US007266620B1

(12) United States Patent
Pechanek et al.

(10) Patent No.: US 7,266,620 B1
(45) Date of Patent: Sep. 4, 2007

(54) SYSTEM CORE FOR TRANSFERRING DATA BETWEEN AN EXTERNAL DEVICE AND MEMORY

(75) Inventors: Gerald George Pechanek, Cary, NC (US); David Strube, Raleigh, NC (US); Edwin Franklin Barry, Vilas, NC (US); Charles W. Kurak, Jr., Durham, NC (US); Carl Donald Busboom, Cary, NC (US); Dale Edward Schneider, Durham, NC (US); Nikos P. Pitsianis, Durham, NC (US); Grayson Morris, Durham, NC (US); Edward A. Wolff, Chapel Hill, NC (US); Patrick R. Marchand, Apex, NC (US); Ricardo E. Rodriguez, Raleigh, NC (US); Marco C. Jacobs, Einhoven (NL)

(73) Assignee: Altera Corporation, San Jose, CA (US)

( * ) Notice: Subject to any disclaimer, the term of this patent is extended or adjusted under 35 U.S.C. 154(b) by 476 days.

(21) Appl. No.: 10/797,726

(22) Filed: Mar. 10, 2004

Related U.S. Application Data

(63) Continuation of application No. 09/599,980, filed on Jun. 22, 2000, now Pat. No. 6,748,517.

(60) Provisional application No. 60/140,425, filed on Jun. 22, 1999.

(51) Int. Cl.
*G06F 13/28* (2006.01)
*G06F 13/00* (2006.01)

(52) U.S. Cl. ........................................ 710/22; 710/308

(58) Field of Classification Search ............ 710/22–35, 710/308
See application file for complete search history.

(56) References Cited

U.S. PATENT DOCUMENTS

| | | | | |
|---|---|---|---|---|
| 4,475,155 | A * | 10/1984 | Oishi et al. | 710/22 |
| 5,179,689 | A * | 1/1993 | Leach et al. | 710/22 |
| 5,822,616 | A * | 10/1998 | Hirooka | 710/22 |
| 6,944,683 | B2 * | 9/2005 | Barry et al. | 710/22 |

* cited by examiner

*Primary Examiner*—Christopher Shin
(74) *Attorney, Agent, or Firm*—Priest & Goldstein, PLLC

(57) ABSTRACT

A system core having an internal memory which transfers data from an external device to the internal memory is described. To this end, the system core includes a processor, a direct memory access (DMA) controller, an instruction memory and a plurality of memories. The instruction memory contains processor instructions and DMA instructions. The DMA controller fetches DMA instructions from the instruction memory. The DMA controller executes the fetched DMA instructions and thus populates the plurality of memories with data from the external device. The processor then operates on the data found in the populated memories.

18 Claims, 3 Drawing Sheets

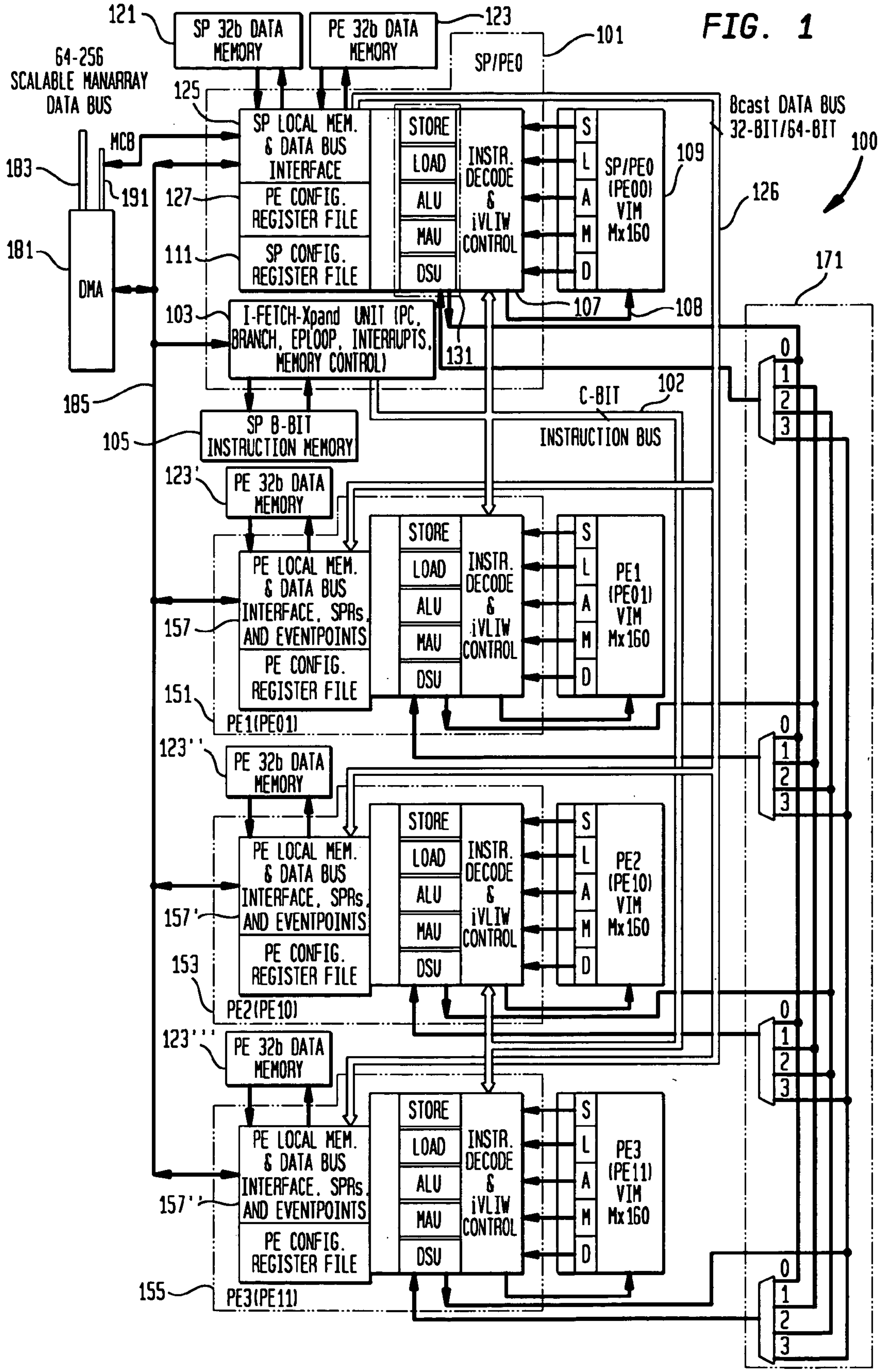
FIG. 1
SP 32b DATA MEMORY
PE 32b DATA MEMORY
SP/PE0
64-256 SCALABLE MANARRAY DATA BUS
Bcast DATA BUS 32-BIT/64-BIT
SP LOCAL MEM. & DATA BUS INTERFACE
PE CONFIG. REGISTER FILE
SP CONFIG. REGISTER FILE
STORE
LOAD
ALU
MAU
DSU
INSTR. DECODE & iVLIW CONTROL
S
L
A
M
D
SP/PE0 (PE00) VIM Mx160
MCB
DMA
I-FETCH-Xpand UNIT (PC, BRANCH, EPLOOP, INTERRUPTS, MEMORY CONTROL)
C-BIT INSTRUCTION BUS
SP 8-BIT INSTRUCTION MEMORY
PE LOCAL MEM. & DATA BUS INTERFACE, SPRs, AND EVENTPOINTS
PE1 (PE01) VIM Mx160
PE1(PE01)
PE2 (PE10) VIM Mx160
PE2(PE10)
PE3 (PE11) VIM Mx160
PE3(PE11)
0
1
2
3
100
101
102
103
105
107
108
109
111
121
123
123'
123''
123'''
125
126
127
131
151
153
155
157
157'
157''
171
181
183
185
191

```
foreach instruction {add mpy sub} {
  # for each processor
  foreach p  {s p} {
    # for each conditional execution
    foreach ce {e t. f.} {
      # for each unit that the instruction holds
      foreach unit {a m d} {
        # foreach testvector
        foreach columns in answerset {
          # generate test with these parameters
        }
      }
    }
  }
}
```

```
set instruction(MPY,FORMAT,1sw)       {RTE RX RY}
set instruction(MPY,FORMAT,1uw)       {RTE RX RY}
set instruction(MPY,FORMAT,2sh)       {RTE RX RY}
set instruction(MPY,FORMAT,2uh)       {RTE RX RY}
set instruction(MPY,RFACCESS)         {{WRITE} {READ} {READ}}
set instruction(MPY,DATATYPES)        {1sw 1uw 2sh 2uh}
set instruction(MPY,DIFFDATATYPES)    {{1sw 1sd 1sw 1sw}{1uw 1ud 1uw 1uw}\
                                      {2sh 2sw 2sh 2sh}{2uh 2uw 2uh 2uh}}
set instruction(MPY,PROCS)            {s p}
set instruction(MPY,UNITS)            {m}
set instruction(MPY,CE)               {e t.f.c n v z}
set instruction(MPY,CC)               {e}
set instruction(MPY,CCOMBO)           {e}
set instruction(MPY,SUFFIX)           {e}
set instruction(MPY,CYCLES)           2
```

```
#setting up state
set instruction(MPY,AS,RXb)     {(maxint)                       {minint)                      }
set instruction(MPY,AS,RYb)     {(maxint)                       {minint)                      }
set instruction(MPY,AS,Cb)      {(0}                            {0}                           }
set instruction(MPY,AS,Vb)      {(0}                            {0}                           }
set instruction(MPY,AS,Nb)      {(0}                            {0}                           }
set instruction(MPY,AS,Zb)      {(0}                            {0}                           }

#specifying desired state.
set instruction(MPY,AS,RTa)     {(mpexpr[maxint]*[maxint])      {mpexpr[minint]*[minint])     }
set instruction(MPY,AS,Ca)      {(0}                            {0}                           }
set instruction(MPY,AS,Va)      {(0}                            {0}                           }
set instruction(MPY,AS,Na)      {(sign0unsil)                   {0}                           }
set instruction(MPY,AS,Za)      {(0}                            {sign0unsil)                  }
```

SYSTEM CORE FOR TRANSFERRING DATA BETWEEN AN EXTERNAL DEVICE AND MEMORY

RELATED APPLICATIONS

The present application is a continuation of U.S. Ser. No. 09/599,980 filed Jun. 22, 2000 now U.S. Pat. No. 6,748,517 which claims the benefit of U.S. Provisional Application Ser. No. 60/140,425 filed Jun. 22, 1999 which are incorporated herein by reference in their entirety.

FIELD OF THE INVENTION

The present invention relates generally to improvements to parallel processing, and more particularly to such processing in the framework of a ManArray architecture and instruction syntax.

BACKGROUND OF THE INVENTION

A wide variety of sequential and parallel processing architectures and instruction sets are presently existing. An ongoing need for faster and more efficient processing arrangements has been a driving force for design change in such prior art systems. One response to these needs have been the first implementations of the ManArray architecture. Even this revolutionary architecture faces ongoing demands for constant improvement.

SUMMARY OF THE INVENTION

A system core having an internal memory which transfers data from an external device to the internal memory is described. To this end, the system core includes a processor, a direct memory access (DMA) controller, an instruction memory and an internal memory. The instruction memory contains processor instructions and DMA instructions. The DMA controller fetches DMA instructions from the instruction memory. The DMA controller executes the fetched DMA instructions and thus populates the internal memory with data from the external device. The processor then operates on the data found in the internal memory. By having a DMA controller which can fetch and execute DMA instructions, the present invention advantageously provides a flexible system core such as providing the system core the feature of populating internal memory according to a particular pattern. Similarly, the system core has the flexibility to read from internal memory and transfer contents of internal memory to external memory according to a particular pattern.

These and other features, aspects and advantages of the invention will be apparent to those skilled in the art from the following detailed description taken together with the accompanying drawings.

BRIEF DESCRIPTION OF THE DRAWINGS

FIG. 3 illustrates an entry from an instruction-description data structure for a multiply instruction (MPY); and FIG. 4 illustrates an entry from an MAU-answer set for the MPY instruction.

DETAILED DESCRIPTION

Figure 1:
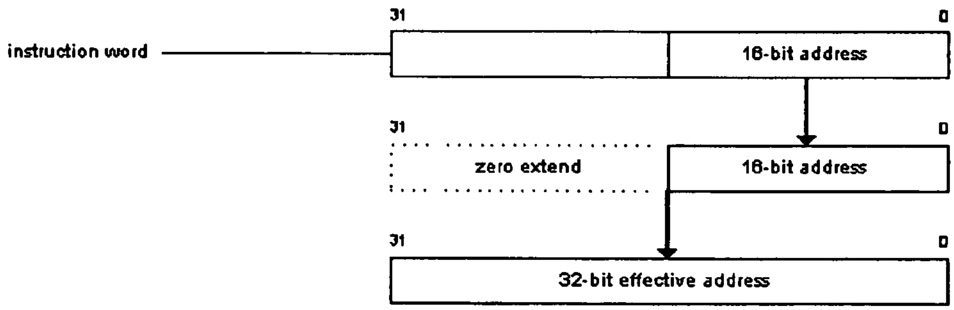
FIG. 1 illustrates an exemplary ManArray 2×2 iVLIW processor showing the connections of a plurality of processing elements connected in an array topology for implementing the architecture and instruction syntax of the present invention.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, now U.S. Pat. No. 6,167,502, U.S. patent application Ser. No. 09/169,255 filed Oct. 9, 1998, now U.S. Pat. No. 6,343,356, U.S. patent application Ser. No. 09/169,256 filed Oct. 9, 1998, now U.S. Pat. No. 6,167,501, U.S. patent application Ser. No. 09/169,072, filed Oct. 9, 1998, now U.S. Pat. No. 6,219,776, U.S. patent application Ser. No. 09/187,539 filed Nov. 6, 1998, now U.S. Pat. No. 6,151,668, U.S. patent application Ser. No. 09/205,5588 filed Dec. 4, 1998, now U.S. Pat. No. 6,173,389, U.S. patent application Ser. No. 09/215,081 filed Dec. 18, 1998, now U.S. Pat. No. 6,101,592, U.S. patent application Ser. No. 09/228,374 filed Jan. 12, 1999 now U.S. Pat. No. 6,216,223, U.S. patent application Ser. No. 09/238,446 filed Jan. 28, 1999, now U.S. Pat. No. 6,366,999, U.S. patent application Ser. No. 09/267,570 filed Mar. 12, 1999, now U.S. Pat. No. 6,446,190, U.S. patent application Ser. No. 09/337,839 filed Jun. 22, 1999, U.S. patent application Ser. No. 09/350,191 filed Jul. 9, 1999, now U.S. Pat. No. 6,356,994, U.S. patent application Ser. No. 09/422,015 filed Oct. 21, 1999, now U.S. Pat. No. 6,408,382, U.S. patent application Ser. No. 09/432,705 filed Nov. 2, 1999 entitled "Methods and Apparatus for Improved Motion Estimation for Video Encoding", U.S. patent application Ser. No. 09/471,217 filed Dec. 23, 1999 entitled "Methods and Apparatus for Providing Data Transfer Control", U.S. patent application Ser. No. 09/472,372 filed Dec. 23, 1999, now U.S. Pat. No. 6,256,683, U.S. patent application Ser. No. 09/596,103 filed Jun. 16, 2000, now U.S. Pat. No. 6,397,324, U.S. patent application Ser. No. 09/598,566 entitled "Methods and Apparatus for Generalized Event Detection and Action Specification in a Processor" filed Jun. 21, 2000, and U.S. patent application Ser. No. 09/598,567 entitled "Methods and Apparatus for Improved Efficiency in Pipeline Simulation and Emulation" filed Jun. 21, 2000, U.S. patent application Ser. No. 09/598,564 entitled filed Jun. 21, 2000, now U.S. Pat. No. 6,622,234, U.S. patent application Ser. No. 09/598,558 entitled "Methods and Apparatus for Providing Manifold Array (ManArray) Program Context Switch with Array Reconfiguration Control" filed Jun. 21, 2000, and U.S. patent application Ser. No. 09/598,084 entitled filed Jun. 21, 2000, now U.S. Pat. No. 6,654,870, as well as, Provisional Application Ser. No. 60/113,637 entitled "Methods and Apparatus for Providing Direct Memory Access (DMA) Engine" filed Dec. 23, 1998, Provisional Application Ser. No. 60/113,555 entitled "Methods and Apparatus Providing Transfer Control" filed Dec. 23, 1998, Provisional Application Ser. No. 60/139,946 entitled "Methods and Apparatus for Data Dependent Address Operations and Efficient Variable Length Code Decoding in a VLIW Processor" filed Jun. 18, 1999, Provisional Application Ser. No. 60/140,245 entitled "Methods and Apparatus for Generalized Event Detection and Action Specification in a Processor" filed Jun. 21, 1999, Provisional Application Ser. No. 60/140,163 entitled "Methods and Apparatus for Improved Efficiency in Pipeline Simulation and Emulation" filed Jun. 21, 1999, Provisional Application Ser. No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" filed Jun. 21, 1999, Provisional Application Ser. No. 60/140,325 entitled "Methods and Apparatus for Establishing Port Priority Function in a VLIW Processor" filed Jun. 21, 1999, Provisional Application Ser. No. 60/140,425 entitled "Methods and Apparatus for Parallel Processing Utilizing a Manifold Array (ManArray) Architecture and Instruction Syntax" filed Jun. 22, 1999, Provisional Application Ser. No. 60/165,337 entitled "Efficient Cosine Transform Implementations on the ManArray Architecture" filed Nov. 12, 1999, and Provisional Application Ser. No. 60/171,911 entitled "Methods and Apparatus for DMA Loading of Very Long Instruction Word Memory" filed Dec. 23, 1999, Provisional Application Ser. No. 60/184,668 entitled "Methods and Apparatus for Providing Bit-Reversal and Multicast Functions Utilizing DMA Controller" filed Feb. 24, 2000, Provisional Application Ser. No. 60/184,529 entitled "Methods and Apparatus for Scalable Array Processor Interrupt Detection and Response" filed Feb. 24, 2000, Provisional Application Ser. No. 60/184,560 entitled "Methods and Apparatus for Flexible Strength Coprocessing Interface" filed Feb. 24, 2000, Provisional Application Ser. No. 60/203,629 entitled "Methods and Apparatus for Power Control in a Scalable Array of Processor Elements" filed May 12, 2000, and Provisional Application Ser. No. 60/212,987 entitled "Methods and Apparatus for Indirect VLIW Memory Allocation" filed Jun. 21, 2000, respectively, all of which are assigned to the assignee of the present invention and incorporated by reference herein in their entirety.

All of the above noted patents and applications, as well as any noted below, are assigned to the assignee of the present invention and incorporated herein in their entirety.

In a presently preferred embodiment of the present invention, a ManArray 2×2 iVLIW single instruction multiple data stream (SIMD) processor 100 shown in FIG. 1 contains a controller sequence processor (SP) combined with processing element-0 (PE0) SP/PE0 101, as described in further detail in U.S. application Ser. No. 09/169,072 entitled "Methods and Apparatus for Dynamically Merging an Array Controller with an Array Processing Element". Three additional PEs 151, 153, and 155 are also utilized to demonstrate improved parallel array processing with a simple programming model in accordance with the present invention. It is noted that the PEs can be also labeled with their matrix positions as shown in parentheses for PE0 (PE00) 101, PE1 (PE01) 151, PE2 (PE10) 153, and PE3 (PE11) 155. The SP/PE0 101 contains a fetch controller 103 to allow the fetching of short instruction words (SIWs) from a B=32-bit instruction memory 105. The fetch controller 103 provides the typical functions needed in a programmable processor such as a program counter (PC), branch capability, digital signal processing eventpoint loop operations, support for interrupts, and also provides the instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. For example, the execution units 131 in the combined SP/PE0 101 can be separated into a set of execution units optimized for the control function, e.g. fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) memory 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. These iVLIWs are identified by the letters SLAMD in VIM 109. The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs 151, 153, and 155 contain common physical data memory units 123', 123'', and 123''' though the data stored in them is generally different as required by the local processing done on each PE. The interface to these PE data memories is also a common design in PEs 1, 2, and 3 and indicated by PE local memory and data bus interface logic 157, 157' and 157''. Interconnecting the PEs for data transfer communications is the cluster switch 171 more completely described in U.S. Pat. No. 6,023,753 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. The primary mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray Control Bus (MCB) 191 is also shown.

Turning now to specific details of the ManArray architecture and instruction syntax as adapted by the present invention, this approach advantageously provides a variety of benefits. Among the benefits of the ManArray instruction syntax, as further described herein, is that first the instruction syntax is regular. Every instruction can be deciphered in up to four parts delimited by periods. The four parts are always in the same order which lends itself to easy parsing for automated tools. An example for a conditional execution (CE) instruction is shown below:

(CE).(NAME).(PROCESSORJUNIT).(DATATYPE)

Below is a brief summary of the four parts of a ManArray instruction as described herein:

(1) Every instruction has an instruction name.

(2A) Instructions that support conditional execution forms may have a leading (T. or F.) or . . .

(2B) Arithmetic instructions may set a conditional execution state based on one of four flags (C=carry, N=sign, V=overflow, Z=zero).

(3A) Instructions that can be executed on both an SP and a PE or PEs specify the target processor via (.S or .P) designations. Instructions without an .S or .P designation are SP control instructions.

(3B) Arithmetic instructions always specify which unit or units that they execute on (A=ALU, M=MAU, D=DSU).

(3C) Load/Store instructions do not specify which unit (all load instructions begin with the letter 'L' and all stores with letter 'S'.

(4A) Arithmetic instructions (ALU, MAU, DSU) have data types to specify the number of parallel operations that the instruction performs (e.g., 1, 2, 4 or 8), the size of the data type (D=64 bit doubleword, W=32 bit word, H=16 bit halfword, B=8 bit byte, or FW=32 bit floating point) and optionally the sign of the operands (S=Signed, U=Unsigned).

(4B) Load/Store instructions have single data types (D=doubleword, W=word, H1=high halfword, H0=low halfword, B0=byte0).

The above parts are illustrated for an exemplary instruction below:

```
[TF.]instr[CNVZ] . [SP][AMD] . [1248][SU][DWHBF]
  |   |     |    |     |  [DWH1H0B]    |
  |   |     |    |     |       |       |
  |   |     |    |     |       |       +-- (4A) Arithmetic Data Type 1SD, 1UD,
  |   |     |    |     |       |               1D, 1SW, 1UW, 1W, 2SW, 2UW, 2W, . . . )
  |   |     |    |     |       +-- (4B) Load/Store Dta Type (D, W, H1, H0, B)
  |   |     |    |     |
  |   |     |    |     +-- (3B) Arithmetic Unit (ALU, MAU, DSU)
  |   |     |    |         (3C) Load/Store Instructions do not specify which unit
  |   |     |    +-- (3A) Target processor (.S for SP, .P for PE)
  |   |     |
  |   |     +-- (2B) Set conditional execution state based on flag (C N V Z)
  |   |
  |   +-- (1) Instruction name (ADD, SUB, etc . . . )
  |
  +-- (2A) Conditional execution (Execute if true T. or execute if false F.)
```

Second, because the instruction set syntax is regular, it is relatively easy to construct a database for the instruction set. The database is organized as instructions with each instruction record containing entries for conditional execution (CE), target processor (PROCS), unit (UNITS), datatypes (DATATYPES) and operands needed for each datatype (FORMAT). The example below using TcLsyntax, as further described in J. Ousterhout, Tcl and the Tk Toolkit, Addison-Wesley, ISBN 0-201-63337-X, 1994, compactly represents all 196 variations of the ADD instruction.

The 196 variations come from (CE)*(PROCS)*(UNITS)*(DATATYPES)=7 *2*2*7=196. It is noted that the 'e' in the CE entry below is for unconditional execution.

| | |
|---|---|
| set instruction(ADD,CE) | {e t. f. c n v z} |
| set instruction(ADD,PROCS) | {s p} |
| set instruction(ADD,UNITS) | {a m} |
| set instruction(ADD,DATATYPES) | {1d 1w 2w 2h 4h 4b 8b} |
| set instruction(ADD,FORMAT,1d) | {RTE RXE RYE} |
| set instruction(ADD,FORMAT,1w) | {RT RX RY} |
| set instruction(ADD,FORMAT,2w) | {RTE RXE RYE} |
| set instruction(ADD,FORMAT,2h) | {RT RX RY} |
| set instruction(ADD,FORMAT,4h) | {RTE RXE RYE} |
| set instruction(ADD,FORMAT,4b) | {RT RX RY} |
| set instruction(ADD,FORMAT,8b) | {RTE RXE RYE} |

The example above only demonstrates the instruction syntax. Other entries in each instruction record include the number of cycles the instruction takes to execute (CYCLES), encoding tables for each field in the instruction (ENCODING) and configuration information (CONFIG) for subsetting the instruction set. Configuration information (1×1, 1×2, etc.) can be expressed with evaluations in the database entries:

```
proc Manta { } {
# are we generating for Manta?
  return 1
# are we generating for ManArray?
# return 0
}
set instruction(MPY,CE) [Manta]?{e t. f.}:{e t. f. c n v z}
```

Having the instruction set defined with a regular syntax and represented in database form allows developers to create tools using the instruction database. Examples of tools that have been based on this layout are:

Assembler (drives off of instruction set syntax in database),

Disassembler (table lookup of encoding in database),

Simulator (used database to generate master decode table for each possible form of instruction), and Testcase Generators (used database to generate testcases for assembler and simulator).

Another aspect of the present invention is that the syntax of the instructions allows for the ready generation of self-checking code from test vectors parameterized over conditional execution/datatypes/sign-extension/etc. TCgen, a test case generator, and LSgen are exemplary programs that generate self-checking assembly programs that can be run through a Verilog simulator and C-simulator.

Figure 2:
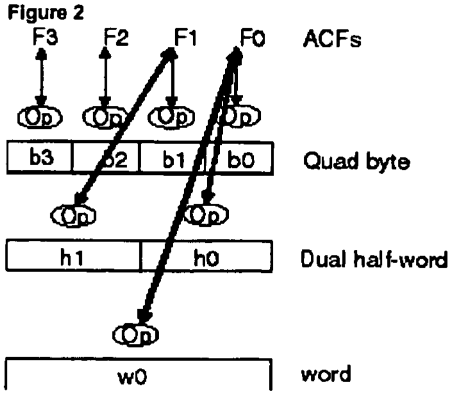
FIG. 2 illustrates an exemplary test case generator program in accordance with the present invention.

An outline of a TCgen program 200 in accordance with the present invention is shown in FIG. 2. Such programs can be used to test all instructions except for flow-control and iVLIW instructions. TCgen uses two data structures to accomplish this result. The first data structure defines instruction-set syntax (for which datatypes/ce[1,2,3]/sign extension/rounding/operands is the instruction defined) and semantics (how many cyles/does the instruction require to be executed, which operands are immediate operands, etc.). This data structure is called the instruction-description data structure.

An instruction-description data structure 300 for the multiply instruction (MPY) is shown in FIG. 3 which illustrates an actual entry out of the instruction-description for the multiply instruction (MPY) in which e stands for empty. The second data structure defines input and output state for each instruction. An actual entry out of the MAU-answer set for the MPY instruction 400 is shown in FIG. 4. State can contain functions which are context sensitive upon evaluation. For instance, when defining an MPY test vector, one can define: $RX_b$ (RX before)=maxint, $RY_b$ (RY before) =maxint, $RT_a$=maxint*maxint. When TCgen is generating an unsigned word form of the MPY instruction, the maxint would evaluate to 0xffffffff. When generating an unsigned halfword form, however, it would evaluate to 0xffff. This way the test vectors are parameterized over all possible instruction variations. Multiple test vectors are used to set up and check state for packed data type instructions.

The code examples of FIGS. 3 and 4 are in Tcl syntax, but are fairly easy to read. "Set" is an assignment, ( ) are used for array indices and the { } are used for defining lists. The only functions used in FIG. 4 are "maxint", "minint", "sign0unsi1", "sign1unsi0", and an arbitrary arithmetic expression evaluator (mpexpr). Many more such functions are described herein below.

TCgen generates about 80 tests for these 4 entries, which is equivalent to about 3000 lines of assembly code. It would take a long time to generate such code by hand. Also, parameterized testcase generation greatly simplifies maintenance. Instead of having to maintain 3000 lines of assembly code, one only needs to maintain the above defined vectors. If an instruction description changes, that change can be easily made in the instruction-description file. A configuration dependent instruction-set definition can be readily established. For instance, only having word instructions for the ManArray, or fixed point on an SP only, can be fairly easily specified.

Test generation over database entries can also be easily subset. Specifying "SUBSET(DATATYPES) {1sw 1sh} " would only generate testcases with one signed word and one signed halfword instruction forms. For the multiply instruction (MPY), this means that the unsigned word and unsigned halfword forms are not generated. The testcase generators TelRita and TelRitaCorita are tools that generate streams of random (albeit with certain patterns and biases) instructions. These instruction streams are used for verification purposes in a co-verification environment where state between a C-simulator and a Verilog simulator is compared on a per-cycle basis.

Utilizing the present invention, it is also relatively easy to map the parameterization over the test vectors to the instruction set since the instruction set is very consistent.

Further aspects of the present invention are addressed in the documentation which follows below. This documentation is divided into the following principle sections:

| | |
|---|---|
| Section I | Table of Contents; |
| Section II | Programmer's User's Guide (PUG); |
| Section III | Programmer's Reference (PREF). |

The Programmer's User's Guide Section addresses the following major categories of material and provides extensive details thereon: (1) an architectural overview; (2) processor registers; (3) data types and alignment; (4) addressing modes; (5) scalable conditional execution (CE); (6) processing element (PE) masking; (7) indirect very long instruction words (iVLIWs); (8) looping; (9) data communication instructions; (10) instruction pipeline; and (11) extended precision accumulation operations.

The Programmer's Reference Section addresses the following major categories of material and provides extensive details thereof: (1) floating-point (FP) operations, saturation and overflow; (2) saturated arithmetic; (3) complex multiplication and rounding; (4) key to instruction set; (5) instruction set; (6) instruction formats, as well as, instruction field definitions.

Manta User and Reference Information

Section I - Contents

Manta User and Reference Information
Section I - Contents
Section II - Manta User's Guide
Architectural Overview
Table of Contents:
1 Core Architecture
2 Features
Processor Registers
Table of Contents
1 SP/PE Register Address Maps
2 SP Primary Register File
3 PE Primary Register File
4 PE Register Usage Restrictions
5 SP Register Usage Restrictions
6 Register Ports
7 Simulator-only Registers
Data Types and Alignment
Table of Contents:
1 Supported Data Types
1.1 Integer Data Formats
2 Compute Register Data Types
3 Address Register Data Types
Addressing Modes
Table of Contents:
1 Direct Addressing Modes
2 Indirect Addressing Modes
3 Special Addressing Modes
Scalable Conditional Execution
Table of Contents
1 - Introduction
2 - Arithmetic Scalar Flags
3 - Arithmetic Condition Flags
4 - ACFs and ASFs in Packed-Data Operations
5 - The Hierarchical Conditional Execution Architecture
6 - Conditional Branch-Type Instructions
7 - Compare Instructions
8 - iVLIW Conditional Execution
9 - Rules for Updating the ACF/ASF Flags
Rule #3:
PE Masking
Table of Contents
1 Introduction
2 The PE Mask Bits in SCR1
3 Multi-Cycle Instructions and PE Masking
4 Pipeline Considerations for PE Masking
5 Data Communications Instructions with PE Masking
6 iVLIW Instructions with PE Masking
Program Flow Control
Table of Contents 1 Program Flow Control on Manta
2 Flow Control Instructions Overview
Indirect Very Long Instruction Words (iVLIWs)
Table of Contents
1. Terminology
2. Overview
3. VLIW Memory Organization and Control
4 Instructions for Operating on iVLIWs: LV, SETV, XV
Instruction Event-Point Looping
Table of Contents
1 Introduction
2 Instruction Event-Point Registers
3 Initializing the IEP Registers
4 General EPLooping Restrictions
Data Communication Instructions
Table of Contents
1 Introduction
2 Load Broadcast Instructions, LBRx
3 Cluster Switch Instructions
4 General Operation of Data Communication Instructions
Floating Point Operations, Saturation and Overflow:
Saturated Arithmetic
Table of Contents
When to Saturate
The Saturation Mode
Saturation Values
Complex Multiplication and Rounding
Instruction Pipeline
Table of Contents
1 Pipeline Operation
2 Pipeline Stages
3 Pipeline Instruction Flow Summary
4 Pipeline Operation Examples
5 State Transitions between the Instruction-Processing States
6 Pipeline Stalls
Extended-Precision Accumulation Operations
Table of Contents
1 The Extended Precision Register (XPR)
2 The MPYXA Instruction
The XSHR instruction
3 The XSCAN instruction
Interrupt Processing
Table of Contents
1 - Overview of Interrupts
3 - Interrupt Sources
4 - Interrupt Selection
5 - Mapping Interrupts to Interrupt Service Routines (ISRs)
6 - Interrupt Control
7 - Interrupt Processing
8 - Interrupt Pipeline Diagrams
9 - Interrupt Service Routines: Context Save/Restore Guidelines
10 - Interrupt Response Times
11 - Interrupt Vector Table
Event Point Architecture
Table of Contents
3 Instruction Event points
6 Event Point Instructions: EPLOOPx and EPLOOPIx
7 EPLOOPx Instruction Pipeline Timing EPLOOPix Instruction Pipeline Timing
Memory Map
Table of Contents
1 Overview
2 MDB Bus Master View
3 Non-SP MCB Master View
4 SP MCB Master View
5 Manta Address Map - PE View (Load/Store)
6 System Address Map - SP View
Special-Purpose Registers
Table of Contents
1 Overview
2 Configuration Registers
3 Message Communication: Mailbox Registers and Addresses
4 Timer Registers
5 Random Number Generation
6 Signature Analysis Registers
7 Debug Registers
8 Event-Points Registers
DMA Subsystem Overview
Table of Contents
1 Introduction
2 Simple Inbound Transfer to SP Data Memory
3 Instruction Set Overview
Controlling DMA Transfers
Table of Contents
1 DMA Reset - Initializing the DMA Controller and Lane Controllers
2 Specifying DMA Transfer Addresses
3 Specifying Transfer Data-Type
4 Executing a DMA Transfer Program
5 Synchronizing Host Processor(s) with Data Transfer
6 Special Transfer Types
DMA Register and Command Address Reference
Table of Contents
1 DMA Register Map
DMA Instruction Set Reference - Transfer Instructions
Table of Contents
1 Transfer Instructions
TCx.IO
TCx.Block
TCx.Stride
TCx.Circular
TCx.PEBlockCyclic
TCx.PESelectIndex
TCx.PESelectPE
TCx.PESelectIndexPE
TCx.Update
TSx.IO
TSx.Block
TSx.Stride
TSx.Circular
TSx.Update
DMA Instruction Set Reference - Control Instructions
Table of Contents
1 Control Instructions
Branching Instructions
JMP - JUMP TPC-relative (GF conditional)
JMPD - JUMP Direct (GF conditional)

CALL - CALL TPC-relative (GF conditional)
CALLD - CALL Direct (GF conditional)
RET - Return from Subroutine
CLEAR, RESTART and NOP - Transfer State Control Instructions
PEXLAT -- Load PE Translate Table
BITREV - Load Bit-Reverse Address Translation code
WAIT - Wait While Condition is TRUE
SIGNAL - Conditional Signal of Interrupt, Message, Semaphore
LIMEAR - Load Immediate Event Action Registers
LIMGR - Load Immediate General Register(s)
LIMSEM8- Load Immediate Semaphore Registers
LIMSEM4- Load Immediate Semaphore Registers (4-bit, with optional 1 or 0 extension)
ManArray Control Bus
  Table of Contents
  Bus Interfaces
  ManArray Control Bus
  MCB to MDB Bus Bridge
ManArray Data Bus
  Table of Contents
  Bus Interfaces
  ManArray Data Bus
Manta SDRAM
  Table of Contents
  The SDRAM Block
Glossary of Terms
Section III - Manta Programmer's Reference
Manta DSP Array Instruction Set Reference
Key to the Instruction Set
  Table of Contents:
  1 Example Instruction:
  2 Example Instruction Syntax
  3 Key to Instruction Set Mnemonic
  *4 Key to PE Positions*
Manta DSP Array Instruction Set Summary Table
Control/VLIW Instruction Formats
SU/LU Instruction Formats
ALU/MAU Instruction Formats
DSU Instruction Formats
CTRL - Control Instructions
Control Instructions Pipeline Considerations and Restrictions
  1 - General Pipeline Considerations for Control Instructions
CALL - Call PC-Relative Subroutine
CALLcc - Call PC-Relative Subroutine on Condition
CALLD - Call Direct Subroutine
CALLDcc - Call Direct Subroutine on Condition
CALLI - Call Indirect Subroutine
CALLIcc - Call Indirect Subroutine on Condition
EPLOOPx - Set Up and Execute an Instruction Event Point Loop
EPLOOPIx - Set Up and Execute an Instruction Event Point Loop Immediate
JMP - Jump PC-Relative
JMPcc - Jump PC-Relative on Condition
JMPD - Jump Direct
JMPDcc - Jump Direct on Condition
JMPI - Jump Indirect
JMPIcc - Jump Indirect on Condition
NOP - No Operation
RET - Return from Call
RETcc - Return from Call on Condition RETI - Return from Interrupt ....................
RETIcc - Return from Interrupt on Condition ....................
SYSCALL - System Call ....................
SVC - Simulator/Verilog Control ....................
VLIW - VLIW Instructions ....................
LV - Load/Disable VLIW ....................
SETV - Set VLIW Slot State ....................
XV - Execute VLIW ....................
SU - Store Unit Instructions ....................
Load/Store Instruction Pipeline Considerations and Restrictions ....................
Table of Contents ....................
1 - General Pipeline Considerations for Load/Store Instructions ....................
2 - Restrictions to Specific Load/Store Instructions ....................
3 - Other Restrictions ....................
SBD - Store Base + Displacement ....................
SD - Store Direct ....................
SI - Store Indirect with Scaled Update ....................
SII - Store Indirect with Scaled Immediate Update ....................
SIU - Store Indirect with Unscaled Update ....................
SIUI - Store Indirect with Unscaled Immediate Update ....................
SMX - Store Modulo Indexed with Scaled Update ....................
SMXU - Store Modulo Indexed with Unscaled Update ....................
STBL - Store to Table ....................
LU - Load Unit Instructions ....................
Load/Store Instruction Pipeline Considerations and Restrictions ....................
Table of Contents ....................
1 - General Pipeline Considerations for Load/Store Instructions ....................
2 - Restrictions to Specific Load/Store Instructions ....................
3 - Other Restrictions ....................
ADDA - Add Address ....................
COPYA - Copy Address ....................
LA - Load Address (PC Relative) ....................
LABD - Load Address Base + Displacement ....................
LBD - Load Base + Displacement ....................
Load Broadcast Instructions Overview ....................
LBRI - Load Broadcast Indirect with Scaled Update ....................
LBRII - Load Broadcast Indirect with Scaled Immediate Update ....................
LBRIU - Load Broadcast Indirect with Unscaled Update ....................
LBRIUI - Load Broadcast Indirect with Unscaled Immediate Update ....................
LBRMX - Load Broadcast Modulo Indexed with Scaled Update ....................
LBRMXU - Load Broadcast Modulo Indexed with Unscaled Update ....................
LBRTBL - Load Broadcast from Table ....................
LD - Load Direct ....................
LI - Load Indirect with Scaled Update ....................
LII - Load Indirect with Scaled Immediate Update ....................
LIM - Load Immediate ....................
LIU - Load Indirect with Unscaled Update ....................
LIUI - Load Indirect with Unscaled Immediate Update ....................
LMX - Load Modulo Indexed with Scaled Update ....................
LMXU - Load Modulo Indexed with Unscaled Update ....................
LTBL - Load from Table ....................
SUBA - Subtract Address ....................
ALU - Arithmetic Logic Unit Instructions ....................
ABS - Absolute Value with Saturate ....................
ABSDIF - Absolute Difference ....................
AND - Logical AND ....................
CMPcc - Compare for Condition ....................
CMPIcc - Compare Immediate for Condition ....................

CNTMSK - Count 1 Bits with Mask
FADD - Floating-Point Add
FCMPcc - Floating-Point Compare for Condition
FSUB - Floating-Point Subtract
MAX - Maximum
MIN - Minimum
NOT - Logical NOT
OR - Logical OR
XOR - Logical XOR
ALU/MAU Common Instructions
ADD - Add
ADDI - Add Immediate
ADDS - Add with Saturate
BFLYD2 - Butterfly Divide by 2
BFLYS - Butterfly with Saturate
MEAN2 - Mean of 2 elements
SUB - Subtract
SUBI - Subtract Immediate
SUBS - Subtract with Saturate
MAU - Multiply Accumulate Unit Instructions
FMPY - Floating-Point Multiply
MEAN4 - MEAN of 4 elements
MPY - Multiply
MPYA - Multiply Accumulate
MPYCX - Multiply Complex
MPYCXD2 - Multiply Complex Divide by 2
MPYCXJ - Multiply Complex Conjugate
MPYCXJD2 - Multiply Complex Conjugate Divide by 2
MPYD2 - Multiply Divide by 2
MPYH - Multiply High
MPYL - Multiply Low
MPYXA - Multiply with Extended Accumulate
SUM2P - Sum of 2 Products
SUM2PA - Sum of 2 Products Accumulate
SUM4ADD - Four Input Summation with Add
SUM8ADD - Eight Input Summation with Add
DSU - Data Select Unit Instructions
BAND - Bit Load with Logical AND
BANDI - Bit Load with Logical AND Immediate
BANDN - Bit AND with NOT Bit
BANDNI - Bit AND with NOT Bit Immediate
BCLR - Bit Clear
BCLRI - Bit Clear Immediate
BL - Bit Load
BLI - Bit Load Immediate
BLN - Bit Load with Logical NOT
BLNI - Bit Load with Logical NOT Immediate
BNOT - Bit NOT
BNOTI - Bit NOT Immediate
BOR - Bit Load with Logical OR
BORI - Bit Load with Logical OR Immediate
BORN - Bit OR with NOT Bit
BORNI - Bit OR with NOT Bit Immediate
BS - Bit Store
BSI - Bit Store Immediate
BSET - Bit Set
BSETI - Bit Set Immediate
BSWAP - Bit Swap BSWAPI - Bit Swap Immediate
BXOR - Bit Load with Logical XOR
BXORI - Bit Load with Logical XOR Immediate
BXORN - Bit XOR with NOT Bit
BXORNI - Bit XOR with NOT Bit Immediate
CNTRS - Count Redundant Sign Bits
COPY - Copy
COPYS - Copy Selective
FDIV - Floating-Point Divide
FRCP - Floating-Point Reciprocal
FRSQRT - Floating-Point Reciprocal Square Root
FSQRT - Floating-Point Square Root
FTOI - Convert Single Precision Floating-Point to Integer
FTOIS - Convert Single Precision Floating-Point to Integer Scaled
ITOF - Convert Integer to Single Precision Floating-Point
ITOFS - Convert Integer to Single Precision Floating-Point Scaled
MIX - Mix Packed Data
PACKB - Pack 4 Bytes into 1 Word
PACKH - Pack High Data into Smaller Format
PACKL - Pack Low Data into Smaller Format
PERM - Permute
PEXCHG - PE to PE Exchange
ROT - Rotate
ROTLI - Rotate Left Immediate
ROTRI - Rotate Right Immediate
SCANL - Scan Left for First '1' Bit
SCANR - Scan Right for First '1' Bit
SHL - Shift Left
SHLI - Shift Left Immediate
SHR - Shift Right
SHRI - Shift Right Immediate
SPRECV - SP Receive from PE
SPSEND - SP Send
UNPACK - Unpack Data Elements
XSCAN - Scan Extended precision register for MSB
XSHR - Extended Shift Right
Instruction Field Definitions

Section II - Manta User's Guide

Architectural Overview

BOPS, Inc. Manta SYSSIM 2.31

Table of Contents:

1 Core Architecture
2 Features

2.1 iVLIW Core
2.2 Processor Registers
2.3 Program and Data Buses 2.3.1 Program Bus
2.3.2 PE1(2,3) Local Data Buses
2.3.3 SP/PE0 Local Data Buses
2.3.4 SP Broadcast Load Data Bus 2.4 VLIW Memory Interfaces

1 Core Architecture

The ManArray™ Architecture is the basis for BOPS' family of co-processor cores. The Manta Co-Processor Core is a member of the BOPS2K family of co-processor cores. This core offers an ultra high-performance DSP solution for a variety of communications and consumer applications. The Manta Co-Processor Core is a DSP array of four iVLIW - enabled processing units, which is complemented by a high-performance DMA and buses and scalable memory bandwidth. The combination of these technologies provides a core that balances extreme computational power with matching high-performance I/O. The Manta Core provides the following architectural features:

- an iVLIW -enabled 2x2 DSP Array for extreme computational power
- high-performance DMA and buses for powerful I/O
- scalable memory bandwidth to match the application's needs Manta Core's DSP Array consists of:

- One 32-bit iVLIW Sequence Processor (SP), merged with PE0, featuring:
  - Program Flow Control Unit (PFCU)
  - Arithmetic Logic Unit (ALU):
    - fixed-point
    - floating-point
  - Multiply-Accumulate Unit (MAU):
    - fixed-point
    - floating-point
  - Data Select Unit (DSU):
    - hardware divide/square-root unit
    - bit, communication, shift, rotate, permute, extract, insert
  - Load Unit (LU)

- Store Unit (SU)
- Interrupt Controller
- Primary Register File
- Special-Purpose Registers
- Local Data Memory
- Local Instruction Memory
- Local VLIW Memory
- Scalable Conditional Execution
- Zero-latency Data Communication across the array
- Event-Point Architecture

- Four 32-bit iVLIW Processing Elements (PE0, PE1, PE2, PE3), each featuring:
  - Arithmetic Logic Unit (ALU):
    - fixed-point
    - floating-point
  - Multiply-Accumulate Unit(MAU):
    - fixed-point
    - floating-point
  - Data Select Unit (DSU)
    - hardware divide/square-root unit
    - bit, communication, shift, rotate, permute, extract, insert
  - Load Unit (LU)
  - Store Unit (SU)
  - Interrupt Controller
  - Primary Register File
  - Special-Purpose Registers
  - Local Data Memory
  - Local Instruction Memory
  - Local VLIW Memory
  - Scalable Conditional Execution
  - Zero-latency Data Communication across the array
  - Event-Point Architecture DSP Array Block Diagram (logical view) (click to enlarge/double-click to reduce size)

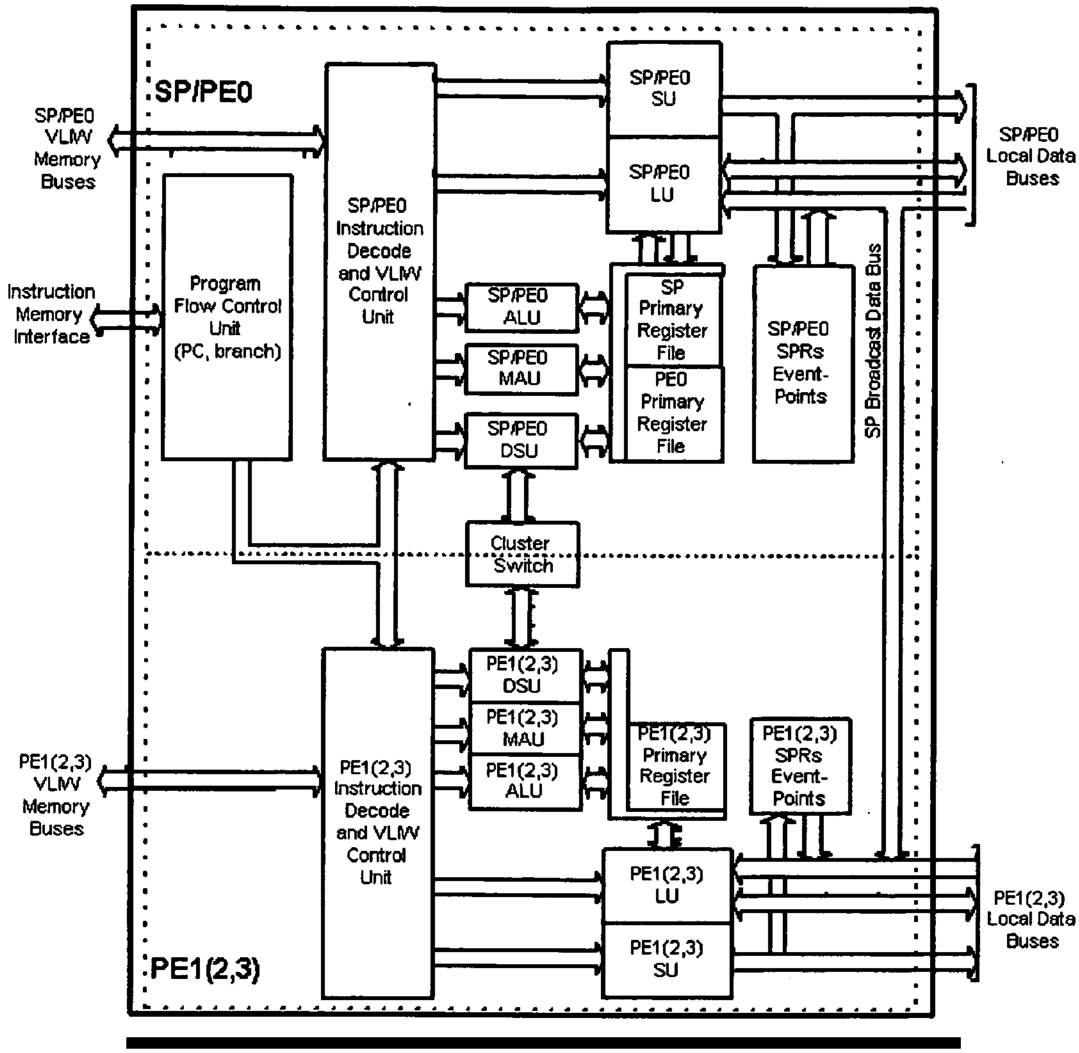
SP/PE0
SP/PE0 VLIW Memory Buses
Program Flow Control Unit (PC, branch)
Instruction Memory Interface
SP/PE0 Instruction Decode and VLIW Control Unit
SP/PE0 SU
SP/PE0 LU
SP/PE0 Local Data Buses
SP/PE0 ALU
SP/PE0 MAU
SP/PE0 DSU
SP Primary Register File
PE0 Primary Register File
SP/PE0 SPRs Event-Points
SP Broadcast Data Bus
Cluster Switch
PE1(2,3) DSU
PE1(2,3) MAU
PE1(2,3) ALU
PE1(2,3) Primary Register File
PE1(2,3) SPRs Event-Points
PE1(2,3) VLIW Memory Buses
PE1(2,3) Instruction Decode and VLIW Control Unit
PE1(2,3) LU
PE1(2,3) SU
PE1(2,3) Local Data Buses
PE1(2,3)

2 Features

2.1 The DSP Array

The DSP Array combines four high-performance 32-bit, iVLIW -capable Processing Elements (PE0,1,2,3) with a high-performance 32-bit, iVLIW -capable Sequence Processor (SP).

Each PE has five execution units: a MAU, an ALU, a DSU, an LU, and an SU. The ALU, MAU and DSU on each PE support both fixed-point and single-precision floating-point operations.

The SP is merged with PE0 and it too has five execution units: a MAU, an ALU, a DSU, an LU, and an SU. The ALU, MAU and DSU on each PE support both fixed-point and single-precision floating-point operations. The SP also includes a program flow control unit.

The floating-point ALUs are multi-functional, arithmetic units capable of performing two-cycle addition, subtraction, and comparison operations on IEEE Standard 754-1985 basic 32-bit format single precision floating-point data.

The floating-point MAUs are multi-functional, arithmetic units capable of performing two-cycle multiply operations on IEEE Standard 754-1985 basic 32-bit format single precision floating-point data.

The fixed-point ALUs are multi-functional, arithmetic units capable of performing single-cycle addition, subtraction, comparison, logical, min, max, and absolute value operations on signed and unsigned integer data in packed and unpacked formats.

The fixed-point MAUs are multi-functional, arithmetic units capable of performing two-cycle multiply-with-accumulate, multiply-complex, single-cycle addition, subtraction, and summation on signed and unsigned integer data in packed and unpacked formats.

The DSUs are multi-functional data-manipulation units capable of performing single-cycle shifts, rotates, permutes, scans, sign-extensions and bit-manipulation functions on data in packed and unpacked formats. The DSUs can perform multi-cycle divides, reciprocals, square-roots and reciprocal square-root operations on IEEE Standard 754-1985 basic 32-bit format single precision floating-point data, and multi-cycle divides and modulo operations on signed and unsigned integer data formats. The multi-cycle operations allow the DSU pipeline to execute other single-cycle instructions while a multi-cycle operation is in progress. The DSUs also perform single-cycle data transfers between any processor on the array.

The LU and SU perform external data transfers between each processor's local registers and that processor's local memory. A sign-extension circuit in each LU provides sign-extension capability when loading byte and integer data values from memory.

The SP's Program Flow Control Unit (PFCU) performs instruction address generation and fetching, provides branch control, and handles interrupt processing.

---

2.2 Processor Registers

The SP and PE processors each contain a Primary Register File. Primary Register Files are comprised of the Compute Register File (CRF), the Address Register File (ARF) and the Miscellaneous Register File (MRF).

The Compute Register File (CRF) can be configured as a 16x64-bit or a 32x32-bit register file on a cycle-by-cycle basis. Compute registers serve as the data source(s) or destination(s) for all ALU, the MAU, and DSU instructions and can also be accessed via the LU and the SU.

The Address Register File (ARF) is configured as a 8x32-bit register file. Address registers contain address pointers used by the LU and the SU to address memory and can also be accessed via the DSU.

The Miscellaneous Register File (MRF) is configured as a 24x32-bit register file. Miscellaneous registers include registers to retain the higher-order bytes from a MPXA (Multiply-Extended-Accumulate) operation, registers that store condition information (SCR0/1) and registers for interrupt control and processing.

In addition to a Primary Register File, the SP and PEs also contain Special-Purpose Registers (SPRs). SPRs include system configuration registers, Event-Point registers, and DMA control, as well as any system-specific/application-specific registers.

---

2.3 Program and Data Buses

Separate buses allow for concurrent instruction fetches, PE data accesses, and SP data accesses:

- Program Bus: SP_IADDR, SP_IDATA
- PE Local Data Buses: PE_LADDR, PE_SADDR, PE_LDATA, PE_SDATA
- SP/PE0 Local Data Buses: SP_LADDR, SP_SADDR, SP_LDATA, SP_SDATA
- SP Broadcast Load Data Bus: SP_BLDATA

2.3.1 Program Bus

The 32-bit SP_IADDR (instruction address) and SP_IDATA (instruction data) buses provide an interface to on-chip program memories. Inside, the SP_IADDR and the SP_IDATA buses are connected to the Fetch Program Counter (FPC) and the 1st Instruction Registers (IR1), respectively.

2.3.2 PE1(2,3) Local Data Buses

The PE1(2,3)(2,3)_LADDR (load address) and PE1(2,3)(2,3)_LDATA (load data) buses, and the PE1(2,3)(2,3)_SADDR (store address) and PE1(2,3)(2,3)_SDATA (store data) buses, respectively, provide a read and a write path from PE1(2,3)(2,3)'s primary register file to on-chip PE1(2,3)(2,3) local data memories. Together, these 32-bit buses allow two PE1(2,3)(2,3) local memory accesses (one load and one store per PE) to be performed every cycle.

2.3.3 SP/PE0 Local Data Buses

The SP_LADDR (load address) and SP_LDATA (load data) buses, and the SP_SADDR (store address) and SP_SDATA (store data) buses, respectively, provide a read and a write path from PE0 's primary register file and the SP's primary register file, to on-chip PE1(2,3) local data memories. Together, these 32-bit buses allow any of the following, dual, local memory accesses to be performed every cycle:

- a PE0 local memory-to-PE0 register transfer and a PE0 register-to-PE0 local memory transfer
- a PE0 local memory-to-PE0 register transfer and a SP register-to-SP local memory transfer
- a SP local memory-to-SP register transfer and a PE0 register-to-PE0 local memory transfer
- a SP local memory-to-SP register transfer and a SP register-to-SP local memory transfer

2.3.4 SP Broadcast Load Data Bus

The 32-bit SP_BLDATA (broadcast load data) bus is an extension of the SP local load data bus and it provides an interface between each PEs primary register files and SP local data memory. The SP broadcast load data bus may be used in conjunction with the SP/PE0 local data buses to support the following local memory accesses every cycle:

- a SP local memory-to-any/all PEs register transfer, and PEs register-to-PEs local memory transfers.
- a SP local memory-to-PE0 and/or PE1(2,3) register transfer, a SP register-to-SP local memory transfer, and PE1(2,3),2, and 3 register-to-PE1(2,3),2, and 3 local memory transfer.

2.4 VLIW Memory Interfaces

Each VLIW Memory Interface comprises a read data bus, a write data bus, and a shared address bus.

Processor Registers

BOPS, Inc. Manta SYSSIM 2.31

This chapter describes the SP and PE processor register files.

---

Table of Contents

1 SP/PE Register Address Maps
2 SP Primary Register File

2.1 SP Compute Registers
2.2 SP Address Registers
2.3 SP Miscellaneous Registers (2.3.1-2 reserved registers)
2.3.3 SP VIM Address Register (VAR)
2.3.4 SP User Link Register (ULR)
2.3.5 SP Debug Interrupt Link Register (DBGILR)
2.3.6 SP General-Purpose Interrupt Link Register (GPILR)
2.3.7 SP Debug Interrupt Status Register (DBGISR)
2.3.8 SP General-Purpose Interrupt Status Register (GPISR)
2.3.9 SP Interrupt Request Register (IRR)
2.3.10 SP Interrupt Enable Register (IER)
2.3.11 SP VIM Read Port Register (VPORT)
2.3.12 SP Status and Control Register (SCR0)
2.3.13 SP Status and Control Register 1 (SCR1)
2.3.14 SP Divide Square-Root Result Register (DSQR)
(2.3.15 reserved register)
2.3.16 SP Extended-Precision Register (XPR)
(2.3.17 reserved register)
2.3.18 SP MRF Extension Address Register (MRFXAR)
2.3.19 SP MRF Extension Data Register (MRFXDR1)
(2.3.20 reserved register)

2.4 SP Miscellaneous Registers Extension 1

2.4.1 SP Saved Status Register 0 (SSR0)
2.4.2 SP Saved Status Register 1 (SSR1)
2.4.3 SP Saved Status Register 2 (SSR2)

3 PE Primary Register File

3.1 PE Compute Registers
3.2 PE Address Registers
3.3 PE Miscellaneous Registers (3.3.1-2 PE reserved registers)
3.3.3 VIM Address Register (VAR)
(3.3.4 - 10 PE reserved registers)
3.3.11 VIM Read Port Register (VPORT)
3.3.12 PE Status and Control Register 0 (SCR0)
3.3.13 PE Status and Control Register 1 (SCR1)
3.3.14 PE Divide/Square Root Unit Register (DSQR)
(3.3.15 reserved register)
3.3.16 PE Extended Precision Register (XPR)
(3.3.17 reserved register)
3.3.18 PE-accessible MRF Extension Address Register (MRFXAR)
3.3.19 PE MRF Extension Data Register (MRFXDR1)
(3.3.20 reserved register)

3.4 PE Miscellaneous Registers Extension 1

3.4.1 PE ALU Interrupt Forwarding Register 0 (ALUIFR0)
3.4.2 PE ALU Interrupt Forwarding Register 1 (ALUIFR1)
3.4.3 PE MAU Interrupt Forwarding Register 0 (MAUIFR0)
3.4.4 PE MAU Interrupt Forwarding Register 1 (MAUIFR1)
3.4.5 PE Interrupt Forwarding Register Address Register (IFRADR)
3.4.6 PE Saved Status Register 0 (SSR0)
3.4.7 PE Saved Status Register 1 (SSR1)
3.4.8 PE Saved Status Register 2 (SSR2)

4 PE Register Usage Restrictions
5 SP Register Usage Restrictions
6 Register Ports

6.1 Distributed Resource Conflicts

7 Simulator-only Registers

7.1 HOTF Register

1 SP/PE Register Address Maps

SP Register Address Map

| Register Number | Abbreviation | Register Name |
|---|---|---|
| 000000 | r0 | Compute Register 0 |
| 000001 | r1 | Compute Register 1 |
| 000010 | r2 | Compute Register 2 |
| 000011 | r3 | Compute Register 3 |
| 000100 | r4 | Compute Register 4 |
| 000101 | r5 | Compute Register 5 |
| 000110 | r6 | Compute Register 6 |
| 000111 | r7 | Compute Register 7 |
| 001000 | r8 | Compute Register 8 |
| 001001 | r9 | Compute Register 9 |
| 001010 | r10 | Compute Register 10 |
| 001011 | r11 | Compute Register 11 |
| 001100 | r12 | Compute Register 12 |
| 001101 | r13 | Compute Register 13 |
| 001110 | r14 | Compute Register 14 |
| 001111 | r15 | Compute Register 15 |
| 010000 | r16 | Compute Register 16 |
| 010001 | r17 | Compute Register 17 |
| 010010 | r18 | Compute Register 18 |
| 010011 | r19 | Compute Register 19 |
| 010100 | r20 | Compute Register 20 |
| 010101 | r21 | Compute Register 21 |
| 010110 | r22 | Compute Register 22 |
| 010111 | r23 | Compute Register 23 |
| 011000 | r24 | Compute Register 24 |
| 011001 | r25 | Compute Register 25 |
| 011010 | r26 | Compute Register 26 |
| 011011 | r27 | Compute Register 27 |
| 011100 | r28 | Compute Register 28 |
| 011101 | r29 | Compute Register 29 |
| 011110 | r30 | Compute Register 30 |
| 011111 | r31 | Compute Register 31 |
| 100000 | a0 | Address Register 0 |
| 100001 | a1 | Address Register 1 |
| 100010 | a2 | Address Register 2 |
| 100011 | a3 | Address Register 3 |
| 100100 | a4 | Address Register 4 |
| 100101 | a5 | Address Register 5 |
| 100110 | a6 | Address Register 6 |
| 100111 | a7 | Address Register 7 |
| 101000 | — | Reserved |
| 101001 | — | Reserved |
| 101010 | — | Reserved |
| 101011 | — | Reserved |
| 101100 | — | Reserved |
| 101101 | ULR | User Link Register |
| 101110 | DBGILR | Debug Interrupt Link Register |
| 101111 | GPILR | General-Purpose Interrupt Link Register |
| 110000 | DBGISR | Debug Interrupt Status Register |
| 110001 | GPISR | General-Purpose Interrupt Status Register |

PE Register Address Map

| Register Number | Abbreviation | Register Name |
|---|---|---|
| 000000 | r0 | Compute Register 0 |
| 000001 | r1 | Compute Register 1 |
| 000010 | r2 | Compute Register 2 |
| 000011 | r3 | Compute Register 3 |
| 000100 | r4 | Compute Register 4 |
| 000101 | r5 | Compute Register 5 |
| 000110 | r6 | Compute Register 6 |
| 000111 | r7 | Compute Register 7 |
| 001000 | r8 | Compute Register 8 |
| 001001 | r9 | Compute Register 9 |
| 001010 | r10 | Compute Register 10 |
| 001011 | r11 | Compute Register 11 |
| 001100 | r12 | Compute Register 12 |
| 001101 | r13 | Compute Register 13 |
| 001110 | r14 | Compute Register 14 |
| 001111 | r15 | Compute Register 15 |
| 010000 | r16 | Compute Register 16 |
| 010001 | r17 | Compute Register 17 |
| 010010 | r18 | Compute Register 18 |
| 010011 | r19 | Compute Register 19 |
| 010100 | r20 | Compute Register 20 |
| 010101 | r21 | Compute Register 21 |
| 010110 | r22 | Compute Register 22 |
| 010111 | r23 | Compute Register 23 |
| 011000 | r24 | Compute Register 24 |
| 011001 | r25 | Compute Register 25 |
| 011010 | r26 | Compute Register 26 |
| 011011 | r27 | Compute Register 27 |
| 011100 | r28 | Compute Register 28 |
| 011101 | r29 | Compute Register 29 |
| 011110 | r30 | Compute Register 30 |
| 011111 | r31 | Compute Register 31 |
| 100000 | a0 | Address Register 0 |
| 100001 | a1 | Address Register 1 |
| 100010 | a2 | Address Register 2 |
| 100011 | a3 | Address Register 3 |
| 100100 | a4 | Address Register 4 |
| 100101 | a5 | Address Register 5 |
| 100110 | a6 | Address Register 6 |
| 100111 | a7 | Address Register 7 |
| 101000 | — | Reserved |
| 101001 | — | Reserved |
| 101010 | — | Reserved |
| 101011 | — | Reserved |
| 101100 | — | Reserved |
| 101101 | — | Reserved |
| 101110 | — | Reserved |
| 101111 | — | Reserved |

| | | |
|---|---|---|
| 110010 | IRR | Interrupt Request Register |
| 110011 | IER | Interrupt Enable Register |
| 110100 | VAR | VIM Address Registers (V0 and V1) |
| 110101 | VPORT | VIM Read Port Register |
| 110110 | SCR0 | Status and Control Register 0 |
| 110111 | SCR1 | Status and Control Register 1 |
| 111000 | DSQR | Divide/Square-Root Register |
| 111001 | — | Reserved |
| 111010 | XPR | Extended Precision Register |
| 111011 | — | Reserved |
| 111100 | MRFXAR | MRF Extension Address Register |
| 111101 | MRFXDR1 | MRF Extension Data Register1 |
| 111110 | — | Reserved |
| 111111 | — | Reserved |

| | | |
|---|---|---|
| 110000 | — | Reserved |
| 110001 | — | Reserved |
| 110010 | — | Reserved |
| 110011 | — | Reserved |
| 110100 | VAR | VIM Address Registers (V0 and V1) |
| 110101 | VPORT | VIM Read Port Register |
| 110110 | SCR0 | Status and Control Register 0 |
| 110111 | SCR1 | Status and Control Register 1 |
| 111000 | DSQR | Divide/Square-Root Register |
| 111001 | — | Reserved |
| 111010 | XPR | Extended Precision Register |
| 111011 | — | Reserved |
| 111100 | — | Reserved |
| 111101 | MRFXDR1 | MRF Extension Data Register1 |
| 111110 | — | Reserved |
| 111111 | — | Reserved |

2 SP Primary Register File

The SP Primary Register Space provides address space for 32 32-bit compute registers, 8 32-bit address registers , and 24 32-bit miscellaneous registers.

2.1 SP Compute Registers

Register Address Map

SP compute registers r0 through r31 serve as the data source(s) or destination(s) for all ALU, MAU, and DSU instructions, and are also accessible via the LU and the SU. As illustrated in Figure 2-1, compute registers, can be addressed as 32 32-bit registers, or 16 64-bit registers. 64-bit registers always use an even/odd register pair, addressed using the even register.

Figure 2-1. SP Compute Registers 32-bit Registers

| | |
|---|---|
| r1 | r0 |
| r3 | r2 |
| r5 | r4 |
| • | • |
| • | • |
| • | • |
| r27 | r26 |
| r29 | r28 |
| r31 | r30 |

64-bit Registers

| |
|---|
| r1, r0 |
| r3, r2 |
| r5, r4 |
| • |
| • |
| • |
| r27, r26 |
| r29, r28 |
| r31, r30 |

Compute registers in the SP are organized as a multi-ported register file, allowing simultaneous read, and write, access by the LU, SU, ALU, MAU, and DSU. If the same compute register is used as both an input data source in one operation and as the result data destination in another operation, the read is performed in the first half of the cycle and the write is performed in the second half. Thus, the old register contents are used as the input data before the register is loaded with the new result data.

If two, or more, write operations to the same compute register occur in the same cycle, only the write operation having the higher priority is actually performed. Write priority (from highest to lowest) is determined based on the execution unit performing the operation as follows:

- LU
- ALU
- MAU
- DSU

2.2 SP Address Registers

Register Address Map

SP address registers a0 through a7 contain base and index addresses used by the LU and the SU to address locations in memory. These registers may be targets of the Load Unit and sources for the Store unit for halfword and word accesses. These registers may also be accessed by DSU instructions.

Figure 2-2. SP Address Registers 32-bit Registers

| | |
|---|---|
| a1 | a0 |
| a3 | a2 |
| a5 | a4 |
| a7 | a6 |

Address registers in the SP, are organized as a multi-ported register file, allowing simultaneous read and write access by the LU, the SU (addressing purposes only), and the DSU. If a same address register is used as both a data source in one operation and as a data target in another operation, the read is performed in the first half of the cycle and the write is performed in the second half. Thus, the old register contents are used as the source data before the register is loaded with the new result data.

If two, or more, write operations to the same address register occur in the same cycle, only the write operation having the higher priority is actually performed. Write priority (from highest to lowest) is determined based on the execution unit performing the operation as follows:

- LU
- SU
- DSU

2.3 SP Miscellaneous Registers

2.3.1 - 2 SP Reserved Registers

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| reserved | | | | | | | | | | | | | | | | | | | | | | | | | | | | | | | |

2.3.3 SP VIM Address Register (VAR)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| VIM Base Address 1 (V1) | | | | | | | | | | | | | | | | VIM Base Address 0 (V0) | | | | | | | | | | | | | | | |

The VIM Address Register (VAR) contains two 16-bit base VLIW Instruction Memory (VIM) addresses (V0) and (V1). V0 and V1 are used by VLIW instructions (LV, SETV, XV) as the base component of the VLIW address. The offset is provided in the LV, SETV or XV instruction itself. Adding the base (V0 or V1) to the offset in the instruction gives the VIM address of the VLIW to be loaded or executed.

VAR is not affected by reset.

2.3.4 User Link Register (ULR)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Return Address | | | | | | | | | | | | | | | | | | | | | | | | | | | | | | 0 | 0 |

The 32-bit User Link Register (ULR) contains the return address after a call operation. When a call instruction is executed, the current Fetch Program Counter (FPC) is copied to the ULR before the FPC is loaded with the branch target address for the call. When nesting multiple calls, software must save the ULR to memory before executing a new call in order to preserve the return address of the previous call. The ULR may be accessed via load/store instructions. Bits 1:0 are reserved and always read zero.

Upon executing the return-from-subroutine-call operation, the FPC is loaded with the current contents of the ULR.

ULR is not affected by reset.

2.3.5 SP Debug Interrupt Link Register (DBGILR)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Return Address | | | | | | | | | | | | | | | | | | | | | | | | | | | | | | 0 | 0 |

The 32-bit SP Debug Interrupt Link Register (DBGILR) contains the return address after a Debug Interrupt (DBGI) is acknowledged by the SP. When the SP acknowledges a DBGI, the address of the instruction to be executed after control is returned to the original program is written to the DBGILR before the branch to the DBGI interrupt vector is executed. When nesting multiple DBGIs, software must save the DBGILR to memory before re-enabling DBGIs in order to preserve the return address of the previous DBGI. Bits 1:0 are reserved and always read zero.

Upon executing the return-from-DBGI operation, the FPC is loaded with the current contents of the DBGILR.

DBGILR is not affected by reset.

2.3.6 SP General-Purpose Interrupt Link Register (GPILR)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|

| Return Address | | |
|---|---|---|
| | 0 | 0 |

The 32-bit SP General-Purpose Interrupt Link Register (GPILR) contains the return address after a General-Purpose Interrupt (GPI) is acknowledged by the SP. When the SP acknowledges a GPI, the address of the instruction to be executed after control is returned to the original program is written to the GPILR before the branch to the GPI interrupt vector is executed. When nesting multiple GPIs, software must save the GPILR to memory before re-enabling GPIs in order to preserve the return address of the previous GPI. Bits 1:0 are reserved and always read zero.

Upon executing the return-from-GPI operation, the FPC is loaded with the current contents of the GPILR.

GPILR is not affected by reset.

2.3.7 SP Debug Interrupt Status Register (DBGISR)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Copy of SCR0 contents | | | | | | | | | | | | | | | | | | | | | | | | | | | | | | | |

The 32-bit SP Debug Interrupt Status Register (DBGISR) contains the contents of SCR0 register after the SP acknowledges a Debug Interrupt. When the SP acknowledges a Debug Interrupt, the current contents of the SCR0 register are written to the DBGISR before the branch to the Debug Interrupt service routine is executed. When nesting multiple Debug Interrupts, software must save the DBGISR to memory before re-enabling Debug Interrupts in order to preserve the state of the previous Debug Interrupt.

When a return-from-interrupt (RETI) instruction is executed at the end of the Debug Interrupt service routine, the SCR0 register is loaded with the current contents of the DBGISR.

DBGISR is set to 0 by reset.

2.3.8 SP General-Purpose Interrupt Status Register (GPISR)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Copy of SCR0 contents | | | | | | | | | | | | | | | | | | | | | | | | | | | | | | | |

The 32-bit SP General-Purpose Interrupt Status Register (GPISR) contains the contents of SCR0 register after a General-Purpose Interrupt (GPI) is acknowledged by the SP. When the SP acknowledges a GPI, the current contents of the SCR0 register are written to the GPISR before the branch to the GPI service routine is executed. When nesting multiple GPIs, software must save the GPISR to memory before re-enabling GPIs in order to preserve the state of the previous GPI.

When a return-from-interrupt (RETI) instruction is executed at the end of the GPI service routine, the SCR0 register is loaded with the current contents of the GPISR.

GPISR is set to 0 by reset.

2.3.9 SP Interrupt Request Register (IRR)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| R | R | R | R | R | R | R | R | R | R | R | R | R | R | R | R | R | R | R | R | R | R | R | R | R | R | R | R | R | R | R | R |
| GPI31 | GPI30 | GPI29 | GPI28 | GPI27 | GPI26 | GPI25 | GPI24 | GPI23 | GPI22 | GPI21 | GPI20 | GPI19 | GPI18 | GPI17 | GPI16 | GPI15 | GPI14 | GPI13 | GPI12 | GPI11 | GPI10 | GPI9 | GPI8 | GPI7 | GPI6 | GPI5 | GPI4 | NMI | DBI | Res | Res |

Res Reserved

R Interrupt Request Bit
R = 0, interrupt is cleared.
R = 1, interrupt is pending.

The 32-bit SP Interrupt Request Register (IRR) contains the status of general-purpose interrupts (GPI4-GPI31), the non-maskable interrupt (NMI), and the Debug Interrupt. When a GPI, NMI, or Debug Interrupt request is recognized, the corresponding bit in the IRR is set to 1 to indicate that the interrupt is pending.

Bits 2:31 of the IRR are set to 0 by reset. Bits 0:1 are reserved and always read zero.

Software may also request a GPI, NMI, or Debug Interrupt, by setting their corresponding bit in the IRR to 1. Writing a 0 to the IRR has no effect, however.

Note: When a GPI, NMI, or Debug Interrupt request is serviced, the hardware automatically sets their corresponding bit in the IRR to 0. However, if a GPI or NMI is configured as level-triggered, and their input signal is still low when the interrupt request is serviced, their corresponding bit in the IRR is set to 0 for one cycle and then set to 1 again, indicating a new interrupt request is pending.

See also the chapter on Interrupts.

---

2.3.10 SP Interrupt Enable Register (IER)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| E | E | E | E | E | E | E | E | E | E | E | E | E | E | E | E | E | E | E | E | E | E | E | E | E | E | E | E | E | E | E | E |
| GPI31 | GPI30 | GPI29 | GPI28 | GPI27 | GPI26 | GPI25 | GPI24 | GPI23 | GPI22 | GPI21 | GPI20 | GPI19 | GPI18 | GPI17 | GPI16 | GPI15 | GPI14 | GPI13 | GPI12 | GPI11 | GPI10 | GPI9 | GPI8 | GPI7 | GPI6 | GPI5 | GPI4 | REs | Res | Res | Res |

Res Reserved

E Interrupt Enable Bit
E = 0, interrupt is disabled.
E = 1, interrupt is enabled.

The 32-bit SP Interrupt Enable Register (IER) is used to enable and disable general-purpose interrupts (GPI4-GPI31). Each GPI interrupt is enabled (unmasked) if its corresponding IER bit is set, and is disabled (masked) if its corresponding IER bit is set to 0.

Bits 4:31 of the IER are set to 0 by reset. Bits 0:3 are reserved and always read zero.

Note: Once a maskable interrupt is recognized, its corresponding Interrupt Request Register (IRR) bit will be set to 1, whether the interrupt is enabled or not.

See also the chapter on Interrupts.

---

2.3.11 SP VIM Read Port Register (VPORT)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Data returned varies, as described below | | | | | | | | | | | | | | | | | | | | | | | | | | | | | | | |

The VIM Read Port Register is used for diagnostic purposes, to read the contents of the last VIM accessed via an XV instruction. To read the entire line of a specific VIM, issue six reads from the VPORT register to a target register or memory location.

Example

```
xv.p v0, 0, e=, f=
```

To read the port, issue the XV instruction with no slots to execute.

```
copy.pd.w R0, VPORT
```

The first read of VPORT returns the following:
R0.B0[bit-4] is the enable/disable for the SU (1=enabled, 0=disabled)
R0.B0[bit-3] is the enable/disable for the LU.
R0.B0[bit-2] is the enable/disable for the ALU.
R0.B0[bit-1] is the enable/disable for the MAU.
R0.B0[bit-0] is the enable/disable for the DSU.
R0.B1[bits-1:0] is the UAF as defined in the XV instruction encoding.

| | |
|---|---|
| `copy.pd.w R1, VPORT` | The second read of VPORT returns the instruction in the SU slot. |
| `copy.pd.w R2, VPORT` | The third read of VPORT returns the instruction in the LU slot. |
| `copy.pd.w R3, VPORT` | The fourth read of VPORT returns the instruction in the ALU slot. |
| `copy.pd.w R4, VPORT` | The fifth read of VPORT returns the instruction in the MAU slot. |
| `copy.pd.w R5, VPORT` | The sixth read of VPORT returns the instruction in the DSU slot. |

2.3.12 SP Status and Control Register 0 (SCR0)

Register Address Map

| 31 | 30 | 29 | 28 27 | 26 | 25 | 24 23 22 21 20 | 19 | 18 | 17 | 16 | 15 14 13 12 11 10 9 8 | 7 | 6 | 5 | 4 | 3 | 2 | 1 | 0 |
|---|---|---|---|---|---|---|---|---|---|---|---|---|---|---|---|---|---|---|---|
| GPIE | NMIE | DBIE | LVL | R | SymSat | Reserved | C | N | V | Z | Reserved | F7 | F6 | F5 | F4 | F3 | F2 | F1 | F0 |

LVL Level: indicates the interrupt level or processor mode
00 = User
01 = GPI
10 = NMI
11 = Debug
See also *Interrupt Modes, Types and Priorities* in the chapter on Interrupts.

DBIE Debug Interrupt Enable. Setting this bit enables the Debug interrupt. This bit is cleared by hardware when a debug interrupt taken.
1 = Debug Interrupt enabled
0 = Debug Interrupt disabled

NMI NMIE – Non-maskable Interrupt Enable. This bit may be set by software but may not be cleared by software. It is cleared at RESET and after an NMI has be acknowledged by the ICU.
0 = NMI disabled
1 = NMI enabled

GPIE General Purpose Interrupt Enable. This bit must be set in order for any of the GPI bits of the IRR to cause an interrupt. This is a global enable for all GPI class interrupts. (It does not affect SYSCALL). This bit is cleared by hardware when any GPI, NMI or Debug Interrupt is acknowledged. It may be explicitly set in software to reenable GPIs.
0 = GPIs are disabled
1 = GPIs are enabled
See also *Asynchronous Interrupt Sources* in the chapter on Interrupts.

SymSat Saturation
0 = Asymmetric Saturation
(read-only bit)

C, V, N, Z Arithmetic Scalar Flag Bits
These bits represent the Carry, Negative, oVerflow, and Zero (CNVZ) status generated by an operation. For simplex instructions, these bits represent the CNVZ status generated by the least-significant operation. For VLIWs, these bits represent the CNVZ status generated by the least-significant operation executed in the unit selected for condition generation. Program flow control instructions also use these bits to control program flow.
These bits are always set to 0 by reset.

F7-F0 Arithmetic Condition Flags
These bits are always set to 0 by reset.

See Scalable Conditional Execution for details on the Arithmetic Scalar Flags and Arithmetic Condition Flags.

2.3.13 SP Status and Control Register 1 (SCR1)

Register Address Map

| 31 30 29 28 27 | 26 25 | 24 | 23 22 21 20 | 19 | 18 | 17 | 16 | 15 14 13 12 11 10 9 8 7 6 5 4 | 3 | 2 | 1 | 0 |
|---|---|---|---|---|---|---|---|---|---|---|---|---|
| IVEC | Reserved | DVSQ Busy | Reserved | DC0 | DN0 | DV0 | DZ0 | Reserved (PM15-PM4) | PM3 | PM2 | PM1 | PM0 |

IVEC – Interrupt Vector Field

This field contains the vector number of the last interrupt request that was accepted.

DVSQ Busy – Divide/Square-Root Unit Busy flag

If DVSQ-Busy = 0, the Divide/Square-Root Unit is available
If DVSQ-Busy = 1, the Divide/Square-Root Unit is busy DVSQ-Busy is a read-only bit.

DC0, DN0, DV0, DZ0 – Divide/Square-Root Unit Arithmetic Scalar Flags

The Divide/Square-Root Unit Arithmetic Scalar flags are set when an operation in this unit completes execution. These bits represent the Carry, Negative, oVerflow, and Zero (CNVZ) status generated by a previous divide or square-root operation. DC0, DN0, DV0 and DZ0 bits are copied to the C, V, N, and Z bits in the SCR0 register when a new divide or square-root operation is executed.

These bits are always set to 0 by reset.

**PM*n* – PE Mask Bits**

If PM*n* = 0, PE*n* is unmasked.
If PM*n* = 1, PE*n* is masked.

These bits are always set to 0 by reset.

Note: The PE Mask bits are evaluated during the decode stage of an instruction to determine the masking status of the PE.

See also PE Masking documentation.

---

2.3.14 SP Divide Square-Root Result Register (DSQR)

Register Address Map

| 31 30 29 28 27 26 25 24 23 22 21 20 19 18 17 16 15 14 13 12 11 10 9 8 7 6 5 4 3 2 1 0 |
|---|
| Divide Square-Root Result |

The 32-bit SP Divide Square-Root Result Register (DSQR) receives the result from the Divide Square-Root Unit when it completes an operation.

DSQR is not affected by reset.

---

2.3.15 SP Reserved Registers

Register Address Map

| 31 30 29 28 27 26 25 24 23 22 21 20 19 18 17 16 15 14 13 12 11 10 9 8 7 6 5 4 3 2 1 0 |
|---|
| reserved |

---

2.3.16 SP Extended-Precision Register (XPR)

Register Address Map

| 31 30 29 28 27 26 25 24 23 22 21 20 19 18 17 16 | 15 14 13 12 11 10 9 8 7 6 5 4 3 2 1 0 |
|---|---|
| XPR.H1 | XPR.H0 |

| XPR.B3 | XPR.B2 | XPR.B1 | XPR.B0 |
|---|---|---|---|

The 32-bit SP Extended-Precision Register (XPR) is used to retain precision integer data for extended-precision accumulation operations (i.e. MPYXA). The XPR register contains two sets of extension fields:

1. XPR.B0, XPR.B1, XPR.B2, and XPR.B3
2. XPR.H0, and XPR.H1

For 40-bit accumulation, two sets of two 8-bit subregisters (XPR.B0 and XPR.B1) or (XPR.B2 and XPR.B3) are used to hold the upper-most byte of the accumulated result.

For 80-bit accumulation, two 16-bit subregisters (XPR.H0 and XPR.H1) are used to hold the upper-most byte of the accumulated result.

XPR must be explicitly initialized prior to a MPYXA, XSCAN, or XSHR instruction. Further, the XPR must not be read by the SU or DSU on the cycle immediately following any of these (or any other two-cycle MAU) instructions.

XPR write conflicts are resolved cycle-by-cycle, on a half-word basis, with the following priorities:

1. Highest - MRF write port (LOAD > COPY) instruction.
2. next - MPYXA
3. Lowest - XSHR XPR is not affected by reset.

---

2.3.17 SP Reserved Registers

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| reserved | | | | | | | | | | | | | | | | | | | | | | | | | | | | | | | |

---

2.3.18 SP MRF Extension Address Register (MRFXAR)

Register Address Map

Reset value: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Reserved | | | | | | | | | | | | | | | | AI | Reserved | | | | | | | | | | | | MRFX Addr1 | | |

MRFX Addr MRF Extension Address Register. This field contains the address of a register within the MRF Extension register group. When MRFXDR1 is read or written, the MRFX register specified by this address is the target of the read or write operation.

AI Auto Increment. When set, this bit causes the MRFXAddr1 field to increment by 1 after each read or write access to the MRFXDR1.

Exception: For conditionally executed DSU load and store operations that can use MRFs as targets, the auto increment occurs whether the instruction executes or not.

---

2.3.19 SP MRF Extension Data Register (MRFXDR1)

Register Address Map

Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| MRFX Data | | | | | | | | | | | | | | | | | | | | | | | | | | | | | | | |

MRFX Data A Load/Store or DSU operation (COPY, BIT op), which targets MRFXDR1, will access the MRFX register at the address contained in bits [2:0] of the MRFXAR. If the AutoInc bit of the MRFXAR is set, then the access will also cause the address in the MRFXAR to be incremented by 1 after the access.

(2.3.20 SP Reserved Register)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| reserved | | | | | | | | | | | | | | | | | | | | | | | | | | | | | | | |

2.4 SP Miscellaneous Registers Extension 1

Overview MRF Extension 1:

| MRFX1 address | SP(Mnemonic) | PE(Mnemonic) | Register Name |
|---|---|---|---|
| 000 | (reserved) | ALUIFR0 | ALU Interrupt Forwarding Register 0 |
| 001 | (reserved) | ALUIFR1 | ALU Interrupt Forwarding Register 1 |
| 010 | (reserved) | MAUIFR0 | MAU Interrupt Forwarding Register 0 |
| 011 | (reserved) | MAUIFR1 | MAU Interrupt Forwarding Register 1 |
| 100 | (reserved) | IFRADR | Interrupt Forwarding Register Address Register |
| 101 | SSR0 | SSR0 | Saved Status Register 0 |
| 110 | SSR1 | SSR1 | Saved Status Register 1 |
| 111 | SSR2 | SSR2 | Saved Status Register 2 |

2.4.1 SP Saved Status Register 0 (SSR0)

Register Address Map

Reset value: Undefined

| 31 | 30 | 29 | 28 | 27 26 25 24 | 23 22 21 20 19 18 17 16 | 15 | 14 | 13 | 12 | 11 10 09 08 | 07 06 05 04 03 02 01 00 |
|---|---|---|---|---|---|---|---|---|---|---|---|
| User Mode Exec Phase | | | | | | User Mode Decode Phase | | | | | |
| UESF3 | UESF2 | UESF1 | UESF0 | User Exec ASFs | User Exec ACFs | UDSF3 | UDSF2 | UDSF1 | UDSF0 | User Decode ASFs | User Decode ACFs |

SSR0 contains flag state information saved during interrupt processing.

Decode ACFs ACF flags restored when first instruction after RETI reaches decode
Decode ASFs ASF flags restored when first instruction after RETI reaches decode
UDSF0 User mode, decode phase, state flag 0. Required for proper flag update.
UDSF1 User mode, decode phase, state flag 1. Required for proper flag update.
UDSF2 User mode, decode phase, state flag 2. Required for proper flag update.
UDSF3 User mode, decode phase, state flag 3. Required for proper flag update.
Exec ACFs ACF flags restored when first instruction after RETI reaches decode
Exec ASFs ASF flags restored when first instruction after RETI reaches decode
UESF0 User mode, exec phase, state flag 0. Required for proper flag update.
UESF1 User mode, exec phase, state flag 1. Required for proper flag update.
UESF2 User mode, exec phase, state flag 2. Required for proper flag update.
UESF3 User mode, exec phase, state flag 3. Required for proper flag update.

2.4.2 SP Saved Status Register 1 (SSR1)

Register Address Map

Reset value: Undefined

| 31 | 30 | 29 | 28 | 27 26 25 24 | 23 22 21 20 19 18 17 16 | 15 | 14 | 13 | 12 | 11 10 09 08 | 07 06 05 04 03 02 01 00 |
|---|---|---|---|---|---|---|---|---|---|---|---|
| System Mode CR Phase | | | | | | User Mode CR Phase | | | | | |
| SCSSF3 | SCSSF2 | SCSSF1 | SCSSF0 | System CR ASFs | System CR ACFs | UCSSF3 | UCSSF2 | UCSSF1 | UCSSF0 | User CR ASFs | User CR ACFs |

SSR1 contains flag state information saved during interrupt processing.

| | |
|---|---|
| **User CR ACFs** | ACF flags restored when first instruction after RETI reaches CR |
| **User CR ASFs** | ASF flags restored when first instruction after RETI reaches CR |
| **UCSF0** | User mode, CR phase, state flag 0. Required for proper flag update. |
| **UCSF1** | User mode, CR phase, state flag 1. Required for proper flag update. |
| **UCSF2** | User mode, CR phase, state flag 2. Required for proper flag update. |
| **UCSF3** | User mode, CR phase, state flag 3. Required for proper flag update. |
| **System CR ACFs** | ACF flags restored when first instruction after RETI reaches decode |
| **System CR ASFs** | ASF flags restored when first instruction after RETI reaches decode |
| **SCSF0** | System mode, CR phase, state flag 0. Required for proper flag update. |
| **SCSF1** | Syste mode, CR phase, state flag 1. Required for proper flag update. |
| **SCSF2** | Syste mode, CR phase, state flag 2. Required for proper flag update. |
| **SCSF3** | Syste mode, CR phase, state flag 3. Required for proper flag update. |

2.4.3 SP Saved Status Register 2 (SSR2)

Register Address Map

Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| System Mode Exec Phase | | | | | | | | | | | | | | | | System Mode Decode Phase | | | | | | | | | | | | | | | |
| SXSF3 | SXSF2 | SXSF1 | SXSF0 | System Exec ASFs | | | | System Exec ACFs | | | | | | | | SDSF3 | SDSF2 | SDSF1 | SDSF0 | System Decode ASFs | | | | System Decode ACFs | | | | | | | |

SSR2 contains flag state information saved during interrupt processing.

| | |
|---|---|
| **System Decode ACFs** | ACF flags restored when first instruction after RETI reaches decode |
| **System Decode ASFs** | ASF flags restored when first instruction after RETI reaches decode |
| **SDSF0** | System mode, decode phase, state flag 0 |
| **SDSF1** | System mode, decode phase, state flag 1. |
| **SDSF2** | System mode, decode phase, state flag 2. |
| **SDSF3** | System mode, decode phase, state flag 3. |
| **System Exec ACFs** | ACF flags restored when first instruction after RETI reaches decode |
| **System Exec ASFs** | ASF flags restored when first instruction after RETI reaches decode |
| **SESF0** | System mode, exec phase, state flag 0. |
| **SESF1** | System mode, exec phase, state flag 1. |
| **SESF2** | System mode, exec phase, state flag 2. |
| **SESF3** | System mode, exec phase, state flag 3. |

3 PE Primary Register File

Register Address Map

The PE Primary Register Space provides address space for 32 32-bit compute registers, 8 32-bit address registers , and 24 32-bit miscellaneous registers.

---

3.1 PE Compute Registers

Register Address Map

The PE0 compute registers r0 through r31 operate the same as the SP computer registers. For more information, see 2.1 SP Compute Registers.

---

3.2 PE Address Registers

Register Address Map

The PE address registers a0 through a7 operate the same as the SP address registers. For more information, see 2.2 SP Address Registers.

---

3.3 PE Miscellaneous Registers

(3.3.1 - 2 PE Reserved Registers)

Register Address Map

| 31–0 |
|---|
| reserved |

3.3.3 PE VIM Address Register (VAR)

Register Address Map

The PE VIM address registers, VAR, operate the same as the SP VIM address register. For more information, see SP VIM Address Register.

(3.3.4 - 10 PE Reserved Registers)

Register Address Map

| 31–0 |
|---|
| reserved |

3.3.11 PE VIM Read Port Register (VPORT)

Register Address Map

The PE VIM Read Port register operates the same as the SP VIM Read Port register. For more information, see SP VIM Read Port Register.

3.3.12 PE Status and Control Register 0 (SCR0)

Register Address Map

| 31–26 | 25 | 24–20 | 19 | 18 | 17 | 16 | 15–12 | 11–8 | 7 | 6 | 5 | 4 | 3 | 2 | 1 | 0 |
|---|---|---|---|---|---|---|---|---|---|---|---|---|---|---|---|---|
| reserved | SymSat | reserved | C | N | V | Z | reserved | PE ID | F7 | F6 | F5 | F4 | F3 | F2 | F1 | F0 |

The 32-bit PE0 Status and Control Register 0 (SCR0) contains the PE's status and control information.

SymSat Saturation
0 =Asymmetric Saturation
read-only bit

C, V, N, Z Arithmetic Scalar Flag Bits
These bits represent the Carry, Negative, oVerflow, and Zero (CNVZ) status generated by an operation. For simplex instructions, these bits represent the CNVZ status generated by the least-significant operation. For VLIWs, these bits represent the CNVZ status generated by the least-significant operation executed in the unit selected for condition generation.
These bits are always set to 0 by reset.

PE ID PE ID (Read-only bits)
These bits contain the hardwired PE number of the PE. Each PE in the core has a unique ID which is encoded as follows:
0000 = PE0
0001 = PE1
0010 = PE2
0011 = PE3
...
1111 = PE15
(NOTE: A BOPS core consisting of N-PEs uses encodings 0 to N-1).

| | |
|---|---|
| **F7-F0** | Arithmetic Condition Flags<br>These bits are always set to 0 by reset. |

See Scalable Conditional Execution for details on the Arithmetic Scalar Flags and Arithmetic Condition Flags.

3.3.13 PE Status and Control Register 1 (SCR1)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Reserved | | | | | | | DVSQ Busy | Reserved | | | | DC0 | DN0 | DV0 | DZ0 | Reserved | | | | | | | | | | | | | | | |

A PE's SCR1 contains additional status and control information. A PE's SCR1 contains fields which indicate the status and result condition flags of the PE's Divide/Square-root instructions (DVSQ Unit). A PE's SCR1 does not contain bits to control PE masking.

DVSQ Busy – Divide/Square-Root Unit Busy flag

If DVSQ-Busy = 0, the Divide/Square-Root Unit is available
If DVSQ-Busy = 1, the Divide/Square-Root Unit is busy DVSQ-Busy is a read-only bit.

DC0, DN0, DV0, DZ0 – Divide/Square-Root Unit Arithmetic Scalar Flags

The Divide/Square-Root Unit Arithmetic Scalar flags are set when an operation in this unit completes execution. These bits represent the Carry, Negative, oVerflow, and Zero (CNVZ) status generated by a previous divide or square-root operation. DC0, DN0, DV0 and DZ0 bits are copied to the C, V, N, and Z bits in the SCR0 register when a new divide or square-root operation is executed.

These bits are always set to 0 by reset.

3.3.14 PE Divide/Square Root Unit Register (DSQR)

Register Address Map

The PE DSQR address registers operate the same as the SP DSQR address register. For more information, see SP Divide/Square Root Unit Register.

3.3.15 PE Reserved Registers

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| reserved | | | | | | | | | | | | | | | | | | | | | | | | | | | | | | | |

3.3.16 PE Extended Precision Register (XPR)

Register Address Map

The PE XPR address registers operate the same as the SP XPR address register. For more information, see SP Extended Precision Register.

(3.3.17 PE Reserved Register)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| reserved | | | | | | | | | | | | | | | | | | | | | | | | | | | | | | | |

3.3.18 PE-accessible MRF Extension Address Register (MRFXAR)

Register Address Map

The SP MRFXAR is accessible from SP/PE0 only.

3.3.19 PE MRF Extension Data Register (MRFXDR1)

Register Address Map

Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| MRFX Data | | | | | | | | | | | | | | | | | | | | | | | | | | | | | | | |

MRFX Data A Load/Store or DSU operation (COPY, BIT op), which targets MRFXDR1, will access the MRFX register at the address contained in bits [3:0] of the MRFXAR. If the AutoInc bit of the MRFXAR is set, then the access will also cause the address in the MRFXAR to be incremented by 1 after the access.

(3.3.20 PE Reserved Register)

Register Address Map

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| reserved | | | | | | | | | | | | | | | | | | | | | | | | | | | | | | | |

3.4 PE Miscellaneous Registers Extension 1

Overview MRF Extension 1:

| MRFX1 address | SP(Mnemonic) | PE(Mnemonic) | Register Name |
|---|---|---|---|
| 000 | (reserved) | ALUIFR0 | ALU Interrupt Forwarding Register 0 |
| 001 | (reserved) | ALUIFR1 | ALU Interrupt Forwarding Register 1 |
| 010 | (reserved) | MAUIFR0 | MAU Interrupt Forwarding Register 0 |
| 011 | (reserved) | MAUIFR1 | MAU Interrupt Forwarding Register 1 |
| 100 | (reserved) | IFRADR | Interrupt Forwarding Register Address Register |
| 101 | SSR0 | SSR0 | Saved Status Register 0 |
| 110 | SSR1 | SSR1 | Saved Status Register 1 |
| 111 | SSR2 | SSR2 | Saved Status Register 2 |

3.4.1 PE ALU Interrupt Forwarding Register 0 (ALUIFR0)

Register Address Map

Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| ALUIFR Data[31:0] | | | | | | | | | | | | | | | | | | | | | | | | | | | | | | | |

ALUIFR Data[31:0] This register contains data saved when an interrupt is acknowledged and an ALU 2-cycle instruction is executing in the pipeline. This data is saved in order to allow correct restoration of the pipe during RETI processing.

3.4.2 SP ALU Interrupt Forwarding Register 1 (ALUIFR1)

Register Address Map

Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| ALUIFR Data[63:32] | | | | | | | | | | | | | | | | | | | | | | | | | | | | | | | |

ALUIFR Data[64:32] This register contains data saved when an interrupt is acknowledged and an ALU 2-cycle instruction is executing in the pipeline. This data is saved in order to allow correct restoration of the pipe during RETI processing.

3.4.3 PE MAU Interrupt Forwarding Register 0 (MAUIFR0)

Register Address Map

Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| MAUIFR Data[31:0] | | | | | | | | | | | | | | | | | | | | | | | | | | | | | | | |

MAUIFR Data[31:0] This register contains data saved when an interrupt is acknowledged and an MAU 2-cycle instruction is executing in the pipeline. This data is saved in order to allow correct restoration of the pipe during RETI processing.

3.4.4 PE MAU Interrupt Forwarding Register 1 (MAUIFR1)

Register Address Map

Reset value: Undefined

| 31–0 |
|---|
| MAUIFR Data[63:32] |

MAUIFR Data[63:32] This register contains data saved when an interrupt is acknowledged and an MAU 2-cycle instruction is executing in the pipeline. This data is saved in order to allow correct restoration of the pipe during RETI processing.

---

3.4.5 PE Interrupt Forwarding Register Address Register (IFRADR)

Register Address Map

Reset value: Undefined

| 31–28 | 27–24 | 23 | 22 | 21–16 | 15–12 | 11–08 | 07 | 06 | 05–00 |
|---|---|---|---|---|---|---|---|---|---|
| ALU Even WE | ALU Odd WE | SP/PE | R | ALU Addr | MAU Even WE | MAU Odd WE | SP/PE | R | MAU Addr |

This register contains IFR address and control information in order to correctly restore the IFR data registers to the register file during RETI processing.

MAU Addr MAU register Address

R Reserved

SP/PE SP/PE Bit

MAU Odd WE MAU Odd CRF bank Write-Enables

MAU Even WE MAU Even CRF bank Write-Enables

ALU Addr MAU register Address

R Reserved

SP/PE SP/PE Bit

ALU Odd WE ALU Odd CRF bank Write-Enables

ALU Even WE ALU Even CRF bank Write-Enables

---

3.4.6 PE Saved Status Register 0 (SSR0)

Register Address Map

Reset value: Undefined

| 31 | 30 | 29 | 28 | 27–24 | 23–16 | 15 | 14 | 13 | 12 | 11–08 | 07–00 |
|---|---|---|---|---|---|---|---|---|---|---|---|
| User Mode Exec Phase | | | | | | User Mode Decode Phase | | | | | |
| UESF | UESF | UESF | UESF | User Exec ASFs | User Exec ACFs | UDSF | UDSF | UDSF | UDSF | User Decode ASFs | User Decode ACFs |

| 3 | 2 | 1 | 0 | | | 3 | 2 | 1 | 0 | | |
|---|---|---|---|---|---|---|---|---|---|---|---|

SSR0 contains flag state information saved during interrupt processing.

Decode ACFs ACF flags restored when first instruction after RETI reaches decode
Decode ASFs ASF flags restored when first instruction after RETI reaches decode
UDSF0 User mode, decode phase, state flag 0. Required for proper flag update.
UDSF1 User mode, decode phase, state flag 1. Required for proper flag update.
UDSF2 User mode, decode phase, state flag 2. Required for proper flag update.
UDSF3 User mode, decode phase, state flag 3. Required for proper flag update.
Exec ACFs ACF flags restored when first instruction after RETI reaches execute
Exec ASFs ASF flags restored when first instruction after RETI reaches execute
UESF0 User mode, exec phase, state flag 0. Required for proper flag update.
UESF1 User mode, exec phase, state flag 1. Required for proper flag update.
UESF2 User mode, exec phase, state flag 2. Required for proper flag update.
UESF3 User mode, exec phase, state flag 3. Required for proper flag update.

3.4.7 PE Saved Status Register 1 (SSR1)

Register Address Map

Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| System Mode CR Phase | | | | | | | | | | | | | | | | User Mode CR Phase | | | | | | | | | | | | | | | |
| SCSF3 | SCSF2 | SCSF1 | SCSF0 | System CR ASFs | | | | System CR ACFs | | | | | | | | UCSF3 | UCSF2 | UCSF1 | UCSF0 | User CR ASFs | | | | User CR ACFs | | | | | | | |

SSR1 contains flag state information saved during interrupt processing.

User CR ACFs ACF flags restored when first instruction after RETI reaches CR
User CR ASFs ASF flags restored when first instruction after RETI reaches CR
UCSF0 User mode, CR phase, state flag 0. Required for proper flag update.
UCSF1 User mode, CR phase, state flag 1. Required for proper flag update.
UCSF2 User mode, CR phase, state flag 2. Required for proper flag update.
UCSF3 User mode, CR phase, state flag 3. Required for proper flag update.
System CR ACFs ACF flags restored when first instruction after RETI reaches CR
System CR ASFs ASF flags restored when first instruction after RETI reaches CR
SCSF0 System mode, CR phase, state flag 0. Required for proper flag update.
SCSF1 System mode, CR phase, state flag 1. Required for proper flag update.
SCSF2 System mode, CR phase, state flag 2. Required for proper flag update.
SCSF3 System mode, CR phase, state flag 3. Required for proper flag update.

3.4.8 PE Saved Status Register 2 (SSR2)

Register Address Map

Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| System Mode Exec Phase | | | | | | | | | | | | | | | | System Mode Decode Phase | | | | | | | | | | | | | | | |
| SES | SES | SES | SES | System Exec ASFs | | | | System Exec ACFs | | | | | | | | SDS | SDS | SDS | SDS | System Decode ASFs | | | | System Decode ACFs | | | | | | | |

| | | | | | | | | | | | |
|---|---|---|---|---|---|---|---|---|---|---|---|
| F3 | F2 | F1 | F0 | | | F3 | F2 | F1 | F0 | | |

SSR2 contains flag state information saved during Interrupt processing.

| | |
|---|---|
| **System Decode ACFs** | ACF flags restored when first instruction after RETI reaches decode |
| **System Decode ASFs** | ASF flags restored when first instruction after RETI reaches decode |
| **SDSF0** | System mode, decode phase, state flag 0 |
| **SDSF1** | System mode, decode phase, state flag 1. |
| **SDSF2** | System mode, decode phase, state flag 2. |
| **SDSF3** | System mode, decode phase, state flag 3. |
| **System Exec ACFs** | ACF flags restored when first instruction after RETI reaches execute |
| **System Exec ASFs** | ASF flags restored when first instruction after RETI reaches execute |
| **SESF0** | System mode, exec phase, state flag 0. |
| **SESF1** | System mode, exec phase, state flag 1. |
| **SESF2** | System mode, exec phase, state flag 2. |
| **SESF3** | System mode, exec phase, state flag 3. |

4 PE Register Usage Restrictions

Register Address Map

In general, PE register-to-register (or memory-to-register) instructions may only use PE registers (or PE memory) as their source, and PE registers as their destination. Similarly, PE register-to-memory instructions may only use PE registers as their source and PE memory as their destination. Exceptions are DSU instructions involving PE-to-PE register-to-register transfers.

5 SP Register Usage Restrictions

Register Address Map

In general, SP register-to-register (or memory-to-register) instructions may only use SP registers (or SP memory) as SP source, and SP registers as their destination. Similarly, SP register-to-memory instructions may only use SP registers as their source and SP memory as their destination. Exceptions are DSU instructions involving SP-to-PE register-to-register transfers, and LU instructions involving SP-to-PE memory-to-register transfers.

---

6 Register Ports

The diagram below shows the Compute Register File (CRF) ports and Address Register File (ARF) ports for each SP and PE execution unit. SP and PE0 register files share a common set of execution units.

CRF and ARF Register Ports

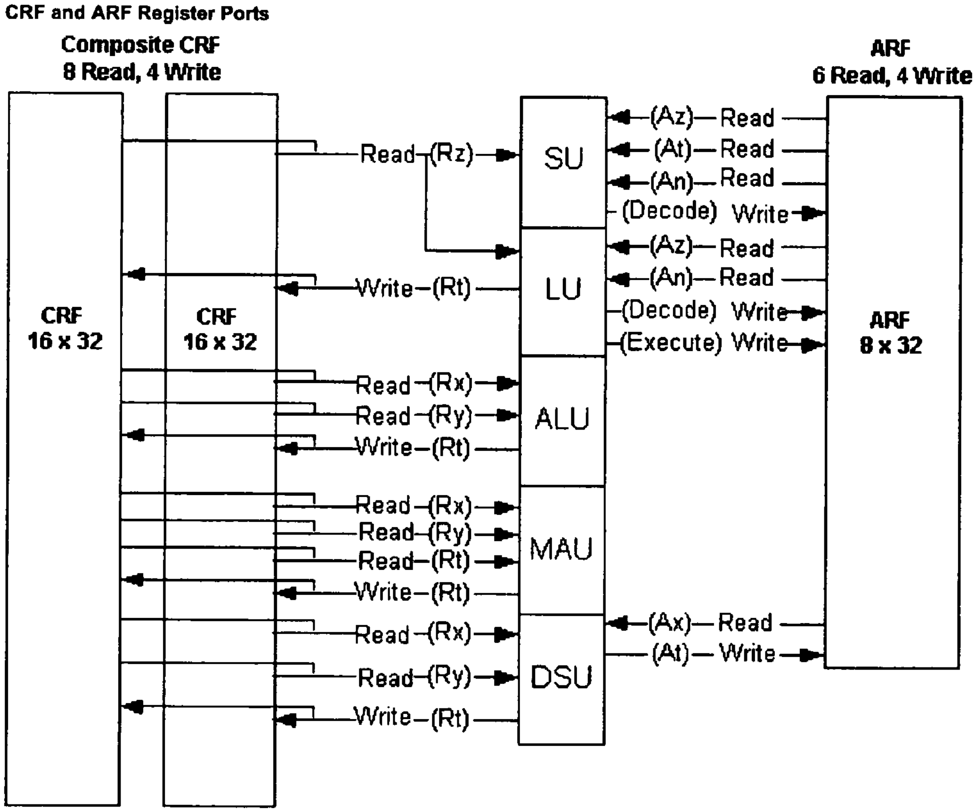

---

6.1 Distributed Resource Conflicts

There are three independent types of resource conflict (and priorities)in Manta:

1. ALU/MAU Write Ports
2. CRF/ARF Write Register #
3. MRF Write Port

The following prioritization rules resolve potential port conflicts.

| Resource | Type | Contenders | Priority Rule | Notes |
|---|---|---|---|---|

| | | | | |
|---|---|---|---|---|
| CRF register port | Write | ALU and MAU instructions within same execution unit | Last-into-Pipe | 1 |
| ARF register single-word<br>CRF register single-word | Write | Instructions in different execution units | SLAMD | 2, 3 |
| ARF register | Read | Instructions within LU | Decode over Execute | 4 |
| MRF register write port | Write | Instructions in different execution units | SLAMD | 5 |
| MRF register read port | Read | Instructions in different execution units | SLAMD | 6 |

Notes:

1. When multiple ALU or MAU instructions within the same execution unit try to write to the CRF in the same cycle, the instruction that last entered the pipeline has priority and is granted write access, independent of the data type. For example, a two-cycle MAU instruction followed by a single-cycle MAU instruction; the single-cycle MAU instruction wins.
2. Register access priorities in descending order are SU, LU, ALU, MAU, DSU (SLAMD). This rule is evaluated for contending instructions during every cycle, and independently for even CRF, odd CRF, and ARF.
3. Example: If an execution unit attempts a double-word write and another execution unit writes a single word result to the same register address, the priorities will affect only the one single word register with the actual conflict and not the other. The other, undisputed single-word register is updated by the lower-priority unit.
4. This case has the potential for a programming error! Please see the Load/Store Pipeline Restrictions document for more information.
5. Explicit DSU and LU instructions which simultaneously write to the MRF should be avoided, because this may cause unexpected results.
6. Explicit DSU and SU instructions which simultaneously read from the MRF should be avoided, because this may cause unexpected results.

7 Simulator-only Registers

7.1 HOTF Register

The HOTF register is a simulator-only register. During any given cycle, HOTF makes the hot condition information (hot flags) available in the simulator. This means that HOTF contains the condition information generated by an instruction at the end of that instruction's execute phase.

More information on hot condition information in the Scalable Conditional Execution document.

See also the definition of Status and Control Register 0 (SCR0) .

Data Types and Alignment

BOPS, Inc. Manta SYSSIM 2.31

This chapter describes the supported data types and how these data types are aligned in compute and address registers.

Table of Contents:

1 Supported Data Types

1.1 Integer Data Formats

8-Bit Unsigned Integer
8-Bit Signed Integer
16-Bit Unsigned Integer
16-Bit Signed Integer
32-Bit Unsigned Integer
32-Bit Signed Integer
40-Bit Extended Precision Unsigned Integer
40-Bit Extended Precision Signed Integer
64-Bit Unsigned Integer
64-Bit Signed Integer
80-Bit Extended Precision Unsigned Integer
80-Bit Extended Precision Signed Integer 1.2 Floating-Point Data Formats 32-bit IEEE-754 Single Precision Floating-Point

2 Compute Register Data Types

2.1 Unpacked Integer Values in a Compute Register
2.2 Packed Integer Values in a Compute Register
2.3 Floating point values in a Compute Register

3 Address Register Data Types

3.1 Address Values in an Address Register
3.2 Integer Values in an Address Register

1 Supported Data Types

The datatypes discussed in this section apply to all compute registers. (See Register File documentation.) Doubleword, H0, H1 and B) are used in the Load/Store instructions.

1.1 Integer Data Formats

The Manta supports the following integer data formats:

8-Bit Unsigned Integer

Quad Unsigned Bytes

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 8-bits | | | | | | | | 8-bits | | | | | | | | 8-bits | | | | | | | | 8-bits | | | | | | | |
| B3 | | | | | | | | B2 | | | | | | | | B1 | | | | | | | | B0 | | | | | | | |

Octal Unsigned Bytes (Odd)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 8-bits | | | | | | | | 8-bits | | | | | | | | 8-bits | | | | | | | | 8-bits | | | | | | | |
| B3 | | | | | | | | B2 | | | | | | | | B1 | | | | | | | | B0 | | | | | | | |

(Even)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 8-bits | | | | | | | | 8-bits | | | | | | | | 8-bits | | | | | | | | 8-bits | | | | | | | |
| B3 | | | | | | | | B2 | | | | | | | | B1 | | | | | | | | B0 | | | | | | | |

8-Bit Signed Integer

Quad Signed Bytes

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>S</td><td colspan="7">7-bits</td><td>S</td><td colspan="7">7-bits</td><td>S</td><td colspan="7">7-bits</td><td>S</td><td colspan="7">7-bits</td></tr>
<tr><td colspan="8">B3</td><td colspan="8">B2</td><td colspan="8">B1</td><td colspan="8">B0</td></tr>
</table>

Octal Signed Bytes (Odd)

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>S</td><td colspan="7">7-bits</td><td>S</td><td colspan="7">7-bits</td><td>S</td><td colspan="7">7-bits</td><td>S</td><td colspan="7">7-bits</td></tr>
<tr><td colspan="8">B3</td><td colspan="8">B2</td><td colspan="8">B1</td><td colspan="8">B0</td></tr>
</table>

(Even)

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>S</td><td colspan="7">7-bits</td><td>S</td><td colspan="7">7-bits</td><td>S</td><td colspan="7">7-bits</td><td>S</td><td colspan="7">7-bits</td></tr>
<tr><td colspan="8">B3</td><td colspan="8">B2</td><td colspan="8">B1</td><td colspan="8">B0</td></tr>
</table>

16-Bit Unsigned Integer

Dual Unsigned Halfwords

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="16">16-bits</td><td colspan="16">16-bits</td></tr>
<tr><td colspan="16">H1</td><td colspan="16">H0</td></tr>
</table>

Quad Unsigned Halfwords (Odd)

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="16">16-bits</td><td colspan="16">16-bits</td></tr>
<tr><td colspan="16">H1</td><td colspan="16">H0</td></tr>
</table>

(Even)

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="16">16-bits</td><td colspan="16">16-bits</td></tr>
<tr><td colspan="16">H1</td><td colspan="16">H0</td></tr>
</table>

16-Bit Signed Integer

Dual Signed Halfwords

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>S</td><td colspan="15">15-bits</td><td>S</td><td colspan="15">15-bits</td></tr>
<tr><td colspan="16">H1</td><td colspan="16">H0</td></tr>
</table>

Quad Signed Halfwords (Odd)

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>S</td><td colspan="15">15-bits</td><td>S</td><td colspan="15">15-bits</td></tr>
<tr><td colspan="16">H1</td><td colspan="16">H0</td></tr>
</table>

(Even)

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>S</td><td colspan="15">15-bits</td><td>S</td><td colspan="15">15-bits</td></tr>
<tr><td colspan="16">H1</td><td colspan="16">H0</td></tr>
</table>

32-Bit Unsigned Integer

Unsigned Word

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="32">32-bits</td></tr>
</table>

Dual Unsigned Words (Odd)

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="32">32-bits</td></tr>
</table>

(Even)

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="32">32-bits</td></tr>
</table>

32-Bit Signed Integer

Signed Word

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>S</td><td colspan="31">31-bits</td></tr>
</table>

Dual Signed Words (Odd)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| S | 31-bits | | | | | | | | | | | | | | | | | | | | | | | | | | | | | | |

(Even)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| S | 31-bits | | | | | | | | | | | | | | | | | | | | | | | | | | | | | | |

See Extended Precision Accumulation Operations for more information.

40-Bit Extended Precision Unsigned Integer

Dual Extended Unsigned Words

XPR.Bo

| 7 | 6 | 5 | 4 | 3 | 2 | 1 | 0 |
|---|---|---|---|---|---|---|---|
| MSB 8-bits | | | | | | | |

(Odd)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| LSB 32-bits | | | | | | | | | | | | | | | | | | | | | | | | | | | | | | | |

XPR.Be

| 7 | 6 | 5 | 4 | 3 | 2 | 1 | 0 |
|---|---|---|---|---|---|---|---|
| MSB 8-bits | | | | | | | |

(Even)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| LSB 32-bits | | | | | | | | | | | | | | | | | | | | | | | | | | | | | | | |

See Extended Precision Accumulation Operations for more information.

40-Bit Extended Precision Signed Integer

Dual Extended Signed Words

XPR.Bo

| 7 | 6 | 5 | 4 | 3 | 2 | 1 | 0 |
|---|---|---|---|---|---|---|---|
| S | MSB 7-bits | | | | | | |

(Odd)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| LSB 32-bits | | | | | | | | | | | | | | | | | | | | | | | | | | | | | | | |

XPR.Be

| 7 | 6 | 5 | 4 | 3 | 2 | 1 | 0 |
|---|---|---|---|---|---|---|---|
| S | MSB 7-bits | | | | | | |

(Even)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| LSB 32-bits | | | | | | | | | | | | | | | | | | | | | | | | | | | | | | | |

See Extended Precision Accumulation Operations for more information.

64-Bit Unsigned Integer

Unsigned Doubleword (Odd)

| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|
| MSB 32-bits | | | | | | | | | | | | | | | | | | | | | | | | | | | | | | | |

(Even)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| LSB 32-bits | | | | | | | | | | | | | | | | | | | | | | | | | | | | | | | |

64-Bit Signed Integer

Signed Doubleword (Odd)

| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|
| S | MSB 31-bits | | | | | | | | | | | | | | | | | | | | | | | | | | | | | | |

(Even)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| LSB 32-bits | | | | | | | | | | | | | | | | | | | | | | | | | | | | | | | |

80-Bit Extended Precision Unsigned Integer

Extended Unsigned Doubleword

XPR.Hx

| 7 | 6 | 5 | 4 | 3 | 2 | 1 | 0 |
|---|---|---|---|---|---|---|---|
| MSB 8-bits | | | | | | | |

(Odd)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 32-bits | | | | | | | | | | | | | | | | | | | | | | | | | | | | | | | |

(Even)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| LSB 32-bits | | | | | | | | | | | | | | | | | | | | | | | | | | | | | | | |

See Extended Precision Accumulation Operations for more information.

80-Bit Extended Precision Signed Integer

Extended Signed Doubleword

XPR.Hx

| 7 | 6 | 5 | 4 | 3 | 2 | 1 | 0 |
|---|---|---|---|---|---|---|---|
| S | MSB 7-bits | | | | | | |

(Odd)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 32-bits | | | | | | | | | | | | | | | | | | | | | | | | | | | | | | | |

(Even)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| LSB 32-bits | | | | | | | | | | | | | | | | | | | | | | | | | | | | | | | |

See

Extended Precision Accumulation Operations for more information.

---

1.2 Floating-Point Data Formats

ManArray supports the following floating-point data formats:

32-bit IEEE-754 Single Precision Floating-Point

IEEE-754 Single Precision Floating-Point

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| S | Exponent | | | | | | | | Fraction | | | | | | | | | | | | | | | | | | | | | | |
| MSB | | | | | | | | LSB | MSB | | | | | | | | | | | | | | | | | | | | | | LSB |

---

2 Compute Register Data Types

Compute registers in the Manta DSP Core can contain fixed-point unpacked and packed data values, and IEEE Standard 754-1985 basic 32-bit format single precision floating-point data values. Unpacked data values include signed and unsigned byte, halfword, word, and doubleword integer values. Packed data values include signed and unsigned, quad and octal byte, dual and quad halfword, and dual word, integer values.

---

2.1 Unpacked Integer Values in a Compute Register

Unpacked, unsigned-byte integer values occupy the 8 least-significant bits of a compute register. When an unsigned-byte integer value occupies the 8 least-significant bits of a compute register, the remaining bits are left unused.

Unpacked, signed byte integer values occupy the 8 least-significant bits of a compute register. When a signed byte integer value occupies the 8 least-significant bits of a compute register, the remaining bits are filled by extending the sign bit of the value contained in the 8 least significant bits of the register.

Unpacked, unsigned-halfword integer values occupy the 16 least-significant bits, or the 16 most-significant bits, of a compute register. When an unsigned-halfword integer value occupies the 16 least-significant bits of a compute register, the remaining bits are filled with zeros or ones, or are left unused. When an unsigned-halfword integer value occupies the 16 most-significant bits of a compute register, the remaining bits are left unused.

Unpacked, signed halfword integer values occupy the 16 least-significant bits, or the 16 most-significant bits, of a compute register. When a signed halfword integer value occupies the 16 least-significant bits of a compute register, the remaining bits are filled with zeros or ones, or are left unused.

Unpacked, signed or unsigned-word integer values occupy all 32 bits of a compute register.

Unpacked, signed or unsigned-doubleword integer values occupy all 64 bits of an even/odd compute register pair.

2.2 Packed Integer Values in a Compute Register

Quad packed, unsigned or signed byte integer values occupy all 32 bits of a compute register. Octal packed, unsigned or signed byte integer values occupy all 64 bits of an even/odd compute register pair.

Dual packed, unsigned or signed halfword integer values occupy all 32 bits of a compute register. Quad packed, unsigned or signed halfword integer values occupy all 64 bits of an even/odd compute register pair.

Dual packed, unsigned or signed word integer values occupy all 64 bits of an even/odd compute register pair.

2.3 Floating point values in a Compute Register

IEEE Standard 754-1985 basic 32-bit format single precision floating-point data values occupy all 32 bits of a compute register.

3 Address Register Data Types

Address registers in the Manta DSP Core can contain 16-bit modulo and index address values, 32-bit address values, and unpacked and unsigned, halfword and word integer values.

3.1 Address Values in an Address Register

Modulo and index address values occupy the 16 most-significant bits of an address register and the 16 least-significant bits of an address register, respectively. 32-bit address values occupy all 32 bits of an address register.

3.2 Integer Values in an Address Register

Unpacked, unsigned-halfword integer values occupy the 16 least-significant bits, or the 16 most-significant bits, of an address register. When an unsigned-halfword integer value occupies the 16 least-significant bits of an address register, the remaining bits are filled with zeros or ones, or are left unused. When an unsigned-halfword integer value occupies the 16 most-significant bits of an address register, the remaining bits are left unused.

Unpacked, unsigned-word integer values occupy all 32 bits of an address register.

Addressing Modes

The Manta Co-Processor Core supports a full set of operand addressing modes.

Addressing modes specify whether the operand(s) is in a processor register, or in memory, and provide their effective address. There are three classes of addressing modes: direct addressing modes, indirect addressing modes, and special addressing modes. This chapter provides a detailed description of the Core's addressing modes, including block diagrams illustrating their hardware implementation.

---

Table of Contents:

1 Direct Addressing Modes

1.1 Register Direct Mode
1.2 Address Direct Mode
2 Indirect Addressing Modes
2.1 Base+Displacement Mode
2.2 Address Register Indirect with Pre-Decrement Mode
2.3 Address Register Indirect with Pre-Increment Mode
2.4 Address Register Indirect with Post-Decrement Mode
2.5 Address Register Indirect with Post-Increment Mode
2.6 Address Register Indirect with Scaled Pre-Decrement Mode
2.7 Address Register Indirect with Scaled Pre-Increment Mode
2.8 Address Register Indirect with Scaled Post-Decrement Mode
2.9 Address Register Indirect with Scaled Post-Increment Mode
2.10 Address Register Modulo Indexed with Pre-Decrement Mode
2.11 Address Register Modulo Indexed with Post-Increment Mode
2.12 Address Register Modulo Indexed with Scaled Pre-Decrement Mode
2.13 Address Register Modulo Indexed with Scaled Post-Increment Mode
2.14 Address Register Table Look-Up Mode

3 Special Addressing Modes

3.1 PC-Relative Mode
3.2 Immediate Mode

---

1 Direct Addressing Modes

1.1 Register Direct Mode

In the register direct addressing mode, the operand(s) is in a compute or address register.

1.2 Address Direct Mode

In the address direct addressing mode, the operand is in memory and the operand effective address is a 16-bit address contained in the instruction word. The 16-bit address is zero-extended before it is used.

2 Indirect Addressing Modes

2.1 Base+Displacement Mode

In the base+displacement addressing mode, the operand is in memory and the operand effective address is the sum of a 32-bit base address contained in the address register Specified in the instruction and a 13-bit displacement value contained in the instruction word. The 13-bit displacement value is sign-extended to a 32-bit integer value before it is used.

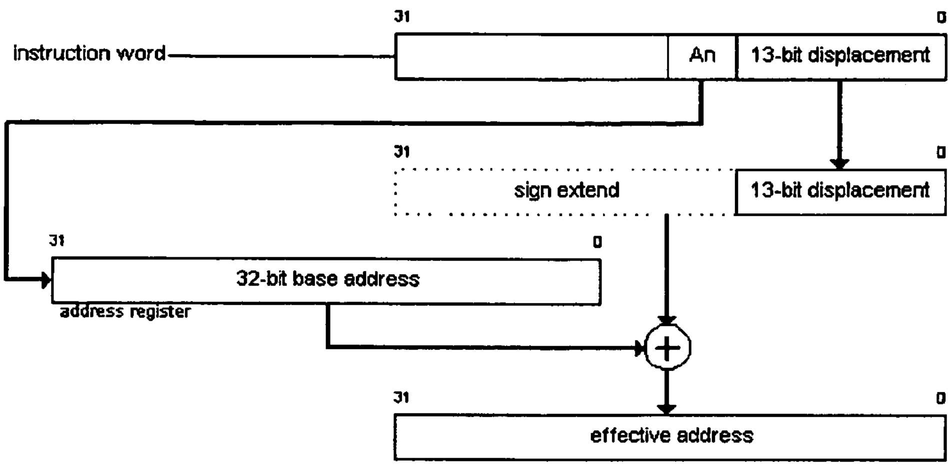

2.2 Address Register Indirect with Pre-Decrement Mode

In the address register indirect with pre-decrement addressing mode, the operand is in memory and the operand effective address is the difference of the contents of the address register Specified in the instruction and an update value. The update value is either a 6-bit unsigned integer value contained in the instruction word, or is a 32-bit unsigned integer value contained in a compute register Specified in the instruction word. The 7-bit update value is zero-extended to a 32-bit integer value before it is used.

After it is formed, the operand effective address is written to the address register Specified in the instruction.

a) 7-bit update

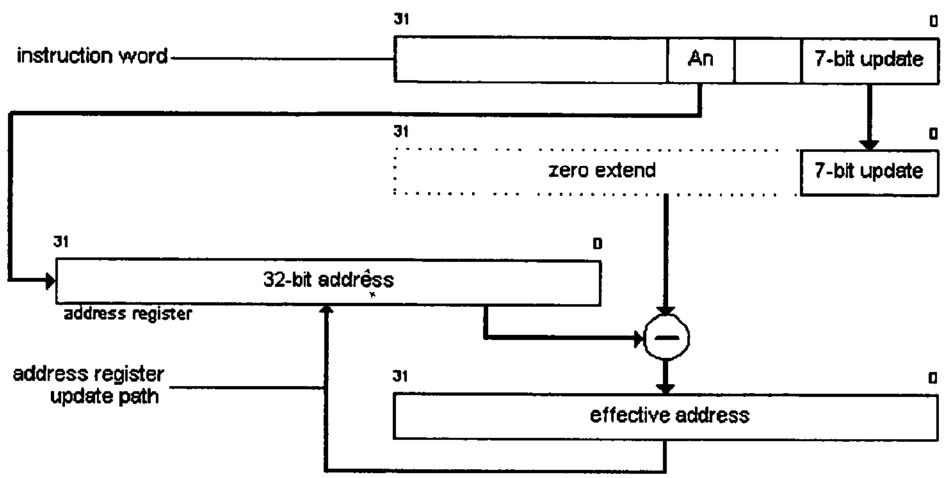

b) 32-bit update

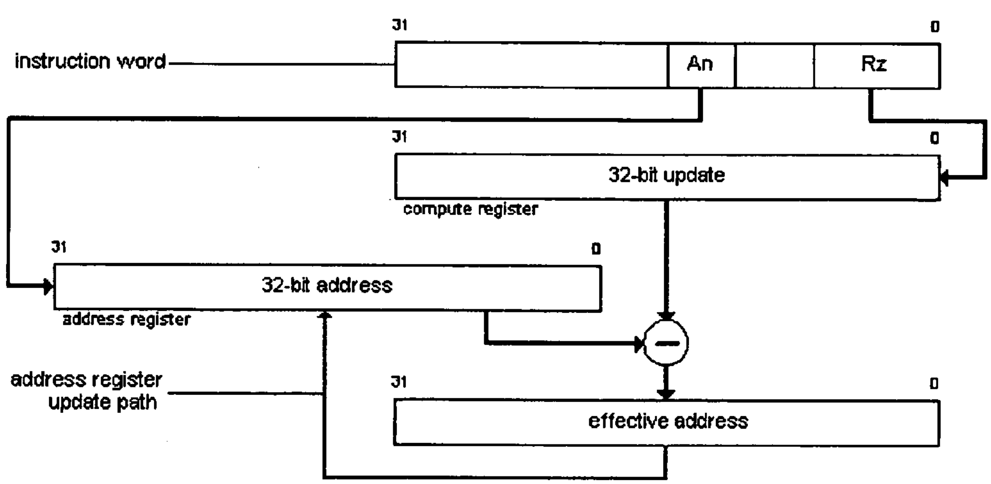

2.3 Address Register Indirect with Pre-Increment Mode

In the address register indirect with pre-increment addressing mode, the operand is in memory and the operand effective address is the sum of the contents of the address register Specified in the instruction and an update value. The update value is either a 6-bit unsigned integer value contained in the instruction word, or is a 32-bit unsigned integer value contained in a compute register Specified in the instruction word. The 7-bit update value is zero-extended to a 32-bit integer value before it is used.

After it is formed, the operand effective address is written to the address register Specified in the instruction.

a) 7-bit update

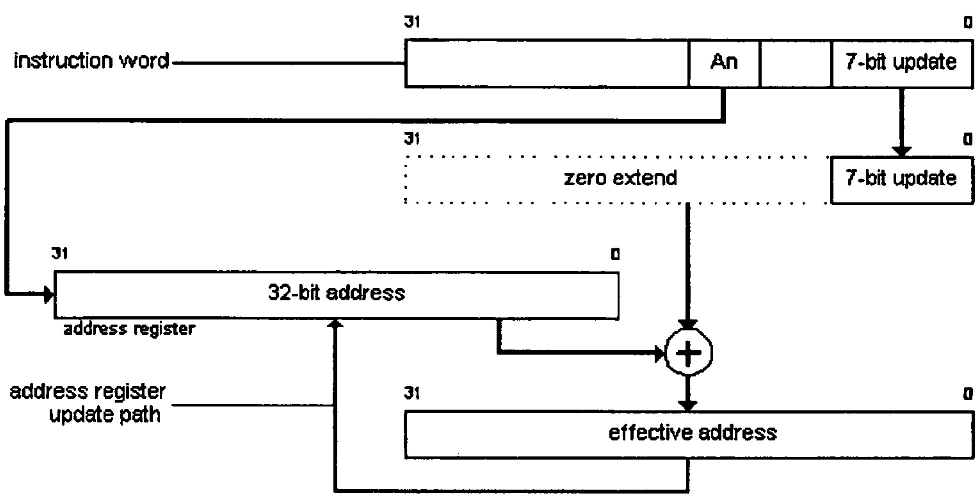

b) 32-bit update

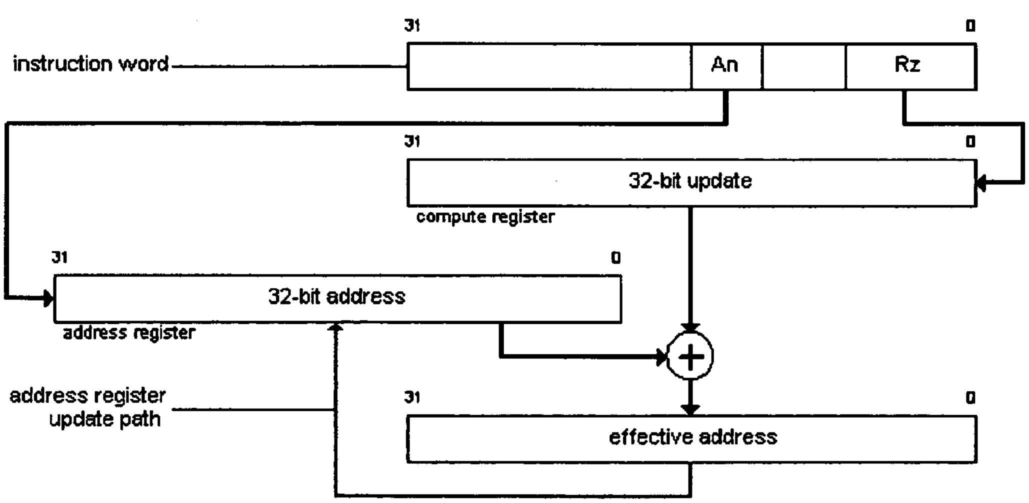

2.4 Address Register Indirect with Post-Decrement Mode

In the address register indirect with post-decrement addressing mode, the operand is in memory and the operand effective address is the contents of the address register Specified in the instruction. After supplying the operand effective address, the same address register is loaded with the difference of the operand effective address and an update value. The update value is either a 7-bit unsigned integer value contained in the instruction word, or is a 32-bit unsigned integer value contained in a compute register Specified in the instruction word. The 7-bit update value is zero-extended to a 32-bit integer value before it is used.

a) 7-bit update

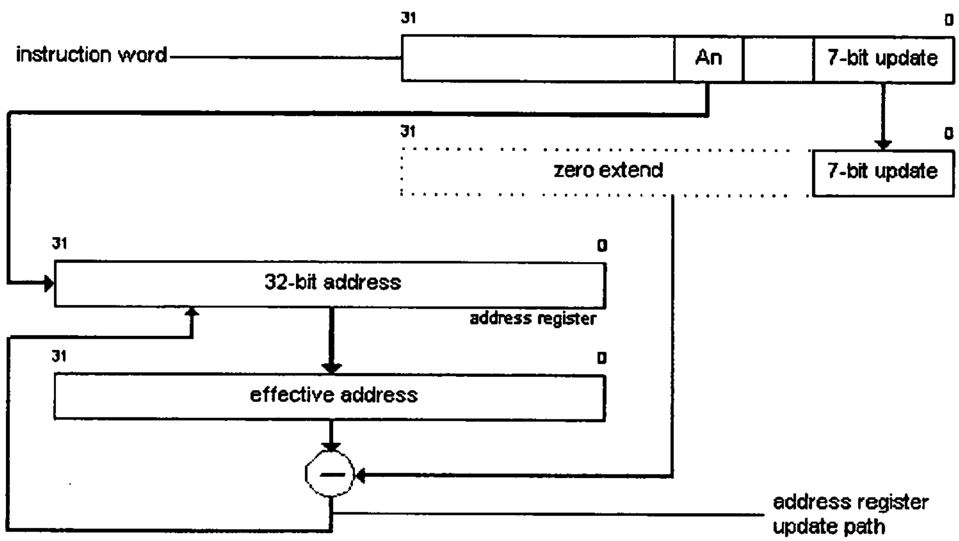

b) 32-bit update

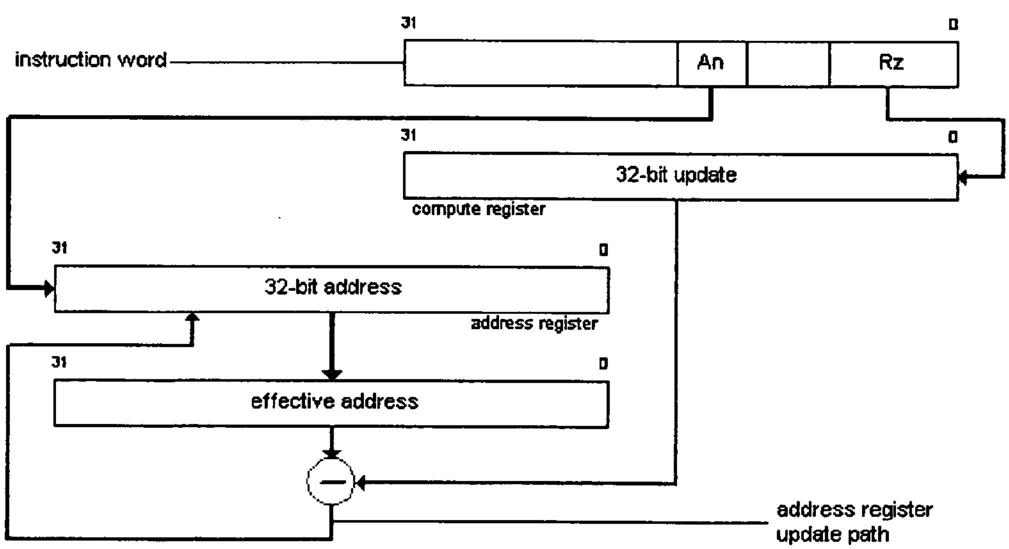

2.5 Address Register Indirect with Post-Increment Mode

In the address register indirect with post-increment addressing mode, the operand is in memory and the operand effective address is the contents of the address register Specified in the instruction. After supplying the operand effective address, the same address register is loaded with the sum of the operand effective address and an update value. The update value is either a 7-bit unsigned integer value contained in the instruction word, or is a 32-bit unsigned integer value contained in a compute register Specified in the instruction word. The 7-bit update value is zero-extended to a 32-bit integer value before it is used.

a) 7-bit update

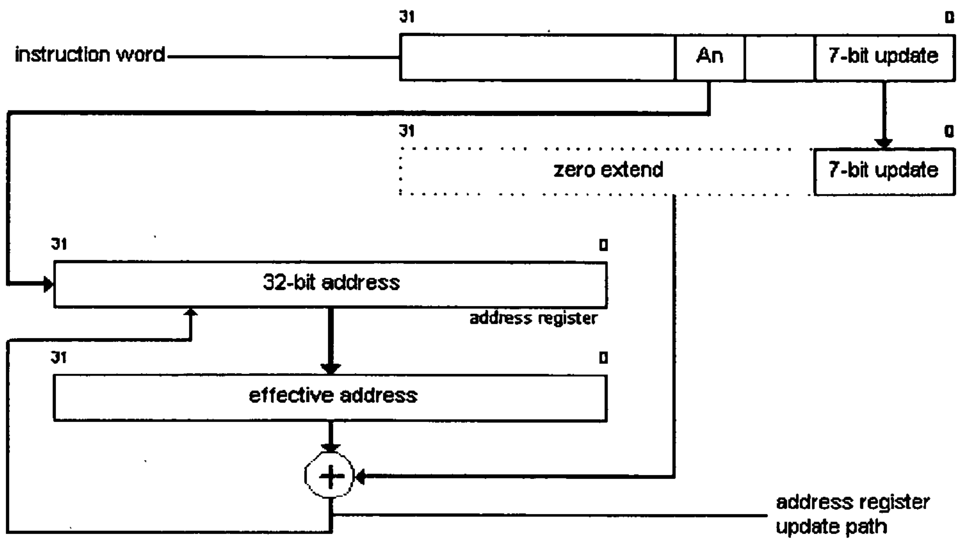

b) 32-bit update

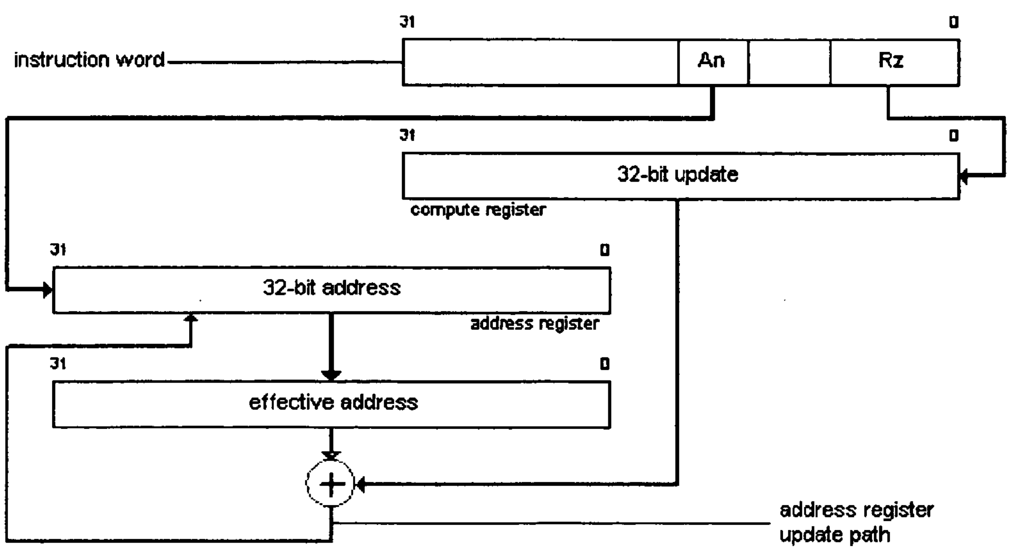

2.6 Address Register Indirect with Scaled Pre-Decrement Mode

In the address register indirect with pre-decrement addressing mode, the operand is in memory and the operand effective address is the difference of the contents of the address register Specified in the instruction and an update value. The update value is either a 6-bit unsigned integer value contained in the instruction word, or is a 32-bit unsigned integer value contained in a compute register Specified in the instruction word. The update value is scaled by the size of the operand (i.e. multiplied, by 2 for a halfword, by 4 for a word, or by 8 for a doubleword). The 7-bit update value is zero-extended to a 32-bit integer value before it is used.

After it is formed, the operand effective address is written to the address register Specified in the instruction.

a) 7-bit update

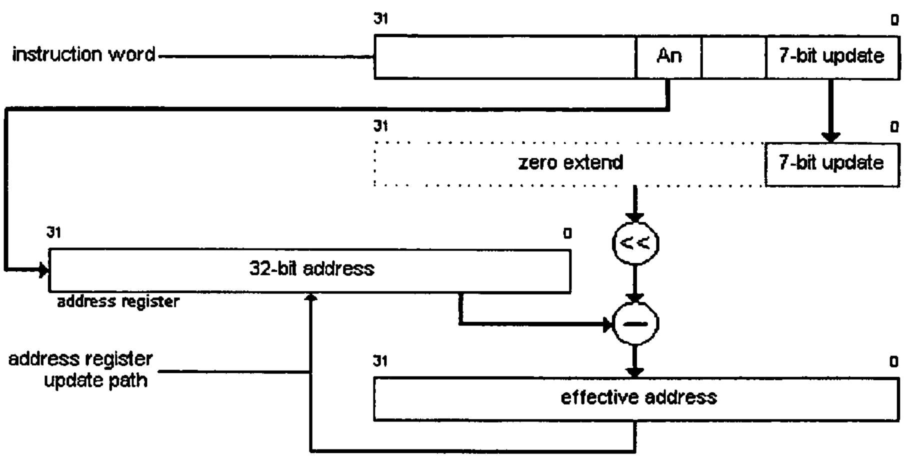

b) 32-bit update

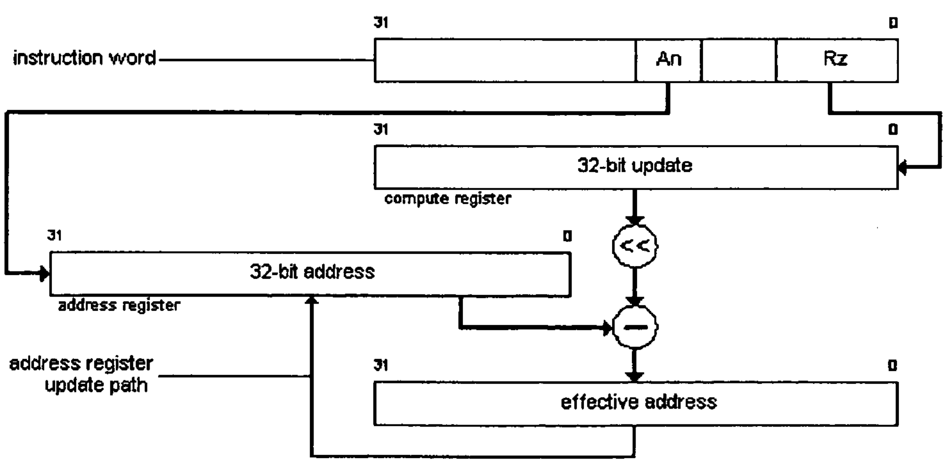

2.7 Address Register Indirect with Scaled Pre-Increment Mode

In the address register indirect with pre-increment addressing mode, the operand is in memory and the operand effective address is the sum of the contents of the address register Specified in the instruction and an update value. The update value is either a 6-bit unsigned integer value contained in the instruction word, or is a 32-bit unsigned integer value contained in a compute register Specified in the instruction word. The update value is scaled by the size of the operand (i.e. multiplied, by 2 for a halfword, by 4 for a word, or by 8 for a doubleword). The 7-bit update value is zero-extended to a 32-bit integer value before it is used.

After it is formed, the operand effective address is written to the address register Specified in the instruction.

a) 7-bit update

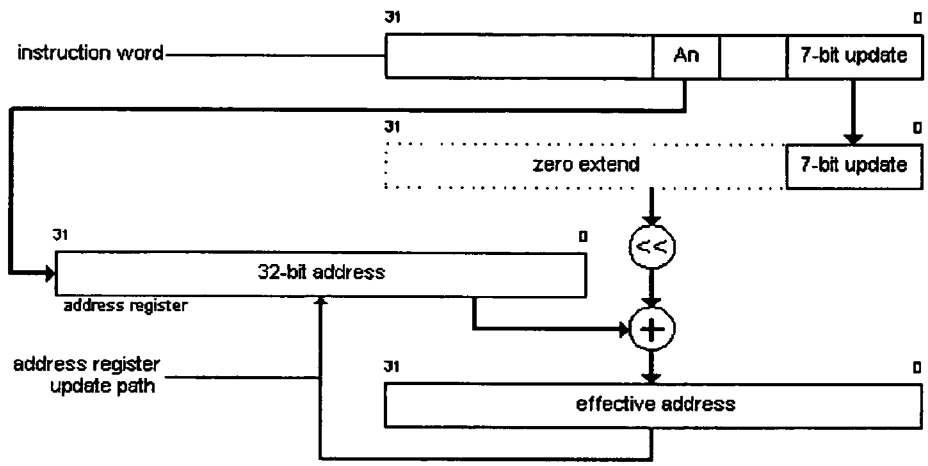

b) 32-bit update

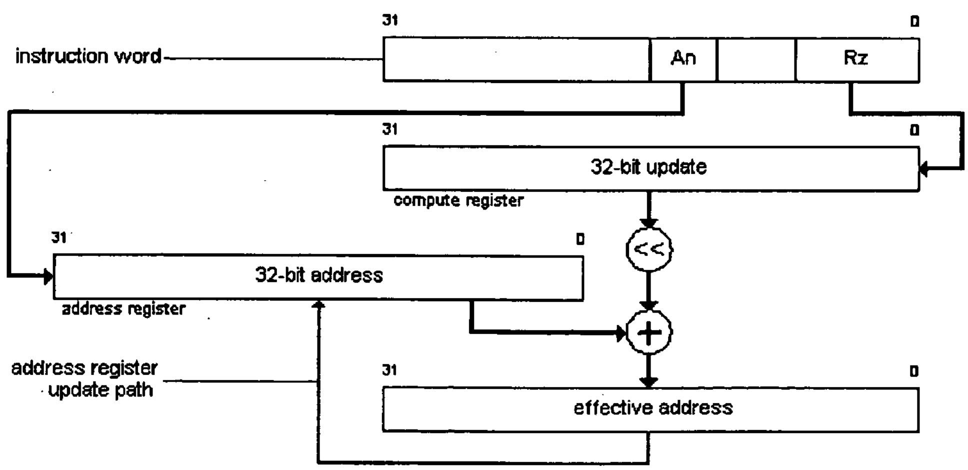

2.8 Address Register Indirect with Scaled Post-Decrement Mode

In the address register indirect with post-decrement addressing mode, the operand is in memory and the operand effective address is the contents of the address register Specified in the instruction. After supplying the operand effective address, the same address register is loaded with the difference of the operand effective address and an update value. The update value is either a 7-bit unsigned integer value contained in the instruction word, or is a 32-bit unsigned integer value contained in a compute register Specified in the instruction word. The update value is scaled by the size of the operand (i.e. multiplied, by 2 for a halfword, by 4 for a word, or by 8 for a doubleword). The 6-bit update value is zero-extended to a 32-bit integer value before it is used.

a) 7-bit update

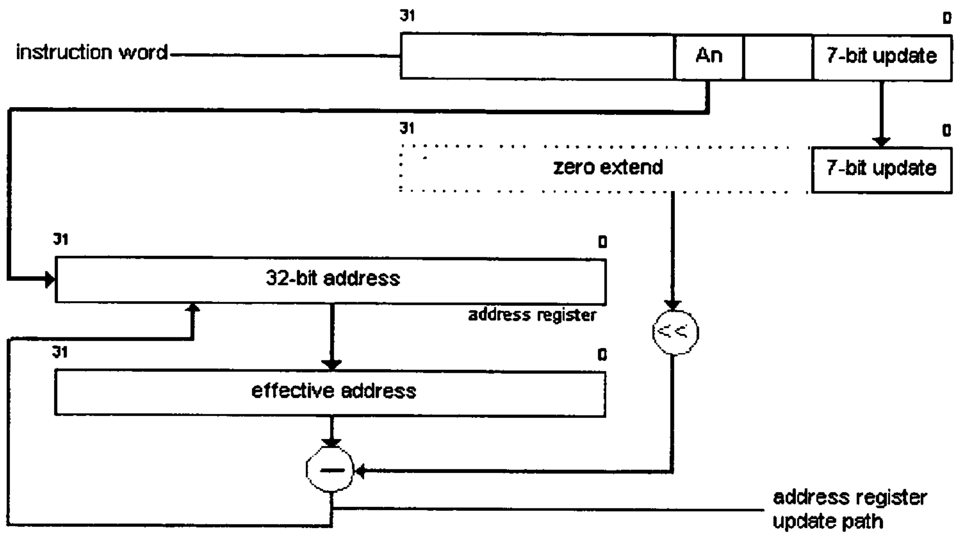

b) 32-bit update

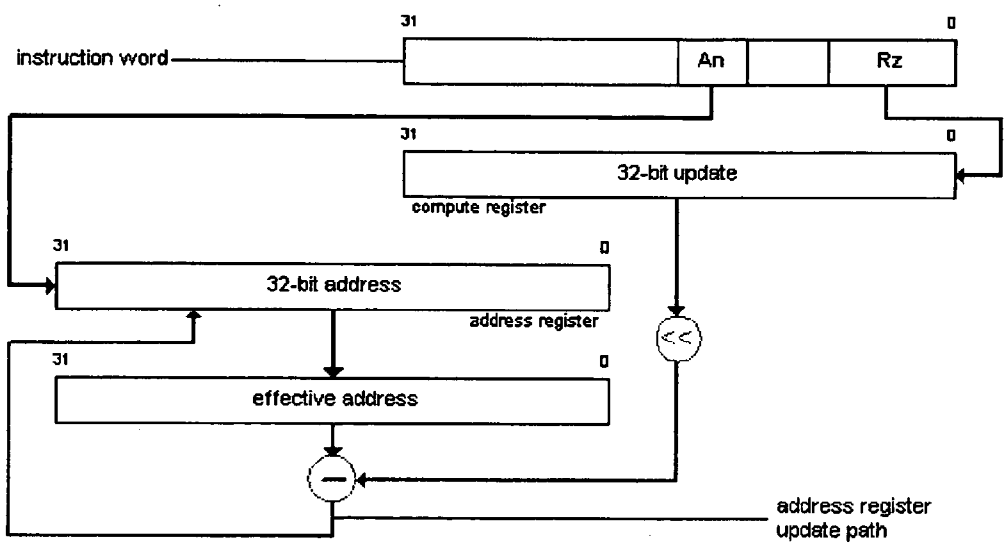

2.9 Address Register Indirect with Scaled Post-Increment Mode

In the address register indirect with post-increment addressing mode, the operand is in memory and the operand effective address is the contents of the address register Specified in the instruction. After supplying the operand effective address, the same address register is loaded with the sum of the operand effective address and an update value. The update value is either a 7-bit unsigned integer value contained in the instruction word, or is a 32-bit unsigned integer value contained in a compute register Specified in the instruction word. The update value is scaled by the size of the operand (i.e. multiplied, by 2 for a halfword, by 4 for a word, or by 8 for a doubleword). The 7-bit update value is zero-extended to a 32-bit integer value before it is used.

a) 7-bit update

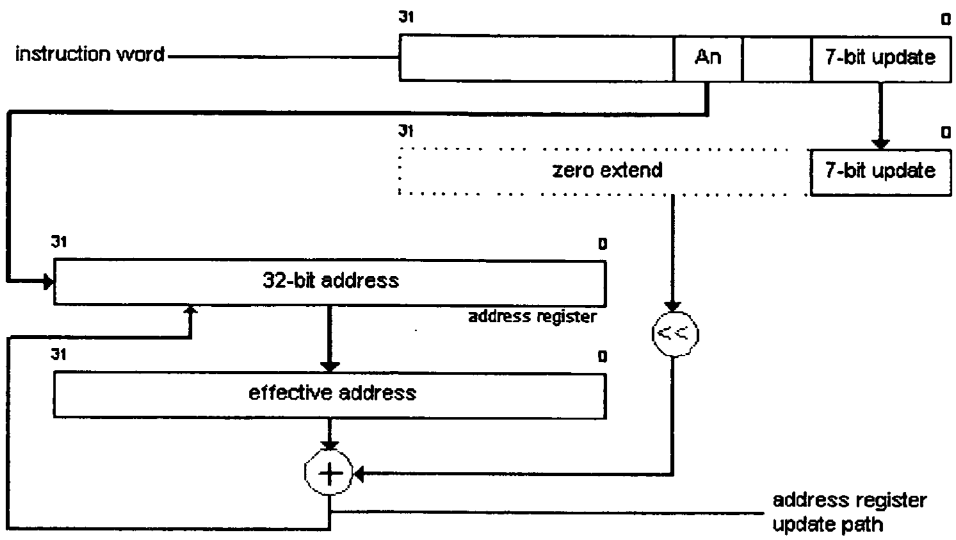

b) 32-bit update

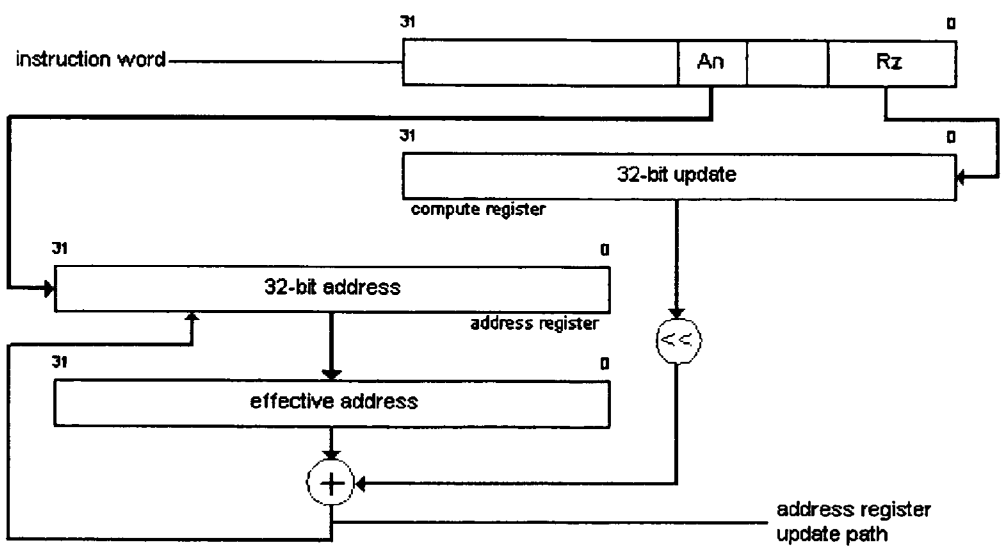

2.10 Address Register Modulo Indexed with Pre-Decrement Mode

In the address register modulo indexed with pre-decrement addressing mode, the operand is in memory and the operand effective address is calculated as follows:

A 7-bit update value contained in the instruction word is zero-extended to a 16-bit integer value and subtracted from the lower-half contents of the odd address register (i.e. the "index") to create a first 16-bit result. This first 16-bit result is then added to the upper-half contents of the odd address register (i.e. the "modulo") to create a second 16-bit result. If the second 16-bit result (i.e. the index minus the update plus the modulo) is greater than or equal to zero, that result is zero-extended to a 32-bit integer value and added to the contents of the even address register (i.e. the "base"). Otherwise, the first 16-bit result (i.e. the index minus the update) is zero-extended to a 32-bit integer value and added to the contents of the even address register. After the operand effective address is formed, the selected 16-bit result is written to the lower-half of the odd address register.

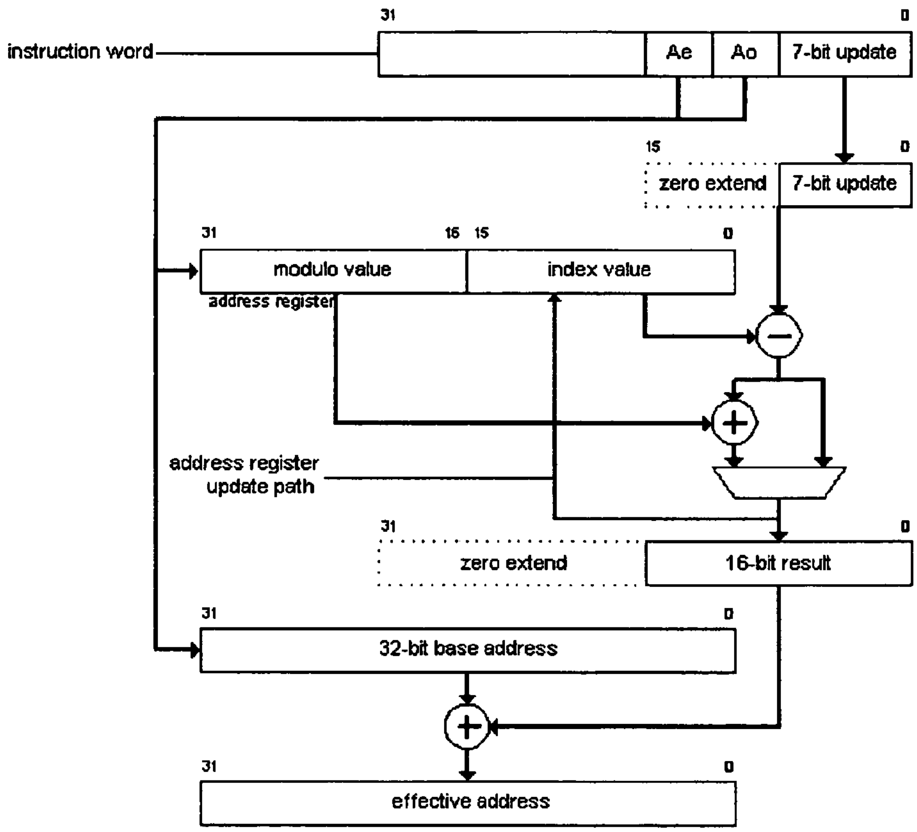

2.11 Address Register Modulo Indexed with Post-Increment Mode

In the address register modulo indexed with post-increment addressing mode, the operand is in memory and the operand effective address is calculated as follows:

The lower-half contents of the odd address register (i.e. the "index") are zero-extended to a 32-bit integer value and added to the contents of the even address register (i.e. the "base").

After the operand effective address is formed, a 7-bit update value contained in the instruction word is zero-extended to a 16-bit integer value and added to the index to create a first 16-bit result. The upper-half contents of the odd address register (i.e. the "modulo) are then subtracted from the first 16-bit result to create a second 16-bit result. If the second 16-bit result (i.e. the index plus the update minus modulo) is greater than or equal to zero, that result is written to the lower-half of the odd address register. Otherwise, the first 16-bit result (i.e. the index plus the update) is written the lower-half of the odd address register.

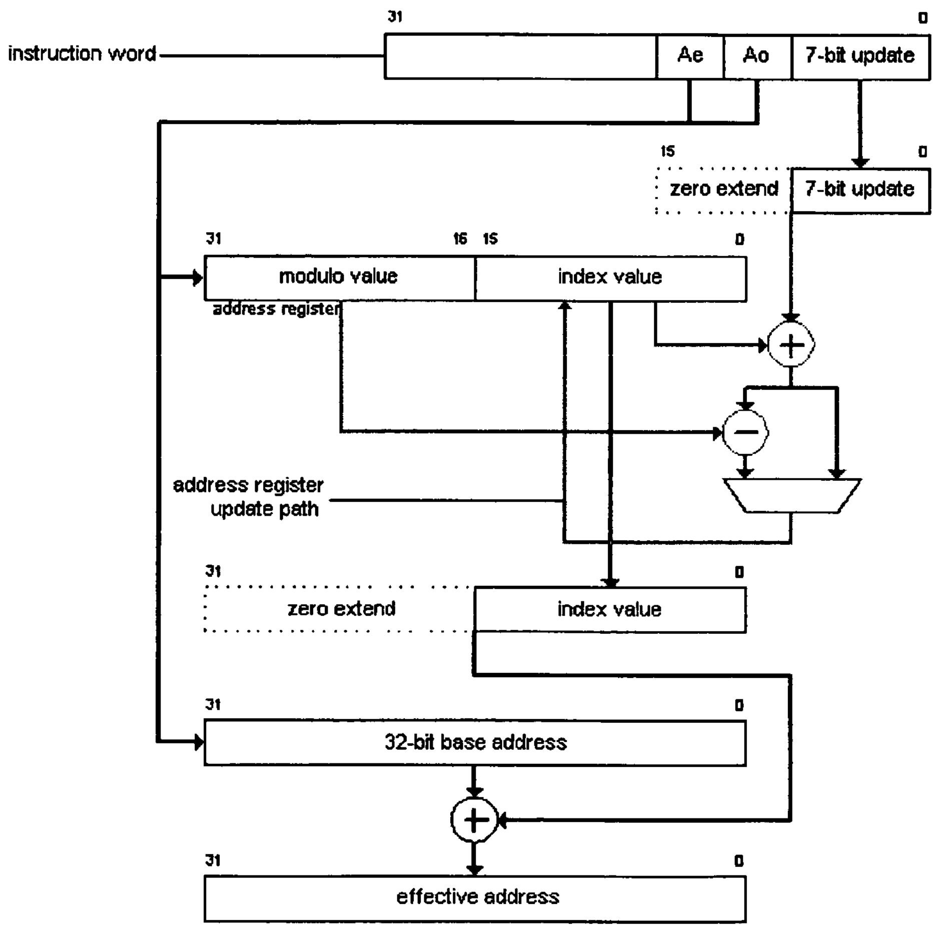

2.12 Address Register Modulo Indexed with Scaled Pre-Decrement Mode

In the address register modulo indexed with scaled pre-decrement addressing mode, the operand is in memory and the operand effective address is calculated as follows:

A 7-bit update value contained in the instruction word is zero-extended and scaled by the size of the operand (i.e. multiplied, by 2 for a halfword, by 4 for a word, or by 8 for a doubleword) to form a 16-bit integer value. The 16-bit integer value is then subtracted from the lower-half contents of the odd address register (i.e. the "index") to create a first 16-bit result. This first 16-bit result is then added to the upper-half contents of the odd address register (i.e. the "modulo") to create a second 16-bit result. If the second 16-bit result (i.e. the index minus the update plus the modulo) is greater than or equal to zero, that result is zero-extended to a 32-bit integer value and added to the contents of the even address register (i.e. the "base"). Otherwise, the first 16-bit result (i.e. the index minus the update) is zero-extended to a 32-bit integer value and added to the contents of the even address register. After the operand effective address is formed, the selected 16-bit result is written to the lower-half of the odd address register.

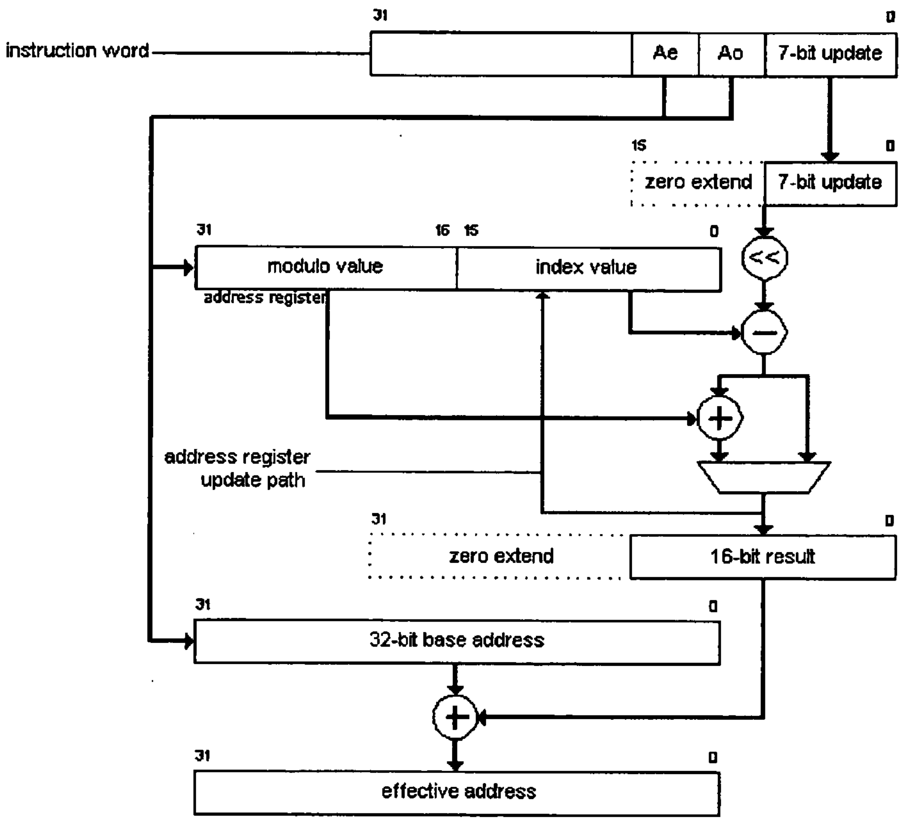

2.13 Address Register Modulo Indexed with Scaled Post-Increment Mode

In the address register modulo indexed with scaled post-increment addressing mode, the operand is in memory and the operand effective address is calculated as follows:

The lower-half contents of the odd address register (i.e. the "index") are zero-extended to a 16-bit integer value and added to the contents of the even address register (i.e. the "base").

After the operand effective address is formed, a 7-bit update value is zero-extended and scaled by the size of the operand (i.e. multiplied, by 2 for a halfword, by 4 for a word, or by 8 for a doubleword) to form a 16-bit integer value. The 16-bit integer value is then added to the index to create a first 16-bit result. The upper-half contents of the odd address register (i.e. the "modulo) are then subtracted from the first 16-bit result to create a second 16-bit result. If the second 16-bit result (i.e. the index plus the update minus modulo) is greater than or equal to zero, that result is written to the lower-half of the odd address register. Otherwise, the first 16-bit result (i.e. the index plus the update) is written the lower-half of the odd address register.

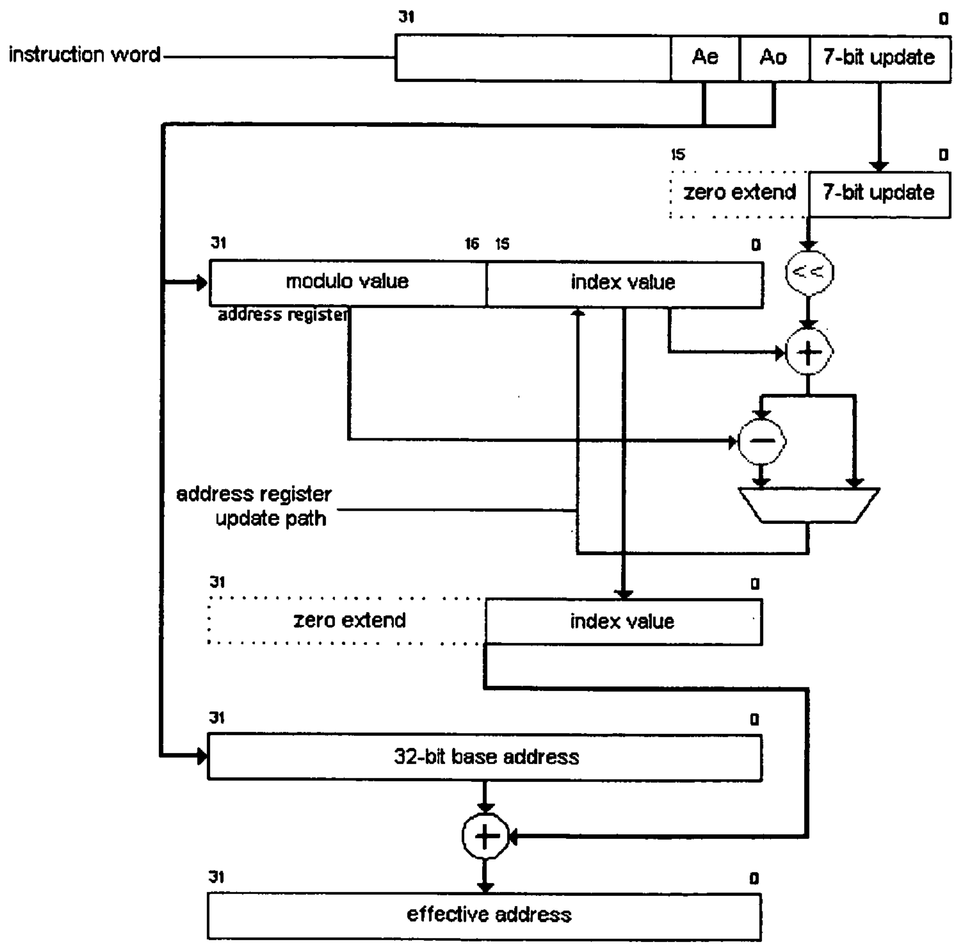

2.14 Address Register Table Look-Up Mode

In the address register table look-up addressing mode, the operand is in memory and the operand effective address is the sum, or the difference, of the contents of an address register and a compute register Specified in the instruction.

To form the operand effective address, the contents of the compute register (i.e. the "index") are scaled by the size of the operand (i.e. multiplied, by 2 for a halfword, by 4 for a word, or by 8 for a doubleword) to form a 32-bit integer value. This 32-bit integer value is then added to, or subtracted from, the contents of the address register.

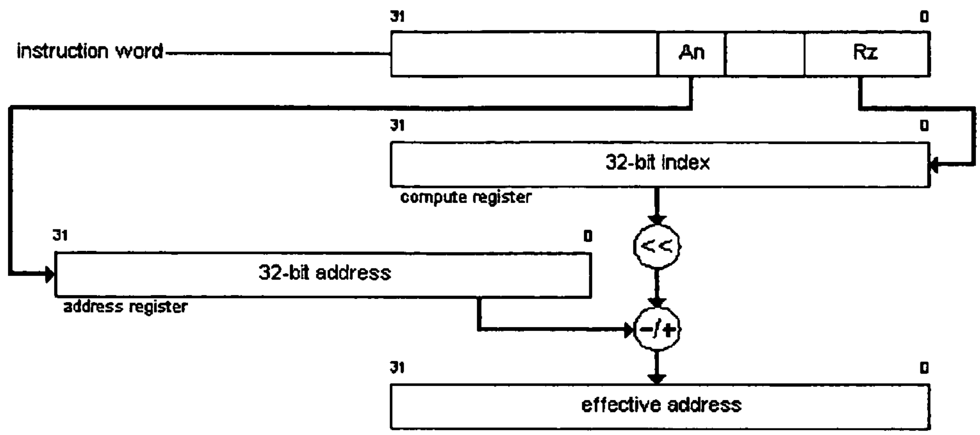

3 Special Addressing Modes

3.1 PC-Relative Mode

The PC-Relative addressing mode is used by jumps, calls, and looping instructions. The effective address is the sum of a 12- or 16-bit displacement value contained in the instruction word and the contents of the Decode Program Counter (DPC). The 12- or 16-bit displacement value is sign-extended to 32-bits before it is used.

Figure 3.1: PC-Relative Mode

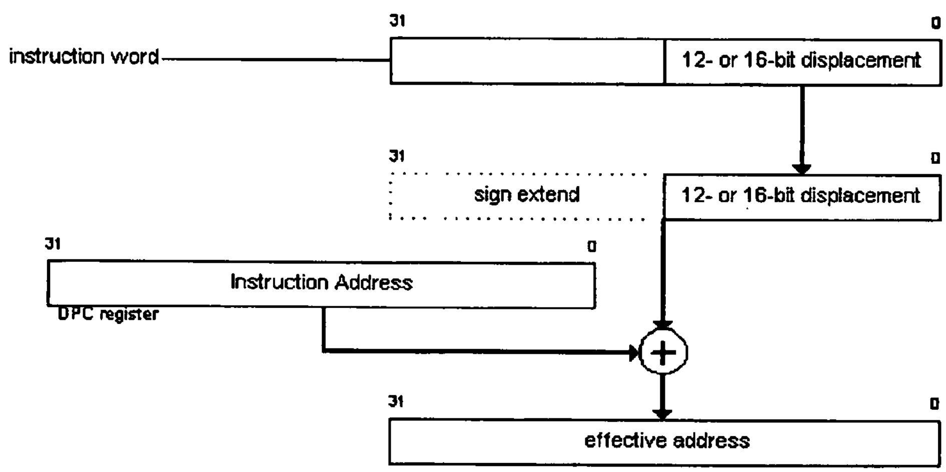

3.2 Immediate Mode

In the immediate mode, the source operand is an unsigned 16-bit integer or a signed 17-bit integer contained in the instruction word. When the unsigned 16-bit integer is used, the operand may be loaded into the upper-half or the lower-half of an address or compute register. When the signed 17-bit integer is used, the magnitude (i.e. the 16 least-significant bits of the operand) is loaded into the lower-half of the target register and the sign-bit (i.e. the most-significant bit of the operand) is replicated into every bit in the upper-half of the target register.

a) 16-bit load immediate to upper-half of target register

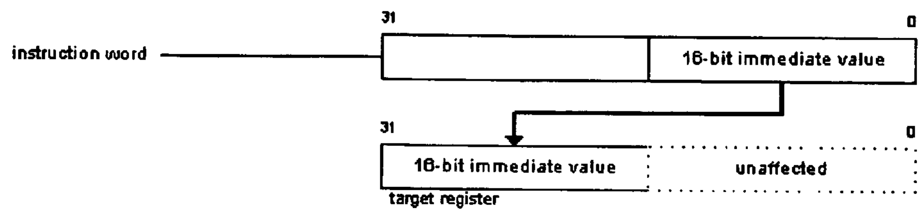

b) 16-bit load immediate to lower-half of target register

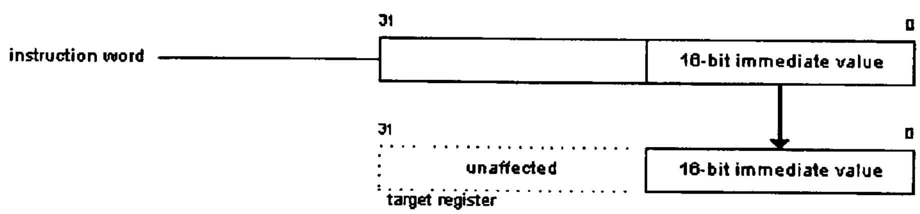

c) 17-bit load immediate

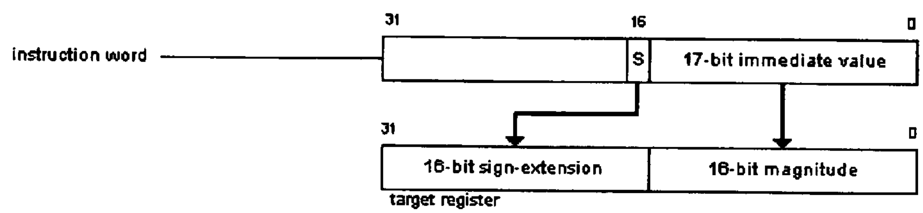

Scalable Conditional Execution

BOPS, Inc. Manta SYSSIM 2.31

This chapter describes how Scalable Conditional Execution is implemented in the ManArray Architecture.

Table of Contents

1 - Introduction

1.1 - Definitions

2 - Arithmetic Scalar Flags

2.1 - ASF Generation
2.2 - ASF Use

3 - Arithmetic Condition Flags

3.1 - ACF Generation
3.2 - ACF Use

4 - ACFs and ASFs in Packed-Data Operations
5 - The Hierarchical Conditional Execution Architecture

5.1 - CE1: One-bit Conditional Execution Opcode Extension Encoding
5.2 - CE2: Two-bit Conditional Execution Opcode Extension Encoding
5.3 - CE3a: Three-bit Conditional Execution Opcode Extension Encoding

6 - Conditional Branch Type Instructions
7 - Compare Instructions
8 - VLIW Conditional Execution
9 - Rules for Updating the ACF/ASF

Rule #1
Rule #2
Rule #3
Rule #4

1 - Introduction

Conditional or guarded execution is the ability to control whether an instruction executes or not, based on certain specifiable results of a previous operation. An instruction that does not execute because of the tested condition is defined to not change the machine state.

The ManArray architecture, provides a scalable and hierarchical conditional execution specification based upon instruction type, support in the SP(s) and PEs for complex conditions based upon present and previous condition state, a mechanism for interdependent conditional execution between the multiple execution units in an i VLIW machine, and a mechanism for packed-data conditional execution.

The ManArray architecture uses a three-level, hierarchical conditional execution specification. This specification uses 1-bit, 2-bit, or 3-bit fields in the instruction formats, depending upon the instruction type and format encoding restrictions. These bit fields, CE1 for 1-bit conditional execution, CE2 for 2-bit conditional execution, and CE3 for 3-bit conditional execution, specify the condition to be tested to determine whether to execute the instruction.

The condition information to be operated upon as specified in CE1, CE2 or CE3, is a reduced set of state information, separately produced from the normal side-effect state generated in parallel by executing instructions, be they packed-data operations or iVLIW operations. This condition information is made available to subsequent instructions in the form of hot condition information or condition flags.

Two types of condition flags are specified: the Arithmetic Scalar Flags (ASF) and the Arithmetic Condition Flags (ACF). The ASFs are Carry (C), Overflow (V), Sign (N), Zero (Z) and the ACFs are F7-F0. The programmer-visible ASFs are always set as specified by the instruction, after each instruction execution, and represent the traditional side effects of the operation on the least significant data element. The ACFs are set as a result of an instruction execution or as a result of a Boolean combination of condition information generated from a present compare instruction and previous instruction execution. Generation of the ASFs is independent of the generation of ACFs.

Generalized conditional execution is based on the ACF condition information. Conditional branching uses either the ASF condition information or the ACF condition information.

The ASF and ACF condition information is stored in the common, programmer-visible Status and Control Register 0 (SCR0) in the SP and in the PE SCR0. The SP SCR0 is part of the Miscellaneous Registers (MRF) in the SP; the PE SCR0 is part of the MRF in the PE. .

However, there is no wait penalty for flag updates. That means the condition information generated by an instruction is immediately available to the following instruction at the end of the first instruction's execute phase in the pipeline, for use in the second instruction's execute phase. The first instruction's condition information is saved to SCR0 during its condition-return phase in the pipeline. A conditionally executing (or branching) third instruction may then use the first instruction's condition information during execute, reading the saved condition flags from SCR0.

If the first instruction uses the CCombo field (see Compare Instructions) to combine its condition information with the existing ACFs in SCR0, that new, combined condition information is also available to the immediately following instruction at the end of the first instruction's execute phase in the pipeline.

1.1 - Definitions

| | |
|---|---|
| **Condition information** | The complete set of side-effects generated in parallel by executing instructions. |
| **ACF information** | Hot ACF information and/or ACFs. |
| **ASF information** | Hot ASF information and/or ASFs. |
| **Hot signals** | Condition information signals generated by an instruction in condition return, and made available to Load and Store instructions in execute and decode. At the end of condition return, hot signals are latched into corresponding ACF or ASF flag bits. |
| **Hot condition information** | Condition information signals generated by an instruction during execute, before they are latched in condition return. |
| **Hot ACF information** | Condition information signals generated by an instruction during execute, before they are latched in condition return and saved as the ACFs. |
| **Hot ASF information** | Condition information signals generated by an instruction during execute, before they are latched in condition return and saved as the ASFs. |
| **Latched signals** | ACFs and/or ASFs. |
| **Condition Flags** | ACFs and ASFs. |
| **ACFs** | F7-F0, see also Arithmetic Condition Flags section. |
| **ASFs** | CNVZ; see also Arithmetic Scalar Flags section. |

Relationship of the terms defined:

| | Hot signals | Latched signals |
|---|---|---|
| Condition information | Hot condition information | Condition Flags |
| ACF information | Hot ACF information | ACFs |
| ASF information | Hot ASF information | ASFs |

2 - Arithmetic Scalar Flags

2.1 - ASF Generation

Conceptually, the normal side-effect state generated from an instruction execution is saved in the Arithmetic Scalar Flags (ASFs), namely carry (C), overflow (V), sign (N), and zero (Z) flags. The ASFs are set based on the least significant operation being executed on a packed data type, i.e. byte-0 (b0), Half-word-0 (H0), Word-0 (W0), or Doubleword (D). Some restrictions apply depending upon the data type. The ASFs are always set as specified by the instruction. They are updated at the end of the condition-return (CR) phase of the pipeline. The following table defines the general rules by which most instructions update the ASFs. However, note that these rules only provide a general rule-of-thumb. Many instructions don't use these rules to update the ASFs. To understand clearly how a specific instruction updates the ASFs, always consult that instruction's documentation in the Instruction Set Reference.

Table 1: The Arithmetic Scalar Flags (ASF)

| Scalar Flag | Description |
|---|---|
| C – Carry | Set if the carry output from bit-31 (for Word operations) of the arithmetic unit is 1. Cleared if carry output is 0. |
| N – Sign | Set if highest order bit (bit-31 for Word operations) of the result (sign bit) is 1. Cleared if highest order bit is 0. |
| V – Overflow | Set if the XOR of the two highest order carries (for Word operations: the carry into bit-31 and the carry out of bit-31) is a 1. Cleared if the XOR is a zero. This condition corresponds to a positive or negative overflow in 2's complement arithmetic which is used in signed number operations and ABSDIF, BFLYD2, BFLYS, SUB, SUBI, SUBS, CMPcc, and CMPIcc instructions for both signed and unsigned operations. |
| Z– Zero | Set if the output of the operation contain all zeroes. |

2.2 - ASF Use

SP or PE instructions may branch based on the ASFs set by the last instruction that affected the ASFs. If the instruction immediately preceding the branch affects the ASFs, the branch instruction always uses the new condition information generated by the immediately preceding instruction, not the condition information saved in SCR0.

3 - Arithmetic Condition Flags

The ManArray Architecture defines a set of Arithmetic Condition Flags (ACFs) that store specified results from instruction execution. These ACFs are used for generalized conditional execution. In order to minimize branch latencies, almost all instructions can be conditionally executed based upon the ACFs. For an instruction to be conditionally executed in each PE in an array of PEs, a testable condition must be generated locally in each PE. The section on ACF Generation explains how this local testable condition is derived from the large number of conditions that can occur in each PE due to iVLIW execution on packed data types.

To enable cycle-by-cycle generalized conditional execution of an instruction stream, the instruction encoding contains the conditional execution bitfields CE1, CE2 and CE3. These bits specify which conditions are employed, in order to determine whether to execute the instructions or not.

Thus, the ManArray programmer has two ways to control generalized conditional execution:

1. by specifying how the ACFs are set by the instruction generating the condition,
2. or by specifying how the ACFs are used by the instruction operating on a condition.

There is one set of ACFs per SP and one set of ACFs for each PE in the array, independent of the number of execution units in the array's processors. In this manner, a condition can be generated in one execution unit, e.g. from a compare instruction in the ALU, and based upon this condition the other execution units can conditionally execute the next instruction.

Instructions that execute conditionally do not affect the condition flags themselves. This feature gives the programmer the ability to execute C-style conditional expression operators of the form `(a>b) ? z = x+y : r = q+s`. The first instruction after the comparison will not alter the flags, which would produce an undesired result. Therefore, an instruction may either specify to conditionally execute based upon the ACFs or specify how to set the ACFs, but not both.

---

3.1 - ACF Generation

All instructions with a CE3 opcode extension field can update the ACFs. Unlike in the generation of the ASFs, the generation of the ACFs by these instructions is controlled by the programmer. This reduces the amount of condition state information that results from a packed-data iVLIW operation.

The following groups of instructions provide some level of control over the generation of the ACFs:

- ALU comparison instructions, such as CMPcc and CMPIcc use the condition test CC and CCombo fields for setting the ACF F7-F0. For example, valid condition results such as Greater than or Equal (GE) or Less than or Equal (LE) can be specified to set the appropriate ACF. See also Compare Instructions section.
- Other arithmetic instructions may provide the ability to specify how to update the ACFs using one of the four scalar conditions C, N, V, or Z side effects on an instruction by instruction basis. ALU, MAU and DSU instructions that have a CE3 field support this feature. See the ALU/ MAU Instruction Format Table and the DSU Instruction Format Table for an overview of these instructions.
- iVLIW operations provide the programmer with control over which of the arithmetic units is allowed to affect the ACFs. During each cycle, the ownership and setting of the condition flags is dynamically determined by the instruction in execution.

Conditions that occur but are not selected to affect the ACFs cause no effect and are not generally saved.

The ACFs are updated at the end of the condition-return (CR) phase of the pipeline.

---

3.2 - ACF Use

The ACFs can be tested for in the SP and in the PEs by conditionally executing instructions, minimizing the use of conditional branches. In the simplest case, PE instructions may conditionally execute and SP instructions may conditionally execute or branch on the condition results of last instruction that affected the ACFs.

ALU, MAU and DSU instructions check the ACF settings in the execute phase of the pipeline. So if the instruction immediately preceding the conditionally executing ALU/ MAU/ DSU instruction affects the ACFs, the ACF conditionally executing instruction uses the new, hot condition information from the immediately preceding instruction, not the ACFs in SCR0. If the instruction immediately preceding the conditionally executing ALU/ MAU/ DSU instruction uses the CCombo field to combine the side effects with the existing ACFs in SCR0, the conditionally executing instruction will use that combined hot ACF condition information.

Conditionally executing Load/Store, Control and VLIW instructions check the ACFs in the decode phase of the pipeline and require a one-cycle delay after the ACF update. More information in Load/Store Pipeline Restrictions.

If the immediately preceding instruction does not affect the ACFs, general conditional execution is based on the condition results of the last instruction that affected the ACFs.

4 - ACFs and ASFs in Packed-Data Operations

A packed-data operation is defined as executing the same operation on each of the multiple data elements specified by the instruction. Each of these individual data-element operations can generate side effects that can set the appropriate ACF as defined by the packed data instruction. (See the section on ACF Generation) Since the ManArray architecture supports up to eight simultaneous packed-data operations, the ManArray conditional execution architecture defines eight ACFs: F7 - F0. The ASFs are set by the operation on the least significant data element (See the section on ASF Generation). Table 2 shows the correspondence between the flags and the operation parallelism.

Table 2:

| Operation Parallelism | Supported Data types | ACFs Affected (by operation on data element) | ACFs Unaffected | ACFs set by operation on this data element: |
|---|---|---|---|---|
| 64-bit | 8 Bytes | F7(b7), F6(b6), F5(b5), F4(b4), F3(b3), F2(b2), F1(b1), F0(b0) | None | b0 |
| 32-bit | 4 Bytes | F3(b3), F2(b2), F1(b1), F0(b0) | F7 – F4 | b0 |
| 64-bit | 4 Halfwords | F3(H1o), F2(H0o), F1(H1e), F0(H0e) | F7 – F4 | H0e |
| 32-bit | 2 Halfwords | F1(H1), F0(H0) | F7 – F2 | H0 |
| 64-bit | 2 Words | F1(W1), F0(W0) | F7 – F2 | W0 |
| 32-bit | 1 Word | F0(W) | F7 – F1 | W |
| 64-bit | 1 Doubleword | F0(DW) | F7 – F1 | DW |

Figures 1 and 2 depict the relationship of a packed-data element operation and its corresponding ACF. Figure 1 illustrates 64-bit packed data operations. For example, for a Dual word packed-data operation, the operation on W0 affects F0 and the operation on W1 affect F1.

Figure 1

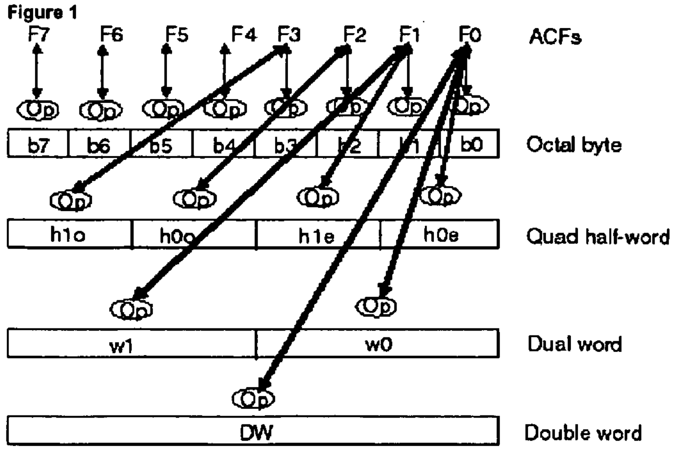

Figure 2 represents 32-bit packed-data operations in quad byte operations. Here the operation on b0 affects F0, the operation on b1 affects F1, the operation on b2 affects F2, and the operation on b3 affects F3.

5 - The Hierarchical Conditional Execution Architecture

5.1 - CE1: One-bit Conditional Execution Opcode Extension Encoding

Opcodes with a CE1 1-bit extension field as illustrated in Table 3 below, may conditionally execute if True or unconditionally execute without affecting the ACFs. The ASFs are set as defined by the instruction. For example Load/Store instructions never affect ACF flags and they may be conditionally executed on a true condition.

Table 3:

| Encoding | Execution | Affect on ACFs | Example Instruction |
|---|---|---|---|
| 0 | Execute | DO NOT AFFECT | lim.s.h0 R0, 0xFFFF |
| 1 | Cond. Exec. If F0 is True | DO NOT AFFECT | T.lim.s.h0 R0, 0xFFFF |

5.2 - CE2: Two-bit Conditional Execution Opcode Extension Encoding

Opcodes with a CE2 2-bit extension field as illustrated in Table 4 below may conditionally execute on true or false, unconditionally execute and not affect the ACFs or provide an instruction-specific conditional execution function. The ASFs are set as defined by the instruction.

Table 4:

| Encoding | Execution | Effect on ACFs | Example Instruction |
|---|---|---|---|
| 00 | Execute | DO NOT AFFECT | copy.sd.w R0, R1 |
| 01 | Cond. Exec if F0 is True | DO NOT AFFECT | T.copy.sd.w R0, R1 |
| 10 | Cond. Exec if F0 is False | DO NOT AFFECT | F.copy.sd.w R0, R1 |
| 11 | reserved | N/A | N/A |

5.3 - CE3a: Three-bit Conditional Execution Opcode Extension Encoding

The CE3a 3-bit Conditional Execution architecture in the ManArray provides the programmer with three different levels of functionality:

1. unconditional execution of the operation,
2. conditional execution of the operation,
3. unconditional execution of the operation with control over ACF setting.

In the third case, the C, N, V, and Z flags represent the side effect from the instruction that is executing. Arithmetic instructions of the form A ← ; X ! Y or X ← X! Y! Z where the ! is an arithmetic function, like +, -, *, logical OR, may be conditionally executed on a true or false condition without affecting the flags. They may be unconditionally executed without affecting the flags or unconditionally executed and affect the flags based on one of the conditions C, N, V, or Z.

When an instruction's CE3 field specifies updating the ACFs with a "not affected" ASF, the ACF will not be updated.

Table 5:

| Encoding | Execution | Affect ACFs | Example Instruction |
|---|---|---|---|
| 000 | Execute | DO NOT AFFECT | add.sa.1w R0, R1, R2 |
| 001 | Cond. Exec if F0 is True | DO NOT AFFECT | T.add.sa.1w R0, R1, R2 |
| 010 | Cond. Exec if F0 is False | DO NOT AFFECT | F.add.sa.1w R0, R1, R2 |
| 011 | Reserved | Reserved | None |
| 100 | Execute | ACFs ←C | shriC.pd.1w R0, R1, R2 |
| 101 | Execute | ACFs ←N | sprecvN.pd.w R0, R1,2x2PE1 |
| 110 | Execute | ACFs ←V | shriV.sd.1w R0, R1, R2 |
| 111 | Execute | ACFs ←Z | sprecvZ.pd.w R0, R1,2x2PE0 |

6 - Conditional Branch-Type Instructions

The Manta SP supports the following branch-type instructions: CALLcc, CALLDcc, CALLIcc, JMPcc, JMPDcc, JMPIcc, RETcc , RETIcc . These instructions provide branch-type functions based upon the ASF or ACF settings, which are set by previously executed instructions. Therefore the conditional branch need only specify branch-on-true or branch-on-false (see Table 7) and may make use of scalar conditional branch instructions. See ASF Generation and ACF Generation for information on how to generate the ASF or ACF settings.

Table 7:

| Mnemonic | Branch if: |
|---|---|
| T.op | F0=1 |
| F.op | F0=0 |
| opZ (opEQ) | Z=1 |
| opNZ (opNE) | Z=0 |
| opHI | (C=1) && (Z=0) |
| opHS (opCS) | C=1 |
| opLO (opCC) | C=0 |
| opLS | (C=0) \|\| (Z=1) |
| opVS | V=1 |
| opVC | V=0 |
| opPOS | (N=0) && (Z=0) |
| opNEG | N=1 |
| opGE | N=V |
| opGT | (Z=0) && (N=V) |
| opLE | (Z=1) \|\| (N != V) |
| opLT | N != V |

7 - Compare Instructions

Executed comparison instructions always affect the ACFs and the ASFs. The instruction encoding specifies two bitfields that control how the executed compare instruction affects the ACFs:

- the condition code field (CC)
- the condition combination field (CCombo)

First each operation on a data element yields a C-N-V-Z flag setting for that element, as defined by the CC field encoding in the instruction. These flag settings are internal state, and they are not visible to the programmer, except for the flag setting that results from the operation on the least significant data element, which is saved as the ASF. (See ASF Generation section) Then each C-N- V-Z flag setting is used to determine the ACF setting that corresponds to the data element, based on the definition encoded in the CCombo field.

See Table 8 for the supported definitions for the CC field. See Table 9 for the supported definitions for the CCombo field.

Table 8

| CC | Description | CNVZ Setting |
|---|---|---|
| Z (EQ) | Zero or Equal | Z=1 |
| NZ (NE) | Not Zero or Not Equal | Z=0 |
| HI | Higher (unsigned) | (C=1) && (Z=0) |
| HS (CS) | Higher or Same (unsigned, or Carry Set) | C=1 |
| LO (CC) | Lower (unsigned, or Carry Clear) | C=0 |
| LS | Lower or Same (unsigned) | (C=0) \|\| (Z=1) |
| VS | Overflow Set | V=1 |
| VC | Overflow Clear | V=0 |
| POS | Positive | (N=0) && (Z=0) |
| NEG | Negative | N=1 |
| GE | Greater-than or Equal (signed) | N=V |
| GT | Greater-Than (signed) | (Z=0) && (N=V) |
| LE | Less-than or Equal (signed) | (Z=1) \|\| (N != V) |
| LT | Less-Than (signed) | N != V |

Condition combination (CCombo) allows the programmer to branch in the SP or conditionally execute in the SP and PEs on a Boolean combination of multiple conditions. The programmer can combine the previous state of the ACFs with the result of the condition code test specified in the instruction's CC field. This approach allows complex conditions to be created without resorting to multiple branching. Conditional execution may also take place based on a combination of multiple conditions rather than a single condition.

In Table 9, $F_{t,n}$ designates the "n" T/F condition flags (F) generated on cycle t. Specifically, the letter "n" represents the set of ACFs n=1: F0, n=2: F1– F0, n=4: F3– F0, or n=8: F7–F0 depending on whether the compare instruction is mono, dual, quad, or octal respectively. $F_{t-1,n}$ designates the state of the ACFs on the previous cycle, as indicated by the t-1 subscript. Fn represents the final set of true/false values that the set of n machine ACFs takes upon completion of the compare operation. This condition flag encoding is shown in Table 9.

Table 9:

| Encoding | Combination | Operation |
|---|---|---|
| 00 | none | $F_n \leftarrow F_{t,n}$ |
| 01 | AND | $F_n \leftarrow F_{t-1,n}$ AND $F_{t,n}$ |
| 10 | OR | $F_n \leftarrow F_{t-1,n}$ OR $F_{t,n}$ |
| 11 | XOR | $F_n \leftarrow F_{t-1,n}$ XOR $F_{t,n}$ |

8 - iVLIW Conditional Execution

Each instruction stored in the VLIW Instruction Memory (VIM) contains its CE1, CE2, or CE3a/b specification.

When the iVLIW is read out for execution in response to an execute-VLIW (XV) instruction, multiple flags internal to the individual units can be generated. Since there is one set of ACFs and potentially each instruction in the iVLIW could affect the flags, a selection mechanism is needed to choose which arithmetic unit will affect the flags for any given cycle. There are two mechanisms for achieving this, one for Single Instruction Multiple Data stream (SIMD) code and one for Synchronous Multiple Instruction Multiple Data stream (SMIMD) code.

For SIMD code, the programmer specifies which unit affects the flags at execution time as part of the XV instruction. The XV instruction specification may override the unit specified in the LV instruction. This allows the programmer to pack multiple non-overlapping iVLIWs in the same VIM address with different arithmetic units affecting the condition flags per iVLIW execution.

In SMIMD a different iVLIW can exist at the same VIM address in different PEs across the array. Each of these iVLIWs can then be executed in parallel for purposes of optimizing performance in different applications with varying needs for iVLIW parallelism. For SMIMD code, the programmer specifies which arithmetic unit affects the flags when the iVLIW is loaded as part of the Load iVLIW (LV) instruction. This approach allows different PEs to have different units affect the flags.

9 - Rules for Updating the ACF/ASF Flags

This section defines how the array updates the Arithmetic Condition Flags (ACF) and the Arithmetic Scalar Flags (ASF).

For the most common sequences, involving streams of one-cycle or two-cycle instructions, the flags are set in a simple predictable fashion.

For instruction streams that include mixtures of one-cycle and two-cycle instructions, there can be unexpected results. Some of the constraints that apply to these are described below.

Rule #1:

Updates to the ACF and ASF flags are handled as an atomic operation.

Discussion: Whichever execution unit updates the ACF flags will update the ASF flags as well. "Updated" means that flags can either be changed or left in their previous state.

Rule #2:

The last instruction entering the pipeline wins.

Discussion: Contention across stages of the pipeline can occur both within an execution unit, and across multiple execution units.

Resolution A (2-cycle Instruction vs 1-cycle Instruction):

An execution unit will resolve contention among its own pipeline stages.

Discussion: In the ALU, when a 2-cycle instruction is followed by a 1-cycle instruction, the ALU will resolve the contention using the rule that last-in-wins.

Example:

```
                            ! See examples key
fcmpGT.sa.1fw    r0,r1
cmpZ.sa.1w       r0,r1      ! This instruction will update the flags.
```

Exception:

When a 2-cycle instruction is followed by a CMP or CMPI type of instruction. For example, when an FADD is followed by a CMP, the FADD will update the CRF register, but the CMP will update the flags.

Resolution B (CR2 in one unit vs. CR in another unit):

In the event that an instruction completing CR2 stage from one execution unit is competing with an instruction completing the CR stage in a different execution unit, the unit completing the CR stage will update the flags. The hot condition information used for conditional execution and branching will come from the unit completing CR. For example, a 2-cycle MAU followed by a single cycle ALU, the CGU will use the last-in-wins rule with the single cycle ALU setting the hot flags state. In the event that an instruction completing the CR2 stage from one execution unit is not competing with an instruction completing the CR stage in a different execution unit, the unit completing the CR2 stage will update the flags.

Example:

```
                              ! See examples key
fmpy.pm.1fw       r0,r2,r3
cmpZ.pa.1w        r0,r1       ! This instruction will update the flags.
```

Resolution C (CR or CR2 in one unit vs. EX in another unit):

In the event that an instruction completing CR or CR2 stage from one execution unit is competing with an instruction completing the EX stage in a different execution unit, the unit completing the EX stage will update the flags (assuming it is either unconditionally executed or conditionally executed). However the hot condition information used for conditional execution and branching will come from the unit completing CR or CR2.

Example:

```
                              ! See examples key
fcmpGT.sa.1fw     r0,r1
cmpZ.sa.1w        r0,r1
T.bl.sd           f0,r20,r11 !  This instruction will update the flags
                              !  if the hot condition information for F0 from the cmpZ
instruction is a 1,
                              !  otherwise the flags will be updated by the cmpZ.
```

Rule #3:

If a unit completing the EX stage of the pipe (e.g. DSU bitop/ copy or LU) updates the flags, while a 2 cycle instruction is completing EX2, the 2 cycle instruction will be "Blocked" from updating the flags during the next stage (i.e., its CR2 stage), even if there is no conflict in the next cycle. This is done within the CGU unit.

Example 1 of Rule #3:

```
                                  ! See examples key
fcmpGT.sa.1fw     r0,r1
bl.sd             f0,r20,r11   !  This instruction will update the flags.


T.band.sd         f0,r21,r12   !  This instruction will update the flags if
                               !  the hot condition information for F0 from the BL was set
so that the
                               !  BAND can conditionally execute, otherwise
                               !  the flags from the BL will remain unaffected.
```

Rule #4:

By definition for iVLIW instructions, the parameter "f=[AMD]" determines whether the ALU, MAU, or DSU update the flags.

Setting "f=N" determines that the ALU, MAU, DSU do not update the flags; however the LU can update the flags.

Flag contention can occur (due to the pipeline) during coincident EX1, CR, and/or CR2 operations. In each cycle, contention can exist for determining which execution unit can set the flags. Rule #2 "last instruction entering the pipeline wins" applies here in the normal contention situations.

Special Situations:

A no-operation situation in an execution unit slot allows a previous 2-cycle operation to set the flags, as long as there is no contention and it is allowed by the f=[AMDN] setting. Slot-specific nop situations are:

- a nop instruction in a slot,
- a slot not enabled by the XV E= parameter (or a slot disabled by a SETV or LV instruction),
- a conditional instruction in a slot that doesn't execute, or
- where f=N.

In normal usage, the ALU/ MAU/ DSU instructions in an XV with f=N setting can not set the flags. Normal usage is defined as sequences of 2-cycle instructions, or sequences of 1-cycle instructions.

There are special cases in which 2-cycle and 1-cycle instructions are mixed. For example, a 2-cycle instruction followed by an XV with f=N and containing a 1-cycle instruction in the same execution unit as the 2-cycle instruction; in this case the 1-cycle instruction (being last in the pipe) wins and sets the flags. It is recommended that, if the flags are to be preserved from 2-cycle operations for this case, that in the XV f=x is used (where x = the execution unit of the previous 2-cycle instruction).

The setting of the flags by Load (LU), DSU Bit, and DSU Copy instructions, which are accomplished in EX1, takes priority over any CR or CR2 flag operation that may contend with the EX1 operation, and consequently blocks any previous 2-cycle operation from ever updating the flags. (Note that the f=x setting may be specified by the XV with a VX=1, or by the previously set UAF loaded in the VIM when VX=0.)

For example, in XVs the Load unit could load SCR0 flags even when f=N is specified. For the DSU, f=D allows 1-cycle DSU instructions to have priority over setting flags in EX1 any previous 2-cycle operation.

For explicit flag updating, the results of this rule depend on whether the LU and DSU:

- have separate write ports to the MRF, or
- share a single write port to the MRF.

Example SP1 of Rule #4:

```
! See examples key
 Bor
 FcmpGT   ! overridden by CmpZ in ALU
 Copy     ! overridden by LU acquisition of MRF write port
 T.BL
```

had occurred. The FcmpGT gets squashed by CmpZ using Rule 2-Resolution A. The CmpZ is squashed by Rule 3.

- If the LIM was to SCR0, as far as the ACF and ASF are concerned, neither the Copy nor the LIM instructions would have occurred. This happens because the "F=D" setting does not allow the LU to write to the ACFs and CNVZ bits of SCR0. The LIM to the bits in SCR0 not associated with the ACFs or ASFs would have still occurred. The Copy was suppressed because the LU takes control of the single MRF write port.

- If the LIM was to an MRF other than SCR0, the SCR0 will remain unchanged since the LU takes control of the single MRF write port.

Finally, if the F0 setting from the BOR instruction allows the BL instruction to execute, the BL will update the flags, otherwise the flags will remain unaffected.

Example SP2 of Rule #4:

```
! See examples key
Bor
FcmpGT !overridden by CmpZ in ALU
BXOR
T.BL
```

The results are explained as follows:

- The FcmpGT is squashed by CmpZ (Rule 2-Resolution A).

- The CmpZ is squashed by Rule 3.

- Since the LIM is to SCR0, but "F=D" is in effect, all bits (except the ASFs and ACFs in SCR0) will be loaded by the LIM.

- The BXOR will set the designated ACF

- The other ASFs and ACFs will remain unchanged from the previous cycle's setting.

PE Masking

This chapter describes how the Manarray programmer can selectively mask PEs in order to maximize the usage of available parallelism.

Table of Contents

1 Introduction
2 The PE Mask Bits in SCR1
3 Multi-Cycle Instructions and PE Masking
4 Pipeline Considerations for PE Masking
5 Data Communications Instructions with PE Masking
6 iVLIW Instructions with PE Masking

1 Introduction

PE Masking is a key feature of the Manarray architecture. It allows a programmer to selectively operate any PE. A PE is masked when its corresponding PE Mask bit in SP SCR1 is set. When a PE is masked, it still receives instructions, but it does not change its internal register state.

2 The PE Mask Bits in SCR1

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| IVEC | | | | | reserved | | DVSQ Busy | DC1 | DN1 | DV1 | DZ1 | DC0 | DN0 | DV0 | DZ0 | reserved (PM15-PM4) | | | | | | | | | | | | PM3 | PM2 | PM1 | PM0 |

NOTE: for definitions of all SCR1 fields see SP Status and Control Register 1 (SCR1) in the chapter Processor Registers.

**PM*n* – PE Mask Bits**

If PM*n* = 0, PE*n* is enabled (unmasked).
If PM*n* = 1, PE*n* is disabled (masked).

The PE Mask bits, or PM bits, contain the PE Mask settings. These settings are evaluated during the decode stage of an instruction to determine which PEs are masked for the instruction.

Reset always sets the PE Mask Bits to 0, enabling all PEs.

Each PE Mask bit PM*n* corresponds to a single PE, such that the bit position equals the PE Linear Ordering ID (defined in the Cluster Switch Diagram of the PEXCHG instruction). Thus PM0 defines the masking status of PE0, and PM1, PM2, and PM3 define the masking status of PE1, PE2, and PE3, respectively.

See also definitions of the LIM and COPY instructions.

3 Multi-Cycle Instructions and PE Masking

All instructions check the PE Mask bits during the decode phase of the pipeline. The PE-Mask bit settings during the decode phase of a PE instruction determine the PE asking status for that instruction. The PE masking status for that instruction does not change after decode, regardless of the number of cycles that instruction stays in the pipeline, and regardless of the state of the PE Mask bits AFTER that instruction's decode phase.

---

4 Pipeline Considerations for PE Masking

After an instruction modifies SCR1, the immediately following instruction uses the old settings of the PE Mask bits. The second instruction after the instruction that modifies SCR1 uses the new PE Mask settings.

Example 1:

```
! This Example is syntactically correct. See key
lim.s.h0 SCR1,1             ! updates SCR1: SCR1.b0=0001, disables PE0
add.sa.1w r0,r1,r2          ! uses the old PE Mask settings
lv.p v0,1,5,d=s,f=d         ! uses the updated PE Mask settings
```

Programming Tip: To avoid putting a NOP after an instruction which modifies the PE Mask bits in SCR1, put an instruction which executes in the SP, or an instruction which should execute under the old value of the PE Mask bits.

---

5 Data Communications Instructions with PE Masking

When a PE receives a Data Communication instruction, the PE makes data available and changes cluster switch controls, regardless of the setting of the PE Mask bit. If that PE is masked, no data are written into the specified target register in that PE. In PE0, values being specified for the SP are active even if PE0 is masked.

See additional documentation:

1. Load Broadcast Instructions: Effects of PE Masking
2. Cluster Switch Instructions: Effects of PE Masking
3. PEXCHG instruction
4. SPRECV instruction
5. SPSEND instruction

---

6 iVLIW Instructions with PE Masking

See additional documentation:

1. Using the LV Instruction with PE Masking
2. Using the SETV Instruction with PE Masking
3. Executing VLIWs with PE Masking in effect.
4. Examples
5. Loading, Modifying, and Disabling VLIWs in SMIMD Mode
6. VLIW Instructions

---

Program Flow Control

This chapter describes the Program Flow Control features of Manta.

Table of Contents

1 Program Flow Control on Manta
2 Flow Control Instructions Overview

1 Program Flow Control on Manta

Like all ManArray-based designs, Manta uses the SP for program flow control. The Flow Control Instructions group includes Calls, Jumps, Returns and Event-Point Loops. This group also includes the instructions that are used to control Indirect VLIWs: LV, SETV and XV. These iVLIW instructions provide powerful ways to optimize programs for maximum performance, which are covered in a separate chapter about the iVLIW architecture.

Conditional execution is another flow-control topic that is covered in a separate chapter. The flow control instructions that support conditional execution, provide conditional branching functions based upon the ASF or ACF settings, which are set by previously executed instructions. See the section on Conditional Branch-Type Instructions.

The Program Flow Control Unit (PFCU) determines the address of the next instruction to be fetched from program memory. The next instruction is typically the next sequential instruction in the program, or is the instruction at the target of a branch operation, or an eploop operation. The next instruction can also be the instruction at the target of an interrupt. The PFCU determines the next instruction fetch address based on information received from the branch and loop control logic. The PFCU can also determine the next instruction fetch address based on information received from the interrupt mechanism.

2 Flow Control Instructions Overview

The instructions that support flow control functions are the following:

Call / Jump / Return Instructions

| | |
|---|---|
| CALL | Call PC-Relative Subroutine |
| CALLcc | Call PC-Relative Subroutine on Condition |
| CALLD | Call Direct Subroutine |
| CALLDcc | Call Direct Subroutine on Condition |
| CALLI | Call Indirect Subroutine |
| CALLIcc | Call Indirect Subroutine on Condition |
| RET | Return from Subroutine |
| RETcc | Return from Subroutine on Condition |
| JMP | Jump PC-Relative |
| JMPcc | Jump PC-Relative on Condition |
| JMPD | Jump Direct |
| JMPDcc | Jump Direct on Condition |
| JMPI | Jump Indirect |
| JMPIcc | Jump Indirect on Condition |
| SYSCALL | System Call |

Event-Point Loop Instructions

| | |
|---|---|
| EPLOOP | Set Up and Execute an Event Point Loop |
| EPLOOPI | Set Up and Execute an Event Point Loop Immediate |

Interrupt Instructions

| | |
|---|---|
| RETI | Return from Interrupt |
| RETIcc | Return from Interrupt on Condition |

Miscellaneous Instructionss

| | |
|---|---|
| SVC | Simulator/Verilog Control |
| NOP | No Operation |

The Interrupt instructions are described in the Interrupts chapter.

The EPLOOP instructions are covered in the chapter on Event-Point Looping. The Miscellaneous Flow Control instructions are described in the Instruction-Set Reference.

The Call, Jump and Return Instructions are branch-type instructions, as discussed below.

Branch-type Instructions

The Call, Jump and Return Instructions provide branching functionality in Manta.

These instructions allow the programmer to specify a change in the instruction sequence in which a program is processed. Based on the operation performed by the instruction, the program jumps to a new effective address and continues executing from there.

Calls

Calls allow the programmer to initiate a subroutine, and to save the address of the immediately following instruction, in order to be able to move the program back to that point, after the subroutine is executed. The different types of calls provide for a variety of ways to calculate the effective address for the subroutine. The conditional execution forms of the different Calls allow the programmer to have the Call conditionally execute based on condition flags.

Returns

Returns allow the programmer to move the program back to an effective address, previously saved by a Call instruction, after a subroutine completes execution. The conditional execution forms of the Returns allow the programmer to have the Return conditionally execute based on condition flags.

Jumps

Jumps move the program to a new effective address. The different types of Jumps provide for a variety of ways to calculate the new effective address. The conditional execution forms of the Jumps allow the programmer to have the Jump conditionally execute based on condition flags.

Indirect Very Long Instruction Words (iVLIWs)

BOPS, Inc. Manta SYSSIM 2.31

This chapter describes what iVLIWs are, how they work, and how to use them. Examples on how to program iVLIWs are included in this chapter.

Table of Contents

1 Terminology
2 Overview
3 VLIW Memory Organization and Control
4 Instructions for Operating on iVLIWs: LV, SETV, XV

4.1 The VIM Base Address Register
4.2 The LV Instruction: Loading and Modifying iVLIWs

*4.2.1 Disabling VLIW slots via the LV instruction*
*4.2.2 Using the LV Instruction with PE Masking*

4.3 The SETV Instruction: Enabling and Disabling Instruction Slots Without Loading New Instructions

*4.3.1 Using the SETV Instruction with PE Masking*

4.4 The XV Instruction: Executing VLIWs

*4.4.1 Executing a VLIW via the XV Instruction*

4.5 Summary of Parameters: f=, e=, d=

*4.5.1 The f= Parameter*
*4.5.2 The e= Parameter*
*4.5.3 The d= Parameter*

4.6 Examples
4.7 Extended Example

5 "Mixed" VLIWs

5.1 Loading Mixed VLIWs
5.2 Setting Slot Status of Mixed VLIWs
5.3 Executing Mixed VLIWs
5.4 Example: Behavior of Mixed VLIWs

6 VLIW Operation in SIMD Mode
7 VLIW Operation in Synchronous-MIMD Mode

7.1 Executing VLIWs in SMIMD Mode
7.2 Loading, Modifying, and Disabling VLIWs in SMIMD Mode

8 Setting Condition Flags within VLIWs

1. Terminology

PEs are referenced with the PE Linear Ordering ID defined in the PEXCHG instruction.

In describing instruction syntax, we have used standard regular expression syntax.

2. Overview

The SP and each PE on the Manta use an Indirect Very Long Instruction Word (iVLIW™) architecture. The iVLIW design allows the programmer to in effect create optimized instructions for specific applications. Using simple 32-bit instruction paths, the programmer can create a "cache" of application-optimized VLIWs in each PE. Using the same 32-bit paths, these iVLIWs are 'triggered' for execution by a single instruction, issued across the array. Thus the ManArray iVLIW architecture avoids traditional VLIW problems that precluded extensions to array processors.

Each iVLIW is composed by loading and concatenating multiple 32-bit simplex instructions in each PE's iVLIW Instruction Memory (VIM), using the LV instruction. Every VIM can contain multiple iVLIWs - one at each VIM address. Each VIM address contains five slots for simplex instructions - one for each execution unit on the PE. (See also VLIW Memory Organization and Control.) When iVLIWs are executed via the XV instruction, all enabled simplex instructions at the specified iVLIW address execute simultaneously, on all unmasked PEs across the array.

Each PE controls loading, modificaton, and execution of iVLIWs locally, as illustrated in Figure 1. iVLIW control includes management of the flow of instructions between the Instruction Bus, the VIM and the execution units.

*Figure 1: Each PE performs iVLIW control locally.*

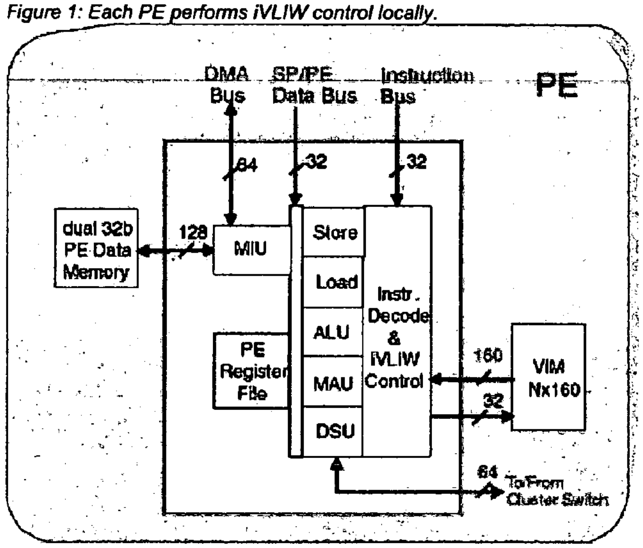

3. VLIW Memory Organization and Control

Each VIM address consists of five 32-bit instruction slots (one per execution unit). Individual instruction slots are loaded via the LV instruction. The instructions that were loaded to VIM remain in their slots until explicitly overwritten via the LV. See also the section on the LV instruction.

Individual instruction slots can be enabled and disabled using the LV or the SETV instruction. When an iVLIW is executed, the instructions in disabled slots don't execute; only the instructions in the enabled slots execute.

In the merged SP/PE0, both PE0 and the SP can address all VIM addresses.

Figure 2 illustrates the VIM organization.

*Figure 2: VIM Organization.*

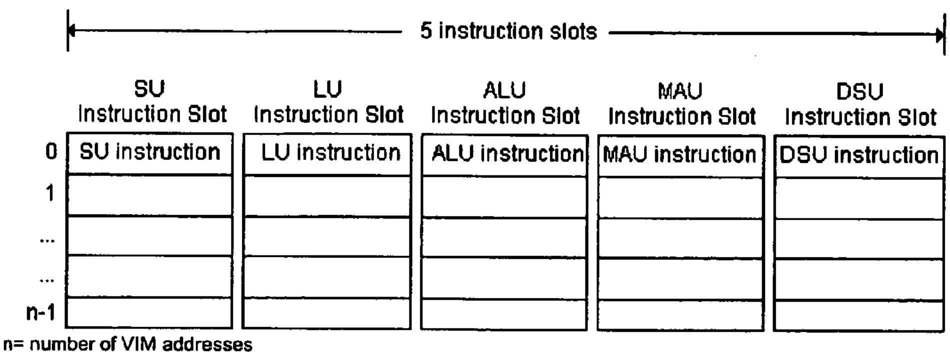

n= number of VIM addresses
SU = Store Unit
LU = Load Unit
ALU = Arithmetic Logic Unit
MAU = Multiplu-Accummulate Unit
DSU = Data Select Unit

4 Instructions for Operating on iVLIWs: LV, SETV, XV

Three instructions control loading, execution and setting the parameters for execution of iVLIWs:

- Load iVLIW (LV)
- Execute iVLIW (XV)
- Set iVLIW State (SETV)

The LV instruction is used to load new instructions into a VIM address, and can be used to disable some instruction slots at that address. The SETV instruction is used to modify the enabled and disabled status of individual slots at a VIM address, without loading new instructions. The XV instruction is used to execute previously loaded iVLIWs from VIM. All three instructions require the use of a VIM base address register. There are SP and PE versions of all three instructions; when the PE version is invoked, all unmasked PEs under the invoking SP's control participate.

All iVLIW instructions take parameters to indicate the status of the iVLIW (for example, to indicate which execution unit will set condition flags (LV, SETV, XV), which execution units are enabled (XV), or which iVLIW slots should be disabled (LV, SETV) ). These parameters will be described later in this chapter, and are also described in the VLIW section of the Instruction Set Architecture.

---

4.1 The VIM Base Address Register

Architecturally, there are two 16-bit VIM base address registers, v0 and v1, in each SP and PE processor. (The actual number available for use may vary from implementation to implementation.) These user-writable registers provide a base VIM address from which the user can offset loads into and executes from VIM. v0 and v1 reside in the Miscellaneous Register VAR; v0 occupies the lower halfword (H0), and v1 occupies the upper halfword (H1). They are initialized to zero upon machine reset.

v0 and v1 can be modified just as any other Miscellaneous Register via a load instruction or copy. To load a value into v0, modify the lower halfword of the register VAR. To load a value into v1, modify the higher halfword of the register VAR.

The syntax of the VLIW instructions requires a VIM base address register as the first parameter. To use v0, specifiy "v0" as the first parameter of the LV, SETV, or XV instruction; to use v1, specify "v1" as the first parameter. When using PE versions of these instructions (LV.p, SETV.p, XV.p), each PE will access its own specified VIM base address register; when using the SP versions (LV.s, SETV.s, XV.s), the specified SP base address register will be used.

By using PE Masking, each PE can have a different value in the VIM base address registers.

*Example 1: Loading and Using a VIM Base Address Register in the PEs.*

```
! This Example is syntactically and logically correct. See key
lim.p.h0 VAR,16               ! load PE VIM base address register v0 (=VAR.h0) in
nop                           ! all unmasked PEs with 16; wait one cycle before
                              ! using v0

lv.p v0, 1, 3, d=slamd, f=a   ! disable all slots at VIM entry 17 (=v0+1) in all
                              ! unmasked PEs & load the following 3 instructions;
                              ! select ALU to set flags (see section 4.2 for
                              ! details on the LV instruction)
    lii.p.w r0, a0+, 4           ! loaded (and disabled)
    fmpy.pm.1fw r6, r1, r23      ! loaded (and disabled)
    fadd.pa.1fw r9, r9, r5       ! loaded (and disabled)
```

---

4.2 The LV Instruction: Loading and Modifying iVLIWs lv.[sp] v[0-1], (0 | 1 | .. | n), [0-5], d=[slamd]*, f=[amd]?

For the value of n, see the Manta datasheet.

VIM entries are loaded and modified via the LV instruction. The LV instruction is a delimiter-only instruction, meaning it identifies the block of 32-bit simplex instructions to be loaded into the specified VIM entry, but does not cause the loaded instructions to be executed. The LV instruction specifies a VIM base address register, supplies a VIM address offset and the number of 32-bit simplex instructions to load; selects which slots (if any) should be disabled (with the d= (Disable) parameter); and identifies which execution unit will, by default, set condition flags upon future execution via the XV instruction (with the f= (Unit Affecting Flags) parameter; but note that this choice can be overridden in the XV instruction itself). For detailed discussion of condition flags, see section 8 and Conditional Execution.

The simplex instructions to be loaded follow immediately after the LV instruction in the program text. The LV instruction executes until the specified number of instructions has been processed. If an instruction not suitable for loading in the VIM (see Table 1) is present, the LV instruction count decrements, but the instruction in question is otherwise ignored.

If the number of simplex instructions following the LV is greater than the number specified for loading, the excess instructions will not be loaded into the VIM entry, but will execute normally.

See the Examples in section 4.6.

*Table 1: Instructions not suitable for loading into VIM.*

| | |
|---|---|
| **JMP** (all forms) | **XV** (.s or .p) |
| **CALL** (all forms) | **EPLOOP** (all forms) |
| **RET** (all forms) | **NOP** |
| **LV** (.s or .p) | **SVC** (all forms) |

4.2.1 Disabling VLIW slots via the LV instruction

Disabling of individual slots in individual VIM entries can be accomplished through the LV instruction by using the d= parameter. Any combination of instruction slots can be specified for disabling, including all slots or none. The contents of the slots designated for disabling are unchanged unless loaded by an instruction following the LV. Slots specified for disabling remain disabled until a subsequent LV or SETV instruction specifies a new status, even if they are loaded in the current LV. Slots which are not specified for disabling are either unaffected, retaining the status they had before the current LV; or they are loaded by a new instruction, in which case they become enabled regardless of their previous status. Example 2 below shows the use of the LV instruction with slot disabling. Slots are disabled during the Execute phase of the pipeline.

Disabling instruction slots is independent of loading instruction slots; a given LV can disable and then load a specified slot, disable it only, load it only, or leave it unaffected. Slots not identified for disabling, and for which no appropriate 32-bit instruction follows for loading, are not affected by the LV instruction. See Table 2.

*Table 2: Ways a VIM instruction slot can be modified by the LV instruction.*

| If the current LV says to: | Then after completion of the LV, the specified slot: |
|---|---|
| disable the specified slot (for example, d=a disables the ALU slot) | retains its original contents and is disabled |
| disable the specified slot, and load an instruction into it (e.g. d=a followed by add.pa.1w R1,R2,R3) | holds the new contents (e.g. add.pa.1w R1,R2,R3) and is disabled |
| load an instruction into the slot (e.g. d=slm followed by add.pa.1w R1,R2,R3) | holds the new contents (e.g. add.pa.1w R1,R2,R3) and is enabled |
| nothing specified for this slot (e.g. d=slm with no ALU instruction following) | retains its original contents and original status |

Programming Tip: To enable and disable slots only, without loading new simplex instructions, use the SETV instruction. See also Example 3.

Disabling of individual instructions within a VIM entry using LV with the d= parameter should not be confused with disabling PEs via PE Masking. Similarly, disabling of individual instructions via the LV with the d= parameter is distinct from enabling execution units via the XV with the e= parameter. An execution unit can be enabled in the XV, contain a valid instruction, and still execute a NOP if the instruction itself has been disabled via the d= parameter of the LV instruction.

*Example 2: Loading a VLIW via the LV Instruction.*

```
! This Example is syntactically and logically correct. See key
lv.p v0, 1, 3, d=slm, f=a      ! disable LU,MAU,SU slots at VIM entry v0+1 in all
unmasked
                               ! PEs & load the following 3 instructions; select ALU
                               ! to set flags
    lii.p.w r0, a0+, 4           ! loaded (and disabled)
    fmpy.pm.1fw r6, r1, r23      ! loaded (and disabled)
```

```
   fadd.pa.1fw r9, r9, r5           ! loaded (and enabled)
   si.p.w r5, a1+, r30              ! not loaded; instead executed immediately

! Now VIM entry v0+1 contains the lii.p.w disabled, the fmpy.pm.1fw disabled, the
fadd.pa.1fw
! enabled, its original DSU contents and status, and its original SU contents disabled.
```

*Figure 3: NP Pipeline Illustration for Example 2.* The top row denotes the Fetch, Pre-Decode, Decode, Execute (phases 1, 2, 3), and Condition Return stages of the pipeline. (See the Pipeline chapter for a description of the pipeline stages for the LV instruction.) In this situation, we are in the NP state, and the Pre-Decode stage is not used. Time progresses from top to bottom; the rightmost column shows the contents of VIM address 1 (in all unmasked PEs) as execution of the LV instruction proceeds. Note that none of the instructions loaded into VIM entry 1 as a result of the LV enter the Execution or Condition Return stages of the pipeline.

*Loading a VLIW via the LV Instruction in NP State.*

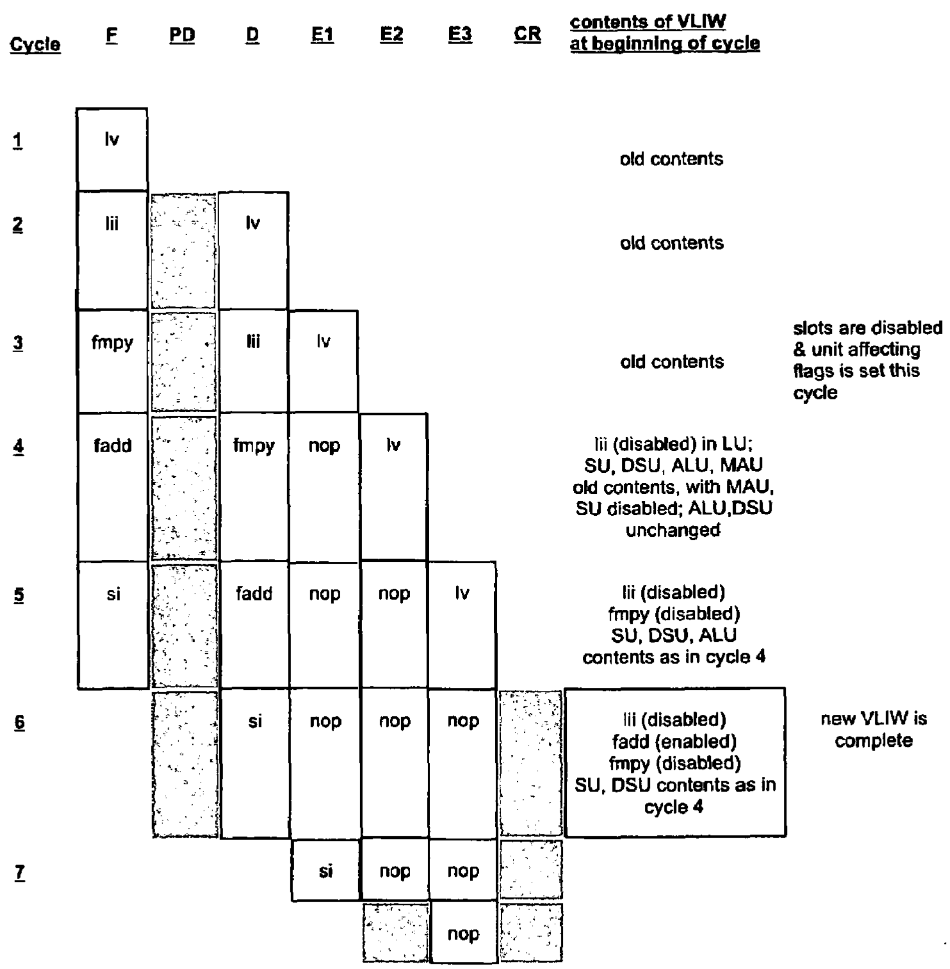

*Figure 4: EP Pipeline Illustration for Example 2.* In this situation, we are in the EP state, and the Pre-Decode stage is used. In the EP state, the first instruction is loaded during the Decode stage, rather than Execute. Otherwise, LV operation is the same as for the normal pipeline. Note that the store instruction now completes execution in cycle 8, not cycle 7 (see the Pipeline chapter for details of store instruction pipeline execution.)

*Loading a VLIW via the LV Instruction in EP State.*

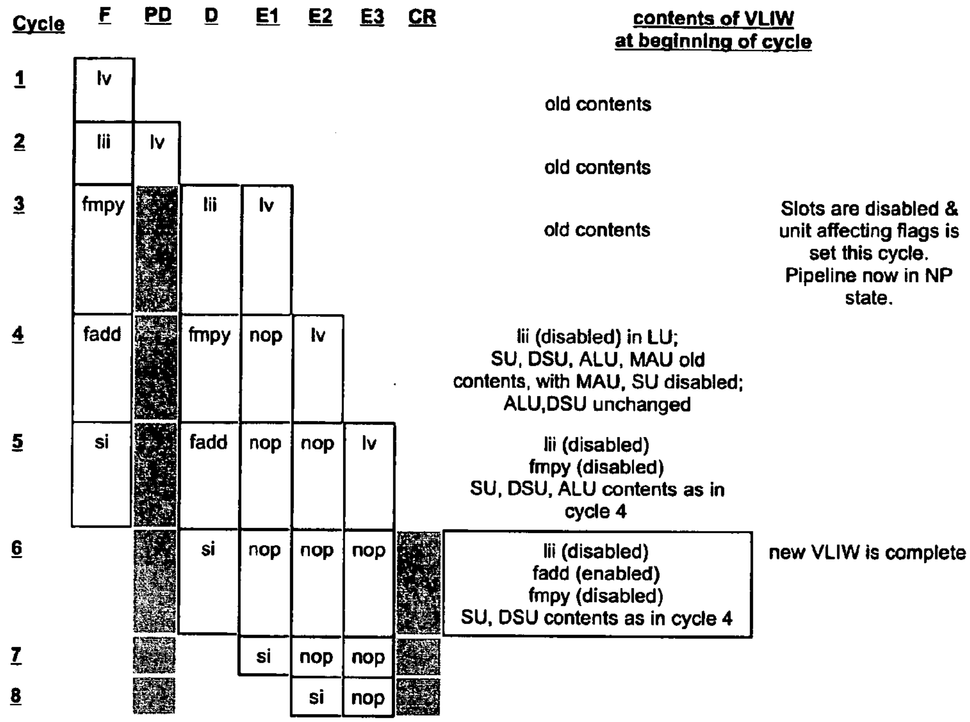

As illustrated in Example 2, not all instruction slots at the target VIM address need to be loaded as part of the LV instruction. Slots not identified for disabling, and for which no appropriate instruction follows for loading, are not affected by the LV instruction.

---

4.2.2 Using the LV Instruction with PE Masking

The LV.p instruction may be executed while one or more PEs are masked. In this case, the specified VIM entry is unaffected in the masked PEs (including SP/PE0 if PE0 is masked). The LV.p instruction executes even if all PEs are masked (making it a multicycle NOP). See the chapter on Processor Registers for a complete description of the SP's SCR1 register. See also PE Masking. See also section 7.2.

The LV.s instruction loads only into the SP/PE0 shared VIM, regardless of the masking status of any PE, including PE0. This means that instructions can be loaded into PE0's VIM even while PE0 is masked.

Restriction: A change to the PE Mask bits in SP SCR1 requires one cycle delay before an LV instruction. It is usually not possible to avoid placing a NOP in this situation between the instruction which modifies SCR1 and the LV instruction. See also PE Masking.

See also the Examples in section 4.6.

---

4.3 The SETV Instruction: Enabling and Disabling Instruction Slots Without Loading New Instructions setv.[sp] v[0-1], (0 | 1 | .. | n), e=[slamd]*, f=[amd]?

The SETV instruction is used when you wish to explicitly enable and disable slots in a VIM entry without loading new instructions. This is useful in situations where instructions for more than one function are stored at the same VIM address: the instructions which operate in the first function (e.g. vector add) are stored in some of the instruction slots (e.g. LU, ALU, and SU), while the instructions which operate in the second function (e.g. vector dot product) are stored in others, perhaps overlapping (e.g. LU, MAU, and DSU). All instructions can be loaded at one time with the LV instruction, and dynamically enabled and disabled as needed via the SETV instruction. (This dynamic enabling and disabling can also, in this particular example, be done via the XV instruction.) The SETV capability is particularly useful for situations where each PE is executing a different function, and therefore slots must be enabled via the XV even though they should not execute in all PEs.

The SETV instruction is similar to the LV instruction in two ways: first, its setting for the f= parameter remains in effect until a subsequent SETV or LV changes it. This is in contrast with the XV instruction, whose setting for the f= parameter endures only during the operation of the XV itself. Second, the SETV instruction does not cause the specified VIM entry to execute.

The SETV instruction syntax differs from the LV instruction syntax in two ways: first, SETV does not load new instructions, and therefore does not contain an instruction count field. Second, enabling and disabling of instruction slots is accomplished via an e= (Enable) parameter.

Functionally, the operation of the e= parameter of the SETV instruction is like that of the XV instruction: slots which are specified for enabling are enabled, and those which are not specified are disabled. Unlike with the XV, however, the enabled / disabled setting of an instruction slot remains in effect until the next SETV or LV changes it.

Note that this enable / disable behavior differs significantly from that of the LV instruction, where slots which are not specified for disabling remain unchanged (unless loaded with a new instruction, in which case they become enabled).

Enabling and disabling of individual instructions within a VIM entry using SETV with the e= parameter should not be confused with disabling PEs via PE Masking. Similarly, disabling of individual instructions via the SETV with the e= parameter is distinct from enabling execution units via the XV with the e= parameter. An execution unit can be enabled in the XV, contain a valid instruction, and still execute a NOP if the instruction itself has been disabled via the e= parameter of the SETV instruction.

*Example 3: Disabling iVLIW slots without loading new instructions.*

```
! This Example is syntactically and logically correct. See key
setv.p v1, 3, e=lam, f=a    ! enable LU, ALU, and MAU slots (and disable SU and DSU
                            ! slots) at VIM entry v1+3 in all enabled
                            ! PEs; select ALU to set flags

lii.p.w r0, a0+, 4          ! not loaded - executed immediately
fmpy.pm.1fw r6, r1, r23     ! not loaded - executed immediately
fadd.pa.1fw r9, r9, r5     ! not loaded - executed immediately
si.p.w r5, a1+, r30         ! not loaded - executed immediately
```

*Figure 5: NP Pipeline Illustration for Example 3.* None of the instructions following the SETV are loaded; all therefore proceed through the Execute and (for those which set flags) Condition Return stages of the pipeline.

*Enabling and disabling VLIW slots without loading new instructions in NP State.*

| Cycle | F | PD | D | E1 | E2 | E3 | CR | contents of VLIW at beginning of cycle | |
|---|---|---|---|---|---|---|---|---|---|
| 1 | setv | | | | | | | old contents | |
| 2 | lii | | setv | | | | | old contents | |
| 3 | fmpy | | lii | setv | | | | old contents | slots are disabled & unit affecting flags is set this cycle |
| 4 | fadd | | fmpy | lii | | | | old contents with LU,ALU,MAU enabled; DSU,SU disabled | SETV is complete |
| 5 | si | | fadd | fmpy | | | | - | |
| 6 | | | si | fadd | fmpy | | | - | |
| 7 | | | | si | fadd | | | - | |
| 8 | | | | | | | fadd | - | |

*Figure 6: EP Pipeline Illustration for Example 3.* As in Example 2, all instructions after the SETV complete one cycle later in the EP State than in the NP State. (Refer to the Pipeline chapter for details of pipeline execution under various instructions.)

*Enabling and disabling VLIW slots without loading new instructions in EP State.*

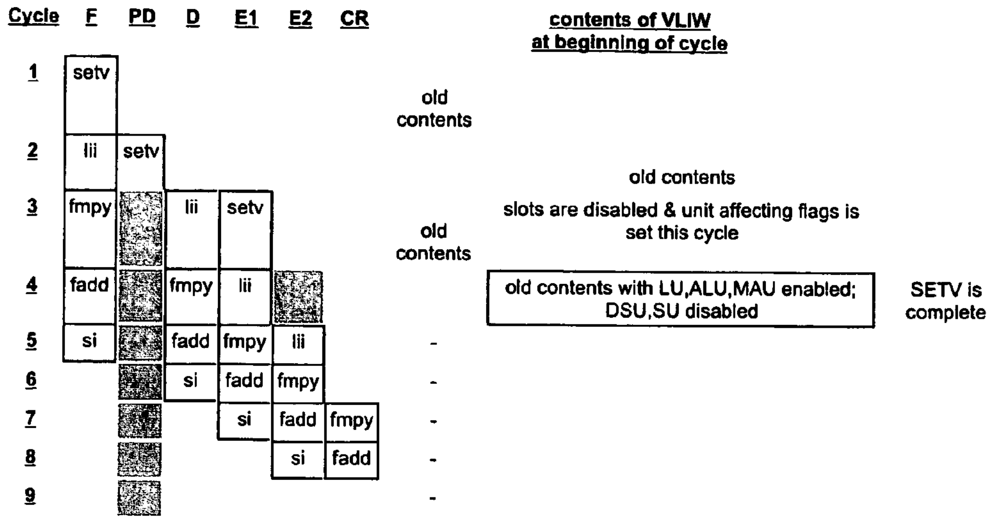

See also the Examples in section 4.6.

Restriction: A SETV instruction cannot be followed by an XV instruction targeting the same VIM address. There must be at least one instruction (or NOP) between the SETV and the XV. This delay is necessary to allow the disabled / enabled status of the slots to be set before being accessed by the XV.

*Example 4: Pipeline restriction on SETV instruction followed by an XV.*

```
! This Example contains an error. See key
setv.p v1, 3, e=lam, f=a    ! enable LU, ALU, and MAU slots (and disable SU and DSU
                            ! slots) at VIM entry v1+3 in all unmasked
                            ! PEs; select ALU to set flags

xv.p v1, 3, e=slamd, f=     ! ERROR - the xv will access VIM entry v1+3 before
                            ! the setv has finished writing to it
```

```
! This Example is syntactically and logically correct. See key
setv.p v1, 3, e=lam, f=a    ! enable LU, ALU, and MAU slots (and disable SU and DSU
                            ! slots) at VIM entry v1+3 in all unmasked
                            ! PEs; select ALU to set flags
lim.s.w R0, 0x80       ! any instruction here will do -- even another setv to
                            ! a different VIM entry
xv.p v1, 3, e=slamd, f=     ! OK - now the setv has time to complete before the xv
                            ! tries to access VIM entry v1+3
```

4.3.1 Using the SETV Instruction with PE Masking

The SETV.p instruction may be executed while one or more PEs are masked. In this case, the specified VIM entry is unaffected in the masked PEs (including SP/PE0 if PE0 is masked). The SETV.p instruction executes even if all PEs are masked (making it a NOP). See the chapter on Processor Registers for a complete description of the SP's SCR1 register. See also PE Masking. See also section 7.2.

The SETV.s instruction affects only the SP/PE0 shared VIM, regardless of the masking status of any PE, including PE0. This means that instruction slot status can be changed in PE0's VIM even while PE0 is masked.

Restriction: A change to the PE Mask bits in SP SCR1 requires one cycle delay before a SETV instruction. It is usually not possible to avoid placing a NOP in this situation between the instruction which modifies SCR1 and the SETV instruction. See also PE Masking.

See also the Examples in section 4.6.

4.4 The XV Instruction: Executing VLIWs xv.[sp] v[0-1], {0 | 1 | .. | n}, e=[slamd]*, f=[amd]?

For the value of *n*, see the Manta datasheet.

Once a set of 32-bit simplex instructions has been loaded into a VIM entry, they can be fetched and sent to the proper execution units via the XV instruction. The XV instruction specifies the VIM address, selects which instruction slots at that address will participate at execution time (with the e= (Enable) parameter), and selects which (if any) unit will affect the condition flags (with the f= (Unit Affecting Flags) parameter, thereby overriding the setting specified during the most recent LV or SETV to the VIM entry). The f= setting, if specified, is valid only for the duration of the current XV, and does not modify the setting stored with the VIM entry. For detailed discussion of condition flags, see section 8 and Conditional Execution.

Disabling of individual instructions via the LV with the d= parameter is distinct from enabling execution units via the XV with the e= parameter. An execution unit can be enabled in the XV, contain a valid instruction, and still execute a NOP if the instruction itself has been disabled via the d= parameter of the LV instruction.

Similarly, disabling and enabling of individual instructions via the SETV with the e= parameter is distinct from disabling and enabling execution units via the XV with the e= parameter. An execution unit can be enabled in the XV, contain a valid instruction, and still execute a NOP if the instruction itself has been disabled via the e= parameter of the SETV instruction.

In order for an instruction in a VLIW to enter the instruction pipeline during operation of an XV, the following criteria must be satisfied: (1) the instruction slot must have been enabled via an LV or SETV; and (2) the execution unit must be enabled in the XV. If either criterion is unmet, the instruction will not execute. (Note that for communications instructions, this means that no sourcing information will be provided, nor will the cluster switch setting be updated, in contrast with the operation under PE Masking and conditional execution, where only the update of processor state is inhibited.)

Restriction: A SETV instruction cannot be immediately followed by an XV instruction targeting the same VIM address. There must be at least one instruction (or NOP) between the SETV and the XV. This delay is necessary to allow the disabled / enabled status of the slots to be set before being accessed by the XV. See Example 4.

4.4.1 Executing a VLIW via the XV Instruction

This example uses the VLIW which was loaded in Example 2. Recall that the SU slot in that example was disabled but not loaded, and the DSU was unaffected, leaving the original contents of those two slots (if any) unchanged. As a result, even though there may be an instruction in the SU slot of the VLIW, and even though the XV instruction enables that slot, it will not execute. The DSU may or may not execute, depending on its original status. The LU and MAU were loaded and disabled in Example 2; consequently, neither instruction will enter the instruction pipeline, even though the XV enables those slots. The ALU was loaded but not disabled; it therefore becomes enabled, and, since it is enabled in the XV, the ALU instruction will execute.

*Example 5: Executing a VLIW via the XV instruction.*

```
! This Example is syntactically correct. See key
xv.p v0, 1,e=slamd,f=        ! execute VLIW at VIM address v0+1 in all unmasked
                             ! PEs; use the stored setting for unit-to-affect-
                             ! flags; all execution units are enabled (though
                             ! some individual instructions have been previously
                             ! disabled via the LV)
```

*Figure 7: EP Pipeline Illustration for Example 5.* The XV instruction can only be executed in the EP state. Note that the XV instruction always completes execution after the Pre-Decode stage of the pipeline. The instructions contained in the VLIW itself proceed through the Decode, Execute, and (possibly) Condition Return stages. The Execute stage may take one or two cycles, depending on the particular instructions contained in the VIM entry being executed. In this example, the DSU instruction (if any) finishes in one execute phase, while the ALU floating point add instruction requires two cycles to complete. Since the ALU is selected to set the condition flags, only the add instruction enters the Condition Return stage of the pipeline. In Example 2, we loaded the load, multiply, and add instructions; there may or may not be previously loaded instructions in the DSU and SU. For this example, we assume that the DSU and SU do contain instructions, and that the DSU had previously been enabled. Note that the load, multiply, and store instructions do not execute. Note also that no change occurs in the VIM entry itself.

*Executing a VLIW via the XV Instruction in EP State.*

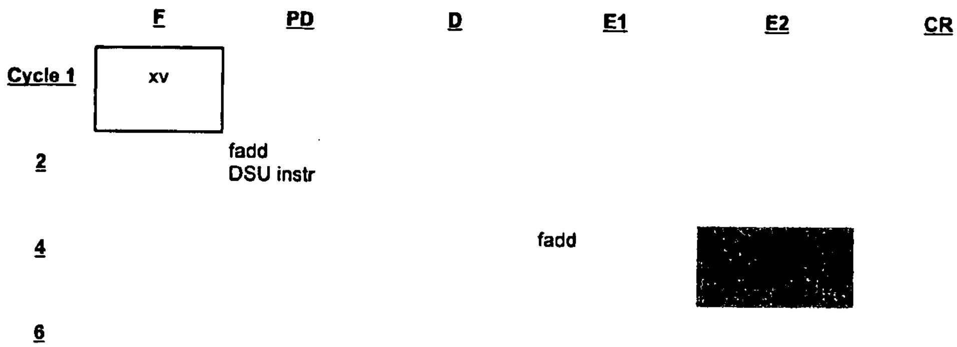
F
PD
D
E1
E2
CR
Cycle 1
xv
2
fadd
DSU instr
4
fadd
6

Instruction Event-Point Looping

BOPS, Inc. Manta SYSSIM 2.31

Table of Contents

1 Introduction
2 Instruction Event-Point Registers

2.1 IEP Registers 2.1.1 IEPxR0
2.1.2 IEPxR1
2.1.3 IEPxR2

2.2 IEP Control Registers 2.2.1 IEPCTL0
2.2.2 IEPCTL1

2.3 IEP Register Addresses

3 Initializing the IEP Registers

3.1 Initializing the IEP Registers via EPLOOPIx and EPLOOPx
3.2 Initializing the EPLoop Control Registers via SSPR

4 General EPLooping Restrictions

1 Introduction

Instruction Event Point Looping™ uses ManArray's Event Point™ architecture to provide program looping functionality for ManArray program control.

ManArray's Event Point architecture allows the programmer to trigger an action (Y) by an event (X), which occurs during the execution of a program, so that

```
when X occurs, Y happens.
```

Using Instruction Event Point Looping to set up a program loop, the programmer defines an Event Point, where event X is a match of a stored instruction address value and the contents of the PC. This stored instruction address value thus defines the start address of the program loop. Action Y is the program loop, which is defined by additional stored values that determine the end address for the loop and the number of times the loop is repeated.

To define an Event Point for an Event-Point Loop, the programmer uses the EPLOOPx/EPLOOPIx or SSPR instructions to store the values that define the Event-Point loop to the Instruction Event-Point and Event-Point Control registers.

NOTE: Instruction Event Point Looping™ and Event Point™ are BOPS Trademarks.

2 Instruction Event-Point Registers

The Instruction Event-Point registers are six sets of three 32-bit ExtInt registers, and two 32-bit ExtInt control registers (see Table 1). Each set of three registers plus an 8-bit control value in one of the Instruction Event-Point Control registers is used to store the values that define an Instruction Event Point when used to set up an instruction loop. All ExtInt registers are in the Special Purpose Register (SPR) space.

Table 1: The Instruction Event-Point (ExtInt) Registers:

| | Contents | Instruction Event Point 0 | Instruction Event Point 1 | Instruction Event Point 2 | Instruction Event Point 3 | Instruction Event Point 4 | Instruction Event Point 5 |
|---|---|---|---|---|---|---|---|
| ExtInt registers | EPLoop End Address | IEP0R0 | IEP1R0 | IEP2R0 | IEP3R0 | IEP4R0 | IEP5R0 |
| | EPLoop Start Address | IEP0R1 | IEP1R1 | IEP2R1 | IEP3R1 | IEP4R1 | IEP5R1 |
| | EPLoop Counter EPLoop Reload Value | IEP0R2 | IEP1R2 | IEP2R2 | IEP3R2 | IEP4R2 | IEP5R2 |

| IEP Control registers | Eight Control Bits per Event Point | IEPCTL0 | IEPCTL1 |
|---|---|---|---|

For Instruction Event-Point Looping, IEPxR1 contains the start address of the program loop, and IEPxR0 contains the end address of the program loop. IEPxR2 is a counter register; IEPxR2.H1 contains the EPLoop Reload Value; IEPxR2.H0 contains the EPLoop Counter. When the PC reaches the start address of the program loop,and the EPLoop Counter is non-zero, execution proceeds with the next sequential instruction. If the EPLoop Counter is zero, the body of the EPLoop is skipped and execution proceeds with the next sequential instruction after the end address (IEPxR0). While an EPLoop is active (EPLoop Counter > 0) each instruction address is compared to the EPLoop end address (IEPxR0). When there is a match and EPLoop Counter > 1, PC is set to the EPLoop start address (IEPxR1) and the EPLoop Counter is decremented. When there is a match and EPLoop Counter = 1, the EPLoop Counter is loaded with the EPLoop Reload Value (IEPxR2.H1) and the program loop is exited.

---

2.1 IEP Registers

2.1.1 IEPxR0

See the Instruction Event-Point Registers section in the Special Purpose Register definitions.

2.1.2 IEPxR1

See the Instruction Event-Point Registers section in the Special Purpose Register definitions.

2.1.3 IEPxR2

See the Instruction Event-Point Registers section in the Special Purpose Register definitions.

---

2.2 IEP Control Registers

The following control registers specify options associated with each event point
(8 bits per event point):

2.2.1 IEPCTL0

See the Instruction Event-Point Registers section in the Special Purpose Register definitions.

2.2.2 IEPCTL1

See the Instruction Event-Point Registers section in the Special Purpose Register definitions.

---

2.3 IEP Register Addresses

See the System Address Map section in the Memory Map chapter.

3 Initializing the IEP Registers

The IEP registers are initialized via EPLOOPx and EPLOOPIx, or via SSPR. EPLOOPIx and EPLOOPx are used when the body of the program loop starts with the next sequential instruction (i.e. the instruction immediately following EPLOOPIx or EPLOOPx in the program). Consequently, these instructions are primarily used to set up non-nested program loops.

SSPR is used when the body of the program loop does not start with the next sequential instruction (i.e. the program requires the EPLoop to be set up in advance).

3.1 Initializing the IEP Registers via EPLOOPIx and EPLOOPx

EPLOOPIx and EPLOOPx are used to set up program loops that start with the next sequential instruction.

EPLOOPIx and EPLOOPx load the IEPxR1 with the address of the first instruction in a program loop and IEPxR0 with the address of the last instruction in a program loop. The address loaded in the IEPxR1 is the address of the instruction immediately following EPLOOPIx or EPLOOPx in the program. The address loaded in the IEPxR0 is calculated using PC-relative addressing.

In addition, EPLOOPIx initializes the EPLoop Counter in IEPxR2.H0. When EPLOOPIx is executed, a 10-bit EPLoop count value (between 0 and 1023) contained in the instruction word is zero-extended to 16-bits and loaded in the EPLoop Counter (the EPLoop Reload Value, however, is not affected by EPLOOPIx). A non-zero value loaded in the EPLoop Counter enables the EPLoop mechanism. Otherwise, loading the EPLoop Counter with zero results in the EPLOOPIx (or EPLOOPx) instruction performing a branch to the instruction immediately following the end of the EPLoop, causing the body of the program loop to be skipped.

EPLOOPx does not affect the contents of the EPLoop Counter (IEPxR2.H0). When EPLOOPx is used to set up a program loop, the EPLoop Counter must first be loaded with a non-zero value via SSPR, to enable the EPLoop mechanism.

See also the instruction descriptions of EPLOOPIx and EPLOOPx for additional details and examples.

The "x" in EPLOOPx and EPLOOPIx can be 0, 1, 2, or 3.

3.2 Initializing the EPLoop Control Registers via SSPR

SSPR is used to set up program loops that do not start with the next sequential instruction. When nesting two program EPLoops, SSPR's can be used to set up the inner EPLoop's start and end addresses (IEPxR1 and IEPxR0), EPLoop Counter (IEPxR2.H0), and EPLoop Reload Value (IEPxR2.H1), in advance. Note: Since the EPLoop Reload Value is automatically copied into the EPLoop counter when the end of a EPLoop is reached, loading the EPLoop Reload Value with the proper EPLoop count allows the EPLoop mechanism to be re-enabled for the next time the EPLoop is entered.

NOTE: If the start or/and end addresses of nested EPLoops are identical, the outer EPLoop has to use a higher-numbered IEPx than the inner EPLoop.

4 General EPLooping Restrictions

The following restrictions apply to all EPLoops in general, regardless of the number of instructions in the EPLoop:

The last two instructions in an EPLoop cannot be one of the following:

```
CALL     JMP     LV        RET
CALLcc   JMPcc   EPLOOPx   RETcc
CALLD    JMPD    EPLOOPIx  RETI
CALLDcc  JMPDcc  SYSCALL   RETIcc
CALLI    JMPI
CALLIcc  JMPIcc
```

Data Communication Instructions

BOPS, Inc. Manta SYSSIM 2.31

Table of Contents

1 Introduction
2 Load Broadcast Instructions, LBRx

2.1 Effects of PE Masking

3 Cluster Switch Instructions

3.1 PE Exchange, PEXCHG
3.2 SP Receive, SPRECV
3.3 SP Send, SPSEND
3.4 Effects of PE Masking

4 General Operation of Data Communication Instructions

4.1 The SP in the Operation of Data Communication Instructions
4.2 VLIWs and Data Communication Instructions

1 Introduction

Data Communication instructions are instructions where the source register/memory and the the target register(s) reside on different processors within the array. Thus, these instructions are used to communicate data between PEs and/or SPs. These are the supported Data Communication instructions:

- Load Broadcast (LU) (LBRI, LBRII, LBRIU, LBRIUI, LBRMX, LBRMXU, LBRTBL)
- Cluster-Switch Instructions: (DSU)
    - SP Send (SPSEND)
    - SP Receive (SPRECV)
    - PE Exchange (PEXCHG)

In the LBRx and SPSEND instructions, data is flowing from an SP to PE(s). In SPRECV, data is received into an SP register from a PE register. In PEXCHG, data is received into a PE's target register from any PE's source register.

The cluster-switch instructions execute on the DSU and communicate data across the array using the ManArray cluster switch. The LBRx instructions execute on the LU and use a seperate broadcast bus to communicate data across the array.

2 Load Broadcast Instructions, LBRx

The LBRx instructions execute on the LU and broadcast data to each PE along a separate dedicated broadcast bus (see figure below).

Figure 1: 2x2 Load Broadcast Instruction Data Path

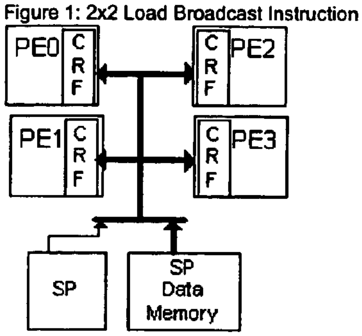

General form of Load Broadcast instructions:

`LBRxx Rt, As ±, index`

The target register(s), Rt, is located in the receiving PE, and the source data is from the SP memory location indicated by the array controlling SP's source address register, As.

The LBRx family of instructions uses an SP address register to identify a data location in SP local memory. Data read from the SP memory location is broadcast to the array via a separate SP-to-Array data bus, and then is written into target PE register files.

2.1 Effects of PE Masking

The only effect of PE masking on executing LBRx instructions is that a masked PE is not able to update its target register with the value received from the SP to array data bus.

3 Cluster Switch Instructions

The cluster-switch instructions execute on the DSU and communicate data across the array using the ManArray cluster switch.

General form for cluster-switch instructions:

```
INSTRUCTION Rt, Rs, <CSctrl>
```

The operands of a cluster switch instruction determine the three critical parameters for each PE that receives the instruction:

- Based on the setting of CSctrl each PE that contains a target register generates mux controls for the cluster switch that determine from which out port it reads the data for its target register.
- Based on the Rt operand, each PE selects the CRF target register which is updated with the data read from its in port
- Based on the Rs operand, each PE designates a CRF source register and makes it available on the out port

3.1 The ManArray Cluster Switch

The cluster switch is an array of muxes and ports that connect each PE. Within the cluster switch, each PE is connected to and controls one of the muxes. The cluster-switch controls are determined by the instruction the PE receives. When a PE receives a cluster-switch instruction, it controls its mux in the cluster switch by combining the CSctrl field of the instruction with its PID. These controls are not state information, and are not saved.

Each processor can both receive data and make data available to other processors in each instruction cycle.

Figure 3.1-1: Cluster Switch Configuration in a 2x2 cluster:

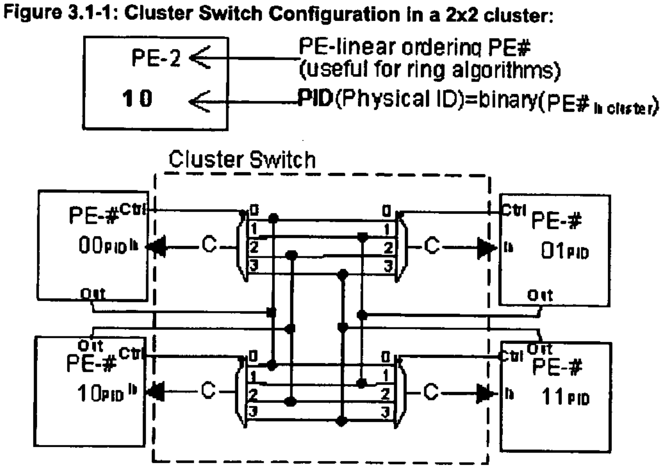

C is the internal data path within a Cluster

Figure 3.1-2: Individual PE Cluster Switch

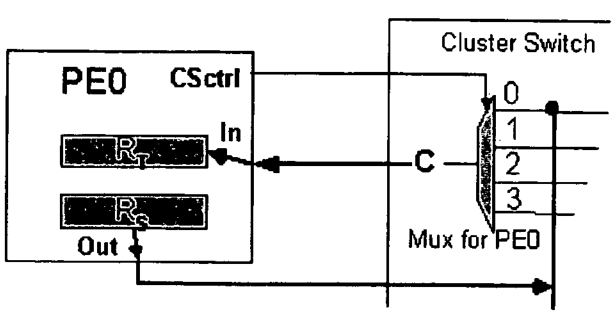

3.1 PE Exchange, PEXCHG

PEXCHG is used for the transfer of data between PEs. Each PE that executes PEXCHG, makes a source register value available on the OUT port, controls its mux in the cluster switch, and updates a target register with a value from the IN port.

In the figure below, the registers are highlighted in a cluster executing `PEXCHG.PD.W Rt, Rs, 2x2SWP0`. This instruction establishes a Communication data exchange between PE0 and PE1, and between PE2 and PE3

Figure 3.1-1: `PEXCHG.PD.W Rt, Rs, 2x2SWP0`: Cluster Switch with Source and Target Registers

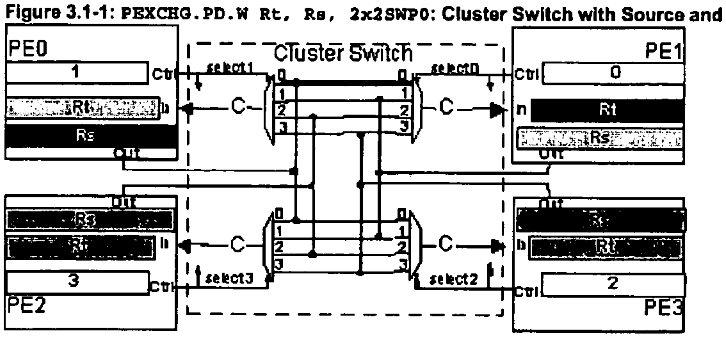

PE1 Rt ←PE0 Rs
PE1 provides a source register, Rs, and receives data into its target register, Rt, from the source register designated in PE0. The setting of PEXCHGCSctrl to *2x2SWP0* in the instruction causes PE1 to switch the mux to 0, which makes PE0's source register available to PE1, via PE0's OUT port.
PE0 Rt←PE1 Rs
PE3 Rt←PE2 Rs
PE2 Rt ←PE3 Rs The CSctrl operand of this instruction is set to *2x2SWP0*. This encoding tells each PE which mux controls to generate for its mux in the cluster switch:

- PE1: select 0
- PE0: select 1
- PE3: select 2
- PE2: select 3

These mux controls in the cluster switch determine from which cluster switch path the PE is to read data from its single IN port.

The "sourcing" PE may execute a PEXCHG itself, or it may execute another Cluster Switch instruction that also makes a source register available. See the section on Synchronous MIMD for more details.

3.2 SP Receive, SPRECV

An SPRECV instruction updates a target register in the SP CRF with a source register from one of the PE registers. This instruction is executed as a PE instruction because PE0 controls its mux in the cluster switch on behalf of the SP in order to determine from which cluster switch path it reads the data for the SPs target register.

During an SPRECV instruction, controls are generated only for the PE0 mux in the cluster switch, and only the designated PE makes a source register available.

3.3 SP Send, SPSEND

The SP source register is made available on PE0's OUT port. All PEs generate a *0* as control for the cluster switch; as if the were executing a PEXCHG Rt, Rs, 2x2_PE0. Each PE designates its own target register in its local SPSEND instruction. No PE except SP/PE0 make a source value available on the OUT port.

3.4 Effects of PE Masking

The only effect of PE masking on executing Cluster Switch Instructions is that a masked PE does not update its target register with the value received from the cross cluster switch bus. All other actions, including changing of cluster switch settings, and placing source register values on the cluster switch bus, takes place as if the PE were not masked.

4 General Operation of Data Communication Instructions

When a data communication instruction is issued, all processors on the ManArray receive the same instruction and execute it. The source of data is specified by the instruction in the processor providing the source; The target of the data is specified by the instruction in the target processor.

A processor that receives a data communication instruction combines encoded information from that instruction with its PID. Only that combination determines whether that processor provides a source register or a target register or both for the operation.

If the processor determines that it provides a source register for that operation, it makes the source register value available on its OUT port. In the case of cluster switch instructions, the source value is available via the cluster switch. In the case of LBRx, the SP makes the value available via the Load Broadcast Data Path. If the processor determines that it provides a target register for that operation, it either 1. (cluster switch instructions) uses the cluster switch to access the value from the specified source processor's OUT port,
2. (LBRx instructions) gets the value the SP makes available via the Load Broadcast Data Path.

Once the processor determines where to get the source value, it places that value in its target register. That target register is always a local register on that processor.

Example: all four PEs receive the instruction `lbrii.p.w R0, A1+, 1`, which causes:

1. the source register A1 in the SP to be read, providing an address into Sequence Processor memory;
2. the word at that SP memory address to be broadcast along the LBR broadcast bus and loaded into all PEs' target register R0, and
3. the value in SP register A1 to be updated by 4 bytes (= 1 word).

In this example, the SP has no access to any of the target registers. It merely provides the source register value to the Load Broadcast Data Path. From there, the PEs place the value into their local target registers.

4.1 The SP in the Operation of Data Communication Instructions

The instruction received by SP/PE0 determines the source and target for data transferred from or to the SP.

For SPSEND and SPRECV, the SP controls PE0's cluster switch.

4.2 iVLIWs and Data Communication Instructions iVLIW execution of Data Communication Instructions must use `XV.P`, not `XV.S`, if any PEs other than PE0 will participate.

During execution of iVLIWs that contains data communication instructions, all processors necessary for the data communication instruction operations have to receive the instruction and execute it. in order for the operation to produce meaningful results. An `xv.s` accesses the designated VLIW in SP/PE0 VIM; an `xv.p` accesses the designated iVLIW in all VIMs. (see the chapter on iVLIWs)

Floating Point Operations, Saturation and Overflow:

BOPS, Inc. Manta SYSSIM 2.31

ManArray Floating Point operations is a subset of IEEE 754 (1) basic 32 bit format single precision floating point standard, as follows:

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| S | Exponent | | | | | | | | Fraction | | | | | | | | | | | | | | | | | | | | | | |
| | MSB | | | | | | | LSB | MSB | | | | | | | | | | | | | | | | | | | | | | LSB |

Where:

> S = 0 = positive value, 1 = negative value.
> Exponent = exponent value biased by +127 such that e = E +127
> Fraction = fractional value
> *precision* = 24 bits
> MSB = Most Significant Bit
> LSB = Least Significant Bit and:

| | value | represents in *exponent* |
|---|---|---|
| $E_{max}$ | 127 | 1111 1110 |
| $E_{min}$ | -126 | 0000 0001 |
| $E_{max}$ +1 | | 1111 1111 |
| $E_{min}$ – 1 | | 0000 0000 |
| Exponent bias | 127 | |

The IEEE 754 Basic Standard provides for the following representations:

| Sign | Exponent, e | Fraction | Represents IEEE | ManArray output results | CNVZ Flags |
|---|---|---|---|---|---|
| s = 0 | e = $E_{min}$ -1 | $f$ = 0 | +0 | +0 | Z=1,N=0 |
| s = 1 | e = $E_{min}$-1 | $f$= 0 | -0 | Flushed to +0 (s=0) | Z=1,N=0 |
| — | e =$E_{min}$-1 | $f$≠ 0 | $\pm 0.f \times 2^{Emin}$ | Flushed to +0 (s=0) | Z=1,N=0 |
| — | $E_{min} \geq e \geq E_{max}$ | — | $1.f \times 2^{e-127}$ | $1.f \times 2^{e-127}$ | N=s |
| — | e = $E_{max+1}$ | $f$ = 0 | ±∞ | Clamped to $\pm 1.f_{max} \times 2^{Emax}$ | V=1,N=s |
| — | e = $E_{max+1}$ | $f \neq 0$ | NaN | Clamped to $\pm 1.f_{max} \times 2^{Emax}$ | V=1,N=s |

Values in emphasized fields are allowed by IEEE 754 but are not produced by ManArray. The equivalent ManArray values are shown in the right column.

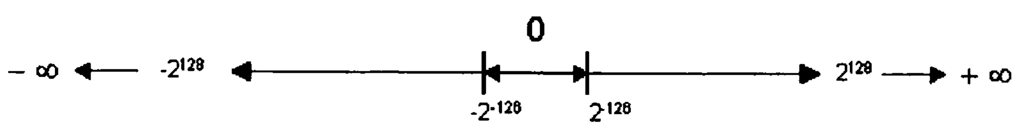

The ManArray Floating Point Instructions will produce results compatible with the IEEE 754 standard. ManArray floating point operations produce output within a range of $-2^{128} < \text{value} < +2^{128}$. ManArray floating point values approach zero such that the smallest non-zero positive value produced is $2^{-126}$, the largest negative value is $-2^{-126}$. Positive and Negative infinity, "Not a Numbers", negative zero representations, and non-normalized fractional values will not be produced (see table above). Source registers are assumed to be in IEEE 754 floating point compatible format. ManArray floating point functions are further defined as follows:

> ManArray currently supports only "round to nearest even" (RNE), the IEEE 754 default rounding mode (2).

Floating point operations that produce overflows (or underflows) are clamped to the maximum (or negative minimum) representative value and will set the arithmetic "V" flag to 1. NaNs and infinities will be clamped as overflows before being written to target registers.

All results with a magnitude smaller than the smallest representative value (smaller than a positive value of $2^{-126}$or larger than a value of $-2^{-126}$) are flushed to zero, and any zero value result will be positive (Arithmetic "N" flag = 0, arithmetic "Z" flag = 1). Negative zero results will not be produced.

Comparisons between floating point numbers that produce a difference with a magnitude smaller than the smallest representative value will be unordered, the difference will be flushed to zero producing an "Equal = true" result.

No exceptions are generated as a result of floating point instructions.

The table below gives examples of floating point binary representations allowed under the IEEE 754 standard and as source inputs to ManArray floating point operations, and their effective result values if they had been produced by the ManArray implementation.

Floating Point Format:

| Sign | Exponent | Fraction | represents | value => ManArray result |
|---|---|---|---|---|
| 0 | 1111 1110 | 1111 1111 1111 1111 1111 111 | most positive | $+1.9999..x\ 2^{127}$ |
| 1 | 1111 1110 | 1111 1111 1111 1111 1111 111 | most negative | $-1.9999..x2^{127}$ |
| 0 | 0000 0001 | 0000 0000 0000 0000 0000 000 | least positive | $+1.0\ x\ 2^{-126}$ |
| 1 | 0000 0001 | 0000 0000 0000 0000 0000 000 | least negative | $-1.0\ x\ 2^{-126}$ |
| 0 | 0000 0000 | 0000 0000 0000 0000 0000 000 | Positive zero | +0 |
| 1 | 0000 0000 | 0000 0000 0000 0000 0000 000 | Negative zero | - 0 => +0 |
| 0 | 0000 0000 | 0000 0000 1001 1110 0000 001 | Non-normalized | $+2^{-126} > v > +2^{-150}$ => +0 |
| 1 | 0000 0000 | 0000 0000 1001 1110 0000 001 | Non-normalized | $-2^{-126} > v > -2^{-150}$ => +0 |
| 0 | 0000 0000 | 0000 0000 0000 0000 0000 001 | least positive Non-normalized | $+2^{-149}$ => +0 |
| 1 | 0000 0000 | 0000 0000 0000 0000 0000 001 | least negative Non-normalized | $-2^{-149}$ => +0 |
| 0 | 1111 1111 | 0000 1111 0000 1111 0000 111 | Not A Number | NaN => $+1.9999..x\ 2^{127}$ |
| 1 | 1111 1111 | 0000 1111 0000 1111 0000 111 | Not A Number | NaN => $-1.9999..x\ 2^{127}$ |
| 0 | 1111 1111 | 0000 0000 0000 0000 0000 000 | Positive Infinity | $+\infty$ => $+1.9999..x\ 2^{127}$ |
| 1 | 1111 1111 | 0000 0000 0000 0000 0000 000 | Negative Infinity | $-\infty$ => $-1.9999..x\ 2^{127}$ |

Values in emphasized fields are allowed by IEEE 754 but are not produced by ManArray. The equivalent ManArray values are shown in the right column.

Operations with NAN and Infinity Floating point source inputs will always set the arithmetic "V" flag to 1, and produce either Maximum Positive ($+1.9999..x\ 2^{127}$), Least Negative ($-1.9999..x2^{127}$), or positive zero output values (See tables below). Any source value whose exponent field consists of all zeros, including non-normalized values, will produce results as if that source value were equal to positive zero. Non-normalized values produced as the result of floating point operations are converted to positive zero as shown in the table above if greater than the most positive, greater that the least negative but less than the least positive, or less than the most negative.

Please see the floating-point instruction descriptions below for additional information about floating-point operations with NAN and Infinity values.

- FADD (Floating-Point Addition),
- FSUB (Floating-Point Subtraction),
- FMPY (Floating-Point Multiplication),
- FDIV (Floating-Point Division),
- FRCP (Floating-Point Reciprocal),
- FSQRT (Floating-Point Square Root)

- FRSQRT (Floating-Point Reciprocal Square Root).

---

1) ANSI/IEEE Standard 754-1985, IEEE Standard for Binary Floating-Point Arithmetic, © 1985 by The Institute of Electrical and Electronics Engineers, Inc. , New York, NY.

2) Note that when operating on two floating point numbers, the result is usually a number that cannot be exactly represented by another floating point number. For example, in a floating point system using base 10 and two significant digits, 6.1 x 0.5 = 3.05. This needs to be rounded to two digits. Should it be rounded to 3.0 or 3.1? In the IEEE standard, such halfway cases are rounded to the number whose low order digit is even. That is down to 3.0, not up to 3.1. In the problem 6.3 x 0.5 = 3.15, the result would be rounded up to 3.2, the nearest *even*, not down to 3.1. The IEEE standard has four rounding modes. The default is "round to nearest even (RNE)" as just explained. The other modes are round toward 0 (or truncate), round toward +∞ (or ceiling), and round to - ∞ (or floor). From Computer Architecture A Quantitative Approach (2nd Ed.) by David A. Patterson and John L. Hennessy, © 1990, 1996 by Morgan Kaufmann Publishers, Inc. Page A-14.

---

Saturated Arithmetic

The Manta supports fixed-point saturated arithmetic. Saturation is used for algorithms in which it is necessary to clamp overflowing results to a high or low value.

The following tables summarize when saturation occurs and what values result from saturation.

Table of Contents

When to Saturate
The Saturation Mode
Asymmetric Mode Saturation Values

When to Saturate

| | |
|---|---|
| Unsigned Add | If carry occurs (C=1) saturate to maximum limit |
| Unsigned Subtract | If carry does not occur (C=0) saturate to minimum limit |
| Signed Add | If overflow occurs (V=1) and both sources are positive, saturate to maximum limit<br>If overflow occurs (V=1) and both sources are negative, saturate to minimum limit |
| Signed Subtract (A - B) | If overflow occurs (V=1) and A is negative, B is positive, saturate to minimum limit<br>If overflow occurs (V=1) and A is positive, B is negative, saturate to maximum limit |

The Saturation Mode

The Manta supports asymmetric saturation. Asymmetric saturation saturates the negative value to a number which is an absolute value of one greater than the positive value, for instance -128 and +127 for sign bytes.

The Saturation Mode Bit (SymmSat) in SCR0 determines the saturation mode.

Saturation Values

| | Data Format | | Hex Limits | | Decimal Limits | |
|---|---|---|---|---|---|---|
| | Size | Bits | Min INT | Max INT | Min INT | Max INT |
| Unsigned | Byte | 8 | 0x00 | 0xFF | 0 | 255 |
| | Halfword | 16 | 0x0000 | 0xFFFF | 0 | 65535 |
| | Word | 32 | 0x00000000 | 0xFFFFFFFF | 0 | 4,294,967,295 |
| | Doubleword | 64 | 0x00000000 00000000 | 0xFFFFFFFF FFFFFFFF | 0 | $2^{64}$-1 |
| Signed | Byte | 8 | 0x80 | 0x7F | -128 | 127 |
| | Halfword | 16 | 0x8000 | 0x7FFF | -32768 | 32767 |
| | Word | 32 | 0x80000000 | 0x7FFFFFFF | -2,147,483,648 | 2,147,483,647 |
| | Doubleword | 64 | 0x80000000 00000000 | 0x7FFFFFFF FFFFFFFF | $-2^{63}$ | $2^{63}$-1 |

Complex Multiplication and Rounding BOPS, Inc. Manta SYSSIM 2.31

Let *x* be one of the intermediate words that is reduced to the final result . We assume that *x* consists of two fields, the *fractional* field *f* containing the 15 least significant bits of the word and the *integral* field *i* containing the rest (17) most significant bits.(2) For the divide-by-2 variants, the field lengths are 16 bits each. Since the numbers that are held in *x* are in two's complement encoding, a direct interpretation of the bits contained in the fields above, will not be correct.

The final result always receives the integral part of the word modified by an action that takes place with respect to the rounding mode, the integral and the fractional field. The action, in form of decimal operations is as follows:

| Example: x=-23,4375 i=-23 f=,4375 | FFE89000 | When divided by $2^{16}$ = -23.4375 |
|---|---|---|
| $TRUNC(x,i,f) = i$ | FFE9 | -23 |
| $CEIL(x,i,f) = \begin{cases} i+1 \Leftarrow f \neq 0 \wedge x > 0 \\ i \end{cases}$ | FFE9 | -23 |
| $FLOOR(x,i,f) = \begin{cases} i-1 \Leftarrow f \neq 0 \wedge x < 0 \\ i \end{cases}$ | FFE8 | -24 |
| $ROUND(x,i,f) = \begin{cases} i+1 \Leftarrow f \geq \frac{1}{2} \wedge x > 0 \\ i-1 \Leftarrow f \geq \frac{1}{2} \wedge x < 0 \\ i \end{cases}$ | FFE9 | -23 |

Note that the formulae above work correctly when the quantities *x, i, f* are decimal numbers. For a direct implementation addressing *x* as a two's complement binary number, please see "Implementation of Rounding for Fixed Point Arithmetic" which can be obtained by contacting BOPS, Inc. (info@bops.com).

---

(1) Specific processor models may implement a subset of these four rounding modes.

(2) For the calculation of the complex multiplication we first multiply two signed 16 bit numbers. The result is a 31 bit signed number. Then we add/subtract two 31 bit numbers, with a result that is a 32 bit signed number. Note that the returned value to the half word contains the 16 least significant bits of the integral field. The most significant bit of the integral field together with the overflow bit are used to determine the overflow for that half word. An overflow scenario is the following: assume that the complex arguments contain the maximum allowable value for their fields. Then the complex conjugate multiplication results in an overflow since it is not representable in the 32-bit result format.

Back to previous page

Instruction Pipeline

BOPS, Inc. Manta SYSSIM 2.31

This document describes the instruction pipeline and provides examples showing how the pipeline operates while processing different types of instructions.

Table of Contents

1 Pipeline Operation
2 Pipeline Stages

2.1 Program Flow Control Unit Registers 2.1.1 Fetch Program Counter Register
2.1.2 Decode Program Counter Register
2.1.3 Execute Program Counter Register 2.2 The Fetch (F) Stage
2.3 The Pre-Decode (PD) Stage
2.4 The Decode (D) Stage
2.5 The Execute (EX) Stage
2.6 The Condition-Return (CR) Stage

3 Pipeline Instruction Flow Summary
4 Pipeline Operation Examples

4.1 Integer Arithmetic/Logical Instructions
4.2 Load-Address Instructions
4.3 Load-Immediate Instructions using an Address Register
4.4 Load-Immediate Instructions using a Compute Register
4.5 Memory Load Instructions 4.5.1 Avoiding a pipeline conflict caused by a memory load instruction 4.6 Memory Store Instructions
4.7 Unconditional Jump Instructions 4.7.1 Resolved pipeline conflict caused by an unconditional jump instruction 4.8 Conditional Jump Instructions 4.8.1 Resolved pipeline conflict caused by a conditional jump instruction 4.9 Unconditional Call Instructions 4.9.1 Resolved pipeline conflict caused by an unconditional call instruction 4.10 Conditional Call Instructions 4.10.1 Resolved pipeline conflict caused by a conditional call instruction 4.11 Unconditional Return-from-Call Instructions 4.11.1 Resolved pipeline conflict caused by an unconditional return instruction 4.12 Conditional Return-from-Call Instructions 4.12.1 Resolved pipeline conflict caused by a conditional return instruction 4.13 Event-Point Loop Control Instructions
4.14 Load-VLIW (LV) Instruction
4.15 Execute-VLIW (XV) Instruction

5 State Transitions between the Instruction-Processing States

5.1 Transition from the NP State to the EP State
5.2 Transition from the EP State to the NP State

6 Pipeline Stalls

6.1 Long Program Fetch
6.2 Hold-Everything
6.3 Program Re-Fetch

1 Pipeline Operation

The pipeline is always operating in one of two Instruction-Processing States:

- The Normal Pipeline (NP) State
- The Extended Pipeline (EP) State

The NP State is associated with the execution of non-VLIW instructions only. While operating in this state, the pipeline is divided into four stages: *fetch*, *decode*, *execute*, and *condition-return*.

The EP State is associated primarily with the execution of VLIWs. While operating in this state, the pipeline is divided into five stages: *fetch*, *pre-decode*, *decode*, *execute*, and *condition-return*.

State transitions between the NP and EP states are described in Section 5 State Transitions between the Instruction-Processing States.

2 Pipeline Stages

2.1 Program Flow Control Unit Registers

The PFCU contains three registers used in the controlling the program flow: the Fetch Program Counter (FPC), the Decode Program Counter (DPC), and the Execute Program Counter (XPC). These registers are hidden and cannot be accessed via software. Also contained in the FPCU is the User Link Register (ULR). The ULR contains the return target address after a call operation and may be accessed via PE load and store instructions.

2.1.1 Fetch Program Counter Register

The Fetch Program Counter register (FPC) contains the address of the instruction currently being fetched. Once an instruction has been successfully fetched, the FPC is typically updated with the address of the next sequential instruction in the program, or with the address of a new location in the program resulting from a branch operation, or a single-or multiple-instruction program loop. The FPC can also be updated with the address of a new location in the program resulting from an interrupt. The FPC register is shown in Figure 7-1 below.

When updated as a result of a branch operation, the FPC is loaded with the instruction address that results from an effective address calculation, or the contents of a link register. Branch operations that cause the FPC to be loaded with the instruction address that results from an effective address calculation include jumps and calls. Branch operations that cause the FPC to be loaded with the contents of a link register include traps and returns.

When updated as a result of an interrupt being taken, the FPC is loaded with the interrupt vector (i.e. the interrupt service routine's entry address) corresponding to the source of the interrupt.

Fetch Program Counter Register (FPC)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Fetch Instruction Address | | | | | | | | | | | | | | | | | | | | | | | | | | | | | | 0 | 0 |

2.1.2 Decode Program Counter Register

The Decode Program Counter register (DPC) contains the address of the instruction currently being decoded. The contents of the DPC are used by jump and call operations for PC-relative addressing. The DPC register is shown in Figure 7-2 below.

Decode Program Counter Register (DPC)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Decode Instruction Address | | | | | | | | | | | | | | | | | | | | | | | | | | | | | | 0 | 0 |

2.1.3 Execute Program Counter Register

The Execute Program Counter register (XPC) contains the address of the instruction currently being executed. The XPC register is shown in Figure 7-3 below.

Execute Program Counter Register (XPC)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Execute Instruction Address | | | | | | | | | | | | | | | | | | | | | | | | | | | | | | 0 | 0 |

2.2 The Fetch (F) Stage

During the Fetch (F) Stage, the instruction is fetched by the SP using the address in the FPC (Fetch Program Counter) register, and loaded into a primary Instruction Register (IR1) in the SP and each PE. Once the instruction is fetched, the FPC register is loaded with the value of the current FPC plus 1, unless it is written to by the branch/event-point-loop hardware or the interrupt control logic. An example of the instruction flow during the F stage is shown in Figure 1 below.

Figure 1. Instruction Flow During the Fetch Stage of the Pipeline
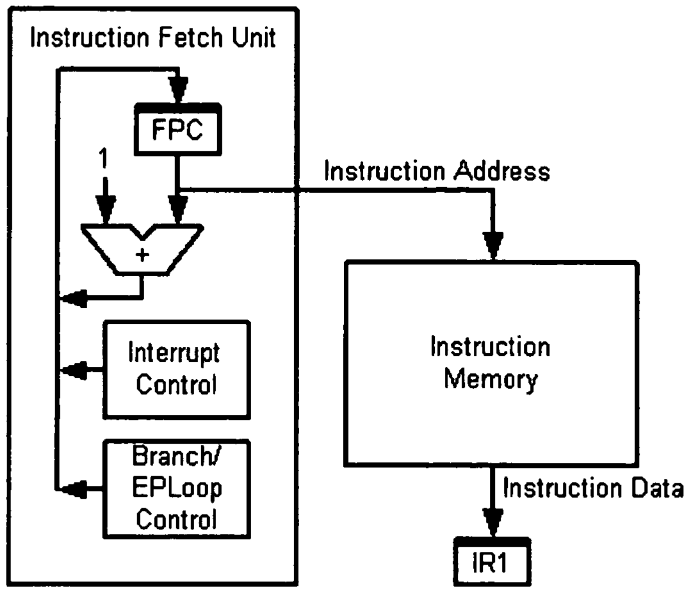

2.3 The Pre-Decode (PD) Stage

During the Pre-Decode (PD) Stage, VLIWs are fetched from VLIW Memory into a set of secondary Instruction Registers (IR2s) associated with each execution unit. An example of the instruction flow during the PD stage is illustrated in Figure 2 below. As illustrated in Figure 2, the VIM address is supplied by the XV instruction in IR1. Non-VLIW instructions are simply transferred from IR1 to IR2.

Figure 2. Instruction Flow During the Pre-Decode Stage of the Pipeline

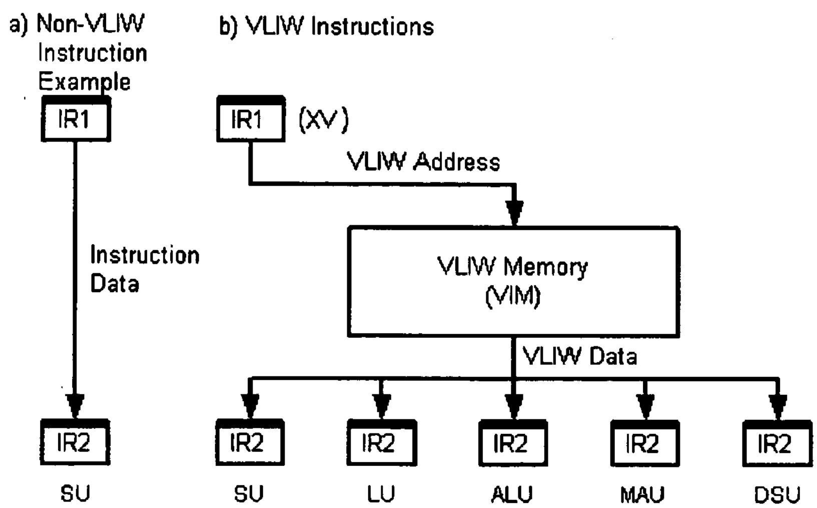

2.4 The Decode (D) Stage

During the Decode (D) Stage, the instruction in IR1 (NP State), or IR2 (EP State), is decoded in the appropriate execution unit to generate all the control signals necessary for its execution in the next stage. The instruction's source and target registers are identified, and if appropriate, effective address computations are performed. An example of the instruction flow during the D stage is illustrated in Figure 3 below.

Figure 3. Instruction Flow During the Decode Stage of the Pipeline

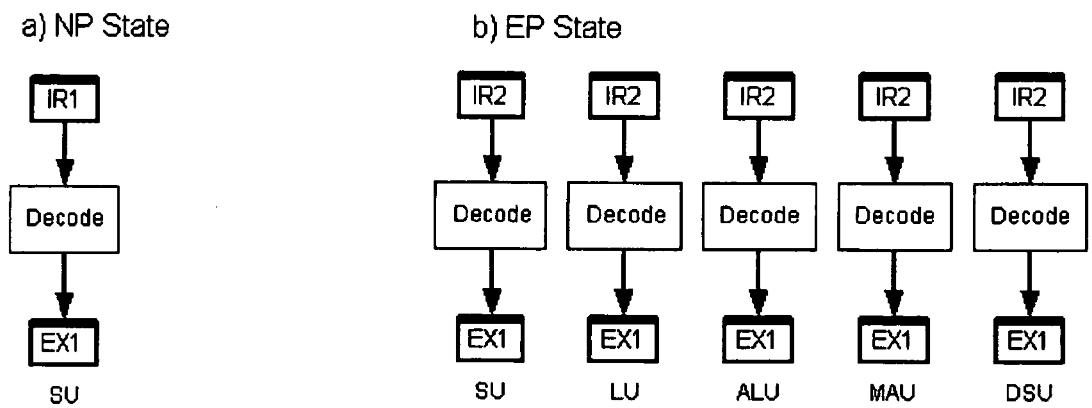

2.5 The Execute (EX) Stage

The Execute Stage consists of five phases: EX1 through EX5. Although most instructions require only the first of these phases to complete their execution, some instructions may require all five phases to complete their execution. An example of this is the LV instruction, which requires anywhere from 0 to 5 phases to complete its execution. The general instruction flow during the EX stage is illustrated in Figure 4 below.

Figure 4. Instruction Flow During the Execute Phases of the Pipeline

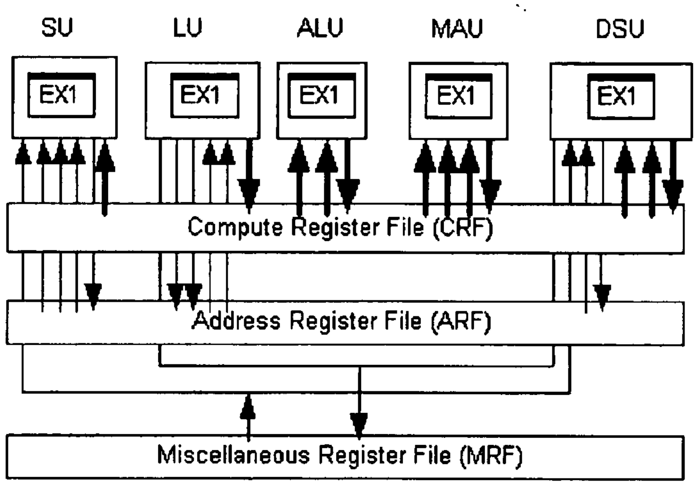

2.6 The Condition-Return (CR) Stage

Instructions affecting the Arithmetic Flags generate the new flag values during the Condition-Return (CR) Stage. Thus, during the CR Stage, the new flag values are made available for use by any instruction performing an operation in the same cycle. The Arithmetic Flag bits in the Status and Control Register (SCR) are loaded with the new flag values at the end of this stage.

3 Pipeline Instruction Flow Summary
Figure 5. Pipeline Instruction Flow Summary
1. Non-VLIW Instruction Flow (NP State)
2. Non-VLIW Instruction Flow (EP State)
3. VLIW Instruction Flow (EP State)
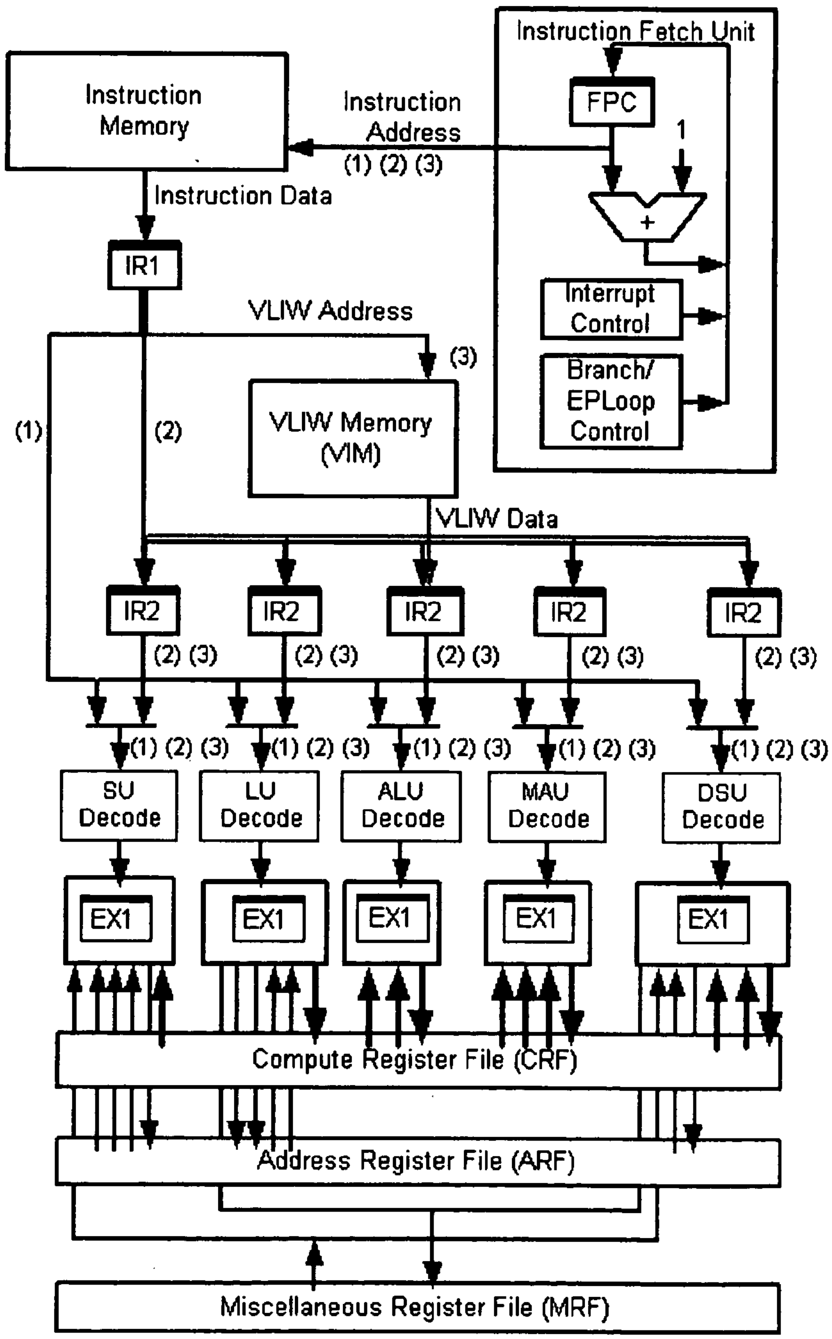

4 Pipeline Operation Examples

The following sections describe the operations performed in the different stages of the pipeline for the various instruction types.

4.1 Integer Arithmetic/Logical Instructions

Integer arithmetic/logical instructions (e.g. ADD, MPY, AND) complete their execution at the end of the first phase of the EX stage.

a) NP State

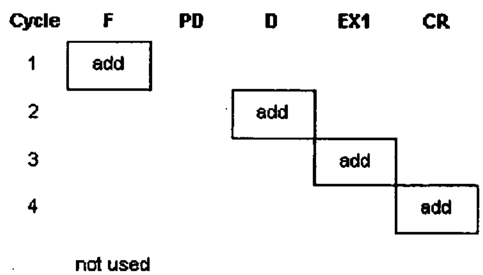

b) EP State

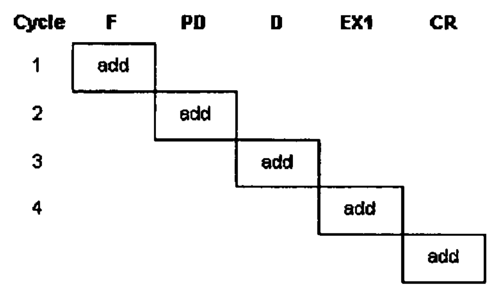

| Pipeline Stage | Operation |
|---|---|
| Fetch | The instruction is fetched from memory into the IR1 register. |
| Pre-Decode | Not used. |
| Decode | The instruction in IR1 is decoded. |
| EX1 | The operand(s) is(are) read, the operation is performed, and the result(s) is(are) written to the register file. |
| CR | The result(s) and the new Arithmetic Flag values are made available for use by any instruction performing an operation in this cycle. The new flag values are written to the SCR at the end of the cycle. |

| Pipeline Stage | Operation |
|---|---|
| Fetch | The instruction is fetched from memory into the IR1 register. |
| Pre-Decode | The NMIE bit must be set for a NMI to be recognized by the interrupt mechanism. |
| Decode | The instruction in IR2 is decoded. |
| EX1 | The operand(s) is(are) read, the operation is performed, and the result(s) is(are) written to the register file. |
| CR | The result(s) and the new Arithmetic Flag values are made available for use by any instruction performing an operation in this cycle. The new flag values are written to the SCR at the end of the cycle. |

4.2 Load-Address Instructions

Load-address instructions (e.g. load-address indirect) complete their execution at the end of the D stage.

a) NP State

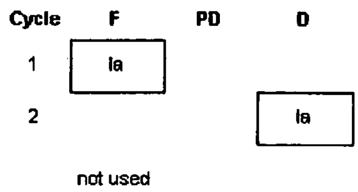

| Pipeline Stage | Operation |
|---|---|
| Fetch | The instruction is fetched from memory into the IR1 register. |
| Pre-Decode | Not used. |
| Decode | The instruction in IR1 is decoded and the operand address is generated and written to the target address register. |

b) EP State

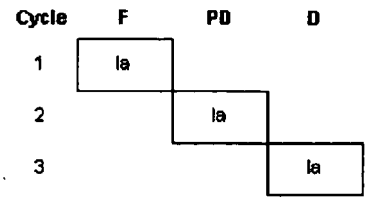

| Pipeline Stage | Operation |
|---|---|
| Fetch | The instruction is fetched from memory into the IR1 register. |
| Pre-Decode | The instruction in IR1 is transferred to the IR2 register. |
| Decode | The instruction in IR2 is decoded and the operand address is generated and written to the target address register. |

4.3 Load-Immediate Instructions using an Address Register

Load-immediate instructions using an address register as the target complete their execution at the end of the D stage.

a) NP State

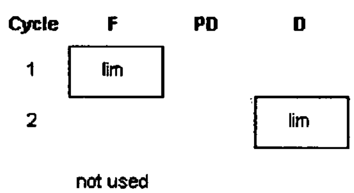

| Pipeline Stage | Operation |
|---|---|
| Fetch | The instruction is fetched from memory into the IR1 register. |
| Pre-Decode | Not used. |
| Decode | The instruction in IR1 is decoded and the immediate value contained in the instruction word is written to the target address register. |

b) EP State

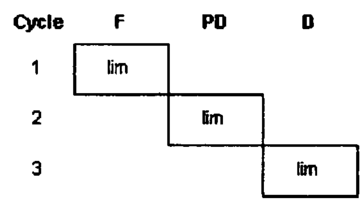

| Pipeline Stage | Operation |
|---|---|
| Fetch | The instruction is fetched from memory into the IR1 register. |
| Pre-Decode | The instruction in IR1 is transferred to the IR2 register. |
| Decode | The instruction in IR2 is decoded and the immediate value contained in the instruction word is written to the target address register. |

4.4 Load-Immediate Instructions using a Compute Register

Load-immediate instructions using a compute register as the target complete their execution at the end of the first phase of the EX stage.

a) NP State

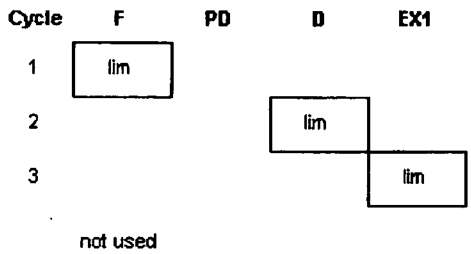

| Pipeline Stage | Operation |
|---|---|
| Fetch | The instruction is fetched from memory into the IR1 register. |
| Pre-Decode | Not used. |
| Decode | The instruction in IR1 is decoded and the immediate value contained in the instruction word is written to a hidden register in the Load Unit. |
| EX1 | The contents of the hidden register are written to the target compute register. |

b) EP State

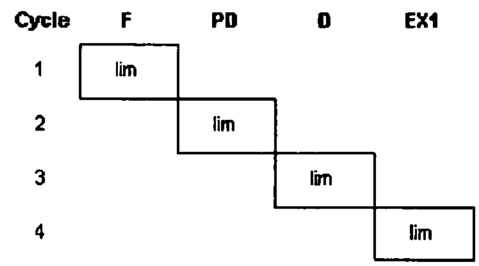

| Pipeline Stage | Operation |
|---|---|
| Fetch | The instruction is fetched from memory into the IR1 register. |
| Pre-Decode | The instruction in IR1 is transferred to the IR2 register. |
| Decode | The instruction in IR2 is decoded and the immediate value contained in the instruction word is written to a hidden register in the Load Unit. |
| EX1 | The contents of the hidden register are written to the target compute register. |

4.5 Memory Load Instructions

Memory load instructions (e.g. memory load-indirect using an address or compute register as the target) complete their execution at the end of the first phase of the EX stage.

a) NP State

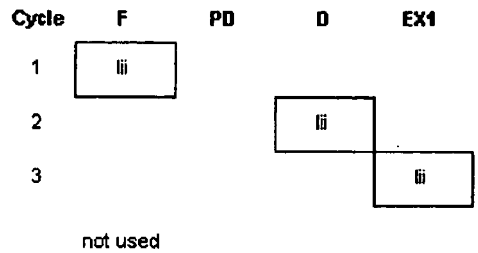

| Pipeline Stage | Operation |
|---|---|
| Fetch | The instruction is fetched from memory into the IR1 register. |
| Pre-Decode | Not used. |
| Decode | The instruction in IR1 is decoded and the operand address is generated. Any address register updates required by the addressing mode are performed. |
| EX1 | The operand is read from memory and written to the target address or compute register. |

b) EP State

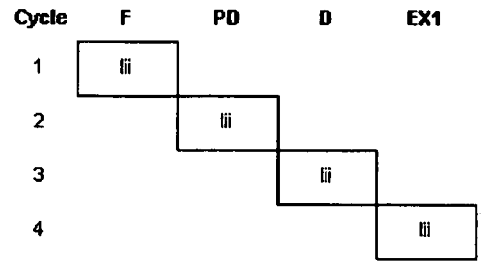

| Pipeline Stage | Operation |
|---|---|
| Fetch | The instruction is fetched from memory into the IR1 register. |
| Pre-Decode | The instruction in IR1 is transferred to the IR2 register. |
| Decode | The instruction in IR2 is decoded and the operand address is generated. Any address register updates required by the addressing mode are performed. |
| EX1 | The operand is read from memory and written to the target address or compute register. |

4.5.1 Avoiding a pipeline conflict caused by a memory load instruction

If the next sequential instruction following a memory load instruction attempts to use the operand fetched by the memory load instruction for addressing purposes, a read-before-write register conflict results. To prevent this conflict, a delay-slot instruction must be inserted between the memory load instruction and the next sequential instruction.

4.6 Memory Store Instructions

Memory store instructions (e.g. store-indirect using an address or compute register as the source) complete their execution at the end of the first phase of the EX stage.

a) NP State

| Cycle | F | PD | D | EX1 |
|---|---|---|---|---|
| 1 | sii | | | |
| 2 | | | sii | |
| 3 | | | | sii |
| | not used | | | |

| Pipeline Stage | Operation |
|---|---|
| Fetch | The instruction is fetched from memory into the IR1 register. |
| Pre-Decode | Not used. |
| Decode | The instruction in IR1 is decoded and the operand address is generated. Any address register updates required by the addressing mode are performed. |
| EX1 | The source address or compute register is read and its contents written to memory. |

b) EP State

| Cycle | F | PD | D | EX1 |
|---|---|---|---|---|
| 1 | sii | | | |
| 2 | | sii | | |
| 3 | | | sii | |
| 4 | | | | sii |

| Pipeline Stage | Operation |
|---|---|
| Fetch | The instruction is fetched from memory into the IR1 register. |
| Pre-Decode | The instruction in IR1 is transferred to the IR2 register. |
| Decode | The instruction in IR2 is decoded and the operand address is generated. Any address register updates required by the addressing mode are performed. |
| EX1 | The source address or compute register is read and its contents written to memory. |

4.7 Unconditional Jump Instructions

Unconditional jump instructions (e.g. JMP, JMPD) complete their execution at the end of the D stage.

a) NP State

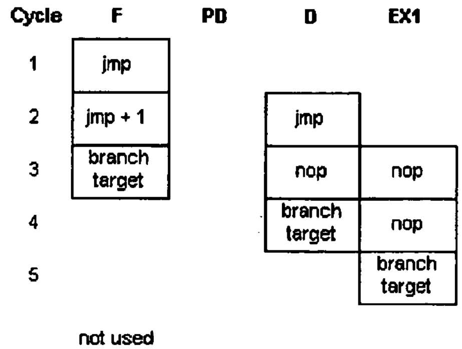

| Pipeline Stage | Operation |
|---|---|
| Fetch | The instruction is fetched from memory into the IR1 register. |
| Pre-Decode | Not used. |
| Decode | The instruction in IR1 is decoded and the branch target address is generated and written to the FPC. |
| EX1 | No operation is performed. Note that this stage coincides with the Fetch stage of the instruction at the branch target address. |

b) EP State

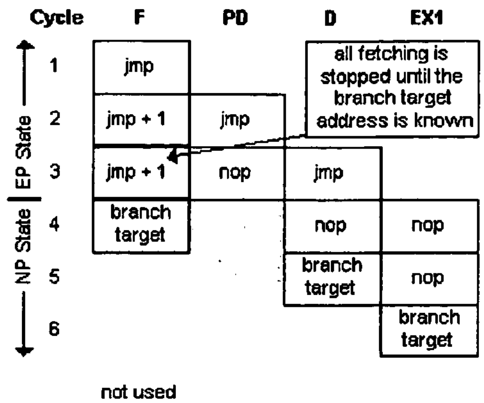

| Pipeline Stage | Operation |
|---|---|
| Fetch | The instruction is fetched from memory into the IR1 register. |
| Pre-Decode | The instruction in IR1 is transferred to the IR2 register. |
| Decode | The instruction in IR2 is decoded and the branch target address is generated and written to the FPC. The pipeline transitions from the EP State to the NP State at the end of this cycle. |
| EX1 | No operation is performed. Note that this stage coincides with the Fetch stage of the instruction at the branch target address. |

4.7.1 Resolved pipeline conflict caused by an unconditional jump instruction

When an unconditional jump instruction is detected in the pipeline, any instruction(s) subsequent to the jump instruction already fetched into the pipeline are immediately discarded or aborted, and NOPs are inserted in the pipeline in their place. This is done to insure that none of the instructions between the unconditional jump instruction and its target are partially executed.

4.8 Conditional Jump Instructions

Conditional jump instructions (e.g. JMPZ, JMPGT) complete their execution at the end of the first phase of the EX stage.

a) NP State

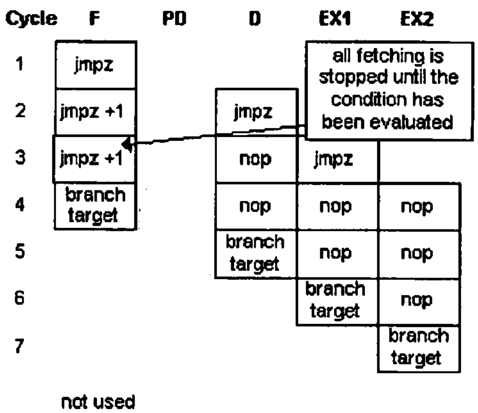

| Pipeline Stage | Operation |
|---|---|
| Fetch | The instruction is fetched from memory into the IR1 register. |
| Pre-Decode | Not used. |
| Decode | The instruction in IR1 is decoded and the branch target address is generated. |
| EX1 | The condition is evaluated. If the condition is true, the FPC is loaded with the branch target address. If the condition is false, the FPC is loaded with the address of the next sequential instruction in the program (i.e. jmpz + 1). |
| EX2 | No operation is performed. Note that this stage coincides with the Fetch stage of the instruction at the branch target address. |

b) EP State

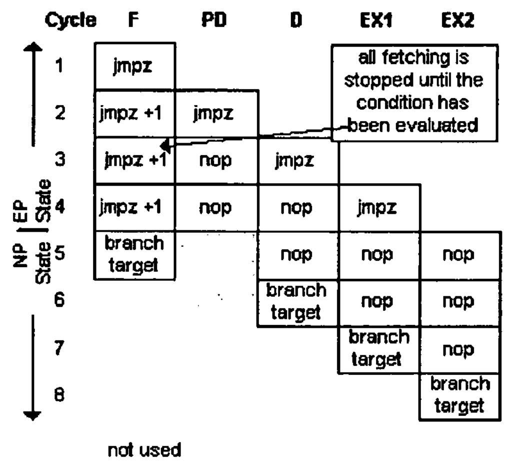

| Pipeline Stage | Operation |
|---|---|
| Fetch | The instruction is fetched from memory into the IR1 register. |
| Pre-Decode | The instruction in IR1 is transferred to the IR2 register. |
| Decode | The instruction in IR2 is decoded and the branch target address is generated. |
| EX1 | The condition is evaluated. If the condition is true, the FPC is loaded with the branch target address. If the condition is false, the FPC is loaded with the address of the next sequential instruction in the program (i.e. jmpz + 1). The pipeline transitions from the EP State to the NP State at the end of this cycle. |
| EX2 | No operation is performed. Note that this stage coincides with the Fetch stage of the instruction at the branch target address. |

4.8.1 Resolved pipeline conflict caused by a conditional jump instruction

When a conditional jump instruction is detected in the pipeline, any instruction(s) subsequent to the jump instruction already fetched into the pipeline are immediately discarded or aborted, and NOPs are inserted in the pipeline in their place. This is done to insure that none of the instructions between the conditional jump instruction and its target are partially executed.

4.9 Unconditional Call Instructions

Unconditional call instructions (e.g. CALL, CALLD) complete their execution at the end of the D stage.

a) NP State

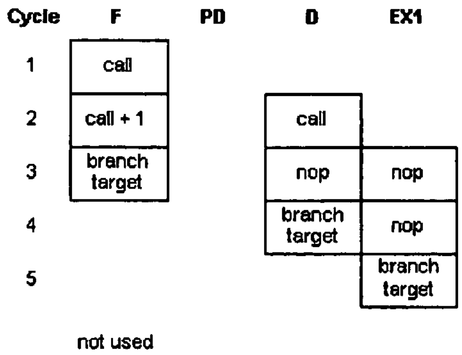

| Pipeline Stage | Operation |
|---|---|
| Fetch | The instruction is fetched from memory into the IR1 register. |
| Pre-Decode | Not used. |
| Decode | The instruction in IR1 is decoded and the return address (i.e. the current FPC) is copied to the ULR. The branch target address is generated and written to the FPC. |
| EX1 | No operation is performed. Note that this stage coincides with the Fetch stage of the instruction at the branch target address. |

b) EP State

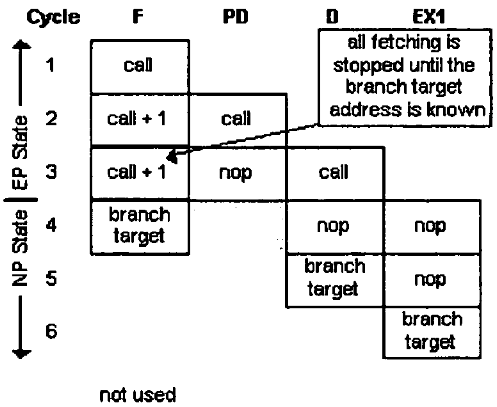

| Pipeline Stage | Operation |
|---|---|
| Fetch | The instruction is fetched from memory into the IR1 register. |
| Pre-Decode | The instruction in IR1 is transferred to the IR2 register. |
| Decode | The instruction in IR2 is decoded and the return address (i.e. the current FPC) is copied to the ULR. The branch target address is generated and written to the FPC. The pipeline transitions from the EP State to the NP State at the end of this cycle. |
| EX1 | No operation is performed. Note that this stage coincides with the Fetch stage of the instruction at the branch target address. |

4.9.1 Resolved pipeline conflict caused by an unconditional call instruction When an unconditional call instruction is detected in the pipeline, any instruction(s) subsequent to the call instruction already fetched into the pipeline are immediately discarded or aborted, and NOPs are inserted in the pipeline in their place. This is done to insure that none of the instructions between the unconditional call instruction and its target are partially executed.

4.10 Conditional Call Instructions

Conditional call instructions (e.g. CALLZ, CALLGT) complete their execution at the end of the first phase of the EX stage.

a) NP State

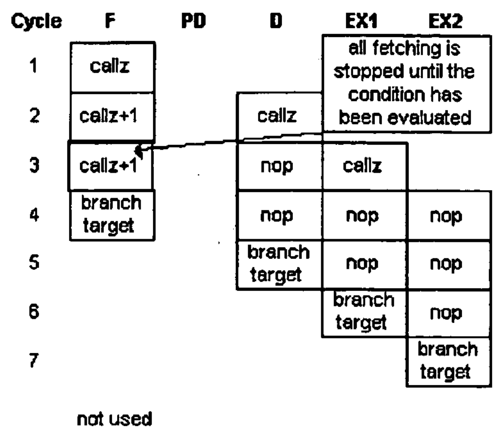

| Pipeline Stage | Operation |
|---|---|
| Fetch | The instruction is fetched from memory into the IR1 register. |
| Pre-Decode | Not used. |
| Decode | The instruction in IR1 is decoded and the branch target address is generated. |
| EX1 | The condition is evaluated. If the condition is true, the return address (i.e. the current FPC) is copied to the ULR and the FPC is loaded with the branch target address. If the condition is false, the FPC is loaded with the address of the next sequential instruction in the program (i.e. callz + 1). |
| EX2 | No operation is performed. Note that this stage coincides with the Fetch stage of the instruction at the branch target address. |

b) EP State

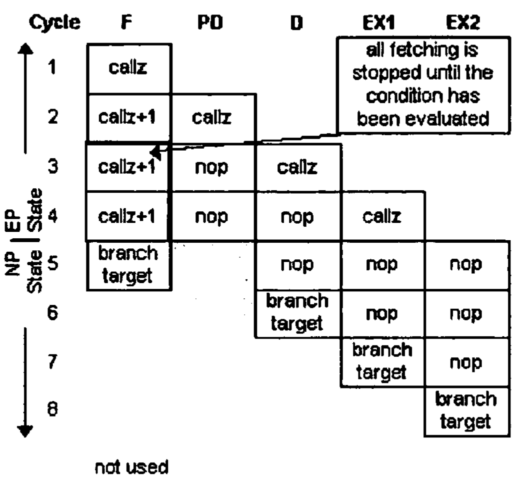

| Pipeline Stage | Operation |
|---|---|
| Fetch | The instruction is fetched from memory into the IR1 register. |
| Pre-Decode | The instruction in IR1 is transferred to the IR2 register. |
| Decode | The instruction in IR2 is decoded and the branch target address is generated. |
| EX1 | The condition is evaluated. If the condition is true, the return address (i.e. the current FPC) is copied to the ULR and the FPC is loaded with the branch target address. If the condition is false, the FPC is loaded with the address of the next sequential instruction in the program (i.e. callz + 1). The pipeline transitions from the EP State to the NP State at the end of this cycle. |
| EX2 | No operation is performed. Note that this stage coincides with the Fetch stage of the instruction at the branch target address. |

4.10.1 Resolved pipeline conflict caused by a conditional call instruction

When a conditional call instruction is detected in the pipeline, any instruction(s) subsequent to the call instruction already fetched into the pipeline are immediately discarded or aborted, and NOPs are inserted in the pipeline in their place. This is done to insure that none of the instructions between the conditional call instruction and its target are partially executed.

4.11 Unconditional Return-from-Call Instructions

Unconditional return-from-call instructions (e.g. RET) complete their execution at the end of the D stage.

a) NP State

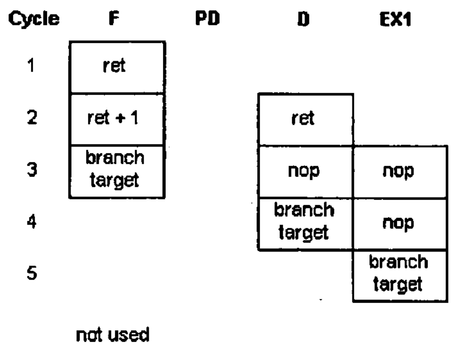

| Pipeline Stage | Operation |
|---|---|
| Fetch | The instruction is fetched from memory into the IR1 register. |
| Pre-Decode | Not used. |
| Decode | The instruction in IR1 is decoded and the return address (i.e. the current ULR content) is copied to the FPC. |
| EX1 | No operation is performed. Note that this stage coincides with the Fetch stage of the instruction at the return address. |

b) EP State

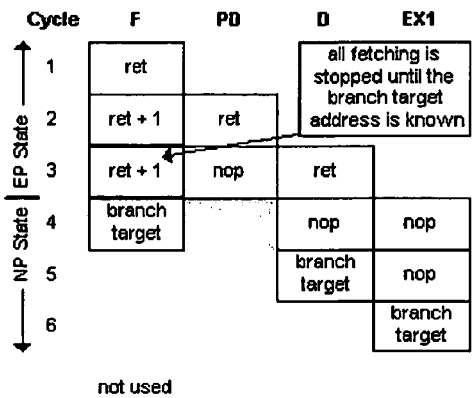

| Pipeline Stage | Operation |
|---|---|
| Fetch | The instruction is fetched from memory into the IR1 register. |
| Pre-Decode | The instruction in IR1 is transferred to the IR2 register. |
| Decode | The instruction in IR2 is decoded and the return address (i.e. the current ULR content) is copied to the FPC. The pipeline transitions from the EP State to the NP State at the end of this cycle. |
| EX1 | No operation is performed. Note that this stage coincides with the Fetch stage of the instruction at the return address. |

4.11.1 Resolved pipeline conflict caused by an unconditional return instruction When an unconditional return instruction is detected in the pipeline, any instruction(s) subsequent to the return instruction already fetched into the pipeline are immediately discarded or aborted, and NOPs are inserted in the pipeline in their place. This is done to insure that none of the instructions between the unconditional return instruction and its target are partially executed.

4.12 Conditional Return-from-Call Instructions

Conditional return-from-call instructions (e.g. RETZ, RETGT) complete their execution at the end of the first phase of the EX stage.

a) NP State

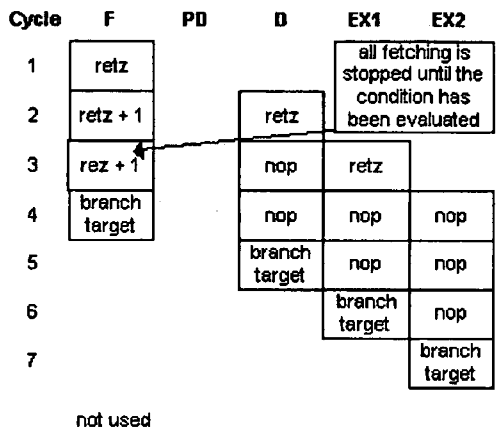

b) EP State

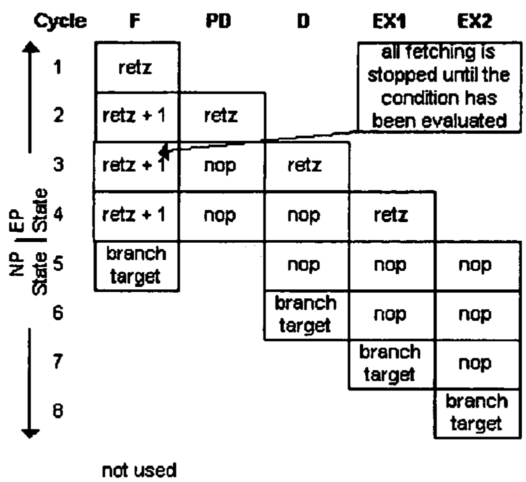

| Pipeline Stage | Operation |
|---|---|
| Fetch | The instruction is fetched from memory into the IR1 register. |
| Pre-Decode | Not used. |
| Decode | The instruction in IR1 is decoded and the branch target address is generated. |
| EX1 | The condition is evaluated. If the condition is true, the return address (i.e. the current ULR content) is copied to the FPC. If the condition is false, the FPC is loaded with the address of the next sequential instruction in the program (i.e. retz + 1). |
| EX2 | No operation is performed. Note that this stage coincides with the Fetch stage of the instruction at the return address. |

| Pipeline Stage | Operation |
|---|---|
| Fetch | The instruction is fetched from memory into the IR1 register. |
| Pre-Decode | The instruction in IR1 is transferred to the IR2 register. |
| Decode | The instruction in IR2 is decoded and the branch target address is generated. |
| EX1 | The condition is evaluated. If the condition is true, the return address (i.e. the current ULR content) is copied to the FPC. If the condition is false, the FPC is loaded with the address of the next sequential instruction in the program (i.e. retz + 1). The pipeline transitions from the EP State to the NP State at the end of this cycle. |
| EX2 | No operation is performed. Note that this stage coincides with the Fetch stage of the instruction at the return address. |

4.12.1 Resolved pipeline conflict caused by a conditional return instruction When a conditional return instruction is detected in the pipeline, any instruction(s) subsequent to the return instruction already fetched into the pipeline are immediately discarded or aborted, and NOPs are inserted in the pipeline in their place. This is done to insure that none of the instructions between the conditional return instruction and its target are partially executed.

4.13 Event-Point Loop Control Instructions

The Event-Point Loop control instructions (EPLOOPx and EPLOOPIx) complete their execution at the end of the first phase of the EX stage.

Three-instruction loop, executed 0 times a) NP State

| Cycle | F | PD | D | EX1 | EX2 |
|---|---|---|---|---|---|
| 1 | eploop | | | | |
| 2 | hw nop 1 | | eploop | | |
| 3 | hw nop 2 | | hw nop 1 | eploop | |
| 4 | loop instr. 1 | | hw nop 2 | hw nop 1 | eploop |
| 5 | loop instr. 3 | | loop instr. 1 cancelled | hw nop 2 | hw nop 1 |
| 6 | instr. 1 after loop | | loop instr. 3 cancelled | loop instr. 1 cancelled | hw nop 2 |
| 7 | instr. 2 after loop | | instr. 1 after loop | loop instr. 3 cancelled | loop instr. 1 cancelled |
| | | not used | | | |

| Pipeline Stage | Operation |
|---|---|
| Fetch | The instruction is fetched from memory into the IR1 register. |
| Pre-Decode | Not used. |
| Decode | The instruction in IR1 is decoded. The end address of the loop is computed. The PC is held one cycle, effective NOP'ing the first instruction in the loop. |
| EX1 | SPR Register IEPxR0 is updated with the loop end address, register IEPxR1 is updated with the loop start address, and if the instruction is an EPLOOPI, then IEPxR2 is updated with the loop count value. The PC is held another cycle, effective NOP'ing the first instruction in the loop again. |
| EX2 | The first instruction of the loop is fetched. The loop counter is compared to zero. Since the loop count is zero, the first instruction of the loop is cancelled. |
| EX3 | The last instruction of the loop is fetched, and then cancelled. |
| EX4 | The first instruction after the loop body is fetched and executed normally. |

b) EP State

| State | Cycle | F | PD | D | EX1 | EX2 |
|---|---|---|---|---|---|---|
| EP State | 1 | eploop | | | | |
| EP State | 2 | hw nop 1 | eploop | | | |
| EP State | 3 | hw nop 2 | hw nop 1 | eploop | | |
| EP State | 4 | hw nop 3 | hw nop 2 | hw nop 1 | eploop | |
| NP State | 5 | loop instr. 1 | | hw nop 2 | hw nop 1 | eploop |
| NP State | 6 | loop instr. 3 | | loop instr. 1 cancelled | hw nop 2 | hw nop 1 |
| NP State | 7 | instr. 1 after loop | | loop instr. 3 cancelled | loop instr. 1 cancelled | hw nop 2 |
| NP State | 8 | instr. 2 after loop | | instr. 1 after loop | loop instr. 3 cancelled | loop instr. 1 cancelled |
| | | | not used | | | |

| Pipeline Stage | Operation |
|---|---|
| Fetch | The instruction is fetched from memory into the IR1 register. |
| Pre-Decode | The instruction in IR1 is transferred to the IR2 register. The PC is held one cycle, effectively NOP'ing the first instruction in the loop. |
| Decode | The instruction in IR1 is decoded. The end address of the loop is computed. The PC is held another cycle, effective NOP'ing the first instruction in the loop. |
| EX1 | SPR Register IEPxR0 is updated with the loop end address, register IEPxR1 is updated with the loop start address, and if the instruction is an EPLOOPI, then IEPxR2 is updated with the loop count value. The PC is held another cycle, effective NOP'ing the first instruction in the loop again. |
| EX2 | The first instruction of the loop is fetched. The loop counter is compared to zero. Since the loop count is zero, the first instruction of the loop is cancelled. |
| EX3 | The last instruction of the loop is fetched, and then cancelled. |
| EX4 | The first instruction after the loop body is fetched and executed normally. |

Three-instruction loop, executed more than 1 time

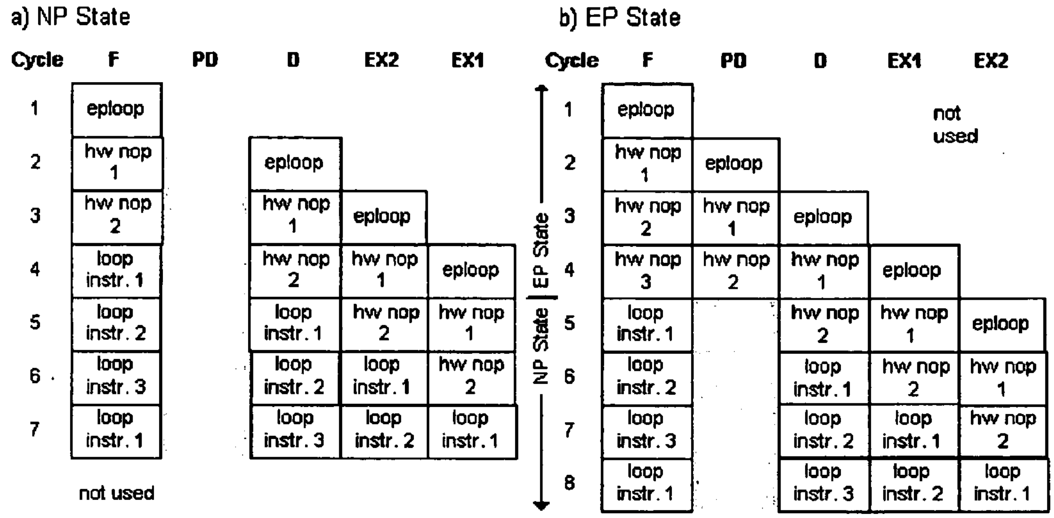

a) NP State

| Pipeline Stage | Operation |
|---|---|
| Fetch | The instruction is fetched from memory into the IR1 register. |
| Pre-Decode | Not used. |
| Decode | The instruction in IR1 is decoded. The end address of the loop is computed. The PC is held one cycle, effective NOP'ing the first instruction in the loop. |
| EX1 | SPR Register IEPxR0 is updated with the loop end address, register IEPxR1 is updated with the loop start address, and if the instruction is an EPLOOPI, then IEPxR2 is updated with the loop count value. The PC is held another cycle, effective NOP'ing the first instruction in the loop again. |
| EX2 | The first instruction of the loop is fetched. The loop counter is compared to zero. Since the loop count is not zero, the first instruction of the loop is executed normally. |

b) EP State

| Pipeline Stage | Operation |
|---|---|
| Fetch | The instruction is fetched from memory into the IR1 register. |
| Pre-Decode | The instruction in IR1 is transferred to the IR2 register. The PC is held one cycle, effectively NOP'ing the first instruction in the loop. |
| Decode | The instruction in IR1 is decoded. The end address of the loop is computed. The PC is held another cycle, effectively NOP'ing the first instruction in the loop. |
| EX1 | SPR Register IEPxR0 is updated with the loop end address, register IEPxR1 is updated with the loop start address, and if the instruction is an EPLOOPI, then IEPxR2 is updated with the loop count value. The PC is held another cycle, effectively NOP'ing the first instruction in the loop again. |
| EX2 | The first instruction of the loop is fetched. The loop counter is compared to zero. Since the loop count is not zero, the first instruction of the loop is executed normally. |

4.14 Load-VLIW (LV) Instruction

Depending on the number of instructions being loaded in the VIM, and the instruction-processing state currently in effect, the LV instruction may complete its execution at the end of the PD stage, the D stage, or at the end of any one of the five phases of the EX stage.

a) NP State

| Cycle | F | PD | D | EX1 | EX2 |
|---|---|---|---|---|---|
| 1 | lv | | | | |
| 2 | add | | lv | | |
| 3 | fadd | | add | lv | |
| 4 | | | fadd | nop | lv |
| 5 | | | | nop | nop |
| 6 | | | | | nop |

not used

| Pipeline Stage | Operation |
|---|---|
| Fetch | The instruction is fetched from memory into the IR1 register. |
| Pre-Decode | Not used. |
| Decode | The instruction in IR1 is decoded and the number of instructions to be loaded in the VIM (N) is determined. If N=0, the LV instruction completes its execution at the end of this cycle. |
| EX1 | If N>0, the 1st instruction after the LV instruction is loaded in the VIM. If N=1, the LV instruction completes its execution at the end of this cycle. |
| EX2 | If N>1, the 2nd instruction after the LV instruction is loaded in the VIM. If N=2, the LV instruction completes its execution at the end of this cycle. |
| EX3 (notshown) | If N>2, the 3rd instruction after the LV instruction is loaded in the VIM. If N=3, the LV instruction completes its execution at the end of this cycle. |
| EX4 (notshown) | If N>3, the 4th instruction after the LV instruction is loaded in the VIM. If N=4, the LV instruction completes its execution at the end of this cycle. |
| EX5 (notshown) | If N=5, the 5th instruction after the LV instruction is loaded in the VIM. The LV instruction completes its execution at the end of this cycle. |

b) EP State

| Cycle | F | PD | D | EX1 |
|---|---|---|---|---|
| 1 | lv | | | |
| 2 | add | lv | | |
| 3 | fadd | add | lv | |
| 4 | | fadd | add | lv |
| 5 | | | fadd | nop |
| 6 | | | | nop |

| Pipeline Stage | Operation |
|---|---|
| Fetch | The instruction is fetched from memory into the IR1 register. |
| Pre-Decode | The instruction in IR1 is pre-decoded and the number of instructions to be loaded in the VIM (N) is determined. If N=0, the LV instruction completes its execution at the end of this cycle. |
| Decode | If N>0, the 1st instruction after the LV instruction is loaded in the VIM. If N=1, the LV instruction completes its execution at the end of this cycle. |
| EX1 | If N>1, the 2nd instruction after the LV instruction is loaded in the VIM. If N=2, the LV instruction completes its execution at the end of this cycle. |
| EX2 (not shown) | If N>2, the 3rd instruction after the LV instruction is loaded in the VIM. If N=3, the LV instruction completes its execution at the end of this cycle. |
| EX3 (not shown) | If N>3, the 4th instruction after the LV instruction is loaded in the VIM. If N=4, the LV instruction completes its execution at the end of this cycle. |
| EX4 (not shown) | If N=5, the 5th instruction after the LV instruction is loaded in the VIM. The LV instruction completes its execution at the end of this cycle. |

Note that it is permissible to mix single-cycle instructions and multi-cycle instructions in a VLIW.

4.15 Execute-VLIW (XV) Instruction

To allow instructions encapsulated in a VLIW to proceed through the D stage of the pipeline before they are executed, the XV instruction can only be executed while the pipeline is in the EP State and completes its execution at the end of the PD stage.

| Cycle | F | PD | D | EX1 | EX2 | CR |
|---|---|---|---|---|---|---|
| 1 | xv | | | | | |
| 2 | | xv | | | | |
| 3 | | | vliw | | | |
| 4 | | | | vliw | | |
| 5 | | | | | vliw | |
| 6 | | | | | | vliw |

| Pipeline Stage | Operation |
|---|---|
| Fetch | The instruction is fetched from memory into the IR1 register. |
| Pre-Decode | The instruction in IR1 is pre-decoded and the VLIW is fetched from VIM. The encapsulated instructions are loaded in the IR2 registers of the participating execution units. |
| Decode | The instructions in the IR2 registers are decoded, and processed according to their instruction type. See Examples 4.1 through 4.6. |
| EX1 | See Examples 4.1 through 4.6. |
| EX2 | See Examples 4.1 through 4.6. |
| CR | See Examples 4.1 through 4.6. |

Note that is it permissible to mix single-cycle instructions and multi-cycle instructions in a VLIW.

5 State Transitions between the Instruction-Processing States

5.1 Transition from the NP State to the EP State

As illustrated in Figure 10-6 below, the transition from the NP State to the EP State occurs automatically when the execute-VLIW (XV) instruction is executed.

Figure 6. Transition from the NP State to the EP State

| State | Cycle | F | PD | D | EX1 | EX2 | CR |
|---|---|---|---|---|---|---|---|
| NP State | 1 | add | | | | | |
| NP State | 2 | xv | | add | | | |
| EP State | 3 | | xv | nop | add | | |
| EP State | 4 | | | vliw | nop | add | |
| EP State | 5 | | | | vliw | nop | |
| EP State | 6 | | | | | vliw | nop |
| EP State | 7 | not used | | | | | vliw |

| Cycle | Operation |
|---|---|
| 1 | The ADD instruction is fetched from memory into the IR1 register (F Stage). |
| 2 | The ADD instruction is decoded (D Stage). The XV intsruction is fetched from memory into the IR1 register (F Stage). The PD Stage is not used. |
| 3 | The operands for the ADD instruction are read, the operation is performed, and the result(s) is (are) written to the register file (EX1 phase). The XV instruction is pre-decoded and the VLIW is fetched from VIM. The encapsulated instructions are loaded in the IR2 registers of the participating execution units (PD Stage). The pipeline transitions from the NP State to the EP State at the start of this cycle. A NOP is introduced into the pipeline as a result. |
| 4 | The result(s) and the new Arithmetic Flags generate by the ADD instruction are made available for use by any instruction performing an operation in this cycle. The new flag values are written to the SCR at the end of the cycle (CR Stage). The instructions in the IR2 registers are decoded, and processed according to their instruction type. See Examples 4.1 through 4.6. |
| 5 | See Examples 4.1 through 4.6. |
| 6 | See Examples 4.1 through 4.6. |
| 7 | See Examples 4.1 through 4.6. |

5.2 Transition from the EP State to the NP State

The transition from the EP State to the NP State occurs automatically when any of the following change-of-flow instructions is executed:

| | | | |
|---|---|---|---|
| CALL | JMP | RET | EPLOOP |
| CALLcc | JMPcc | RETcc | EPLOOPI |
| CALLD | JMPD | RETI | |
| CALLDcc | JMPDcc | RETIcc | |
| CALLI | JMPI | | |

CALLIcc JMPIcc

The transition from the EP State to the NP State is illustrated in Examples 4.8 through4.13.

6 Pipeline Stalls

Although the pipeline can generally maintain a net throughput of one instruction executing every clock cycle, such throughput can only be guaranteed if no stall conditions occur. As described in the following paragraphs, pipeline stalls can be caused by different conditions.

6.1 Long Program Fetch

A long program fetch occurs when an instruction fetch from program memory takes longer that one cycle to complete. In the example of Figure 7, the LBD instruction is fetched from a program memory that supports single-cycle accesses. The ADD instruction, however, is fetched from a program memory that requires more that one cycle to complete an access. As a result, the pipeline is stalled waiting for the instruction fetch to be completed. As shown in Figure 7, a NOP (no-operation) instruction is automatically inserted in the pipeline by the hardware for each cycle the pipeline is stalled.

Figure 7. Pipeline stalled due to a long program fetch

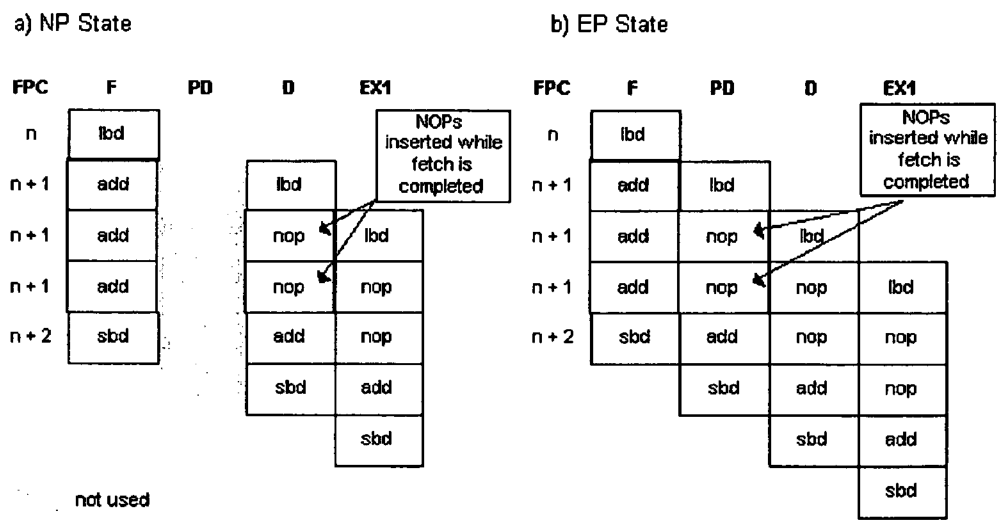

6.2 Hold-Everything

A hold-everything condition occurs when an operand access to or from memory takes longer that one cycle to complete. In the example of Figure 9, the SBD instruction stores an operand to a memory that supports single-cycle accesses. The LBD instruction, however, loads an operand from a memory that requires more that one cycle to complete an access. As shown in Figure 9, the LBD instruction results in the pipeline stalling until the memory access is completed.

Figure 9. Pipeline stalled due to a hold-everything condition

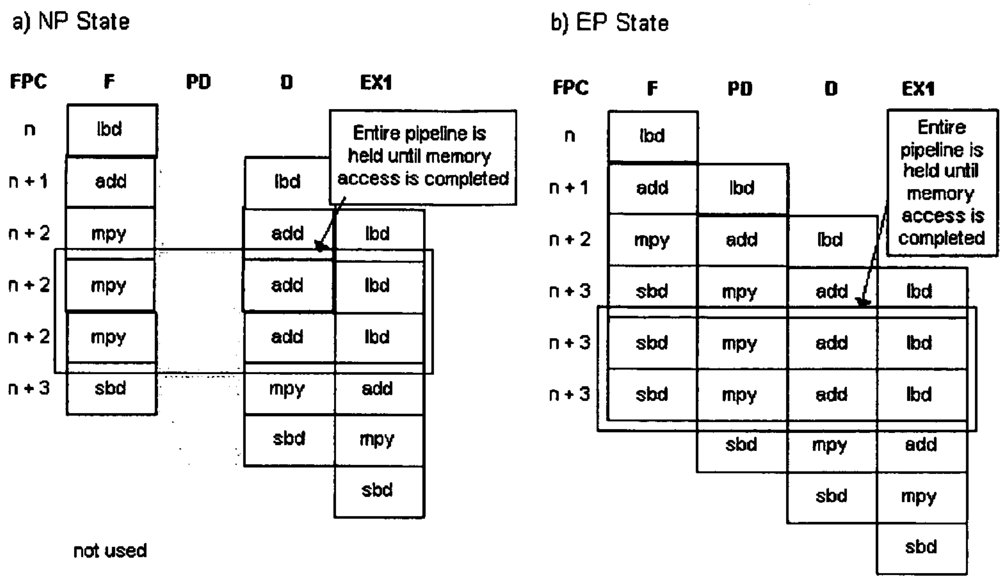

6.3 Program Re-Fetch

A program re-fetch occurs when an EPLOOPI (or EPLOOP) instruction is detected in the pipeline. In the example of Figure 8, the detection of the EPLOOPI instruction in the pipeline results in the pipeline being stalled while waiting for the first instruction in the loop (i.e. the next sequential instruction) to be re-fetched from program memory. As shown in Figure 8, during NP state, the pipeline is stalled two times, inserting two NOPs (no-operation) in to the pipeline and the instruction immediately following the EPLOOPI (or EPLOOP) is re-fetched. While in EP state, the pipeline is stalled three times, inserting three NOPs (no-operations) in to the pipeline and the instruction immediately following the EPLOOPI (or EPLOOP) is re-fetched.

Figure 8: Pipeline stalled due to a program re-fetch.

a) NP State

| Cycle | F | PD | D | EX2 | EX1 |
| --- | --- | --- | --- | --- | --- |
| 1 | eploop | | | | |
| 2 | hw nop 1 | | eploop | | |
| 3 | hw nop 2 | | hw nop 1 | eploop | |
| 4 | loop instr. 1 | | hw nop 2 | hw nop 1 | eploop |
| 5 | loop instr. 2 | | loop instr. 1 | hw nop 2 | hw nop 1 |
| 6 | loop instr. 3 | | loop instr. 2 | loop instr. 1 | hw nop 2 |
| 7 | loop instr. 1 | | loop instr. 3 | loop instr. 2 | loop instr. 1 |
| | | not used | | | |

b) EP State

| State | Cycle | F | PD | D | EX1 | EX2 |
| --- | --- | --- | --- | --- | --- | --- |
| EP State | 1 | eploop | | | | not used |
| EP State | 2 | hw nop 1 | eploop | | | |
| EP State | 3 | hw nop 2 | hw nop 1 | eploop | | |
| EP State | 4 | hw nop 3 | hw nop 2 | hw nop 1 | eploop | |
| NP State | 5 | loop instr. 1 | | hw nop 2 | hw nop 1 | eploop |
| NP State | 6 | loop instr. 2 | | loop instr. 1 | hw nop 2 | hw nop 1 |
| NP State | 7 | loop instr. 3 | | loop instr. 2 | loop instr. 1 | hw nop 2 |
| NP State | 8 | loop instr. 1 | | loop instr. 3 | loop instr. 2 | loop instr. 1 |

| Pipeline Stage | Operation |
| --- | --- |
| Fetch | The instruction is fetched from memory into the IR1 register. |
| Pre-Decode | Not used. |
| Decode | The instruction in IR1 is decoded. The end address of the loop is computed. The PC is held one cycle, effective NOP'ing the first instruction in the loop. |
| EX1 | SPR Register IEPxR0 is updated with the loop end address, register IEPxR1 is updated with the loop start address, and if the instruction is an EPLOOPI, then IEPxR2 is updated with the loop count value. The PC is held another cycle, effective NOP'ing the first instruction in the loop again. |
| EX2 | The first instruction of the loop is fetched. The loop counter is compared to zero. Since the loop count is not zero, the first instruction of the loop is executed normally. |

| Pipeline Stage | Operation |
| --- | --- |
| Fetch | The instruction is fetched from memory into the IR1 register. |
| Pre-Decode | The instruction in IR1 is transferred to the IR2 register. The PC is held one cycle, effectively NOP'ing the first instruction in the loop. |
| Decode | The instruction in IR1 is decoded. The end address of the loop is computed. The PC is held another cycle, effectively NOP'ing the first instruction in the loop. |
| EX1 | SPR Register IEPxR0 is updated with the loop end address, register IEPxR1 is updated with the loop start address, and if the instruction is an EPLOOPI, then IEPxR2 is updated with the loop count value. The PC is held another cycle, effectively NOP'ing the first instruction in the loop again. |
| EX2 | The first instruction of the loop is fetched. The loop counter is compared to zero. Since the loop count is not zero, the first instruction of the loop is executed normally. |

It is important to note that the pipeline stall associated with the EPLOOPI (or EPLOOP) instruction only affects the set up portion of a program loop.

Extended-Precision Accumulation Operations

BOPS, Inc.

Table of Contents

1 The Extended Precision Register (XPR)
2 The MPYXA Instruction
3 The XSCAN instruction

1 The Extended Precision Register (XPR)

The XPR is a 32-bit extension register that is used in two ways:

- For dual 40-bit accumulation, two sets of two 8-bit sub-registers (XPR.B0 and XPR.B1) or (XPR.B2 and XPR.B3) are used to hold the upper-most byte of the accumulated result.
- For single 80-bit accumulation, two 16-bit sub-registers (XPR.H0 and XPR.H1) are used to hold the upper-most byte of the accumulated result.

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| XPR.H1 | | | | | | | | | | | | | | | | XPR.H0 | | | | | | | | | | | | | | | |
| XPR.B3 | | | | | | | | XPR.B2 | | | | | | | | XPR.B1 | | | | | | | | XPR.B0 | | | | | | | |

The specific sub-registers used in an extended precision operation depend on the size of the accumulation (dual 40-bit or single 80-bit) and on the target CRF register pair specified in the instruction. For dual 40-bit accumulation, the 8-bit extension registers XPR.B0 and XPR.B1 (or XPR.B2 and XPR.B3) are associated with a pair of CRF registers. For single 80-bit accumulation, the 16-bit extension register XPR.H0 (or XPR.H1) is associated with a pair of CRF registers.

Dual 40-bit Multiply-Accumulate Extended
During the dual 40-bit accumulation, the even target register is extended using XPR.B0 or XPR.B2, and the odd target register is extended using XPR.B1 or XPR.B3. The tables below describe the register usage in detail.

| 07 | 06 | 05 | 04 | 03 | 02 | 01 | 00 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|---|---|---|---|---|---|---|
| XPR.B0 | | | | | | | | Rte {0, 4, 8, 12, 16, 20, 24, 28} | | | | | | | | | | | | | | | | | | | | | | | | | | | | | | | |

| 07 | 06 | 05 | 04 | 03 | 02 | 01 | 00 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|---|---|---|---|---|---|---|
| XPR.B1 | | | | | | | | Rto {1, 5, 9, 13, 17, 21, 25, 29} | | | | | | | | | | | | | | | | | | | | | | | | | | | | | | | |

| 07 | 06 | 05 | 04 | 03 | 02 | 01 | 00 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|---|---|---|---|---|---|---|
| XPR.B2 | | | | | | | | Rte {2, 6, 10, 14, 18, 22, 26, 30} | | | | | | | | | | | | | | | | | | | | | | | | | | | | | | | |

| 07 | 06 | 05 | 04 | 03 | 02 | 01 | 00 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|---|---|---|---|---|---|---|
| XPR.B3 | | | | | | | | Rto {3, 7, 11, 15, 19, 23, 27, 31} | | | | | | | | | | | | | | | | | | | | | | | | | | | | | | | |

Single 80-bit Multiply-Accumulate Extended
During the 80-bit accumulation, the odd-even register pair is extended using either XPR.H0 or XPR.H1, depending on the even target register (Rte). The tables below describe the register usage in detail.

| 15 | 14 | 13 | 12 | 11 | 10 | 09 | 08 | 07 | 06 | 05 | 04 | 03 | 02 | 01 | 00 | 31-00 | 31-00 |
|---|---|---|---|---|---|---|---|---|---|---|---|---|---|---|---|---|---|
| XPR.H0 | | | | | | | | | | | | | | | | Rto {1, 5, 9, 13, 17, 21, 25, 29} | Rte {0, 4, 8, 12, 16, 20, 24, 28} |

| 15 | 14 | 13 | 12 | 11 | 10 | 09 | 08 | 07 | 06 | 05 | 04 | 03 | 02 | 01 | 00 | 31-00 | 31-00 |
|---|---|---|---|---|---|---|---|---|---|---|---|---|---|---|---|---|---|
| XPR.H1 | | | | | | | | | | | | | | | | Rto {3, 7, 11, 15, 19, 23, 27, 31} | Rte {2, 6, 10, 14, 18, 22, 26, 30} |

The extension registers are part of the Miscellaneous Register File (MRF), and XPR must be explicitly initialized prior to a MPYXA, XSCAN, or XSHR instruction. This may be done with a COPY or LIM instruction. The initialized values depend on whether signed or unsigned arithmetic is being used for the MPYXA instruction and the initial value of the accumulator(s). XPR is not affected by reset.

2 The MPYXA Instruction

The MPYXA instruction adds the product of source registers *Rx* and *Ry* to a target register *Rt* that is extended by the XPR. MPYXA includes the extension register as part of the accumulator(s). The word multiply form of the instruction multiplies two 32-bit values producing a 64-bit result which is sign-extended to 80 bits and then added to the 80-bit extended precision target register. The dual halfword form of the instruction multplies two pairs of 16-bit values producing a 32-bit result which is sign-extended to 40 bits then added to the 40-bit extended precision target register.

The results of successive MPYXA instructions are accumulated in the extended target register.

The XSHR instruction

When a multiply-accumulate (MPYXA) operation is complete, XPR.Hx or XPR.Bo and XPR.Be may hold the most significant bits of the result; it also may not hold the most-significant bits if only sign bits appear in the extension. In order to use the most significant bits of a result (or results) it is necessary to shift the result(s) back into the working CRF registers according to the number of significant bits found in the extension register(s).

Unsigned 40-Bit Results ( XSHR.[SP]D.2UW )
For unsigned 40-bit accumulation the XSHR instruction searches the specified 8-bit extension register for the most-significant '1' bit. If no '1' bits are found, zero is returned to B0 of the target register. If one or more '1' bits are found in the 8-bit extension register, the bit position+1 of the most significant '1' bit is returned in B0 of the target register. Bit positions vary between 0 and 7, therefore the returned values are between 0x00 and 0x08 (0x00 meaning no '1' bits found).

Signed 40-Bit Results ( XSHR.[SP]D.2SW )
In signed accumulation it is possible that the result in the extension register has all sign bits and the lower 32 bits of the result has non-sign bits. Therefore, in signed accumulation, the logic must include the most significant (sign) bit of the 32-bit register pair in the determination of the result. In this case the 40-bit result should still be shifted right by 1 bit to provide one sign bit in the scaled 32-bit result.

For signed 40 bit accumulation the XSHR instruction searches the specified 8-bit extension register for the most-significant '1' bit, if the most significant bit (sign bit) is 0, or it searches for the most significant '0' bit if the most-significant bit (sign bit) is a '1'. If no 'X' bits are found (X is '0' or '1' depending on sign) and the sign bit of the 32-bit register pair is equal to NOT(X), 0x00 is returned to B0 of the target register. If no 'X' bits are found and the sign bit of the 32-bit register pair is equal to X, then 0x01 is returned to B0 of the target register. If 'X' bits are found in the extension register then the bit position+2 of the most-significant 'X' bit is returned to B0 of the target register. These means that the target register may receive a value between 0 and 0x09 (9 decimal). If the value returned is 0x09, then the extension register has overflowed.

The logic operates on each 8-bit extension register in parallel. The low order 8-bit extension register ('even' extension register) is associated with the even numbered CRF register, and the high order 8-bit extension register ('odd' extension register) is associated with the odd register of a pair. The result value for the even extension register is placed in B0 or B2 of the target register, and the result for the odd extension register is placed in B1 or B3 of the target register.

3 The XSCAN instruction

The extended scan (XSCAN) instructions searches extension register XPR for the MSB. For halfword data, the scan operates on a 16-bit extension register, XPR.H1 or XPR.H0. For dual byte data, the scan operates on an 8-bit extension register, XPR.B3, XPR.B2, XPR.B1, or XPR.B0.

Interrupt Processing

BOPS, Inc. Manta SYSSIM 2.31

This chapter describes how general-purpose interrupts (GPI4*-GPI31*), non-maskable interrupt (NMI*) inputs, and others, are recognized, prioritized, processed.

Table of Contents

1 - Overview of Interrupts
2 - Interrupt Modes
3 - Interrupt Sources

3.1 - Synchronous Interrupt Sources 3.1.1 - Setting Bits in the IRR
3.1.2 - SYSCALL Instruction 3.2 - Asynchronous Interrupt Sources 3.2.1 - Debug Interrupt 3.2.1.1 - Address Interrupts
3.2.2 - NMI
3.2.2.1 - Address Interrupts
3.2.3 - GPI-Level Interrupts
3.2.3.1 - DMA
3.2.3.2 - Timer
3.2.3.3 - Bus Errors
3.2.3.4 - External Interrupts
3.2.3.5 - Address Interrupts

4 - Interrupt Selection
5 - Mapping Interrupts to Interrupt Service Routines
6 - Interrupt Control

6.1 - INTSRC Interrupt Source Control Register
6.2 - ADIEN Address Interrupt Enable Register

7 - Interrupt Processing
8 - Interrupt Pipeline Diagrams

8.1 - Saving flag information within the SSR registers
8.2 - Single Cycle SIW 8.2.1 - Single Cycle SIW: Normal Pipe
8.2.2 - Single Cycle SIW: Expanded Pipe 8.3 - Dual Cycle SIW 8.3.1 - Dual Cycle SIW: Normal Pipe
8.3.2 - Dual Cycle SIW: Expanded Pipe 8.4 - Unconditional Branch SIW 8.4.1 - Unconditional Branch SIW: Normal Pipe
8.4.2 - Unconditional Branch SIW: Expanded Pipe 8.5 - Conditional Branch SIW 8.5.1 - Conditional Branch SIW: Normal Pipe
8.5.2 - Conditional Branch SIW: Expanded Pipe 8.6 - Load VLIW instruction 8.6.1 - Load VLIW instruction: Normal Pipe
8.6.2 - Load VLIW instruction: Expanded Pipe 8.7 - Returning from interrupts 8.7.1 - Restoring the flags with the SSRs
8.7.2 - RETI with no other interrupts pending 8.7.3 - RETIcc with no other interrupts pending
8.7.4 - Return with interrupt pending
8.8 - Higher Priority Interrupts

9 - Interrupt Service Routines: Context Save/Restore Guidelines
10 - Interrupt Response Times
11 - Interrupt Vector Table

1 - Overview of Interrupts

A processor interrupt is an event which causes the preemption of the currently executing program in order to initiate special program actions. Processing an interrupt generally involves the following steps:

- Save the minimum context of the currently executing program
- Save the current instruction address (or Program Counter)
- Determine the interrupt service routine (ISR) start address and branch to it
- Execute the interrupt program code until a "return from interrupt" instruction is decoded
- Restore the interrupted program's context
- Restore the Program Counter and resume the interrupted program.

Interrupts are classified in three primary ways:

- interrupt level
- asynchronous vs. synchronous
- maskable vs. non-maskable.

Interrupts at one level cannot preempt interrupts at the same level or interrupts at a higher level (unless specifically overridden by software) but may preempt interrupts at a lower level. This creates a hierarchical interrupt structure. Synchronous interrupts occur as a result of instruction execution while asynchronous interrupts occur as a result of events external to the instruction processing pipeline. Maskable interrupts are those which may be disabled by software while non-maskable interrupts may not be disabled (once enabled) by software.

Interrupt hardware provides for the following:

- Interrupt sources and source selection
- Interrupt control (enable/disable)
- Interrupt mapping: source event-to-ISR
- Hardware support for context save/restore These are discussed further in the following sections.

3 - Interrupt Sources

There are multiple sources of interrupts to the DSP core. These sources may be divided into two basic types, synchronous and asynchronous. Synchronous interrupts are generated as a direct result of instruction execution within the DSP core. Asynchronous interrupts are generated as a result of other system events. Asynchronous interrupt sources may be further divided into external sources (those coming from outside the Manta System Core) and internal sources (those coming from devices within the system core). Up to 32 interrupt signals may be simultaneously asserted to the DSP core at any time, and each of these 32 may arise from multiple sources. A module called the System Interrupt Select Unit (SISU) gathers all interrupt sources and, based on its configuration (programmable in software), selects which possible 32 may be sent to the DSP core. There is a central interrupt controller called the Interrupt Control Unit (ICU) within the DSP core which arbitrates between the 32 pending interrupts. These pending interrupt signals are captured in the Interrupt Request Register (IRR): The ICU then arbitrates between pending interrupts as reflected in the IRR on each cycle.

---

3.1 - Synchronous Interrupt Sources

3.1.1 - Setting Bits in the IRR

One method of initiating an interrupt is by directly setting bits in the Interrupt Request Register (IRR) which is located in the DSP Interrupt Control Unit (ICU). This may be done by Load instructions or DSU COPY or BIT operations.

3.1.2 - SYSCALL Instruction

The SYSCALL interrupt is generated by the SYSCALL instruction. This is a synchronous interrupt which operates at the same level as GPIs. SYSCALL is a control instruction which combines the features of a call instruction with those of an interrupt. The argument to the SYSCALL instruction is a vector number. This number refers to an entry in the SYSCALL table which is located in SP instruction memory starting at address 0x00000080 through address 0x000000FF. There are 32 vectors. A SYSCALL is at the same level as a GPI and causes GPIs to be disabled (via the GIE bit in SCR0). It also uses the same interrupt status and link registers as a GPI.

---

3.2. - Asynchronous Interrupt Sources

This section describes the asynchronous interrupt sources which are grouped under their respective interrupt levels, Debug, NMI and GPI. Note that the Address Interrupt (described below) can generate any of the three levels of interrupts.

3.2.1 - Debug Interrupt

Debug interrupt sources include the Debug Control Register, Debug Instruction Register and Debug Breakpoint Registers. (More on this later)

3.2.1.1 - Address Interrupts

Address interrupts are a mechanism for invoking any interrupt type by writing to a particular address on the MCB. When a write is detected to an address mapped to an Address Interrupt, the corresponding interrupt signal is asserted to the DSP core Interrupt Control Unit. There are four ranges of 32 (byte) addresses each which are defined to generate Address Interrupts. A write to an address in the first range (Range 0) causes the corresponding interrupt (single pulse on the wire to the ICU). A write to Range 1 causes assertion of the corresponding interrupt signal and also write the data to a register "mailbox" (MBOX1). A write to Ranges 2 and 3 has the same effect as Range 1, with data going to register mailboxes 2 and 3 respectively. (See the interrupt source/vector table below).

3.2.2 - NMI

The NMI may come from either an internal or external source. It may be invoked by either a signal or by an Address Interrupt.

3.2.2.1 - Address Interrupts

An Address Interrupt may be used to generate an NMI to the DSP core, as described in section. Debug Interrupts

3.2.3 - GPI Level Interrupts

3.2.3.1 - DMA

There are four DMA interrupt signals (wires), two from each Lane Controller. LCs are also capable of generating Address Interrupts via the MCB.

3.2.3.2 - Timer

The system timer is designed to provide a periodic interrupt source and an absolute time reference.

3.2.3.3 - Bus Errors

When a bus master generates a target address which is not acknowledged by a slave device, an interrupt may be generated.

3.2.3.4 - External Interrupts

External interrupts are signals which are inputs to the System Core interface.

3.2.3.5 - Address Interrupts

An Address Interrupt may be used to generate any GPI to the DSP core, as described in section Debug Interrupts.

4 - Interrupt Selection

External and Internal interrupt signals converge at the System Interrupt Select Unit (SISU). Registers in this unit allow selection and control of internal and external interrupt sources for sending to the DSP ICU. A single register, the Interrupt Source Control Register (INTSRC) determines if a particular interrupt vector will respond to an internal or external interrupt. The following figure shows the interrupt sources converging at the SISU and the resulting set of 30 interrupt signals sent to the Interrupt Request Register (IRR) in the DSP ICU.

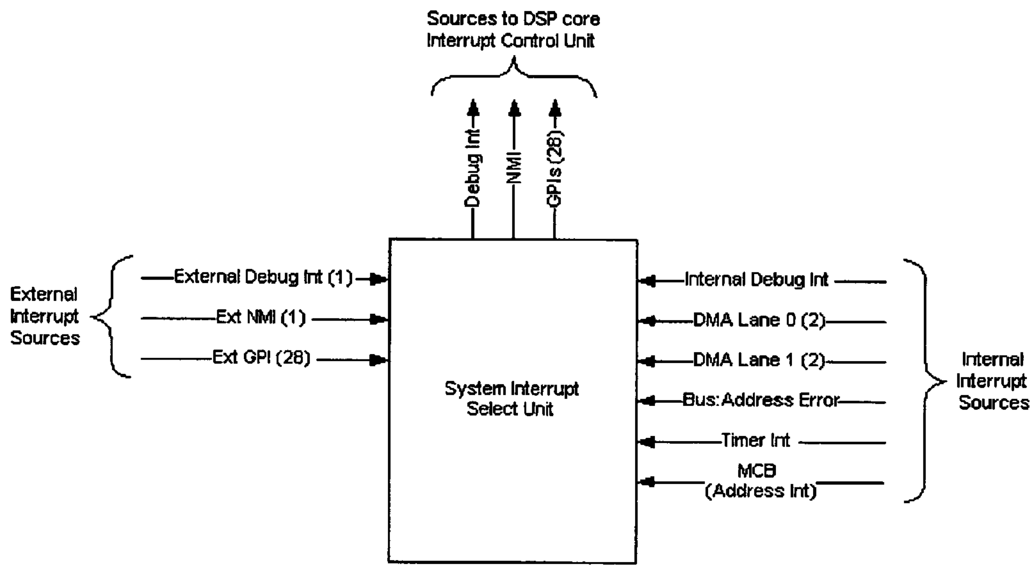

The next figure shows how a single GPI bit of the Interrupt Request Register (IRR) is generated.

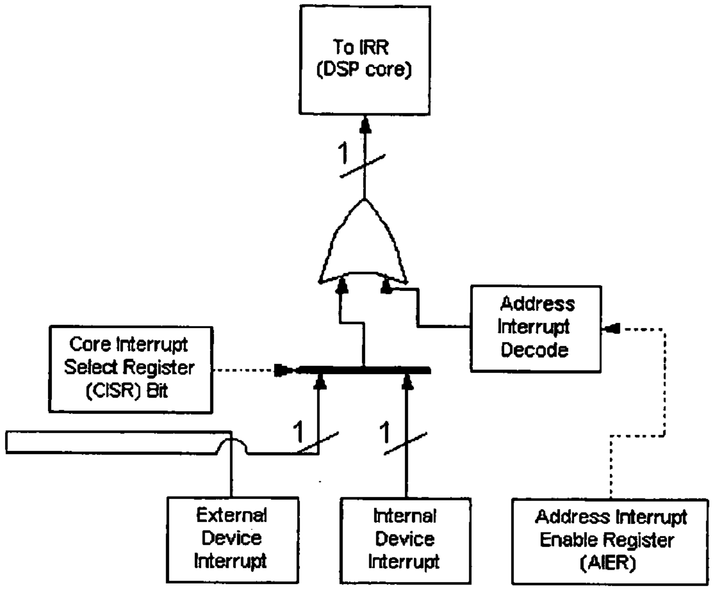
This figure shows how the NMI bit in the IRR is generated from its sources. Note that the sources are OR'd together rather than multiplexed.
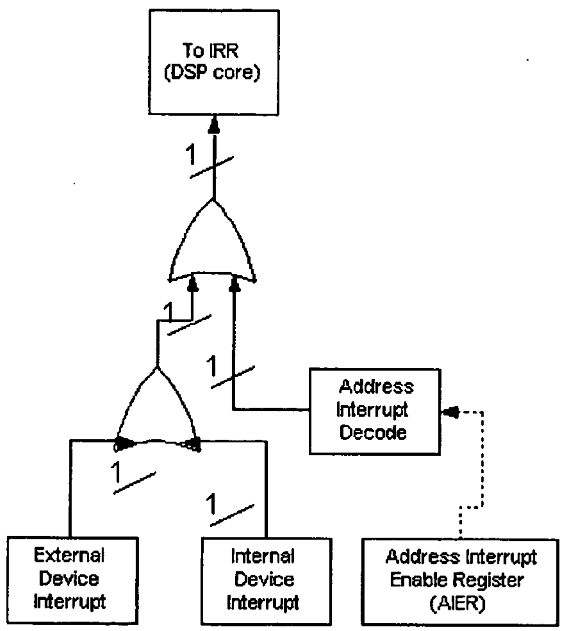
This figure shows how the DBG bit in the IRR is generated from its sources. Note that the sources are OR'd together rather than multiplexed. (This is not final—Debug still under consideration.)

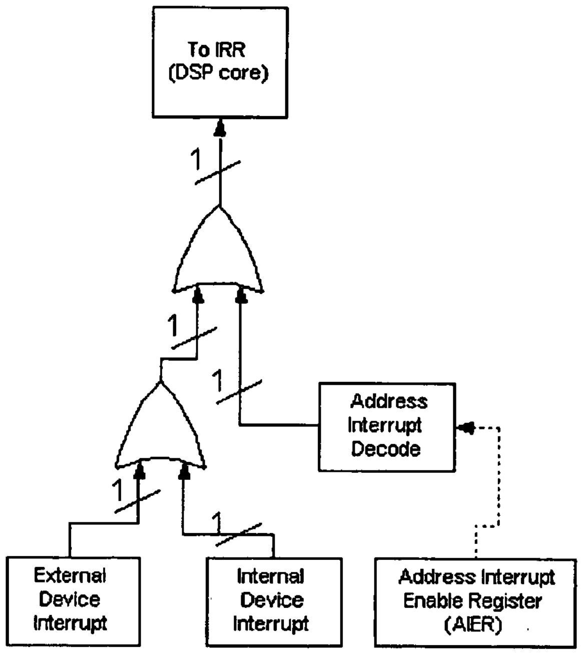

5 - Mapping Interrupts to Interrupt Service Routines (ISRs)

There are two mechanisms for mapping interrupt events to their associated ISRs. Asynchronous interrupts are mapped to interrupt handlers through the Interrupt Vector Table. SYSCALL interrupts (software generated) are mapped to handlers through the SYSCALL vector table.

The Interrupt Vector Table (IVT) resides in Processor Instruction Memory from address 0x00000000 through address 0x0000 007F. It consists of 32 addresses, each of which contains the address of the first instruction of an ISR corresponding to an interrupt source.

The following table describes the assignment of interrupt sources to their corresponding vectors in the Interrupt Vector Table. For details on the mailbox registers (Mbox 1... 3) see Address Interrupts, above.

| Vector | Vector Address in Instruction Memory | Name | Interrupt Sources | | | | | |
|---|---|---|---|---|---|---|---|---|
| | | | External | Internal | Address Interrupt (MCB) Enabled by ADIEN[0] | Address Interrupt (Mbox 1) Enabled by ADIEN[1] | Address Interrupt (Mbox 2) Enabled by ADIEN[2] | Address Interrupt (Mbox 3) Enabled by ADIEN[3] |
| 0 | 0x0000 | ---- | None | Reserved | Reserved | Reserved | Reserved | Reserved |
| 1 | 0x0004 | ---- | None | Reserved | Reserved | Reserved | Reserved | Reserved |
| 2 | 0x0008 | DBG | None | Debug | 0x00300202 | 0x00300222 | 0x00300242 | 0x00300262 |
| 3 | 0x000c | NMI | ExtNMI | BusError | 0x00300203 | 0x00300223 | 0x00300243 | 0x00300263 |
| 4 | 0x0010 | GPI04 | ExtInt04 | Sys Timer | 0x00300204 | 0x00300224 | 0x00300244 | 0x00300264 |
| 5 | 0x0014 | GPI05 | ExtInt05 | Reserved | 0x00300205 | 0x00300225 | 0x00300245 | 0x00300265 |
| 6 | 0x0018 | GPI06 | ExtInt06 | Reserved | 0x00300206 | 0x00300226 | 0x00300246 | 0x00300266 |

| | | | | | | | | |
|---|---|---|---|---|---|---|---|---|
| 7 | 0x001c | GPI07 | ExtInt07 | Reserved | 0x00300207 | 0x00300227 | 0x00300247 | 0x00300267 |
| 8 | 0x0020 | GPI08 | ExtInt08 | DMA0_ctu | 0x00300208 | 0x00300228 | 0x00300248 | 0x00300268 |
| 9 | 0x0024 | GPI09 | ExtInt09 | DMA0_stu | 0x00300209 | 0x00300229 | 0x00300249 | 0x00300269 |
| 10 | 0x0028 | GPI10 | ExtInt10 | DMA1_ctu | 0x0030020A | 0x0030022A | 0x0030024A | 0x0030026A |
| 11 | 0x002c | GPI11 | ExtInt11 | DMA1_stu | 0x0030020B | 0x0030022B | 0x0030024B | 0x0030026B |
| 12 | 0x0030 | GPI12 | ExtInt12 | Reserved | 0x0030020C | 0x0030022C | 0x0030024C | 0x0030026C |
| 13 | 0x0034 | GPI13 | ExtInt13 | Reserved | 0x0030020D | 0x0030022D | 0x0030024D | 0x0030026D |
| 14 | 0x0038 | GPI14 | ExtInt14 | Reserved | 0x0030020E | 0x0030022E | 0x0030024E | 0x0030026E |
| 15 | 0x003c | GPI15 | ExtInt15 | Reserved | 0x0030020F | 0x0030022F | 0x0030024F | 0x0030026F |
| 16 | 0x0040 | GPI16 | ExtInt16 | Reserved | 0x00300210 | 0x00300230 | 0x00300250 | 0x00300270 |
| 17 | 0x0044 | GPI17 | ExtInt17 | Reserved | 0x00300211 | 0x00300231 | 0x00300251 | 0x00300271 |
| 18 | 0x0048 | GPI18 | ExtInt18 | Reserved | 0x00300212 | 0x00300232 | 0x00300252 | 0x00300272 |
| 19 | 0x004c | GPI19 | ExtInt19 | Reserved | 0x00300213 | 0x00300233 | 0x00300253 | 0x00300273 |
| 20 | 0x0050 | GPI20 | ExtInt20 | Reserved | 0x00300214 | 0x00300234 | 0x00300254 | 0x00300274 |
| 21 | 0x0054 | GPI21 | ExtInt21 | Reserved | 0x00300215 | 0x00300235 | 0x00300255 | 0x00300275 |
| 22 | 0x0058 | GPI22 | ExtInt22 | Reserved | 0x00300216 | 0x00300236 | 0x00300256 | 0x00300276 |
| 23 | 0x005c | GPI23 | ExtInt23 | Reserved | 0x00300217 | 0x00300237 | 0x00300257 | 0x00300277 |
| 24 | 0x0060 | GPI24 | ExtInt24 | Reserved | 0x00300218 | 0x00300238 | 0x00300258 | 0x00300278 |
| 25 | 0x0064 | GPI25 | ExtInt25 | Reserved | 0x00300219 | 0x00300239 | 0x00300259 | 0x00300279 |
| 26 | 0x0068 | GPI26 | ExtInt26 | Reserved | 0x0030021A | 0x0030023A | 0x0030025A | 0x0030027A |
| 27 | 0x006c | GPI27 | ExtInt27 | Reserved | 0x0030021B | 0x0030023B | 0x0030025B | 0x0030027B |
| 28 | 0x0070 | GPI28 | ExtInt28 | Reserved | 0x0030021C | 0x0030023C | 0x0030025C | 0x0030027C |
| 29 | 0x0074 | GPI29 | ExtInt29 | Reserved | 0x0030021D | 0x0030023D | 0x0030025D | 0x0030027D |
| 30 | 0x0078 | GPI30 | ExtInt30 | Reserved | 0x0030021E | 0x0030023E | 0x0030025E | 0x0030027E |
| 31 | 0x007c | GPI31 | ExtInt31 | Reserved | 0x0030021F | 0x0030023F | 0x0030025F | 0x0030027F |

Example:

Interrupt GPI04 has an associated interrupt vector 04 at address 0x00000010 in instruction memory which should be initialized to contain the address of the first instruction of an ISR. This vector may be invoked by an external source (if the external source is enabled in the INTSRC), or by any of the internal sources. The System Timer interrupt is mapped to GPI04, and writes to addresses 0x00300004, 0x00300024, 0x00300044, and 0x00300064 will cause interrupts if their respective ranges are enabled in the ADIEN. Writes to the last three addresses will additionally latch data in "mailbox" registers (used for interprocessor communication).

The following table shows the SYSCALL vector mapping. ISRs which are invoked with SYSCALL have the same characteristics as GPI ISRs.

| SYSCALL Vector | Vector Address in Instruction Memory | Name |
|---|---|---|
| 0 | 0x0080 | SYSCALL0 |
| 1 | 0x0084 | SYSCALL1 |
| 2 | 0x0088 | SYSCALL2 |
| 3 | 0x008c | SYSCALL3 |
| 4 | 0x0090 | SYSCALL4 |
| 5 | 0x0094 | SYSCALL5 |
| 6 | 0x0098 | SYSCALL6 |
| 7 | 0x009c | SYSCALL7 |
| 8 | 0x00a0 | SYSCALL8 |
| 9 | 0x00a4 | SYSCALL9 |
| 10 | 0x00a8 | SYSCALL10 |
| 11 | 0x00ac | SYSCALL11 |
| 12 | 0x00b0 | SYSCALL12 |
| 13 | 0x00b4 | SYSCALL13 |
| 14 | 0x00b8 | SYSCALL14 |
| 15 | 0x00bc | SYSCALL15 |
| 16 | 0x00c0 | SYSCALL16 |
| 17 | 0x00c4 | SYSCALL17 |
| 18 | 0x00c8 | SYSCALL18 |
| 19 | 0x00cc | SYSCALL19 |
| 20 | 0x00d0 | SYSCALL20 |
| 21 | 0x00d4 | SYSCALL21 |
| 22 | 0x00d8 | SYSCALL22 |

| | | |
|---|---|---|
| 23 | 0x00dc | SYSCALL23 |
| 24 | 0x00e0 | SYSCALL24 |
| 25 | 0x00e4 | SYSCALL25 |
| 26 | 0x00e8 | SYSCALL26 |
| 27 | 0x00ec | SYSCALL27 |
| 28 | 0x00f0 | SYSCALL28 |
| 29 | 0x00f4 | SYSCALL29 |
| 30 | 0x00f8 | SYSCALL30 |
| 31 | 0x00fc | SYSCALL31 |

6 - Interrupt Control

Registers involved with interrupt control are shown in the following table.

| Mnemonic | Reg Type | Name | Description |
|---|---|---|---|
| INTSRC | SPR | Core Interrupt Select Register | Selects between and external and internal source for an interrupt signal to the DSP ICU. |
| ADIEN | SPR | Address Interrupt Enable Register | Enables address ranges for interrupt generation. |
| IER | MRF | Interrupt Enable Register | Interrupt enable/disable at the DSP core. |
| IRR | MRF | Interrupt Request Register | Latches pending interrupts to the DSP core. |
| SCR0 | MRF | Status and Control Register 0 | Bits: GIE, NMIE and DBIE control interrupt enables for GPIs, NMI and Debug interrupt classes respectively. The 'ILVL' field indicates the current operating mode and is used to determine RETI operation (which registers are selected for hardware restore). |
| MRFXAR | MRF | MRF Extension Address Register | The value in this register determines the currently addressed MRF Extension Register. A bit in this register also enables auto-increment of the address. |
| MRFXDR | MRF | MRF Extension Data Register | This register indirectly allows access to the MRF Extension register addressed by MRFXAR. |
| ALUIFR0 | MRFX | ALU Interrupt Forwarding Register 0 | Stores first 32 bits of ALU 2-cycle instruction write-data during interrupt processing. |
| ALUIFR1 | MRFX | ALU Interrupt Forwarding Register 1 | Stores second 32 bits of ALU 2-cycle instruction write-data during interrupt processing. |
| MAUIFR0 | MRFX | MAU Interrupt Forwarding Register 0 | Stores first 32 bits of MAU 2-cycle instruction write-data during interrupt processing. |
| MAUIFR1 | MRFX | MAU Interrupt Forwarding Register 1 | Stores second 32 bits of MAU 2-cycle instruction write-data during interrupt processing. |
| IFRADR | MRFX | Interrupt Forwarding Register Address Register | Stores IFR target register addresses and write-enables for 2-cycle instructions during interrupt processing. |
| SSR0 | MRFX | Saved Status | Stores first 32-bits of hot conditions for interrupt processing |

| | | | |
|---|---|---|---|
| | | Register 0 | |
| Status Saved Register1 | MRFX | Saved Status Register 1 | Stores second 32-bits of hot conditions for interrupt processing. |
| Status Saved Register2 | MRFX | Saved Status Register 2 | Stores third 32-bits of hot conditions for interrupt processing. |

6.1 - INTSRC Interrupt Source Control Register

Reset value: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| EXT31 | EXT30 | EXT29 | EXT28 | EXT27 | EXT26 | EXT25 | EXT24 | EXT23 | EXT22 | EXT21 | EXT20 | EXT19 | EXT18 | EXT17 | EXT16 | EXT15 | EXT14 | EXT13 | EXT12 | EXT11 | EXT10 | EXT09 | EXT08 | EXT07 | EXT06 | EXT05 | EXT04 | R | R | R | R |

R Reserved

EXTxx 0 = Internal source
1 = External source

6.2 - ADIEN Address Interrupt Enable Register

Reset value: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Reserved | | | | | | | | | | | | | | | | | | | | | | | | | | | | AIR3 | AIR2 | AIR1 | AIR0 |

R Reserved

AIRx Enable Address Interrupt Range 'x'
0 = Address Interrupt disabled for range 'x'
1 = Address Interrupt enabled for range 'x'

Each of the EAIR bits enables/disables a range of addresses for interrupt generation.

7 - Interrupt Processing

Interrupt processing involves the following steps:

1. Interrupt detection
2. Interrupt arbitration
3. Save essential program state (PC, flags, 2-cycle target data)
4. Fetch IVT vector into PC
5. Execute ISR
6. Execute RETI
7. Restore essential program state
8. Restore PC from appropriate interrupt link register The main points are:

- When multiple interrupts are pending their service order is as follows:
- Debug
- NMI
- GPI04, GPI05,... etc.
- A SYSCALL instruction, if in decode, will execute as if it were of higher priority than any GPI. If there is an NMI or Debug interrupt pending, then the SYSCALL ISR will be preempted after the first instruction is admitted to the pipe (only one instruction of the ISR will execute).
- One instruction is allowed to execute at any level before the next interrupt is allowed to preempt. This means that if an RETI is executed within a GPI ISR and another GPI is pending, then exactly one instruction of the USER level program will execute before the next GPI's ISR is fetched.
- The Debug interrupt saves PC, flags and IFR data when it is acknowledged while in User mode. If it is acknowledged while in GPI mode or NMI mode, it will only save PC and flags (it uses the same IFR registers as the GPI level).
- If processing a Debug interrupt ISR, and the Debug IRR bit is set, then an RETI will result in exactly one instruction executing before returning to the Debug ISR. LV instructions are not interruptable and therefore are considered one (multi-cycle) instruction.

8 - Interrupt Pipeline Diagrams

The tables found in the following sections illustrate Interrupt Processing as currently implemented. The columns in the table show the State of the interrupt state machine (State), a bit within the interrupt request register (IRR), the instruction whose address is contained in the interrupt link register (ILR), the state of the interrupt status register (ISR), the state of the global interrupt enable bit found in SCR0 (GPIE, NMIE, or DBIE), the interrupt level (ILVL), and the instruction being processed in the set of pipeline stages (F,PD,D,EX1,EX2,CR). It is assumed that the individually selectable general purpose interrupt enables found in the IER are enabled if the IRR bit is referring to bits 4 through 31. The interrupt vector number that is stored in SCR1 gets updated at the same time that ILVL is updated in SCR0.

8.1 - Saving flag information within the SSR registers

Any time an interrupt is taken, there will be 3 cycles during which information needed to restore the pipeline is saved away in the Saved Status Registers (SSR0, SSR1, and SSR2). The information is saved when the SSR-SAVE column in the table below has a "1" in it. The easiest way to understand how the three 32-bit SSR registers are loaded is by breaking them down into six 16-bit. SSR0 is made up of the User Mode Decode Phase (UMDP) and User Mode Execute Phase(UMEP) components. SSR1 is made up of the User Mode Condition Return Phase (UMCP) and System Mode Condition Return Phase (SMCP) components. SSR2 is made up of the System Mode Decode Phase (SMDP) and System Mode Execute Phase (SMEP) components. After an interrupt comes along, the data is always first stored to the system mode registers. Then depending on the mode of operation before and after the interrupt, the system mode registers, may be transferred to the user mode registers. If the SSR-XFER bit is asserted, the contents of the system mode registers are transferred to the user mode registers. If the mode of operation before the interrupt is taken is mode USER mode, the SSR-XFER will be asserted. In addition, if the mode of operation before the interrupt is SYSTEM, and the current state is SYSTEM, the SSR-XFER will be asserted.

Table 8.1 - Saving flag information within the SSR registers

| Cycle | SSR-SAVE | SSR-XFER | Op in Fetch | System Mode | | | User Mode | | |
|---|---|---|---|---|---|---|---|---|---|
| | | | | SMCP | SMEP | SMDP | UMCP | UMEP | UMDP |
| 1 | 0 | 0 | Add | SMCP | SMEP | SMDP | UMCP | UMEP | UMDP |
| 2 | 0 | 0 | | SMCP | SMEP | SMDP | UMCP | UMEP | UMDP |
| 3 | 1 | 0 | | SMCP | SMEP | SMDP | UMCP | UMEP | UMDP |

| | | | | | | | | | |
|---|---|---|---|---|---|---|---|---|---|
| 4 | 1* | 0 | FSub EX1 | | SMCP | SMEP | UMCP | UMEP | UMDP |
| 5 | 1 | 0 | FSub EX2 | (Note 3) | | SMEP | UMCP | UMEP | UMDP |
| 6 | 0 | 1 | - | (Note 4) | SMCP | | UMCP | UMEP | UMDP |
| 7 | 0 | 0 | - | SMCP | SMEP | | SMCP | SMEP | |
| 8 | 0 | 0 | - | SMCP | SMEP | SMDP | UMCP | UMEP | UMDP |

In this example, the FSub is preempted by the Interrupt. In cycle 4, since the SSR-SAVE signal was asserted, the FSub Hotflags and Hot State Flags will be saved into SMCP. ( Note 1. ) ( Throughout the discussion of interrupts, information related to the first preempted Op is shaded magenta. ) In cycle 5, SMEP is loaded with the contents of SMCP, and SMCP is loaded with the current Hotflags and the Hot State Flags from cycle 4. (Note 2.) (This information is blue. ) In cycle 6, SMDP gets the contents of SMEP, SMEP gets the contents of SMCP, and SMCP gets loaded with the current Hotflags, and the Hot State Flags for cycle 4. ( Note 3. ) (This information is yellow.) In cycle 7, since the SSR-XFER signal was asserted in the previous cycle, the User Mode Phase components are loaded with copies of the System Mode Phase components.

SMCP – System Mode Condition Return Phase ( Upper Half of SSR1)

SMEP – System Mode Execution Phase (Upper Half of SSR2)

SMDP – System Mode Decode Phase (Lower Half of SSR2)

UMCP – User Mode Condition Return Phase (Lower Half of SSR1)

UMEP – User Mode Execute Phase (Upper Half of SSR0)

UMDP – User Mode Decode Phase (Lower Half of SSR0)

Note 1. The SMCP is loaded with the Hotflags (CNVZ & F0-F7) and the HOTSFs for the Instruction that would be in Execute if the interrupt hadn't occurred ( In this example, the FSub)

Note 2. The SMCP is loaded with the Hotflags (CNVZ & F0-F7) and the HOTSFs from the previous cycle Note 3. The SMCP is loaded with the Hotflags (CNVZ & F0-F7) and the HOTSFs from two cycles before HOTSFs: Hot State Flags HOTSFs = {HOTSF3, HOTSF2,HOTSF1,HOTSF0};
HOTSF3 = bit indicating that a 2-cycle operation is in execute and it could have control of the flag update.
HOTSF2 = bit indicating that a 2-cycle ALU instruction is in the execute (EX1) pipeline stage.
HOTSF1 = bit indicating that a 2-cycle MAU instruction is in the execute (EX1) pipeline stage.
HOTSF0 = bit indicating that a LU or DSU instruction that is targeted at SCR0 is in the execute (EX1) pipeline stage.
*Note: Whenever the SSR-save bit is asserted and a 2-cycle operation (ALU or MAU) is in the EX2 pipeline stage, the target (Compute Register) of the 2-cycle operation is not updated. Rather, the data, address, and write enables (i.e., bits indicating data type) are stored in the corresponding ALUIFDR0, ALUIFDR1, MAUIFDR0, MAUIFDR1, and AMADDR registers.

---

8.2 - Single Cycle SIW

8.2.1 - Single Cycle SIW: Normal Pipe

Table 8.2.1 - Single Cycle SIW: Normal Pipe (User Level Program preempted by a GPI)

| Cycle | Interrupt State | SSR-SAVE | SSR-XFER | IRR | Interrupt Link Register | ISR | IE | ILVL | F | PD | D | EX1 | CR |
|---|---|---|---|---|---|---|---|---|---|---|---|---|---|
| 1 | IDLE | 0 | 0 | 0 | - | - | 1 | USR | Add | | | | |
| 2 | IDLE | 0 | 0 | 1 | - | - | 1 | USR | | | Add | | |

| | | | | | | | | | | | | | |
|---|---|---|---|---|---|---|---|---|---|---|---|---|---|
| 3 | ARB | 1 | 0 | 1 | - | - | 1 | USR | - | | | [illegible] | |
| 4 | IVEC | 1 | 0 | 1 | - | - | 1 | USR | IVEC | | Nop | Nop | [illegible] |
| 5 | ISR | 1 | 0 | 1 | - | - | 1 | USR | | | Nop | Nop | Nop |
| 6 | | 0 | 1* | | | | | | | | | Nop | Nop |
| 7 | | 0 | 0 | 0/1 | Sub | SCR0 | 0 | GPI | | | | | Nop |
| 8 | | 0 | 0 | 0/1 | Sub | SCR0 | 0 | GPI | | | | | |

*Note that the SSR-XFER bit is asserted in this case since it is a GPI taking the mode of operation from a user mode (ILVL=USR) to a system mode (ILVL=GPI). It would also be asserted when taking an interrupt that leaves the mode of operation in the same mode as it was before the interrupt came along (i.e., nesting general purpose interrupts).

IRR – Interrupt Request Register. The bit corresponding to the interrupt taken is cleared in the IRR.

ILR – General Purpose or Debug Interrupt Link Register – Hold the address of the instruction that will be executed following the interrupt. Here only one of these registers (GPILR) is shown.

ISR – General Purpose or Debug Interrupt Status Register – Contains a copy of SCR0, to that flag state may be restored following the interrupt. Here only one of these registers (GPISR) is shown.

IE – Interrupt Enable. Bits 31-29 of SCR0 are GPI Enable, NMI Enable, and DBI Enable--here only the applicable enable bit (GPIE) is shown.

ILVL – Interrupt Level. Bits 28 and 27 of SCR0 contain the ILVL – User, GPI, NMI, or Debug.

---

8.2.2 - Single Cycle SIW: Expanded Pipe

Table 8.2.2 - Single Cycle SIW: Expanded Pipe

---

8.3 - Dual Cycle SIW

8.3.1 - Dual Cycle SIW: Normal Pipe

Table 8.3.1 - Dual Cycle SIW: Normal Pipe

| Cycle | Interrupt State | SSR-SAVE | SSR-XFER | IRR | ILR | ISR | IE | ILVL | F | PD | D | EX1 | EX2 | CR |
|---|---|---|---|---|---|---|---|---|---|---|---|---|---|---|
| 1 | IDLE | 0 | 0 | 0 | - | - | 1 | Old | [illegible] | | | | | |
| 2 | IDLE | 0 | 0 | 1 | - | - | 1 | Old | | | [illegible] | | | |
| 3 | ARB | 1 | 0 | 1 | - | - | 1 | Old | - | | | [illegible] | | |
| 4 | ARB | 1° | 0 | 1 | - | - | 1 | Old | - | | Nop | Nop | [illegible] | |
| 5 | IVEC | 1 | 0 | 1 | - | - | 1 | Old | IVEC | | Nop | Nop | Nop | [illegible] |
| 6 | ISR | 0 | 1 | 1 | - | - | 1 | Old | | | Nop | Nop | Nop | Nop |
| 7 | | 0 | 0 | | | | | | | | | Nop | Nop | Nop |
| 8 | | 0 | 0 | 0/1 | Sub | SCR0 | 0 | New | | | | | Nop | Nop |

| | | | | | | | | | | | | | | | |
|---|---|---|---|---|---|---|---|---|---|---|---|---|---|---|---|
| 9 | | 0 | 0 | 0/1 | Sub | SCR0 | 0 | New | | | | | | | Nop |
| 10 | | 0 | 0 | 0/1 | Sub | SCR0 | 0 | New | | | | | | | |

* : Save Two-cycle Op results from EX2 to appropriate ALU/ MAU Interrupt Forwarding Data Registers

---

8.3.2 - Dual Cycle SIW: Expanded Pipe

Table 8.3.2 - Dual Cycle SIW: Expanded Pipe

| Cycle | Interrupt State | SSR-SAVE | SSR-XFER | IRR | ILR | ISR | IE | ILVL | F | PD | D | EX1 | EX2 | CR |
|---|---|---|---|---|---|---|---|---|---|---|---|---|---|---|
| 1 | IDLE | 0 | 0 | 0 | - | - | 1 | Old | [illegible] | | | | | |
| 2 | IDLE | 0 | 0 | 1 | - | - | 1 | Old | | [illegible] | | | | |
| 3 | WAIT | 0 | 0 | 1 | - | - | 1 | Old | - | | [illegible] | | | |
| 4 | ARB | 1 | 0 | 1 | - | - | 1 | Old | - | Nop | | [illegible] | | |
| 5 | ARB | [illegible] | 0 | 1 | - | - | 1 | Old | - | Nop | Nop | Nop | [illegible] | |
| 6 | IVEC | 1 | 0 | 1 | - | - | 1 | Old | IVEC | Nop | Nop | Nop | Nop | [illegible] |
| 7 | ISR | 0 | 1 | 1 | - | - | 1 | Old | | Nop | Nop | Nop | Nop | Nop |
| 8 | | 0 | 0 | | | | | | | | Nop | Nop | Nop | Nop |
| 9 | | 0 | 0 | 0/1 | Sub | SCR0 | 0 | New | | | | Nop | Nop | Nop |
| 10 | | 0 | 0 | 0/1 | Sub | SCR0 | 0 | New | | | | | Nop | Nop |
| 11 | | 0 | 0 | 0/1 | Sub | SCR0 | 0 | New | | | | | | Nop |
| 12 | | 0 | 0 | 0/1 | Sub | SCR0 | 0 | New | | | | | | |

* : Save Two-cycle Op results from EX2 to appropriate ALU/ MAU Interrupt Forwarding Data Registers

---

8.4 - Unconditional Branch SIW

8.4.1 - Unconditional Branch SIW: Normal Pipe

Table 8.4.1 - Unconditional Branch SIW: Normal Pipe

| Cycle | Interrupt State | SSR-SAVE | SSR-XFER | IRR | ILR | ISR | IE | ILVL | F | PD | D | EX1 | CR |
|---|---|---|---|---|---|---|---|---|---|---|---|---|---|
| 1 | IDLE | 0 | 0 | 0 | - | - | 1 | Old | Jmp | | | | |
| 2 | IDLE | 0 | 0 | 1 | - | - | 1 | Old | | | Jmp | | |
| 3 | ARB | 1 | 0 | 1 | - | - | 1 | Old | - | | | Nop | |
| 4 | IVEC | 1 | 0 | 1 | - | - | 1 | Old | IVEC | | Nop | Nop | Nop |

| | | | | | | | | | | | | | |
|---|---|---|---|---|---|---|---|---|---|---|---|---|---|
| 5 | ISR | 1 | 0 | 1 | - | - | 1 | Old | | | Nop | Nop | Nop |
| 6 | | 0 | 1 | | | | | | | | | Nop | Nop |
| 7 | | 0 | 0 | 0/1 | BrTrg | SCR0 | 0 | New | | | | | Nop |
| 8 | | 0 | 0 | 0/1 | BrTrg | SCR0 | 0 | New | | | | | |

8.4.2 - Unconditional Branch SIW: Expanded Pipe

Table 8.4.2 Unconditional Branch SIW: Expanded Pipe

| Cycle | Interrupt State | SSR-SAVE | SSR-XFER | IRR | ILR | ISR | IE | ILVL | F | PD | D | EX1 | CR |
|---|---|---|---|---|---|---|---|---|---|---|---|---|---|
| 1 | IDLE | 0 | 0 | 0 | - | - | 1 | Old | [illegible] | | | | |
| 2 | IDLE | 0 | 0 | 1 | - | - | 1 | Old | | [illegible] | | | |
| 3 | IDLE | 0 | 0 | 1 | - | - | 1 | Old | - | | [illegible] | | |
| 4 | ARB | 1 | 0 | 1 | - | - | 1 | Old | - | Nop | | | |
| 5 | IVEC | 1 | 0 | 1 | - | - | 1 | Old | IVEC | | Nop | Nop | |
| 6 | ISR | 1 | 0 | 1 | - | - | 1 | Old | | | Nop | Nop | Nop |
| 7 | | 0 | 1 | | | | | | | | | Nop | Nop |
| 8 | | 0 | 0 | 0/1 | BrTrg | SCR0 | 0 | New | | | | | Nop |
| 9 | | 0 | 0 | 0/1 | BrTrg | SCR0 | 0 | New | | | | | |

In Cycle 5, the Pipe contracts from Extended to Normal—PreDecode is no longer used.

8.5 - Conditional Branch SIW

8.5.1 - Conditional Branch SIW: Normal Pipe

Table 8.5.1 – Conditional Branch SIW: Normal Pipe

| Cycle | Interrupt State | SSR-SAVE | SSR-XFER | IRR | ILR | ISR | IE | ILVL | F | PD | D | EX1 | CR |
|---|---|---|---|---|---|---|---|---|---|---|---|---|---|
| 1 | IDLE | 0 | 0 | 0 | - | - | 1 | Old | JmpZ | | | | |
| 2 | IDLE | 0 | 0 | 1 | - | - | 1 | Old | | | JmpZ | | |
| 3 | WAIT | 0 | 0 | 1 | - | - | 1 | Old | - | | | JmpZ | |
| 4 | ARB | 1 | 0 | 1 | - | - | 1 | Old | - | | Nop | Nop | Nop |
| 5 | IVEC | 1 | 0 | 1 | - | - | 1 | Old | IVEC | | Nop | Nop | Nop |
| 6 | ISR | 1 | 0 | 1 | - | - | 1 | Old | | | Nop | Nop | Nop |

| | | | | | | | | | | | | | | |
|---|---|---|---|---|---|---|---|---|---|---|---|---|---|---|
| 7 | | 0 | 1 | | | | | | | | | | Nop | Nop |
| 8 | | 0 | 0 | 0/1 | BrTrg | SCR0 | 0 | New | | | | | | Nop |
| 9 | | 0 | 0 | 0/1 | BrTrg | SCR0 | 0 | New | | | | | | |

In Cycle 3, the Interrupt State will WAIT for the JmpZ be evaluated in Decode before issuing an ARB.

---

8.5.2 - Conditional Branch SIW: Expanded Pipe

Table 8.5.2 – Conditional Branch SIW: Expanded Pipe

| Cycle | Interrupt State | SSR-SAVE | SSR-XFER | IRR | ILR | ISR | IE | ILVL | F | PD | D | EX1 | CR |
|---|---|---|---|---|---|---|---|---|---|---|---|---|---|
| 1 | IDLE | 0 | 0 | 0 | - | - | 1 | Old | JmpZ | | | | |
| 2 | IDLE | 0 | 0 | 1 | - | - | 1 | Old | | JmpZ | | | |
| 3 | WAIT | 0 | 0 | 1 | - | - | 1 | Old | - | | JmpZ | | |
| 4 | WAIT | 0 | 0 | 1 | - | - | 1 | Old | - | Nop | Nop | JmpZ | |
| 5 | ARB | 1 | 0 | 1 | - | - | 1 | Old | - | Nop | Nop | Nop | Nop |
| 6 | IVEC | 1 | 0 | 1 | - | - | 1 | Old | IVEC | | Nop | Nop | Nop |
| 7 | ISR | 1 | 0 | 1 | - | - | 1 | Old | | | Nop | Nop | Nop |
| 8 | | 0 | 1 | | | | | | | | | Nop | Nop |
| 9 | | 0 | 0 | 0/1 | BrTrg | SCR0 | 0 | New | | | | | Nop |
| 10 | | 0 | 0 | 0/1 | BrTrg | SCR0 | 0 | New | | | | | |

In Cycles 3 and 4, the Interrupt State will WAIT for the JmpZ be evaluated in Decode before issuing an ARB.

In Cycle 6, the Pipe contracts from Extended to Normal—PreDecode is no longer used.

---

8.6 - Load VLIW instruction

8.6.1 - Load VLIW instruction: Normal Pipe

Table 8.6.1 – Load VLIW Instruction: Normal Pipe

| Cycle | Interrupt State | SSR-SAVE | SSR-XFER | IRR | ILR | ISR | IE | ILVL | F | PD | D | EX1 | CR |
|---|---|---|---|---|---|---|---|---|---|---|---|---|---|
| 1 | IDLE | 0 | 0 | 0 | - | - | 1 | Old | LV 5 | | | | |
| 2 | IDLE | 0 | 0 | 1 | - | - | 1 | Old | Sd | | LV 5 | | |
| 3 | WAIT | 0 | 0 | 1 | - | - | 1 | Old | Ld | | Nop | Nop | |
| 4 | WAIT | 0 | 0 | 1 | - | - | 1 | Old | Add | | Nop | Nop | Nop |

| | | | | | | | | | | | | | |
|---|---|---|---|---|---|---|---|---|---|---|---|---|---|
| 5 | WAIT | 0 | 0 | 1 | - | - | 1 | Old | | | Nop | Nop | Nop |
| 6 | WAIT | 0 | 0 | 1 | - | - | 1 | Old | | | Nop | Nop | Nop |
| 7 | WAIT | 0 | 0 | 1 | - | - | 1 | Old | | | Nop | Nop | Nop |
| 8 | ARB | 1 | 0 | 1 | - | - | 1 | Old | - | | | Nop | Nop |
| 9 | IVEC | 1 | 0 | 1 | - | - | 1 | Old | IVEC | | Nop | Nop | Nop |
| 10 | ISR | 1 | 0 | 1 | - | - | 1 | Old | | | Nop | Nop | Nop |
| 11 | | 0 | 1 | | | | | | | | | Nop | Nop |
| 12 | | 0 | 0 | 0/1 | Mpy | SCR0 | 0 | New | | | | | Nop |
| 13 | | 0 | 0 | 0/1 | Mpy | SCR0 | 0 | New | | | | | |

In Cycle 3, the Interrupt State will WAIT for the LV to complete before issuing an ARB.

8.6.2 - Load VLIW instruction: Expanded Pipe

Table 8.6.2 - Load VLIW instruction: Expanded Pipe

| Cycle | Interrupt State | SSR-SAVE | SSR-XFER | IRR | ILR | ISR | IE | ILVL | F | PD | D | EX1 | CR |
|---|---|---|---|---|---|---|---|---|---|---|---|---|---|
| 1 | IDLE | 0 | 0 | 0 | - | - | 1 | Old | | | | | |
| 2 | IDLE | 0 | 0 | 1 | - | - | 1 | Old | | | | | |
| 3 | WAIT | 0 | 0 | 1 | - | - | 1 | Old | | | Nop | | |
| 4 | WAIT | 0 | 0 | 1 | - | - | 1 | Old | | | Nop | Nop | |
| 5 | WAIT | 0 | 0 | 1 | - | - | 1 | Old | | | Nop | Nop | Nop |
| 6 | WAIT | 0 | 0 | 1 | - | - | 1 | Old | | | Nop | Nop | Nop |
| 7 | WAIT | 0 | 0 | 1 | - | - | 1 | Old | | | Nop | Nop | Nop |
| 8 | ARB | 1 | 0 | 1 | - | - | 1 | Old | - | | | Nop | Nop |
| 9 | IVEC | 1 | 0 | 1 | - | - | 1 | Old | IVEC | | Nop | Nop | Nop |
| 10 | ISR | 1 | 0 | 1 | - | - | 1 | Old | | | Nop | Nop | Nop |
| 11 | | 0 | 1 | | | | | | | | | Nop | Nop |
| 12 | | 0 | 0 | 0/1 | Mpy | SCR0 | 0 | New | | | | | Nop |
| 13 | | 0 | 0 | 0/1 | Mpy | SCR0 | 0 | New | | | | | |

8.7 - Returning from interrupts

8.7.1 - Restoring the flags with the SSRs

Before the pipeline diagrams found in sections 8.7.2 to 8.7.4 can be fully understood, a brief overview of what happens with the SSR registers and how they are used to restore the HOTFLAGs and saved flags (i.e., bits of SCR0) must be presented. Since the SSR-RESTORE bit is shown in the next table and later in the pipeline diagrams, it can be used to tie in the additional information. This table essentially illustrates that while the SSR-RESTORE bit is asserted, the xMDP, xMEP, and xMCP registers are pipelined. In other words the xMCP bits will be loaded into the xMEP, and the xMEP bits will be loaded into the xMDP. The mode of operation when the first instruction after the return from interrupt instruction enters the decode stage of the pipeline, indicates whether the user mode set of registers (UMDP, UMEP, UMCP) or the system mode set of registers (SMDP, SMEP, SMCP) are to be pipelined. If the mode of operation is system or NMI after the return from interrupt, the SMxP registers will be used, otherwise the UMxP registers will be used.

Table 8.7.1.1 Restoring the Flags with the SSRs Following a System Mode Interrupt

| Cycle | SSR-SAVE | SSR-XFER | Op in Fetch | System Mode | | | User Mode | | |
|---|---|---|---|---|---|---|---|---|---|
| | | | | SMCP | SMEP | SMDP | UMCP | UMEP | UMDP |
| 0 | 0 | 1 | SMCP | SMEP | | UMCP | UMEP | UMDP | |
| 1 | 1 | 1 | SMCP | SMEP | | UMCP | UMEP | UMDP | |
| 2 | 1 | 1 | SMCP | SMCP | SMEP | UMCP | UMEP | UMDP | |
| 3 | 1 | 1 | SMCP | SMCP | SMEP | UMCP | UMEP | UMDP | I5 |
| 4 | 0 | 1 | SMCP | SMCP | SMEP | UMCP | UMEP | UMDP | I6 |

Table 8.7.1.2 Restoring the Flags with the SSRs Following a User Mode Interrupt

| Cycle | SSR-SAVE | SSR-XFER | Op in Fetch | System Mode | | | User Mode | | |
|---|---|---|---|---|---|---|---|---|---|
| | | | | SMCP | SMEP | SMDP | UMCP | UMEP | UMDP |
| 5 | 0 | 0 | SMCP | SMEP | SMDP | UMCP | UMEP | | |
| 6 | 1 | 0 | SMCP | SMEP | SMDP | UMCP | UMEP | | |
| 7 | 1 | 0 | SMCP | SMEP | SMDP | UMCP | UMCP | UMEP | |
| 8 | 1 | 0 | SMCP | SMEP | SMDP | UMCP | UMCP | UMEP | I5 |
| 9 | 0 | 0 | SMCP | SMEP | SMDP | UMCP | UMCP | UMEP | I6 |
| 10 | 0 | 0 | SMCP | SMEP | SMDP | UMCP | UMEP | UMDP | |

SSR-Restore: Saved State Register – Restore

Select System: Select System Mode Registers = Asserted if Returning from a non-GPI interrupt For the purpose of this discussion assume that I4 is the instruction that is being returned to after an RETI or RETIcc instruction.

When I4 enters the decode stage, the HOTFLAGs will come from the xMDP register. (Information shown in magenta.) If HOTSF0 is set, the flags in SCR0 will be loaded with xMEP, instead of normally being updated with the HOTFLAG values.

When I4 enters the execute stage, the HOTFLAGs will come from the xMDP register. (Information shown in blue.) Remember that since the xMxP registers are pipelined during the restoration process the HOTFLAGs are really the values originally saved in the xMEP register. If HOTSF1 is set, the MAU can complete the 2-cycle operation update to the CRF using the information stored in the MAUIFDR0, MAUIFDR1, and AMADDR registers. If HOTSF2 is set, the ALU can complete the 2-cycle operation update to the CRF using the information stored in the ALUIFDR0, ALUIFDR1, and AMADDR registers.

When I4 enters the condition return stage, if HOTSF3 is set and I4 does not block (i.e., I4 is SU or LU instruction which does not target SCR0, or I4 is another 2 cycle instruction, or I4 is a control type instruction), the HOTFLAGS will come from xMDP register. (Information shown in yellow.) Remember that since the xMxP registers are pipelined during the restoration process the HOTFLAGs are really the values originally saved in the xMCP register.

For the purpose of this discussion assume that I4 is the instruction that is being returned to after an RETI or RETIcc instruction.

- When I4 enters the decode stage, the HOTFLAGs will come from the xMDP register. If SF0 is set, the flags in SCR0 will be loaded with xMEP, instead of normally being updated with the HOTFLAG values.

- When I4 enters the execute stage, the HOTFLAGs will come from the xMDP register. Remember that since the xMxP registers are pipelined during the restoration process the HOTFLAGs are really the values originally saved in the xMEP register. If SF1 is set, the MAU can complete the 2-cycle operation update to the CRF using the information stored in the MAUIFDR0, MAUIFDR1, and AMADDR registers. If SF2 is set, the ALU can complete the 2-cycle operation update to the CRF using the information stored in the ALUIFDR0, ALUIFDR1, and AMADDR registers.

- When I4 enters the condition return stage, if SF3 is set and I4 does not block (i.e., I4 is SU or LU instruction which does not target SCR0, or I4 is another 2 cycle instruction, or I4 is a control type instruction), the HOTFLAGS will come from xMDP register. Remember that since the xMxP registers are pipelined during the restoration process the HOTFLAGs are really the values originally saved in the xMCP register.

---

8.7.2 - RETI with no other interrupts pending

Table 8.7.2 – RETI with no other interrupts pending

| Cycle | Interrupt State | SSR-Restore | Hotflags | SCR0 Bits | | F | PD | D | EX1 | EX2 | CR |
|---|---|---|---|---|---|---|---|---|---|---|---|
| | | | | Non Flag | Flag | | | | | | |
| 1 | | 0 | | | | | | | | | |
| 2 | | 0 | | | | | | | | | |
| 3 | RETN | 0 | | | | I4 | | Nop | Nop | | |
| 4 | IDLE | 1 | | | Note 1 | I5 | | | Nop | | Nop |
| 5 | | 1 | xMDP | | Note 2 | I6 | | I5 | I4 | | Nop |
| 6 | | 1 | Note 3 | | | | | I6 | I5 | | I4 |
| 7 | | 0 | | | | | | | I6 | | I5 |
| 8 | | 0 | | | | | | | | | I6 |

Note 1 – If the HOTSF0 is asserted, the SCR0 Flag bits will come from the xMEP. Otherwise they will come from the xMDP.

Note 2 – If the I4 instruction is one of these (non-blocking types): SU; LU (not targeting SCR0); a 2-cycle Op, a Control Op; or a VLIW with UAF field set to N (None), then the SCR0 Flag bits will come from the xMDP, otherwise they will come from the results of I4 in EX1.

Note 3 – If the I4 instruction is a non-blocking type, then the Hotflags will come from the xMDP. Otherwise the Hotflags will come from SCR0.

xMDP -- User or System Mode Decode Phase Components. Flags needed for proper decode were saved before the interrupt and are stored here.

xISR – GPI or Debug Interrupt Status Register. Contains a copy of SCR0 from before the interrupt was taken.

HOTSF0 (Hot State Flag 0) = a bit indicating that aLU or DSU instruction that is targeted at SCR0 is in the execute (EX1) pipeline stage.

Note – EX2 may be used if I4 is a two cycle operation. Presently the Pipe does not use PreDecode when Returning from Interrupts.

SSR-R: Saved State Register – Restore

SSMR: Select System Mode Registers = Asserted if Returning from a non-GPI interrupt For the purpose of this discussion assume that I4 is the instruction that is being returned to after an RETI or RETIcc instruction.

When I4 enters the decode stage, the HOTFLAGs will come from the xMDP register. (Information shown in magenta.) If HOTSF0 is set, the flags in SCR0 will be loaded with xMEP, instead of normally being updated with the HOTFLAG values.

When I4 enters the execute stage, the HOTFLAGs will come from the xMDP register. (Information shown in blue.) Remember that since the xMxP registers are pipelined during the restoration process the HOTFLAGs are really the values originally saved in the xMEP register. If HOTSF1 is set, the MAU can complete the 2-cycle operation update to the CRF using the information stored in the MAUIFDR0, MAUIFDR1, and AMADDR registers. If HOTSF2 is set, the ALU can complete the 2-cycle operation update to the CRF using the information stored in the ALUIFDR0, ALUIFDR1, and AMADDR registers.

When I4 enters the condition return stage, if HOTSF3 is set and I4 does not block (i.e., I4 is SU or LU instruction which does not target SCR0, or I4 is another 2 cycle instruction, or I4 is a control type instruction), the HOTFLAGS will come from xMDP register. (Information shown in yellow.) Remember that since the xMxP registers are pipelined during the restoration process the HOTFLAGs are really the values originally saved in the xMCP register.

---

8.7.3 - RETIcc with no other interrupts pending

Table 8.7.3 – RETIcc with no other interrupts pending

| Cycle | Interrupt State | SSR-Restore | Hotflags | SCR0 Bits Non Flag | Flag | F | PD | D | EX1 | EX2 | CR |
|---|---|---|---|---|---|---|---|---|---|---|---|
| 1 | | 0 | | | | | | | | | |
| 2 | | 0 | | | | | | | | | |
| 3 | WAIT | 0 | | | | | | Nop | Nop | | |
| 4 | RETN | 0 | | | | I4 | | Nop | Nop | | Nop |
| 5 | IDLE | 1 | | | Note 1 | I5 | | | Nop | | Nop |
| 6 | | 1 | xMDP | | Note 2 | I6 | | I5 | I4 | | Nop |
| 7 | | 1 | Note 3 | | | | | I6 | I5 | | I4 |
| 8 | | 0 | | | | | | | I6 | | I5 |
| 9 | | 0 | | | | | | | | | I6 |

Here, the Interrupt State will WAIT for the RETIcc be evaluated in Decode before issuing a RETN from interrupt. The rest of this table is unchanged from Table 8.7.2.

---

8.7.4 - Return with interrupt pending

Table 8.7.4 – RETI with interrupt pending

| Cycle | Interrupt State | SSR-Restore | SSR-SAVE | IRR | Hot flags | SCR0 Bits | F | PD | D | EX1 | EX2 | CR |
|---|---|---|---|---|---|---|---|---|---|---|---|---|

| | | | | | | | | | | | | | |
|---|---|---|---|---|---|---|---|---|---|---|---|---|---|
| | | | | | | Non Flag Flag | | | | | | | |
| 1 | | 0 | 0 | 0 | | | | | | | | | |
| 2 | | 0 | 0 | 0 | | | | | | | | | |
| 3 | RETN | 0 | 0 | | | | | I4 | | Nop | Nop | | |
| 4 | IDLE | 1 | 0 | 1 | | | Note 1 | I5 | | | Nop | | Nop |
| 5 | ARB | 1 | 1 | 1 | xMDP | | Note 2 | - | | Nop | I4 | | Nop |
| 6 | IVEC | 1 | 1 | 1 | Note 3 | | | IVEC | | Nop | Nop | | I4 |
| 7 | ISR | 0 | 1 | 1 | | | | | | Nop | Nop | | Nop |
| 8 | | 0 | 0 | | | | | | | | Nop | | Nop |
| 9 | | 0 | 0 | 0/1 | | | | | | | | | Nop |
| 10 | | 0 | 0 | 0/1 | | | | | | | | | |

In this example, an interrupt request is pending upon RETI. One instruction from the normal program will execute. Flags it needs are provided in Decode as described in Table 8.7.2. The flags it generates will be saved back into the SSRs as it progresses through the Decode, Execute and Condition Return stages. If an SSR-XFER is needed it would happen in the 8th cycle.

Note 1 – If the HOTSF0 is asserted, the SCR0 Flag bits will come from the xMEP. Otherwise they will come from the xMDP.

Note 2 – If the I4 instruction is one of these (non-blocking types): SU; LU (not targeting SCR0); a 2-cycle Op, a Control Op; or a VLIW with UAF field set to N (None), then the SCR0 Flag bits will come from the xMDP, otherwise they will come from the results of I4 in EX1.

Note 3 – If the I4 instruction is a non-blocking type, then the Hotflags will come from the xMDP. Otherwise the Hotflags will come from SCR0.

xMDP – User or System Mode Decode Phase Components. Flags needed for proper decode were saved before the interrupt and are stored here.

xISR – GPI or Debug Interrupt Status Register. Contains a copy of SCR0 from before the interrupt was taken.

HOTSF0 (Hot State Flag 0) = a bit indicating that a LU or DSU instruction that is targeted at SCR0 is in the execute (EX1) pipeline stage.

Note – EX2 may be used if I4 is a two cycle operation. Presently the Pipe does not use PreDecode when Returning from Interrupts.

---

8.8 - Higher Priority Interrupts

Table 8.8 – Higher Priority Interrupts

| Cycle | Interrupt State | SSR-SAVE | SSR-XFER | IRR Lower | IRR Higher | ILR | ISR | IE | ILVL | F | PD | D | EX1 | EX2 | CR |
|---|---|---|---|---|---|---|---|---|---|---|---|---|---|---|---|
| 1 | IDLE | 0 | 0 | 0 | 0 | - | - | 1 | Old | Fadd | | | | | |
| 2 | IDLE | 0 | 0 | 1 | 0 | - | - | 1 | Old | | | Fadd | | | |

| | | | | | | | | | | | | | | | |
|---|---|---|---|---|---|---|---|---|---|---|---|---|---|---|---|
| 3 | ARB | 1 | 0 | 1 | 0 | - | - | 1 | Old | - | | | | | |
| 4 | IVEC | 1 | 0 | 1 | 1 | - | - | 1 | Old | IVEC I | | Nop | Nop | | |
| 5 | ARB | 1 | 0 | 1 | 1 | - | - | 1 | Old | - | | Nop | Nop | Nop | |
| 6 | IVEC | 0 | | 1 | 1 | - | - | 1 | Old | IVEC 2 | | Nop | Nop | Nop | Nop |
| 7 | ISR | 0 | 0 | 1 | 1 | - | - | 1 | Old | | | Nop | Nop | Nop | Nop |
| 8 | | 0 | 0 | 1 | | | | | | | | | Nop | Nop | Nop |
| 9 | | 0 | 0 | 1 | 0 | Sub | SCR0 | 0 | New | | | | | Nop | Nop |
| 8 | | 0 | 0 | 1 | 0 | Sub | SCR0 | 0 | New | | | | | | Nop |
| 10 | | 0 | 0 | 1 | 0 | Sub | SCR0 | 0 | New | | | | | | |

If a higher priority interrupt is requested while the Interrupt State is ARB or IVEC, the next state will be ARB, in which the new IVEC fetch address is being loaded into the instruction fetch address register so that the higher priority interrupt vector will be fetched. This table shows a higher priority interrupt happening 2 cycles after the first interrupt is requested. Note that the lower priority interrupt remains requested.

* : Save Two-cycle Op results from EX2 to appropriate ALU/ MAU Interrupt Forwarding Data Registers

9 - Interrupt Service Routines: Context Save/Restore Guidelines

10 - Interrupt Response Times

11 - Interrupt Vector Table

The Interrupt Vector Table (IVT) resides in Processor Instruction Memory from address 0x00000000 through address 0x0000 007F. It consists of 32 addresses, each of which contains the address of the first instruction of an ISR corresponding to an interrupt source.

The following table describes the assignment of interrupt sources to their corresponding vectors in the Interrupt Vector Table.

| Int Vec | Vector Address in SP Instruct. Memory | Name | Interrupt Sources | | | | | |
|---|---|---|---|---|---|---|---|---|
| | | | External | Internal | Address Interrupt (MCB) Enabled by AIER[0] | Address Interrupt (Mbox 1) Enabled by AIER[1] | Address Interrupt (Mbox 2) Enabled by AIER[2] | Address Interrupt (Mbox 3) Enabled by AIER[3] |
| 0 | 0x0000 | RESET | None | Reserved | Reserved | Reserved | Reserved | Reserved |
| 1 | 0x0004 | None | None | Reserved | Reserved | Reserved | Reserved | |
| 2 | 0x0008 | DBG | None | Debug | 0x00700202 | 0x00700222 | 0x00700242 | 0x00700262 |
| 3 | 0x000c | NMI | ExtNMI | BusError | 0x00700203 | 0x00700223 | 0x00700243 | 0x00700263 |
| 4 | 0x0010 | GPI04 | ExtInt04 | Sys Timer | 0x00700204 | 0x00700224 | 0x00700244 | 0x00700264 |
| 5 | 0x0014 | GPI05 | ExtInt05 | **Host Int A** | 0x00700205 | 0x00700225 | 0x00700245 | 0x00700265 |
| 6 | 0x0018 | GPI06 | ExtInt06 | **Host Int B** | 0x00700206 | 0x00700226 | 0x00700246 | 0x00700266 |
| 7 | 0x001c | GPI07 | ExtInt07 | MB3Empty | 0x00700207 | 0x00700227 | 0x00700247 | 0x00700267 |
| 8 | 0x0020 | GPI08 | ExtInt08 | DMA0_ctu | 0x00700208 | 0x00700228 | 0x00700248 | 0x00700268 |
| 9 | 0x0024 | GPI09 | ExtInt09 | DMA0_stu | 0x00700209 | 0x00700229 | 0x00700249 | 0x00700269 |
| 10 | 0x0028 | GPI10 | ExtInt10 | DMA1_ctu | 0x0070020A | 0x0070022A | 0x0070024A | 0x0070026A |
| 11 | 0x002c | GPI11 | ExtInt11 | DMA1_stu | 0x0070020B | 0x0070022B | 0x0070024B | 0x0070026B |
| 12 | 0x0030 | GPI12 | ExtInt12 | Reserved | 0x0070020C | 0x0070022C | 0x0070024C | 0x0070026C |
| 13 | 0x0034 | GPI13 | ExtInt13 | Reserved | 0x0070020D | 0x0070022D | 0x0070024D | 0x0070026D |
| 14 | 0x0038 | GPI14 | ExtInt14 | Reserved | 0x0070020E | 0x0070022E | 0x0070024E | 0x0070026E |
| 15 | 0x003c | GPI15 | ExtInt15 | Reserved | 0x0070020F | 0x0070022F | 0x0070024F | 0x0070026F |
| 16 | 0x0040 | GPI16 | ExtInt16 | MCB_error | 0x00700210 | 0x00700230 | 0x00700250 | 0x00700270 |
| 17 | 0x0044 | GPI17 | ExtInt17 | MDB_error | 0x00700211 | 0x00700231 | 0x00700251 | 0x00700271 |
| 18 | 0x0048 | GPI18 | **pci_inta** | Reserved | 0x00700212 | 0x00700232 | 0x00700252 | 0x00700272 |
| 19 | 0x004c | GPI19 | **pci_intb** | Reserved | 0x00700213 | 0x00700233 | 0x00700253 | 0x00700273 |

| | | | | | | | | |
|---|---|---|---|---|---|---|---|---|
| 20 | 0x0050 | GPI20 | io_uart_int | Reserved | 0x00700214 | 0x00700234 | 0x00700254 | 0x00700274 |
| 21 | 0x0054 | GPI21 | io_timer_int | Reserved | 0x00700215 | 0x00700235 | 0x00700255 | 0x00700275 |
| 22 | 0x0058 | GPI22 | ExtInt22 | Reserved | 0x00700216 | 0x00700236 | 0x00700256 | 0x00700276 |
| 23 | 0x005c | GPI23 | ExtInt23 | Reserved | 0x00700217 | 0x00700237 | 0x00700257 | 0x00700277 |
| 24 | 0x0060 | GPI24 | ExtInt24 | DBDOBF | 0x00700218 | 0x00700238 | 0x00700258 | 0x00700278 |
| 25 | 0x0064 | GPI25 | ExtInt25 | DBDIBF | 0x00700219 | 0x00700239 | 0x00700259 | 0x00700279 |
| 26 | 0x0068 | GPI26 | ExtInt26 | Reserved | 0x0070021A | 0x0070023A | 0x0070025A | 0x0070027A |
| 27 | 0x006c | GPI27 | ExtInt27 | Reserved | 0x0070021B | 0x0070023B | 0x0070025B | 0x0070027B |
| 28 | 0x0070 | GPI28 | ExtInt28 | Reserved | 0x0070021C | 0x0070023C | 0x0070025C | 0x0070027C |
| 29 | 0x0074 | GPI29 | ExtInt29 | Reserved | 0x0070021D | 0x0070023D | 0x0070025D | 0x0070027D |
| 30 | 0x0078 | GPI30 | ExtInt30 | Reserved | 0x0070021E | 0x0070023E | 0x0070025E | 0x0070027E |
| 31 | 0x007c | GPI31 | ExtInt31 | Reserved | 0x0070021F | 0x0070023F | 0x0070025F | 0x0070027F |

Event Point Architecture

Table of Contents

3 Instruction Event points
6 Event Point Instructions: EPLOOP and EPLOOPI
7 EPLOOPx Instruction Pipeline Timing

3 Instruction Event points

Instruction event points consist of a set of registers which specify events and actions associated with the PC matching particular addresses during instruction fetch phase processing. Each event point uses a set of three 32-bit registers and 8 bits for control in a control register:

See Special Purpose Registers chapter.

The following table describes the behavior for the control encodings:

<table>
<tr><th>Control Value</th><th>Operation</th></tr>
<tr><td>00000000</td><td>Disabled Event point. No action.<br>OutTrigger ← InTrigger;</td></tr>
<tr><td>00T11000<br><br>This may be used for a loop, with loop skip if count is zero.<br><br>If T==1 InTrigger can be used to exit or skip the loop.</td><td>
OutTrigger ← InTrigger; // always pass trigger through<br>
<br>
if(T==1)<br>
InTriggerFF ← InTrigger;<br>
else<br>
InTriggerFF ← 1;<br>
<br>
WHEN ( (PC == IEPxR0 || PC == IEPxR1) )<br>
{<br>
if ( (PC == IEPxR1) && // if PC matches "start" address...<br>
((T == 1 && InTriggerFF == 1) || // trigger is enabled and active<br>
(IEPxR2.H0 == 0) // OR 'count' is zero<br>
)<br>
)<br>
{<br>
PC ← IEPxR0; // jump to end of loop<br>
IEPxR2.H0 ← IEPxR2.H1; // reload count<br>
InTriggerFF ← 0; // clear FF<br>
CancelNext(Inst[PC]); // Cancel last next fetched inst<br>
// (last inst of loop)<br>
}<br>
else if (PC == IEPxR0) // if at "end" address<br>
{<br>
if (T == 1 && InTriggerFF == 1) // if trigger enabled and active<br>
{<br>
PC ← next PC; // fall out of loop<br>
IEPxR2.H0 ← IEPxR2.H1; // reload count<br>
InTriggerFF ← 0; // clear FF<br>
}<br>
else if (IEPxR2.H0 == 0 || IEPxR2.H0 == 1)<br>
{<br>
PC ← next PC;<br>
IEPxR2.H0 ← IEPxR2.H1;<br>
}<br>
else // else Count is neither 1 nor 0<br>
{<br>
PC ← IEPxR1; // next PC is [IEPxR1]<br>
IEPxR2.H0 ← IEPxR2.H0 - 1; // decrement "count"<br>
}<br>
}<br>
<br>
}</td></tr>
</table>

6 Event Point Instructions: EPLOOPx and EPLOOPIx

Two instructions are used to control Event-Point Looping. These instructions are defined in the instruction descriptions: EPLOOPx, EPLOOPIx.

See also the chapter on Event-Point Looping.

7 EPLOOPx Instruction Pipeline Timing

| Cycle | EP Compare | Fetch | Decode | Execute |
|---|---|---|---|---|
| 0 | | EPLOOPx | | |
| 1 | | FirstInstOfLoop | EPLOOPx<br><br>1. Calculate EndA=PC+DISP+1<br>2. Hold PC and NOP instruction in fetch<br>3. Send control to IEPCTLx | InstBeforeEPLOOP |
| 2 | | FirstInstOfLoop | HW NOP | EPLOOPx<br>1. Send EndA to IEPx on Load Address bus to be captured in IEPxR0<br>2. Signal IEPx to capture PC in IEPxR1<br>4. Hold PC and NOP instruction in fetch |
| 3 | First compare of IEPxR0 to PC here. | FirstInstOfLoop | NOP | HW NOP |
| 4 | | NextInstruction | FirstInstOfLoop | HW NOP |
| 5 | | : | NextInstruction | FirstInstOfLoop |

EPLOOPix Instruction Pipeline Timing

| Cycle | EP Compare | Fetch | Decode | Execute |
|---|---|---|---|---|
| 0 | | EPLOOPix | | |
| 1 | | FirstInstOfLoop | EPLOOPix<br><br>1. Calculate EndA=PC+DISP+1<br>2. Hold PC and NOP instruction in fetch<br>3. Send COUNT value along with control to IEPxR2 and IEPCTLx | InstBeforeEPLOOP |
| 2 | | FirstInstOfLoop | HW NOP | EPLOOPix<br>1. Send EndA to IEPx on Load Address bus to be captured in IEPxR0<br>2. Signal IEPx to capture PC in IEPxR1<br>4. Hold PC and NOP instruction in fetch |
| 3 | First compare of IEPxR0 to PC here. | FirstInstOfLoop | NOP | HW NOP |
| 4 | | NextInstruction | FirstInstOfLoop | HW NOP |
| 5 | | : | NextInstruction | FirstInstOfLoop |

Memory Map

Table of Contents

1 Overview
2 MDB Bus Master View
3 Non-SP MCB Master View
4 SP MCB Master View
5 Manta Address Map - PE View (Load/Store)
6 System Address Map - SP View

1 Overview

The Manta coprocessor core, containing the Manta 2x2 DSP array and the Manta DMA controller, communicates with "off-core" devices via the ManArray Control Bus (MCB) and the ManArray Data Bus (MDB). The SP provides one bus master on the MCB and the DMA controller provides a bus master on the MDB for each Lane (Lane 0 and Lane 1) and a bus master on the MCB which serves both Lane Controllers. In addition, the DMA controller provides two bus masters on the DMA Bus (on-core) which connects the 2x2 local memories with the DMA controller.

The address spaces described in the following sections show the address spaces as seen from:

- An MDB Master
- An SP MCB Master (alternate view of MCB SP-local resources)
- A non-SP MCB Master
- A DMA Bus Master (the two Lane Controllers within the DMA unit are the only masters)

An SP MCB master is provided with an alternate view of the MCB address space for its own local resources (DMA controller in particular) which allows SP code to be portable.

2 MDB Bus Master View

0x00000000 - 0x03FFFFFF SDRAM
0x04000000 - 0x07FFFFFF FLASH ROM
0x08000000 - 0x0BFFFFFF PCI Window
0x0C000000 - 0x0FFFFFFF MPB
0x10000000 - 0x10FFFFFF Manta I/O
0x10800000 - 0x108FFFFF DMA MDB Slave Lane 0
0x10900000 - 0x109FFFFF DMA MDB Slave Lane 1
0x14000000 - 0x7FFFFFFF PCI (mapped @0x80000000)
0x80000000 - 0xFFFFFFFF PCI (mapped @0x00000000)

These addresses are those used by any MDB master. The DMA controller has an MDB master for the System Transfer Unit (STU) associated with each Lane. This address map is used to specify DMA transfer addresses when coding TSI and TSO-type transfer instructions.

3 Non-SP MCB Master View

0x00500000 - 0x00507FFF SP Instruction Memory
0x00700000 - 0x007003FF SP SPR registers visible on the MDB
0x00708000 - 0x007083FF DMA Lane Controller 0
0x00708400 - 0x007087FF DMA Lane Controller 1
0x40000000 - 0xFFFFFFFF Mapped to MCB-MDB Bridge
0x14000000 - 0x17FFFFFF SDRAM (via MCB-MDB Bridge)

4 SP MCB Master View

The SP has an alternate view of the MCB address space, which allows SP code to be portable to multiple SPs sharing the same bus (assuming that they are programming their own local resources). By using the following address ranges, the SP is accessing its "own" instruction memory and DMA controller. Address translation, which is based upon the SP's ID, is performed in the SP MBIU (Memory/Bus Interface Unit) to place the correct address on the MCB.

0x00100000 - 0x00107FFF SP Instruction Memory
0x00308000 - 0x003083FF DMA Lane Controller 0
0x00308400 - 0x003087FF DMA Lane Controller 1

Special Purpose Register space (SPR space) is addressed using LSPR (load from SPR) and SSPR (store to SPR) instructions. The SP can still access SPRs via the MCB using non-SP MCB master addresses although at a significant performance penalty. (This is typically useful for test purposes).

5 Manta Address Map - PE View (Load/Store)

PEs can only access their own local memories with Load/Store instructions. PE memories are referenced by PE Load/Store instructions starting from address 0x00000000 up to N-1, where N is the size of the memory in bytes. Bits [31:12] are treated as "don't care" by the hardware, but should be set to zero for software compatibility with future hardware that extends the PE memories.

Manta Memory Map - PE (Load/Store) View of its local resources

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="18">000000000000000000</td><td colspan="14">PE Local Data memory (16KB)</td></tr>
</table>

6 System Address Map - SP View

| General System Address | SP-Relative System Address (bits[25:22]=0) | LSPR /SSPR Address | SP Memory/ SPR Registers | PE Memory/ SPR Registers | Description |
|---|---|---|---|---|---|
| **0x00000000-0x07FFFFFF** | **0x00000000-0x03FFFFFF** | | **Manta Load/Store Address Space** | | Entire Manta Load/Store address space (64 MB) |
| **0x00000000-0x00007FFF** | **0x00000000-0x00007FFF** | | **SP Data Memory** | | SP Data Memory. 8K 32-bit words. (16KB) |
| **0x00100000-0x00107FFF** | **0x00100000-0x00107FFF** | | **SP Instruction Memory** | | SP Instruction Memory. 8K 32-bit instructions.(32 KB). Visible to MCB and DMA. |
| **0x00200000-0x00203fff** | — | | **PE0 Data Memory** | | Not visible on MCB. This range is visible to DMA controller only. |
| **0x00210000-0x00213fff** | — | | **PE1 Data Memory** | | Not visible on MCB. This range is visible to DMA controller only. |
| **0x00220000-0x00223fff** | — | | **PE2 Data Memory** | | Not visible on MCB. This range is visible to DMA controller only. |
| **0x00230000-0x00233fff** | — | | **PE3 Data Memory** | | Not visible on MCB. This range is visible to DMA controller only. |
| **0x00700000-0x0070FFFF** | **0x00300000-0x0030FFFF** | | **Local MCB SPR space** | | Local Special Purpose Register Space (64 KB space). Registers in this space are considered "local" to an SP/PE cluster (though they are accessible to any MCB master device. All registers except DMA registers are accessible in the DSP's SPR space, accessible using LSPR/SSPR instructions. |
| 0x00700000 | 0x00300000 | 0x0000 | MBSTAT | | Mailbox Status register. An LSPR (read) from this address clears MPBSTAT.MBF0 |
| 0x00700001 | 0x00300001 | 0x0001 | MBSTATNC | | LSPR with this address returns data but does not clear MBSTAT.MBF0 |
| 0x00700004 | 0x00300004 | 0x0004 | MBOX1 | | LSPR with this address returns data from MBOX1 and clears MBSTAT.MBF1 |
| 0x00700005 | 0x00300005 | 0x0005 | MBOX1NC | | LSPR with this address returns data from MBOX1 and **does not clear** MBSTAT.MBF1 |
| 0x00700008 | 0x00300008 | 0x0008 | MBOX2 | | LSPR with this address returns data from MBOX2 and clears MBSTAT.MBF2 |
| 0x00700009 | 0x00300009 | 0x0009 | MBOX2NC | | LSPR with this address returns data from MBOX2 and **does not clear** MBSTAT.MBF2 |
| 0x0070000c | 0x0030000c | 0x000c | MBOX3 | | SSPR with this address writes data to MBOX3 |

| | | | | | |
|---|---|---|---|---|---|
| | | | | | and clears MBSTAT.MBE3 |
| | | | | | |

Special-Purpose Registers

Table of Contents

1 Overview

2 Configuration Registers

2.1 MACID - ManArray Core ID Register (Read-Only)
2.2 DSPCTL - DSP Control Register
2.3 SHDWPC - Shadow PC Register (Read-Only)
2.4 INTSRC -- Interrupt Source Configuration Register
2.5 ADIEN - Address Interrupt Enable Register
2.6 LMEMC -- Local Memory Configuration Register

3 Message Communication: Mailbox Registers and Addresses

3.1 MBSTAT - Mailbox Status Register (Read-Only)
3.2 MBOX1 - Mailbox Register 1
3.3 MBOX2 - Mailbox Register 2
3.4 MBOX3 - Mailbox Register 3
3.5 SPAD1 - Scratch Pad Register 1
3.6 SPAD2 - Scratch Pad Register 2

4 Timer Registers

4.1 TIMC - Timer Control Register
4.2 TIMER - Timer (Count) Register
4.3 ECYCLE - Executed Cycle Counter Register
4.4 ECYCCTL - Executed Cycle Control Register

5 Random Number Generation

5.1 LFSR - Linear Feedback Shift Register
5.2 PFNR - Polynominal Value Register

6 Signature Analysis Registers

6.1 SARADDR - Signature Analysis Register Data High
6.2 SARDATAL - Signature Analysis Register Data Low
6.3 SARDATAH - Signature Analysis Register Data High

7 Debug Registers

7.1 DBSTAT - Debug Status Register
7.3 DBDIN - Debug Data In
7.4 DBDOUT - Debug Data Out

8 Event-Points Registers

8.1 Instruction Event-Point Registers
8.3 Event-Point Status Registers

1 Overview

SPRs are registers that provide specialized control and/or communication capabilities to the array processor. Most SPRs are only accessible by the SP, but some are implemented in both the SP's SPR address space and in the PE's SPR address space. These registers are accessible in 1-cycle by the SP (or PE) when using the LSPR or SSPR instructions. Most of these registers may also be accessed by an MCB bus master through system addresses (see the System Address Map table above).

2 Configuration Registers

2.1 MACID - ManArray Core ID Register (Read-Only)

MCB Address: 0x00700058 SPR Address: 0x0058 Reset value: 0x40100001

| 31-28 | 27-20 | 19-00 |
|---|---|---|
| Entity | Revision | BOPS Product ID |

BOPS Product Number — A 20-bit value that indicates the BOPS coprocessor core configuration. This number is assigned by BOPS, Inc. and encodes all parameters associated with the particular core.

Revision — The revision level of the specified core.

Entity — This field is used for test purposes to identify the logic implementation.
0000 - Non-existent SP
0001 - Software Simulator
0010 - Verilog Simulator
0011 - FPGA Emulator
0100 - Silicon
0101 - 1111: Reserved

2.2 DSPCTL - DSP Control Register

MCB Address: 0x00700040 SPR Address: 0x0040 Reset value: 0x00000083

| 31-08 | 07 | 06 | 05 | 04 | 03-02 | 01 | 00 |
|---|---|---|---|---|---|---|---|
| Reserved | ShdwPCEn | DBIREn | Lock Pipe | Lock PC | Reserved | Reset DMA | Reset DSP |

ResetDSP — Reset DSP array. This bit is set to '1' at power-on-reset (POR) for Host-mode, and '0' for Stand-alone mode. After POR in Host mode, this bit remains '1' until cleared. After this bit is cleared to zero, subsequent writes to set it to '1' will cause DSP array reset but will only hold the '1' (reset) value for 4 cycles (i.e. the bit becomes self-clearing). This always allows stand-alone systems to perform soft-restarts.
1 = Reset Processor core (SP and PEs)
0 = Release Processor core from reset.

ResetDMA 1 = Reset DMA controller and DMA Bus
0 = Release DMA controller and DMA Bus from reset LockPC 1 = Prevents the Program Counter (PC) from updating.
0 = Allows PC to be updated.

LockPipe 1 = Prevent the instruction pipe from advancing (all state is "frozen")
0 = Allow instruction pipeline to advance ShdwPCEn SHDWPC register enable. The SHWDPC is enabled to track the PC after RESET. The updates may be disabled be clearing this bit.
0 = SHDWPC is not updated
1 = SHDWPC is updated each cycle with PC value (follows PC).

Reset: PC = 0x00000000 (reset vector at 0x00000000)

---

2.3 SHDWPC - Shadow PC Register (Read-Only)

MCB Address: 0x0070002c SPR Address: 0x002c Reset value: same as PC

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Shadow PC Value | | | | | | | | | | | | | | | | | | | | | | | | | | | | | | | |

This register may be used to read the current value of the PC on the fly. This register actually tracks the PC one-cycle behind the actual PC, but reflects the address of the last instruction fetch. This register is enabled for tracking the PC when DSPCTL.ShdwPCEn = 1. When DSPCTL.ShdwPCEn = 0 the SHDWPC register retains its value. This is a read-only register.

---

2.4 INTSRC -- Interrupt Source Configuration Register

MCB Address: 0x00700048 SPR Address: 0x0048 Reset value: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| EXT31 | EXT30 | EXT29 | EXT28 | EXT27 | EXT26 | EXT25 | EXT24 | EXT23 | EXT22 | EXT21 | EXT20 | EXT19 | EXT18 | EXT17 | EXT16 | EXT15 | EXT14 | EXT13 | EXT12 | EXT11 | EXT10 | EXT09 | EXT08 | EXT07 | EXT06 | EXT05 | EXT04 | R | R | R | R |

R Reserved

EXTxx 0 = Internal source
1 = External source

---

2.5 ADIEN - Address Interrupt Enable Register

MCB Address: 0x0070004C SPR Address: 0x004C Reset value: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Reserved | | | | | | | | | | | | | | | | | | | | | | | | | | | | AIR3 | AIR2 | AIR1 | AIR0 |

AIRx Address Interrupt Range x
0 = Address interrupt for range x disabled
1 = Address interrupt for range x enabled

Address Interrupts are triggered by writes to specific addresses (mapped to the ManArray Control Bus). Each range contains 32 (byte) addresses. When a range's AIR bit is set, a write to a particular address in the range causes the corresponding interrupt to be asserted to the DSP core (except for address offsets 0 and 1 which are reserved). The valid ranges are:

| | |
|---|---|
| **Address Interrupt Range 0** | 0x00300200 - 0x0030021F (except 0x00300200 and 0x00300201) |
| **Address Interrupt Range 1** | 0x00300220 - 0x0030023F (except 0x00300220 and 0x00300221) |
| **Address Interrupt Range 2** | 0x00300240 - 0x0030025F (except 0x00300240 and 0x00300241) |
| **Address Interrupt Range 3** | 0x00300260 - 0x0030027F (except 0x00300260 and 0x00300261) |

2.6 LMEMC -- Local Memory Configuration Register

MCB Address: 0x00700044 SPR Address: 0x0044 Reset value: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Reserved | | | | | | | | | | | | | | | | | End SP0 | R | End PE | R | | | ISP0 | Reserved | | | | IPE3 | IPE2 | IPE1 | IPE0 |

R Reserved

IPE0 0 = Low-order (32-bit word) interleave, 1 = High-order interleave

IPE1 0 = Low-order (32-bit word) interleave, 1 = High-order interleave

IPE2 0 = Low-order (32-bit word) interleave, 1 = High-order interleave

IPE3 0 = Low-order (32-bit word) interleave, 1 = High-order interleave

ISP0 0 = Low-order (32-bit word) interleave, 1 = High-order interleave

EndPE 0 = Little-endian byte ordering in memory
1 = Big-endian byte ordering in memory EndSP0 0 = Little-endian byte ordering in memory
1 = Big-endian byte ordering in memory Each PE's local memory may be configured for either high or low-order interleave. Low-order interleave means that successive 32-bit words in memory lie in different memory banks. High order interleave means that, for an N-word (32-bit), two-bank local memory, the first N/2 sequential addresses (0 through N/2 -1 ) lie in the first bank, while the next N/2 addresses (N/2 through N-1) lie in the second bank.

(Note: DMA accesses also use the specified interleave.)

In addition the "endian-ness" of data stored in memory may be configured independently for the SP and PEs (all PE's local memories are assumed to have the same endian-ness). The DSP is natively "little-endian". Options for little-endian allow data to be fetched with an access type that differs from the embedded data type. This is illustrated in the figures below, which show how the r1,r0 register pair or the r0 register are loaded for different endian configurations.

Note: For Manta, bits EndPE and EndSP0 are hardwired to little endian.

3 Message Communication: Mailbox Registers and Addresses

3.1 MBSTAT - Mailbox Status Register (Read-Only)

| MCB Address: | SPR Address: (read-only) | Reset value: Undefined |
|---|---|---|
| read 0x00700000 (clear MBF0 bit)<br>read 0x00700001 (no clear) | read 0x0000 (clear MBF0 bit)<br>read 0x0001 (no clear) | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Reserved | | | | | | | | | | | | | | | | | | | | | | | | | | | | MBF3 | MBF2 | MBF1 | MBF0 |

MBF0 This bit is set whenever an MCB write access occurs to any address in Address Interrupt Range 0 (no data is saved). This bit is cleared on an LSPR read from address 0x0000, or an MCB read at address 0x00700000. An LSPR read from address 0x0001 or and MCB read from address 0x00700001 will return the MBSTAT value without clearing MBF0.
0 = no write access to corresponding address range
1 = write access to corresponding address range MBF1 This bit is set whenever an MCB write access occurs to any address in Address Interrupt Range 1 (data is latched in MBOX1). This bit is cleared on an LSPR read from 0x0004 or MCB read from 0x00700004. An LSPR read from address 0x0005 or and MCB read from address 0x00700005 will return the MBSTAT value without clearing MBF1.
0 = no write access occurred to corresponding address range
1 = write access occurred to corresponding address range MBF2 This bit is set whenever an MCB write access occurs to any address in Address Interrupt Range 2 (data is latched in MBOX2). This bit is cleared on an LSPR read from 0x0008 or MCB read from 0x00700008. An LSPR read from address 0x0009 or and MCB read from address 0x00700009 will return the MBSTAT value without clearing MBF1.
0 = no write access occurred to corresponding address range
1 = write access occurred to corresponding address range MBE3 This bit is set whenever an MCB read access occurs to any address in Address Interrupt Range 3 (data is read from MBOX3 by an MCB Bus Master).
0 = no read access to corresponding address range
1 = read access to corresponding address range

Read Operations
When this register is read from MCB address 0x00700200 (SP-relative address 0x00300200) or SP SPR address 0x0000, the value is returned to the target register and the MBF0 bit is cleared. To read this register without clearing MBF0, read the value from MCB address 0x007000204 (SP-relative address 0x00700200) or SP SPR address 0x0001.

3.2 MBOX1 - Mailbox Register 1

MCB Address:
write 0x00700220-0x0070023f
read 0x00700004 (clear MBF1 bit)
read 0x00700005 (no clear)

SPR Address: (read-only)
read 0x0004 (clear MBF1 bit)
read 0x0005 (no clear)

Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Message Data | | | | | | | | | | | | | | | | | | | | | | | | | | | | | | | |

Message Data: Message Data is a 32-bit value which is written to one of the addresses in the AIR 1 range (0x00700220 - 0x0070023F). A write to any of the addresses in AIR 1 causes the data to be captured in MBOX1 and the MBF1 bit of the MBSTAT register to be set to 1. If the range is enabled to generate interrupts, and the interrupt is enabled in the IER, then an interrupt signal corresponding to the address will be asserted.

Read Operations

| Read Address | SP-Relative Read Address | SPR Address | Operation |
|---|---|---|---|
| 0x00700004 | 0x00300004 | 0x0004 | A read from this address returns the MBOX1 data and clears the MBF1 ("mailbox full") bit of the MBSTAT register. |
| 0x00700005 | 0x00300005 | 0x0005 | A read from this address returns the MBOX1 data and **does not clear** the MBF1 ("mailbox full") bit of the MBSTAT register. |

3.3 MBOX2 - Mailbox Register 2

MCB Address:
write 0x00700240-0x0030025f
read 0x00700008 (clear MBF2 bit)
read 0x00700009 (no clear)

SPR Address: (read-only)
read 0x0008 (clear MBF2 bit)
read 0x0009 (no clear)

Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Message Data | | | | | | | | | | | | | | | | | | | | | | | | | | | | | | | |

Message Data: Message Data is a 32-bit value which is written to one of the addresses in the AIR 2 range (0x00300240 - 0x0030025F). A write to any of the addresses in AIR 2 causes the data to be captured in MBOX2, and the MBF2 bit of the MBSTAT register to be set to 1. If the range is enabled to generate interrupts, and the interrupt is enabled in the IER, then an interrupt signal corresponding to the address will be asserted.

Read Operations

| Read Address | SP-Relative Read Address | SPR Address | Operation |
|---|---|---|---|
| 0x00700008 | 0x00300008 | 0x0008 | A read from this address returns the MBOX2 data and clears the MBF2 ("mailbox full") bit of the MBSTAT register. |
| 0x00700009 | 0x00300009 | 0x0009 | A read from this address returns the MBOX2 data and **does not clear** the |

| | | | |
|---|---|---|---|
| | | | MBF2 ("mailbox full") bit of the MBSTAT register. |

3.4 MBOX3 - Mailbox Register 3

MCB Address:
read 0x00700260-0x0030027f(set MBE3 of MBSTAT)
write 0x0070000c (clear MBF3 bit)

SPR Address: (read/write)
write 0x000c (set MBE3 bit)
write 0x000d (no set)
read 0x000d (no change to MBE3)

Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Message Data | | | | | | | | | | | | | | | | | | | | | | | | | | | | | | | |

Message Data — Message Data is a 32-bit value which is read from one of the addresses in the AIR 3 range (0x00300260 - 0x0030027F). A read from any of the addresses in AIR 3 causes the data to be read from MBOX3 and the MBE3 bit of the MBSTAT register to be set to 1. If the range is enabled to generate interrupts, and the interrupt is enabled in the IER, then an interrupt signal corresponding to the address will be asserted.

Read Operations

| **Read Address** | **SP-Relative Read Address** | **SPR Address** | **Operation** |
|---|---|---|---|
| 0x0070000c | 0x0030000c | 0x000c | A read from this address returns the MBOX3 data and clears the MBE3 ("mailbox empty") bit of the MBSTAT register. |

This register operates differently than MBOX1 and MBOX2, allowing the SP to push data out to another processor. When another processor reads from MBOX3, an interrupt can be generated to the SP to tell it to load more data into the MBOX3 register.

3.5 SPAD1 - Scratch Pad Register 1

MCB Address:
read/ write 0x00700010

SPR Address: (read/write)
0x0010

Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Message Data | | | | | | | | | | | | | | | | | | | | | | | | | | | | | | | |

Message Data — Message Data is a 32-bit value, which is written to this register either by the host or by the MANTA DSP. No read or write side effects occur. This scratch pad contains auxiliary data for the host, or DSP command or data passed through one of the MBOX registers. The scratch pad should be read or written before the corresponding MBOX register is touched.

3.6 SPAD2 - Scratch Pad Register 2

MCB Address: read/ write 0x00700014 | SPR Address: (read/write) 0x0014 | Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Message Data | | | | | | | | | | | | | | | | | | | | | | | | | | | | | | | |

| | |
|---|---|
| Message Data | Message Data is a 32-bit value, which is written to this register either by the host or by the MANTA DSP. No read or write side effects occur. This scratch pad contains auxiliary data for the host, or DSP command, or data passed through one of the MBOX registers. The scratch pad should be read or written before the corresponding MBOX register is touched. |

4 Timer Registers

4.1 TIMC - Timer Control Register

MCB Address: 0x00700070 SPR Address: 0x0070 Reset value: 0x00000001

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Reserved | | | | | | | | | | | | | | | | | | | | | | | | | | | | | Signal TC | One Shot | Up Count |

UpCount 0 = Timer counts down from initial value
1 = Timer counts up from initial value OneShot 0 = Continuous mode, i.e. reloads initial count when counter reaches "terminal count" (TC).
1 = Stop when TC reached.

SignalTC 0 = Do not signal interrupt on TC.
1 = Signal interrupt on TC.

TC is defined as that cycle in which the counter will update to zero. If in continuous mode, the counter value will never actually hold a zero value (unless it is initialized with zero), since it is during the TC cycle that the counter is reloaded with its initial value. If SignalTC =1, then the interrupt signal is asserted during the TC cycle. At reset, the counter is programmed to count up and is initialized in a counting mode starting with zero. (Starting the timer from reset allows timing of various boot sequences for development purposes). The following figure illustrates the timing for loading a count value of 2 into the TIMER register, Upcount = 0, OneShot=0 and SignalTC=1. If a `1' is written to the TIMER register, then it remains in the register and (if enabled) an interrupt is continuously asserted 1 cycle after the value `1' is loaded into the count register.

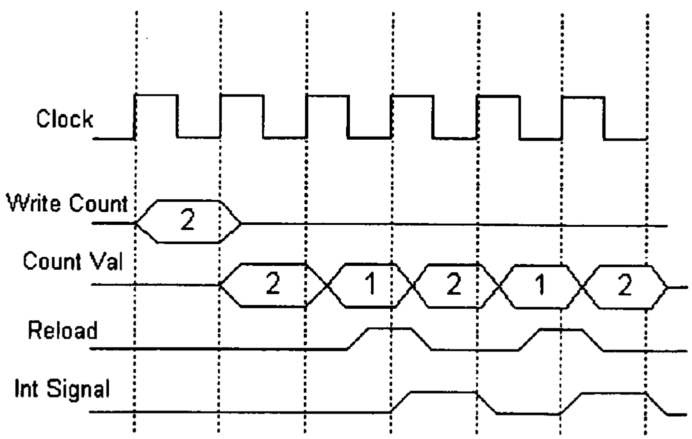

4.2 TIMER - Timer (Count) Register

MCB Address: 0x00700074, 0x00700075 SPR Address: 0x0074, 0x0075 Reset value: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Timer Count | | | | | | | | | | | | | | | | | | | | | | | | | | | | | | | |

Timer Count 32-bit timer value.

| SPR Address | System (MCB) Address | Operation |
|---|---|---|
| 0x0074 | 0x00700074 | A write to this address loads and starts the timer counting according to the control values programmed into the TIMC register. |
| 0x0074 | 0x00700074 | A read from this address returns the current value in TIMER. The state of the counter is not changed. If it is counting, it continues to count, and if stopped it remains stopped. |
| 0x0075 | 0x00700075 | A read from this address returns the current value in TIMER and counting stops. A subsequent write to MCB address 0x00700074 or SPR address 0x0074 may be used to (load and) restart the timer. |

The timer register is initialized to zero at reset, and the TIMC register configured to count up with no interrupt generation. This places the timer in counting mode when reset is released. This may be used by software to time initialization events.

4.3 ECYCLE - Executed Cycle Counter Register

MCB Address: read/write 0x00700018 SPR Address: read/write 0x0018 Reset value: undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Executed Cycles | | | | | | | | | | | | | | | | | | | | | | | | | | | | | | | |

Executed Cycles Executed Cycle Count is a 32-bit value, which is incremented on every core clock cycle in which the stall (pipehold) signal is not asserted. The ECYCCTL register can further restrict the increment to not occur on the second cycle of a two cycle instruction. Furthermore, the ECYCCTL register can restrict the increment to not occur when the processor is operating on an interrupt level other than the base level.

4.4 ECYCCTL - Executed Cycle Control Register

MCB Address: read/write 0x0070001C SPR Address: read/write 0x001C Reset value: undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Reservd | | | | | | | | | | | | | | | | | | | | | | | | | | | | | | NOIRQ | NO2ND |

NOIRQ 1 = ECYCLE will not increment when the DSP is processing on an interrupt level other than the base level.
0 = ECYCLE will increment regardless of the current interrupt level NO2ND 1 = ECYCLE will not increment on the second clock of a two clock instruction
0 = ECYCLE will increment on all non-stalled clocks.

5 Random Number Generation

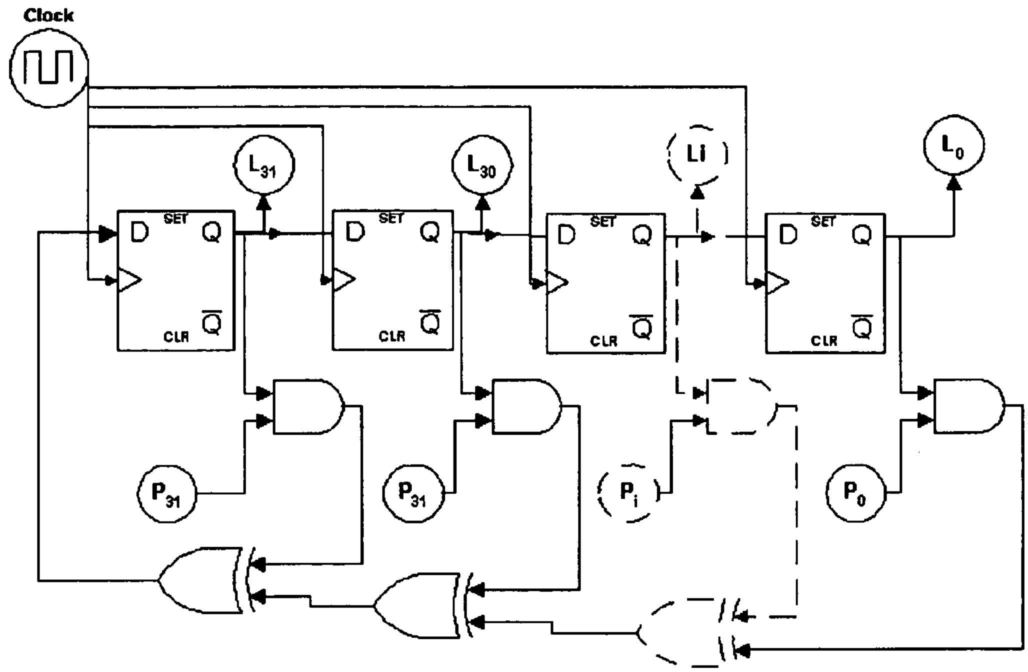

Random number generation is needed in a number of standard DSP applications. For example, it is used as a training signal for adaptive equalization in modems, for the elimination of limit cycles in IIR filter structures, for parallel signal analysis, and of particular interest to BOPS, for generation of pseudonoise used in wireless cellular CDMA applications. The following proposal provides pseudorandom sequence number generation which follow three key randomness properties defined traditionally following Golomb[1967] and following implementation suggestions from Virterbi[1995].

Operation:
In the above figure, two special registers are defined,
1) a 32-bit Linear Feedback Shift Register (LFSR) with bit positions L0 through L31, and
2) a 32-bit Polynomial Seed Register (PNFR) with bit positions P0 through P32.

The LFSR current value is the value held by each of thirty-two data flip-flops. The PNFR, once loaded, does not change unless reloaded, and is used as input for a series of AND gates. Each clock cycle, each intermediate bit value in the LFSR is passed to the next lower order bit value, i.e. bit Li goes to bit Li-1. Each bit position is also ANDed with the same relative bit from the PNFR. The output of each AND is then input as one bit in a series of XORs, the other XOR bit being the output of the previous stage XOR. The result of the XOR series being the new input for LFSR bit 31.

Execution:
There are three operations using two existing instructions required.

To initialize the function, non-zero initial seed values must be loaded into both the LFSR and PNFR registers. This is done using the Store to Special-Purpose Register (SSPR) instruction, and takes the form:
1. SSPR.s.w Rx, LFSR and
2. SSPR.s.w Ry, PNFR.

The value in Rx can be any non-zero value, the value in Ry can be any odd non-zero value (low order bit must be one). To generate a random number, the Load from Special-Purpose Register (LSPR) is used, and takes the form:
3. LSPR.s.w Rt, LFSR.

The current value of the LFSR will be placed in the target register, Rt. The LFSR will then be updated as described in the Operation section above.

---

5.1 LFSR - Linear Feedback Shift Register

MCB Address: 0x00700060 | SPR Address: 0x0060 | Reset value: 0x56E8F3B2

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| LFSR Data | | | | | | | | | | | | | | | | | | | | | | | | | | | | | | | |

LFSR Data On a read access, the current LFSR value is returned. The value is then updated according to the pseudo-random number algorithm (see above).

5.2 PFNR - Polynominal Value Register

MCB Address: 0x00700064 | SPR Address: 0x0064 | Reset value: 0x21AC5729

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Polynomial Value | | | | | | | | | | | | | | | | | | | | | | | | | | | | | | | |

Polynomial Value This register contains the polynomial used for pseudorandom number generation.

6 Signature Analysis Registers

There are three signature analysis registers in the SP Data MIU to compute signatures on the SP address bus and SP data bus each time a store operation is performed (SARADDR, SARDATAL, SARDATAH).

Given:

SARvalue [31:0] = current SAR value
SARrotated [31:0] = {SARvalue[0],SARvalue[31],...SARvalue[1]}
SARfill [31:0] = {SARvalue[0] replicated 32 times} AND {0x80802420}
Input[31:0] = StoreBus[31:0] AND StoreTypeMask

Note: StoreBus is SADDR for SARADDR, SDATA[63:32] for SARDATAH, and SDATA[31:0] for SARDATAL. StoreTypeMask is 0xFFFF for SADDR, and depends on the data type for each data bus input.

WORD (32-bit) ·0xFFFF
HWORD (16-bit) ·0x00FF
BYTE (8-bit) ·0x000F

These signatures are computed as follows:

(1) At RESET, the signature registers are initialized to 0x0000.
(2) Each time an SP store instruction is executed, the SARs are computed:

SARvalue[31:0] _ SARvalue[31:0] XOR SARrotated[31:0] XOR SARfill[31:0] XOR Input (3) Whenever any of the three registers is the target of a write, they all reset to their defined reset state.
(4) Whenever the SARs are read, they return their current signature values.

Thus, a nearly complete signature of the machine state can be accumulated from the beginning of execution to the end of boot and test code, at which time the SAR values can be checked for an exact match. During verification test, the SAR values can also be used as an accumulated measure of correctness. SARs are only computed for the SP store unit.

6.1 SARADDR - Signature Analysis Register Data High

MCB Address: 0x00700020 SPR Address: 0x0020 Reset value: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| SARADDR | | | | | | | | | | | | | | | | | | | | | | | | | | | | | | | |

SARADDR SARADDR is a 32-bit value, which is computed for all store operations from the SP. The SAR is stepped only for clock cycles on which there is a store. When read, they return the current SAR value. When any of the three SAR registers, SARADDR, SARDATAL or SARDATAH, are written, the write data value is ignored and all three registers are set to their Reset Value.

6.2 SARDATAL - Signature Analysis Register Data Low

MCB Address: SPR Address: Reset value: 0x00000000

0x00700024 0x0024

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| SARDATAL | | | | | | | | | | | | | | | | | | | | | | | | | | | | | | | |

SARDATAL SARDATAL is a 32-bit value, which is computed for all store operations from the SP. The SAR is stepped only for clock cycles on which there is a store. When read, they return the current SAR value. When any of the three SAR registers, SARADDR, SARDATAL or SARDATAH are written the write data value is ignored and all three registers are set to their Reset Value. The SARDATAL inputs are taken from the lower order 32 bits of the STORE Unit data bus.

---

6.3 SARDATAH - Signature Analysis Register Data High

MCB Address: 0x00700028 SPR Address: 0x0028 Reset value: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| SARDATAH | | | | | | | | | | | | | | | | | | | | | | | | | | | | | | | |

SARDATAH SARDATAH is a 32-bit value, which is computed for all store operations from the SP. The SAR is stepped only for clock cycles on which there is a store. When read, they return the current SAR value. When any of the three SAR registers, SARADDR, SARDATAL or SARDATAH, are written, the write data value is ignored and all three registers are set to their Reset Value. The SARDATAH inputs are taken from the upper order 32 bits of the STORE unit data bus.

---

7 Debug Registers

---

7.1 DBSTAT - Debug Status Register

MCB Address: 0x00700080 SPR Address: 0x0080 Reset value: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Reserved | | | | | | | | | | | | | | | | | | | | | | | | | | | | Reserved | Reserved | DBDOBF | DBDIBF |

DBDIBF Read Only. Debug Data In Buffer Full.
This bit is set when an MCB device writes to the DBDIN register. This bit is cleared when the SP reads from the DBDIN (clear) register address. (See DBDIN register).
1= DBDIN register contains valid data.
0 = DBDIN does not contain valid data.

DBDOBF Read Only. Debug Data Out Buffer Full.
This bit is set when the SP writes to the DBDOUT register (SPR address). It is cleared when an MCB device reads from the DBDOUT register's MCB address.

---

7.3 DBDIN - Debug Data In

MCB Address: 0x00700088 SPR Address: 0x0088 Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Debug Data In | | | | | | | | | | | | | | | | | | | | | | | | | | | | | | | |

This register is visible on the MCB, and from the SP in SPR address space. An MCB device writes data to this register to communicate to debug monitor code running on the SP. A write to this register causes the DBDIBF bit of the DBSTAT register to be set. A read from this register causes the DBDIBF bit in the DBSTAT register to be cleared.

---

7.4 DBDOUT - Debug Data Out

MCB Address: 0x0070008C SPR Address: 0x008C Reset value: Undefined

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Debug Data Out | | | | | | | | | | | | | | | | | | | | | | | | | | | | | | | |

This register is visible on the MCB, and from the SP in SPR address space. The SP writes to this register to set data to an MCB device. A write to this register causes the DBDOBF bit of the DBSTAT register to be set. This register may be read from the MCB from two different MCB addresses. A read from one address retrieves the data and clears the DBDOBF bit, while a read from the other address does not clear the DBDOBF bit.

8 Event-Points Registers

8.1 Instruction Event-Point Registers

IEPxR0 Reset Value = Unknown

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| IEPxR0x | | | | | | | | | | | | | | | | | | | | | | | | | | | | | | | |

IEPxR1 Reset Value = Unknown

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| IEPxR1x | | | | | | | | | | | | | | | | | | | | | | | | | | | | | | | |

IEPxR2 Reset Value = 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| IEPxR2.H1 | | | | | | | | | | | | | | | | IEPxR2.H0 | | | | | | | | | | | | | | | |

The following control registers specify options associated with each event point (8 bits per event point):

IEPCTL0 Reset Value = 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| S3 | P3 | T3 | IEP3 | | | | | S2 | P2 | T2 | IEP2 | | | | | S1 | P1 | T1 | IEP1 | | | | | S0 | P0 | T0 | IEP0 | | | | |

IEPCTL1 Reset Value = 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Reserved | | | | | | | | Reserved | | | | | | | | S5 | P5 | T5 | IEP5 | | | | | S4 | P4 | T4 | IEP4 | | | | |

IEPx Specifies how IEPxR0, IEPxR1 and IEPxR2 are used for detecting instruction events and generating corresponding actions.

Sx Signal bit. Used to control output signal generation from Event Point logic. This is primarly used to indicate generation whether or not a Debug Interrupt signal will be generated when the specified event occurs, but may be used for other purposes for some specialized types of event points.

Px Pass-through control. This bit is most commonly used to indicate pass-through of the InTrigger signal from input to output. If this bit is a '0', then the InTrigger signal is passed from input to output of the event point logic. If this bit is a '1' then the InTrigger signal is not passed to the output of the event point logic.

Tx Trigger Function bit. This bit is used to control the use of the InTrigger and/or InTriggerFF signals within the event point logic. It's use is dependent on the control code (IEPx fields).

---

8.3 Event-Point Status Registers

EPSTAT (Read-only, SP SPR) Reset Value = 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Reserved | | | | | | | | | | | | | | | | | | IEV5 | IEV4 | IEV3 | IEV3 | IEV1 | IEV0 | Reserved | | | | | DEV2 | DEV1 | DEV0 |

EPSTAT (Read-only, PE SPR) Reset Value = 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| Reserved | | | | | | | | | | | | | | | | | | | | | | | | | | | | | | | DEV0 |

DEVx This bit is set when a match event generates a debug interrupt for Data Event Point 'x'. (Not all control codes that may be programmed cause a debug interrupt to be generated on a match event).
0 = event has not occurred
1 = event has occurred

IEVx This bit is set when a match event generates a debug interrupt for Instruction Event Point 'x'. (Not all control codes that may be programmed cause a debug interrupt to be generated on a match event).
0 = event has not occurred
1 = event has occurred

---

DMA Subsystem Overview

Table of Contents

1 Introduction
2 Simple Inbound Transfer to SP Data Memory

2.1 Simple Inbound Transfer of Program Code to the SP Instruction Memory
2.2 Simple Inbound Transfer of Application Data to a PE Data Memory
2.3 Interleaved Selection of PE Data Memory Destinations
2.4 DMA Instruction Control Unit

3 Instruction Set Overview

1 Introduction

The Manta co-processor core consists of:

- a ManArray 2x2 DSP array,
- local memories,
- a set of special-purpose registers (SPRs),
- a DMA Controller,
- and three primary system busses.

The primary system busses, which provide connectivity inside and outside the coprocessor core, are:

1. the ManArray Data Bus (MDB) which provides high volume data flow into and out of the DSP core,
2. the ManArray Control Bus (MCB) which provides a path for peripheral access and control, and
3. the DMA Bus (consisting of two identical 32-bit lanes) which provides the data path between MDB devices and the PE local memories.

The DMA controller complements the high-performance signal processor; enabling flexible data transfer between off-core devices and local memories while minimizing array processor overhead.

Figure 1. shows where the DMA controller fits into the Manta coprocessor core.

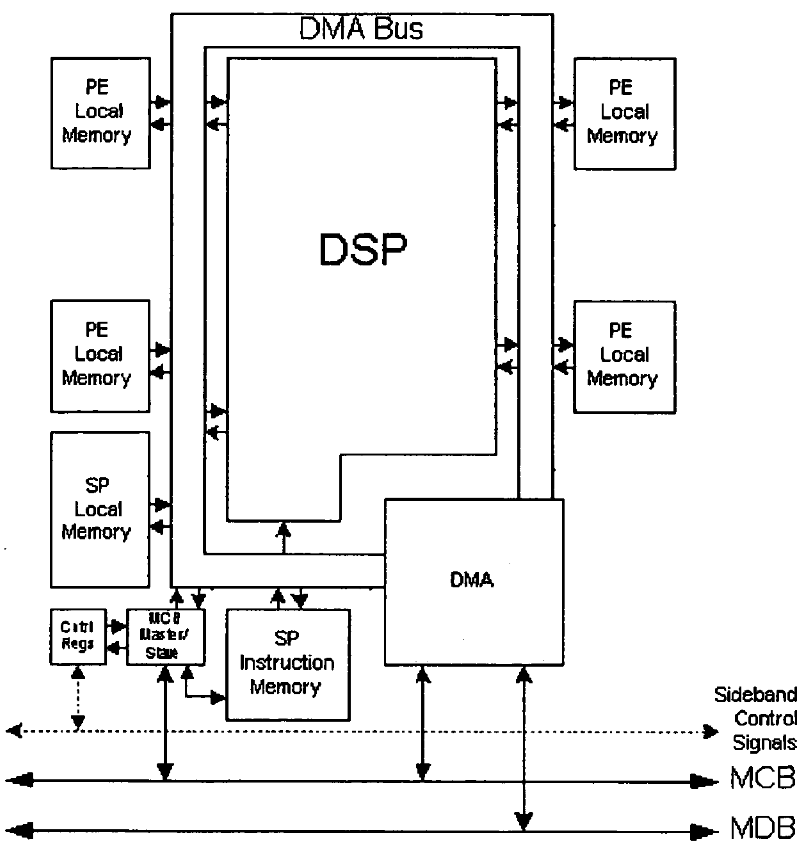

*Figure 1. Manta coprocessor core: DMA Controller Interfaces and DSP array.*

Figure 2 shows the DSP array elements in addition to the DMA controller and memories. The Local Memory Interface Units (LMIUs), the SP Data Memory Interface Unit (SPDMIU) and the SP Instruction Memory Interface Unit (SPIMIU) arbitrate between the DSP array and the DMA controller for memory access. The DSP array (comprising PE0...PE3) always has preference in the case of conflicting accesses.

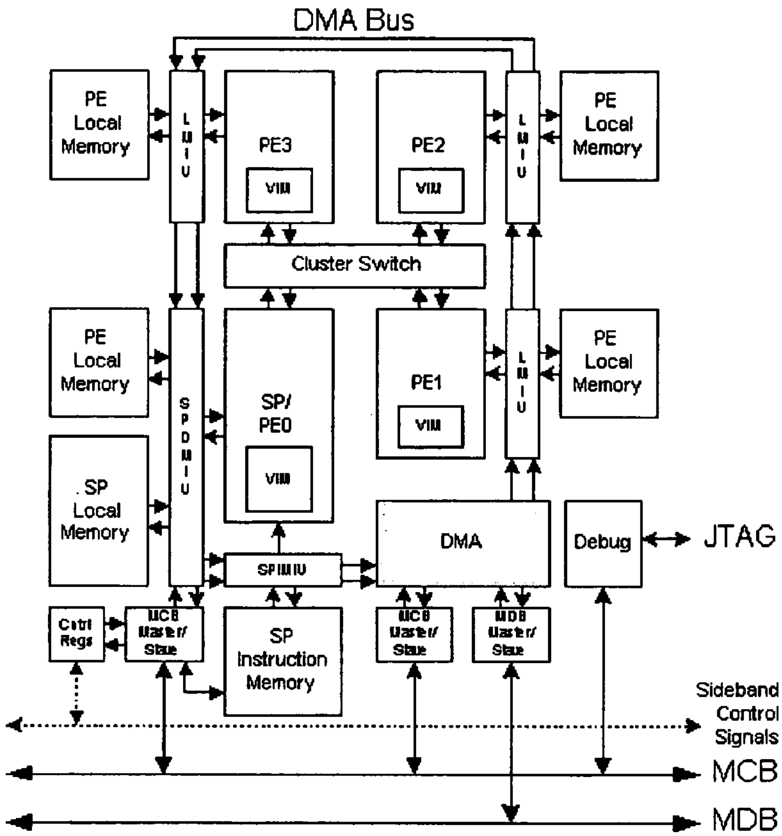

*Figure 2 Manta coprocessor core: DMA Controller Interfaces and DSP array elements.*

Figure 3 shows the structure of the DMA controller and its two independent lane controllers. Each lane controller can manage a single transfer, either Inbound (from MDB to DMA Bus) or Outbound (from DMA bus to MDB), at any given time. Hence, two DMA transfers can be in progress simultaneously.

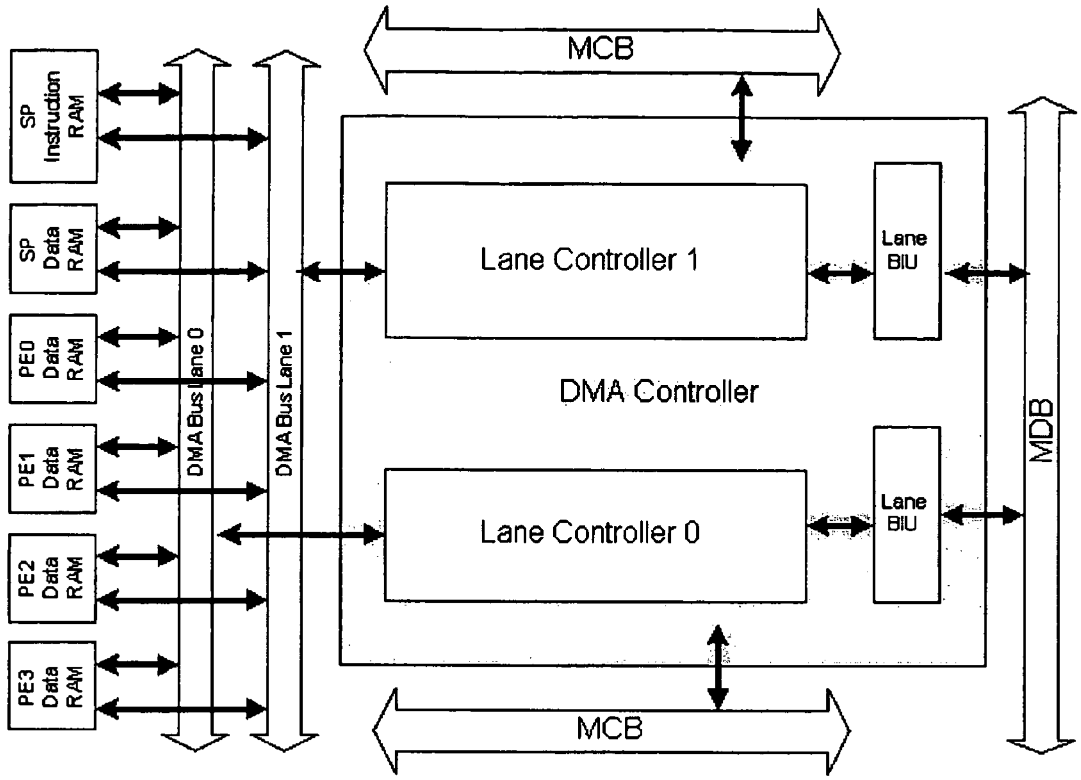

*Figure 3 DMA Controller consisting of two lane controllers*

The DMA Bus consists of two 32-bit data lanes. Each lane is a physically separate, 32-bit data path on the DMA Bus, each controlled by one of the lane controllers. SP data memory, SP instruction memory and PE data memories are each connected to both lanes of the DMA bus, allowing lane controllers independent access to each memory.

Each lane controller is also connected to the MCB where it acts as a bus slave for receiving commands from a host processor, and as a bus master for sending synchronization messages to the host processor or other MCB bus slaves.

The lane controllers are connected to the MDB by a common bus-interface unit, shared by both lane controllers.

Figure 4 shows the internal blocks of the lane controllers. Each lane controller connects to three bus interfaces: one DMA lane (either Lane 0 or Lane 1), an MCB bus interface and an MDB bus interface. Lane controllers each consist of:

- an Instruction Control Unit (ICU),
- a Command Control Unit (CCU),
- a Core Transfer Unit (CTU),
- a System Transfer Unit (STU), and
- Inbound and Outbound data FIFOs.

The CCU decodes and executes host control commands and manages communication of status messages onto the MCB.

The ICU controls fetch and decode of a transfer instruction stream.

The CTU controls data flow between a DMA Bus Lane and the FIFOs.

The STU controls data flow between the FIFOs and the DMA BIU.

Each lane controller can process one transfer (either inbound or outbound) at a time, and both lane controllers can operate independently. The overall throughput of the lane controllers is designed to match the bandwidth of the MDB.

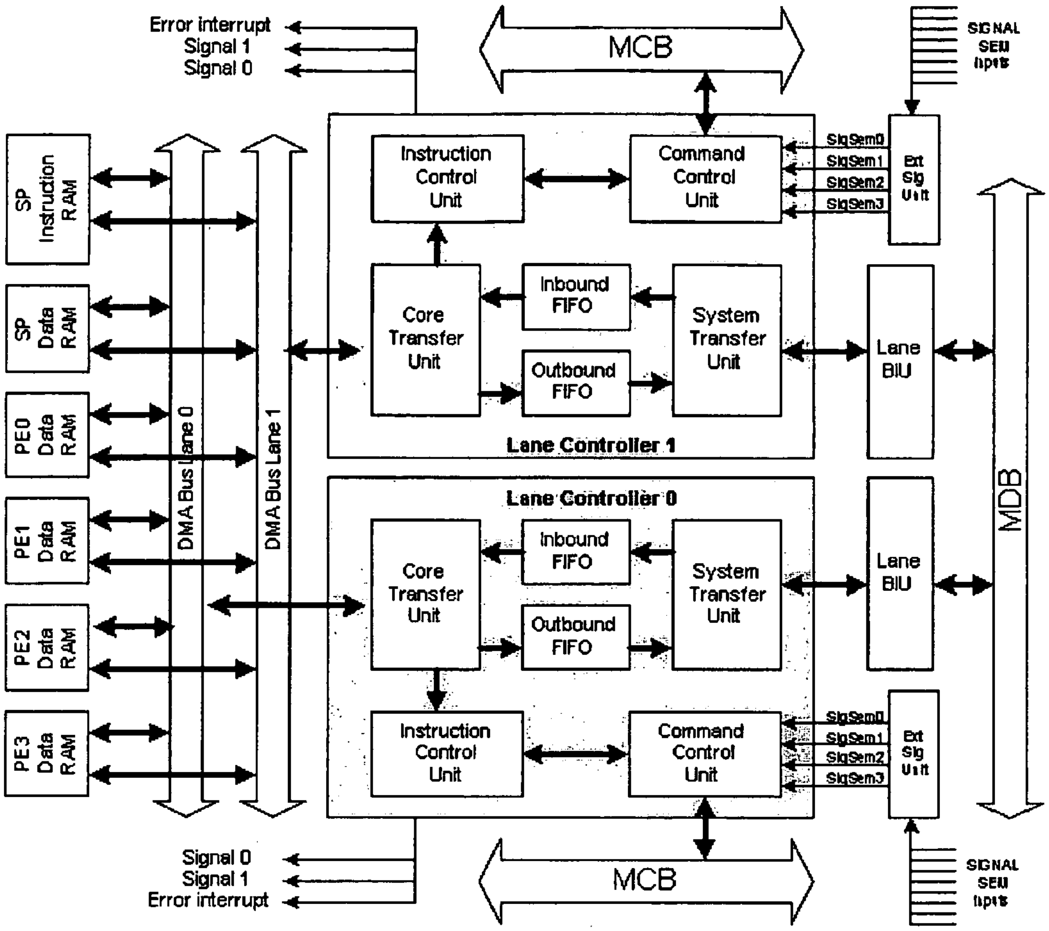
*Figure 4 lane controller structure within DMA controller*

2 Simple Inbound Transfer to SP Data Memory

The following figure illustrates a simple inbound transfer which moves data from an external memory device such as system memory on the AGP bus to SP Data Ram.

To effect this transfer, the System Transfer Unit (STU) continuously makes read requests on the ManArray Data Bus (MDB) to effect data transfers from the system memory on the AGP into the inbound FIFO. The STU's goal is keep the inbound FIFO full. The Core Transfer Unit (CTU) schedules write transfers on the DMA bus to move data from the inbound FIFO to the SP Data Ram. Its goal is to keep the inbound FIFO empty.

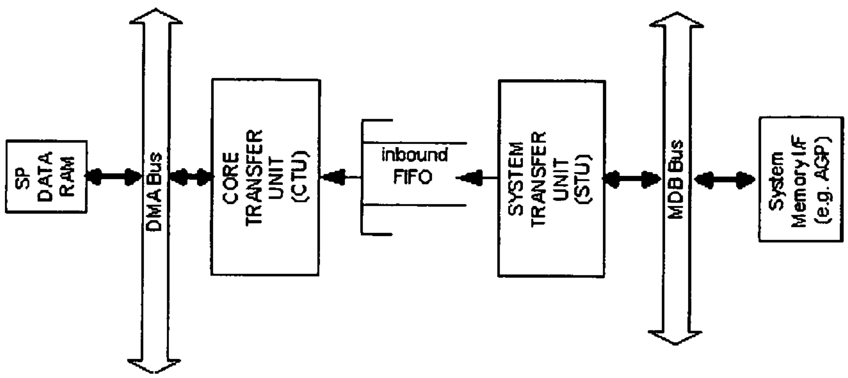

*Figure 5. MANTA Core showing Inbound DMA Transfer from AGP to SP DATA RAM*

The program running in the SP causes the CTU and STU to cooperatively effect this transfer. Once started, a long inbound DMA transfer can be handled without further involvement from the SP. Figure 6 illustrates two ways to effect this transfer, one using the inbound DMA transfer and the other using program synchronous SP Load instructions. SP load instructions are the most flexible way to load an arbitrary memory location into the SP, but when the SP load unit "touches" an external memory, it exposes itself to a stall condition that will cause the DSP to loose one or more full clock cycles.

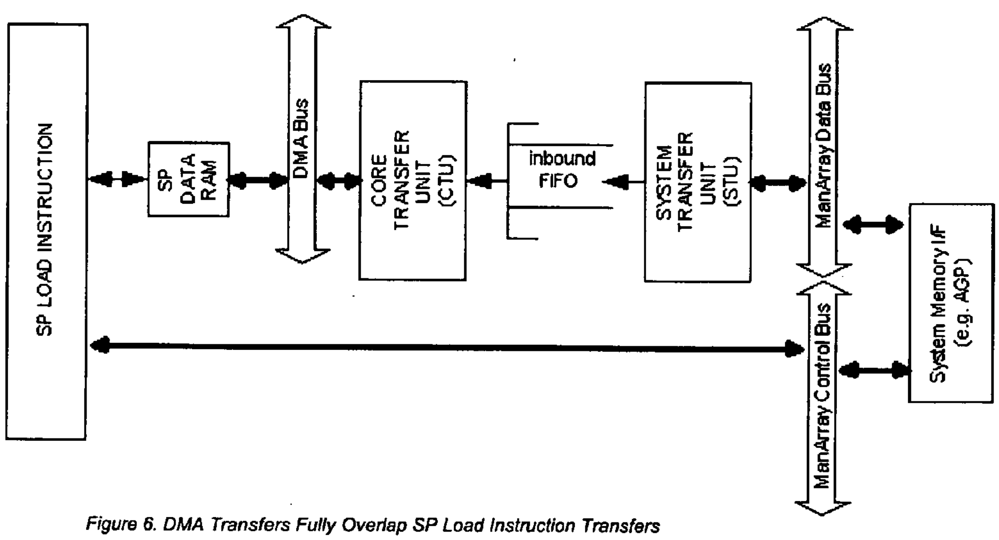

*Figure 6. DMA Transfers Fully Overlap SP Load Instruction Transfers*

The inbound DMA transfer does not expose the SP to uncontrolled stall conditions, but it does require a more involved initialization sequence to perform the transfer. Note that in addition to avoiding stall conditions, the DMA transfer occurs in parallel with SP execution, and without affecting the SP execution resources. Thus a DSP signal processing application runs at exactly the same time additional application data is copied into the SP Data RAM.

2.1 Simple Inbound Transfer of Program Code to the SP Instruction Memory

The fully overlapped DMA inbound transfer is used to load the next program overlay into a portion of the SP instruction RAM while the current overlay is finishing its execution in another section of the SP instruction RAM.

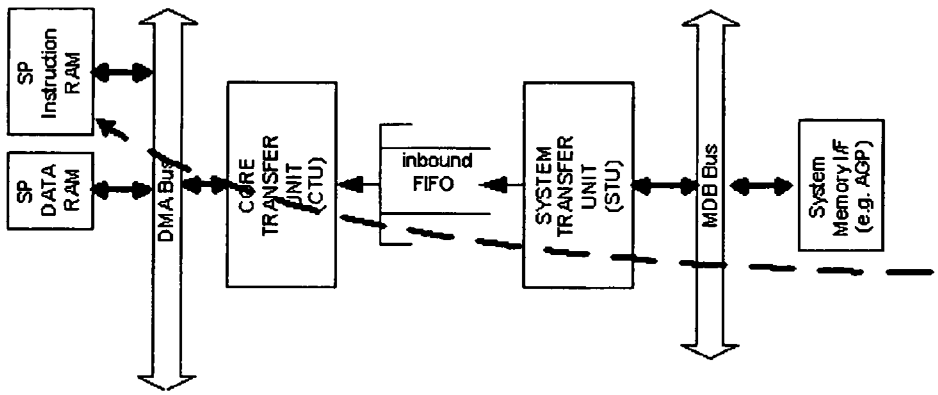

*Figure 7. Using inbound DMA transfers to load a program in the SP instruction RAM*

2.2 Simple Inbound Transfer of Application Data to a PE Data Memory

The inbound DMA transfer is used for continuous flow signal processing applications. For example, a continuous stream of Analog to Digital converter samples can be brought into PE data memory for a DSP application. These samples can be continuously fetched into the PE data memory without affecting the DSP algorithm's usage of the SP/PE processing resources.

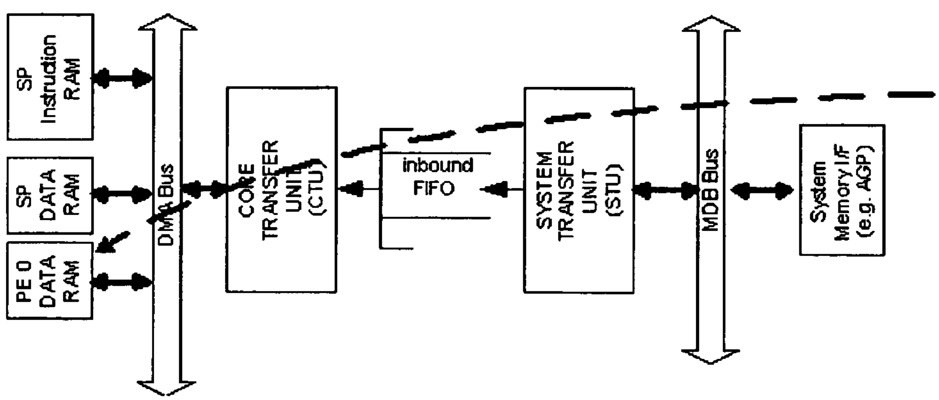

*Figure 8. Using Inbound DMA Transfer to load application data into PE Data Ram*

2.3 Interleaved Selection of PE Data Memory Destinations

Optimal packing of the incoming data into the PE data RAMs often involves scattering the elements of the sample vector stream among the PEs. Numerous addressing modes are provided within the DMA to effect this interleaving operation. For example, the incoming data can be scattered so that each subsequent data element is forwarded to the next sequential PE number. Various complex addressing modes can be programmed into the DMA transfer, so that incoming data can be appropriately packed into the four PE data Rams using DMA address generation and data transfer resources instead of SP/PE computation resources. Likewise, outgoing data may be gathered from the PEs in patterns that best match the characteristics of the algorithm in operation.

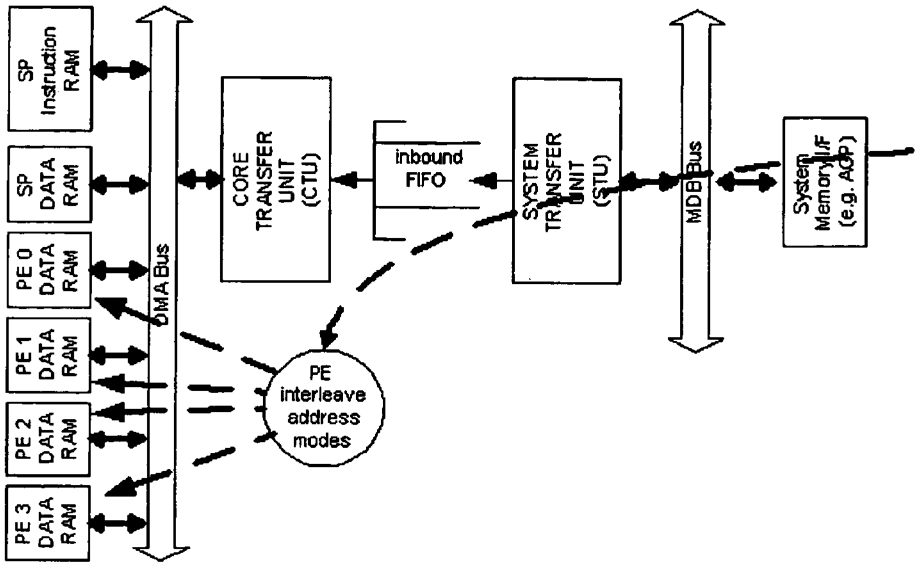

*Figure 9. PE Interleaved Address Modes*

2.4 DMA Instruction Control Unit

Each DMA lane controller is a processor in its own right. The DMA controller instruction set is distinct from the SP/PE instruction set; it is optimized for implementing memory-to-memory transfers along with transfer synchronization as targeted at DSP applications. Each DMA lane has its own instruction fetch/execute unit complete with a program counter (see Figure 10). DMA instructions are fetched over the DMA bus, typically from either the SP Data RAM or the SP Instruction RAM. DMA instructions may also reside in PE Rams There are five classes of DMA instructions:

- Transfer instructions
- Program Flow control instructions
- State control instructions
- Modify-register instructions
- Synchronization Transfer instructions may target either the STU or the CTU, thus two DMA instructions are used to start a complete inbound or outbound DMA transfer, with independent address generation for source and destination memories.

Program Flow Control instructions include jumps, nops and a subroutine call-return mechanism. These instructions allow autonomous instruction stream control.

State control instructions are used to restart a transfer or to clear transfer parameters from a specified transfer unit.

Modify-register instructions allow update of special registers that support address generation, message communication and conditional execution.

Synchronization instructions include SIGNAL and WAIT operations with semaphores, along with instructions for specifying events and signals and/or messages to send when they occur.

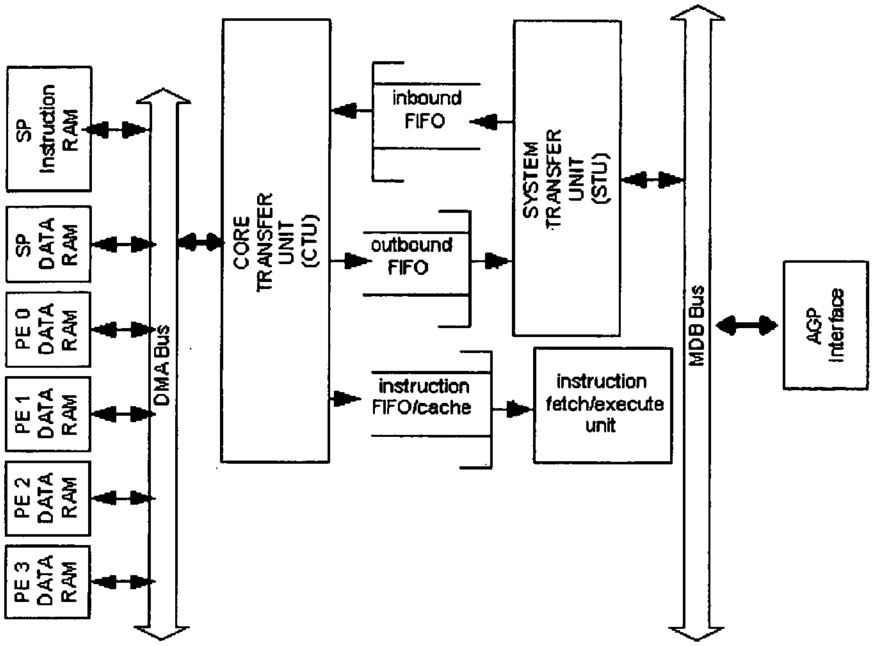

*Figure 10. DMA Instruction Processor*

The Instruction set includes the following types of instructions:

- Transfer System Inbound Instruction
- Transfer Core Inbound Instruction
- Transfer System Outbound Instruction
- Transfer Core Outbound Instruction
- Branch types: Jump, Call and Return (conditional, absolute and TPC-relative)
- Restart transfer Instruction
- Signal semaphore
- Wait semaphore
- Load Event/Action registers with conditions/actions
- Load GPR with an immediate value
- Load semaphores with immediate values
- Load PE address translation table
- Load bit-reversal address translation code

3 Instruction Set Overview

DMA instructions may be divided into two classes, transfer and control.

- Transfer-type instructions are executed in the Transfer Units. They move data between a memory or peripheral and an LC FIFO (either the Inbound Data Queue or IDQ, or the Outbound Data Queue or ODQ).
- Control-type instructions are executed in the ICU. They are subdivided into synchronization-type and branch-type.

A transfer program consists of a sequence of DMA instructions, and is aligned on 32-bit boundaries.

The following table shows a list of basic instruction types.

*Table 1. Instruction Types*

| Instruction | Operation | Description |
|---|---|---|
| TSI | Transfer System Inbound | Load control parameters for Inbound transfer from MDB to Inbound FIFO. |
| TCI | Transfer Core Inbound | Load control parameters for Inbound transfer from Inbound FIFO to a Core memory. |
| TSO | Transfer System Outbound | Load control parameters for Outbound transfer from Outbound FIFO to MDB. |
| TCO | Transfer Core Outbound | Load control parameters for Outbound transfer from Core memory to Outbound FIFO. |
| JMP | Jump (PC-relative) | Branch to a PC-relative instruction address. |
| JMPD | Jump (absolute) | Branch to an absolute transfer instruction address (32-bit). |
| CALL | Call (PC-relative) | Save current PC to the Link PC (LPC) and branch to a PC-relative instruction address. |
| CALLD | Call (absolute) | Save current PC to the Link PC (LPC) and branch to an absolute instruction address (32-bit). |
| RET | Return | Restore PC from LPC and fetch the next instruction from the restored address. |
| RESTART | Resume transfer | Reload specified Transfer Counters with their initial values and continue transfer of data (enter TRANSFER state). |
| CLEAR | Clear Transfer Unit | Set STU, CTU or both to an inactive state. |
| SIGNAL | Signal interrupt, message or semaphore | Allows general conditional signaling using interrupts, message, or semaphore updates. |
| WAIT | Wait for semaphore condition | Wait while a semaphore condition is TRUE. Provides atomic update. |
| LIMEAR | Load Event Action Registers | Load Event Action Registers with conditions to check for. When a condition is satisfied the specified signaling action(s) occur in the form of interrupts, messages and/or semaphore updates. |
| PEXLAT | Load PE Translate | Load PE ID translation table. This table is used during PE addressing modes to |

| | | |
|---|---|---|
| | Table | translate PE address bits. |
| LIMGR | Load Immediate General Register | Loads one or more general registers (GR0-GR3) with immediate values. |
| LIMSEM8 | Load semaphore registers | This instruction allows loading of all four semaphore registers (or any subset) with 8-bit values. |
| LIMSEM4 | Load semaphore registers | This instruction allows loading of all four semaphore registers (or any subset) with 4-bit values which may be optionally extended with either zeros or ones. |
| NOP | No operation | No operation (skip this instruction) |

BOPS, Inc.

Controlling DMA Transfers

BOPS, Inc. - Manta SYSSIM 2.31

Table of Contents

1 DMA Reset - Initializing the DMA Controller and Lane Controllers
2 Specifying DMA Transfer Addresses
3 Specifying Transfer Data-Type
4 Executing a DMA Transfer Program

4.1 The Transfer Program Counter and "Wait" Program Counter Registers
4.2 INITPC and WAITPC: Initializing and Enabling Instruction Fetching
4.3 Lane Controller Commands
4.4 Lane Controller Processing States 4.4.1 RESET
4.4.2 IDLE State
4.4.3 FETCH State
4.4.4 DECODE State
4.4.5 DECODE_XFER State
4.4.6 DECODE_CTRL State
4.4.7 DECODE_SIGNAL State
4.4.8 CHECK_WAITPC State
4.4.9 IWAIT State
4.4.10 EXEC_CTRL State
4.4.11 EXEC_SIGNAL State
4.4.12 EXEC_XFER State
4.4.13 SWAIT State
4.4.14 ERROR State
4.5 End-of-Transfer (EOT) and Transfer State Transition Conditions
4.5.1 Outbound Transfers: End-of-Transfer and State Transition Conditions
4.5.2 Inbound Transfers: End-of-Transfer and State Transition Conditions
4.6 SUSPEND/RESUME Commands

5 Synchronizing Host Processor(s) with Data Transfer

5.1 Lane Controller-to-Host Processor Communication 5.1.1 Internal Transfer Events and Implicit Synchronization Actions
5.1.2 Interrupt Signals
5.1.3 Message Synchronization
5.1.4 Semaphore Synchronization
5.1.5 Host Processor-to-Lane Controller Communication

6 Special Transfer Types

6.1 DMA-to-DMA and DMA-I/O DeviceTransfers 6.1.1 "Pull model" DMA-DMA (or I/O)
6.1.2 "Push model" DMA-DMA (or I/O)

6.2 Update Transfers
6.3 Bit-Reverse PE Addressing

1 DMA Reset - Initializing the DMA Controller and Lane Controllers

At power up, the DMA controller is held in the reset state by the RESETDMA bit of the DSPCTL register. In order to operate the DMA controller this bit must be cleared by software. After the RESETDMA bit has been cleared, both Lane Controllers within the DMA block are in an idle state waiting for commands to initiate their operation. Lane Controllers may be reset individually at any time by writing to the RESET address associated with the individual Lane Controller (see the section below on Lane Controller commands). This is called a "soft reset" and takes place in one cycle . After RESET, the lane controller (or lane controllers in the case of a hard reset) is placed in the IDLE state.

2 Specifying DMA Transfer Addresses

In a typical data transfer between a core memory and a system memory (or device) residing on the MDB, two transfer instructions are used, each supplying one of the addresses. A CTU transfer instruction provides an address on the DMA Bus, specifying a core memory address. These addresses are in one of the following ranges:

| DMA BUS Memory Region | Address Range |
|---|---|
| SP Data memory | 0x00000000 - 0x00007FFF |
| SP Instruction memory | 0x00100000 - 0x00107FFF |
| PE0 Data memory | 0x00200000 - 0x00203FFF |
| PE1 Data memory | 0x00210000 - 0x00213FFF |
| PE2 Data memory | 0x00220000 - 0x00223FFF |
| PE3 Data memory | 0x00230000 - 0x00233FFF |

Note: In the case of the PE addressing modes (described in detail below), only a 16-bit address is required as an offset, since the PE selection is determined by the PE Translation Table (PEXLAT instruction) and multiple PEs are targeted with a single transfer.

An STU transfer instruction provides a system address for devices residing on the MDB. These addresses are 32-bit addresses and are system dependent. The DMA bus and system address spaces are separate for the purposes of DMA transfer addressing (e.g. address 0x00000000 represents a different physical location depending on whether it is submitted to the DMA Bus or the MDB.

System Transfer Unit (STU) Addresses for Manta are shown in the following table:

| Memory Region | Address Range |
|---|---|
| SDRAM | 0x00000000 - 0x03FFFFFF |
| FLASH ROM | 0x04000000 - 0x07FFFFFF |
| PCI Bus Window | 0x08000000 - 0x0BFFFFFF |
| MPB Window | 0x0C000000 - 0x0FFFFFFF |
| Manta I/O | 0x10000000 - 0x10FFFFFF |
| MDB DMA Slaves | 0x11000000 - 0x13FFFFFF |
| PCI | 0x14000000 - 0xFFFFFFFF |

Important Note: Addresses are always assumed to be byte addresses even though the smallest data type supported for Manta is 32-bits. Therefore the least significant two bits of all memory addresses used as the source or destination of data transfers should be zero. On the other hand, addresses used to specify messages sent on the MCB (e.g. SIGNAL instructions) may be aligned to any byte address.

3 Specifying Transfer Data-Type

For the Manta core, the transfer data type is always assumed to be "32-bit word".

4 Executing a DMA Transfer Program

When a Lane Controller comes out of its reset state, it is placed in the IDLE state. In order to start a program, the program counter must be initialized to the start of a list of DMA instructions, and then enabled for fetching. Instruction execution depends on the current Lane Controller state, on commands sent to the Lane controller over the MCB, and on the instructions themselves. The following sections describe the commands, registers, states of operation and instructions used for program flow control.

4.1 The Transfer Program Counter and "Wait" Program Counter Registers

There are two primary registers used to control program flow:

- the Transfer Program Counter (TPC), and
- the Wait Program Counter (WAITPC).

Whenever these two registers contain the same value, the processor enters (or remains in) a "waiting" or paused state. No further instructions are decoded until the WAITPC differs from the TPC. The WAITPC acts as a fence, preventing further instructions from being executed. Since the order of transfer requests in an application program may not be static (tasks request transfers at varying times) the DMA instruction list can be built dynamically. The WAITPC allows a block of instructions to be processed while placing new requests ahead of the WAITPC address, preventing the instruction fetching from overtaking the placement of new instructions into the stream.

The following figure illustrates this:

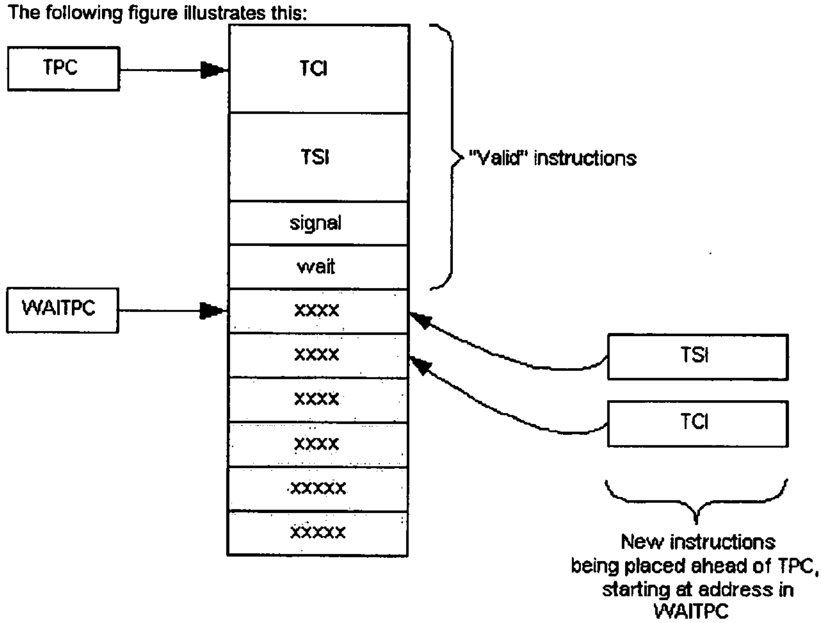

*Figure 1. Using WAITPC to "Validate" a block of DMA Instructions for Execution*

4.2 INITPC and WAITPC: Initializing and Enabling Instruction Fetching

The TPC is initialized by writing a program address to the INITPC register or directly to the TPC register. Writing an instruction address to the INITPC register causes both the TPC and WAITPC registers to be initialized to the value written. When the Lane Controller is in the IDLE state, both TPC and WAITPC have the same value. Writing to INITPC maintains this condition. A second write to the WAITPC register, with a different instruction address, allows program fetching to begin. Whenever WAITPC is not equal to TPC, the Lane Controller is enabled to fetch and execute instructions.

It is possible to enable program fetching by writing to the TPC directly. This allows instruction fetching to begin immediately (if WAITPC differs from TPC after the write). If this is done, it is best to make sure that all memory ahead of the TPC contains valid DMA instructions. The last valid DMA instruction, in this case should either cause fetching to stop (a WAIT -type instruction) or branch to a previous instruction. The use of the WAITPC allows a block of instructions to be validated without requiring a flow-control instruction in the program.

4.3 Lane Controller Commands

Lane Controller commands are control operations that are initiated by any MCB bus master by writing to or reading from specific lane controller "command" addresses.

For example, INITPC is a command that requires data to be written to the INITPC address. The RESET command is initiated by writing any data value to the RESET address. Several commands are initiated only by writing to (or reading from) particular addresses. These "address-only" commands are an efficient way to initiate some control operations, since they require less overhead on the part of an MCB bus master. Some commands may target either the STU or the CTU or both.

Most commands are accepted only when a lane controller is in certain states. When a command is received while processing in a state for which it is not valid, the command is ignored. (States may be tracked by reading the TSRx registers, bits [15:12], which indicate processing state.)

The following table describes the Lane Controller commands.

| Name | Description |
|---|---|
| RESET | Address-only command. Writing any value to this address causes the Lane Controller to reset itself to an IDLE state in which TPC = WAITPC = 0x00000000, all errors are cleared, STU and CTU are cleared to an inactive state, and any transfer in progress is terminated. The Lane Controller's inbound and outbound FIFOs are cleared, and the LMIU FIFOs associated with the Lane Controller are cleared. Registers are reset to their initial values. |
| INITPC | Writing a (32-bit) value to this address loads the TPC AND the WAITPC with the same value. Since TPC and WAITPC are equal, instructions are not fetched. Whenever WAITPC is updated (either directly or via the INITPC command) the LOCK value is cleared to zero. |
| SUSPEND | Address-only command. A write operation (any data) to this register causes any active transfer to SUSPEND activity and retain its state. The requesting transfer unit stops requesting, and the SUSPEND becomes effective after all data in the DMA pipeline has flushed to the destination. (SUSPEND may take several cycles to complete). If received while fetching and decoding an instruction, instruction SUSPENDs after executing the current instruction if it is a control type instruction, and SUSPENDs after entering the transfer state if it is a transfer-type instruction (without moving any data). |
| RESUME | Address-only command. A write to this address allows instruction fetching or data transfer to resume after being paused by a SUSPEND command. Lane controller processing is continued from where it left off prior to receiving a SUSPEND command. |
| RESTART | Address-only command. A write to this address causes the currently READY transfer unit(s) to restart. An active transfer unit which has a zero transfer count is reinitialized with its initial transfer count (from ITCNT register). If both CTC and STC are zero, then both are reloaded. Once either (or both) is reloaded the transfer resumes from the next source/destination addresses (as if the transfer were continuing from where it stopped). |
| RESTARTSTU | Address-only command. A write to this address causes the STU to reload its initial count (if the current count is zero) and continue transferring data using the current STU transfer parameters. |

| | |
|---|---|
| RESTARTCTU | Address-only command. A write to this address causes the CTU to reload its initial count (if the current count is zero) and continue transferring data using the current CTU transfer parameters. |
| CLEAR | Address-only command. A write to this address causes the STU and CTU transfer parameters to be cleared. Once cleared, transfer parameters must be reloaded by fetching new transfer instructions, and RESTART commands will have no effect. |
| CLEARSTU | Address-only command. A write to this address causes the STU transfer parameters to be cleared. Once cleared, transfer parameters must be reloaded by fetching a new STU transfer instruction, and RESTART commands will have no effect. |
| CLEARCTU | Address-only command. A write to this address causes the CTU transfer parameters to be cleared. Once cleared, transfer parameters must be reloaded by fetching a new CTU transfer instruction, and RESTART commands will have no effect. |
| INITSTC | Writing a value to this address updates both ISTC (initial system transfer count) and STC (system transfer count). |
| INITSTC_START | Writing a value to this address updates both ISTC and STC and also causes a RESTART command. |
| INITCTC | Writing a value to this address updates both ICTC (initial core transfer count) and CTC (core transfer count). |
| INITCTC_START | Writing a value to this address updates both ICTC and CTC and initiates a RESTART command. |
| WRITESTC | Writing a value to this address updates only STC. |
| WRITESTC_START | Writing a value to this address updates STC and initiates a RESTART command. |
| WRITECTC | Writing a value to this address updates only CTC. |
| WRITECTC_START | Writing a value to this address updates CTC and initiates a RESTART command. |
| LOCK0 - LOCK7 | There are 8 specific addresses (LOCK0 - LOCK7) which may be used by multiple tasks/processors for mutual exclusive access to the WAITPC, so that each may add instructions to the Lane controller's transfer program (after the current WAITPC) without interference. Each of up to 8 MCB masters (usually processors or tasks) which seek to append DMA instructions to the DMA instruction list are assigned a LOCK address. A read from to LOCKx returns either 0x00000000 (unlocked and available) or 0x00000001 (locked, not available). When a bus master's read from LOCKx returns 0, it may append instructions starting at WAITPC. When it is finished it updates WAITPC to point to 1 location beyond its last instruction. The act of writing WAITPC releases the lock, making available to other MCB masters. |
| UWAITS0 - UWAITS3 | A read from any of these addresses returns zero if the corresponding semaphore value is zero. If the value is not zero, the current value is returned and the semaphore is decremented by 1 atomically. |
| SWAITS0 - SWAITS3 | A read from any of these addresses returns zero if the corresponding semaphore value is **less than or equal to zero** (the semaphore is treated as a signed number). If the value is greater than zero , the value is returned and the semaphore is decremented by 1 atomically. |
| INCS0 - INCS3 | A **write** to any of these addresses (same addresses as UWAITS0 - UWAITS3) causes the corresponding semaphore to be **incremented** atomically. |
| DECS0 - DECS3 | A **write** to any of these addresses (same addresses as SWAITS0 - SWAITS3) causes the corresponding semaphore to be **decremented** atomically. |

4.4 Lane Controller Processing States

At any given time a Lane Controller operates in one of the following global states:

- IDLE
- FETCH
- DECODE
- TPCWAIT
- DECODE_SIGNAL
- IWAIT
- DECODE_XFER
- DECODE_CTRL
- SWAIT
- ERROR
- XFLUSH
- EXEC_SIGNAL
- EXEC_XFER
- EXEC_CTRL

These states are called "global" because they encompass the states of both the STU and CTU and actually consist of multiple substates. The following sections describe each state and how commands affect the Lane controller when in those states.

Note: Those commands which update the LOCKID register, and the SEM register (semaphore update commands) do not directly affect transfer state and are not shown in the command tables in the following sections.

---

4.4.1 RESET

RESET is not a state, but rather an event. It is documented here since a RESET may occur while in any state. In general, the following operations take place at RESET (either soft or hard).

- TPC and WAITPC are initialized to 0x00000000 (start of SP Data memory)
- IDQ and ODQ FIFOs are set to EMPTY
- LMIU FIFOs (FIFOs at each memory interface for the lane) are set to EMPTY
- Semaphore register is cleared to zero
- General Registers are not initialized (values are unspecified)
- STU and CTU are set inactive (no valid transfer parameters loaded)
    - o STC = CTC = 0

- STACTIVE = TCACTIVE = 0
- TCNT = 0
- Save TSRx Register

• Lane controller state is set to IDLE.

Other register reset values are documented below where registers are described in detail.

---

4.4.2 IDLE State

The IDLE state is entered after a hard or soft RESET has been executed or when an INITPC command has been processed (which invalidates the current instruction buffer).

Effect of Commands in IDLE

| Command/Action | Effect when in IDLE state |
|---|---|
| RESET | Next state is IDLE. A write of any data to this address resets lane controller. |
| INITPC | Next state is IDLE. Load TPC and WAITPC with value written to INITPC address.<br>Clear LOCK flag (associated with LOCKID addresses) |
| Write to WAITPC | if (TPC != WAITPC)<br>   next state is FETCH<br>else<br>   next state is IDLE<br>Clear LOCK flag (associated with LOCKID addresses) |
| Write to TPC | if (TPC != WAITPC)<br>   next state is FETCH<br>else<br>   next state is IDLE<br>Clear LOCK flag (associated with LOCKID addresses) |
| SUSPEND | Next state is SWAIT. |
| RESTART | If both STU and CTU contains valid transfer parameters<br>    if(STC == 0)<br>      STC _ ISTC<br>    if(CTC == 0)<br>      CTC _ ICTC<br>    next state is EXEC_XFER<br>else<br>    next state is current state |
| RESTARTSTU | If both STU and CTU contain valid transfer parameters<br>   if(STC == 0)<br>      STC _ ISTC<br>   if(STC != 0 && CTC != 0)<br>      next state is EXEC_XFER<br>   else<br>      next state is current state<br>else<br>  next state is current state |
| RESTARTCTU | A write of any data to this address does the following:<br><br>If both STU and CTU contain valid transfer parameters<br>   if(CTC == 0)<br>     CTC _ ICTC<br>   if(STC != 0 && CTC != 0)<br>      next state is EXEC_XFER<br>   else<br>      next state is current state |

| | |
|---|---|
| | `else`<br>`   next state is current state` |
| CLEAR | No state change. Invalidate both STU and CTU transfer parameters (place them in an inactive state) |
| CLEARSTU | No state change. Invalidate STU transfer parameters. |
| CLEARCTU | No state change. Invalidate CTU transfer parameters. |
| INITSTC | Value written to this address is used to initialize ISTC and STC. |
| INITSTC_START | Value written to this address is copied to both ISTC and STC, then RESTART transfer (same logic as above) |
| INITCTC | Next state is IDLE. Value written to this address is used to initialize ICTC and CTC. |
| INITCTC_START | Value written to this address is copied to both ICTC and CTC, then RESTART transfer (same logic as above) |
| WRITESTC | Next state is IDLE. Value written to this address updates STC only. |
| WRITESTC_START | Value written to this address STC only, then RESTART transfer (same logic as above) |
| WRITECSTC | Next state is IDLE. Value written to this address updates CTC only. |
| WRITECTC_START | Value written to this address CTC only, then RESTART transfer (same logic as above) |

4.4.3 FETCH State

The FETCH state is a transition state, entered when a new buffer of instructions is read. When the buffer is refilled the DECODE state is entered.

Effect of Commands in FETCH State

| Command/Action | Effect when in state |
|---|---|
| RESET | Next state is RESET. |
| SUSPEND | Sets internal "suspend pending" status. Actual SUSPEND does not take effect until CHECKTPC state is entered. |

4.4.4 DECODE State

In the DECODE state, the lane controller reads an instruction from the instruction buffer and determines its type. If the instruction is recognized, then one of the other decode states is entered (see following) and if not recognized the ERROR state is entered.

Effect of Commands in DECODE State

| Command/Action | Effect when in state |
|---|---|

| | |
|---|---|
| RESET | Next state is RESET. |
| SUSPEND | Sets internal "suspend pending" status. Actual SUSPEND does not take effect until CHECKTPC state is entered. |

4.4.5 DECODE_XFER State

In the DECODE_XFER state transfer instruction parameters are loaded into the specified transfer unit (either the CTU or STU).

Effect of Commands in DECODE_XFER State

| Command/Action | Effect when in state |
|---|---|
| RESET | Next state is RESET. |
| SUSPEND | Sets internal "suspend pending" status. Actual SUSPEND does not take effect until CHECKTPC state is entered. |

4.4.6 DECODE_CTRL State

In the DECODE_CTRL state, control type instructions are decoded and/or executed (if they only require a single cycle). Branch type instructions will result cause a transition to the FETCH state to reload the instruction buffer (Manta).

Effect of Commands in DECODE_CTRL State

| Command/Action | Effect when in state |
|---|---|
| RESET | Next state is RESET. |
| SUSPEND | Sets internal "suspend pending" status. Actual SUSPEND does not take effect until CHECKTPC state is entered. |

4.4.7 DECODE_SIGNAL State

In the DECODE_SIGNAL state the lane controller processes SIGNAL instructions which can require MCB bus master access (for messages)

Effect of Commands in DECODE_SIGNAL State

| Command/Action | Effect when in state |
|---|---|
| RESET | Next state is RESET. |
| SUSPEND | Sets internal "suspend pending" status. Actual SUSPEND does not take effect until CHECKTPC state is entered. |

4.4.8 CHECK_WAITPC State

The CHECK_WAITPC state is entered after every instruction is executed to determine if TPC is equal to WAITPC. If they are not equal, then the next instruction is decoded and executed. If they are equal then this state is reentered until they are made unequal (through an external command update of WAITPC or INITPC or write to TPC).

| Command/Action | Effect when in IDLE state |
|---|---|
| RESET | Next state is IDLE. A write of any data to this address resets lane controller. |
| INITPC | Next state is IDLE. Load TPC and WAITPC with value written to INITPC address. Clear LOCK flag (associated with LOCKID addresses) |
| Write to WAITPC | if (TPC != WAITPC)<br>  if instruction words are available in buffer<br>      next state is DECODE<br> else<br>      next state is FETCH<br>Clear LOCK flag (associated with LOCKID addresses) |
| Write to TPC | if (TPC != WAITPC)<br>  if instruction words are available in buffer<br>      next state is DECODE<br> else<br>      next state is FETCH<br>Clear LOCK flag (associated with LOCKID addresses) |
| SUSPEND | Next state is SWAIT. |
| RESTART | If both STU and CTU contains valid transfer parameters<br>    if(STC == 0)<br>      STC _ ISTC<br>    if(CTC == 0)<br>      CTC _ ICTC<br>    next state is EXEC_XFER<br>else<br>    next state is current state |
| RESTARTSTU | If both STU and CTU contain valid transfer parameters<br>   if(STC == 0)<br>      STC _ ISTC<br>   if(STC != 0 && CTC != 0)<br>      next state is EXEC_XFER<br>   else<br>      next state is current state<br>else<br>  next state is current state |
| RESTARTCTU | If both STU and CTU contain valid transfer parameters<br>   if(CTC == 0)<br>     CTC _ ICTC<br>   if(STC != 0 && CTC != 0)<br>      next state is EXEC_XFER<br>   else<br>      next state is current state<br>else<br>   next state is current state |
| CLEAR | Invalidate both STU and CTU transfer parameters (place them in an inactive state). |
| CLEARSTU | Invalidate STU transfer parameters. |
| CLEARCTU | Invalidate CTU transfer parameters. |
| INITSTC | No state change. Value written to this address is used to initialize ISTC and STC. |

| | |
|---|---|
| INITSTC_START | Value written to this address is copied to both ISTC and STC, then initiate RESTART |
| INITCTC | No state change. Value written to this address is used to initialize ICTC and CTC. |
| INITCTC_START | Value written to this address is copied to both ICTC and CTC, then initiate RESTART |
| WRITESTC | No state change. Value written to this address updates STC only. |
| WRITESTC_START | Value written to this address STC only, then initiate RESTART |
| WRITECSTC | No state change. Next state is IDLE. Value written to this address updates CTC only. |
| WRITECTC_START | Value written to this address CTC only, then initiate RESTART |

4.4.9 IWAIT State

The IWAIT state is entered when a WAIT instruction is decoded and it's specified condition is TRUE.

| Command/Action | Effect when in IDLE state |
|---|---|
| RESET | Next state is IDLE. A write of any data to this address resets lane controller. |
| INITPC | Next state is IDLE. Load TPC and WAITPC with value written to INITPC address.<br>Clear LOCK flag (associated with LOCKID addresses) |
| Write to WAITPC | No state change. WAITPC is updated.<br>Clear LOCK flag (associated with LOCKID addresses) |
| Write to TPC | No immediate state change.<br>When WAIT condition becomes false, next state is FETCH (since a change in TPC invalidates the instruction buffer).<br>Clear LOCK flag (associated with LOCKID addresses) |
| SUSPEND | Next state is SWAIT. |
| RESTART | If both STU and CTU contains valid transfer parameters<br>    if(STC == 0)<br>      STC _ ISTC<br>    if(CTC == 0)<br>      CTC _ ICTC<br>    next state is EXEC_XFER<br>else<br>    next state is current state |
| RESTARTSTU | If both STU and CTU contain valid transfer parameters<br>   if(STC == 0)<br>      STC _ ISTC<br>   if(STC != 0 && CTC != 0)<br>      next state is EXEC_XFER<br>   else<br>      next state is current state<br>else<br>  next state is current state |
| RESTARTCTU | If both STU and CTU contain valid transfer parameters<br>   if(CTC == 0)<br>     CTC _ ICTC<br>   if(STC != 0 && CTC != 0)<br>      next state is EXEC_XFER<br>   else |

| | |
|---|---|
| | next state is current state<br>else<br>next state is current state |
| CLEAR | Invalidate both STU and CTU transfer parameters (place them in an inactive state). |
| CLEARSTU | Invalidate STU transfer parameters. |
| CLEARCTU | Invalidate CTU transfer parameters. |
| INITSTC | No state change. Value written to this address is used to initialize ISTC and STC. |
| INITSTC_START | Value written to this address is copied to both ISTC and STC, then initiate RESTART |
| INITCTC | No state change. Value written to this address is used to initialize ICTC and CTC. |
| INITCTC_START | Value written to this address is copied to both ICTC and CTC, then initiate RESTART |
| WRITESTC | No state change. Value written to this address updates STC only. |
| WRITESTC_START | Value written to this address STC only, then initiate RESTART |
| WRITECSTC | No state change. Next state is IDLE. Value written to this address updates CTC only. |
| WRITECTC_START | Value written to this address CTC only, then initiate RESTART |

4.4.10 EXEC_CTRL State

The EXEC_CTRL state is entered with a control-type instruction is detected in decode. In this state the control type instruction is executed and the TPC value is updated according to the instruction type. If the instruction is of branch-type and any condition specified is TRUE, then the TPC is updated with the branch target address.

Effect of Commands in EXEC_CTRL

| Command/Action | Effect when in state |
|---|---|
| RESET | Next state is RESET. |
| SUSPEND | Sets internal "suspend pending" status. Actual SUSPEND does not take effect until CHECKTPC state is entered. |

4.4.11 EXEC_SIGNAL State

The EXEC_SIGNAL state is entered when decoding a multi-word SIGNAL instruction since it may require an MCB bus master operation.

Effect of Commands in EXEC_SIGNAL

| Command/Action | Effect when in state |
|---|---|
| RESET | Next state is RESET. |

| | |
|---|---|
| SUSPEND | Sets internal "suspend pending" status. Actual SUSPEND does not take effect until CHECKTPC state is entered. |

4.4.12 EXEC_XFER State

The EXEC_XFER state is entered in the following ways:

- From DECODE_XFER when a transfer-type instruction is detected
- From IDLE, IWAIT, and CHECK_WAITPC when a RESTART command is received and there are valid parameters in the STU and CTU.
- From SWAIT when a RESUME command is received and the previous state was EXEC_XFER.

This state is the global state that is in effect when a transfer is in progress. During this state the STC and CTC values are updated based on words transferred to/from the MDB or to/from the DMA Bus respectively.

Effect of Commands in EXEC_XFER

| Command/Action | Effect when in state |
|---|---|
| RESET | Next state is RESET. |
| SUSPEND or suspend-pending | `Stops source request and initiates flushing of DMA data pipeline.`<br>`IF EOT condition asserted while flushing data pipeline`<br>`    Next state is CHECK_WAITPC`<br>`else`<br>`    Next state is SWAIT` |

4.4.13 SWAIT State

The SWAIT state is entered after a SUSPEND command has been received and commands or transfers in progress have been completed or paused. This state may only be left by receiving a RESUME command or a RESET.

Effect of Commands in SWAIT State

| Command/Action | Effect when in state |
|---|---|
| RESET | Next state is RESET. |
| RESUME | Causes lane controller to exit SWAIT state and return to the state in which it was operating prior to handling the SUSPEND command. |

4.4.14 ERROR State

The ERROR state is entered when an invalid instruction has been decoded by the lane controller. The only means of leaving the error state is to issue a RESET to the lane controller (hard or soft).

Effect of Commands in ERROR State

| Command/Action | Effect when in state |
|---|---|
| RESET | Next state is RESET. |

4.5 End-of-Transfer (EOT) and Transfer State Transition Conditions

Once a transfer has been started there must be some means for the host processor to know when the transfer has completed or reached some "point of interest". These "points of interest" correspond to internal transfer conditions which may be checked and which may then be used to generate signaling actions back to the host processor(s). Each Lane Controller tracks the following conditions:

- When TPC == WAITPC
- When CTU has transferred the requested number of elements
- When STU has transferred the requested number of elements
- When both CTU and STU have transferred the requested number of elements The "TPC == WAITPC" condition is checked during CHECK_WAITPC and causes fetching to pause while the condition is true. While in the EXEC_XFER state a Lane controller uses two transfer counters, the System Transfer Count (STC) and the Core Transfer Count (CTC). The STC contains the number of data elements to be transferred from (inbound) or to (outbound) the MDB. The CTC contains the number of data elements to be transferred from (outbound) or to (inbound) the DMA Bus.

The main criteria for determining end-of-transfer (EOT) is that either of the transfer counters has reached zero AND all data in the transfer path has been flushed to the destination (FIFOs are empty, etc.). When an EOT condition is detected the Lane Controller transitions to the CHECK_WAITPC state. If programmed to do so, the EOT condition can be signalled to one or more host processors using either a direct interrupt signal (wire) or by sending a message on the MCB. The manner in which STC and CTC are decremented and EOT is determined depends on whether the transfer is inbound or outbound.

4.5.1 Outbound Transfers: End-of-Transfer and State Transition Conditions

For outbound transfers the EOT condition occurs when (STC or CTC reaches zero) AND the ODQ FIFO is empty AND the MDB master is idle.

4.5.2 Inbound Transfers: End-of-Transfer and State Transition Conditions

For inbound transfers the EOT condition occurs when (STC or CTC reaches zero) AND the IDQ FIFO is empty AND the ReqFIFOEmpty signal is asserted (all data has been written to core memory).

4.6 SUSPEND/RESUME Commands

The SUSPEND and RESUME commands provide a means for pausing and restarting a lane controller without affecting its transfer parameters. If a transfer is in progress the following sequence takes place:

- Stop requesting data in the source transfer unit (STU for Inbound transfers, CTU for outbound transfers)
- All outstanding requests are allowed to reach appropriate data FIFO
- Destination transfer unit empties FIFO by generating write request to destination bus (STU for outbound and CTU for inbound transfers). The destination transfer unit simply waits for more data to appear in the FIFO.
- If either transfer unit exhausts its transfer count while flushing the data pipeline, then the EOT condition is set.
- When the data pipeline is flushed, if the EOT condition has not been asserted the processor enters the SWAIT state. If the EOT condition has been asserted, then the Lane controller enters the CHECK_WAITPC state.

If a RESUME command is received and the processor is in the SWAIT state, then the source transfer unit begins requesting data from where it left of prior to the SUSPEND command and the destination transfer unit continues emptying the FIFO.

If no transfer is in progress when a SUSPEND command is received, any instruction which is currently in decode completes its execution and the SWAIT state is entered. If a transfer instruction is in DECODE, its parameters are loaded, and on entry to the EXEC_XFER state the suspend-pending condition is detected resulting in an immediate transition to the SWAIT state. In any of the cases, a state variable is used to return to the appropriate state when a RESUME command is received.

5 Synchronizing Host Processor(s) with Data Transfer

In many applications, synchronization of host processing with data transfer requires the following:

- Data transferred from the source buffer must be valid (that is, the transfer engine cannot be allowed to overtake the producer of data). In other words, avoid underflow conditions at the source.
- Data transferred to the destination cannot overwrite unprocessed data (the transfer engine cannot be allowed to overtake the consumer of data). In other words avoid overflow at the destination.
- The control necessary to prevent underflow and overflow at the source and destination respectively should incur minimal overhead in the source and destination processors, and to a lesser extent the transfer engine (whose function is to hide transfer latency).

There are several synchronization mechanisms available which allow these requirements to be met for each Lane controller. These mechanisms will be described by the direction of control flow, either Lane controller-to-host processor or host-processor-to-Lane controller.

---

5.1 Lane Controller-to-Host Processor Communication

Lane controllers can communicate events to host processors using any of three basic mechanisms:

- Interrupt signals
- Messages
- Semaphores

Each of these mechanisms may be operated in an explicit or an implicit fashion. Explicit operation refers to the operation being carried out by a DMA instruction. Implicit operation refers to the operation being carried out in response to an internal event (after being configured to do so). The following sections discuss explicit and implicit synchronization actions and the instructions/commands associated with them.

---

5.1.1 Internal Transfer Events and Implicit Synchronization Actions

There are basically four different internal "transfer events" which may be selected to cause an associated action:

(1) CTU reaches end-of-transfer condition
(2) STU reaches end-of-transfer condition
(3) CTU && STU reach end-of-transfer condition
(4) TPC becomes equal to WAITPC The end-of-transfer condition occurs in a unit when the number of data elements read or written by the particular unit is equal to the requested transfer count for that unit AND the data FIFO has flushed to the destination of the transfer.

Each time one of these events occurs an associated action can be performed if enabled. The selection and enabling of these actions may be done using the LIMEAR instruction or by loading the Event/Action registers, EAR0 and EAR1 directly. The LIMEAR instruction allows the EAR0 and EAR1 registers to be loaded, and specifies actions to be associated with specified internal events. LIMEAR is used to program operations to be associated with internal events. The actions which may be performed when an event from the above list occurs are:

- Assert interrupt signal 0, and/or
- Assert interrupt signal 1, and /or

- Send message: (and/or)
  - using immediate address and immediate data (immediate: contained in instruction), or
  - using indirect address (found in one of the general register GR0-GR3) and immediate data, or
  - using immediate address and indirect data (found in one of the system registers including GR0-GR3, TSR0-TSR3, SEM, and TPC, or
  - using indirect address and indirect data
- Update semaphore S0: no change, increment, decrement or clear, and/or
- Update semaphore S1: no change, increment, decrement or clear, and/or
- Update semaphore S2: no change, increment, decrement or clear, and/or
- Update semaphore S3: no change, increment, decrement or clear In addition a special restart semaphore event-action pair may be specified when an EOT condition occurs (either CTUeot or STUeot)

- When CTUeot occurs the specified semaphore is compared to zero. If the specified semaphore value is greater than zero then the CTU restarts its current transfer automatically (reloading its initial transfer count), and decrements the semaphore.
- When STUeot occurs the specified semaphore is compared to zero. If the specified semaphore value is greater than zero then the STU restarts its current transfer automatically (reloading its initial transfer count), and decrements the semaphore.

Using the available operations, the Lane controller can signal one or two processors, notifying them of the same internal event, or of different events.

5.1.2 Interrupt Signals

There are two interrupt signals available to each Lane controller. These may be used as inputs to processor interrupt controllers. Explicit assertion of these signals may be carried out using the SIGNAL instruction. When an interrupt signal is asserted, it becomes active high for 2 clock cycles, then returns to an inactive low state. Implicit assertion of an interrupt signal may be configured through use of the LIMEAR instruction or writing to the EAR0 and EAR1 registers.

5.1.3 Message Synchronization

A message is simply a single 32-bit transfer, copying a value from the Lane controller to a specified address with specified data to a device on the MCB. Explicit message communication can be carried out using the SIGNAL instruction. Messages may also be sent as a result of detecting an internal event (such as a transfer count becoming zero) by programming the EAR0 and EAR1 (event-action) registers.

5.1.4 Semaphore Synchronization

There are four 8-bit hardware semaphores which may be updated and monitored by both the Lane controller and host processors in an atomic fashion. The SIGNAL instruction is conditionally executed based on a semaphore value and may in addition update another of the semaphores. The WAIT instruction is used to atomically read-and-optionally-update the semaphore based on its value. Two of the semaphores may be used to support synchronization at the source-end of a transfer and two may be used to support synchronization at the destination-end of the transfer.

---

5.1.5 Host Processor-to-Lane Controller Communication

Host processors can communicate with the Lane controller using either commands (writes to special addresses), register updates (writes with specific data), or discrete signals (usually from an I/O block). In addition host processors can update the Lane controllers instruction flow by using the WAITPC register to break transfer programs into blocks of transfers. Multiple hosts can use the same DMA Lane controller, updating its instruction stream by using the LOCKID register and associated command addresses to implement mutual-exclusive access to the WAITPC. Semaphore commands may be used to both signal and wait on a semaphore. Particular access addresses are used to allow these operations to be performed in once bus transfer (either a read or a write). Specific register updates (such as writing to the transfer count registers) can be used to restart a transfer. A list of operations that a host processor can perform follows:

- Reset Lane controller
- Write to the INITPC register
- Write to TPC register
- Execute a "wait" operation on a semaphore (read SWAIT or UWAIT address)
- Execute a "signal" operation on a semaphore (write the INCSx or DECSx address, or assert one of the SIGNALSEMx input wires)
- Read from the LOCKx register (to acquire a software lock for accessing WAITPC)
- Write to the WAITPC to allow instruction processing to advance
- Write to CTC to update transfer count with optional auto-restart.
- Write to STC to update transfer count with optional auto-restart.
- Suspend,resume, restart transfers The SIGNALSEMx wires are a set of 4 signals per Lane Controller which are associated with a Lane Controller's semaphore registers. A 1-cycle pulse on SIGNALSEMx causes SEMx to be incremented by 1. If this signal is asserted on exactly the same cycle as a Lane Controller is executing a WAIT operation on the same semaphore, then the semaphore is not updated by either operation, and both operations complete as if their respective updates occurred normally.

---

6 Special Transfer Types

6.1 DMA-to-DMA and DMA-I/O DeviceTransfers

Each lane controller supports an MDB-slave address range which may be used to directly read and write from/to the corresponding ODQ or IDQ when the lane's STU is in an inactive state. For example, a DMA transfer from SP Data memory to PE Data memories may be carried out by the following instruction sequences executed by Lane controller 1 and Lane controller 0:

Lane 1:

1. Clear STU - This makes the STU capable of receiving slave requests for IDQ FIFO access.
2. Transfer instruction - Transfer Core Inbound to PE Data address, "transfer count" words Lane 0:

1. Control instruction - setup event-action register to signal interrupt at EOT
2. Transfer instruction - Transfer Core Outbound from SP Data addresses, "transfer count" words
3. Transfer instruction - Transfer System Outbound to MDB slave address(es) of Lane 1, "transfer count" words. Lane 1 STU will write data to its IDQ.

Note that two lane controllers are used to carry out DMA-DMA transfers (or one lane controller an some other reading/writing MDB-master).

This same mechanism can be used by any device on the MDB to read/write to a Lane's data queues, allowing one DMA controller or I/O device to read/write data to another. The following two sections show how general "pull" and "push" model DMA-DMA transfers can be implemented.

6.1.1 "Pull model" DMA-DMA (or I/O)

To support a "pull" model DMA-to-DMA or I/O-to-DMA transfer:

1. Place STU of source DMA into the inactive state (by instruction or command).
2. Program source CTU with an instruction which gathers data from the desired memories and start the transfer. This causes the FIFO to be filled but the STU is inactive so that the FIFO will only respond to reads from the source Lane controller's MDB slave port.
3. Program the destination STU with a TSI.IO instruction using the source DMA's MDB slave address as the I/O transfer address to read from. Program the destination CTU with the desired transfer type for distributing data to destination memories and start the transfer.

The destination DMA Lane controller will "pull" data from the source DMA Lane controller until either source or destination transfer unit reaches an end-of-transfer (EOT) condition (items transferred is equal to transfer count requested). Semaphores may be used to make the setup and execution of the transfer almost entirely occur in the background.

6.1.2 "Push model" DMA-DMA (or I/O)

To support a "push" model DMA-to-DMA or I/O-to-DMA transfer:

1. Place STU of destination DMA into the inactive state (by instruction or command).

2. Program destination CTU with an instruction which distributes data to the desired memories and start the transfer. This causes the CTU to wait for data to arrive in the Inbound FIFO. The STU is inactive so that the FIFO will only respond to writes from the source Lane controller's STU.

3. Program the source STU with a TSO.IO instruction using the destination DMA's MDB slave address as the I/O transfer address to write to. Program the source CTU with the desired transfer type for gathering data from source memories and start the transfer.

The source DMA Lane controller will "push" data into the destination DMA Lane controller's Inbound FIFO until either source or destination transfer unit reaches an end-of-transfer (EOT) condition (items transferred is equal to transfer count requested). Semaphores may be used to make the setup and execution of the transfer almost entirely occur in the background.

6.2 Update Transfers

Update transfers are special instructions that allow an already loaded transfer to be updated with a new transfer count or new target address (or both) without affecting other parameters or state. These types of transfers are useful for minimizing DMA instruction space when processing transfers that are similar to each other.

6.3 Bit-Reverse PE Addressing

Bit-reverse PE addressing allows efficient scatter and gather of FFT data and coefficients. The DMA controller provides an efficient means for post-processing FFT calculations through its bit-reverse addressing capability.

Definitions

Bit reversal is a transposition of bits where the most significant bit (of a given "field" width) becomes least significant, and so on. For example, 0001011 will become 0011010 when the field width is 5 bits.

Digit reversal is a transposition of groups of bits (a group of bits defines a digit) where the most significant digit becomes least significant. For example, 0001011 will become 0111000 for field width 6 and digit width 2.

Discussion

In general an FFT and similar algorithms are faster when they produce out of order output. However, one can implement FFTs that preserve the ordering with some additional cost. The reordering depends upon the radix used.

| Radix | Reversal digit width |
|---|---|
| 2 | 1 |
| 4 | 2 |
| 8 | 3 |
| 2^k | k |

Algorithms with radix larger than 8 seem to be impractical, so we will only encounter digit widths 1-3. Also, any algorithm is capable in processing its own output, meaning that if algorithm A takes in-order input and produces some of the above reversals, then for the inverse transform, algorithm A with a reversed input of the same kind, will produce an in-order output.

The complications arise when one is faced with providing or dealing with a reversed ordering that is not the result of the algorithm at hand:

1) take reversed output from the PEs and generate in-order vector in external memory
2) take reversed output from the PEs and generate bit-reversed vector
3) the inverse of the above two.

Functionality

The offset or vector index can be considered as consisting of two fields:

a) the distributed address (usually this is the PE id) consisting of the most significant bits.
b) the local address (rest of the bits).

To achieve 1), bit reverse PE ids and then digit reverse local address according to radix.

To achieve 2), only bit reverse within the digits.

The bit-reverse addressing supports radix 2, 4, and 8 FFTs (corresponding to digit widths of 1,2, and 3 bits respectively), reversed orderings (1) and (2) above with FFT sizes 256, 512, 1024, 2048, 4096 and 8192 (bits per PE address are 6, 7, 8, 9, 10, and 11 respectively).

NOTE: PE Address bits [1:0] are always assumed to be zero (they are not routed to PE since DMA transfers are only in 32-bit words for Manta).

| BitRev Code | PE Address Bits | | | | | | | | | | | | | |
|---|---|---|---|---|---|---|---|---|---|---|---|---|---|---|
| No reversal | 13 | 12 | 11 | 10 | 9 | 8 | 7 | 6 | 5 | 4 | 3 | 2 | 1 | 0 |
| | | | | | | | | | | | | | | |
| 0x01 | 13 | 12 | 11 | 10 | 9 | 8 | 2 | 3 | 4 | 5 | 6 | 7 | 1 | 0 |
| 0x02 | 13 | 12 | 11 | 10 | 9 | 2 | 3 | 4 | 5 | 6 | 7 | 8 | 1 | 0 |
| 0x03 | 13 | 12 | 11 | 10 | 2 | 3 | 4 | 5 | 6 | 7 | 8 | 9 | 1 | 0 |
| 0x04 | 13 | 12 | 11 | 2 | 3 | 4 | 5 | 6 | 7 | 8 | 9 | 10 | 1 | 0 |
| 0x05 | 13 | 12 | 2 | 3 | 4 | 5 | 6 | 7 | 8 | 9 | 10 | 11 | 1 | 0 |
| 0x06 | 13 | 2 | 3 | 4 | 5 | 6 | 7 | 8 | 9 | 10 | 11 | 12 | 1 | 0 |
| 0x07 | 13 | 12 | 11 | 10 | 9 | 8 | 3 | 2 | 5 | 4 | 7 | 6 | 1 | 0 |
| 0x08 | 13 | 12 | 11 | 10 | 3 | 2 | 5 | 4 | 7 | 6 | 9 | 8 | 1 | 0 |
| 0x09 | 13 | 12 | 3 | 2 | 5 | 4 | 7 | 6 | 9 | 8 | 11 | 10 | 1 | 0 |
| 0x0a | 13 | 12 | 11 | 10 | 9 | 8 | 6 | 7 | 4 | 5 | 2 | 3 | 1 | 0 |
| 0x0b | 13 | 12 | 11 | 10 | 8 | 9 | 6 | 7 | 4 | 5 | 2 | 3 | 1 | 0 |
| 0x0c | 13 | 12 | 10 | 11 | 8 | 9 | 6 | 7 | 4 | 5 | 2 | 3 | 1 | 0 |
| 0x0d | 13 | 12 | 11 | 10 | 9 | 8 | 4 | 3 | 2 | 7 | 6 | 5 | 1 | 0 |
| 0x0e | 13 | 12 | 11 | 4 | 3 | 2 | 7 | 6 | 5 | 10 | 9 | 8 | 1 | 0 |
| 0x0f | 13 | 12 | 11 | 10 | 9 | 8 | 5 | 6 | 7 | 2 | 3 | 4 | 1 | 0 |
| 0x10 | 13 | 12 | 11 | 8 | 9 | 10 | 5 | 6 | 7 | 2 | 3 | 4 | 1 | 0 |
| | | | | | | | | | | | | | | |

| | | | | | | | | | | | | | | |
|---|---|---|---|---|---|---|---|---|---|---|---|---|---|---|
| Inputs per output address bit | 1 | 2 | 4 | 6 | 6 | 8 | 6 | 7 | 7 | 8 | 8 | 11 | | |

Assume a 5-bit "Bit Reversal" code which is always fed into a PE address output MUX. There are 17 possible variations, with a code value of 0 corresponding to "no reversal" of bits.

The Bit Reversal code will be stored in a DMA register, BITREV, whose default value is 0 (no reversal). This register is read/writable from the MCB. There is one BITREV register per Lane controller. This register is reset to 0 on DMA RESET.

DMA Register and Command Address Reference

BOPS, Inc. - Manta SYSSIM 2.31

Table of Contents

1 DMA Register Map
2 Register Definitions

2.1 GR0, GR1, GR2, GR3 -- General Registers
2.2 LOCKID -- Lock ID Register
2.3 SEM - Semaphore Register
2.4 PETABLE - PE Translate Table Register
2.5 EXTSIG - External Signal Register
2.6 TSR0 -- Transfer Status Register 0 (Read-Only)
2.7 TSR1 -- Transfer Status Register 1 (Read-only)
2.8 TSR2 -- Transfer Status Register 2 (Read-only)
2.9 TSR3 -- Transfer Status Register 3 (Read-only)
2.10 TPC - Transfer Program Counter
2.11 WAITPC - Wait Program Counter
2.12 LINKPC - Link Program Counter
2.13 EAR0 - Event / Action Register 0
2.14 EAR1 - Event/Action Register 1
2.15 BITREV - Bit-Reversal Addressing Register
2.16 ITCNT - Initial Transfer Count Register
2.17 TCNT - Transfer Count Register

1 DMA Register Map

| Name | System Address (not SP relative) | | Description |
|---|---|---|---|
| | Lane 0 | Lane 1 | |
| Base Address | 0x00708000 | 0x00708400 | |
| | Register Offset | | |
| RESUME | 0x03 | | Write-only address |
| CLEARSTU | 0x05 | | Write-only address |
| RESTART | 0x07 | | Write-only address |
| RESTARTCTU | 0x09 | | Write-only address |
| RESET | 0x20 | | Write-only address |
| INITSTC | 0x30 | | Write-only address + data (updates both STC and ISTC) |
| INITCTC | 0x34 | | Write-only address + data (updates both CTC and ICTC) |
| WRITESTC | 0x38 | | Write-only address + data (updates only STC, not ISTC) |
| WRITECTC | 0x3c | | Write-only address + data (updates only CTC not ICTC) |
| LOCK0 | 0x50 | | Read-address. Read returns 1 if locked, 0 if not locked (lock granted) |
| LOCK2 | 0x52 | | Read-address. Read returns 1 if locked, 0 if not locked (lock granted) |
| LOCK4 | 0x54 | | Read-address. Read returns 1 if locked, 0 if not locked (lock granted) |
| LOCK6 | 0x56 | | Read-address. Read returns 1 if locked, 0 if not locked (lock granted) |
| EAR0 | 0x114 | | Read/Write address |
| BITREV | 0x11c | | Read/WRite |
| GR0 | 0x120 | | Read/Write address |
| GR1 | 0x124 | | Read/Write address |
| GR2 | 0x128 | | Read/Write address |
| GR3 | 0x12c | | Read/Write address |
| PETABLE | 0x130 | | Read/Write address |
| ITCNT | 0x134 | | Read/Write address |

| | | |
|---|---|---|
| TCNT | 0x138 | Read/Write address |
| LOCKID | 0x13c | Read/Write address |
| TSR0 | 0x140 | Read-only address |
| TSR1 | 0x144 | Read-only address |
| TSR2 | 0x148 | Read-only address |
| TSR3 | 0x14c | Read-only address |
| | | |

DMA Instruction Set Reference - Transfer Instructions

BOPS, Inc. - Manta SYSSIM 2.31

Table of Contents

1 Transfer Instructions

1.1 PE Addressing
1.2 General Notes
1.3 General Format for Transfer Instructions
1.4 Transfer Core Inbound / Transfer Core Outbound (TCI / TCO)
1.5 Transfer System Inbound / Transfer System Outbound (TSI / TSO)

1 Transfer Instructions

Transfer instructions specify:

- which transfer unit they target,
- direction (inbound or outbound),
- data type,
- addressing mode,
- execution control, and
- optional parameters.

Both the STU and CTU support a number of addressing modes in common, including:

- Single-address (I/O),
- Block,
- Stride,
- Circular,
- etc.

The CTU supports an additional set of addressing modes that are specialized for multiple memory access. These are provided to collect/distribute data from/to an array of processing elements (PEs).

DMA transfer instructions are executed by either of two transfer units, the STU or CTU. When processing a transfer between two memories in the system, these units operate in parallel and each operates on its own instruction. Two transfer instructions are required to carry out most types of memory-to-memory transfers.

In some types of transfers, one unit can be active while the other unit is fed multiple transfer instructions. This is particularly useful for multiplexing data from multiple sources into a single destination, or demultiplexing data from a single source to multiple destinations.

A single transfer instruction may be used in the CTU when the STU is inactive to allow the FIFOs to be accessed for read or write from an MDB data port address. This form of transfer is used to allow DMA-DMA transfers and other external devices to read or write directly from/to the IDQ/ODQ FIFOs.

---

1.1 PE Addressing

Any individual PE memory may be accessed using the I/O, Block, Stride or Circular address modes. Because of the manner in which PEs operate on data, it is important to be able to distribute and collect data to/from multiple PEs within the same transfer.

The primary requirement for accessing PE local memories for data transfers is that there be significant flexibility, both in the order of PE access and in the order of data access within each PE. The philosophy behind PE Address control is that data is to be distributed to, or collected from, the PE local memories in a periodic fashion, where the access pattern within a single (multiple-access) period may be complex. The purpose of this approach is to minimize the number of DMA transfers required to generate a specified data access ordering.

All PE addressing involves generating a new *transfer address* (TA) for each access. The TA consists of 2 components:

- PE ID
- Offset into PE memory

The memory offset is determined using a base address value and an index value.

The initial PE ID is the first ID in the PE Translate table (see PEXLAT instruction, and PETABLE register).

If PE local memories are collectively viewed as a two dimensional array in which the first index refers to the PE and the second to the address within the PE, then in the general case the TA may be given as:

```
TA = PEMemory[PE] [Base + Index]
```

The sequence of memory addresses generated for particular transfers is determined by the order and manner in which the PE, Base and Index values are updated after each access.

1.2 General Notes

- Address generation parameters that specify counts range in value from 1 to $2^N$ where N is the number of bits in the parameter (all bits zero represents $2^N$ for an N-bit number). The transfer counts (ISTC, STC, ICTC, and CTC) have this same property. They cannot be written with a zero value. When either the STC or CTC becomes zero (after having been written by a host processor), the STUeot or CTUeot flag is set, indicating the state. These flags qualify the values in the STC or CTC registers.
- Addresses are always assumed to be byte addresses even though the smallest data type currently supported is 32-bits. Therefore, the least significant two bits of all memory addresses used as the source or destination of transfers (not MCB addresses) must be zero.
- If an invalid instruction is decoded, the lane controller enters the ERROR state and sets a flag in the Transfer Status Register 0 (TSR0) that indicates an error has occurred. A RESET command or hard reset must be asserted to the lane controller (or the entire DMA controller) to recover from the error condition.

1.4 Transfer Core Inbound / Transfer Core Outbound (TCI / TCO)

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | XferType | | 0 | I/O | 00 | | Addr Mode | | | | X | Rsrvd | | | Core Transfer Count (CTC) | | | | | | | | | | | | | | | |
| Parameters | | | | | | | | | | | | | | | | | | | | | | | | | | | | | | | |

Description
Supported transfer types (Xfer Type) are:

Xfer Type 00 = New Transfer
01 = Update Transfer
10 = Reserved
11 = Reserved

For the Update transfer types, the Address Mode field is ignored.

Supported Address Modes are:

Addr Mode 0000 = Single Address (I/O)
0001 = Block transfer
0010 = Stride
0011 = reserved
0100 = reserved
0101 = Circular
0110 = reserved
0111 = reserved
1000 = PE Block Cyclic (CTU only)
1001 = PE with Index Select (CTU only)
1010 = PE with PE Select (CTU only)
1011 = PE with PE Select and Index Select (CTU only)
1100 = reserved
1101 = reserved
1110 = reserved
1111 = reserved

Notes:
The data source for TCI is the Inbound Data Queue (IDQ), and the destination for TCO is the Outbound Data Queue (ODQ).

1.5 Transfer System Inbound / Transfer System Outbound (TSI / TSO)

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | XferType | | 1 | I/O | 00 | | Addr Mode | | | | X | 0 | Rsrv | | System Transfer Count (STC) | | | | | | | | | | | | | | | |
| Parameters | | | | | | | | | | | | | | | | | | | | | | | | | | | | | | | |

Description
Supported transfer types (Xfer Type) are:

Xfer Type 00 = New Transfer
01 = Update Transfer Count
10 = Update Transfer Address (reload current transfer count)
11 = Update Transfer Count and Transfer Address For the Update transfer types, the Address Mode field is ignored.

Supported Address Modes are:

Addr Mode 0000 = Single Address (I/O)
0001 = Block transfer
0010 = Stride
0011 = reserved
0100 = reserved
0101 = Circular
0110 = reserved
0111 = reserved
1000 = reserved
1001 = reserved
1010 = reserved
1011 = reserved
1100 = reserved
1101 = reserved
1110 = reserved
1111 = reserved

Notes:
The data source for TSO is the Outbound Data Queue (ODQ), and the destination for TSI is the Inbound Data Queue (IDQ).

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | 00 | | 0 | I/O | 00 | | Addr Mode = 0000 | | | | X | 0 | 00 | | Core Transfer Count (CTC) | | | | | | | | | | | | | | | |
| Transfer Address | | | | | | | | | | | | | | | | | | | | | | | | | | | | | | | |

CTC Core Transfer Count. Number of data items to transfer.

Transfer Address Address from (or to) which to transfer data.

Description

This instruction performs reads from (TCO), or writes to (TCI) a single address specified by Transfer Address. The number of words transferred is CTC.

Note: This instruction may be used primarily for test purposes.

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | 00 | | 0 | I/O | 00 | | Addr Mode = 0001 | | | | X | 0 | 00 | | Core Transfer Count (CTC) | | | | | | | | | | | | | | | |
| Transfer Address | | | | | | | | | | | | | | | | | | | | | | | | | | | | | | | |

CTC Core Transfer Count. Number of data items to transfer.

Transfer Address Start address of the transfer

Description

This instruction performs either a read from (TCO), or a write to (TCI) a sequence of contiguous, monotonically increasing addresses (using the data type specified in bits 25:24), starting with "Transfer Address" for "CTC" addresses.

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | 00 | | 0 | I/O | 00 | | Addr Mode = 0010 | | | | X | 0 | 00 | | Core Transfer Count (CTC) | | | | | | | | | | | | | | | |
| Transfer Address | | | | | | | | | | | | | | | | | | | | | | | | | | | | | | | |
| Index Count (Hold) Range: 1 to 65536 | | | | | | | | | | | | | | | | Base Update (Stride) Range: 1 to 65536 | | | | | | | | | | | | | | | |

| | |
|---|---|
| CTC | Core Transfer Count. Number of data items to transfer. |
| Transfer Address | Start address of the transfer |
| Index Count (Hold) | Number of contiguous data items in a block |
| Base Update (Stride) | Distance between successive blocks. Units are of "data type" size. |

Description

In stride address mode data is accessed in contiguous blocks of "Index Count" words where each block start address is separated from the next by "Base Update" (Stride) words. An example pattern for base update value of 8 and an index count ("hold") value of 4 is shown below. The number of words transferred is specified by the CTC parameter.

*Figure 1.Example of access pattern for Stride address control with Stride = 8, Hold = 4*

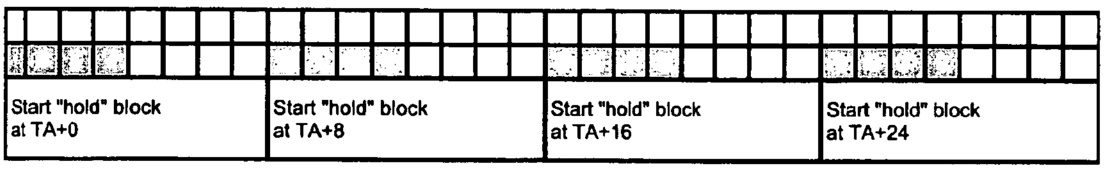

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="2">11</td><td colspan="2">00</td><td>0</td><td>I/O</td><td colspan="2">00</td><td colspan="4">Addr Mode = 0101</td><td>X</td><td>0</td><td colspan="2">00</td><td colspan="16">Core Transfer Count (CTC)</td></tr>
<tr><td colspan="32">Circular Buffer Base Address (CBBA)</td></tr>
<tr><td colspan="16">Circular Buffer Size (BufSize)<br>Range: 1 to 65536</td><td colspan="16">Init (Index)<br>Range: 0 to 65535</td></tr>
</table>

| | |
|---|---|
| CTC | Core Transfer Count. Number of data items to transfer. |
| Circular Buffer Base Address | Start address of circular buffer. |
| BufSize | Number of elements in the circular buffer. |
| Init Index | Initial offset into the circular buffer. Offset is in "datatype" size units. |

Description

The Circular addressing mode specifies a circular buffer whose base address is "Circular Buffer Base Address" (CBBA) and whose size is BufSize. The initial offset into the buffer may be specified by "Init Index". "CTC" successive elements are transferred such that the address is always maintained between CBBA and CBBA+BufSize-1, inclusive.

Given that Index is the current offset into the circular buffer (relative to CBBA) the operation is defined as:

```
Access Address = CBBA + Index
If ( (Index + 1 - BufSize) == 0 )
   Index = 0;
else
   Index = Index + 1;
```

If the Initial Index is specified as larger than BufSize, then the access pattern in unspecified.

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="2">11</td><td colspan="2">00</td><td>0</td><td>I/O</td><td colspan="2">00</td><td colspan="4">Addr Mode = 1000</td><td>X</td><td>0</td><td colspan="2">00</td><td colspan="16">Core Transfer Count (CTC)</td></tr>
<tr><td colspan="16">Reserved</td><td colspan="16">Starting Transfer Address (within PE memory)</td></tr>
<tr><td colspan="4">Loop Ctrl</td><td colspan="4">PE Count</td><td colspan="8">Base Update Count<br>Range: 1 to 256</td><td colspan="16">Base Update (Stride)<br>Range:</td></tr>
<tr><td colspan="16">Index Count (Hold)<br>Range:</td><td colspan="8">Reserved</td><td colspan="8">Index Update<br>Range: 1-256</td></tr>
</table>

Loop Ctrl — Loop Ctrl specifies a particular order in which PE, Base and Index values are updated. Three possible orders are selectable which correspond to three assignments of PE, Base and Index update to three nested control loops (outer, middle and inner).
00 = Base (outer), Index (middle), PE (inner) - BIP
01 = Base (outer, PE (middle), Index (inner) - BPI
10 = PE (outer), Base (middle), Index (inner) - PBI

PE Count — Specifies the number of PEs to be accessed for each time the PE counter is signaled to reload. Valid values are:
0000 = Max Number of PEs as specified in the PE Configuration Register
0001 = 1
0010 = 2
0011 = 3 etc., etc.

Base Update (Stride) — Distance between successive blocks. Units are of "data type" size.

Base Update Count — Used for PBI Loop Control. Specifies the number of time the Base is updated before exiting to the outer loop (PE update). Range is 1 to 256.

Index Count (Hold) — Number of contiguous data items in a block

Index Update — Distance between successive items within a block. Units are of "data type" size.

Description

Address generation for the PE addressing modes may be modeled with three nested "For" loops, where each loop updates either a PE memory start address, a Base (relative to the PE address), or an Index (relative to Base). The access address is given by: Access Address = Memory[PE, Base + Index]. The assignment of these three parameter to the three loops (outer, middle and inner) results in varying orders of data distribution to the same set of PE memory addresses. This reordering allows the placement (or removal) of data to (from) different positions on the array.

LOOP Control Examples

Given:

- An inbound sequence of 16 data with values 0,1,2,3,...15
- PETABLE setting of 0x000000E4 (no translation of PE IDs)
- TSI.block instruction in the STU (reading the 16 values from system memory)
- TCI.blockcyclic instruction in the CTU with PE count = 4, Base Update = 8, Base Count=2 (used for PBI mode only), Index Update = 2, Index Count = 2.

The resulting data in the PE memories for each type of LOOP control would be:

Loop Control: BIP (PE ID varies first, then Index, then Base)

| Address | PE0 | PE1 | PE2 | PE3 |
|---|---|---|---|---|
| 0x0000 | 0 | 1 | 2 | 3 |
| 0x0001 | | | | |
| 0x0002 | 4 | 5 | 6 | 7 |
| 0x0003 | | | | |
| 0x0004 | | | | |
| 0x0005 | | | | |
| 0x0006 | | | | |
| 0x0007 | | | | |
| 0x0008 | 8 | 9 | 10 | 11 |
| 0x0009 | | | | |
| 0x000a | 12 | 13 | 14 | 15 |

Loop Control: BPI (Index varies first, then PE ID, then Base)

| Address | PE0 | PE1 | PE2 | PE3 |
|---|---|---|---|---|
| 0x0000 | 0 | 2 | 4 | 6 |
| 0x0001 | | | | |
| 0x0002 | 1 | 3 | 5 | 7 |
| 0x0003 | | | | |
| 0x0004 | | | | |
| 0x0005 | | | | |
| 0x0006 | | | | |
| 0x0007 | | | | |

| | | | | |
|---|---|---|---|---|
| 0x0008 | 8 | 10 | 12 | 14 |
| 0x0009 | | | | |
| 0x000a | 9 | 11 | 13 | 15 |

Loop Control: PBI (Index varies first, then Base, then PE ID)

| Address | PE0 | PE1 | PE2 | PE3 |
|---|---|---|---|---|
| 0x0000 | 0 | 4 | 8 | 12 |
| 0x0001 | | | | |
| 0x0002 | 1 | 5 | 9 | 13 |
| 0x0003 | | | | |
| 0x0004 | | | | |
| 0x0005 | | | | |
| 0x0006 | | | | |
| 0x0007 | | | | |
| 0x0008 | 2 | 6 | 10 | 14 |
| 0x0009 | | | | |
| 0x000a | 3 | 7 | 11 | 15 |

Note that a for PBI mode, the base count must be 2 in order to get 2 "blocks" of data. Index count corresponds to the number of elements written before updating the next address variable. The gap between elements within a PE is due to the Index Update value of 2 (rather than 1).

BOPS, Inc. - Confidential Manta SYSSIM 2.31

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | 00 | | 0 | I/O | 00 | | Addr Mode = 1001 | | | | X | 0 | 00 | | Core Transfer Count (CTC) | | | | | | | | | | | | | | | |
| IU Count | | | | Reserved | | | | | | | | | | | | Starting Transfer Address (within PE memory) | | | | | | | | | | | | | | | |
| Loop Ctrl | | | | PE Count | | | | Base Update Count | | | | | | | | Base Update (Stride) | | | | | | | | | | | | | | | |
| IU7 | | | | IU6 | | | | IU5 | | | | IU4 | | | | IU3 | | | | IU2 | | | | IU1 | | | | IU0 | | | |

Loop Ctrl — Loop Ctrl specifies a particular order in which PE, Base and Index values are updated. Three possible orders are selectable which correspond to three assignments of PE, Base and Index update to three nested control loops (outer, middle and inner).
00 = Base (outer), Index (middle), PE (inner) - BIP
01 = Base (outer, PE (middle), Index (inner) - BPI
10 = PE (outer), Base (middle), Index (inner) -- PBI PE Count — Specifies the number of PEs to be accessed for each time the PE counter is signaled to reload. Valid values are:
0000 = Max Number of PEs as specified in the PE Configuration Register
0001 = 1
0010 = 2
0011 = 3 etc., etc.

Base Update (Stride) — Distance between successive blocks. Units are of "data type" size.

Base Update Count — Used for PBI Loop Control. Specifies the number of time the Base is updated before exiting to the outer loop (PE update). Range is 1 to 256.

IUx — IU0 - IU7 form an index update table with each entry being a 4-bit update value. Update values are integers in the range of -8 to +7.

IU Count — Index Update Count. This is the number of entries in the index update table. When 'IU Count' index updates have occurred (with associated accesses before update), the next outer loop variable (B or P) is updated. [Note that the number of accesses within the Index loop is 1 greater than the Index Update Count, e.g. an IU Count of 6 implies 7 accesses will occur before the index loop exits.] Subsequent index updates start at the first entry again (IU0). If 'IU Count' is greater than 8, the table entries are used again, starting at the beginning of the table.

Description

Address generation for the PE addressing modes may be modeled with three nested "For" loops, where each loop updates either a PE memory start address, a Base (relative to the PE address), or an Index (relative to Base). The access address is given by: Access Address = Memory[PE, Base + Index]. The assignment of these three parameter to the three loops (outer, middle and inner) results in varying orders of data distribution to the same set of PE memory addresses. This reordering allows the placement (or removal) of data to (from) different positions on the array.

The Index Select parameter allows finer-grained control over a sequence of index values to be accessed. This is done using a table of 8 4-bit index-update (IU) values. Each time the index loop is updated, an IU value is added to the effective address. These update values are accessed from the table sequentially starting from IU0 for IUCount updates. After IUCount updates (and IUCount + 1 accesses), the index update loop is complete and the next outer loop (B or P) is activated. On the next activation of the index loop IU values are accessed starting at the beginning of the table.

Example of Select Index Addressing

The transfer instruction consisting of the following 4 words generates the access pattern below (assuming the PE Translate Table has the value 0xE4, a direct mapping order PE0, PE1, PE2, PE3) :

| | |
|---|---|
| 0xC0900064 | ;Transfer Core-Inbound, Address mode =PESelectIndex, Count=100 |
| 0x60000000 | ;IUCount = 6, PE Start Address = 0x0000 |
| 0x00000040 | ;Loop Control = BIP, PE Count = 4, Base Update Count = 0, Base Update = 0x0040 |
| 0x00EEF222 | ;Index Updates are, in order: +2, +2, +2, -1, -2, -2 |

Addresses Accessed (these are byte addresses while DMA address updates are in 32-bit words):

| | |
|---|---|
| PE0, 0x0000 | ;Note: With BIP loop control PE address changes in inner loop, then index, then base |
| PE1, 0x0000 | |
| PE2, 0x0000 | |
| PE3, 0x0000 | ;PE terminal count reached here, so index update is used |
| PE0, 0x0008 | ;New index (+2), restart PE loop (PE count is 4, but it could be 1, 2, or 3). |
| PE1, 0x0008 | ;In addition the PE Translate table could result in an out of order access to PEs. |
| PE2, 0x0008 | |
| PE3, 0x0008 | |
| PE0, 0x0010 | ;New index (+2) |
| PE1, 0x0010 | |
| PE2, 0x0010 | |
| PE3, 0x0010 | |
| PE0, 0x0018 | ;New index (+2) |
| PE1, 0x0018 | |
| PE2, 0x0018 | |
| PE3, 0x0018 | |
| PE0, 0x0014 | ;New index (-1) |
| PE1, 0x0014 | |
| PE2, 0x0014 | |
| PE0, 0x000c | ;New index (-2) |
| PE1, 0x000c | |
| PE2, 0x000c | |
| PE3, 0x000c | |
| PE0, 0x0004 | ;New index (-2) |
| PE1, 0x0004 | |
| PE2, 0x0004 | |
| PE3, 0x0004 | |
| PE0, 0x0100 | ;New Base occurs here and the pattern repeats, based at 0x0100 |
| PE1, 0x0100 | |

PE2, 0x0100

PE3, 0x0100

PE0, 0x0108

PE1, 0x0108

PE2, 0x0108

PE3, 0x0108 etc.

etc.

Use of a different loop control value alters the PE, Base and Index update order, resulting in different memory access patterns.

---

BOPS, Inc. - Confidential Manta SYSSIM 2.31

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="2">11</td><td colspan="2">00</td><td>0</td><td>I/O</td><td colspan="2">00</td><td colspan="4">Addr Mode<br>= 1010</td><td>X</td><td>0</td><td colspan="2">00</td><td colspan="16">Core Transfer Count (CTC)</td></tr>
<tr><td colspan="16">Reserved</td><td colspan="16">Starting Transfer Address (within PE memory)</td></tr>
<tr><td colspan="4">Loop Ctrl</td><td colspan="4">PE Count</td><td colspan="8">Base Update Count</td><td colspan="16">Base Update (Stride)</td></tr>
<tr><td colspan="16">Index Count (Hold)<br>Range: 1 to 65536</td><td colspan="8">Reserved</td><td colspan="8">Index Update<br>Range: 1-256</td></tr>
<tr><td colspan="4">PEMSK7</td><td colspan="4">PEMSK6</td><td colspan="4">PEMSK5</td><td colspan="4">PEMSK4</td><td colspan="4">PEMSK3</td><td colspan="4">PEMSK2</td><td colspan="4">PEMSK1</td><td colspan="4">PEMSK0</td></tr>
</table>

Loop Ctrl Loop Ctrl specifies a particular order in which PE, Base and Index values are updated. Three possible orders are selectable which correspond to three assignments of PE, Base and Index update to three nested control loops (outer, middle and inner).
00 = Base (outer), Index (middle), PE (inner) - BIP
01 = Base (outer, PE (middle), Index (inner) - BPI
10 = PE (outer), Base (middle), Index (inner) – PBI

PE Count (Not used for this address mode)

Base Update (Stride) Distance between successive blocks. Units are of "data type" size.

Base Update Count Used for PBI Loop Control. Specifies the number of time the Base is updated before exiting to the outer loop (PE update). Range is 1 to 256.

Index Count (Hold) Number of contiguous data items in a block

Index Update Distance between successive items within a block. Units are of "data type" size.

PEMSKx These values form a table of 4-bit fields that are used to specify PE selections for up to 8 passes through the PEs. For each four bit field, a '1' bit selects the PE corresponding to its bit position. PEMSK0 must have at least one '1' bit, and the first all-zero field detected causes selection to begin again with the PEMSK0 field.

Description

Address generation for the PE addressing modes may be modeled with three nested "For" loops, where each loop updates either a PE memory start address, a Base (relative to the PE address), or an Index (relative to Base). The access address is given by: Access Address = Memory[PE, Base + Index]. The assignment of these three parameter to the three loops (outer, middle and inner) results in varying orders of data distribution to the same set of PE memory addresses. This reordering allows the placement (or removal) of data to (from) different positions on the array.

The PE select fields together with the use of the PE Translate table allow out of order access to PEs across multiple passes through them.

Example of Select-PE addressing

- Assume BIP loop control
- Assume a PE translate table that maps 01, 12, 23, 3·0. (table value is 0x39)
- (PE changes in the inner loop) and the following DMA instruction:

| | |
|---|---|
| 0xC0A00064 | ;Transfer Core-Inbound, Address mode =PESelectIndex, Count=100 |
| 0x00000000 | ;PE Start Address = 0x0000 |
| 0x00000040 | ;Loop Control = BIP, PE Count = N/A, Base Update Count = 0, Base Update = 0x0040 |
| 0x00040001 | ;Index Count = 4, Index Update = 1 |
| 0x00000F77 | ;PE access patterns |

Addresses Accessed (addresses shown are byte addresses-DMA uses word addresses internally).

| PE "virtual" Id (VID) | PE Physical ID (PID) | PE Address Offset | Comment |
|---|---|---|---|
| 0 | 1 | 0x0000 | Starting address |
| 1 | 2 | 0x0000 | |
| 2 | 3 | 0x0000 | |
| 0 | 1 | 0x0004 | update index |
| 1 | 2 | 0x0004 | |
| 2 | 3 | 0x0004 | |
| 0 | 1 | 0x0008 | update index |
| 1 | 2 | 0x0008 | |
| 2 | 3 | 0x0008 | |
| 3 | 0 | 0x0008 | |
| 0 | 1 | 0x000c | update index, restart w/ PEMSK0 |
| 1 | 2 | 0x000c | |
| 2 | 3 | 0x000c | |
| 0 | 1 | 0x0040 | update base, update index, PEMSK0 |
| 1 | 2 | 0x0040 | |
| 2 | 3 | 0x0040 | |
| 0 | 1 | 0x0044 | update index |
| 1 | 2 | 0x0044 | |

| | | | |
|---|---|---|---|
| 2 | 3 | 0x0044 | |
| 0 | 1 | 0x0048 | update index |
| 1 | 2 | 0x0048 | |
| 2 | 3 | 0x0048 | |
| 3 | 0 | 0x0048 | |
| 0 | 1 | 0x004c | update index |
| 1 | 2 | 0x004c | |
| 2 | 3 | 0x004c | |
| etc. | etc. | etc. | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | 00 | | 0 | I/O | 00 | | Addr Mode = 1011 | | | | X | 0 | 00 | | Core Transfer Count (CTC) | | | | | | | | | | | | | | | |
| IU Count | | | | Reserved | | | | | | | | | | | | Starting Transfer Address (within PE memory) | | | | | | | | | | | | | | | |
| Loop Ctrl | | | | PE Count | | | | Base Update Count | | | | | | | | Base Update (Stride) | | | | | | | | | | | | | | | |
| IU7 | | | | IU6 | | | | IU5 | | | | IU4 | | | | IU3 | | | | IU2 | | | | IU1 | | | | IU0 | | | |
| PEMSK7 | | | | PEMSK6 | | | | PEMSK5 | | | | PEMSK4 | | | | PEMSK3 | | | | PEMSK2 | | | | PEMSK1 | | | | PEMSK0 | | | |

Loop Ctrl Loop Ctrl specifies a particular order in which PE, Base and Index values are updated. Three possible orders are selectable which correspond to three assignments of PE, Base and Index update to three nested control loops (outer, middle and inner).
00 = Base (outer), Index (middle), PE (Inner) - BIP
01 = Base (outer, PE (middle), Index (inner) - BPI
10 = PE (outer), Base (middle), Index (inner) – PBI

PE Count (Not used for this address mode)

Base Update (Stride) Distance between successive blocks. Units are of "data type" size.

Base Update Count Used for PBI Loop Control. Specifies the number of time the Base is updated before exiting to the outer loop (PE update). Range is 1 to 256.

IU Count Index Update Count. This is the number of entries in the index update table. When 'IU Count' index updates have occurred (with associated accesses after update), the next outer loop variable (B or P) is updated. Subsequent index updates start at the first entry again (IU0). If 'IU Count' is greater than 8, the table entries are used again, starting at the beginning of the table.

IUx IU0 - IU7 form an index update table with each entry being a 4-bit update value. Update values are integers in the range of -8 to +7.

PEMSKx These values form a table of 4-bit fields that are used to specify PE selections for up to 8 passes through the PEs. For each four bit field, a '1' bit selects the PE corresponding to its bit position. PEMSK0 must have at least one '1' bit, and the first all-zero field detected causes selection to begin again with the PEMSK0 field.

Description

Address generation for the PE addressing modes may be modeled with three nested "For" loops, where each loop updates either a PE memory start address, a Base (relative to the PE address), or an Index (relative to Base). The access address is given by: Access Address = Memory[PE, Base + Index]. The assignment of these three parameter to the three loops (outer, middle and inner) results in varying orders of data distribution to the same set of PE memory addresses. This reordering allows the placement (or removal) of data to (from) different positions on the array.

The PESelectIndexPE addressing mode combines Index selection and PE selection into one addressing mode. This form of addressing provides for complex-periodic data access patterns.

Example of Select-Index-PE Addressing

- Assume BIP loop control
- Assume a PE translate table that maps 01, 12, 23, 3·0. (table value is 0x39).
- The following DMA instruction:

0xC0B00064 ;Transfer Core-Inbound, Address mode = PESelectIndex, Count=100

0x20000000 ;Index Update Count = 2, PE Start Address = 0x0000

0x00000006 ;Loop Control = BIP, PE Count = N/A, Base Update Count = 0, Base Update = 0x0006

0x00000032 ;Index Select table: +2, then +3

0x00000F77 ;PE access patterns

Addresses Accessed (addresses shown are byte addresses-DMA uses word addresses internally).

| PE "virtual" Id (VID) | PE Physical ID (PID) | PE Address Offset | Comment |
|---|---|---|---|
| 0 | 1 | 0x0000 | Starting address |
| 1 | 2 | 0x0000 | |
| 2 | 3 | 0x0000 | |
| 0 | 1 | 0x0008 | update index |
| 1 | 2 | 0x0008 | |
| 2 | 3 | 0x0008 | |
| 0 | 1 | 0x0014 | update index |
| 1 | 2 | 0x0014 | |
| 2 | 3 | 0x0014 | |
| 3 | 0 | 0x0014 | |
| 0 | 1 | 0x0018 | update index, update base |
| 1 | 2 | 0x0018 | |
| 2 | 3 | 0x0018 | |
| 0 | 1 | 0x0020 | update index |
| 1 | 2 | 0x0020 | |
| 2 | 3 | 0x0020 | |
| 0 | 1 | 0x002C | update index |
| 1 | 2 | 0x002C | |

| | | | |
|---|---|---|---|
| 2 | 3 | 0x002C | |
| 3 | 0 | 0x002C | |
| 0 | 1 | 0x0030 | update index, update base |
| 1 | 2 | 0x0030 | |
| 2 | 3 | 0x0030 | |
| 0 | 1 | 0x0038 | update index |
| 1 | 2 | 0x0038 | |
| 2 | 3 | 0x0038 | |
| etc. | etc. | etc. | |

| 31 30 | 29 28 | 27 | 26 | 25 24 23 22 | 21 20 | 19 | 18 | 17 16 | 15 14 13 12 11 10 09 08 07 06 05 04 03 02 01 00 |
|---|---|---|---|---|---|---|---|---|---|
| 11 | 01 | 0 | I/O Update | 0 (reserved) | Update Type | X | 0 | 00 | Core Transfer Count (CTC) (if update CTC specified in Update Type) |
| Core Transfer Address (CTA) (if address update specified in Update Type) | | | | | | | | | |

CTC Core Transfer Count. This field is used when Update Type specifies a CTC update.

CTA Core Transfer Address. This word of the instruction is included when CTA update is specified.

L Lock in the transfer once started.

X Begin transfer after loading this instruction

Update Type Specifies what parts (if any of the instruction currently in the CTU are to be updated)

00 = If CTC is zero, reload with ICTC (initial CTC) value. If CTC is non-zero do not update. (This allows a transfer to be continued with no changes)
01 = Update (new) CTC.
10 = Update (new) CTA. If CTC is zero, reload from initial value, otherwise it is left at its current value.
11 = Update (new) CTC and CTA I/O 0 = Inbound
1 = Outbound

Description

This instruction optionally updates the CTU with a new transfer count and transfer address.

If 'Update Type' is 00, then the CTC is reloaded from ICTC if it is zero, or left unchanged if it is non-zero. If the CTU is currently in the IDLE state, then it is enabled to run with its current parameters if 'X' is 0 or placed in the transfer state if 'X' is 1.

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | 00 | | 1 | I/O | 00 | | Addr Mode = 0000 | | | | X | 0 | 00 | | System Transfer Count (STC) | | | | | | | | | | | | | | | |
| Transfer Address | | | | | | | | | | | | | | | | | | | | | | | | | | | | | | | |

STC System Transfer Count. Number of data items to transfer.

Transfer Address Address from (or to) which to transfer data.

Description

This instruction performs reads from (TSI), or writes to (TSO) a single address specified by Transfer Address. The number of words transferred is STC.

Note: This instruction may be used primarily for test purposes.

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="2">11</td><td colspan="2">00</td><td>1</td><td>I/O</td><td colspan="2">00</td><td colspan="4">Addr Mode<br>= 0001</td><td>X</td><td>0</td><td colspan="2">00</td><td colspan="16">System Transfer Count (STC)</td></tr>
<tr><td colspan="32">Transfer Address</td></tr>
</table>

STC System Transfer Count. Number of data items to transfer.

Transfer Address Start address of the transfer

Description

This instruction performs either a read from (TSI), or a write to (TSO) a sequence of contiguous addresses starting with "Transfer Address" for "STC" addresses.

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | 00 | | 1 | I/O | 00 | | Addr Mode = 0010 | | | | X | 0 | 00 | | System Transfer Count (STC) | | | | | | | | | | | | | | | |
| Transfer Address | | | | | | | | | | | | | | | | | | | | | | | | | | | | | | | |
| Index Count (Hold) Range: 1 to 65536 | | | | | | | | | | | | | | | | Base Update (Stride) Range: 1 to 65536 | | | | | | | | | | | | | | | |

STC System Transfer Count. Number of data items to transfer.

Transfer Address Start address of the transfer

Index Count (Hold) Number of contiguous data items in a block

Base Update (Stride) Distance between successive blocks. Units are of "data type" size.

Description

In stride address mode data is accessed in contiguous blocks of "Index Count" words where each block start address is separated from the next by "Base Update" (Stride) words. An example pattern for base update value of 8 and an index count ("hold") value of 4 is shown below. The number of words transferred is specified by the STC parameter.

*Figure 2.Example of access pattern for Stride address control with Stride = 8, Hold = 4*

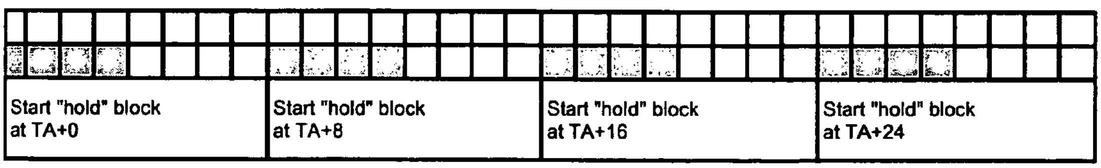

TSx.Circular

BOPS, Inc. - Manta SYSSIM 2.31

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="2">11</td><td colspan="2">00</td><td>1</td><td>I/O</td><td colspan="2">00</td><td colspan="4">Addr Mode<br>= 0101</td><td>X</td><td>0</td><td colspan="2">00</td><td colspan="16">System Transfer Count (STC)</td></tr>
<tr><td colspan="32">Circular Buffer Base Address (CBBA)</td></tr>
<tr><td colspan="16">Circular Buffer Size (BufSize)<br>Range: 1 to 65536</td><td colspan="16">Init Index<br>Range: 0 to 65535</td></tr>
</table>

| | |
|---|---|
| STC | System Transfer Count. Number of data items to transfer. |
| Circular Buffer Base Address | Start address of circular buffer. |
| Circular Buffer Size | Number of elements in the circular buffer. |
| Init Index | Initial offset into the circular buffer. Offset is in "data type" units. |

Description

The Circular addressing mode specifies a circular buffer whose base address is "Circular Buffer Base Address" (CBBA) and whose size is "Circular Buffer Size" (BufSize). The initial offset into the buffer may be specified by "Init Index". "STC" successive elements are transferred such that the address is always maintained between CBBA and CBBA+BufSize-1, inclusive.

Given that Index is the current offset into the circular buffer (relative to CBBA) the operation is defined as:

```
Access Address = CBBA + Index
If ( (Index + 1 - BufSize) ==  0 )
Index = 0;
else
Index = Index + 1;
```

If the Initial Index is specified as larger than BufSize, then the access pattern is unspecified.

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | 01 | | 1 | I/O | 0 (reserved) | | | | Update Type | | X | 0 | 00 | | System Transfer Count (STC) (if update STC specified in Update Type) | | | | | | | | | | | | | | | |
| System Transfer Address (STA) (if address update specified in Update Type) | | | | | | | | | | | | | | | | | | | | | | | | | | | | | | | |

STC System Transfer Count. This field is used when Update Type specifies a STC update.

STA System Transfer Address. This word of the instruction is included when STA update is specified.

L Lock in the transfer once started.

X Begin transfer after loading this instruction

Update Type Specifies what parts (if any of the instruction currently in the STU are to be updated)

00 = If STC is zero, reload with ISTC (initial STC) value. If STC is non-zero do not update. (This allows a transfer to be continued with no changes)
01 = Update (new) STC.
10 = Update (new) STA. If STC is zero, reload with initial (ISTC) value, otherwise leave STC at its current value.
11 = Update (new) STC and STA I/O 0 = Inbound
1 = Outbound

Description

This instruction optionally updates the STU with a new transfer count and transfer address.

If 'Update Type' is 00, then the STC is reloaded from ISTC if it is zero, or left unchanged if it is non-zero. If the STU is currently in the IDLE state, then it is enabled to run with its current parameters if 'X' is 0 or placed in the transfer state if 'X' is 1.

DMA Instruction Set Reference - Control Instructions

Table of Contents

1 Control Instructions

1.1 Transfer Control Events

1 Control Instructions

Control instructions are executed by the Instruction Control Unit. They are used to perform instruction stream control (branching) and synchronization with other processors or devices on the ManArray Control Bus (MCB). Synchronization operations rely on the generation and use of condition information produced by external inputs, Transfer Unit status and data operations.

1.1 Transfer Control Events

There are two types of conditions which can be used to control transfers and generate synchronization signals: internal and external.

Internal conditions are actually events generated during the processing of transfer instructions. They are a combination of one or both transfer counters becoming equal to zero, or the transfer PC (TPC) becoming equal to the WAITPC. These events may be used to generate synchronization signals, which may be sent via MCB or dedicated wire (or both).

External conditions are reflected in the Semaphore registers S0 - S3. These registers are updated by commands received across the MCB or by control instructions. They may then be used to control the instruction flow.

Instructions that use conditions to control their behavior have a common condition field format, shown below. Twelve conditions are determined by comparing a specified 8-bit semaphore register with zero, and setting the condition based on this result. Two of the conditions test for either the CTC or STC being equal to zero, and one condition is "always" for unconditional jumps.

Condition Table

| | |
|---|---|
| **SCondition** | Semaphore condition.<br>0000 = Always<br>0001 = Equal<br>0010 = Not equal<br>0011 = Higher than<br>0100 = Higher than or equal<br>0101 = Lower than<br>0110 = Lower than or equal<br>0111 = CTUeot<br>1000 = STUeot<br>1001 = !CTUeot (CTC not zero)<br>1010 = !STUeot (STC not zero)<br>1011 = Greater than or equal<br>1100 = Greater than<br>1101 = Less than or equal<br>1110 = Less than<br>1111 = reserved |

TPC-relative Branch Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | Branch Op | | | | | | Control (if any) | | | | SCondition | | | | TPCOffset | | | | | | | | | | | | | | | |

Direct Address Branch Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | Branch Op | | | | | | Control (if any) | | | | SCondition | | | | Reserved | | | | | | | | | | | | | | | |
| Direct System Address (32-bit) | | | | | | | | | | | | | | | | | | | | | | | | | | | | | | | |

Description
The branching instructions are of five basic types:

- jump-relative
- jump-direct
- call-relative
- call-direct
- return (from call)

All branch instructions are conditional, with one of the conditions being "always" to implement unconditional branching.

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | 000100 | | | | | | SemID | | Sem Op | | SCondition | | | | TPCOffset | | | | | | | | | | | | | | | |

Description

TPCOffset — Offset (in 32-bit words) of next instruction relative to current value of TPC.

SCondition — (See the Semaphore Condition Table.)

SemID — Semaphore ID. This specifies which semaphore is used in the condition comparison.
00 = S0
01 = S1
10 = S2
11 = S3

Sem Op — Operation to perform on semaphore if branch taken:
00 = No change to semaphore
01 = Decrement the semaphore by 1
10 = Increment the semaphore by 1
11 = Clear to Zero The JMP instruction causes the TPC to be updated to a value equal to TPC + TPCOffset if the specified condition is TRUE. (Unconditional jumps use condition condition code 0000).

The TPCOffset points to a 32-bit word address, therefore the two least significant bits are assumed to be zero and appended to the offset given in the instruction (i.e. the branch range is -32768 to +32767 words relative to the current TPC).

The Semaphore operation allows the specified semaphore to be modified when the associated condition evaluates TRUE.

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | 001000 | | | | | | SemID | | Sem Op | | SCondition | | | | Reserved | | | | | | | | | | | | | | | |
| Direct (32-bit System) Address | | | | | | | | | | | | | | | | | | | | | | | | | | | | | | 0 | 0 |

Description

Direct Address — Target address of branch. 32-bit system address.

SCondition — (See the Semaphore Condition Table.)

SemID — Semaphore ID. This specifies which semaphore is used in the condition comparison.
00 = S0
01 = S1
10 = S2
11 = S3

Sem Op — Operation to perform on semaphore if branch taken:
00 = No change to semaphore
01 = Decrement the semaphore by 1
10 = Increment the semaphore by 1
11 = Clear to Zero The JMPD instruction, when the condition is TRUE, causes the TPC to be updated with the value of the second word of this instruction. Since this is an absolute System address, it is assumed to be a byte address and therefore the least significant two bits are always forced to zero.

The Semaphore operation allows the specified semaphore to be modified when the associated condition evaluates TRUE.

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | 001100 | | | | | | SemID | | Sem Op | | SCondition | | | | TPCOffset | | | | | | | | | | | | | | | |

Description

TPCOffset — Offset (in 32-bit words) of next instruction relative to current value of TPC. The branch range is -32768 to +32767 words relative to the current TPC SCondition — (See the Semaphore Condition Table.)

SemID — Semaphore ID. This specifies which semaphore is used in the condition comparison.
00 = S0
01 = S1
10 = S2
11 = S3

Sem Op — Operation to perform on semaphore if branch taken:
00 = No change to semaphore
01 = Decrement the semaphore by 1
10 = Increment the semaphore by 1
11 = Clear to Zero If the specified condition is TRUE, the CALL instruction causes the address of the next instruction to be saved in the LTPC register (return address) and the TPC is then updated to a value equal to TPC+TPCOffset. If the specified condition is false, the CALL instruction is treated as a NOP. (Unconditional CALLs are specified with the condition code 0000).

The Semaphore operation allows the specified semaphore to be modified when the associated condition evaluates TRUE.

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | 010000 | | | | | | SemID | | Sem Op | | SCondition | | | | Reserved | | | | | | | | | | | | | | | |
| Direct (32-bit System) Address | | | | | | | | | | | | | | | | | | | | | | | | | | | | | | 0 | 0 |

Description

Direct Address — Target address of branch. 32-bit system address.

SCondition — (See the Semaphore Condition Table.)

SemID — Semaphore ID. This specifies which semaphore is used in the condition comparison.
00 = S0
01 = S1
10 = S2
11 = S3

Sem Op — Operation to perform on semaphore if branch taken:
00 = No change to semaphore
01 = Decrement the semaphore by 1
10 = Increment the semaphore by 1
11 = Clear to Zero If the specified condition is TRUE, the CALL instruction causes the address of the next instruction to be saved in the LTPC register (return address) and the 32-bit value specified in the instruction to be copied to the TPC.

If the specified condition is false, the CALL instruction is treated as a NOP. (Unconditional CALLs are specified with the condition code 0000).

The Semaphore operation allows the specified semaphore to be modified when the associated condition evaluates TRUE.

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | 010100 | | | | | | SemID | | Sem Op | | SCondition | | | | Reserved | | | | | | | | | | | | | | | |

SCondition (See the Semaphore Condition Table.)

SemID Semaphore ID. This specifies which semaphore is used in the condition comparison.

00 = S0
01 = S1
10 = S2
11 = S3

Sem Op Operation to perform on semaphore if branch taken:

00 = No change to semaphore
01 = Decrement the semaphore by 1
10 = Increment the semaphore by 1
11 = Clear to Zero The RET instruction, when the specified condition is TRUE, loads the TPC from the LTPC register and continues fetching instructions from the new instruction address.

The Semaphore operation allows the specified semaphore to be modified when the associated condition evaluates TRUE.

BOPS, Inc. - Manta
SYSSIM 2.31

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | 000000 | | | | | | Reserved (0) | | | | Exec Control Op | | | | Reserved (0) | | | | | | | | | | | | | | | |

Exec Control Op 0000 = NOP
0001 = Clear CTU
0010 = Clear STU
0011 = Clear both CTU and STU
0100 = Restart CTU
1000 = Restart STU
1100 = Restart CTU and STU This instruction has a dual purpose. When neither transfer unit is specified, this instruction is a NOP. This instruction is used primarily to force the STU into an IDLE state. When the STU is in the IDLE state it may receive read/write requests to its MDB slave address (specified in the MDBSAR -MDB Slave Address Register). A read request (when STU is IDLE) accesses the ODQ, while a write request accesses the IDQ. This mode of operation is used for DMA-DMA transfers and I/O device transfers.

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | 0110 | | | | MA Type 01 | | (Reserved for 2x4 Translate Table) | | | | | | | | | | | | | | | | 2x2Table | | | | | | | |

2x2Table Contains a table of two bit PE IDs. Two bits of the Core Transfer Address which specify the base of each PE's memory are applied as an index into this table during PE Address modes. The translated value is then used to perform the memory access. With this approach, PEs may be accessed in any order for these modes. Other addressing modes do not use the PE translation table.

MA Type ManArray Type specifies the configuration targeted, and the size of the table.
00 = 1x2
01 = 2x2
10 = 2x4
11 = 4x4

The format of entries in the 2x2 PE translate table is shown below:

| 7 | 6 | 5 | 4 | 3 | 2 | 1 | 0 |
|---|---|---|---|---|---|---|---|
| Output ID for PE3 input ID | | Output ID for PE2 input ID | | Output ID for PE1 input ID | | Output ID for PE0 input ID | |

For example, when the input address bits specify '00' (PE 0) the first entry of the table is returned ("Output ID for PE0 input ID") and substituted for them before applying the address to a core memory.

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | 1011 | | | | 00 | | Reserved | | | | | | | | | | | | | | | | | | | Bit Reverse Code | | | | |

Description

| | |
|---|---|
| Bit Reverse Code | This code specifies how the DMA BUS address bits will be translated. The default is "no translation" (code is 0). Other codes support various options allowing efficient transfer and re-ordering of data that is the output or input to FFT calculations.<br>00000 = No translation<br>00001 = 256 element FFT, radix 2, reverse-pe order to/from in-order vector<br>00010 = 512 element FFT, radix 2, reverse-pe order to/from in-order vector<br>00011 = 1024 element FFT, radix 2, reverse-pe order to/from in-order vector<br>00100 = 2048 element FFT, radix 2, reverse-pe order to/from in-order vector<br>00101 = 4096 element FFT, radix 2, reverse-pe order to/from in-order vector<br>00110 = 8192 element FFT, radix 2, reverse-pe order to/from in-order vector<br>00111 = 256 element FFT, radix 4 reverse-pe order to/from in-order vector<br>01000 = 1024 element FFT, radix 4 reverse-pe order to/from in-order vector<br>01001 = 4096 element FFT, radix 4 reverse-pe order to/from in-order vector<br>01010 = 256 element FFT, radix 4 reverse-pe order to/from reverse-order vector<br>01011 = 1024 element FFT, radix 4 reverse-pe order to/from reverse-order vector<br>01100 = 4096 element FFT, radix 4 reverse-pe order to/from reverse-order vector<br>01101 = 256 element FFT, radix 8, reverse-pe order to/from in-order vector<br>01110 = 2048 element FFT, radix 8 reverse-pe order to/from in-order vector<br>01111 = 256 element FFT, radix 8, reverse-pe order to/from in-order vector<br>10000 = 2048 element FFT, radix 8 reverse-pe order to/from in-order vector |

The BITREV instruction is designed to configure the DMA bus addressing in to allow direct removal of FFT output data (in bit-reversed order) from PE memories to an in-order format in an external memory or device. It also allows FFT data in a reverse-order on the PE memories to be collected and transferred to a reverse-order vector in external memory.

A DMA instruction sequence such as the following would be used to gather transformed FFT data (in reversed order) and transferred to a vector externally:

```
pexlat {3,2,1,0}  ;              ! Bit-reverse the PE addresses
bitrev  code = 8;                ! Assumes 1024 element FFT, radix 4,
                                 ! bit-reversed PE order to in-order memory
tco.blockcyclic  tc=1024,        ! PE block-cyclic transfer from PE memory,
                 peaddr=0x0000,  ! from offset zero in each PE.
                 pecnt=4,
                 loop=BIP,
                 bu = 0,
                 bc = 1,
                 iu  = 1,
                 ic = 512;
                                 ! Block transfer to external memory
tso.block.x  tc=1024,            ! from DMA fifo.
             addr=xxxxxxxx;
pexlat {0,1,2,3} ;               ! Restore PE translate
bitrev code=none ;               ! Restore Bitrev setting to "none"
```

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="2">00</td><td colspan="4">0111</td><td>0</td><td>0</td><td colspan="2">Sem ID</td><td colspan="2">Sem Op</td><td colspan="4">SCondition</td><td colspan="8">Reserved</td><td colspan="8">Compare Val</td></tr>
</table>

SemID — Semaphore ID. This specifies which semaphore is used in the condition comparison.
00 = S0
01 = S1
10 = S2
11 = S3

SCondition — Semaphore condition.
0000 = Always (wait until explicit command causes a processing state change)
0001 = Equal
0010 = Not equal
0011 = Higher than
0100 = Higher than or equal
0101 = Lower than
0110 = Lower than or equal
0111 = CTUeot
1000 = STUeot
1001 = !CTUeot (CTC not zero)
1010 = !STUeot (STC not zero)
1011 = Greater than or equal
1100 = Greater than
1101 = Less than or equal
1110 = Less than
1111 = reserved SemOp — 00 = No change to semaphore when wait condition is/becomes FALSE
01 = Decrement semaphore by 1 when wait condition is/becomes FALSE
10 = Increment semaphore by 1 when the wait condition is/becomes FALSE
11 = Clear to Zero when the wait condition is/becomes FALSE Compare Val — Immediate 8-bit value which is subtracted from the specified semaphore value to obtain the comparison conditions.

The WAIT instruction causes instruction fetching to stop while the specified wait condition is TRUE. The wait condition is specified by the relationship between a specified semaphore (S0, S1, S2 or S3), and an 8-bit immediate value specified in the instruction. The immediate value is subtracted from the semaphore and the flags are set to establish their relationship. The conditions allow the values to be interpreted as either signed or unsigned numbers. When the condition specified is (or becomes) false, the specified semaphores are updated according to the update control fields (bits [7:0]).

NOTE: Initial implementation may only allow "no change" and "decrement" update options for the semaphore specified in the SemID field (rather than any/all semaphores).

BOPS, Inc. - Manta
SYSSIM 2.31

| 31 30 | 29 28 27 26 | 25 24 | 23 22 | 21 20 | 19 18 17 16 | 15 | 14 13 12 | 11 10 | 09 08 | 07 | 06 | 05 04 | 03 02 01 00 |
|---|---|---|---|---|---|---|---|---|---|---|---|---|---|
| 00 | 1000 | Sigmod | Cond Sem ID | Cond Sem Op | SCondition | Inc Dreg | Reserved | Sem ID | Sem Op | Sig1 | Sig0 | Areg | Dreg |
| Immediate Address (present only when Smod = x10 , x11) | | | | | | | | | | | | | |
| Immediate Data (present only when Smod = x01, x11) | | | | | | | | | | | | | |

IncDreg
If Sigmod=00 or Sigmod = 10, and Dreg is a General Register then:
0 = No post-increment of General Register (GR0-GR3 only)
1 = Post-increment General Register (GR0-GR3 only)

Sigmod
00 = Indirect Address (address in reg `Areg'), Indirect Data (data in reg `Dreg')
01 = Indirect Address (address in reg `Areg'), Immediate Data (next inst word)
10 = Immediate Address (next inst word), Indirect Data (data in reg `Dreg')
11 = Immediate Address (next inst word), Immediate data (word following immediate address).

Cond SemID
Semaphore ID. This specifies which semaphore is used in the condition comparison.
00 = S0
01 = S1
10 = S2
11 = S3

Cond SemOp
Specifies operation to perform on the semaphore if condition is TRUE.
00 = No change to semaphore
01 = Decrement the semaphore by 1
10 = Increment the semaphore by 1
11 = Clear semaphore to Zero SCondition
Condition which, if TRUE, allows the SIGNAL to occur. Same as WAIT conditions, and assumes a comparison with zero. (See the Semaphore Condition Table.)

Sig0
1 = Assert Interrupt Signal 0 high for two clock cycles, then low.
0 = Do not assert.

Sig1
1 = Assert Interrupt Signal 1 high for two clock cycles, then low.
0 = Do not assert Areg
When SigMod=00 or SigMod=01, specifies an internal register (GR0-GR3) whose contents to which data is to be sent. Not used if Dreg = `1111'

Dreg
When SigMod = 00 or SigMod = 10 (Indirect Data), this field specifies the register to be sent as message data.
If this field contains `1111', then no message is sent regardless of the value of SigMod.

0001 = GR1
0010 = GR2
0011 = GR3
1000 = TSR0
1001 = TSR1
1010 = TSR2
1011 = TSR3
1100 = TPC
1101 = SEM
1111 = Do Not send Message

| | |
|---|---|
| Sem ID | Specifies a semaphore to update when signal is performed.<br>00 = Semaphore 0<br>01 = Semaphore 1<br>10 = Semaphore 2<br>11 = Semaphore 3 |
| Sem Op | 00 = No change to semaphore<br>01 = Decrement the semaphore by 1<br>10 = Increment the semaphore by 1<br>11 = Clear semaphore to zero |

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>09</td><td>08</td><td>07</td><td>06</td><td>05</td><td>04</td><td>03</td><td>02</td><td>01</td><td>00</td></tr>
<tr><td colspan="2">00</td><td colspan="4">1001</td><td>0</td><td>0</td><td colspan="2">STU Restart Sem</td><td colspan="2">STU Restart CC</td><td colspan="2">CTU Restart Sem</td><td colspan="2">CTU Restart CC</td><td>E1 Inc Dreg</td><td colspan="3">Reserved</td><td>E1 TPC Wait</td><td>E1 TC Zero</td><td>E1 STU eot</td><td>E1 CTU eot</td><td>E0 Inc Dreg0</td><td colspan="3">Reserved</td><td>E0 TPC Wait</td><td>E0 TC Zero</td><td>E0 STU eot</td><td>E0 CTU eot</td></tr>
<tr><td colspan="2">E1 S3 Op</td><td colspan="2">E1 S2 Op</td><td colspan="2">E1 S1 Op</td><td colspan="2">E1 S0 Op</td><td>E1 Sig1</td><td>E1 Sig0</td><td colspan="2">E1 Areg</td><td colspan="4">E1 Dreg</td><td colspan="2">E0 S3 Op</td><td colspan="2">E0 S2 Op</td><td colspan="2">E0 S1 Op</td><td colspan="2">E0 S0 Op</td><td>E0 Sig1</td><td>E0 Sig0</td><td colspan="2">E0 Areg</td><td colspan="4">E0 Dreg</td></tr>
</table>

| | |
|---|---|
| E0CTUeot | 1 = trigger E0 action(s) when CTUeot becomes TRUE (CTC: 10) |
| E0STUeot | 1 = trigger E0 action(s) when STUeot becomes TRUE (STC: 10) |
| E0TCzero | 1 = trigger E0 action(s) when both CTC AND STC become zero. (The later counter to reach zero triggers the action. If this bit is set, E0CTUeot and E0STUeot are ignored. |
| E0TPCWait | 1 = trigger E1 action(s) when TPC becomes equal WAITPC. |
| E0IncDreg | 0 = No post-increment<br>1 = Post-increment Dreg if it is a General Register (GR0-GR3 only) |
| E1CTUeot | 1 = trigger E1 action(s) when CTUeot becomes TRUE (CTC: 10) |
| E1STUeot | 1 = trigger E1 action(s) when STUeot becomes TRUE (STC: 10) |
| E1TCzero | 1 = trigger E1 action(s) when both CTC AND STC become zero. |
| E1TPCWait | 1 = trigger E0 action(s) when TPC becomes equal WAITPC. |
| E0IncDreg | 0 = No post-increment<br>1 = Post-increment Dreg if it is a General Register (GR0-GR3 only) |
| E0 Dreg | Specifies a register to be sent (if not '1111') as message data when E0 event occurs.<br>0000 = GR0<br>0001 = GR1<br>0010 = GR2<br>0011 = GR3<br>1000 = TSR0<br>1001 = TSR1<br>1010 = TSR2<br>1011 = reserved<br>1100 = TPC<br>1101 = SEM<br>1111 = Do Not send Message |
| E0 Areg | Specifies a register which provides the message address when E0 event occurs |

| | |
|---|---|
| | 00 = GR0<br>01 = GR1<br>10 = GR2<br>11 = GR3 |
| E0Sig0 | 0 = Do not assert interrupt signal 0.<br>1 = Assert interrupt signal 0 active 1 for 2 cycles when E0 event occurs |
| E0Sig1 | 0 = Do not assert interrupt signal 1.<br>1 = Assert interrupt signal 1 active 1 for 2 cycles when E0 event occurs |
| E0 S0-S3 Op | Each 2-bit field specifies the action when E0 event occurs, one field per semaphore:<br>00 = No change to semaphore when wait condition becomes FALSE<br>01 = Decrement the semaphore by 1 when wait condition becomes FALSE<br>10 = Increment the semaphore by 1 when the wait condition becomes FALSE<br>11 = Clear semaphore to Zero |
| E1 Dreg | Specifies a register to be sent (if not '1111') as message data when E1 event occurs.<br>0000 = GR0<br>0001 = GR1<br>0010 = GR2<br>0011 = GR3<br>1000 = TSR0<br>1001 = TSR1<br>1010 = TSR2<br>1011 = reserved<br>1100 = TPC<br>1101 = SEM<br>1111 = Do Not send Message |
| E1 Areg | Specifies a register which provides the message address when E1 event occurs.<br>00 = GR0<br>01 = GR1<br>10 = GR2<br>11 = GR3 |
| E1Sig0 | 0 = Do not assert interrupt signal 0.<br>1 = Assert interrupt signal 0 active 1 for 2 cycles when E1 event occurs |
| E1Sig1 | 0 = Do not assert interrupt signal 1.<br>1 = Assert interrupt signal 1 active 1 for 2 cycles when E1 event occurs |
| E1 S0-S3 Op | Each 2-bit field specifies the action when E1 event occurs, one field per semaphore:<br>00 = No change to semaphore when wait condition becomes FALSE<br>01 = Decrement the semaphore by 1 when wait condition becomes FALSE<br>10 = Increment the semaphore by 1 when the wait condition becomes FALSE<br>11 = Clear semaphore to Zero |
| CTU Restart CC | 00 = if (CTU Restart Sem != 0) Restart CTU transfer and decrement CTU Restart Sem<br>01 = reserved<br>10 = reserved<br>11 = No Restart operation |
| CTU Restart Sem | Specifies the semaphore being tested for the CTU Restart CC operation<br>00 = S0<br>01 = S1<br>10 = S2<br>11 = S3 |
| STU Restart CC | 00 = if (STU Restart Sem != 0) Restart STU transfer and decrement STU Restart Sem<br>01 = reserved<br>10 = reserved<br>11 = No Restart operation |
| STU Restart Sem | Specifies the semaphore being tested for the STU Restart CC operation<br>00 = S0<br>01 = S1<br>10 = S2 |

11 = S3

This instruction loads the EAR0 and EAR1 registers which allow various processor actions to be generated based on specified transfer events. (See EAR0 and EAR1 register descriptions).

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | 1010 | | | | 0 | 0 | Reserved | | | | GR3 | GR2 | GR1 | GR0 | Reserved | | | | | | | | | | | | | | | |
| GR0 value (if GR0 = 1), else this word is not present | | | | | | | | | | | | | | | | | | | | | | | | | | | | | | | |
| GR1 value (if GR0 = 1) , else this word is not present | | | | | | | | | | | | | | | | | | | | | | | | | | | | | | | |
| GR2 value (if GR0 = 1) , else this word is not present | | | | | | | | | | | | | | | | | | | | | | | | | | | | | | | |
| GR3 value (if GR0 = 1) , else this word is not present | | | | | | | | | | | | | | | | | | | | | | | | | | | | | | | |

Description

GR0 1 = Immediate value (32-bit) to place in GR0 is assumed to follow (as shown)
0 = No value expected GR1 1 = Immediate value (32-bit) to place in GR1 is assumed to follow (as shown)
0 = No value expected GR2 1 = Immediate value (32-bit) to place in GR2 is assumed to follow (as shown)
0 = No value expected GR3 1 = Immediate value (32-bit) to place in GR3 is assumed to follow (as shown)
0 = No value expected Reg Cnt Number of registers that will be loaded This instruction is used to load one or more of the general registers GR0-GR3. This registers can be used as address or data registers, primarily for data flow synchronization signals and messages.

LIMSEM8- Load Immediate Semaphore Registers

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | 1010 | | | | 1 | 0 | Reserved | | | | S3En | S2En | S1En | S0En | Reserved | | | | | | | | | | | | | | | |
| S3 Value | | | | | | | | S2 Value | | | | | | | | S1 Value | | | | | | | | S0 Value | | | | | | | |

S3En - S0En	Semaphore Load enables.
0 = Do not load corresponding semaphore register
1 = Load corresponding semaphore register S3 Value - S0 Value	Immediate data values to be loaded (if enabled) into semaphore registers.

This instruction loads the semaphore register with 8-bit immediate values. Only those semaphores selected for loading will be updated.

---

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | 1010 | | | | 1 | 1 | S3 Ext | S2 Ext | S1 Ext | S0 Ext | S3 En | S2 En | S1 En | S0 En | S3 Value | | | | S2 Value | | | | S1 Value | | | | S0 Value | | | |

S3Ext - S0Ext	Extension option (used for those values which are enabled to load):
0 = Load value and clear upper 4 bits to zero
1 = Load value and set upper 4 bits to `1111'

S3En - S0En	Semaphore Load enables.
0 = Do not load corresponding semaphore register
1 = Load corresponding semaphore register S3 Value - S0 Value	Immediate 4-bit data values to be loaded (if enabled) into semaphore registers.

This instruction loads the semaphore register with 4-bit immediate values which may be optionally extended with either zeros or ones. Only those semaphores selected for loading will be updated.

---

1.3 General Format for Transfer Instructions

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 11 | | Xfer Type | | C/S | I/O | Data Type | | Addr Mode | | | | X | Rsrvd | | | Transfer Count | | | | | | | | | | | | | | | |
| Other Parameters depending on transfer type (Xfer Type) and address generation control (Addr Mode) - possibly multiple words | | | | | | | | | | | | | | | | | | | | | | | | | | | | | | | |

Description

Xfer Type
00 = New Transfer
01 = Update Transfer Count
10 = Update Transfer Address (reload current transfer count)
11 = Update Transfer Count and Transfer Address C/S
0 = CTU instruction, 1 = STU instruction I/O
0 = Inbound, 1 = Outbound Data Type
00 = 32-bit word
01 = reserved
10 = reserved
11 = reserved Addr Mode
0000 = Single address (I/O)
0001 = Block transfer
0010 = Stride/Hold
0011 = reserved
0100 = reserved
0101 = Circular
0110 = reserved
0111 = reserved
1000 = PE Block Cyclic (CTU only)
1001 = PE with Index Select (CTU only)
1010 = PE with PE Select (CTU only)
1011 = PE with PE Select and Index Select (CTU only)
1100 = reserved
1101 = reserved
1110 = reserved
1111 = reserved X
0 = load instruction and continue in FETCH_DEC state,
1 = load instruction and goto EXEC_XFER state.

Rsrv
Reserved field

ManArray Control Bus

Table of Contents

Bus Interfaces
ManArray Control Bus
MCB to MDB Bus Bridge

Bus Interfaces

The ManArray architecture uses two primary bus interfaces: the ManArray Data Bus (MDB), and the ManArray Control Bus (MCB). The MDB provides for high volume data flow in and out of the DSP array. The MCB provides a path for peripheral access and control. The width of either bus varies between different implementations of ManArray coprocessor cores. The width of the MDB is set according to the data bandwidth requirements of the array in a given application, as well as the overall complexity of the on-chip system.

ManArray Control Bus

The MCB is a 32-bit, single-beat, lockable control bus (up to 15 masters/slaves) that runs at core clock speeds, i.e. on the same clock as the DSP array. This bus represents the control interface from the outside world to the BOPS core. The bus protocol is compatible with the ARM® AHB. The data bus is 32 bits wide. Within a ManArray coprocessor core, the bus masters are ManArray SP DMMU, SP IMMU, and the DMA. ManArray slaves on this bus are the ManArray SP register space, and the DMA control register space. This bus can operate in either little or big endian mode. Multiple ManArray DSPs can be supported on the MCB. The 64 Mbyte ManArray Aperture is architected to support 16 DSPs, each with its own DMA. The MCB to MDB bridge slave on the MCB decodes and accepts almost all of the MCB address space and maps transfers to the MDB with a 1:1 address translation. The ManArray Aperture is not decoded by the MCB to MDB bridge slave.

MCB to MDB Bus Bridge

The bus bridge provides a slave on the MCB that accepts transfers within a very large aperture. In essence, all of the 32 bit MCB address is picked up by the bus bridge and mapped to the MDB, except for the 64MByte ManArray aperture containing the ManArray DSP and DMA state. These transfers are reflected through a master on the MDB to the various devices on the MDB. Notice that an address remapping occurs during this process such that accesses to the MCB at offset 0x14000000 are mapped to the SDRAM at location 0x00000000 on the MDB. This relocation occurs across the 64MBytes from 0x14000000 to 0x17FFFFFF so that the SDRAM aperture on the MDB is visible from the MCB.

ManArray Data Bus

Table of Contents

Bus Interfaces
ManArray Data Bus

Bus Interfaces

The ManArray architecture uses two primary bus interfaces: the ManArray Data Bus (MDB), and the ManArray Control Bus (MCB). The MDB provides for high volume data flow in and out of the DSP array. The MCB provides a path for peripheral access and control. The width of either bus varies between different implementations of ManArray co-processor cores. The width of the MDB is set according to the data bandwidth requirements of the array in a given application, as well as the overall complexity of the on-chip system.

ManArray Data Bus

The MDB is a 64-bit, bursting/split capable, non-locking data bus (up to 15 masters/slaves) on-chip bus that runs at core clock speeds, i.e. on the same clock as the DSP array. The bus protocol is compatible with the ARM® AHB. The width of this data bus depends on the bandwidth requirements of the DSP array(s) and the requirements of other on-chip system components. For example, a single MDB may support several ManArray cores, and has to provide sufficient bandwidth for all DSP traffic as well as the host processor and various other on-chip I/O devices. The only ManArray DSP Core Master on this bus is the DMA engine. Typically, one MCB to MDB bus bridge is supported regardless of the number of ManArray DSPs on the chip. Address space allocation on this bus is defined by the SOC architecture. The sources and sinks of DSP data streams should be resident on this bus so that the DMA data transfers can take place over this bus.

MDB Address Space

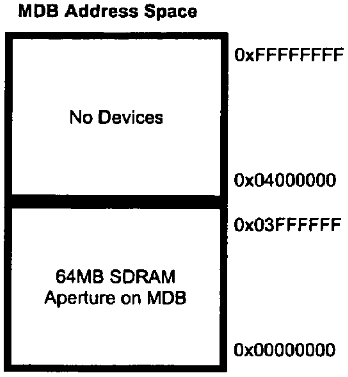

Glossary of Terms

A | B | C | D | E | F | G | H | I | L | M | N | O | P | S | T | U | V | X | Z

A

ACF - Arithmetic Condition Flags (F0-F7). (See also Scalable Conditional Execution.)

Address Register - A register used to address local memory via Load/Store Instructions

Address Instructions - Instructions that provide arithmetic/logical operations on address registers.

ALU - Arithmetic Logic Unit. (See Architectural Overview.)

ARF - Address Register File

ASF - Arithmetic Scalar Flags, used for conditional execution. (See also Scalable Conditional Execution.)

B

Broadcast - The operation that loads an SP register or SP local memory value in parallel to multiple target PE registers.

C

Carry Flag (C) - This flag indicates if an operation has generated a bit beyond the most significant bit available for the data type. (See also Scalable Conditional Execution.)

CE - Conditional Execution (See Scalable Conditional Execution.)

CNVZ flags - Arithmetic Scalar Flags (ASFs). (See also Scalable Conditional Execution.)

Cluster - A 2x2 ManArray, which consists of 4 processors (SP/PE0 and PEs1-3) and a cluster switch.

Cluster Switch - The cluster switch consists of data buses and multiplexors (muxes) designed to provide single-cycle data communication between the processors of a ManArray.

Compute Register - A register used for arithmetic/logical operations.

Condition Information - The complete set of side-effects generated in parallel by executing instructions. (See also Scalable Conditional Execution.)

CRF - Compute Register File.

D

Decode Phase - The phase of the instruction pipeline in which the instruction is decoded and resources are set up for execution. Some instructions generate results in the decode phase.

DPC - Decode Program Counter Register. (See Documentation.)

Direct Addressing - The address supplied is an absolute address for a memory reference instruction.

DSU - Data Select Unit. (See Architectural Overview.)

E

Effective Address - The address presented to memory for data accesses.

Even Register - A register with an even number (i.e. R0, R2, A0, A2, etc.)

Execute Phase - The phase of the instruction pipeline in which the instruction is executed. Instructions that complete their operation in one cycle, usually post their results at the end of execute phase. Instructions that execute over multiple cycles usually post their results at the end of the last execution phase.

---

F

F0-F7 flags - Arithmetic Condition Flags (ACFs). (See Scalable Conditional Execution.)

Fetch Phase - Refers to the phase of the instruction pipeline in which the instruction is loaded from memory.

FPC register - Fetch Program Counter register. (See Documentation.)

---

G

GPI - General-Purpose Interrupt.

---

H

Hot flags - hot condition information. Condition information signals generated by an instruction during execute, before they are latched in condition return. (See also Scalable Conditional Execution.)

---

I

IEEE Single-Precision Floating-Point format - Floating point compatible with the ANSI / IEEE Standard 754-1985 basic 32-bit single precision.

ILR - Interrupt Link Register.

Indexed Addressing Mode - Addressing memory through a base value and an index from the base.

Instruction Pipeline - The phases of execution that an instruction passes through to complete its operation. On Manta, the instruction pipeline consists of four phases, a Fetch phase, Decode phase, an Execute phase, and a Condition Return phase.

Instruction slot - The positions of the individual instructions within a single iVLIW.

Integer overflow - Defined when results from an integer operation do not fit in the target resource

IVLIW - indirect Very Long Instruction Word. (See iVLIWs chapter.)

---

L

Lane - A lane is one of the physically seperate 32-bit data path on the DMA Bus, each controlled by one of the lane controllers. (See DMA Subsystem Overview.)

LU - Load Unit. (See Architectural Overview.)

---

M

MAU - Multiply-Accumulate Unit. (See Architectural Overview.)

MIMD - Multiple-Instruction Multiple-Data.

---

N

NaN - Not a Number - Bit value representation in floating-point arithmetic that does not represent a valid number.

O

Odd Register - A register with an odd number (i.e. R1, R3, A1, A3, etc.)

Odd/Even Register Pair - A register pair for doubleword operations. The odd register contains the most significant bits and the even register contains the least significant bits. Valid register pairs are R1||R0, R3||R2, R5||R4, R7||R6, R9||R8, R11||R10, R13||R12, R15||R14, R17||R16, R19||R18, R21||R20, R23||R22, R25||R24, R27||R26, R29||R28, R31||R30. These pairs are referenced in an instruction by the even register of a pair.

Operand - One or more arguments that can be registers or data values that are specified along with an instruction

Ordered - In floating-point format, two valid numbers are ordered when their comparison (subtraction) results in a valid, non-zero result.

Overflow Flag (V) - This flag represents the exclusive OR of the CARRY OUTS of the two most significant bits generated by the operation for the data type. (See also Scalable Conditional Execution.)

P

Packed data - Data that consist of multiple sub-data types within larger data types – such as 4 8-bit bytes within a 32-bit word. Packed data operations are intended to be executed at the sub-data type level.

PC - Program Counter register.

PC-relative Addressing - The PC-Relative addressing mode is used by jumps, calls, and looping instructions. The effective address is the sum of a 12- or 16-bit displacement value contained in the instruction word and the contents of the Decode Program Counter (DPC). The 12- or 16-bit displacement value is sign-extended to 32-bits before it is used.

PFCU - Program Flow Control Unit. This unit determines the address of the next instruction to be fetched from program memory. The PFCU contains three registers used in the control the program flow: the Fetch Program Counter (FPC), the Decode Program Counter (DPC), and the Execute Program Counter (XPC). (See Documentation.) (See Architectural Overview.)

PE - Processor Element. (See Architectural Overview.)

Pre-Increment - In Load/Store addressing modes, this refers to updating an address register before its use. The address register is incremented by an update value prior to its use.

Pre-Decrement - In Load/Store addressing modes, this refers to updating an address register before its use. The address register is decremented by an update value prior to its use.

Post-Increment - In Load/Store addressing modes, this refers to updating an address register after its use. The address register is incremented by an update value after its use.

Post-Decrement - In Load/Store addressing modes, this refers to updating an address register after its use. The address register is decremented by an update value after its use.

S

Saturated Arithmetic - Saturation is used for algorithms in which it is necessary to clamp overflowing results to a high or low value. (See Saturated Arithmetic chapter.)

SIMD - Single-Instruction Multiple-Data programming model.

Simplex Instruction - Single 32-bit instructions

Signed Value - In a 2's complement representation. The MSB of the 2's complement value determines the sign of the value (0=positive, 1=negative).

Sign-extending - Converting a value from an original representation to a representation with more bits, all higher-order bits in the larger representation are filled with the value of the Most Significant Bit (MSB) of the original representation.

Sign Flag (N) - This flag represents the most significant bit of the data type; 1 means the value is negative, and 0 means the value is positive (for numbers in 2's complement).

SP - Sequence Processor (merged with PE0). (See Architectural Overview.)

SPR - Special Purpose Register. (See Architectural Overview.)

SU - Store Unit. (See Architectural Overview.)

Synchronous MIMD - Programming model where multiple VLIWs are executed in multiple PEs and where the simplex instructions at a given VLIW address are not the same in each PE.

---

T

Target Register - The register that receives data.

---

U

ULR - User Link Register

Unordered - In floating-point format two valid numbers are unordered when their comparison (subtraction) results in zero.

Unsigned Value - An unsigned number in which the valid values are always positive and range between 0 and $2^{n-1}$, where n is the number of bits available to represent the value.

---

V

VLIW - Very Long Instruction Word. See iVLIW.

VIM - Very Long Instruction Word Memory. (See iVLIWs chapter.)

---

X

XPC - Execute Program Counter Register. See Documentation.

---

Z

Zero-extending - Filling the most significant bits of a value with zeros to promote a value of one size to a larger size.

Zero Flag (Z) - This is the flag in which 1 means the value is zero and 0 means the value is non-zero. (See Scalable Conditional Execution.)

---

Manta SDRAM

Table of Contents

The SDRAM Block

The SDRAM Block

The SDRAM block provides bulk memory service via the MDB. The 64MByte SDRAM interface is accessed when a read or write cycle is received in the first 64Mbytes of the SDRAM aperture on both of its ports. Thus the SDRAM is a slave device on the MDB.

NOTE: The BOPS System Simulator defaults to 64Kwords of SDRAM. Users can expand up to 64Mbytes via File I/O Control Blocks.

Section III - Manta Programmer's Reference

Manta DSP Array Instruction Set Reference

BOPS, Inc. - Manta SYSSIM 2.31

Key to Instruction Set

Instruction Set Summary Table
Instruction Formats:

- CTRL/VLIW
- SU/LU
- ALU/MAU
- DSU

Manta DSP Array Instructions by Category:

CTRL - Control Instructions
VLIW - VLIW Instructions
SU - Store Unit Instructions
LU - Load Unit Instructions
ALU - Arithmetic Logic Unit Instructions
ALU/MAU - Common Instructions
MAU - Multiply Accumulate Unit Instructions
DSU - Data Select Unit Instructions

Instruction Field Definitions
Glossary

NOTE: Instruction timings are dependent upon the manufacturing process and are subject to change due to factors beyond BOPS' control. Always use the latest documentation to verify correct functional definitions and timing information.

The DMA instructions are not part of the Manta DSP Array Instruction Set. Please see the DMA Subsystem chapter for the DMA instruction set documentation.

Key to the Instruction Set

Table of Contents:

1 Example Instruction
*Figure 1: Basic layout used for all instructions.*

2 Example Instruction Syntax
*Figure 2: Syntax of the MPY Instruction.*
*Figure 3: expanded view of the MPY Syntax table.*

3 Key to Instruction Set Mnemonic
*Figure 4*
3.1 Abbreviations
*Table1: Abbreviations used in the Instruction Set Mnemonic.*
3.2 Operands
*Table2: Operands for instruction set syntax.*

4 Key to PE Positions

1 Example Instruction:

CONTENT

Each instruction is documented with a Base Mnemonic and Name, an Encoding, a Description, a Syntax/Operation table, a list of the Arithmetic Flags Affected by it, and a Cycle Count number. Figure 1 shows the basic layout used for all instructions in the Programmer's Reference Guide using the Multiply instruction (MPY) as an example. Figure 2 explains the syntax of the MPY instruction. Figure 3 shows an expanded view of the MPY Syntax table to illustrate the compact representation of the instruction variations. Figure 4 is a general key to the instruction-set syntax for the three major groups of instructions.

*Figure 1: Basic layout used for all instructions.*

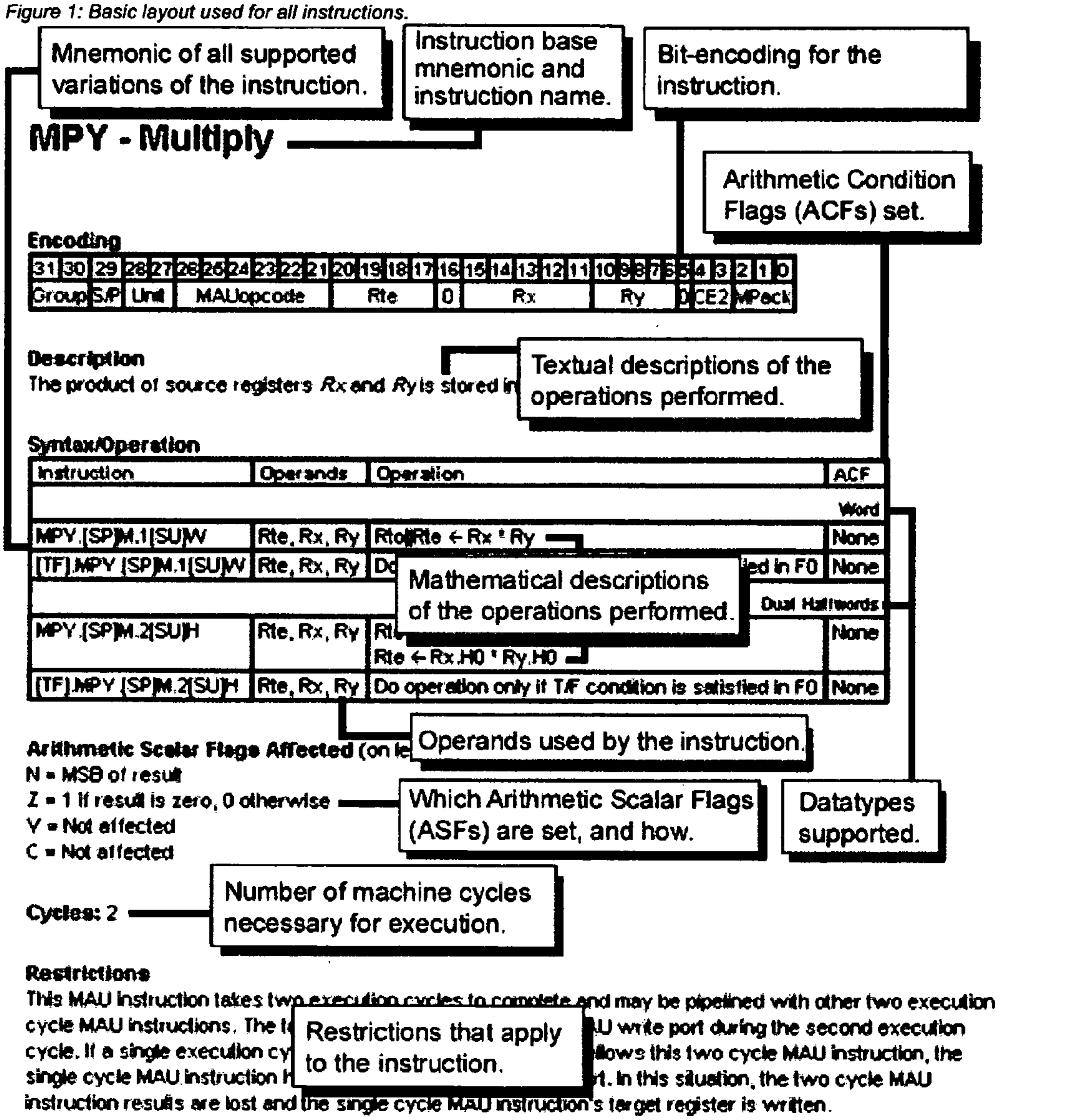

2 Example Instruction Syntax

CONTENT

*Figure 2: Syntax of the MPY instruction.*

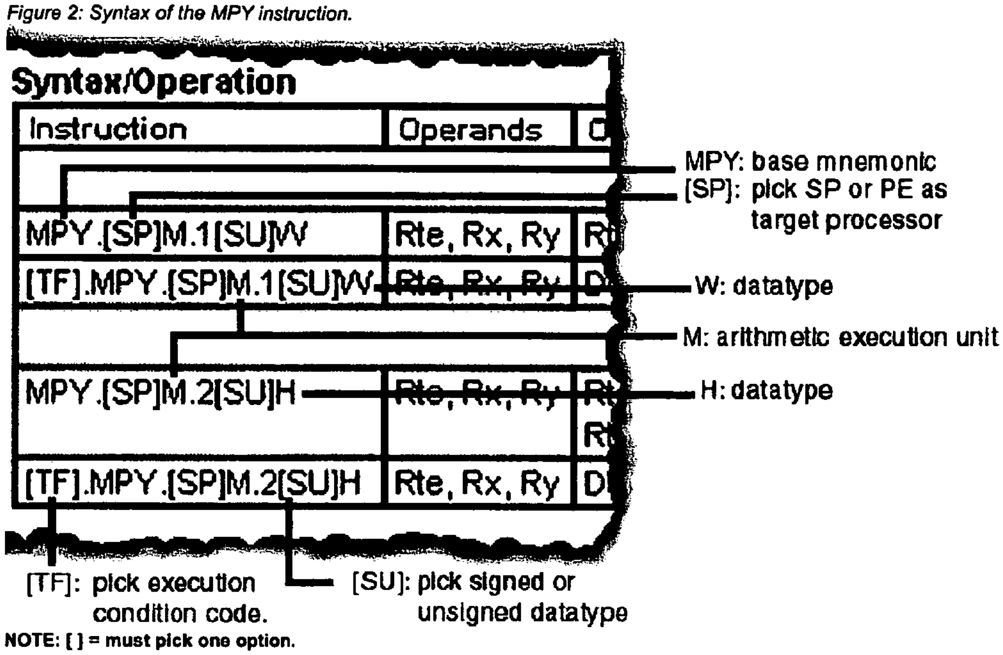

NOTE: [ ] = must pick one option.

*Figure 3: expanded view of the MPY Syntax table.*

| | | | |
|---|---|---|---|
| MPY.SM.1SW | Rte,Rx,Re | MPY.SM.2SH | Rte,Rx,Re |
| MPY.SM.1UW | Rte,Rx,Re | MPY.SM.2UH | Rte,Rx,Re |
| MPY.PM.1SW | Rte,Rx,Re | MPY.PM.2SH | Rte,Rx,Re |
| MPY.PM.1UW | Rte,Rx,Re | MPY.PM.2UH | Rte,Rx,Re |
| MPYC.SM.1SW | Rte,Rx,Re | MPYC.SM.2SH | Rte,Rx,Re |
| MPYC.SM.1UW | Rte,Rx,Re | MPYC.SM.2UH | Rte,Rx,Re |
| MPYC.PM.1SW | Rte,Rx,Re | MPYC.PM.2SH | Rte,Rx,Re |
| MPYC.PM.1UW | Rte,Rx,Re | MPYC.PM.2UH | Rte,Rx,Re |
| MPYN.SM.1SW | Rte,Rx,Re | MPYN.SM.2SH | Rte,Rx,Re |
| MPYN.SM.1UW | Rte,Rx,Re | MPYN.SM.2UH | Rte,Rx,Re |
| MPYN.PM.1SW | Rte,Rx,Re | MPYN.PM.2SH | Rte,Rx,Re |
| MPYN.PM.1UW | Rte,Rx,Re | MPYN.PM.2UH | Rte,Rx,Re |
| MPYV.SM.1SW | Rte,Rx,Re | MPYV.SM.2SH | Rte,Rx,Re |
| MPYV.SM.1UW | Rte,Rx,Re | MPYV.SM.2UH | Rte,Rx,Re |
| MPYV.PM.1SW | Rte,Rx,Re | MPYV.PM.2SH | Rte,Rx,Re |
| MPYV.PM.1UW | Rte,Rx,Re | MPYV.PM.2UH | Rte,Rx,Re |
| MPYZ.SM.1SW | Rte,Rx,Re | MPYZ.SM.2SH | Rte,Rx,Re |
| MPYZ.SM.1UW | Rte,Rx,Re | MPYZ.SM.2UH | Rte,Rx,Re |
| MPYZ.PM.1SW | Rte,Rx,Re | MPYZ.PM.2SH | Rte,Rx,Re |
| MPYZ.PM.1UW | Rte,Rx,Re | MPYZ.PM.2UH | Rte,Rx,Re |
| T.MPY.SM.1SW | Rte,Rx,Re | T.MPY.SM.2SH | Rte,Rx,Re |
| T.MPY.SM.1UW | Rte,Rx,Re | T.MPY.SM.2UH | Rte,Rx,Re |
| T.MPY.PM.1SW | Rte,Rx,Re | T.MPY.PM.2SH | Rte,Rx,Re |
| T.MPY.PM.1UW | Rte,Rx,Re | T.MPY.PM.2UH | Rte,Rx,Re |
| F.MPY.SM.1SW | Rte,Rx,Re | F.MPY.SM.2SH | Rte,Rx,Re |
| F.MPY.SM.1UW | Rte,Rx,Re | F.MPY.SM.2UH | Rte,Rx,Re |
| F.MPY.PM.1SW | Rte,Rx,Re | F.MPY.PM.2SH | Rte,Rx,Re |
| F.MPY.PM.1UW | Rte,Rx,Re | F.MPY.PM.2UH | Rte,Rx,Re |

The expanded view of the possible forms of the example instruction illustrates the compact representation of the ManArray instruction set. Move the cursor over the box to toggle to the compact view.

3 Key to Instruction Set Mnemonic

CONTENT

*Figure 4:*

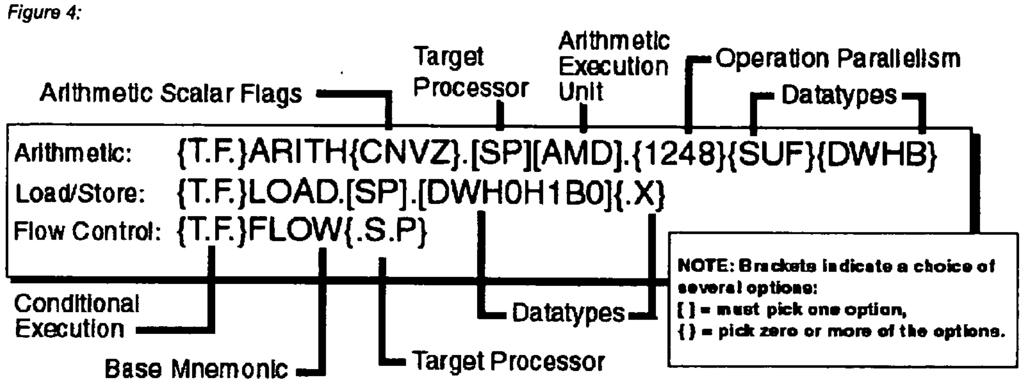

If zero is chosen for all brackets after the last dot, delete the last dot.

3.1 Abbreviations

CONTENT

*Table 1: Abbreviations used in the Instruction Set Mnemonic.*

| | |
|---|---|
| **Arithmetic Scalar Flags** (ASF). (only Arithmetic Instructions) | C=Carry<br>N=Sign<br>V=Overflow<br>Z=Zero |
| **Arithmetic Execution Unit** (only Arithmetic Instructions) | A=Arithmetic Logic Unit (ALU)<br>M=Multiply-Accumulate Unit (MAU)<br>D=Data Select Unit (DSU) |
| **Conditional Execution** | T=True<br>F=False |
| **Datatypes** | S=Signed<br>U=Unsigned |
| | D=Doubleword (64 bits)<br>F=IEEE Single Precision Floating Point (32 bits)<br>W=Word (32 bits)<br>H=Halfword (16 bits)<br>H0=Low Halfword (16 bits)<br>H1=High Halfword (16 bits)<br>B=Byte (8 bits)<br>B0=Byte 0 (8 bits) |
| | X=Sign Extension to 32 bits |
| **Operation Parallelism** | 1=Mono<br>2=Dual<br>4=Quad<br>8=Octal |
| **Target Processor** | S=SP<br>P=PE |

For definitions of special cases, please see field description tables in the instruction set.

3.2 Operands

CONTENT

*target/source registers, immediate values, address registers.*

*Table 2: Operands for instruction set syntax.*

*Top of page*

| | |
|---|---|
| (...)[30:15] | Access bits 30-15 from the result of the expression in (...) |
| ±An (+An, -An) | Any address register used in the calculation of an effective address. Apply a pre-increment (+An) or a pre-decrement (-An) update. |
| An± (An+, An-) | Any address register used in the calculation of an effective address. Apply a post-increment (An+) or a post-decrement (An-) update. |
| An | Any address register used in the calculation of an effective address (A0-A7). |
| At | Any address register that is the target of a (load) operation (A0-A7). |
| -Ao | Any odd-numbered address register (A1, A3, A5, A7). Apply a pre-decrement update. |
| Ao+ | Any odd-numbered address register (A1, A3, A5, A7). Apply a post-increment update. |
| B0 | Byte 0 (LSB of Word) |
| B1 | Byte 1 |
| B2 | Byte 2 |
| B3 | Byte 3 (MSB of Word) |
| Fs, Ft | Any arithmetic scalar flag (F0-F7) |
| H0 | Low halfword |
| H1 | High halfword |
| LSB | Least Significant Bit or Least Significant Byte |
| $Mem[...]_{byte}$ | Memory access of a byte |
| $Mem[...]_{hword}$ | Memory access of a halfword |
| $Mem[...]_{word}$ | Memory access of a word |
| $Mem[...]_{dword}$ | Memory access of a doubleword |
| MSB | Most Significant Bit or Most Significant Byte |
| Reg | Any register, except an address register |
| Rege | Any even-numbered register, except an address register |
| Rt, Rx, Ry | Any compute register (R0-R31) |
| RtBt, RxBx | Any compute register (R0-R31) any byte (B0, B1, B2, B3) |
| Rte, Rxe, Rye | Any even-numbered compute register (R0, R2, ... R30) |
| RtHt, RxHx | Any compute register (R0-R31) any halfword (H0, H1) |
| Rto\|\|Rte, Rxo\|\|Rxe, Ryo\|\|Rye | An odd/even compute register pair containing a doubleword. The odd register contains the MSB and the even register contains the LSB. Note: Doublewords pairs are grouped r1\|\|ro, r3\|\|r2, ... r31\|\|r30. |
| RxeHx, RyeHy | Any even-numbered compute register (R0, R2, ... R30) any halfword (H0, H1) |
| ±Rz (+Rz, -Rz) | Any compute register (R0-R31) used in Indirect Addressing Mode instructions where +Rz means that Rz is added to An for address generation and -Rz means the Rz is subtracted from An for address generation. |

*For definitions of special cases please see field description tables in the instruction set.*

*4 Key to PE Positions*
*CONTENT*
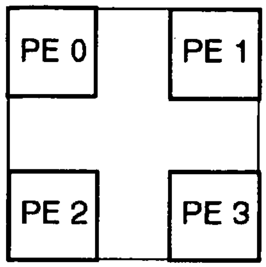

Manta DSP Array Instruction Set Summary Table

BOPS, Inc. - Manta SYSSIM 2.31

| CTRL | SU | LU | ALU | ALU/MAU | MAU | DSU | |
|---|---|---|---|---|---|---|---|
| CALL | SBD | ADDA | ABS | ADD | FMPY | BAND | CNTRS |
| CALLcc | SD | COPYA | ABSDIF | ADDI | MEAN4 | BANDI | COPY |
| CALLD | SI | LA | AND | ADDS | MPY | BANDN | COPYS |
| CALLDcc | SII | LABD | CMPcc | BFLYD2 | MPYA | BANDNI | FDIV |
| CALLI | SIU | LATBL | CMPIcc | BFLYS | MPYCX | BCLR | FRCP |
| CALLIcc | SIUI | LBD | CNTMSK | MEAN2 | MPYCXD2 | BCLRI | FRSQRT |
| EPLOOPx | SMX | LBRI | FADD | SUB | MPYCXJ | BL | FSQRT |
| EPLOOPIx | SMXU | LBRII | FCMPcc | SUBI | MPYCXJD2 | BLI | FTOI |
| JMP | SSPR | LBRIU | FSUB | SUBS | MPYD2 | BLN | FTOIS |
| JMPcc | STBL | LBRIUI | MAX | | MPYH | BLNI | ITOF |
| JMPD | | LBRMX | MIN | | MPYL | BNOT | ITOFS |
| JMPDcc | | LBRMXU | NOT | | MPYXA | BNOTI | MIX |
| JMPI | | LBRTBL | OR | | SUM2P | BOR | PACKB |
| JMPIcc | | LD | XOR | | SUM2PA | BORI | PACKH |
| NOP | | LI | | | SUM4ADD | BORN | PACKL |
| RET | | LII | | | SUM8ADD | BORNI | PERM |
| RETcc | | LIM | | | | BS | PEXCHG |
| RETI | | LIU | | | | BSI | ROT |
| RETIcc | | LIUI | | | | BSET | ROTLI |
| SYSCALL | | LMX | | | | BSETI | ROTRI |
| SVC | | LMXU | | | | BSWAP | SCANL |
| | | LSPR | | | | BSWAPI | SCANR |
| **VLIW** | | LTBL | | | | BXOR | SHL |
| LV | | SUBA | | | | BXORI | SHLI |
| SETV | | | | | | BXORN | SHR |
| XV | | | | | | BXORNI | SHRI |
| | | | | | | | SPRECV |
| | | | | | | | SPSEND |
| | | | | | | | UNPACK |
| | | | | | | | XSCAN |
| | | | | | | | XSHR |

The DMA instructions are not part of the Manta DSP Array Instruction Set. Please see the DMA Subsystem chapter for the DMA instruction set documentation.

The Document Style Conventions page contains useful information about some formatting styles used in the ManArray Documentation.

Control/VLIW Instruction Formats

BOPS, Inc. - Manta SYSSIM 2.31

Call / Jump / Return Instructions

| Instruction | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| CALL<br>CALLcc<br>JMP<br>JMPcc | Group | | S/P | CtrlOp | | | | Ctrl Amode | | 0 | CtrlCC | | | | | 0 | SDISP16 | | | | | | | | | | | | | | | |
| CALLD<br>CALLDcc<br>JMPD<br>JMPDcc | Group | | S/P | CtrlOp | | | | Ctrl Amode | | 0 | CtrlCC | | | | | 0 | UADDR16 | | | | | | | | | | | | | | | |
| CALLI<br>CALLIcc<br>JMPI<br>JMPIcc | Group | | S/P | CtrlOp | | | | Ctrl Amode | | 0 | CtrlCC | | | | | 0 | An | | | 0 | 0 | 0 | 0 | 0 | 0 | 0 | 0 | 0 | 0 | 0 | 0 | 0 |
| RET<br>RETcc | Group | | S/P | CtrlOp | | | | 0 | 0 | 0 | CtrlCC | | | | | 0 | 0 | 0 | 0 | 0 | 0 | 0 | 0 | 0 | 0 | 0 | 0 | 0 | 0 | 0 | 0 | 0 |
| SYSCALL | Group | | S/P | CtrlOp | | | | 0 | 0 | 0 | CtrlCC | | | | | 0 | 0 | 0 | 0 | 0 | 0 | 0 | 0 | 0 | 0 | 0 | 0 | Vector | | | | |

Event Point Loop Instructions

| Instruction | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| EPLOOPx | Group | | S/P | CtrlOp | | | | LCF | BPID | | 0 | 0 | 0 | 0 | 0 | 0 | 0 | 0 | 0 | 0 | 0 | 0 | UDISP10 | | | | | | | | | |
| EPLOOPIx | Group | | S/P | CtrlOp | | | | LCF | BPID | | LoopCnt | | | | | | | | | | | | UDISP10 | | | | | | | | | |

Interrupt Instructions

| Instruction | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| RETI<br>RETIcc | Group | | S/P | CtrlOp | | | | 0 | 0 | 0 | CtrlCC | | | | | 0 | 0 | 0 | 0 | 0 | 0 | 0 | 0 | 0 | 0 | 0 | 0 | 0 | 0 | 0 | 0 | 0 |

Miscellaneous Instructions

| Instruction | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| NOP | Group | | S/P | CtrlOp | | | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| SVC | Group | | S/P | CtrlOp | | | | 0 | 0 | 0 | 0 | Rt | | | | | Rx | | | | | SvcOp | | | | | | | | 0 | 0 | 0 |

VLIW Instructions

| Instruction | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| LV | Group | | S/P | CtrlOp | | | | E/D | UAF | | InstrCnt | | | | 0 | 0 | 0 | SU | LU | ALU | MAU | DSU | Vb | 0 | VimOffs | | | | | | | |
| SETV | Group | | S/P | CtrlOp | | | | E/D | UAF | | 0 | 0 | 0 | 0 | 0 | 0 | 0 | SU | LU | ALU | MAU | DSU | Vb | 0 | VimOffs | | | | | | | |
| XV | Group | | S/P | CtrlOp | | | | VX | UAF | | 0 | 0 | 0 | 0 | 0 | 0 | 0 | SU | LU | ALU | MAU | DSU | Vb | 0 | VimOffs | | | | | | | |

SU/LU Instruction Formats

BOPS, Inc. - Manta SYSSIM 2.31

Load-Immediate

| Instruction | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| LIM | Group | | S/P | L/S | 000 | | | CE1 | LOC | | $Rt_{5-0}$ | | | | | | IMM16 | | | | | | | | | | | | | | | |
| 1 S-Avail | Group | | S/P | 1 | 000 | | | CE1 | Bits 23-0 undefined | | | | | | | | | | | | | | | | | | | | | | | |

Load Address

| Instruction | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| LA | Group | | S/P | L/S | 001 | | | CE1 | 0 | 0 | 0 | 0 | At/Mt | At<br>Mt | | | SDISP16 | | | | | | | | | | | | | | | |
| LABD<br>COPYA | Group | | S/P | L/S | 001 | | | CE1 | 0 | 0 | 0 | 1 | At/Mt | At<br>Mt | | | An | | | LSDISP13 | | | | | | | | | | | | |
| LATBL<br>ADDA<br>SUBA | Group | | S/P | L/S | 001 | | | CE1 | 0 | 0 | 1 | 1 | At/Mt | At<br>Mt | | | An | | | Brcst =0 | Sign Ext =0 | Scale | S/D | Dec/ Inc | Imm/ Reg =1 | Updt An =0 | Rz/ Az | Rz<br>0 | 0 | Az | | |

Load/Store from/to Memory

| Instruction | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| LBD<br>SBD | Group | | S/P | L/S | 010 | | | CE1 | Size | | 0 Rt<br>0 Rte 0<br>AtMRt | | | | | | An | | | LSDISP13 | | | | | | | | | | | | |
| LD<br>SD | Group | | S/P | L/S | 011 | | | CE1 | Size | | 0 Rt<br>0 Rte 0<br>AtMRt | | | | | | UADDR16 | | | | | | | | | | | | | | | |
| LBRMX<br>LBRMXU<br>LMX<br>LMXU<br>SMX<br>SMXU | Group | | S/P | L/S | 100 | | | CE1 | Size | | 0 Rt<br>0 Rte 0<br>AtMRt | | | | | | Ae | | Mod/ Long | Brcst | Sign Ext | Scale | Pre-Dec/ Post Inc | $UPDATE7_{[2:1]}$ | | $UPDATE7_{[6:3]}$ | | Ao | $UPDATE7_{[0]}$ | | | |
| LBRII<br>LBRIUI<br>LII<br>LIUI<br>SII<br>SIUI | Group | | S/P | L/S | 101 | | | CE1 | Size | | 0 Rt<br>0 Rte 0<br>AtMRt | | | | | | An | | | Brcst | Sign Ext | Scale | Pre/ Post | Dec/ Inc | Imm/ Reg =0 | UPDATE7 | | | | | | |
| LBRI<br>LBRIU<br>LI<br>LIU<br>SI<br>SIU | Group | | S/P<br>AtMRt | L/S | 101 | | | CE1 | Size | | 0 Rt<br>0 Rte 0<br>0 0 Az | | | | | | An | | | Brcst | Sign Ext | Scale | Pre/ Post | Dec/ Inc | Imm/ Reg =1 | Updt An =1 | Rz/ Az | Rz | | | | |
| LBRTBL<br>LTBL<br>STBL | Group | | S/P | L/S | 101 | | | CE1 | Size | | 0 Rt<br>0 Rte 0<br>AtMRt | | | | | | An | | | Brcst | Sign Ext | Scale =1 | S/D =0 | Dec/ Inc | Imm/ Reg =1 | Updt An =0 | Rz/ Az | Rz<br>0 | 0 | Az | | |
| LSPR<br>SSPR | Group | | S/P | L/S | 110 | | | CE1 | Size | | 0 | Rt | | | | | 0 | 0 | 0 | 0 | 0 | 0 | SPRADDR | | | | | | | | | |

ALU/MAU Instruction Formats

BOPS, Inc. - Manta SYSSIM 2.31

ALU Instructions

| Instruction | 31-30 | 29 | 28-27 | 26-21 | 20-16 | 15-11 | 10-6 | 5 | 4-3 | 2-0 |
|---|---|---|---|---|---|---|---|---|---|---|
| ABS | Group | S/P | Unit | ALUopcode | Rt / Rte, 0 | Rx / Rxe, 0 | 0 0 0 0 0 | 0 | CE2 | DPack |
| ABSDIF<br>MAX<br>MIN | Group | S/P | Unit | ALUopcode | Rt / Rte, 0 | Rx / Rxe, 0 | Ry / Rye, 0 | 0 | CE2 | DPack |
| CNTMSK | Group | S/P | Unit | ALUopcode | Rt / Rte, 0 | Rx / Rxe, 0 | Ry / Rye, 0 | 0 | CE2 | CntmskExt |
| FADD<br>FSUB | Group | S/P | Unit | ALUopcode | Rt | Rx | Ry | 0 | CE2 | FPack |
| AND<br>OR<br>XOR | Group | S/P | Unit | ALUopcode | Rt / Rte, 0 | Rx / Rxe, 0 | Ry / Rye, 0 | 0 | CE2 | LogicExt |
| NOT | Group | S/P | Unit | ALUopcode | Rt / Rte, 0 | Rx / Rxe, 0 | 0 0 0 0 0 | 0 | CE2 | LogicExt |
| CMPIcc | Group | S/P | Unit | ALUopcode | $I_6$, CC | Rx / Rxe, 0 | $I_{5-0}$ | | CCombo | DPack |
| CMPcc | Group | S/P | Unit | ALUopcode | 0, CC | Rx / Rxe, 0 | Ry / Rye, 0 | 0 | CCombo | DPack |
| FCMPcc | Group | S/P | Unit | ALUopcode | FCC | Rx | Ry | 0 | CCombo | FPack |

Common ALU/MAU Instructions

| Instruction | 31-30 | 29 | 28-27 | 26-21 | 20-16 | 15-11 | 10-6 | 5 | 4-3 | 2-0 |
|---|---|---|---|---|---|---|---|---|---|---|
| ADD<br>ADDS<br>MEAN2<br>SUB<br>SUBS | Group | S/P | Unit | ALUopcode<br>MAUopcode | Rt / Rte, 0 | Rx / Rxe, 0 | Ry / Rye, 0 | 0 | CE2 | DPack |
| ADDI<br>SUBI | Group | S/P | Unit | ALUopcode | Rt / Rte, 0 | Rx / Rxe, 0 | UIMM5 | 0 | CE2 | DPack |
| BFLYD2<br>BFLYS | Group | S/P | Unit | ALUopcode<br>MAUopcode | Rte, 0 | Rx / Rxe, 0 | Ry / Rye, 0 | 0 | CE2 | 0, H, W/H |

MAU Instructions

| Instruction | 31-30 | 29 | 28-27 | 26-21 | 20-16 | 15-11 | 10-6 | 5 | 4-3 | 2-0 |
|---|---|---|---|---|---|---|---|---|---|---|
| FMPY | Group | S/P | Unit | MAUopcode | Rt | Rx | Ry | 0 | CE2 | FPack |
| MEAN4 | Group | S/P | Unit | MAUopcode | Rt | Rxe, 0 | Rye, 0 | 0 | CE2 | RM1, M4Ext |
| MPY<br>MPYA<br>MPYD2<br>MPYXA | Group | S/P | Unit | MAUopcode | Rte, 0 | Rx | Ry | 0 | CE2 | MPack |
| MPYCX<br>MPYCXJ<br>MPYCXD2<br>MPYCXJD2 | Group | S/P | Unit | MAUopcode | Rt | Rx | Ry | 0 | CE2 | ME |
| MPYH<br>MPYL | Group | S/P | Unit | MAUopcode | Rt / Rte, 0 | Rx / Rxe, 0 | Ry / Rye, 0 | 0 | CE2 | MPack |
| SUM2P<br>SUM2PA | Group | S/P | Unit | MAUopcode | Rt / Rte, 0 | Rx / Rxe, 0 | Ry / Rye, 0 | 0 | CE2 | SumpExt |
| SUM4ADD | Group | S/P | Unit | MAUopcode | Rt / Rte, 0 | Rx / Rxe, 0 | Ry / Rye, 0 | 0 | CE2 | Sum4Ext |
| SUM8ADD | Group | S/P | Unit | MAUopcode | Rt | Rxe, 0 | Ry | 0 | CE2 | Sum8Ext |

DSU Instruction Formats

BOPS, Inc. - Manta SYSSIM 2.31

Single Bit Instructions

| Instruction | 31 30 | 29 | 28 27 | 26 25 24 23 22 21 | 20 19 18 17 16 | 15 14 13 12 11 | 10 | 9 | 8 | 7 | 6 | 5 | 4 | 3 | 2 | 1 | 0 |
|---|---|---|---|---|---|---|---|---|---|---|---|---|---|---|---|---|---|
| BAND, BANDN<br>BL, BLN<br>BOR, BORN<br>BSWAP<br>BXOR, BXORN | Group | S/P | Unit | DSUopcode | $Rs_{4\text{-}0}$ | Rx | $Rs_5$ | Ft | | | BitOpExt | | | | 0 | CE2 | |
| BANDI, BANDNI<br>BLI, BLNI<br>BORI, BORNI<br>BSWAPI<br>BXORI, BXORNI | Group | S/P | Unit | DSUopcode | $Rs_{4\text{-}0}$ | BitNum | $Rs_5$ | Ft | | | BitOpExt | | | | 0 | CE2 | |
| BCLR , BNOT<br>BSET | Group | S/P | Unit | DSUopcode | $Rt_{4\text{-}0}$ | Rx | $Rt_5$ | 0 | 0 | 0 | BitOpExt | | | | 0 | CE2 | |
| BCLRI , BNOTI<br>BSETI | Group | S/P | Unit | DSUopcode | $Rt_{4\text{-}0}$ | BitNum | $Rt_5$ | 0 | 0 | 0 | BitOpExt | | | | 0 | CE2 | |
| BS | Group | S/P | Unit | DSUopcode | $Rt_{4\text{-}0}$ | Rx | $Rt_5$ | Ft | | | BitOpExt | | | | 0 | CE2 | |
| BSI | Group | S/P | Unit | DSUopcode | $Rt_{4\text{-}0}$ | BitNum | $Rt_5$ | Ft | | | BitOpExt | | | | 0 | CE2 | |

Data Manipulation Instructions

| Instruction | 31 30 | 29 | 28 27 | 26 25 24 23 22 21 | 20 19 18 17 16 | 15 14 13 12 11 | 10 | 9 | 8 | 7 | 6 | 5 | 4 | 3 | 2 | 1 | 0 |
|---|---|---|---|---|---|---|---|---|---|---|---|---|---|---|---|---|---|
| CNTRS | Group | S/P | Unit | DSUopcode | Rt | Rx | 0 | 0 | 0 | 0 | 0 | CntrsExt | | | 0 | CE2 | |
| COPY | Group | S/P | Unit | DSUopcode | $Rt_{4\text{-}0}$ | $Rx_{4\text{-}0}$ | $Rt_5$ | $Rx_5$ | 0 | 0 | CopyExt | | | | | CE2 | |
| COPYS | Group | S/P | Unit | DSUopcode | Rt / Rte 0 | Rx / Rxe 0 | Ry / Rye 0 | | | | | DPack | | | 0 | 0 | 0 |
| MIX | Group | S/P | Unit | DSUopcode | Rte 0 | Rx | Ry | | | | | MixExt | | | 0 | CE2 | |
| PACKB | Group | S/P | Unit | DSUopcode | Rt | Rxe 0 | Rye 0 | | | | | PackbExt | | | 0 | CE2 | |
| PACKH , PACKL | Group | S/P | Unit | DSUopcode | Rte 0 | Rxe 0 | Rye 0 | | | | | PackExt | | | 0 | CE2 | |
| PERM | Group | S/P | Unit | DSUopcode | Rt / Rte 0 | Rxe 0 | Ry | | | | | PermExt | | | 0 | CE2 | |
| ROT | Group | S/P | Unit | DSUopcode | Rt / Rte 0 | Rx / Rxe 0 | Ry | | | | | DPack | | | 0 | CE2 | |
| ROTLI<br>ROTRI | Group | S/P | Unit | DSUopcode | Rt / Rte 0 | Rx / Rxe 0 | Nbits | | | | | DPack | | | 0 | CE2 | |
| SHL<br>SHR | Group | S/P | Unit | DSUopcode | Rt / Rte 0 | Rx / Rxe 0 | Ry | | | | | DPack | | | CE3 | | |
| SHLI<br>SHRI | Group | S/P | Unit | DSUopcode | Rt / Rte 0 | Rx / Rxe 0 | Nbits | | | | | DPack | | | CE3 | | |
| SCANL , SCANR | Group | S/P | Unit | DSUopcode | Rt | Rx | 0 | 0 | 0 | 0 | 0 | ScanExt | | | 0 | CE2 | |
| UNPACK | Group | S/P | Unit | DSUopcode | Rte 0 | Rx | 0 | 0 | 0 | 0 | 0 | UnpackExt | | | 0 | CE2 | |
| XSCAN | Group | S/P | Unit | DSUopcode | Rt | Rxe 0 | 0 | 0 | 0 | 0 | 0 | XscanExt | | | 0 | CE2 | |
| XSHR | Group | S/P | Unit | DSUopcode | Rte 0 | 0 0 0 0 0 | Ry | | | | | XshrExt | | | 0 | CE2 | |

Divide/Square-Root/Conversion Instructions

| Instruction | 31 30 | 29 | 28 27 | 26 25 24 23 22 21 | 20 19 18 17 16 | 15 14 13 12 11 | 10 | 9 | 8 | 7 | 6 | 5 | 4 | 3 | 2 | 1 | 0 |
|---|---|---|---|---|---|---|---|---|---|---|---|---|---|---|---|---|---|
| FDIV | Group | S/P | Unit | DSUopcode | Rt | Rx | Ry | | | | | FdivExt | | | 0 | CE2 | |
| FRCP | Group | S/P | Unit | DSUopcode | Rt | Rx | 0 | 0 | 0 | 0 | 0 | FdivExt | | | 0 | CE2 | |
| FRSQRT<br>FSQRT | Group | S/P | Unit | DSUopcode | Rt | Rx | 0 | 0 | 0 | 0 | 0 | FsqrtExt | | | 0 | CE2 | |
| FTOI<br>FTOIS | Group | S/P | Unit | DSUopcode | Rt | Rx | 0 | RM | | SR | CnvrtExt | | | | 0 | CE2 | |
| ITOF<br>ITOFS | Group | S/P | Unit | DSUopcode | Rt | Rx | 0 | 0 | 0 | SR | CnvrtExt | | | | 0 | CE2 | |

SP<->PE and PE<->PE Data Communication Instructions

| Instruction | 31 30 | 29 | 28 27 | 26 25 24 23 22 21 | 20 19 18 17 16 | 15 14 13 12 11 | 10 | 9 | 8 | 7 | 6 | 5 | 4 | 3 | 2 | 1 | 0 |
|---|---|---|---|---|---|---|---|---|---|---|---|---|---|---|---|---|---|
| PEXCHG | Group | S/P | Unit | DSUopcode | Rt | Rx | PEXCHGCSctrL | | | | | | | | CE3 | | |
| SPRECV | Group | S/P | Unit | DSUopcode | Rt | Rx | SPRECVCSctrl | | | | | | | | CE3 | | |
| SPSEND | Group | S/P | Unit | DSUopcode | Rt | Rx | SPSENDCSctrl | | | | | | | | CE3 | | |

CTRL - Control Instructions

BOPS, Inc. - Manta SYSSIM 2.31

Pipeline Considerations for Control Instructions

| | |
|---|---|
| CALL | Call PC-Relative Subroutine |
| CALLcc | Call PC-Relative Subroutine on Condition |
| CALLD | Call Direct Subroutine |
| CALLDcc | Call Direct Subroutine on Condition |
| CALLI | Call Indirect Subroutine |
| CALLIcc | Call Indirect Subroutine on Condition |
| EPLOOPx | Set Up and Execute an Instruction Event Point Loop |
| EPLOOPIx | Set Up and Execute an Instruction Event Point Loop Immediate |
| JMP | Jump PC-Relative |
| JMPcc | Jump PC-Relative on Condition |
| JMPD | Jump Direct |
| JMPDcc | Jump Direct on Condition |
| JMPI | Jump Indirect |
| JMPIcc | Jump Indirect on Condition |
| NOP | No Operation |
| RET | Return from Subroutine |
| RETcc | Return from Subroutine on Condition |
| RETI | Return from Interrupt |
| RETIcc | Return from Interrupt on Condition |
| SYSCALL | System Call |
| SVC | Simulator/Verilog Control |

Control Instructions Pipeline Considerations and Restrictions

1 - General Pipeline Considerations for Control Instructions

1.1 - Calli/Jmpi Instructions Perform Address Generation in Decode

For address generation, CALLI and JMPI instructions read the value of the address register (An) in the DECODE stage of the pipe. Programmers must ensure that the address register (An) used by the CALLI or JMPI instruction contains the intended value at the DECODE stage in the pipe.

Example 1

```
LIM.S.W    An, 0x100        ! An <- 0x100 in DECODE
CALLI      An               ! CALLI uses 0x100 because LIM works in DECODE also
```

| Cycles | Fetch | Decode | Execute | CR |
|---|---|---|---|---|
| 1 | LIM.S.W | | | |
| 2 | CALLI | LIM.S.W | | |
| 3 | | CALLI | LIM.S.W | |
| 4 | | | CALLI | LIM.S.W |
| 5 | | | | CALLI |

Example 2

```
LIM.S.W    An, 0x100        ! An <- 0x100 in DECODE
LBD.S.W    An, An, 0x10     ! An <- Mem[0x110] in EXECUTE
CALLI      An               ! Uses value of 0x100 not value loaded by LBD instruction
```

| Cycles | Fetch | Decode | Execute | CR |
|---|---|---|---|---|
| 1 | LIM.S.W | | | |
| 2 | LBD.S.W | LIM.S.W | | |
| 3 | CALLI | LBD.S.W | LIM.S.W | |
| 4 | | CALLI | LBD.S.W | LIM.S.W |
| 5 | | | CALLI | LBD.S.W |
| 6 | | | | CALLI |

CALL - Call PC-Relative Subroutine

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | CtrlAmode | | 0 | CtrlCC | | | | | 0 | SDISP16 | | | | | | | | | | | | | | | |

Description
Save the address of the instruction immediately following the CALL instruction in the User Link Register (ULR) and jump to the effective address which is the sum of the PC and a signed 16-bit displacement.
See also CALLcc.

Syntax/Operation

| Instruction | Operands | Operation |
|---|---|---|
| CALL | label | ULR ←PC + 1<br>PC ←PC + SDISP16 |

Note: In the assembler you use a label to produce the SDISP16 value.

Arithmetic Flags Affected
None

Cycles: 2

CALLcc - Call PC-Relative Subroutine on Condition

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | CtrlAmode | | 0 | CtrlCC | | | | | 0 | SDISP16 | | | | | | | | | | | | | | | |

Description

Save the address of the instruction immediately following the CALL instruction in the User Link Register (ULR) and jump to the effective address, if the specified condition is satisfied. The effective address is the sum of the PC and a signed 16-bit displacement.
See also CALL.

Syntax/Operation

| Instruction | Operands | Operation |
|---|---|---|
| CALLZ (CALLEQ) | label | ULR ←PC + 1; PC ←PC + SDISP16 if (Z=1) |
| CALLNZ (CALLNE) | label | ULR ←PC + 1; PC ←PC + SDISP16 if (Z=0) |
| CALLHI | label | ULR ←PC + 1; PC ←PC + SDISP16 if ((C=1) && (Z=0)) |
| CALLHS (CALLCS) | label | ULR ←PC + 1; PC ←PC + SDISP16 if (C=1) |
| CALLLO (CALLCC) | label | ULR ←PC + 1; PC ←PC + SDISP16 if (C=0) |
| CALLLS | label | ULR ←PC + 1; PC ←PC + SDISP16 if ((C=0) \|\| (Z=1)) |
| CALLVS | label | ULR ←PC + 1; PC ←PC + SDISP16 if (V=1) |
| CALLVC | label | ULR ←PC + 1; PC ←PC + SDISP16 if (V=0) |
| CALLPOS | label | ULR ←PC + 1; PC ←PC + SDISP16 if ((N=0) && (Z=0)) |
| CALLNEG | label | ULR ←PC + 1; PC ←PC + SDISP16 if (N=1) |
| CALLGE | label | ULR ←PC + 1; PC ←PC + SDISP16 if (N=V) |
| CALLGT | label | ULR ←PC + 1; PC ←PC + SDISP16 if ((Z=0) && (N=V)) |
| CALLLE | label | ULR ←PC + 1; PC ←PC + SDISP16 if ((Z=1) \|\| (N != V)) |
| CALLLT | label | ULR ←PC + 1; PC ←PC + SDISP16 if (N != V) |
| T.CALL | label | ULR ←PC + 1; PC ←PC + SDISP16 if (F0=1) |
| F.CALL | label | ULR ←PC + 1; PC ←PC + SDISP16 if (F0=0) |

Note: In the assembler you use a label to produce the SDISP16 value.

Arithmetic Flags Affected

None

Cycles: 3 (regardless of whether CALL occurs or not)

CALLD - Call Direct Subroutine

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | CtrlAmode | | 0 | CtrlCC | | | | | 0 | UADDR16 | | | | | | | | | | | | | | | |

Description
Save the address of the instruction immediately following the CALLD instruction in the User Link Register (ULR) and jump to the effective address. The effective address is created by zero-extending the unsigned 16-bit direct address *UADDR16* to 32-bits.
See also CALLDcc.

Syntax/Operation

| Instruction | Operands | Operation |
|---|---|---|
| CALLD | UADDR16 | ULR ←PC + 1<br>PC ←UADDR16 |

Arithmetic Flags Affected
None

Cycles: 2

CALLDcc - Call Direct Subroutine on Condition

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | CtrlAmode | | 0 | CtrlCC | | | | | 0 | UADDR16 | | | | | | | | | | | | | | | |

Description

Save the address of the instruction immediately following the CALLDcc instruction in the User Link Register (ULR) and jump to the effective address if the specified condition is satisfied. The effective address is created by zero-extending the 16-bit direct address *UADDR16* to 32-bits.
See also CALLD.

Syntax/Operation

| Instruction | Operands | Operation |
|---|---|---|
| CALLDZ (CALLDEQ) | UADDR16 | ULR ←PC + 1; PC ←UADDR16 if (Z=1) |
| CALLDNZ (CALLDNE) | UADDR16 | ULR ←PC + 1; PC ←UADDR16 if (Z=0) |
| CALLDHI | UADDR16 | ULR ←PC + 1; PC ←UADDR16 if ((C=1) && (Z=0)) |
| CALLDHS (CALLDCS) | UADDR16 | ULR ←PC + 1; PC ←UADDR16 if (C=1) |
| CALLDLO (CALLDCC) | UADDR16 | ULR ←PC + 1; PC ←UADDR16 if (C=0) |
| CALLDLS | UADDR16 | ULR ←PC + 1; PC ←UADDR16 if ((C=0) \|\| (Z=1)) |
| CALLDVS | UADDR16 | ULR ←PC + 1; PC ←UADDR16 if (V=1) |
| CALLDVC | UADDR16 | ULR ←PC + 1; PC ←UADDR16 if (V=0) |
| CALLDPOS | UADDR16 | ULR ←PC + 1; PC ←UADDR16 if ((N=0) && (Z=0)) |
| CALLDNEG | UADDR16 | ULR ←PC + 1; PC ←UADDR16 if (N=1) |
| CALLDGE | UADDR16 | ULR ←PC + 1; PC ←UADDR16 if (N=V) |
| CALLDGT | UADDR16 | ULR ←PC + 1; PC ←UADDR16 if ((Z=0) && (N=V)) |
| CALLDLE | UADDR16 | ULR ←PC + 1; PC ←UADDR16 if ((Z=1) \|\| (N != V)) |
| CALLDLT | UADDR16 | ULR ←PC + 1; PC ←UADDR16 if (N != V) |
| T.CALLD | UADDR16 | ULR ←PC + 1; PC ←UADDR16 if (F0=1) |
| F.CALLD | UADDR16 | ULR ←PC + 1; PC ←UADDR16 if (F0=0) |

Arithmetic Flags Affected
None

Cycles: 3 (regardless of whether CALLD occurs or not)

CALLI - Call Indirect Subroutine

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | CtrlAmode | | 0 | CtrlCC | | | | | 0 | An | | | 0 | 0 | 0 | 0 | 0 | 0 | 0 | 0 | 0 | 0 | 0 | 0 | 0 |

Description
Save the address of the instruction immediately following the CALLI instruction in the User Link Register (ULR) and jump to the effective address contained in address register *An*.
See also CALLIcc.

Syntax/Operation

| Instruction | Operands | Operation |
|---|---|---|
| CALLI | An | ULR ←PC + 1<br>PC ←An |

Arithmetic Flags Affected
None

Cycles: 2

Pipeline Considerations
See General Pipeline Considerations for Control Instructions.

CALLIcc - Call Indirect Subroutine on Condition

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | CtrlAmode | | 0 | CtrlCC | | | | | 0 | An | | | 0 | 0 | 0 | 0 | 0 | 0 | 0 | 0 | 0 | 0 | 0 | 0 | 0 |

Description
Save the address of the instruction immediately following the CALLIcc instruction in the User Link Register (ULR) and jump to the effective address if the specified condition is satisfied. The effective address is in address register *An*.
See also CALLI.

Syntax/Operation

| Instruction | Operands | Operation |
|---|---|---|
| CALLIZ (CALLIEQ) | An | ULR ←PC + 1; PC ←An if (Z=1) |
| CALLINZ (CALLINE) | An | ULR ←PC + 1; PC ←An if (Z=0) |
| CALLIHI | An | ULR ←PC + 1; PC ←An if ((C=1) && (Z=0)) |
| CALLIHS (CALLICS) | An | ULR ←PC + 1; PC ←An if (C=1) |
| CALLILO (CALLICC) | An | ULR ←PC + 1; PC ←An if (C=0) |
| CALLILS | An | ULR ←PC + 1; PC ←An if ((C=0) \|\| (Z=1)) |
| CALLIVS | An | ULR ←PC + 1; PC ←An if (V=1) |
| CALLIVC | An | ULR ←PC + 1; PC ←An if (V=0) |
| CALLIPOS | An | ULR ←PC + 1; PC ←An if ((N=0) && (Z=0)) |
| CALLINEG | An | ULR ←PC + 1; PC ←An if (N=1) |
| CALLIGE | An | ULR ←PC + 1; PC ←An if (N=V) |
| CALLIGT | An | ULR ←PC + 1; PC ←An if ((Z=0) && (N=V)) |
| CALLILE | An | ULR ←PC + 1; PC ←An if ((Z=1) \|\| (N != V)) |
| CALLILT | An | ULR ←PC + 1; PC ←An if (N != V) |
| T.CALLI | An | ULR ←PC + 1; PC ←An if (F0=1) |
| F.CALLI | An | ULR ←PC + 1; PC ←An if (F0=0) |

Arithmetic Flags Affected
None

Cycles: 3 (regardless of whether CALLI occurs or not)

Pipeline Considerations
See General Pipeline Considerations for Control Instructions.

EPLOOPx - Set Up and Execute an Instruction Event Point Loop

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | LCF | BPID | | 0 | 0 | 0 | 0 | 0 | 0 | 0 | 0 | 0 | 0 | 0 | 0 | UDISP10 | | | | | | | | | |

Description

EPLOOPx sets up and executes a program loop beginning with the next sequential instruction. The Instruction Event Point Register (IEPxR1) is loaded with the address of the next sequential instruction. The Instruction Event Point Register (IEPxR0) is loaded with the address of the last instruction in the loop, which is the sum of the address of the LOOP instruction and 10-bit unsigned displacement *UDISP10*. The Instruction Event Point Control field (IEPx) in the IEPCTL0:IEPCTL1 register pair is loaded with the value 0x18. If the Loop Counter (IEPxR2.h0) is non-zero, execution proceeds with the next sequential instruction. If the Loop Counter is zero, the body of the loop is skipped and execution proceeds with the next sequential instruction after the address in IEPxR0. While a loop is active (Loop Counter > 0) each instruction address is compared to the IEPxR0. When there is a match and Loop Counter > 1, PC is set to IEPxR1 and the Loop Counter is decremented. When there is a match and Loop Counter = 1, the Loop Counter is loaded with the Loop Reload Value and the loop is exited.

Syntax/Operation

| Instruction | Operands | Operation |
|---|---|---|
| EPLOOPx | UDISP10 | IEPxR1 ←PC + 1<br>IEPxR0 ←PC + UDISP10<br>IEPx ←0x18<br>if (IEPxR2.H0 > 0) {<br>  while (IEPxR2.H0 > 1) {<br>    Execute instructions until PC = IEPxR0<br>    PC ←IEPxR1<br>    IEPxR2.H0 ←IEPxR2.H0 - 1<br>  }<br>  Execute instructions until PC = IEPxR0<br>  IEPxR2.H0 ←IEPxR2.H1<br>}<br>else<br>  PC ←PC + UDISP10 + 1 |

Note: In the assembler you use a label to produce the *UDISP10* value.
The *x* in EPLOOPx, IEPxR0, IEPxR1, and IEPxR2 is 0, 1, 2, or 3.

Arithmetic Flags Affected
None

Cycles: 3

Restrictions

1. The last two instructions in a program loop may not be any of the following instructions:

```
CALL      JMP      LV        RET
CALLcc    JMPcc    EPLOOPx   RETcc
CALLD     JMPD     EPLOOPIx  RETI
CALLDcc   JMPDcc   SYSCALL   RETIcc
CALLI     JMPI
CALLIcc   JMPIcc
```

2. Nested loops may not share the same loop end address (i.e. they may not end in the same instruction).

Example 1 (Non-nested Program Loop)

```
! This Example is syntactically and logically correct. See key
setup_loop:  lim.s.w    r1, 300          ! load the 16-bit loop count in r1
             sspr.s.w   r1, iep0r2       ! and transfer to the loop count register
iep0r2
             eploop0    loop_end         ! load the loop start address in iep0r1
                                         ! load the loop end address in iep0r0
```

```
                                              ! (enables the looping mechanism using iep0r0,
iep0r1, iep0r2, iepctl0.b0
loop_start:         !       . . .             ! first instruction of program loop
                    !       . . .
                    !       . . .
                    !       . . .
loop_end:           !       . . .             ! last  instruction of program loop
```

Example 2 (A nested Program Loop)

```
! This Example is syntactically and logically correct. See key
setup_loop1:  lim.s.w     r1, loop1_start  ! load the loop start address in r1
              sspr.s.w    r1, iep1r1       ! and transfer to loop start address iep1r1
              lim.s.w     r1, loop1_end    ! load the loop end address in r1
              sspr.s.w    r1, iep1r0       ! and transfer to loop end address iep1r0
              lim.s.h1    r1, 16           ! initialize the Loop Counter-Reload value
              lim.s.h0    r1, 16           ! initialize the Loop Counter
              sspr.s.w    r1, iep1r2       ! and transfer both to loop count register
iep1r2

              lspr.s.w    r1, iepctl0      ! get the current iep1 value from iepctl0 into
r1
              lim.s.w     r2, 0x18         ! load the new iep1 control value into r2
              copy.sd.b   r1b1, r2b0       ! insert it into byte 1 of r1
              sspr.s.w    r1, iepctl0      ! write the updated value back to iepctl0
                                           ! (enables the looping mechanism using iep1r0,
iep1r1, iep1r2, iepctl0.b1
                    !       . . .
                    !       . . .
                    !       . . .
setup_loop0:  lim.s.h0    r1, 300          ! load the 16-bit loop count in r1.h0
              lim.s.h1    r1, 300          ! load the 16-bit loop reload count in r1.h1
              sspr.s.w    r1, iep0r2       ! and transfer to the loop count register
iep0r2
              eploop0     loop0_end        ! load the loop start address in iep0r1
                                           ! load the loop end address in iep0r0
                                           ! (enables the looping mechanism using iep0r0,
iep0r1, iep0r2, iepctl0.b0

loop0_start:        !       . . .          ! first instruction of outer program loop
                    !       . . .
                    !       . . .
                    !       . . .
                    !       . . .
loop1_start:        !       . . .          ! first instruction of inner program loop
                    !       . . .
                    !       . . .
                    !       . . .
                    !       . . .
loop1_end:          !       . . .          ! last instruction of inner program loop
                    !       . . .
                    !       . . .
                    !       . . .
                    !       . . .
loop0_end:          !       . . .          ! last instruction of outer program loop
```

EPLOOPIx - Set Up and Execute an Instruction Event Point Loop Immediate

BOPS, Inc. - Manta
SYSSIM 2.31

Encoding

| 31 30 | 29 | 28 27 26 25 | 24 | 23 22 | 21 20 19 18 17 16 15 14 13 12 11 10 | 9 8 7 6 5 4 3 2 1 0 |
|---|---|---|---|---|---|---|
| Group | S/P | CtrlOp | LCF | BPID | LoopCnt | UDISP10 |

Description

EPLOOPIx sets up and executes a program loop beginning with the next sequential instruction. The Instruction Event Point Register (IEPxR1) is loaded with the address of the next sequential instruction. The Instruction Event Point Register (IEPxR0) is loaded with the address of the last instruction in the loop, which is the sum of the address of the EPLOOPI instruction and 10-bit unsigned displacement *UDISP10*. The Instruction Event Point Register (IEPxR2) is loaded with the unsigned 12-bit value *LoopCnt*, placing the value in both the upper and lower halfwords. The Instruction Event Point Control field (IEPx) in the IEPCTL0:IEPCTL1 register pair is loaded with the value 0x18. If the Loop Counter (IEPxR2) is non-zero, execution proceeds with the next sequential instruction. If the Loop Counter is zero, the body of the loop is skipped and execution proceeds with the next sequential instruction after the IEPxR0. While a loop is active (Loop Counter > 0) each instruction address is compared to the IEPxR0. When there is a match and Loop Counter > 1, PC is set to IEPxR1 and the Loop Counter is decremented. When there is a match and Loop Counter = 1, the Loop Counter is loaded with the Loop Reload Value and the loop is exited.

Syntax/Operation

| Instruction | Operands | Operation |
|---|---|---|
| EPLOOPIx | LoopCnt, UDISP10 | IEPxR1 ←PC + 1<br>IEPxR0 ←PC + UDISP10<br>IEPxR2.H0 ←LoopCnt<br>IEPxR2.H1 ←LoopCnt<br>IEPx ←0x18<br>if (IEPxR2.H0 > 0) {<br>  while (IEPxR2.H0 > 1) {<br>    Execute instructions until PC = IEPxR0<br>    PC ←IEPxR1<br>    IEPxR2.H0 ←IEPxR2.H0 - 1<br>  }<br>  Execute instructions until PC = IEPxR0<br>  IEPxR2.H0 ←IEPxR2.H1<br>}<br>else<br>  PC ←PC + UDISP10 + 1 |

Note: In the assembler you use a label to produce the *UDISP10* value.
The *x* in EPLOOPIx, IEPxR0, IEPxR1, IEPxR2 is 0, 1, 2, or 3

Arithmetic Flags Affected
None

Cycles: 3

Restrictions

1. The last two instructions in a program loop may not be any of the following instructions:

```
CALL      JMP      LV        RET
CALLcc    JMPcc    EPLOOPx   RETcc
CALLD     JMPD     EPLOOPIx  RETI
CALLDcc   JMPDcc   SYSCALL   RETIcc
CALLI     JMPI
CALLIcc   JMPIcc
```

2. Nested loops may not share the same loop end address (i.e. they may not end in the same instruction).

Example 1 (Non-nested Program Loop)

```
! This Example is syntactically and logically correct. See key
setup_loop:   eploopi0   300, loop_end     ! load the loop start address in iep0r1
                                           ! load the loop end address in iep0r0
                                           ! load the loop counter in iep0r2.h0
```

```
                                        ! load the loop control value in iepctl0.b0
loop_start:      !      . . .           ! first instruction of program loop
                 !      . . .
                 !      . . .
                 !      . . .
loop_end:        !      . . .           ! last instruction of program loop
```

Example 2 (A nested Program Loop)

```
! This Example is syntactically and logically correct. See key
setup_loop1:  lim.s.w    r1, loop1_start  ! load the loop start address in r1
              sspr.s.w   r1, iep1r1       ! and transfer to loop start address iep1r1
              lim.s.w    r1, loop1_end    ! load the loop end address in r1
              sspr.s.w   r1, iep1r0       ! and transfer to loop end address iep1r0
              lim.s.h1   r1, 16           ! initialize the Loop Counter-Reload value
              lim.s.h0   r1, 16           ! initialize the Loop Counter
              sspr.s.w   r1, iep1r2       ! and transfer both to loop count register
iep1r2

              lspr.s.w   r1, iepctl0      ! get the current iep1 value from iepctl0 into
r1
              lim.s.w    r2, 0x18         ! load the new iep1 control value into r2
              copy.sd.b  r1b1, r2b0       ! insert it into byte 1 of r1
              sspr.s.w   r1, iepctl0      ! write the updated value back to iepctl0
                                          ! (enables the looping mechanism using iep1r0,
iep1r1, iep1r2, iepctl0.b1

                  !      . . .
                  !      . . .
                  !      . . .

setup_loop0:  eploopi0   300, loop0_end   ! load the loop start address in iep0r1
                                          ! load the loop end address in iep0r0
                                          ! load the 12-bit loop count in iep0r2.h0
                                          ! (enables the looping mechanism using iep0r0,
iep0r1, iep0r2, iepctl0.b0

loop0_start:      !      . . .            ! first instruction of outer program loop
                  !      . . .
                  !      . . .
                  !      . . .
                  !      . . .
loop1_start:      !      . . .            ! first instruction of inner program loop
                  !      . . .
                  !      . . .
                  !      . . .
                  !      . . .
loop1_end:        !      . . .            ! last instruction of inner program loop
                  !      . . .
                  !      . . .
                  !      . . .
                  !      . . .
loop0_end:        !      . . .            ! last instruction of outer program loop
```

JMP - Jump PC-Relative

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | CtrlAmode | | 0 | CtrlCC | | | | | 0 | SDISP16 | | | | | | | | | | | | | | | |

Description
Jump to the effective address which is the sum of the PC and a signed 16-bit displacement.

Syntax/Operation

| Instruction | Operands | Operation |
|---|---|---|
| JMP | label | PC ←PC + SDISP16 |

Note: In the assembler you use a label to produce the SDISP16 value.

Arithmetic Flags Affected
None

Cycles: 2

JMPcc - Jump PC-Relative on Condition

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | CtrlAmode | | 0 | CtrlCC | | | | | 0 | SDISP16 | | | | | | | | | | | | | | | |

Description
Jump to the effective address, if the specified condition is satisfied. The effective address is the sum of the PC and a signed 16-bit displacement.

Syntax/Operation

| Instruction | Operands | Operation |
|---|---|---|
| JMPZ (JMPEQ) | label | PC ←PC + SDISP16 if (Z=1) |
| JMPNZ (JMPNE) | label | PC ←PC + SDISP16 if (Z=0) |
| JMPHI | label | PC ←PC + SDISP16 if ((C=1) && (Z=0)) |
| JMPHS (JMPCS) | label | PC ←PC + SDISP16 if (C=1) |
| JMPLO (JMPCC) | label | PC ←PC + SDISP16 if (C=0) |
| JMPLS | label | PC ←PC + SDISP16 if ((C=0) \|\| (Z=1)) |
| JMPVS | label | PC ←PC + SDISP16 if (V=1) |
| JMPVC | label | PC ←PC + SDISP16 if (V=0) |
| JMPPOS | label | PC ←PC + SDISP16 if ((N=0) && (Z=0)) |
| JMPNEG | label | PC ←PC + SDISP16 if (N=1) |
| JMPGE | label | PC ←PC + SDISP16 if (N=V) |
| JMPGT | label | PC ←PC + SDISP16 if ((Z=0) && (N=V)) |
| JMPLE | label | PC ←PC + SDISP16 if ((Z=1) \|\| (N != V)) |
| JMPLT | label | PC ←PC + SDISP16 if (N != V) |
| T.JMP | label | PC ←PC + SDISP16 if (F0=1) |
| F.JMP | label | PC ←PC + SDISP16 if (F0=0) |

Arithmetic Flags Affected
None

Cycles: 3 (regardless of whether JMP occurs or not)

JMPD - Jump Direct

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | CtrlAmode | | 0 | CtrlCC | | | | | 0 | UADDR16 | | | | | | | | | | | | | | | |

Description
Jump to the effective address created by zero-extending the unsigned 16-bit direct address *UADDR16* to 32-bits.

Syntax/Operation

| Instruction | Operands | Operation |
|---|---|---|
| JMPD | UADDR16 | PC ←UADDR16 |

Arithmetic Flags Affected
None

Cycles: 2

JMPDcc - Jump Direct on Condition

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | CtrlAmode | | 0 | CtrlCC | | | | | 0 | UADDR16 | | | | | | | | | | | | | | | |

Description

Jump to the effective address if the specified condition is satisfied. The effective address is created by zero-extending the 16-bit direct address *UADDR16* to 32-bits.

Syntax/Operation

| Instruction | Operands | Operation |
|---|---|---|
| JMPDZ (JMPDEQ) | UADDR16 | PC ←UADDR16 if (Z=1) |
| JMPDNZ (JMPDNE) | UADDR16 | PC ←UADDR16 if (Z=0) |
| JMPDHI | UADDR16 | PC ←UADDR16 if ((C=1) && (Z=0)) |
| JMPDHS (JMPDCS) | UADDR16 | PC ←UADDR16 if (C=1) |
| JMPDLO (JMPDCC) | UADDR16 | PC ←UADDR16 if (C=0) |
| JMPDLS | UADDR16 | PC ←UADDR16 if ((C=0) \|\| (Z=1)) |
| JMPDVS | UADDR16 | PC ←UADDR16 if (V=1) |
| JMPDVC | UADDR16 | PC ←UADDR16 if (V=0) |
| JMPDPOS | UADDR16 | PC ←UADDR16 if ((N=0) && (Z=0)) |
| JMPDNEG | UADDR16 | PC ←UADDR16 if (N=1) |
| JMPDGE | UADDR16 | PC ←UADDR16 if (N=V) |
| JMPDGT | UADDR16 | PC ←UADDR16 if ((Z=0) && (N=V)) |
| JMPDLE | UADDR16 | PC ←UADDR16 if ((Z=1) \|\| (N != V)) |
| JMPDLT | UADDR16 | PC ←UADDR16 if (N != V) |
| T.JMPD | UADDR16 | PC ←UADDR16 if (F0=1) |
| F.JMPD | UADDR16 | PC ←UADDR16 if (F0=0) |

Arithmetic Flags Affected

None

Cycles: 3 (regardless of whether JMPD occurs or not)

JMPI - Jump Indirect

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | CtrlAmode | | 0 | CtrlCC | | | | | 0 | An | | | 0 | 0 | 0 | 0 | 0 | 0 | 0 | 0 | 0 | 0 | 0 | 0 |

Description
Jump to the effective address contained in address register *An*.

Syntax/Operation

| Instruction | Operands | Operation |
|---|---|---|
| JMPI | An | PC ←An |

Arithmetic Flags Affected
None

Cycles: 2

Pipeline Considerations
See General Pipeline Considerations for Control Instructions.

JMPIcc - Jump Indirect on Condition

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | CtrlAmode | | 0 | CtrlCC | | | | | 0 | An | | | 0 | 0 | 0 | 0 | 0 | 0 | 0 | 0 | 0 | 0 | 0 | 0 | 0 |

Description

Jump to the effective address if the specified condition is satisfied. The effective address is in address register *An*.

Syntax/Operation

| Instruction | Operands | Operation |
|---|---|---|
| JMPIZ (JMPIEQ) | An | PC ←An if (Z=1) |
| JMPINZ (JMPINE) | An | PC ←An if (Z=0) |
| JMPIHI | An | PC ←An if ((C=1) && (Z=0)) |
| JMPIHS (JMPICS) | An | PC ←An if (C=1) |
| JMPILO (JMPICC) | An | PC ←An if (C=0) |
| JMPILS | An | PC ←An if ((C=0) \|\| (Z=1)) |
| JMPIVS | An | PC ←An if (V=1) |
| JMPIVC | An | PC ←An if (V=0) |
| JMPIPOS | An | PC ←An if ((N=0) && (Z=0)) |
| JMPINEG | An | PC ←An if (N=1) |
| JMPIGE | An | PC ←An if (N=V) |
| JMPIGT | An | PC ←An if ((Z=0) && (N=V)) |
| JMPILE | An | PC ←An if ((Z=1) \|\| (N != V)) |
| JMPILT | An | PC ←An if (N != V) |
| T.JMPI | An | PC ←An if (F0=1) |
| F.JMPI | An | PC ←An if (F0=0) |

Arithmetic Flags Affected

None

Cycles: 3 (regardless of whether JMPI occurs or not)

Pipeline Considerations

See General Pipeline Considerations for Control Instructions.

NOP - No Operation

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

Description
No operation is performed.

Syntax/Operation

| Instruction | Operands | Operation |
|---|---|---|
| NOP | *<none>* | Do nothing |

Arithmetic Flags Affected
None

Cycles: 1

RET - Return from Call

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | 0 | 0 | 0 | CtrlCC | | | | | 0 | 0 | 0 | 0 | 0 | 0 | 0 | 0 | 0 | 0 | 0 | 0 | 0 | 0 | 0 | 0 | 0 |

Description

Jump to the effective address contained in the User Link Register (ULR).
See also RETcc.

Syntax/Operation

| Instruction | Operands | Operation |
|---|---|---|
| RET | *<none>* | PC ←ULR |

Arithmetic Flags Affected

None

Cycles: 2

RETcc - Return from Call on Condition

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | 0 | 0 | 0 | CtrlCC | | | | | 0 | 0 | 0 | 0 | 0 | 0 | 0 | 0 | 0 | 0 | 0 | 0 | 0 | 0 | 0 | 0 | 0 |

Description

Jump to the effective address contained in the User Link Register (ULR) if the specified condition is satisfied. See also RET.

Syntax/Operation

| Instruction | Operands | Operation |
|---|---|---|
| RETZ (RETEQ) | *<none>* | PC ←ULR if (Z=1) |
| RETNZ (RETNE) | *<none>* | PC ←ULR if (Z=0) |
| RETHI | *<none>* | PC ←ULR if ((C=1) && (Z=0)) |
| RETHS (RETCS) | *<none>* | PC ←ULR if (C=1) |
| RETLO (RETCC) | *<none>* | PC ←ULR if (C=0) |
| RETLS | *<none>* | PC ←ULR if ((C=0) \|\| (Z=1)) |
| RETVS | *<none>* | PC ←ULR if (V=1) |
| RETVC | *<none>* | PC ←ULR if (V=0) |
| RETPOS | *<none>* | PC ←ULR if ((N=0) && (Z=0)) |
| RETNEG | *<none>* | PC ←ULR if (N=1) |
| RETGE | *<none>* | PC ←ULR if (N=V) |
| RETGT | *<none>* | PC ←ULR if ((Z=0) && (N=V)) |
| RETLE | *<none>* | PC ←ULR if ((Z=1) \|\| (N != V)) |
| RETLT | *<none>* | PC ←ULR if (N != V) |
| T.RET | *<none>* | PC ←ULR if (F0=1) |
| F.RET | *<none>* | PC ←ULR if (F0=0) |

Arithmetic Flags Affected

None

Cycles: 3 (regardless of whether RET occurs or not)

RETI - Return from Interrupt

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | 0 | 0 | 0 | CtrlCC | | | | | 0 | 0 | 0 | 0 | 0 | 0 | 0 | 0 | 0 | 0 | 0 | 0 | 0 | 0 | 0 | 0 | 0 |

Description

RETI is used to return from the current interrupt level. The fetch PC is loaded with the contents of GPILR when the current interrupt level is one of the General Purpose interrupts. The fetch PC is loaded with the contents of DBGILR when the current interrupt level is the Debug Interrupt.

NOTE: The LVL field of the SCRO contains the current interrupt level.

See also RETIcc.

Syntax/Operation

| Instruction | Operands | Operation |
|---|---|---|
| RETI | *<none>* | PC ←GPILR (if SCR0.LVL=GPI)<br>PC ←DBGILR (if SCR0.LVL=DBG) |

Arithmetic Flags Affected
None

Cycles: 2

RETIcc - Return from Interrupt on Condition

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | 0 | 0 | 0 | CtrlCC | | | | | 0 | 0 | 0 | 0 | 0 | 0 | 0 | 0 | 0 | 0 | 0 | 0 | 0 | 0 | 0 | 0 | 0 |

Description
RETIcc is used to conditionally return from the current interrupt level. The fetch PC is loaded with the contents of GPILR when the current interrupt level is one of the General Purpose interrupts and the specified condition is true. The fetch PC is loaded with the contents of DBGILR when the current interrupt level is the Debug Interrupt and the specified condition is true.

NOTE: The LVL field of the SCRO contains the current interrupt level.

See also RETI.

Syntax/Operation

| Instruction | Operands | Operation |
|---|---|---|
| RETIZ (RETIEQ) | *<none>* | PC ←GPILR if (SCR0.LVL=GPI && (Z=1)<br>PC ←DBGILR if (SCR0.LVL=DBG && (Z=1) |
| RETINZ (RETINE) | *<none>* | PC ←GPILR if (SCR0.LVL=GPI && (Z=0)<br>PC ←DBGILR if (SCR0.LVL=DBG && (Z=0) |
| RETIHI | *<none>* | PC ←GPILR if (SCR0.LVL=GPI && ((C=1) && (Z=0))<br>PC ←DBGILR if (SCR0.LVL=DBG && ((C=1) && (Z=0)) |
| RETIHS (RETICS) | *<none>* | PC ←GPILR if (SCR0.LVL=GPI && (C=1)<br>PC ←DBGILR if (SCR0.LVL=DBG && (C=1) |
| RETILO (RETICC) | *<none>* | PC ←GPILR if (SCR0.LVL=GPI && (C=0)<br>PC ←DBGILR if (SCR0.LVL=DBG && (C=0) |
| RETILS | *<none>* | PC ←GPILR if (SCR0.LVL=GPI && ((C=0) \|\| (Z=1))<br>PC ←DBGILR if (SCR0.LVL=DBG && ((C=0) \|\| (Z=1)) |
| RETIVS | *<none>* | PC ←GPILR if (SCR0.LVL=GPI && (V=1)<br>PC ←DBGILR if (SCR0.LVL=DBG && (V=1) |
| RETIVC | *<none>* | PC ←GPILR if (SCR0.LVL=GPI && (V=0)<br>PC ←DBGILR if (SCR0.LVL=DBG && (V=0) |
| RETIPOS | *<none>* | PC ←GPILR if (SCR0.LVL=GPI && ((N=0) && (Z=0))<br>PC ←DBGILR if (SCR0.LVL=DBG && ((N=0) && (Z=0)) |
| RETINEG | *<none>* | PC ←GPILR if (SCR0.LVL=GPI && (N=1)<br>PC ←DBGILR if (SCR0.LVL=DBG && (N=1) |
| RETIGE | *<none>* | PC ←GPILR if (SCR0.LVL=GPI && (N=V)<br>PC ←DBGILR if (SCR0.LVL=DBG && (N=V) |
| RETIGT | *<none>* | PC ←GPILR if (SCR0.LVL=GPI && ((Z=0) && (N=V))<br>PC ←DBGILR if (SCR0.LVL=DBG && ((Z=0) && (N=V)) |
| RETILE | *<none>* | PC ←GPILR if (SCR0.LVL=GPI && ((Z=1) \|\| (N != V))<br>PC ←DBGILR if (SCR0.LVL=DBG && ((Z=1) \|\| (N != V)) |
| RETILT | *<none>* | PC ←GPILR if (SCR0.LVL=GPI && (N != V)<br>PC ←DBGILR if (SCR0.LVL=DBG && (N != V) |
| T.RETI | *<none>* | PC ←GPILR if (SCR0.LVL=GPI && (F0=1)<br>PC ←DBGILR if (SCR0.LVL=DBG && (F0=1) |
| F.RETI | *<none>* | PC ←GPILR if (SCR0.LVL=GPI && (F0=0)<br>PC ←DBGILR if (SCR0.LVL=DBG && (F0=0) |

Arithmetic Flags Affected
None

Cycles: 3 (regardless of whether RETI occurs or not)

SYSCALL - System Call

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | 0 | 0 | 0 | CtrlCC | | | | | 0 | 0 | 0 | 0 | 0 | 0 | 0 | 0 | 0 | 0 | 0 | 0 | Vector | | | | |

Description

The address of the instruction immediately following SYSCALL is saved in the General-Purpose Interrupt Link Register (GPILR) and the PC is loaded with the specified *Vector* from the System Vector Table. The System Vector Table contains 32 vectors numbered from 0 to 31. Each vector contains a 32-bit address used as the target of a SYSCALL.

Syntax/Operation

| Instruction | Operands | Operation |
|---|---|---|
| SYSCALL | Vector | GPISR ←SCR0<br>GPILR ←PC + 1<br>PC ←SysVecTbl[Vector]$_{word}$<br>SCR0.GPIE ←0 |

Arithmetic Flags Affected

None

Cycles: 2

SVC - Simulator/Verilog Control

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | 0 | 0 | 0 | 0 | Rt/Rs | | | | | Rx | | | | | SvcOp | | | | | | | | 0 | 0 | 0 |

Description
This instruction is only valid for use with the BOPS Software Instruction Simulator or Hardware Verilog Simulator. It is used for testing and debug purposes. This instruction should be followed by three NOP instructions when used at the end of a program.
SVC is a macro for SVC.S.

Syntax/Operation

| Instruction | Operands | Operation |
|---|---|---|
| SVC.S | Rt, Rx, SVC_HALT | Halt the simulator.<br>Rt and Rx are unused. |

Arithmetic Flags Affected
None

Cycles: 1

```
ASCII-CSV DUMP FORMAT {Keys are: dmp, reg, mem, vim}
---------------------
dmp, cycle[cycleNum], [configuration], r[release], [timestamp]
reg, p[planeNum], c[clusterNum], [sp pe[peNum]], r[regNum],       0xHHHHHHHH
mem, p[planeNum], c[clusterNum], [sp pe[peNum]], mem[memAddr], [lengthInBytes], 0xHH
vim, p[planeNum], c[clusterNum], [sp pe[peNum]], vim[vimAddr], [su]0xHHHHHHHH,
[lu]0xHHHHHHHH, [alu]0xHHHHHHHH, [mau]0xHHHHHHHH, [dsu]0xHHHHHHHH

where:
[cycleNum]       = Decimal number of cycle being dumped
[configuration]  = One of {ManArray, Manta, ...}
[release]        = Release number of form "MM.mm" where 'MM' is major release number and
'mm' is minor release number
[timestamp]      = Date/time in form "YY.MM.DD, HH:MM:SS" where
                   'YY'= year (00-99), 'MM'= month (01-12), 'DD'= day (01-31)
                   'HH'= hour (00-23), 'MM'= minute (00-59), 'SS'= seconds (00-59)
[planeNum]       = Decimal number of plane (must be 0 for now)
[clusterNum]     = Decimal number of cluster (must be 0 for now)
[peNum]          = Decimal number of PE (0-3)
[regNum]         = Decimal number of register (0-63)
[memAddr]        = Decimal number of memory address (0-MAX_SP/PE_MEM-1)
[lengthInBytes]  = Decimal number specifying number of memory bytes dumped (1-
MAX_SP/PE_MEM)
[vimAddr]        = Decimal number of VIM address (0-95)


ASCII-CSV DUMP ALL EXAMPLE:
--------------------------
dmp, cycle1, Manta, r0.68, 99.02.17, 12:38:45
reg, p0, c0, sp, r0, 0x00000000
...
reg, p0, c0, sp, r63, 0x01010101
mem, p0, c0, sp, mem0, 16, 0x00, 0x00, 0x00, 0x00, 0x00, 0x00, 0x00, 0x00, 0x00, 0x00,
0x00, 0x00, 0x00, 0x00, 0x00, 0x00
...
mem, p0, c0, sp, mem8176, 16, 0x00, 0x00, 0x00, 0x00, 0x00, 0x00, 0x00, 0x00, 0x00, 0x00,
0x00, 0x00, 0x00, 0x00, 0x00, 0x00
vim, p0, c0, sp, vim0, 0x00000000, 0x00000000, 0x00000000, 0x00000000, 0x00000000
...
vim, p0, c0, sp, vim95, 0x00000000, 0x00000000, 0x00000000, 0x00000000, 0x00000000
reg, p0, c0, pe0, r0, 0x00000000
...
reg, p0, c0, pe0, r63, 0x01010101
mem, p0, c0, pe0, mem0, 16, 0x00, 0x00, 0x00, 0x00, 0x00, 0x00, 0x00, 0x00, 0x00, 0x00,
0x00, 0x00, 0x00, 0x00, 0x00, 0x00
...
mem, p0, c0, pe0, mem4080, 16, 0x00, 0x00, 0x00, 0x00, 0x00, 0x00, 0x00, 0x00, 0x00,
0x00, 0x00, 0x00, 0x00, 0x00, 0x00, 0x00
```

```
vim, p0, c0, pe0, vim0, 0x00000000, 0x00000000, 0x00000000, 0x00000000, 0x00000000
...
vim, p0, c0, pe0, vim95, 0x00000000, 0x00000000, 0x00000000, 0x00000000, 0x00000000
reg, p0, c0, pe1, r0, 0x00000000
...
reg, p0, c0, pe1, r63, 0x01010101
mem, p0, c0, pe1, mem0, 16, 0x00, 0x00, 0x00, 0x00, 0x00, 0x00, 0x00, 0x00, 0x00, 0x00,
0x00, 0x00, 0x00, 0x00, 0x00, 0x00
...
mem, p0, c0, pe1, mem4080, 16, 0x00, 0x00, 0x00, 0x00, 0x00, 0x00, 0x00, 0x00, 0x00,
0x00, 0x00, 0x00, 0x00, 0x00, 0x00, 0x00
vim, p0, c0, pe1, vim0, 0x00000000, 0x00000000, 0x00000000, 0x00000000, 0x00000000
...
vim, p0, c0, pe1, vim95, 0x00000000, 0x00000000, 0x00000000, 0x00000000, 0x00000000
reg, p0, c0, pe2, r0, 0x00000000
...
reg, p0, c0, pe2, r63, 0x01010101
mem, p0, c0, pe2, mem0, 16, 0x00, 0x00, 0x00, 0x00, 0x00, 0x00, 0x00, 0x00, 0x00, 0x00,
0x00, 0x00, 0x00, 0x00, 0x00, 0x00
...
mem, p0, c0, pe2, mem4080, 16, 0x00, 0x00, 0x00, 0x00, 0x00, 0x00, 0x00, 0x00, 0x00,
0x00, 0x00, 0x00, 0x00, 0x00, 0x00, 0x00
vim, p0, c0, pe2, vim0, 0x00000000, 0x00000000, 0x00000000, 0x00000000, 0x00000000
...
vim, p0, c0, pe2, vim95, 0x00000000, 0x00000000, 0x00000000, 0x00000000, 0x00000000
reg, p0, c0, pe3, r0, 0x00000000
...
reg, p0, c0, pe3, r63, 0x01010101
mem, p0, c0, pe3, mem0, 16, 0x00, 0x00, 0x00, 0x00, 0x00, 0x00, 0x00, 0x00, 0x00, 0x00,
0x00, 0x00, 0x00, 0x00, 0x00, 0x00
...
mem, p0, c0, pe3, mem4080, 16, 0x00, 0x00, 0x00, 0x00, 0x00, 0x00, 0x00, 0x00, 0x00,
0x00, 0x00, 0x00, 0x00, 0x00, 0x00, 0x00
vim, p0, c0, pe3, vim0, 0x00000000, 0x00000000, 0x00000000, 0x00000000, 0x00000000
...
vim, p0, c0, pe3, vim95, 0x00000000, 0x00000000, 0x00000000, 0x00000000, 0x00000000


BINARY DUMP FORMAT {All values are dumped in big-endian format}
--------------------------------------------------------------

DMP Record:
byte  0:       [dmpRecord]         0x00
bytes 1-4:     [cycleNum]          0xHHHHHHHH
bytes 5-6:     [configuration]     0xHHHH       {0x0000=ManArray, 0x0001=Manta}
byte  7:       [majorReleaseNum]   0xHH
byte  8:       [minorReleaseNum]   0xHH
bytes 9-12:    [timestamp]         0xHHHHHHHH   { This is the number returned from the
Standard C-library time() function }

REG Record:
byte  0:       [regRecord]         0x01
byte  1:       [planeNum]          0xHH
byte  2:       [clusterNum]        0xHH
byte  3:       [spPeNum]           0xHH         { 0xFF=SP, 0x00=PE0, 0x01=PE1, 0x02=PE2,
0x03=PE3 }
byte  4:       [regNum]            0xHH         { 0x00 = Reg1, 0x3f = Reg63 }
byte  5:       [regCount]          0xHH         { must be number in range 0x01-0x40 }
bytes 6-9:     [regValueA]         0xHHHHHHHH   { value of register regNum }
bytes 10-13:   [regValueB]         0xHHHHHHHH   { value of register regNum+1 }
...   ...      ...                 ...            ...

MEM Record:
byte  0:       [memRecord]         0x02
byte  1:       [planeNum]          0xHH
byte  2:       [clusterNum]        0xHH
byte  3:       [spPeNum]           0xHH         { 0xFF=SP, 0x00=PE0, 0x01=PE1, 0x02=PE2,
0x03=PE3 }
bytes 4-7:     [memAddr]           0xHHHHHHHH
bytes 8-11:    [lengthInBytes]     0xHHHHHHHH   { must be greater than 0 }
byte  12:      [memByteA]          0xHH         { value of byte at memAddr }
byte  13:      [memByteB]          0xHH         { value of byte at memAddr+1 }
```

```
...   ...      ...              ...          ...

VIM Record:
byte  0:     [vimRecord]        0x03
byte  1:     [planeNum]         0xHH
byte  2:     [clusterNum]       0xHH
byte  3:     [spPeNum]          0xHH       { 0xFF=SP, 0x00=PE0, 0x01=PE1, 0x02=PE2,
0x03=PE3 }
bytes 4-7:   [vimAddr]          0xHHHHHHHH
bytes 8-11:  [vimCount]         0xHHHHHHHH { must be greater than 0 }
bytes 12-15: [vimSuSlotA]       0xHHHHHHHH { SU  instr slot of VIM at vimAddr }
bytes 16-19: [vimLuSlotA]       0xHHHHHHHH { LU  instr slot of VIM at vimAddr }
bytes 20-23: [vimAluSlotA]      0xHHHHHHHH { ALU instr slot of VIM at vimAddr }
bytes 24-27: [vimMauSlotA]      0xHHHHHHHH { MAU instr slot of VIM at vimAddr }
bytes 28-31: [vimDsuSlotA]      0xHHHHHHHH { DSU instr slot of VIM at vimAddr }
bytes 32-35: [vimSuSlotB]       0xHHHHHHHH { SU  instr slot of VIM at vimAddr+1 }
bytes 36-39: [vimLuSlotB]       0xHHHHHHHH { LU  instr slot of VIM at vimAddr+1 }
bytes 40-43: [vimAluSlotB]      0xHHHHHHHH { ALU instr slot of VIM at vimAddr+1 }
bytes 44-47: [vimMauSlotB]      0xHHHHHHHH { MAU instr slot of VIM at vimAddr+1 }
bytes 48-51: [vimDsuSlotB]      0xHHHHHHHH { DSU instr slot of VIM at vimAddr+1 }
...   ...      ...              ...          ...


BINARY DUMP EXAMPLE(S)
-----------------------------------------------------------------------------------------
--------------------------

Example-1
---------
Given:
Dump from PE2 on plane-0 cluster-0 on a Manta Release 0.68 of a Register
Cycle number is 7
Timestamp value is 0x12345677
R1 = 0x11111111
                                                     1  1  1
                          0  1  2  3  4  5  6  7  8  9  0  1  2
                         ---------------------------------------
DMP Record (13-bytes):  |00|00 00 00 07|00 01|00|44|12 34 56 77|
                        |---------------------------------------
REG Record (10-bytes):  |01|00|00|02|01|01|11 11 11 11|
                         ------------------------------
    Total  (23-bytes)


Example-2
---------
Given:
Dump from PE2 on plane-0 cluster-0 on a Manta Release 0.68 of a Memory word
Cycle number is 8
Timestamp value is 0x12345678
SP MEMORY at address 0x00000022 is 0x33445566
                                                     1  1  1  1  1  1
                          0  1  2  3  4  5  6  7  8  9  0  1  2  3  4  5
                         ---------------------------------------
DMP Record (13-bytes):  |00|00 00 00 08|00 01|00 44|12 34 56 78|
                        |------------------------------------------------
MEM Record (16-bytes):  |02|00|00|02|00 00 00 22|00 00 00 04|33 44 55 66|
                        |------------------------------------------------
    Total  (29-bytes)


Example-3
---------
Given:
Dump requested from PE2 on plane-0 cluster-0 on a Manta Release 0.68 of a VIM
Cycle number is 9
Timestamp value is 0x12345679
VIM at address 4 is 0xAAAAAAAA{SU} 0xBBBBBBBB{LU} 0xCCCCCCCC{ALU} 0xDDDDDDDD{MAU}
0xEEEEEEEE{DSU}

                                                     1  1  1  1  1  1  1  1  1  1  2  2
2  2  2  2  2  2  2  2  3  3
```

```
                    0  1  2  3  4  5  6  7  8  9  0  1  2  3  4  5  6  7  8  9  0  1
2  3  4  5  6  7  8  9  0  1
                    --------------------------------------------
DMP Record (13-bytes): |00|00 00 00 09|00 01|00 44|12 34 56 79|
                    ----------------------------------------------------------------
-----------------------------
VIM Record (32-bytes): |03|00|00|02|00 00 00 04|00 00 00 01|AA AA AA AA|BB BB BB BB|CC CC
CC CC|DD DD DD DD|EE EE EE EE|
                    ----------------------------------------------------------------
-----------------------------
    Total   (45-bytes)
```

BOPS, Inc.

VLIW - VLIW Instructions

LV Load/Disable VLIW

SETV Set VLIW State

XV Execute VLIW

LV - Load/Disable VLIW

BOPS, Inc. - Manta SYSSIM 2.31

Encoding

| 31 30 | 29 | 28 27 26 25 | 24 | 23 22 | 21 20 19 18 | 17 | 16 | 15 | 14 | 13 | 12 | 11 | 10 | 9 | 8 | 7 6 5 4 3 2 1 0 |
|---|---|---|---|---|---|---|---|---|---|---|---|---|---|---|---|---|
| Group | S/P | CtrlOp | E/D | UAF | InstrCnt | 0 | 0 | 0 | SU | LU | ALU | MAU | DSU | Vb | 0 | VIMOFFS |

Description

LV is used to load individual instruction slots of the specified SP or PE VLIW Memory (VIM). The VIM address is computed as the sum of a base VIM address register *Vb* (V0 or V1) plus an unsigned 8-bit offset *VIMOFFS*. The VIM address must be in the valid range for your hardware configuration otherwise the operation of this instruction is undefined.

Any combination of individual instruction slots may be disabled via the disable slot parameter 'D={SLAMD}', where S=Store Unit (SU), L=Load Unit (LU), A=Arithmetic Logic Unit (ALU), M=Multiply-Accumulate Unit (MAU) and D=Data Select Unit (DSU). A blank 'D=' parameter does not disable any slots. An instruction loaded into a slot marked by the disable slot parameter remains disabled when loaded.

The number of instructions to load are specified via the *InstrCnt* parameter. Valid values are 1-5. The next *InstrCnt* instructions following LV are loaded into the specified VIM. An instruction loaded into a slot not marked by the disable slot parameter above is enabled when loaded.

The Unit Affecting Flags (UAF) parameter 'F=[AMDN]' selects which arithmetic unit (A=ALU, M=MAU, D=DSU) is allowed to set condition flags for the specified VIM when it is executed. 'F=N' specifies that none of the arithmetic units are allowed to set condition flags. A blank 'F=' selects the ALU instruction slot.

Syntax/Operation

| Instruction | Operands | Operation |
|---|---|---|
| LV.[SP] | V[01], VIMOFFS, InstrCnt, D={SLAMD}, F=[AMDN] | (V[01]+VIMOFFS)[SU].enable ←0 if (D=S)<br>(V[01]+VIMOFFS)[LU].enable ←0 if (D=L)<br>(V[01]+VIMOFFS)[ALU].enable ←0 if (D=A)<br>(V[01]+VIMOFFS)[MAU].enable ←0 if (D=M)<br>(V[01]+VIMOFFS)[DSU].enable ←0 if (D=D)<br><br>(V[01]+VIMOFFS)[UAF] ←ALU if (F=A or F=)<br>(V[01]+VIMOFFS)[UAF] ←MAU if (F=M)<br>(V[01]+VIMOFFS)[UAF] ←DSU if (F=D)<br>(V[01]+VIMOFFS)[UAF] ←None if (F=N)<br><br>for (i=0; i< InstrCnt; i++) {<br>Load instruction into (V[01]+VIMOFFS)<br>if (SU Instr AND D != S) { (V[01]+VIMOFFS)[SU].enable ←1 }<br>if (LU Instr AND D != L) { (V[01]+VIMOFFS)[LU].enable ←1 }<br>if (ALU Instr AND D != A) { (V[01]+VIMOFFS)[ALU].enable ←1 }<br>if (MAU Instr AND D != M) { (V[01]+VIMOFFS)[MAU].enable ←1 }<br>if (DSU Instr AND D != D) { (V[01]+VIMOFFS)[DSU].enable ←1 }<br>} |

Arithmetic Flags Affected

None

Cycles: 1 + Number of instructions loaded (*InstrCnt*)

Pipeline Considerations

The LV instruction causes the pipeline to transition from Extended Pipeline (EP) state to Normal Pipeline (NP) state.

Restrictions/Warnings

1. If multiple simplex instructions are loaded into the same instruction slot, the last instruction loaded is the one that remains.

2. If multiple simplex instructions in a VLIW have the same target registers, the results of those instructions when executed are indeterminate. The example below produces indeterminate results because the ADD and SUB instructions each have R4 as a target register.

```
                                    ! This Example is syntactically correct. See key
lv.p          v0, 2, 3, d=, f=
lbrii.p.w     r1, a1+, 4
sub.pm.1w     r4, r0, r10     ! <- Same target register as ADD
```

```
add.pa.1w   r4, r2, r3      ! <- Same target register as SUB
```

3. Load and Store instructions that share the same address register with pre/post increment/decrement, are in fact, targeting the same address register for update. The resulting value in the address register is indeterminate. The example below produces an indeterminate value in address register *A5*.

```
                            ! This Example is syntactically correct. See key
lv.s     v0, 20, 2, d=, f=
lii.s.w  r1, a5+, 1         ! <- Same address register as SII
sii.s.w  r2, a5-, 1         ! <- Same address register as LII
```

4. If a Load instruction and a Store instruction use the same register as target and source, and the same memory location as source and target, both the Load and the Store operation execute in a single cycle. The simultaneous load operation of a value from a memory location to a register and the store operation of a different value from the same register to the same memory location is the equivalent of a Swap operation.

```
                            ! This Example is syntactically correct. See key
lv.s         v0, 20, 2, d=, f=
lii.s.w      r1, a1+, 1
sii.s.w      r1, a1+, 1
xv.s         V0, 20, e=sl, f=
```

Examples

| | |
|---|---|
| `lim.s.h0 VAR, 0` | Load VIM base address register v0 with a zero (beginning of VIM) |
| `lv.s v0, 0, 5, d=, f=` | Load VLIW memory at SP VIM Address 0 with the next five simplex instructions that follow. No instruction slots are disabled. ALU is defaulted to set condition flags for this VLIW. |
| `lv.s v0, 31, 3, d=a, f=m` | Load VLIW memory at SP VIM Address 31 with the next three simplex instructions that follow. The ALU slot is disabled. MAU is selected to set condition flags for this VLIW. |
| `lv.p v0, 15, 3, d=s, f=d` | Load VLIW memory in all enabled PE VIMs at Address 15 with the next three simplex instructions that follow. The SU slot is disabled. DSU is selected to set condition flags for this VLIW. |

SETV - Set VLIW Slot State

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | E/D | UAF | | 0 | 0 | 0 | 0 | 0 | 0 | 0 | SU | LU | ALU | MAU | DSU | Vb | 0 | VIMOFFS | | | | | | | |

Description

SETV is used to set the enable/disable state of individual instruction slots of the specified SP or PE VLIW Memory (VIM). The VIM address is computed as the sum of a base VIM address register *Vb* (V0 or V1) plus an unsigned 8-bit offset *VIMOFFS*. The VIM address must be in the valid range for your hardware configuration otherwise the operation of this instruction is undefined.

Any combination of individual instruction slots may be enabled via the enable slot parameter 'E={SLAMD}', where S=Store Unit (SU), L=Load Unit (LU), A=Arithmetic Logic Unit (ALU), M=Multiply-Accumulate Unit (MAU) and D=Data Select Unit (DSU). Any slot not enabled via this parameter is disabled. A blank 'E=' disables all slots.

The Unit Affecting Flags (UAF) parameter 'F=[AMDN]' selects which arithmetic unit (A=ALU, M=MAU, D=DSU) is allowed to set condition flags for the specified VIM when it is executed. 'F=N' specifies that none of the arithmetic units are allowed to set condition flags. A blank 'F=' selects the ALU instruction slot.

Syntax/Operation

| Instruction | Operands | Operation |
|---|---|---|
| SETV.[SP] | V[01], VIMOFFS, E={SLAMD}, F=[AMDN] | (V[01]+VIMOFFS)[SU].enable ←1 if (E=S), else 0<br>(V[01]+VIMOFFS)[LU].enable ←1 if (E=L), else 0<br>(V[01]+VIMOFFS)[ALU].enable ←1 if (E=A), else 0<br>(V[01]+VIMOFFS)[MAU].enable ←1 if (E=M), else 0<br>(V[01]+VIMOFFS)[DSU].enable ←1 if (E=D), else 0<br><br>(V[01]+VIMOFFS)[UAF] ←ALU if (F=A or F=)<br>(V[01]+VIMOFFS)[UAF] ←MAU if (F=M)<br>(V[01]+VIMOFFS)[UAF] ←DSU if (F=D)<br>(V[01]+VIMOFFS)[UAF] ←None if (F=N) |

Arithmetic Flags Affected

None

Cycles: 1

Pipeline Considerations

The SETV instruction causes the pipeline to transition from Extended Pipeline (EP) state to Normal Pipeline (NP) state.

Restrictions/Warnings

An XV instruction immediately following a SETV instruction accessing the same VIM will not pick up the new enable/disable settings of the SETV. A one instruction filler is necessary.

XV - Execute VLIW

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | VX | UAF | | 0 | 0 | 0 | 0 | 0 | 0 | 0 | SU | LU | ALU | MAU | DSU | Vb | 0 | VimOffs | | | | | | | |

Description
XV is used to execute an Indirect VLIW (iVLIW). The iVLIWs that are available for execution by the XV instruction are stored at individual addresses of the specified SP or PE VLIW Memory (VIM). The VIM address is computed as the sum of a base VIM address register *Vb* (V0 or V1) plus an unsigned 8-bit offset *VIMOFFS*. The VIM address must be in the valid range for your hardware configuration otherwise the operation of this instruction is undefined.

Any combination of individual instruction slots may be executed via the execute slot parameter 'E={SLAMD}', where S=Store Unit (SU), L=Load Unit (LU), A=Arithmetic Logic Unit (ALU), M=Multiply-Accumulate Unit (MAU), D=Data Select Unit (DSU). A blank 'E=' parameter does not execute any slots.

The Unit Affecting Flags (UAF) parameter 'F=[AMDN]' overrides the UAF specified for the VLIW when it was loaded via the LV instruction. The override selects which arithmetic instruction slot (A=ALU, M=MAU, D=DSU) or none (N=NONE) is allowed to set condition flags for this execution of the VLIW. The override does not affect the UAF setting specified via the LV instruction. A blank 'F=' selects the UAF specified when the VLIW was loaded.

Syntax/Operation

| Instruction | Operands | Operation |
|---|---|---|
| XV.[SP] | V[01], VIMOFFS, E={SLAMD}, F=[AMDN] | Execute (V[01]+VIMOFFS)[SU] if (E=S)<br>Execute (V[01]+VIMOFFS)[LU] if (E=L)<br>Execute (V[01]+VIMOFFS)[ALU] if (E=A)<br>Execute (V[01]+VIMOFFS)[MAU] if (E=M)<br>Execute (V[01]+VIMOFFS)[DSU] if (E=D)<br><br>(V[01]+VIMOFFS)[UAF] ←ALU if (F= or F=A)<br>(V[01]+VIMOFFS)[UAF] ←MAU if (F=M)<br>(V[01]+VIMOFFS)[UAF] ←DSU if (F=D)<br>(V[01]+VIMOFFS)[UAF] ←None if (F=N) |

Arithmetic Flags Affected
Condition Flags are set by the individual simplex instruction in the slot specified by the setting of 'F=' parameter from the original LV instruction or as overridden by a 'F=[AMD]' parameter in the XV instruction. Condition flags are not affected when 'F=N'.

Cycles: 1

Restrictions/Warnings
An XV instruction immediately following a SETV instruction accessing the same VIM will not pick up the new enable/disable settings of the SETV. A one instruction filler is necessary.

Pipeline Considerations
The XV instruction causes the pipeline to transition from Normal Pipeline (NP) state to Extended Pipeline (EP) state. A one-cycle delay occurs when this transition takes place. *Note: If the pipeline is already in EP state, there is no one-cycle delay.* The pipeline transitions from EP state to NP state upon executing any of the following instructions:

```
CALL    CALLD    CALLI    JMP    JMPD    JMPI    EPLOOP   RET    LV
CALLcc  CALLDcc  CALLIcc  JMPcc  JMPDcc  JMPIcc  EPLOOPI  RETcc  SETV
```

Programmers should keep the number of transitions between NP state and EP state to a minimum in program segments that are heavily executed. In addition, pipeline considerations must be taken into account based upon the individual simplex instructions in each of the slots that are executed.

For details see State Transitions between the Instruction-Processing States.

Examples

| | |
|---|---|
| `lim.s.h0 VAR, 0` | Load VIM base address register v0 with a zero (beginning of VIM) |
| `xv.s v0, 0, e=slamd, f=` | Execute unconditionally all simplex instructions contained in the VLIW at SP VIM Address 0. Condition flags are updated by the unit specified in the LV instruction. |

| | |
|---|---|
| `xv.p v0, 5, e=lam, f=n` | On each unmasked PE, execute unconditionally the instructions in the LU, ALU, and MAU slots of the VLIW at PE VIM Address 5. No condition flags are updated. |
| `xv.s v0, 31, e=as, f=a` | Execute unconditionally the instructions in the ALU and SU slots of the VLIW at SP VIM Address 31. Condition flags are updated by the ALU. |
| `xv.s v0, 5, e=, f=` | This instruction is a NOP because no instruction slots are specified to execute. |

SU - Store Unit Instructions

BOPS, Inc. - Manta SYSSIM 2.31

Load/Store Instruction Pipeline Restrictions

SBD Store Base + Displacement

SD Store Direct

SI Store Indirect with Scaled Update

SII Store Indirect with Scaled Immediate Update

SIU Store Indirect with Unscaled Update

SIUI Store Indirect with Unscaled Immediate Update

SMX Store Modulo Indexed with Scaled Update

SMXU Store Modulo Indexed with Unscaled Update

SSPR Store to Special-purpose Register

STBL Store to Table

Load/Store Instruction Pipeline Considerations and Restrictions

Table of Contents

1 - General Pipeline Considerations for Load/Store Instructions

1.1 - Load/Store Instructions Check the ACFs in Decode
1.2 - Load/Store Instructions Perform Address Generation in Decode

2 - Restrictions to Specific Load/Store Instructions

2.1 - Pipeline Restrictions for Indirect Addressing Instructions
2.2 - Pipeline Restrictions for Load-Address Instructions

3 - Other Restrictions

3.1 - Simultaneous Load/Copy to MRF

1 - General Pipeline Considerations for Load/Store Instructions

1.1 - Load/Store Instructions Check the ACFs in Decode

A conditionally executing Load/Store instruction checks the ACFs in the decode stage of the pipeline. Therefore the condition generated by the instruction that executed 2 cycles preceding the L/S instruction (one cycle before the L/S instruction enters the decode stage of the pipeline) determines whether that instruction executes.

Example 1 - arithmetic instructions check the ACFs in execute:
In cycle 4, `AddZ` goes through the execute phase of the pipeline and makes its condition flags available. In the next cycle, `T.Copy` enters the execute phase and checks the condition flags set by `AddZ` to determine whether to execute.

| Cycles | Fetch | Decode | Execute | CR |
|---|---|---|---|---|
| 1 | SubN | | | |
| 2 | AddZ | SubN | | |
| 3 | T.Copy | AddZ | SubN | |
| 4 | | T.Copy | AddZ | SubN |
| 5 | | | T.Copy | AddZ |
| 6 | | | | ?T.Copy? |

Example 2 - L/S instructions check the ACFs in decode:
In cycle 3, `SubN` goes through the execute phase of the pipeline and makes its condition flags available. In cycle 4, `T.Lim` checks the condition flags while in decode. Therefore it is going to determine whether to execute based on the flags made available by `SubN`. The flags generated by `AddZ` are available in cycle 5. `T.Lim` will not use these flags.

| Cycles | Fetch | Decode | Execute | CR |
|---|---|---|---|---|
| 1 | SubN | | | |
| 2 | AddZ | SubN | | |
| 3 | T.Lim | AddZ | SubN | |
| 4 | | T.Lim | AddZ | SubN |
| 5 | | | ?T.Lim? | AddZ |
| 6 | | | | ?T.Lim? |

1.2 - Load/Store Instructions Perform Address Generation in Decode

For address generation, Load/Store instructions read the value of the address register (An) in the DECODE stage of the pipe. Programmers must ensure that the address register (An) used by Load/Store instruction contains the intended value at the DECODE stage in the pipe.

Example 1

```
LIM.S.W    An, 0x100        ! An <- 0x100 in DECODE
SI.S.W     Rt, ±An, RzAz    ! SI.S.W uses 0x100 because LIM works in DECODE also
```

| Cycles | Fetch | Decode | Execute | CR |
|---|---|---|---|---|
| 1 | LIM.S.W | | | |
| 2 | SI.S.W | LIM.S.W | | |
| 3 | | SI.S.W | LIM.S.W | |
| 4 | | | SI.S.W | LIM.S.W |
| 5 | | | | SI.S.W |

Example 2

```
LIM.S.W    An, 0x100        ! An <- 0x100 in DECODE
LBD.S.W    An, An, 0x10     ! An <- Mem[0x110] in EXECUTE
SBD.S.W    Rt, An, SDISP13  ! Uses value of 0x100 not value loaded by LBD instruction
```

| Cycles | Fetch | Decode | Execute | CR |
|---|---|---|---|---|
| 1 | LIM.S.W | | | |
| 2 | LBD.S.W | LIM.S.W | | |
| 3 | SBD.S.W | LBD.S.W | LIM.S.W | |
| 4 | | SBD.S.W | LBD.S.W | LIM.S.W |
| 5 | | | SBD.S.W | LBD.S.W |
| 6 | | | | SBD.S.W |

2 - Restrictions to Specific Load/Store Instructions

2.1 - Pipeline Restrictions for Indirect Addressing Instructions

ADDA, SUBA, LAI, LAIU, LATBL, LBRI, LBRIU, LBRTBL, LTBL, LI, LIU, SI, SIU and STBL instructions differ from all other LU and SU instructions in that they access the Address Register File (ARF) and the Compute Register File (CRF) simultaneously. The CRF access always occurs via the Store Unit (SU). For this reason the following programming considerations apply:

1. A one-cycle delay is required between an instruction that updates a CRF register and the use of the new register value as a source operand in one of the above load or store instructions.
2. Any combination of ADDA, SUBA, LAI, LAIU, LATBL, LBRI, LBRIU, LBRTBL, LTBL, LI, LIU, SI, SIU and STBL must not be executed from the same VLIW when using the compute-register update value forms of the instructions.
3. A Store instruction that reads a compute register in execute (S_1 in example below) should NOT be immediately followed by a Load/Store instruction that reads a compute register in decode (L/S_2 in example below).

Example:
Error: In cycle 3, S_1 goes through the execute phase of the pipeline and attempts to read the value of a compute register. At the same time, L/S_2 attempts to read the value of a compute register while in decode.

| Cycles | Fetch | Decode | Execute | CR |
|---|---|---|---|---|
| 1 | S_1 | | | |
| 2 | L/S_2 | S_1 | | |
| 3 | | L/S_2 | S_1 | |
| 4 | | | L/S_2 | S_1 |
| 5 | | | | L/S_2 |

S_1: Any Store instruction.
L/S_2: Any of the following Load/Store instructions: ADDA, SUBA, LAI, LAIU, LATBL, LBRI, LBRIU, LBRTBL, LTBL, LI, LIU, SI, SIU or STBL.

2.2 - Pipeline Restrictions for Load-Address Instructions

Like all Load/Store instructions, Load-Address (LAxx) instructions perform address generation during the decode phase of the pipeline. However, LAxx instructions write to MRF registers during the execute phase. That means:

- When LAxx targets any ARF register, the write occurs during the decode phase.
- When LAxx targets any MRF register, the write occurs during the execute phase.

---

3 - Other Restrictions

3.1 - Simultaneous Load/Copy to MRF

Due to the number of available MRF write ports, it is not possible to simultaneously load and copy values to the Miscellaneous Register File (MRF).

See also Processor Registers.

---

SBD - Store Base + Displacement

BOPS, Inc. - Manta SYSSIM 2.31

Encoding

| 31 30 | 29 | 28 | 27 26 25 | 24 | 23 22 | 21 | 20 19 18 17 | 16 | 15 14 13 | 12 11 10 9 8 7 6 5 4 3 2 1 0 |
|---|---|---|---|---|---|---|---|---|---|---|
| Group | S/P | L/S | 010 | CE1 | Size | 0 | Rt | | An | LSDISP13 |
| | | | | | | 0 | Rte | 0 | | |
| | | | | | | AtMRt | | | | |

Description
Store a byte, halfword, word, or doubleword operand to SP memory from an SP source register or to PE local memory from a PE source register. The operand effective address is the sum of address register *An* and a signed 13-bit displacement *LSDISP13*.

Syntax/Operation

| Instruction | Operands | Operation |
|---|---|---|
| | | Store Compute Register |
| SBD.[SP].D | Rte, An, LSDISP13 | Rto\|\|Rte ←Mem[An + LSDISP13]$_{dword}$ |
| SBD.[SP].W | Rt, An, LSDISP13 | Rt ←Mem[An + LSDISP13]$_{word}$ |
| SBD.[SP].H0 | Rt, An, LSDISP13 | Rt.H0 ←Mem[An + LSDISP13]$_{hword}$ |
| SBD.[SP].B0 | Rt, An, LSDISP13 | Rt.B0 ←Mem[An + LSDISP13]$_{byte}$ |
| T.SBD.[SP].[DWHB] | Rt, An, LSDISP13 | Do operation only if T condition is satisfied in F0 |
| | | Store ARF/MRF Register |
| SBD.[SP].W | AtMRt, An, LSDISP13 | AtMRt ←Mem[An + LSDISP13]$_{word}$ |
| SBD.[SP].[H0H1] | AtMRt, An, LSDISP13 | AtMRt.Hx ←Mem[An + LSDISP13]$_{hword}$ (Hx=H0 or H1) |
| T.SBD.[SP].[WH0H1] | AtMRt, An, LSDISP13 | Do operation only if T condition is satisfied in F0 |

NOTE: AtMRt is any register except a compute register.
Doubleword access must align on doubleword boundaries.

Arithmetic Flags Affected
None

Cycles: 1

Pipeline Considerations
See Load/Store Instruction Pipeline Considerations.

SD - Store Direct

BOPS, Inc. - Manta SYSSIM 2.31

Encoding

| 31 30 | 29 | 28 | 27 26 25 | 24 | 23 22 | 21 20 19 18 17 16 | 15 14 13 12 11 10 9 8 7 6 5 4 3 2 1 0 |
|---|---|---|---|---|---|---|---|
| Group | S/P | L/S | 011 | CE1 | Size | 0 \| Rt | UADDR16 |
| | | | | | | 0 \| Rte \| 0 | |
| | | | | | | AtMRt | |

Description
Store a byte, halfword, word, or doubleword operand to SP memory from an SP source register or to PE local memory from a PE source register. The operand effective address is created by zero-extending the 16-bit direct address *UADDR16* to 32-bits.

Syntax/Operation

| Instruction | Operands | Operation |
|---|---|---|
| | | Store Compute Register |
| SD.[SP].D | Rte, UADDR16 | Rto\|\|Rte ←Mem[UADDR16]$_{dword}$ |
| SD.[SP].W | Rt, UADDR16 | Rt ←Mem[UADDR16]$_{word}$ |
| SD.[SP].H0 | Rt, UADDR16 | Rt.H0 ←Mem[UADDR16]$_{hword}$ |
| SD.[SP].B0 | Rt, UADDR16 | Rt.B0 ←Mem[UADDR16]$_{byte}$ |
| T.SD.[SP].[DWH0B0] | Rt, UADDR16 | Do operation only if T condition is satisfied in F0 |
| | | Store ARF/MRF Register |
| SD.[SP].W | AtMRt, UADDR16 | AtMRt ←Mem[UADDR16]$_{word}$ |
| SD.[SP].[H0H1] | AtMRt, UADDR16 | AtMRt.Hx ←Mem[UADDR16]$_{hword}$ (Note: Hx=H0 or H1) |
| T.SD.[SP].[WH0H1] | AtMRt, UADDR16 | Do operation only if T condition is satisfied in F0 |

NOTE: AtMRt is any register except a compute register.
Doubleword access must align on doubleword boundaries.

Arithmetic Flags Affected
None

Cycles: 1

Pipeline Considerations
See Load/Store Instruction Pipeline Considerations.

SI - Store Indirect with Scaled Update

BOPS, Inc. - Manta SYSSIM 2.31

Encoding

<table>
<tr><td>31 30</td><td>29</td><td>28</td><td>27 26</td><td>25</td><td>24</td><td>23 22</td><td>21</td><td>20 19 18 17</td><td>16</td><td>15 14 13</td><td>12</td><td>11</td><td>10</td><td>9</td><td>8</td><td>7</td><td>6</td><td>5</td><td>4 3 2 1 0</td></tr>
<tr><td rowspan="2">Group</td><td rowspan="2">S/P</td><td rowspan="2">L/S</td><td rowspan="2" colspan="2">101</td><td rowspan="2">CE1</td><td rowspan="2">Size</td><td>0</td><td colspan="2">Rt</td><td rowspan="2">An</td><td rowspan="2">Brcst</td><td rowspan="2">Sign Ext</td><td rowspan="2">Scale</td><td rowspan="2">Pre/ Post</td><td rowspan="2">Dec/ Inc</td><td rowspan="2">Imm/ Rt =1</td><td rowspan="2">Updt An =1</td><td rowspan="2">Rz/ Az</td><td rowspan="2">Rz</td></tr>
<tr><td>0</td><td>Rte</td><td>0</td></tr>
<tr><td colspan="4">AtMRt</td><td>0</td><td>0</td><td colspan="2">Az</td><td colspan="12"></td></tr>
</table>

Description

Store a byte, halfword, word, or doubleword operand to SP memory from an SP source register or to PE local memory from a PE source register. Source address register *An* is updated prior to (pre-decrement/pre-increment) or after (post-decrement/post-increment) its use as the operand effective address. The update to *An* is an addition or subtraction of compute register *Rz* or address register *Az* scaled by the size of the operand being loaded (i.e. no scale for a byte, 2 for a halfword, 4 for a word, or 8 for a doubleword).

Syntax/Operation (pre-decrement / pre-increment)

| Instruction | Operands | Operation |
|---|---|---|
| | | Store Compute Register |
| SI.[SP].D | Rte, ±An, RzAz | An ←An ± (RzAz * 8)<br>Rto\|\|Rte ←Mem[An]$_{dword}$ |
| SI.[SP].W | Rt, ±An, RzAz | An ←An ± (RzAz * 4)<br>Rt ←Mem[An]$_{word}$ |
| SI.[SP].H0 | Rt, ±An, RzAz | An ←An ± (RzAz * 2)<br>Rt.H0 ←Mem[An]$_{hword}$ |
| SI.[SP].B0 | Rt, ±An, RzAz | An ←An ± RzAz<br>Rt.B0 ←Mem[An]$_{byte}$ |
| T.SI.[SP].[DWH0B0] | Rt, ±An, RzAz | Do operation only if T condition is satisfied in F0 |
| | | Store ARF/MRF Register |
| SI.[SP].W | AtMRt, ±An, RzAz | An ←An ± (RzAz * 4)<br>AtMRt ←Mem[An]$_{word}$ |
| SI.[SP].[H0H1] | AtMRt, ±An, RzAz | An ←An ± (RzAz * 2)<br>AtMRt.Hx ←Mem[An]$_{hword}$ (Note: Hx=H0 or H1) |
| T.SI.[SP].[WH0H1] | AtMRt, ±An, RzAz | Do operation only if T condition is satisfied in F0 |

NOTE: AtMRt is any register except a compute register.
NOTE: RzAz is any address or compute register
Doubleword access must align on doubleword boundaries.

Syntax/Operation (post-decrement / post-increment)

| Instruction | Operands | Operation |
|---|---|---|
| | | Store Compute Register |
| SI.[SP].D | Rte, An±, RzAz | Rto\|\|Rte ←Mem[An]$_{dword}$<br>An ←An ± (RzAz * 8) |
| SI.[SP].W | Rt, An±, RzAz | Rt ←Mem[An]$_{word}$<br>An ←An ± (RzAz * 4) |
| SI.[SP].H0 | Rt, An±, RzAz | Rt.H0 ←Mem[An]$_{hword}$<br>An ←An ± (RzAz * 2) |
| SI.[SP].B0 | Rt, An±, RzAz | Rt.B0 ←Mem[An]$_{byte}$<br>An ←An ± RzAz |
| T.SI.[SP].[DWH0B0] | Rt, An±, RzAz | Do operation only if T condition is satisfied in F0 |
| | | Store ARF/MRF Register |
| SI.[SP].W | AtMRt, An±, RzAz | AtMRt ←Mem[An]$_{word}$<br>An ←An ± (RzAz * 4) |
| SI.[SP].[H0H1] | AtMRt, An±, RzAz | AtMRt.Hx ←Mem[An]$_{hword}$ (Note: Hx=H0 or H1)<br>An ←An ± (RzAz * 2) |
| T.SI.[SP].[WH0H1] | AtMRt, An±, RzAz | Do operation only if T condition is satisfied in F0 |

NOTE: AtMRt is any register except a compute register.
NOTE: RzAz is any address or compute register
Doubleword access must align on doubleword boundaries.

Arithmetic Flags Affected

None

Cycles: 1

Pipeline Considerations
See Load/Store Instruction Pipeline Considerations and Load/Store Indirect Addressing Mode restrictions.

---

SII - Store Indirect with Scaled Immediate Update

BOPS, Inc. - Manta SYSSIM 2.31

Encoding

| 31 30 | 29 | 28 | 27 26 25 | 24 | 23 22 | 21 20 19 18 17 16 | 15 14 13 | 12 | 11 | 10 | 9 | 8 | 7 | 6 5 4 3 2 1 0 |
|---|---|---|---|---|---|---|---|---|---|---|---|---|---|---|
| Group | S/P | L/S | 101 | CE1 | Size | 0 Rt<br>0 Rte 0<br>AtMRt | An | Brcst | Sign Ext | Scale | Pre/ Post | Dec/ Inc | Imm/ Rt =0 | UPDATE7 |

Description
Store a byte, halfword, word, or doubleword operand to SP memory from an SP source register or to PE local memory from a PE source register. Source address register An is updated prior to (pre-decrement/pre-increment) or after (post-decrement/post-increment) its use as the operand effective address. The update to *An* is an addition or subtraction of the unsigned 7-bit update value *UPDATE7* scaled by the size of the operand being loaded (i.e. no scale for a byte, 2 for a halfword, 4 for a word, or 8 for a doubleword).

Syntax/Operation (pre-decrement / pre-increment)

| Instruction | Operands | Operation |
|---|---|---|
| | | Store Compute Register |
| SII.[SP].D | Rte, ±An, UPDATE7 | An ←An ± (UPDATE7 * 8)<br>Rto\|\|Rte ←$\text{Mem[An]}_{dword}$ |
| SII.[SP].W | Rt, ±An, UPDATE7 | An ←An ± (UPDATE7 * 4)<br>Rt ←$\text{Mem[An]}_{word}$ |
| SII.[SP].H0 | Rt, ±An, UPDATE7 | An ←An ± (UPDATE7 * 2)<br>Rt.H0 ←$\text{Mem[An]}_{hword}$ |
| SII.[SP].B0 | Rt, ±An, UPDATE7 | An ←An ± UPDATE7<br>Rt.B0 ←$\text{Mem[An]}_{byte}$ |
| T.SII.[SP].[DWH0B0] | Rt, ±An, UPDATE7 | Do operation only if T condition is satisfied in F0 |
| | | Store ARF/MRF Register |
| SII.[SP].W | AtMRt, ±An, UPDATE7 | An ←An ± (UPDATE7 * 4)<br>AtMRt ←$\text{Mem[An]}_{word}$ |
| SII.[SP].[H0H1] | AtMRt, ±An, UPDATE7 | An ←An ± (UPDATE7 * 2)<br>AtMRt.Hx ←$\text{Mem[An]}_{hword}$ (Note: Hx=H0 or H1) |
| T.SII.[SP].[WH0H1] | AtMRt, ±An, UPDATE7 | Do operation only if T condition is satisfied in F0 |

NOTE: AtMRt is any register except a compute register.
Doubleword access must align on doubleword boundaries.

Syntax/Operation (post-decrement / post-increment)

| Instruction | Operands | Operation |
|---|---|---|
| | | Store Compute Register |
| SII.[SP].D | Rte, An± , UPDATE7 | Rto\|\|Rte ←$\text{Mem[An]}_{dword}$<br>An ←An ± (UPDATE7 * 8) |
| SII.[SP].W | Rt, An± , UPDATE7 | Rt ←$\text{Mem[An]}_{word}$<br>An ←An ± (UPDATE7 * 4) |
| SII.[SP].H0 | Rt, An± , UPDATE7 | Rt.H0 ←$\text{Mem[An]}_{hword}$<br>An ←An ± (UPDATE7 * 2) |
| SII.[SP].B0 | Rt, An± , UPDATE7 | Rt.B0 ←$\text{Mem[An]}_{byte}$<br>An ←An ± UPDATE7 |
| T.SII.[SP].[DWH0B0] | Rt, An± , UPDATE7 | Do operation only if T condition is satisfied in F0 |
| | | Store ARF/MRF Register |
| SII.[SP].W | AtMRt, An± , UPDATE7 | AtMRt ←$\text{Mem[An]}_{word}$<br>An ←An ± (UPDATE7 * 4) |
| SII.[SP].[H0H1] | AtMRt, An± , UPDATE7 | AtMRt.Hx ←$\text{Mem[An]}_{hword}$ (Note: Hx=H0 or H1)<br>An ←An ± (UPDATE7 * 2) |
| T.SII.[SP].[WH0H1] | AtMRt, An± , UPDATE7 | Do operation only if T condition is satisfied in F0 |

NOTE: AtMRt is any register except a compute register.
Doubleword access must align on doubleword boundaries.

Arithmetic Flags Affected
None

Cycles: 1

Pipeline Considerations
See Load/Store Instruction Pipeline Considerations.

---

SIU - Store Indirect with Unscaled Update

BOPS, Inc. - Manta SYSSIM 2.31

Encoding

| 31 30 | 29 | 28 | 27 26 25 | 24 | 23 22 | 21 | 20 19 18 17 16 | 15 14 13 | 12 | 11 | 10 | 9 | 8 | 7 | 6 | 5 | 4 3 2 1 0 |
|---|---|---|---|---|---|---|---|---|---|---|---|---|---|---|---|---|---|
| Group | S/P | L/S | 101 | CE1 | Size | 0 | Rt | An | Brcst | Sign Ext | Scale | Pre/ Post | Dec/ Inc | Imm/ Rt =1 | Updt An =1 | Rz/ Az | Rz |
| | | | | | | 0 | Rte 0 | | | | | | | | | | |
| AtMRt | | | 0 | 0 | Az | | | | | | | | | | | | |

Description

Store a byte, halfword, word, or doubleword operand to SP memory from an SP source register or to PE local memory from a PE source register. Source address register *An* is updated prior to (pre-decrement/pre-increment) or after (post-decrement/post-increment) its use as the operand effective address. The update to *An* is an addition or subtraction of the compute register *Rz* or address register *Az*.

Syntax/Operation (pre-decrement / pre-increment)

| Instruction | Operands | Operation |
|---|---|---|
| | | Store Compute Register |
| SIU.[SP].D | Rte, ±An, RzAz | An ←An ± RzAz<br>Rto‖Rte ← $Mem[An]_{dword}$ |
| SIU.[SP].W | Rt, ±An, RzAz | An ←An ± RzAz<br>Rt ←$Mem[An]_{word}$ |
| SIU.[SP].H0 | Rt, ±An, RzAz | An ←An ± RzAz<br>Rt.H0 ←$Mem[An]_{hword}$ |
| SIU.[SP].B0 | Rt, ±An, RzAz | An ←An ± RzAz<br>Rt.B0 ←$Mem[An]_{byte}$ |
| T.SIU.[SP].[DWH0B0] | Rt, ±An, RzAz | Do operation only if T condition is satisfied in F0 |
| | | Store ARF/MRF Register |
| SIU.[SP].W | AtMRt, ±An, RzAz | An ←An ± RzAz<br>AtMRt ←$Mem[An]_{word}$ |
| SIU.[SP].[H0H1] | AtMRt, ±An, RzAz | An ←An ± RzAz<br>AtMRt.Hx ←$Mem[An]_{hword}$ (Note: Hx=H0 or H1) |
| T.SIU.[SP].[WH0H1] | AtMRt, ±An, RzAz | Do operation only if T condition is satisfied in F0 |

NOTE: AtMRt is any register except a compute register.
NOTE: RzAz is any address or compute register.
Doubleword access must align on doubleword boundaries.

Syntax/Operation (post-decrement / post-increment)

| Instruction | Operands | Operation |
|---|---|---|
| | | Store Compute Register |
| SIU.[SP].D | Rte, An±, RzAz | Rto‖Rte ←$Mem[An]_{dword}$<br>An ←An ± RzAz |
| SIU.[SP].W | Rt, An±, RzAz | Rt ←$Mem[An]_{word}$<br>An ←An ± RzAz |
| SIU.[SP].H0 | Rt, An±, RzAz | Rt.H0 ←$Mem[An]_{hword}$<br>An ←An ± RzAz |
| SIU.[SP].B0 | Rt, An±, RzAz | Rt.B0 ←$Mem[An]_{byte}$<br>An ←An ± RzAz |
| T.SIU.[SP].[DWH0B0] | Rt, An±, RzAz | Do operation only if T condition is satisfied in F0 |
| | | Store ARF/MRF Register |
| SIU.[SP].W | AtMRt, An±, RzAz | AtMRt ←$Mem[An]_{word}$<br>An ←An ± RzAz |
| SIU.[SP].[H0H1] | AtMRt, An±, RzAz | AtMRt.Hx ←$Mem[An]_{hword}$ (Note: Hx=H0 or H1)<br>An ←An ± RzAz |
| T.SIU.[SP].[WH0H1] | AtMRt, An±, RzAz | Do operation only if T condition is satisfied in F0 |

NOTE: AtMRt is any register except a compute register.
NOTE: RzAz is any address or compute register.
Doubleword access must align on doubleword boundaries.

Arithmetic Flags Affected

None

Cycles: 1

Pipeline Considerations
See Load/Store Instruction Pipeline Considerations and Load/Store Indirect Addressing Mode restrictions.

---

SIUI - Store Indirect with Unscaled Immediate Update

BOPS, Inc. - Manta SYSSIM 2.31

Encoding

| 31 30 | 29 | 28 | 27 26 25 | 24 | 23 22 | 21 20 19 18 17 16 | 15 14 13 | 12 | 11 | 10 | 9 | 8 | 7 | 6 5 4 3 2 1 0 |
|---|---|---|---|---|---|---|---|---|---|---|---|---|---|---|
| Group | S/P | L/S | 101 | CE1 | Size | 0 Rt<br>0 Rte 0<br>AtMRt | An | Brcst | Sign Ext | Scale | Pre/ Post | Dec/ Inc | Imm/ Rt =0 | UPDATE7 |

Description
Store a byte, halfword, word, or doubleword operand to SP memory from an SP source register or to PE local memory from a PE source register. Source address register *An* is updated prior to (pre-decrement/pre-increment) or after (post-decrement/post-increment) its use as the operand effective address. The update to *An* is an addition or subtraction of the unsigned 7-bit update value UPDATE7.

Syntax/Operation (pre-decrement / pre-increment)

| Instruction | Operands | Operation |
|---|---|---|
| | | Load Compute Register |
| SIUI.[SP].D | Rte, ±An, UPDATE7 | An ←An ± UPDATE7<br>Rto\|\|Rte ← Mem[An]$_{dword}$ |
| SIUI.[SP].W | Rt, ±An, UPDATE7 | An ←An ± UPDATE7<br>Rt ←Mem[An]$_{word}$ |
| SIUI.[SP].H0 | Rt, ±An, UPDATE7 | An ←An ± UPDATE7<br>Rt.H0 ←Mem[An]$_{hword}$ |
| SIUI.[SP].B0 | Rt, ±An, UPDATE7 | An ←An ± UPDATE7<br>Rt.B0 ←Mem[An]$_{byte}$ |
| T.SIUI.[SP].[DWH0B0] | Rt, ±An, UPDATE7 | Do operation only if T condition is satisfied in F0 |
| | | Load ARF/MRF Register |
| SIUI.[SP].W | AtMRt, ±An, UPDATE7 | An ←An ± UPDATE7<br>AtMRt ←Mem[An]$_{word}$ |
| SIUI.[SP].[H0H1] | AtMRt, ±An, UPDATE7 | An ←An ± UPDATE7<br>AtMRt.Hx ←Mem[An]$_{hword}$ (Note: Hx=H0 or H1) |
| T.SIUI.[SP].[WH0H1] | AtMRt, ±An, UPDATE7 | Do operation only if T condition is satisfied in F0 |

NOTE: AtMRt is any register except a compute register.
Doubleword access must align on doubleword boundaries.

Syntax/Operation (post-decrement / post-increment)

| Instruction | Operands | Operation |
|---|---|---|
| | | Load Compute Register |
| SIUI.[SP].D | Rte, An±, UPDATE7 | Rto\|\|Rte ←Mem[An]$_{dword}$<br>An ←An ± UPDATE7 |
| SIUI.[SP].W | Rt, An±, UPDATE7 | Rt ←Mem[An]$_{word}$<br>An ←An ± UPDATE7 |
| SIUI.[SP].H0 | Rt, An±, UPDATE7 | Rt.H0 ←Mem[An]$_{hword}$<br>An ←An ± UPDATE7 |
| SIUI.[SP].B0 | Rt, An±, UPDATE7 | Rt.B0 ←Mem[An]$_{byte}$<br>An ←An ± UPDATE7 |
| T.SIUI.[SP].[DWH0B0] | Rt, An±, UPDATE7 | Do operation only if T condition is satisfied in F0 |
| | | Load ARF/MRF Register |
| SIUI.[SP].W | AtMRt, An±, UPDATE7 | AtMRt ←Mem[An]$_{word}$<br>An ←An ± UPDATE7 |
| SIUI.[SP].[H0H1] | AtMRt, An±, UPDATE7 | AtMRt.Hx ←Mem[An]$_{hword}$ (Note: Hx=H0 or H1)<br>An ←An ± UPDATE7 |
| T.SIUI.[SP].[WH0H1] | AtMRt, An±, UPDATE7 | Do operation only if T condition is satisfied in F0 |

NOTE: AtMRt is any register except a compute register.
Doubleword access must align on doubleword boundaries.

Arithmetic Flags Affected
None

Cycles: 1

Pipeline Considerations
See Load/Store Instruction Pipeline Considerations.

---

SMX - Store Modulo Indexed with Scaled Update

BOPS, Inc. - Manta SYSSIM 2.31

Encoding

| 31 30 | 29 | 28 | 27 26 25 | 24 | 23 22 | 21 20 19 18 17 16 | 15 14 | 13 | 12 | 11 | 10 | 9 | 8 7 | 6 5 4 3 | 2 1 | 0 |
|---|---|---|---|---|---|---|---|---|---|---|---|---|---|---|---|---|
| Group | S/P | L/S | 100 | CE1 | Size | 0 Rt / 0 Rte 0 / AtMRt | Ae | Mod/Long | Brcst | Sign Ext | Scale | Pre-Dec/Post Inc | UPDATE7[2:1] | UPDATE7[6:3] | Ao | UPDATE7[0] |

Description

Store a byte, halfword, word, or doubleword operand to SP memory from an SP source register or to PE local memory from a PE source register. Even address register *Ae* contains a 32-bit base address of a memory buffer. The high halfword of odd address register *Ao* contains an unsigned 16-bit value representing the memory buffer size in bytes (This is the modulo value). The low halfword of *Ao* is an unsigned 16-bit index into the buffer.

The index value is updated prior to (pre-decrement) or after (post-increment) its use in forming the operand effective address. A pre-decrement update involves subtracting the unsigned 7-bit update value *UPDATE7* scaled by the size of the operand being loaded (i.e. no scale for a byte, 2 for a halfword, 4 for a word, or 8 for a doubleword) from the index. If the resulting index becomes negative, the modulo value is added to the index. A post-increment update involves adding the scaled *UPDATE7* to the index. If the resulting index is greater than or equal to the memory buffer size (modulo value), the memory buffer size is subtracted from the index. The effect of the index update is that the index moves a scaled *UPDATE7* bytes forward or backward within the memory buffer.

The operand effective address is the sum of the base address and the index.

Syntax/Operation (pre-decrement)

| Instruction | Operands | Operation |
|---|---|---|
| | | Store Compute Register |
| SMX.[SP].D | Rte, Ae, -Ao, UPDATE7 | Ao.H0 ←Ao.H0 - (UPDATE7 * 8)<br>if (Ao.H0 < 0)<br>Ao.H0 ←Ao.H0 + Ao.H1<br>Rto\|\|Rte ←Mem[Ae + Ao.H0]$_{dword}$ |
| SMX.[SP].W | Rt, Ae, -Ao, UPDATE7 | Ao.H0 ←Ao.H0 - (UPDATE7 * 4)<br>if (Ao.H0 < 0)<br>Ao.H0 ←Ao.H0 + Ao.H1<br>Rt ←Mem[Ae +Ao.H0]$_{word}$ |
| SMX.[SP].H0 | Rt, Ae, -Ao, UPDATE7 | Ao.H0 ←Ao.H0 - (UPDATE7 * 2)<br>if (Ao.H0 < 0)<br>Ao.H0 ←Ao.H0 + Ao.H1<br>Rt.H0 ←Mem[Ae + Ao.H0]$_{hword}$ |
| SMX.[SP].B0 | Rt, Ae, -Ao, UPDATE7 | Ao.H0 ←Ao.H0 - UPDATE7<br>if (Ao.H0 < 0)<br>Ao.H0 ←Ao.H0 + Ao.H1<br>Rt.B0 ←Mem[Ae + Ao.H0]$_{byte}$ |
| T.SMX.[SP].[DWH0B0] | Rt, Ae, -Ao, UPDATE7 | Do operation only if T condition is satisfied in F0 |
| | | Store ARF/MRF Register |
| SMX.[SP].W | AtMRt, Ae, -Ao, UPDATE7 | Ao.H0 ←Ao.H0 - (UPDATE7 * 4)<br>if (Ao.H0 < 0)<br>Ao.H0 ←Ao.H0 + Ao.H1<br>AtMRt ←Mem[Ae + Ao.H0]$_{word}$ |
| SMX.[SP].[H0H1] | AtMRt, Ae, -Ao, UPDATE7 | Ao.H0 ←Ao.H0 - (UPDATE7 * 2)<br>if (Ao.H0 < 0)<br>Ao.H0 ←Ao.H0 + Ao.H1<br>AtMRt.Hx ←Mem[Ae + Ao.H0]$_{hword}$ (Note: Hx=H0 or H1) |
| T.SMX.[SP].[WH0H1] | AtMRt, Ae, -Ao, UPDATE7 | Do operation only if T condition is satisfied in F0 |

NOTE: AtMRt is any register except a compute register.
Doubleword access must align on doubleword boundaries.

Syntax/Operation (post-increment)

| Instruction | Operands | Operation |
|---|---|---|
| | | Store Compute Register |
| SMX.[SP].D | Rte, Ae, Ao+, UPDATE7 | Rto\|\|Rte ←Mem[Ae + Ao.H0]$_{dword}$<br>Ao.H0 ←Ao.H0 + (UPDATE7 * 8) |

| | | |
|---|---|---|
| | | if (Ao.H0 >= Ao.H1)<br>Ao.H0 ←Ao.H0 - Ao.H1 |
| SMX.[SP].W | Rt, Ae, Ao+, UPDATE7 | Rt ←Mem[Ae + Ao.H0]$_{word}$<br>Ao.H0 ←Ao.H0 + (UPDATE7 * 4)<br>if (Ao.H0 >= Ao.H1)<br>Ao.H0 ←Ao.H0 - Ao.H1 |
| SMX.[SP].H0 | Rt, Ae, Ao+, UPDATE7 | Rt.H0 ←Mem[Ae + Ao.H0]$_{hword}$<br>Ao.H0 ←Ao.H0 + (UPDATE7 * 2)<br>if (Ao.H0 >= Ao.H1)<br>Ao.H0 ←Ao.H0 - Ao.H1 |
| SMX.[SP].B0 | Rt, Ae, Ao+, UPDATE7 | Rt.B0 ←Mem[Ae + Ao.H0]$_{byte}$<br>Ao.H0 ←Ao.H0 + UPDATE7<br>if (Ao.H0 >= Ao.H1)<br>Ao.H0 ←Ao.H0 - Ao.H1 |
| T.SMX.[SP].[DWH0B0] | Rt, Ae, Ao+, UPDATE7 | Do operation only if T condition is satisfied in F0 |
| | | Store ARF/MRF Register |
| SMX.[SP].W | AtMRt, Ae, Ao+, UPDATE7 | AtMRt ←Mem[Ae + Ao.H0]$_{word}$<br>Ao.H0 ←Ao.H0 + (UPDATE7 * 4)<br>if (Ao.H0 >= Ao.H1)<br>Ao.H0 ←Ao.H0 - Ao.H1 |
| SMX.[SP].[H0H1] | AtMRt, Ae, Ao+, UPDATE7 | AtMRt.Hx ←Mem[Ae + Ao.H0]$_{hword}$ (Note: Hx=H0 or H1)<br>Ao.H0 ←Ao.H0 + (UPDATE7 * 2)<br>if (Ao.H0 >= Ao.H1)<br>Ao.H0 ←Ao.H0 - Ao.H1 |
| T.SMX.[SP].[WH0H1] | AtMRt, Ae, Ao+, UPDATE7 | Do operation only if T condition is satisfied in F0 |

NOTE: AtMRt is any register except a compute register.
Doubleword access must align on doubleword boundaries.

Arithmetic Flags Affected
None

Cycles: 1

Pipeline Considerations
See Load/Store Instruction Pipeline Considerations.

SMXU - Store Modulo Indexed with Unscaled Update

BOPS, Inc. - Manta SYSSIM 2.31

Encoding

| 31 30 | 29 | 28 | 27 26 25 | 24 | 23 22 | 21 20 19 18 17 16 | 15 14 | 13 | 12 | 11 | 10 | 9 | 8 7 | 6 5 4 3 | 2 1 | 0 |
|---|---|---|---|---|---|---|---|---|---|---|---|---|---|---|---|---|
| Group | S/P | L/S | 100 | CE1 | Size | 0 Rt<br>0 Rte 0<br>AtMRt | Ae | Mod/Long | Brcst | Sign Ext | Scale | Pre-Dec/Post Inc | UPDATE7[2:1] | UPDATE7[6:3] | Ao | UPDATE7[0] |

Description
Store a byte, halfword, word, or doubleword operand to SP memory from an SP source register or to PE local memory from a PE source register. Even address register *Ae* contains a 32-bit base address of a memory buffer. The high halfword of odd address register *Ao* contains an unsigned 16-bit value representing the memory buffer size in bytes (This is the modulo value). The low halfword of *Ao* is an unsigned 16-bit index into the buffer.

The index value is updated prior to (pre-decrement) or after (post-increment) its use in forming the operand effective address. A pre-decrement update involves subtracting the unsigned 7-bit update value *UPDATE7* from the index. If the resulting index becomes negative, the modulo value is added to the index. A post-increment update involves adding the *UPDATE7* to the index. If the resulting index is greater than or equal to the memory buffer size (modulo value), the memory buffer size is subtracted from the index. The effect of the index update is that the index moves *UPDATE7* bytes forward or backward within the memory buffer. The operand effective address is the sum of the base address and the index.

Syntax/Operation (pre-decrement)

| Instruction | Operands | Operation |
|---|---|---|
| | | Store Compute Register |
| SMXU.[SP].D | Rte, Ae, -Ao, UPDATE7 | Ao.H0 ←Ao.H0 - UPDATE7<br>if (Ao.H0 < 0)<br>Ao.H0 ←Ao.H0 + Ao.H1<br>Rto‖Rte ←Mem[Ae + Ao.H0]$_{dword}$ |
| SMXU.[SP].W | Rt, Ae, -Ao, UPDATE7 | Ao.H0 ←Ao.H0 - UPDATE7<br>if (Ao.H0 < 0)<br>Ao.H0 ←Ao.H0 + Ao.H1<br>Rt ←Mem[Ae +Ao.H0]$_{word}$ |
| SMXU.[SP].H0 | Rt, Ae, -Ao, UPDATE7 | Ao.H0 ←Ao.H0 - UPDATE7<br>if (Ao.H0 < 0)<br>Ao.H0 ←Ao.H0 + Ao.H1<br>Rt.H0 ←Mem[Ae + Ao.H0]$_{hword}$ |
| SMXU.[SP].B0 | Rt, Ae, -Ao, UPDATE7 | Ao.H0 ←Ao.H0 - UPDATE7<br>if (Ao.H0 < 0)<br>Ao.H0 ←Ao.H0 + Ao.H1<br>Rt.B0 ←Mem[Ae + Ao.H0]$_{byte}$ |
| T.SMXU.[SP].[DWH0B0] | Rt, Ae, -Ao, UPDATE7 | Do operation only if T condition is satisfied in F0 |
| | | Store ARF/MRF Register |
| SMXU.[SP].W | AtMRt, Ae, -Ao, UPDATE7 | Ao.H0 ←Ao.H0 - UPDATE7<br>if (Ao.H0 < 0)<br>Ao.H0 ←Ao.H0 + Ao.H1<br>AtMRt ←Mem[Ae + Ao.H0]$_{word}$ |
| SMXU.[SP].[H0H1] | AtMRt, Ae, -Ao, UPDATE7 | Ao.H0 ←Ao.H0 - UPDATE7<br>if (Ao.H0 < 0)<br>Ao.H0 ←Ao.H0 + Ao.H1<br>AtMRt.Hx ←Mem[Ae + Ao.H0]$_{hword}$ (Note: Hx=H0 or H1) |
| T.SMXU.[SP].[WH0H1] | AtMRt, Ae, -Ao, UPDATE7 | Do operation only if T condition is satisfied in F0 |

NOTE: AtMRt is any register except a compute register.
Doubleword access must align on doubleword boundaries.

Syntax/Operation (post-increment)

| Instruction | Operands | Operation |
|---|---|---|
| | | Store Compute Register |
| SMXU.[SP].D | Rte, Ae, Ao+, UPDATE7 | Rto‖Rte ←Mem[Ae + Ao.H0]$_{dword}$<br>Ao.H0 ←Ao.H0 + UPDATE7<br>if (Ao.H0 >= Ao.H1)<br>Ao.H0 ←Ao.H0 - Ao.H1 |

| | | |
|---|---|---|
| SMXU.[SP].W | Rt, Ae, Ao+, UPDATE7 | Rt ←Mem[Ae + Ao.H0]$_{word}$<br>Ao.H0 ←Ao.H0 + UPDATE7<br>if (Ao.H0 >= Ao.H1)<br>Ao.H0 ←Ao.H0 - Ao.H1 |
| SMXU.[SP].H0 | Rt, Ae, Ao+, UPDATE7 | Rt.H0 ←Mem[Ae + Ao.H0]$_{hword}$<br>Ao.H0 ←Ao.H0 + UPDATE7<br>if (Ao.H0 >= Ao.H1)<br>Ao.H0 ←Ao.H0 - Ao.H1 |
| SMXU.[SP].B0 | Rt, Ae, Ao+, UPDATE7 | Rt.B0 ←Mem[Ae + Ao.H0]$_{byte}$<br>Ao.H0 ←Ao.H0 + UPDATE7<br>if (Ao.H0 >= Ao.H1)<br>Ao.H0 ←Ao.H0 - Ao.H1 |
| T.SMXU.[SP].[DWH0B0] | Rt, Ae, Ao+, UPDATE7 | Do operation only if T condition is satisfied in F0 |
| | | Store ARF/MRF Register |
| SMXU.[SP].W | AtMRt, Ae, Ao+, UPDATE7 | AtMRt ←Mem[Ae + Ao.H0]$_{word}$<br>Ao.H0 ←Ao.H0 + UPDATE7<br>if (Ao.H0 >= Ao.H1)<br>Ao.H0 ←Ao.H0 - Ao.H1 |
| SMXU.[SP].[H0H1] | AtMRt, Ae, Ao+, UPDATE7 | AtMRt.Hx ←Mem[Ae + Ao.H0]$_{hword}$ (Note: Hx=H0 or H1)<br>Ao.H0 ←Ao.H0 + UPDATE7<br>if (Ao.H0 >= Ao.H1)<br>Ao.H0 ←Ao.H0 - Ao.H1 |
| T.SMXU.[SP].[WH0H1] | AtMRt, Ae, Ao+, UPDATE7 | Do operation only if T condition is satisfied in F0 |

NOTE: AtMRt is any register except a compute register.
Doubleword access must align on doubleword boundaries.

Arithmetic Flags Affected
None

Cycles: 1

Pipeline Considerations
See Load/Store Instruction Pipeline Considerations.

STBL - Store to Table

BOPS, Inc. - Manta SYSSIM 2.31

Encoding

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="2" rowspan="3">Group</td><td rowspan="3">S/P</td><td rowspan="3">L/S</td><td colspan="3" rowspan="3">101</td><td rowspan="3">CE1</td><td colspan="2" rowspan="3">Size</td><td>0</td><td colspan="5">Rt</td><td colspan="3" rowspan="3">An</td><td rowspan="3">Brcst</td><td rowspan="3">Sign Ext</td><td rowspan="3">Scale =1</td><td rowspan="3">S/D =0</td><td rowspan="3">Dec/ Inc</td><td rowspan="3">Imm/ Reg =1</td><td rowspan="3">Updt An =0</td><td rowspan="3">Rz/ Az</td><td colspan="5" rowspan="2">Rz</td></tr>
<tr><td>0</td><td colspan="4">Rte</td><td>0</td></tr>
<tr><td colspan="6">AtMRt</td><td>0</td><td>0</td><td colspan="3">Az</td></tr>
</table>

Description

Store a byte, halfword or word from a source register into a table of elements in memory. Source address register *An* contains the base address of the table. Compute register *Rz* or address register *Az* contains the unsigned index of the element to store. The index can be specified to be added to or subtracted from the base address.

Syntax/Operation

| Instruction | Operands | Operation |
|---|---|---|
| | | Store Compute Register |
| STBL.[SP].D | Rte, An, ±RzAz | Rto\|\|Rte ←Mem[An ± (RzAz * 8)]$_{dword}$ |
| STBL.[SP].W | Rt, An, ±RzAz | Rt ←Mem[An ± (RzAz * 4)]$_{word}$ |
| STBL.[SP].H0 | Rt, An, ±RzAz | Rt.H0 ←Mem[An ± (RzAz * 2)]$_{hword}$ |
| STBL.[SP].B0 | Rt, An, ±RzAz | Rt.B0 ←Mem[An ± RzAz]$_{byte}$ |
| T.STBL.[SP].[DWH0B0] | Rt, An, ±RzAz | Do operation only if T condition is satisfied in F0 |
| | | Store ARF/MRF Register |
| STBL.[SP].W | AtMRt, An, ±RzAz | AtMRt ←Mem[An ± (RzAz * 4)]$_{word}$ |
| STBL.[SP].[H0H1] | AtMRt, An, ±RzAz | AtMRt.Hx ←Mem[An ± (RzAz * 2)]$_{hword}$ (Note: Hx=H0 or H1) |
| T.STBL.[SP].[WH0H1] | AtMRt, An, ±RzAz | Do operation only if T condition is satisfied in F0 |

NOTE: AtMRt is any register except a compute register.
NOTE: RzAz is any address or compute register.
Doubleword access must align on doubleword boundaries.

Arithmetic Flags Affected

None

Cycles: 1

Pipeline Considerations

See Load/Store Instruction Pipeline Considerations and Load/Store Indirect Addressing Mode restrictions.

LU - Load Unit Instructions

Load/Store Instruction Pipeline Restrictions

| | |
|---|---|
| ADDA | Add Address |
| COPYA | Copy Address |
| LA | Load Address PC-Relative |
| LABD | Load Address Base + Displacement |
| LATBL | Load Address of Table Item |
| LBD | Load Base + Displacement |
| LBRxx | Load Broadcast Instructions Overview |
| LBRI | Load Broadcast Indirect with Scaled Update |
| LBRII | Load Broadcast Indirect with Scaled Immediate Update |
| LBRIU | Load Broadcast Indirect with Unscaled Update |
| LBRIUI | Load Broadcast Indirect with Unscaled Immediate Update |
| LBRMX | Load Broadcast Modulo Indexed with Scaled Update |
| LBRMXU | Load Broadcast Modulo Indexed with Unscaled Update |
| LBRTBL | Load Broadcast from Table |
| LD | Load Direct |
| LI | Load Indirect with Scaled Update |
| LII | Load Indirect with Scaled Immediate Update |
| LIM | Load Immediate |
| LIU | Load Indirect with Unscaled Update |
| LIUI | Load Indirect with Unscaled Immediate Update |
| LMX | Load Modulo Indexed with Scaled Update |
| LMXU | Load Modulo Indexed with Unscaled Update |
| LSPR | Load from Special-purpose Register |
| LTBL | Load from Table |
| SUBA | Subtract Address |

Load/Store Instruction Pipeline Considerations and Restrictions

BOPS, Inc. - Manta
SYSSIM 2.31

Table of Contents

1 - General Pipeline Considerations for Load/Store Instructions

1.1 - Load/Store Instructions Check the ACFs in Decode
1.2 - Load/Store Instructions Perform Address Generation in Decode

2 - Restrictions to Specific Load/Store Instructions

2.1 - Pipeline Restrictions for Indirect Addressing Instructions
2.2 - Pipeline Restrictions for Load-Address Instructions

3 - Other Restrictions

3.1 - Simultaneous Load/Copy to MRF

1 - General Pipeline Considerations for Load/Store Instructions

1.1 - Load/Store Instructions Check the ACFs in Decode

A conditionally executing Load/Store instruction checks the ACFs in the decode stage of the pipeline. Therefore the condition generated by the instruction that executed 2 cycles preceding the L/S instruction (one cycle before the L/S instruction enters the decode stage of the pipeline) determines whether that instruction executes.

Example 1 - arithmetic instructions check the ACFs in execute:
In cycle 4, `AddZ` goes through the execute phase of the pipeline and makes its condition flags available. In the next cycle, `T.Copy` enters the execute phase and checks the condition flags set by `AddZ` to determine whether to execute.

| Cycles | Fetch | Decode | Execute | CR |
|---|---|---|---|---|
| 1 | SubN | | | |
| 2 | AddZ | SubN | | |
| 3 | T.Copy | AddZ | SubN | |
| 4 | | T.Copy | AddZ | SubN |
| 5 | | | T.Copy | AddZ |
| 6 | | | | ?T.Copy? |

Example 2 - L/S instructions check the ACFs in decode:
In cycle 3, `SubN` goes through the execute phase of the pipeline and makes its condition flags available. In cycle 4, `T.Lim` checks the condition flags while in decode. Therefore it is going to determine whether to execute based on the flags made available by `SubN`. The flags generated by `AddZ` are available in cycle 5. `T.Lim` will not use these flags.

| Cycles | Fetch | Decode | Execute | CR |
|---|---|---|---|---|
| 1 | SubN | | | |
| 2 | AddZ | SubN | | |
| 3 | T.Lim | AddZ | SubN | |
| 4 | | T.Lim | AddZ | SubN |
| 5 | | | ?T.Lim? | AddZ |
| 6 | | | | ?T.Lim? |

1.2 - Load/Store Instructions Perform Address Generation in Decode

For address generation, Load/Store instructions read the value of the address register (An) in the DECODE stage of the pipe. Programmers must ensure that the address register (An) used by Load/Store instruction contains the intended value at the DECODE stage in the pipe.

Example 1

```
LIM.S.W   An, 0x100       ! An <- 0x100 in DECODE
SI.S.W    Rt, ±An, RzAz   ! SI.S.W uses 0x100 because LIM works in DECODE also
```

| Cycles | Fetch | Decode | Execute | CR |
|---|---|---|---|---|
| 1 | LIM.S.W | | | |
| 2 | SI.S.W | LIM.S.W | | |
| 3 | | SI.S.W | LIM.S.W | |
| 4 | | | SI.S.W | LIM.S.W |
| 5 | | | | SI.S.W |

Example 2

```
LIM.S.W   An, 0x100        ! An <- 0x100 in DECODE
LBD.S.W   An, An, 0x10     ! An <- Mem[0x110] in EXECUTE
SBD.S.W   Rt, An, SDISP13  ! Uses value of 0x100 not value loaded by LBD instruction
```

| Cycles | Fetch | Decode | Execute | CR |
|---|---|---|---|---|
| 1 | LIM.S.W | | | |
| 2 | LBD.S.W | LIM.S.W | | |
| 3 | SBD.S.W | LBD.S.W | LIM.S.W | |
| 4 | | SBD.S.W | LBD.S.W | LIM.S.W |
| 5 | | | SBD.S.W | LBD.S.W |
| 6 | | | | SBD.S.W |

2 - Restrictions to Specific Load/Store Instructions

2.1 - Pipeline Restrictions for Indirect Addressing Instructions

ADDA, SUBA, LAI, LAIU, LATBL, LBRI, LBRIU, LBRTBL, LTBL, LI, LIU, SI, SIU and STBL instructions differ from all other LU and SU instructions in that they access the Address Register File (ARF) and the Compute Register File (CRF) simultaneously. The CRF access always occurs via the Store Unit (SU). For this reason the following programming considerations apply:

1. A one-cycle delay is required between an instruction that updates a CRF register and the use of the new register value as a source operand in one of the above load or store instructions.
2. Any combination of ADDA, SUBA, LAI, LAIU, LATBL, LBRI, LBRIU, LBRTBL, LTBL, LI, LIU, SI, SIU and STBL must not be executed from the same VLIW when using the compute-register update value forms of the instructions.
3. A Store instruction that reads a compute register in execute (S_1 in example below) should NOT be immediately followed by a Load/Store instruction that reads a compute register in decode (L/S_2 in example below).

Example:
Error: In cycle 3, `S_1` goes through the execute phase of the pipeline and attempts to read the value of a compute register. At the same time, `L/S_2` attempts to read the value of a compute register while in decode.

| Cycles | Fetch | Decode | Execute | CR |
|---|---|---|---|---|
| 1 | S_1 | | | |
| 2 | L/S_2 | S_1 | | |
| 3 | | L/S_2 | S_1 | |
| 4 | | | L/S_2 | S_1 |
| 5 | | | | L/S_2 |

S_1: Any Store instruction.
L/S_2: Any of the following Load/Store instructions: ADDA, SUBA, LAI, LAIU, LATBL, LBRI, LBRIU, LBRTBL, LTBL, LI, LIU, SI, SIU or STBL.

2.2 - Pipeline Restrictions for Load-Address Instructions

Like all Load/Store instructions, Load-Address (LAxx) instructions perform address generation during the decode phase of the pipeline. However, LAxx instructions write to MRF registers during the execute phase. That means:

- When LAxx targets any ARF register, the write occurs during the decode phase.
- When LAxx targets any MRF register, the write occurs during the execute phase.

---

3 - Other Restrictions

3.1 - Simultaneous Load/Copy to MRF

Due to the number of available MRF write ports, it is not possible to simultaneously load and copy values to the Miscellaneous Register File (MRF).

See also Processor Registers.

---

ADDA - Add Address

BOPS, Inc. - Manta SYSSIM 2.31

Encoding

| 31 30 | 29 | 28 | 27 26 25 | 24 | 23 | 22 | 21 | 20 | 19 | 18 17 16 | 15 14 13 | 12 | 11 | 10 | 9 | 8 | 7 | 6 | 5 | 4 | 3 | 2 1 0 |
|---|---|---|---|---|---|---|---|---|---|---|---|---|---|---|---|---|---|---|---|---|---|---|
| Group | S/P | L/S | 001 | CE1 | 0 | 0 | 1 | 1 | At/Mt | At / Mt | An | Brcst =0 | Sign Ext =0 | Scale =0 | S/D =0 | Dec/Inc =1 | Imm/Reg =1 | Updt An =0 | Rz/Az | Rz / 0 | Rz / 0 | Rz / Az |

Description

Add source compute register *Rz* or address register *Az* to address register *An* and store the result in target Address Register *At* or Control-Flow Address Register *Mt*.

Syntax/Operation

| Instruction | Operands | Operation |
|---|---|---|
| ADDA.[SP].W | AtMt, An, RzAz | AtMt ←An + RzAz |
| T.ADDA.[SP].W | AtMt, An, RzAz | Do operation only if T condition is satisfied in F0 |

NOTES: RzAz is any address or compute register.
See Field Description of At and Mt for valid SP/PE target registers.

Arithmetic Flags Affected
None

Cycles: 1

Pipeline Considerations

The target address register is loaded in the Decode stage of the pipeline.
See also Load/Store Instruction Pipeline Considerations and Load/Store Indirect Addressing Mode restrictions.

COPYA - Copy Address

BOPS, Inc. - Manta SYSSIM 2.31

Encoding

| 31 30 | 29 | 28 | 27 26 25 | 24 | 23 | 22 | 21 | 20 | 19 | 18 17 16 | 15 14 13 | 12 11 10 9 8 7 6 5 4 3 2 1 0 |
|---|---|---|---|---|---|---|---|---|---|---|---|---|
| Group | S/P | L/S | 001 | CE1 | 0 | 0 | 0 | 1 | At/Mt | At / Mt | An | LSDISP13 |

Description

Copy the source address register *An* to target Address Register *At* or Control-Flow Address Register *Mt*.
NOTE: COPYA is implemented in the assembler as a macro that expands to an LABD instruction with a zero displacement. The BOPS simulator/debugger disassembles COPYA as an LABD instruction.

Syntax/Operation

| Instruction | Operands | Operation |
|---|---|---|
| COPYA.[SP].W | AtMt, An | AtMt ←An |
| T.COPYA.[SP].W | AtMt, An | Do operation only if T condition is satisfied in F0 |

See Field Description of At and Mt for valid SP/PE target registers.

Arithmetic Flags Affected

None

Cycles: 1

Restrictions:

It is not possible to simultaneously load and copy values to the Miscellaneous Register File (MRF)
See also Load/Store Pipeline Restrictions.

Pipeline Considerations

See Load/Store Instruction Pipeline Considerations.

LA - Load Address (PC Relative)

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | L/S | 001 | | | CE1 | 0 | 0 | 0 | 0 | At/Mt | At / Mt | | | SDISP16 | | | | | | | | | | | | | | | |

Description

Load a 32-bit effective address into an SP Address Register *At* or Control-Flow Address Register *Mt.* The effective address is the sum of the current PC and a signed 16-bit displacement *SDISP16.* Note: *SDISP16* represents the number of halfwords to displace (i.e. to load the address of the next instruction the *SDISP16* value is two because the next instruction is two halfwords away). No memory access is performed.

Syntax/Operation

| Instruction | Operands | Operation |
|---|---|---|
| LA.S.W | AtMt, SDISP16 | AtMt ←PC + (SDISP16 * 2) |
| T.LA.S.W | AtMt, SDISP16 | Do operation only if T condition is satisfied in F0 |

NOTE: See Field Description of At and Mt for valid SP/PE target registers.

Arithmetic Flags Affected

None

Cycles: 1

Pipeline Considerations

A target Address Register (*At*) is loaded in the Decode stage of the pipeline.
A target Control-Flow Address Register (*Mt*) is loaded in the Execute stage of the pipeline.

See also Load/Store Instruction Pipeline Considerations.

Restrictions

This is an SP only instruction.

LABD - Load Address Base + Displacement

BOPS, Inc. - Manta SYSSIM 2.31

Encoding

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="2" rowspan="2">Group</td><td rowspan="2">S/P</td><td rowspan="2">L/S</td><td colspan="3" rowspan="2">001</td><td rowspan="2">CE1</td><td rowspan="2">0</td><td rowspan="2">0</td><td rowspan="2">0</td><td rowspan="2">1</td><td rowspan="2">At/ Mt</td><td colspan="3">At</td><td colspan="3" rowspan="2">An</td><td colspan="13" rowspan="2">LSDISP13</td></tr>
<tr><td colspan="3">Mt</td></tr>
</table>

Description

Load a 32-bit effective address into an SP or PE Address Register *At* or Control-Flow Address Register *Mt*. The effective address is the sum of address register *An* and a signed 13-bit displacement *LSDISP13*. No memory access is performed.

Syntax/Operation

| Instruction | Operands | Operation |
|---|---|---|
| LABD.[SP].W | AtMt, An, LSDISP13 | AtMt ←An + LSDISP13 |
| T.LABD.[SP].W | AtMt, An, LSDISP13 | Do operation only if T condition is satisfied in F0 |

NOTE: See Field Description of At and Mt for valid SP/PE target registers.

Arithmetic Flags Affected

None

Cycles: 1

Pipeline Considerations

A target Address Register (*At*) is loaded in the Decode stage of the pipeline.
A target Control-Flow Address Register (*Mt*) is loaded in the Execute stage of the pipeline.

See also Load/Store Instruction Pipeline Considerations.

LBD - Load Base + Displacement

BOPS, Inc. - Manta SYSSIM 2.31

Encoding

| 31 30 | 29 | 28 | 27 26 25 | 24 | 23 22 | 21 | 20 19 18 17 | 16 | 15 14 13 | 12 11 10 9 8 7 6 5 4 3 2 1 0 |
|---|---|---|---|---|---|---|---|---|---|---|
| Group | S/P | L/S | 010 | CE1 | Size | 0 | Rt | | An | LSDISP13 |
| | | | | | | 0 | Rte | 0 | | |
| | | | | | | AtMRt | | | | |

Description
Load a byte, halfword, word, or doubleword operand into an SP target register from SP memory or into a PE target register from PE local memory. The operand effective address is the sum of address register *An* and a signed 13-bit displacement *LSDISP13*.

Syntax/Operation

| Instruction | Operands | Operation |
|---|---|---|
| | | Load Compute Register |
| LBD.[SP].D | Rte, An, LSDISP13 | Rto\|\|Rte ←Mem[An + LSDISP13]$_{dword}$ |
| LBD.[SP].W | Rt, An, LSDISP13 | Rt ←Mem[An + LSDISP13]$_{word}$ |
| LBD.[SP].H0 | Rt, An, LSDISP13 | Rt.H0 ←Mem[An + LSDISP13]$_{hword}$ |
| LBD.[SP].B0 | Rt, An, LSDISP13 | Rt.B0 ←Mem[An + LSDISP13]$_{byte}$ |
| T.LBD.[SP].[DWHB] | Rt, An, LSDISP13 | Do operation only if T condition is satisfied in F0 |
| | | Load ARF/MRF Register |
| LBD.[SP].W | AtMRt, An, LSDISP13 | AtMRt ←Mem[An + LSDISP13]$_{word}$ |
| LBD.[SP].[H0H1] | AtMRt, An, LSDISP13 | AtMRt.Hx ←Mem[An + LSDISP13]$_{hword}$ (Hx=H0 or H1) |
| T.LBD.[SP].[WH0H1] | AtMRt, An, LSDISP13 | Do operation only if T condition is satisfied in F0 |

NOTE: AtMRt is any register except a compute register.
Doubleword access must align on doubleword boundaries.

Arithmetic Flags Affected
None

Cycles: 1

Pipeline Considerations
See Load/Store Instruction Pipeline Considerations.

Load Broadcast Instructions Overview

The load broadcast (LBRxx) instructions are cooperative SP->PE data transfer instructions which provide the capability to broadcast a byte, halfword, or word from SP memory and make it available for any PE to receive into a register. Because of their cooperative nature, the LBRxx instructions function differently based on whether they execute in SP/PE0 or in a non-SP/PE0 processor. These functional differences are discussed below:

LBRxx function In SP/PE0
An LBRxx instruction executing in SP/PE0 performs SP address generation (as specified by the particular LBRxx instruction) and SP memory data access, regardless of the current PE mask or conditional execution state. The size of the SP memory data access is determined by the data type specified by the LBRxx instruction (i.e. a byte, halfword, word or doubleword). SP address generation occurs in the DECODE stage of the pipeline using SP address/compute registers. The accessed SP memory data is broadcasted (made available) to all PEs in the EXECUTE stage.

If PE0 is not masked, it receives the SP broadcasted memory data into its target register. For conditional execution forms of the LBRxx instructions, the condition must be satisfied for the target register to receive the data.

LBRxx function In Non-SP/PE0
An LBRxx instruction executing in a non-SP/PE0 is only a receiver of the broadcasted SP memory data (i.e. It does not do any SP address generation or SP memory access). The broadcasted SP memory data is received by a non-PE0 into its target register only if the PE is executing an LBRxx instruction and it is not masked. For conditional execution forms of the LBRxx instructions, the condition must be satisfied for the target register to receive the data.

SIMD Operation
In SIMD operation, each LBRxx operates as described above.

SMIMD Operation
In SMIMD operation, where each PE could be executing a different load instruction in the Load Unit (LU), it is possible to execute a non-LBRxx instruction in SP/PE0 and execute LBRxx instructions in non-SP/PE0. In this case, since no LBRxx instruction is performing SP address generation and SP memory access, the data being received by the LBRxx instructions in non-SP/PE0 is indeterminate.

Also, in SMIMD it is possible for an LBRxx instruction in SP/PE0 to broadcast a data type that is different from the data type being received by an LBRxx instruction in a non-SP/PE0. The table below describes what is received based on what is sent with respect to the different data types.

| Data Type Broadcasted by SP | Data Type Received by PE | Action |
|---|---|---|
| byte | byte | PE.byte ←SP.byte |
| | halfword | PE.halfword[15:8] ←??<br>PE.halfword[7:0] ←SP.byte |
| | word | PE.word[31:8] ←??<br>PE.word[7:0] ←SP.byte |
| | | |
| halfword | byte | PE.byte ←SP.halfword[7:0] |
| | halfword | PE.halfword ←SP.halfword |
| | word | PE.word[31:16] ←??<br>PE.word[15:0] ←SP.halfword |
| | | |
| word | byte | PE.byte ←SP.word[7:0] |
| | halfword | PE.halfword ←SP.word[15:0] |
| | word | PE.word ←SP.word |
| | | |

NOTE: ?? means indeterminate data

LBRI - Load Broadcast Indirect with Scaled Update

BOPS, Inc. - Manta SYSSIM 2.31

Encoding

| 31-30 | 29 | 28 | 27-26 | 25 | 24 | 23-22 | 21 | 20-17 | 16 | 15-13 | 12 | 11 | 10 | 9 | 8 | 7 | 6 | 5 | 4-0 |
|---|---|---|---|---|---|---|---|---|---|---|---|---|---|---|---|---|---|---|---|
| Group | S/P | L/S | 101 | | CE1 | Size | 0 | Rt | | An | Brcst | Sign Ext | Scale | Pre/ Post | Dec/ Inc | Imm/ Rt =1 | Updt An =1 | Rz/ Az | Rz |
| | | | | | | | 0 | Rte | 0 | | | | | | | | | | |
| AtMRt | | | | 0 | 0 | Az | | | | | | | | | | | | | |

Description

Load a byte, halfword, word, or doubleword operand into a PE target register from SP memory. SP address register *An* is updated prior to (pre-decrement/pre-increment) or after (post-decrement/post-increment) its use as the operand effective address on SP/PE0. The update to SP *An* is an addition or subtraction of SP compute register *Rz* or SP address register *Az* scaled by the size of the operand being loaded (i.e. no scale for a byte, 2 for a halfword, or 4 for a word). Byte and halfword operands can be sign-extended to 32-bits.

See the Load Broadcast Instructions Overview for a more detailed description of the functionality of LBRxx instructions.

Syntax/Operation (pre-decrement / pre-increment)

| Instruction | Operands | Operation |
|---|---|---|
| | | Load Compute Register |
| LBRI.P.D | Rte, ±An, RzAz | if (SP/PE0) {<br>SP.An ←SP.An ± (SP.RzAz * 8)<br>SP.BrData[63:0] ←SP.Mem[SP.An]$_{dword}$ }<br>PE.Rto\|\|Rte ←SP.BrData[63:0] |
| LBRI.P.W | Rt, ±An, RzAz | if (SP/PE0) {<br>SP.An ←SP.An ± (SP.RzAz * 4)<br>SP.BrData[31:0] ←SP.Mem[SP.An]$_{word}$ }<br>PE.Rt ←SP.BrData[31:0] |
| LBRI.P.H0 | Rt, ±An, RzAz | if (SP/PE0) {<br>SP.An ←SP.An ± (SP.RzAz * 2)<br>SP.BrData[15:0] ←SP.Mem[SP.An]$_{hword}$ }<br>PE.Rt.H0 ←SP.BrData[15:0] |
| LBRI.P.H0.X | Rt, ±An, RzAz | if (SP/PE0) {<br>SP.An ←SP.An ± (SP.RzAz * 2)<br>SP.BrData[15:0] ←SP.Mem[SP.An]$_{hword}$ }<br>PE.Rt.H0 ←SP.BrData[15:0]<br>PE.Rt.H1 ←0xFFFF if MSB(SP.BrData[15:0])=1<br>PE.Rt.H1 ←0x0000 if MSB(SP.BrData[15:0])=0 |
| LBRI.P.B0 | Rt, ±An, RzAz | if (SP/PE0) {<br>SP.An ←SP.An ± SP.RzAz<br>SP.BrData[7:0] ←SP.Mem[SP.An]$_{byte}$ }<br>PE.Rt.B0 ←SP.BrData[7:0] |
| LBRI.P.B0.X | Rt, ±An, RzAz | if (SP/PE0) {<br>SP.An ←SP.An ± SP.RzAz<br>SP.BrData[7:0] ←SP.Mem[SP.An]$_{byte}$ }<br>PE.Rt.B0 ←SP.BrData[7:0]<br>PE.Rt.B1 ←0xFF if MSB(SP.BrData[7:0])=1<br>PE.Rt.B1 ←0x00 if MSB(SP.BrData[7:0])=0<br>PE.Rt.H1 ←0xFFFF if MSB(SP.BrData[7:0])=1<br>PE.Rt.H1 ←0x0000 if MSB(SP.BrData[7:0])=0 |
| T.LBRI.P.[DWH0B0].[X] | Rt, ±An, RzAz | Do receive operation only if T condition is satisfied in F0 |
| | | Load ARF/MRF Register |
| LBRI.P.W | AtMRt, ±An, RzAz | if (SP/PE0) {<br>SP.An ←SP.An ± (SP.RzAz * 4)<br>SP.BrData[31:0] ←SP.Mem[SP.An]$_{word}$ }<br>PE.AtMRt ←SP.BrData[31:0] |
| LBRI.P.[H0H1] | AtMRt, ±An, RzAz | if (SP/PE0) {<br>SP.An ←SP.An ± (SP.RzAz * 2)<br>SP.BrData[15:0] ←SP.Mem[SP.An]$_{hword}$ }<br>PE.AtMRt.Hx ←SP.BrData[15:0] *(Note: Hx=H0 or H1)* |
| LBRI.P.H0.X | AtMRt, ±An, RzAz | if (SP/PE0) {<br>SP.An ←SP.An ± (SP.RzAz * 2) |

| | | |
|---|---|---|
| | | SP.BrData[15:0] ←SP.Mem[SP.An]hword }<br>PE.AtMRt.H0 ←SP.BrData[15:0]<br>PE.AtMRt.H1 ←0xFFFF if MSB(SP.BrData[15:0])=1<br>PE.AtMRt.H1 ←0x0000 if MSB(SP.BrData[15:0])=0 |
| T.LBRI.P.[WH0H1].[X] | AtMRt, ±An, RzAz | Do receive operation only if T condition is satisfied in F0 |

NOTE: AtMRt is any register except a compute register.
NOTE: RzAz is any address or compute register.

Syntax/Operation (post-decrement / post-increment)

| Instruction | Operands | Operation |
|---|---|---|
| | | Load Compute Register |
| LBRI.P.D | Rte, An±, RzAz | if (SP/PE0) {<br>SP.BrData[63:0] ←SP.Mem[SP.An]dword<br>SP.An ←SP.An ± (SP.RzAz * 8) }<br>PE.Rto\|\|Rte ←SP.BrData[63:0] |
| LBRI.P.W | Rt, An±, RzAz | if (SP/PE0) {<br>SP.BrData[31:0] ←SP.Mem[SP.An]word<br>SP.An ←SP.An ± (SP.RzAz * 4) }<br>PE.Rt ←SP.BrData[31:0] |
| LBRI.P.H0 | Rt, An±, RzAz | if (SP/PE0) {<br>SP.BrData[15:0] ←SP.Mem[SP.An]hword<br>SP.An ←SP.An ± (SP.RzAz * 2) }<br>PE.Rt.H0 ←SP.BrData[15:0] |
| LBRI.P.H0.X | Rt, An±, RzAz | if (SP/PE0) {<br>SP.BrData[15:0] ←SP.Mem[SP.An]hword<br>SP.An ←SP.An ± (SP.RzAz * 2) }<br>PE.Rt.H0 ←SP.BrData[15:0]<br>PE.Rt.H1 ←0xFFFF if MSB(SP.BrData[15:0])=1<br>PE.Rt.H1 ←0x0000 if MSB(SP.BrData[15:0])=0 |
| LBRI.P.B0 | Rt, An±, RzAz | if (SP/PE0) {<br>SP.BrData[7:0] ←SP.Mem[SP.An]byte<br>SP.An ←SP.An ± SP.RzAz }<br>PE.Rt.B0 ←SP.BrData[7:0] |
| LBRI.P.B0.X | Rt, An±, RzAz | if (SP/PE0) {<br>SP.BrData[7:0] ←SP.Mem[SP.An]byte<br>SP.An ←SP.An ± SP.RzAz }<br>PE.Rt.B0 ←SP.BrData[7:0]<br>PE.Rt.B1 ←0xFF if MSB(SP.BrData[7:0])=1<br>PE.Rt.B1 ←0x00 if MSB(SP.BrData[7:0])=0<br>PE.Rt.H1 ←0xFFFF if MSB(SP.BrData[7:0])=1<br>PE.Rt.H1 ←0x0000 if MSB(SP.BrData[7:0])=0 |
| T.LBRI.P.[DWH0B0].[X] | Rt, An±, RzAz | Do receive operation only if T condition is satisfied in F0 |
| | | Load ARF/MRF Register |
| LBRI.P.W | AtMRt, An±, RzAz | if (SP/PE0) {<br>SP.BrData[31:0] ←SP.Mem[SP.An]word<br>SP.An ←SP.An ± (SP.RzAz * 4) }<br>PE.AtMRt ←SP.BrData[31:0] |
| LBRI.P.[H0H1] | AtMRt, An±, RzAz | if (SP/PE0) {<br>SP.BrData[15:0] ←SP.Mem[SP.An]hword<br>SP.An ←SP.An ± (SP.RzAz * 2) }<br>PE.AtMRt.Hx ←SP.BrData[15:0] *(Note: Hx=H0 or H1)* |
| LBRI.P.H0.X | AtMRt, An±, RzAz | if (SP/PE0) {<br>SP.BrData[15:0] ←SP.Mem[SP.An]hword<br>SP.An ←SP.An ± (SP.RzAz * 2) }<br>PE.AtMRt.H0 ←SP.BrData[15:0]<br>PE.AtMRt.H1 ←0xFFFF if MSB(SP.BrData[15:0])=1<br>PE.AtMRt.H1 ←0x0000 if MSB(SP.BrData[15:0])=0 |
| T.LBRI.P.[WH0H1].[X] | AtMRt, An±, RzAz | Do receive operation only if T condition is satisfied in F0 |

NOTE: AtMRt is any register except a compute register.
NOTE: RzAz is any address or compute register.

Arithmetic Flags Affected
None

Cycles: 1

Pipeline Considerations

See Load/Store Instruction Pipeline Considerations and Load/Store Indirect Addressing Mode restrictions.

---

LBRII - Load Broadcast Indirect with Scaled Immediate Update

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | L/S | 101 | | | CE1 | Size | | 0 / 0 | Rt / Rte 0 / AtMRt | | | | | An | | | Brcst | Sign Ext | Scale | Pre/ Post | Dec/ Inc | Imm/ Rt =0 | UPDATE7 | | | | | | |

Description
Load a byte, halfword, or word word, or doubleword operand into a PE target register from SP memory. SP address register *An* is updated prior to (pre-decrement/pre-increment) or after (post-decrement/post-increment) its use as the operand effective address on SP/PE0. The update to SP *An* is an addition or subtraction of the unsigned 7-bit update value *UPDATE7* scaled by the size of the operand being loaded (i.e. no scale for a byte, 2 for a halfword, or 4 for a word). Byte and halfword operands can be sign-extended to 32-bits. Address registers can only be loaded with a word or halfword.

See the Load Broadcast Instructions Overview for a more detailed description of the functionality of LBRxx instructions.

Syntax/Operation (pre-decrement / pre-increment)

| Instruction | Operands | Operation |
|---|---|---|
| | | *Load Compute Register* |
| LBRII.P.D | Rte, ±An, UPDATE7 | if (SP/PE0) {<br>SP.An ←SP.An ± (UPDATE7 * 8)<br>SP.BrData[63:0] ←SP.Mem[SP.An]$_{dword}$ }<br>PE.Rto\|\|Rte ←SP.BrData[63:0] |
| LBRII.P.W | Rt, ±An, UPDATE7 | if (SP/PE0) {<br>SP.An ←SP.An ± (UPDATE7 * 4)<br>SP.BrData[31:0] ←SP.Mem[SP.An]$_{word}$ }<br>PE.Rt ←SP.BrData[31:0] |
| LBRII.P.H0 | Rt, ±An, UPDATE7 | if (SP/PE0) {<br>SP.An ←SP.An ± (UPDATE7 * 2)<br>SP.BrData[15:0] ←SP.Mem[SP.An]$_{hword}$ }<br>PE.Rt.H0 ←SP.BrData[15:0] |
| LBRII.P.H0.X | Rt, ±An, UPDATE7 | if (SP/PE0) {<br>SP.An ←SP.An ± (UPDATE7 * 2)<br>SP.BrData[15:0] ←SP.Mem[SP.An]$_{hword}$ }<br>PE.Rt.H0 ←SP.BrData[15:0]<br>PE.Rt.H1 ←0xFFFF if MSB(SP.BrData[15:0])=1<br>PE.Rt.H1 ←0x0000 if MSB(SP.BrData[15:0])=0 |
| LBRII.P.B0 | Rt, ±An, UPDATE7 | if (SP/PE0) {<br>SP.An ←SP.An ± UPDATE7<br>SP.BrData[7:0] ←SP.Mem[SP.An]$_{byte}$ }<br>PE.Rt.B0 ←SP.BrData[7:0] |
| LBRII.P.B0.X | Rt, ±An, UPDATE7 | if (SP/PE0) {<br>SP.An ←SP.An ± UPDATE7<br>SP.BrData[7:0] ←SP.Mem[SP.An]$_{byte}$ }<br>PE.Rt.B0 ←SP.BrData[7:0]<br>PE.Rt.B1 ←0xFF if MSB(SP.BrData[7:0])=1<br>PE.Rt.B1 ←0x00 if MSB(SP.BrData[7:0])=0<br>PE.Rt.H1 ←0xFFFF if MSB(SP.BrData[7:0])=1<br>PE.Rt.H1 ←0x0000 if MSB(SP.BrData[7:0])=0 |
| T.LBRII.P.[DWH0B0].[X] | Rt, ±An, UPDATE7 | Do receive operation only if T condition is satisfied in F0 |
| | | *Load ARF/MRF Register* |
| LBRII.P.W | AtMRt, ±An, UPDATE7 | if (SP/PE0) {<br>SP.An ←SP.An ± (UPDATE7 * 4)<br>SP.BrData[31:0] ←SP.Mem[SP.An]$_{word}$ }<br>PE.AtMRt ←SP.BrData[31:0] |
| LBRII.P.[H0H1] | AtMRt, ±An, UPDATE7 | if (SP/PE0) {<br>SP.An ←SP.An ± (UPDATE7 * 2)<br>SP.BrData[15:0] ←SP.Mem[SP.An]$_{hword}$ }<br>PE.AtMRt.Hx ←SP.BrData[15:0] *(Note: Hx=H0 or H1)* |
| LBRII.P.H0.X | AtMRt, ±An, UPDATE7 | if (SP/PE0) {<br>SP.An ←SP.An ± (UPDATE7 * 2) |

| | | |
|---|---|---|
| | | SP.BrData[15:0] ←SP.Mem[SP.An]$_{hword}$ }<br>PE.AtMRt.H0 ←SP.BrData[15:0]<br>PE.AtMRt.H1 ←0xFFFF if MSB(SP.BrData[15:0])=1<br>PE.AtMRt.H1 ←0x0000 if MSB(SP.BrData[15:0])=0 |
| T.LBRII.P.[WH0H1].[X] | AtMRt, ±An, UPDATE7 | Do receive operation only if T condition is satisfied in F0 |

NOTE: AtMRt is any register except a compute register.

Syntax/Operation (post-decrement / post-increment)

| Instruction | Operands | Operation |
|---|---|---|
| | | Load Compute Register |
| LBRII.P.D | Rte, An±, UPDATE7 | if (SP/PE0) {<br>SP.BrData[63:0] ←SP.Mem[SP.An]$_{dword}$<br>SP.An ←SP.An ± (UPDATE7 * 8) }<br>PE.Rto\|\|Rte ←SP.BrData[63:0] |
| LBRII.P.W | Rt, An±, UPDATE7 | if (SP/PE0) {<br>SP.BrData[31:0] ←SP.Mem[SP.An]$_{word}$<br>SP.An ←SP.An ± (UPDATE7 * 4) }<br>PE.Rt ←SP.BrData[31:0] |
| LBRII.P.H0 | Rt, An±, UPDATE7 | if (SP/PE0) {<br>SP.BrData[15:0] ←SP.Mem[SP.An]$_{hword}$<br>SP.An ←SP.An ± (UPDATE7 * 2) }<br>PE.Rt.H0 ←SP.BrData[15:0] |
| LBRII.P.H0.X | Rt, An±, UPDATE7 | if (SP/PE0) {<br>SP.BrData[15:0] ←SP.Mem[SP.An]$_{hword}$<br>SP.An ←SP.An ± (UPDATE7 * 2) }<br>PE.Rt.H0 ←SP.BrData[15:0]<br>PE.Rt.H1 ←0xFFFF if MSB(SP.BrData[15:0])=1<br>PE.Rt.H1 ←0x0000 if MSB(SP.BrData[15:0])=0 |
| LBRII.P.B0 | Rt, An±, UPDATE7 | if (SP/PE0) {<br>SP.BrData[7:0] ←SP.Mem[SP.An]$_{byte}$<br>SP.An ←SP.An ± UPDATE7 }<br>PE.Rt.B0 ←SP.BrData[7:0] |
| LBRII.P.B0.X | Rt, An±, UPDATE7 | if (SP/PE0) {<br>SP.BrData[7:0] ←SP.Mem[SP.An]$_{byte}$<br>SP.An ←SP.An ± UPDATE7 }<br>PE.Rt.B0 ←SP.BrData[7:0]<br>PE.Rt.B1 ←0xFF if MSB(SP.BrData[7:0])=1<br>PE.Rt.B1 ←0x00 if MSB(SP.BrData[7:0])=0<br>PE.Rt.H1 ←0xFFFF if MSB(SP.BrData[7:0])=1<br>PE.Rt.H1 ←0x0000 if MSB(SP.BrData[7:0])=0 |
| T.LBRII.P.[DWH0B0].[X] | Rt, An±, UPDATE7 | Do receive operation only if T condition is satisfied in F0 |
| | | Load ARF/MRF Register |
| LBRII.P.W | AtMRt, An±, UPDATE7 | if (SP/PE0) {<br>SP.BrData[31:0] ←SP.Mem[SP.An]$_{word}$<br>SP.An ←SP.An ± (UPDATE7 * 4) }<br>PE.AtMRt ←SP.BrData[31:0] |
| LBRII.P.[H0H1] | AtMRt, An±, UPDATE7 | if (SP/PE0) {<br>SP.BrData[15:0] ←SP.Mem[SP.An]$_{hword}$<br>SP.An ←SP.An ± (UPDATE7 * 2) }<br>PE.AtMRt.Hx ←SP.BrData[15:0] *(Note: Hx=H0 or H1)* |
| LBRII.P.H0.X | AtMRt, An±, UPDATE7 | if (SP/PE0) {<br>SP.BrData[15:0] ←SP.Mem[SP.An]$_{hword}$<br>SP.An ←SP.An ± (UPDATE7 * 2) }<br>PE.AtMRt.H0 ←SP.BrData[15:0]<br>PE.AtMRt.H1 ←0xFFFF if MSB(SP.BrData[15:0])=1<br>PE.AtMRt.H1 ←0x0000 if MSB(SP.BrData[15:0])=0 |
| T.LBRII.P.[WH0H1].[X] | AtMRt, An±, UPDATE7 | Do receive operation only if T condition is satisfied in F0 |

NOTE: AtMRt is any register except a compute register.

Arithmetic Flags Affected
None

Cycles: 1

Pipeline Considerations
See Load/Store Instruction Pipeline Considerations.

---

LBRIU - Load Broadcast Indirect with Unscaled Update

BOPS, Inc. - Manta SYSSIM 2.31

Encoding

| 31 30 | 29 | 28 | 27 26 25 | 24 | 23 22 | 21 | 20 19 18 17 | 16 | 15 14 13 | 12 | 11 | 10 | 9 | 8 | 7 | 6 | 5 | 4 3 2 1 0 |
|---|---|---|---|---|---|---|---|---|---|---|---|---|---|---|---|---|---|---|
| Group | S/P | L/S | 101 | CE1 | Size | 0 | Rt | | An | Brcst | Sign Ext | Scale | Pre/ Post | Dec/ Inc | Imm/ Rt =1 | Updt An =1 | Rz/ Az | Rz |
| | | | | | | 0 | Rte | 0 | | | | | | | | | | |
| AtMRt | | | | 0 | 0 | | Az | | | | | | | | | | | |

Description

Load a byte, halfword, or word word, or doubleword operand into a PE target register from SP memory. SP Source address register *An* is updated prior to (pre-decrement/pre-increment) or after (post-decrement/post-increment) its use as the operand effective address on SP/PE0. The update to SP *An* is an addition or subtraction of SP compute register *Rz* or SP address register *Az*. Byte and halfword operands can be sign-extended to 32-bits.

See the Load Broadcast Instructions Overview for a more detailed description of the functionality of LBRxx instructions.

Syntax/Operation (pre-decrement / pre-increment)

| Instruction | Operands | Operation |
|---|---|---|
| | | Load Compute Register |
| LBRIU.P.D | Rte, ±An, RzAz | if (SP/PE0) {<br>SP.An ←SP.An ± SP.RzAz<br>SP.BrData[63:0] ←SP.Mem[SP.An]$_{dword}$ }<br>PE.Rto\|\|Rte ←SP.BrData[63:0] |
| LBRIU.P.W | Rt, ±An, RzAz | if (SP/PE0) {<br>SP.An ←SP.An ± SP.RzAz<br>SP.BrData[31:0] ←SP.Mem[SP.An]$_{word}$ }<br>PE.Rt ←SP.BrData[31:0] |
| LBRIU.P.H0 | Rt, ±An, RzAz | if (SP/PE0) {<br>SP.An ←SP.An ± SP.RzAz<br>SP.BrData[15:0] ←SP.Mem[SP.An]$_{hword}$ }<br>PE.Rt.H0 ←SP.BrData[15:0] |
| LBRIU.P.H0.X | Rt, ±An, RzAz | if (SP/PE0) {<br>SP.An ←SP.An ± SP.RzAz<br>SP.BrData[15:0] ←SP.Mem[SP.An]$_{hword}$ }<br>PE.Rt.H0 ←SP.BrData[15:0]<br>PE.Rt.H1 ←0xFFFF if MSB(SP.BrData[15:0])=1<br>PE.Rt.H1 ←0x0000 if MSB(SP.BrData[15:0])=0 |
| LBRIU.P.B0 | Rt, ±An, RzAz | if (SP/PE0) {<br>SP.An ←SP.An ± SP.RzAz<br>SP.BrData[7:0] ←SP.Mem[SP.An]$_{byte}$ }<br>PE.Rt.B0 ←SP.BrData[7:0] |
| LBRIU.P.B0.X | Rt, ±An, RzAz | if (SP/PE0) {<br>SP.An ←SP.An ± SP.RzAz<br>SP.BrData[7:0] ←SP.Mem[SP.An]$_{byte}$ }<br>PE.Rt.B0 ←SP.BrData[7:0]<br>PE.Rt.B1 ←0xFF if MSB(SP.BrData[7:0])=1<br>PE.Rt.B1 ←0x00 if MSB(SP.BrData[7:0])=0<br>PE.Rt.H1 ←0xFFFF if MSB(SP.BrData[7:0])=1<br>PE.Rt.H1 ←0x0000 if MSB(SP.BrData[7:0])=0 |
| T.LBRIU.P.[DWH0B0].[X] | Rt, ±An, RzAz | Do receive operation only if T condition is satisfied in F0 |
| | | Load ARF/MRF Register |
| LBRIU.P.W | AtMRt, ±An, RzAz | if (SP/PE0) {<br>SP.An ←SP.An ± SP.RzAz<br>SP.BrData[31:0] ←SP.Mem[SP.An]$_{word}$ }<br>PE.AtMRt ←SP.BrData[31:0] |
| LBRIU.P.[H0H1] | AtMRt, ±An, RzAz | if (SP/PE0) {<br>SP.An ←SP.An ± SP.RzAz<br>SP.BrData[15:0] ←SP.Mem[SP.An]$_{hword}$ }<br>PE.AtMRt.Hx ←SP.BrData[15:0] *(Note: Hx=H0 or H1)* |
| LBRIU.P.H0.X | AtMRt, ±An, RzAz | if (SP/PE0) {<br>SP.An ←SP.An ± SP.RzAz<br>SP.BrData[15:0] ←SP.Mem[SP.An]$_{hword}$ } |

| | | |
|---|---|---|
| | | PE.AtMRt.H0 ←SP.BrData[15:0]<br>PE.AtMRt.H1 ←0xFFFF if MSB(SP.BrData[15:0])=1<br>PE.AtMRt.H1 ←0x0000 if MSB(SP.BrData[15:0])=0 |
| T.LBRIU.P.[WH0H1].[X] | AtMRt, ±An, RzAz | Do receive operation only if T condition is satisfied in F0 |

NOTE: AtMRt is any register except a compute register.
NOTE: RzAz is any address or compute register.

Syntax/Operation (post-decrement / post-increment)

| Instruction | Operands | Operation |
|---|---|---|
| | | Load Compute Register |
| LBRIU.P.D | Rte, An±, RzAz | if (SP/PE0) {<br>SP.BrData[63:0] ←SP.Mem[SP.An]$_{dword}$<br>SP.An ←SP.An ± SP.RzAz }<br>PE.Rto\|\|Rte ←SP.BrData[63:0] |
| LBRIU.P.W | Rt, An±, RzAz | if (SP/PE0) {<br>SP.BrData[31:0] ←SP.Mem[SP.An]$_{word}$<br>SP.An ←SP.An ± SP.RzAz }<br>PE.Rt ←SP.BrData[31:0] |
| LBRIU.P.H0 | Rt, An±, RzAz | if (SP/PE0) {<br>SP.BrData[15:0] ←SP.Mem[SP.An]$_{hword}$<br>SP.An ←SP.An ± SP.RzAz }<br>PE.Rt.H0 ←SP.BrData[15:0] |
| LBRIU.P.H0.X | Rt, An±, RzAz | if (SP/PE0) {<br>SP.BrData[15:0] ←SP.Mem[SP.An]$_{hword}$<br>SP.An ←SP.An ± SP.RzAz }<br>PE.Rt.H0 ←SP.BrData[15:0]<br>PE.Rt.H1 ←0xFFFF if MSB(SP.BrData[15:0])=1<br>PE.Rt.H1 ←0x0000 if MSB(SP.BrData[15:0])=0 |
| LBRIU.P.B0 | Rt, An±, RzAz | if (SP/PE0) {<br>SP.BrData[7:0] ←SP.Mem[SP.An]$_{byte}$<br>SP.An ←SP.An ± SP.RzAz }<br>PE.Rt.B0 ←SP.BrData[7:0] |
| LBRIU.P.B0.X | Rt, An±, RzAz | if (SP/PE0) {<br>SP.BrData[7:0] ←SP.Mem[SP.An]$_{byte}$<br>SP.An ←SP.An ± SP.RzAz }<br>PE.Rt.B0 ←SP.BrData[7:0]<br>PE.Rt.B1 ←0xFF if MSB(SP.BrData[7:0])=1<br>PE.Rt.B1 ←0x00 if MSB(SP.BrData[7:0])=0<br>PE.Rt.H1 ←0xFFFF if MSB(SP.BrData[7:0])=1<br>PE.Rt.H1 ←0x0000 if MSB(SP.BrData[7:0])=0 |
| T.LBRIU.P.[DWH0B0].[X] | Rt, An±, RzAz | Do receive operation only if T condition is satisfied in F0 |
| | | Load ARF/MRF Register |
| LBRIU.P.W | AtMRt, An±, RzAz | if (SP/PE0) {<br>SP.BrData[31:0] ←SP.Mem[SP.An]$_{word}$<br>SP.An ←SP.An ± SP.RzAz }<br>PE.AtMRt ←SP.BrData[31:0] |
| LBRIU.P.[H0H1] | AtMRt, An±, RzAz | if (SP/PE0) {<br>SP.BrData[15:0] ←SP.Mem[SP.An]$_{hword}$<br>SP.An ←SP.An ± SP.RzAz }<br>PE.AtMRt.Hx ←SP.BrData[15:0] *(Note: Hx=H0 or H1)* |
| LBRIU.P.H0.X | AtMRt, An±, RzAz | if (SP/PE0) {<br>SP.BrData[15:0] ←SP.Mem[SP.An]$_{hword}$<br>SP.An ←SP.An ± SP.RzAz }<br>PE.AtMRt.H0 ←SP.BrData[15:0]<br>PE.AtMRt.H1 ←0xFFFF if MSB(SP.BrData[15:0])=1<br>PE.AtMRt.H1 ←0x0000 if MSB(SP.BrData[15:0])=0 |
| T.LBRIU.P.[WH0H1].[X] | AtMRt, An±, RzAz | Do receive operation only if T condition is satisfied in F0 |

NOTE: AtMRt is any register except a compute register.
NOTE: RzAz is any address or compute register.

Arithmetic Flags Affected
None

Cycles: 1

Pipeline Considerations

See also Load/Store Instruction Pipeline Considerations and Load/Store Indirect Addressing Mode restrictions.

---

LBRIUI - Load Broadcast Indirect with Unscaled Immediate Update

BOPS, Inc. - Manta SYSSIM 2.31

Encoding

| 31 30 | 29 | 28 | 27 26 25 | 24 | 23 22 | 21 20 19 18 17 16 | 15 14 13 | 12 | 11 | 10 | 9 | 8 | 7 | 6 5 4 3 2 1 0 |
|---|---|---|---|---|---|---|---|---|---|---|---|---|---|---|
| Group | S/P | L/S | 101 | CE1 | Size | 0 Rt<br>0 Rte 0<br>AtMRt | An | Brcst | Sign Ext | Scale | Pre/ Post | Dec/ Inc | Imm/ Rt =0 | UPDATE7 |

Description
Load a byte, halfword, or word word, or doubleword operand into a PE target register from SP memory. SP address register *An* is updated prior to (pre-decrement/pre-increment) or after (post-decrement/post-increment) its use as the operand effective address on SP/PE0. The update to SP *An* is an addition or subtraction of the unsigned 7-bit update value *UPDATE7*. Byte and halfword operands can be sign-extended to 32-bits.

See the Load Broadcast Instructions Overview for a more detailed description of the functionality of LBRxx instructions.

Syntax/Operation (pre-decrement / pre-increment)

| Instruction | Operands | Operation |
|---|---|---|
| | | Load Compute Register |
| LBRIUI.P.D | Rte, ±An, UPDATE7 | if (SP/PE0) {<br>SP.An ←SP.An ± UPDATE7<br>SP.BrData[63:0] ←SP.Mem[SP.An]$_{dword}$ }<br>PE.Rto\|\|Rte ←SP.BrData[63:0] |
| LBRIUI.P.W | Rt, ±An, UPDATE7 | if (SP/PE0) {<br>SP.An ←SP.An ± UPDATE7<br>SP.BrData[31:0] ←SP.Mem[SP.An]$_{word}$ }<br>PE.Rt ←SP.BrData[31:0] |
| LBRIUI.P.H0 | Rt, ±An, UPDATE7 | if (SP/PE0) {<br>SP.An ←SP.An ± UPDATE7<br>SP.BrData[15:0] ←SP.Mem[SP.An]$_{hword}$ }<br>PE.Rt.H0 ←SP.BrData[15:0] |
| LBRIUI.P.H0.X | Rt, ±An, UPDATE7 | if (SP/PE0) {<br>SP.An ←SP.An ± UPDATE7<br>SP.BrData[15:0] ←SP.Mem[SP.An]$_{hword}$ }<br>PE.Rt.H0 ←SP.BrData[15:0]<br>PE.Rt.H1 ←0xFFFF if MSB(SP.BrData[15:0])=1<br>PE.Rt.H1 ←0x0000 if MSB(SP.BrData[15:0])=0 |
| LBRIUI.P.B0 | Rt, ±An, UPDATE7 | if (SP/PE0) {<br>SP.An ←SP.An ± UPDATE7<br>SP.BrData[7:0] ←SP.Mem[SP.An]$_{byte}$ }<br>PE.Rt.B0 ←SP.BrData[7:0] |
| LBRIUI.P.B0.X | Rt, ±An, UPDATE7 | if (SP/PE0) {<br>SP.An ←SP.An ± UPDATE7<br>SP.BrData[7:0] ←SP.Mem[SP.An]$_{byte}$ }<br>PE.Rt.B0 ←SP.BrData[7:0]<br>PE.Rt.B1 ←0xFF if MSB(SP.BrData[7:0])=1<br>PE.Rt.B1 ←0x00 if MSB(SP.BrData[7:0])=0<br>PE.Rt.H1 ←0xFFFF if MSB(SP.BrData[7:0])=1<br>PE.Rt.H1 ←0x0000 if MSB(SP.BrData[7:0])=0 |
| T.LBRIUI.P.[DWH0B0].[X] | Rt, ±An, UPDATE7 | Do receive operation only if T condition is satisfied in F0 |
| | | Load ARF/MRF Register |
| LBRIUI.P.W | AtMRt, ±An, UPDATE7 | if (SP/PE0) {<br>SP.An ←SP.An ± UPDATE7<br>SP.BrData[31:0] ←SP.Mem[SP.An]$_{word}$ }<br>PE.AtMRt ←SP.BrData[31:0] |
| LBRIUI.P.[H0H1] | AtMRt, ±An, UPDATE7 | if (SP/PE0) {<br>SP.An ←SP.An ± UPDATE7<br>SP.BrData[15:0] ←SP.Mem[SP.An]$_{hword}$ }<br>PE.AtMRt.Hx ←SP.BrData[15:0] *(Note: Hx=H0 or H1)* |
| LBRIUI.P.H0.X | AtMRt, ±An, UPDATE7 | if (SP/PE0) {<br>SP.An ←SP.An ± UPDATE7<br>SP.BrData[15:0] ←SP.Mem[SP.An]$_{hword}$ }<br>PE.AtMRt.H0 ←SP.BrData[15:0] |

| | | |
|---|---|---|
| | | PE.AtMRt.H1 ←0xFFFF if MSB(SP.BrData[15:0])=1<br>PE.AtMRt.H1 ←0x0000 if MSB(SP.BrData[15:0])=0 |
| T.LBRIUI.P.[WH0H1].[X] | AtMRt, ±An, UPDATE7 | Do receive operation only if T condition is satisfied in F0 |

NOTE: AtMRt is any register except a compute register.

Syntax/Operation (post-decrement / post-increment)

| Instruction | Operands | Operation |
|---|---|---|
| | | Load Compute Register |
| LBRIUI.P.D | Rte, An±, UPDATE7 | if (SP/PE0) {<br>SP.BrData[63:0] ←SP.Mem[SP.An]$_{dword}$<br>SP.An ←SP.An ± UPDATE7 }<br>PE.Rto\|\|Rte ←SP.BrData[63:0] |
| LBRIUI.P.W | Rt, An±, UPDATE7 | if (SP/PE0) {<br>SP.BrData[31:0] ←SP.Mem[SP.An]$_{word}$<br>SP.An ←SP.An ± UPDATE7 }<br>PE.Rt ←SP.BrData[31:0] |
| LBRIUI.P.H0 | Rt, An±, UPDATE7 | if (SP/PE0) {<br>SP.BrData[15:0] ←SP.Mem[SP.An]$_{hword}$<br>SP.An ←SP.An ± UPDATE7 }<br>PE.Rt.H0 ←SP.BrData[15:0] |
| LBRIUI.P.H0.X | Rt, An±, UPDATE7 | if (SP/PE0) {<br>SP.BrData[15:0] ←SP.Mem[SP.An]$_{hword}$<br>SP.An ←SP.An ± UPDATE7 }<br>PE.Rt.H0 ←SP.BrData[15:0]<br>PE.Rt.H1 ←0xFFFF if MSB(SP.BrData[15:0])=1<br>PE.Rt.H1 ←0x0000 if MSB(SP.BrData[15:0])=0 |
| LBRIUI.P.B0 | Rt, An±, UPDATE7 | if (SP/PE0) {<br>SP.BrData[7:0] ←SP.Mem[SP.An]$_{byte}$<br>SP.An ←SP.An ± UPDATE7 }<br>PE.Rt.B0 ←SP.BrData[7:0] |
| LBRIUI.P.B0.X | Rt, An±, UPDATE7 | if (SP/PE0) {<br>SP.BrData[7:0] ←SP.Mem[SP.An]$_{byte}$<br>SP.An ←SP.An ± UPDATE7 }<br>PE.Rt.B0 ←SP.BrData[7:0]<br>PE.Rt.B1 ←0xFF if MSB(SP.BrData[7:0])=1<br>PE.Rt.B1 ←0x00 if MSB(SP.BrData[7:0])=0<br>PE.Rt.H1 ←0xFFFF if MSB(SP.BrData[7:0])=1<br>PE.Rt.H1 ←0x0000 if MSB(SP.BrData[7:0])=0 |
| T.LBRIUI.P.[DWH0B0].[X] | Rt, An±, UPDATE7 | Do receive operation only if T condition is satisfied in F0 |
| | | Load ARF/MRF Register |
| LBRIUI.P.W | AtMRt, An±, UPDATE7 | if (SP/PE0) {<br>SP.BrData[31:0] ←SP.Mem[SP.An]$_{word}$<br>SP.An ←SP.An ± UPDATE7 }<br>PE.AtMRt ←SP.BrData[31:0] |
| LBRIUI.P.[H0H1] | AtMRt, An±, UPDATE7 | if (SP/PE0) {<br>SP.BrData[15:0] ←SP.Mem[SP.An]$_{hword}$<br>SP.An ←SP.An ± UPDATE7 }<br>PE.AtMRt.Hx ←SP.BrData[15:0] *(Note: Hx=H0 or H1)* |
| LBRIUI.P.H0.X | AtMRt, An±, UPDATE7 | if (SP/PE0) {<br>SP.BrData[15:0] ←SP.Mem[SP.An]$_{hword}$<br>SP.An ←SP.An ± UPDATE7 }<br>PE.AtMRt.H0 ←SP.BrData[15:0]<br>PE.AtMRt.H1 ←0xFFFF if MSB(SP.BrData[15:0])=1<br>PE.AtMRt.H1 ←0x0000 if MSB(SP.BrData[15:0])=0 |
| T.LBRIUI.P.[WH0H1].[X] | AtMRt, An±, UPDATE7 | Do receive operation only if T condition is satisfied in F0 |

NOTE: AtMRt is any register except a compute register.

Arithmetic Flags Affected
None

Cycles: 1

Pipeline Considerations
See Load/Store Instruction Pipeline Considerations.

LBRMX - Load Broadcast Modulo Indexed with Scaled Update

BOPS, Inc. - Manta SYSSIM 2.31

Encoding

| 31 30 | 29 | 28 | 27 26 25 | 24 | 23 22 | 21 20 19 18 17 16 15 14 | 13 | 12 | 11 | 10 | 9 | 8 7 | 6 5 4 3 | 2 1 | 0 |
|---|---|---|---|---|---|---|---|---|---|---|---|---|---|---|---|
| Group | S/P | L/S | 100 | CE1 | Size | 0 Rt<br>0 Rte 0<br>AtMRt | Ae | Mod/Long | Brcst | Sign Ext | Scale | Pre-Dec/Post Inc | UPDATE7[2:1] | UPDATE7[6:3] | Ao | UPDATE7[0] |

Description

Load a byte, halfword, word, or doubleword operand into a PE target register from SP memory. SP even address register *Ae* contains a 32-bit base address of an SP memory buffer. The high halfword of SP odd address register *Ao* contains an unsigned 16-bit value representing the SP memory buffer size in bytes (This is the modulo value). The low halfword of SP *Ao* is an unsigned 16-bit index into the buffer.

The SP index value is updated prior to (pre-decrement) or after (post-increment) its use in forming the operand effective address on SP/PE0. A pre-decrement update involves subtracting the unsigned 7-bit update value *UPDATE7* scaled by the size of the operand being loaded (i.e. no scale for a byte, 2 for a halfword, or 4 for a word) from the SP index. If the resulting SP index becomes negative, the modulo value is added to the SP index. A post-increment update involves adding the scaled *UPDATE7* to the SP index. If the resulting SP index is greater than or equal to the SP memory buffer size (modulo value), the SP memory buffer size is subtracted from the SP index. The effect of the SP index update is that the SP index moves a scaled *UPDATE7* bytes forward or backward within the SP memory buffer.

The SP operand effective address is the sum of the SP base address and the SP index. Byte and halfword operands can be sign-extended to 32-bits.

See the Load Broadcast Instructions Overview for a more detailed description of the functionality of LBRxx instructions.

Syntax/Operation (pre-decrement)

| Instruction | Operands | Operation |
|---|---|---|
| | | Load Compute Register |
| LBRMX.P.D | Rte, Ae, -Ao, UPDATE7 | if (SP/PE0) {<br>SP.Ao.H0 ←SP.Ao.H0 - (UPDATE7 * 8)<br>if (SP.Ao.H0 < 0)<br>SP.Ao.H0 ←SP.Ao.H0 + SP.Ao.H1<br>SP.BrData[63:0] ←SP.Mem[SP.Ae + SP.Ao.H0]$_{dword}$ }<br>PE.Rto\|\|Rte ←SP.BrData[63:0] |
| LBRMX.P.W | Rt, Ae, -Ao, UPDATE7 | if (SP/PE0) {<br>SP.Ao.H0 ←SP.Ao.H0 - (UPDATE7 * 4)<br>if (SP.Ao.H0 < 0)<br>SP.Ao.H0 ←SP.Ao.H0 + SP.Ao.H1<br>SP.BrData[31:0] ←SP.Mem[SP.Ae + SP.Ao.H0]$_{word}$ }<br>PE.Rt ←SP.BrData[31:0] |
| LBRMX.P.H0 | Rt, Ae, -Ao, UPDATE7 | if (SP/PE0) {<br>SP.Ao.H0 ←SP.Ao.H0 - (UPDATE7 * 2)<br>if (SP.Ao.H0 < 0)<br>SP.Ao.H0 ←SP.Ao.H0 + SP.Ao.H1<br>SP.BrData[15:0] ←SP.Mem[SP.Ae + SP.Ao.H0]$_{hword}$ }<br>PE.Rt.H0 ←SP.BrData[15:0] |
| LBRMX.P.H0.X | Rt, Ae, -Ao, UPDATE7 | if (SP/PE0) {<br>SP.Ao.H0 ←SP.Ao.H0 - (UPDATE7 * 2)<br>if (SP.Ao.H0 < 0)<br>SP.Ao.H0 ←SP.Ao.H0 + SP.Ao.H1<br>SP.BrData[15:0] ←SP.Mem[SP.Ae + SP.Ao.H0]$_{hword}$ }<br>PE.Rt.H0 ←SP.BrData[15:0]<br>PE.Rt.H1 ←0xFFFF if MSB(SP.BrData[15:0])=1<br>PE.Rt.H1 ←0x0000 if MSB(SP.BrData[15:0])=0 |
| LBRMX.P.B0 | Rt, Ae, -Ao, UPDATE7 | if (SP/PE0) {<br>SP.Ao.H0 ←SP.Ao.H0 - UPDATE7<br>if (SP.Ao.H0 < 0)<br>SP.Ao.H0 ←SP.Ao.H0 + SP.Ao.H1<br>SP.BrData[7:0] ←SP.Mem[SP.Ae + SP.Ao.H0]$_{byte}$ }<br>PE.Rt.B0 ←SP.BrData[7:0] |
| LBRMX.P.B0.X | Rt, Ae, -Ao, UPDATE7 | if (SP/PE0) {<br>SP.Ao.H0 ←SP.Ao.H0 - UPDATE7 |

| | | |
|---|---|---|
| | | if (SP.Ao.H0 < 0)<br>SP.Ao.H0 ←SP.Ao.H0 + SP.Ao.H1<br>SP.BrData[7:0] ←SP.Mem[SP.Ae + SP.Ao.H0]$_{byte}$ }<br>PE.Rt.B0 ←SP.BrData[7:0]<br>PE.Rt.B1 ←0xFF if MSB(SP.BrData[7:0])=1<br>PE.Rt.B1 ←0x00 if MSB(SP.BrData[7:0])=0<br>PE.Rt.H1 ←0xFFFF if MSB(SP.BrData[7:0])=1<br>PE.Rt.H1 ←0x0000 if MSB(SP.BrData[7:0])=0 |
| T.LBRMX.P.[DWH0B0].[X] | Rt, Ae, -Ao, UPDATE7 | Do receive operation only if T condition is satisfied in F0 |
| | | Load ARF/MRF Register |
| LBRMX.P.W | AtMRt, Ae, -Ao, UPDATE7 | if (SP/PE0) {<br>SP.Ao.H0 ←SP.Ao.H0 - (UPDATE7 * 4)<br>if (SP.Ao.H0 < 0)<br>SP.Ao.H0 ←SP.Ao.H0 + SP.Ao.H1<br>SP.BrData[31:0] ←SP.Mem[SP.Ae + SP.Ao.H0]$_{word}$ }<br>PE.AtMRt ←SP.BrData[31:0] |
| LBRMX.P.[H0H1] | AtMRt, Ae, -Ao, UPDATE7 | if (SP/PE0) {<br>SP.Ao.H0 ←SP.Ao.H0 - (UPDATE7 * 2)<br>if (SP.Ao.H0 < 0)<br>SP.Ao.H0 ←SP.Ao.H0 + SP.Ao.H1<br>SP.BrData[15:0] ←SP.Mem[SP.Ae + SP.Ao.H0]$_{hword}$ }<br>PE.AtMRt.Hx ←SP.BrData[15:0] *(Note: Hx=H0 or H1)* |
| LBRMX.P.H0.X | AtMRt, Ae, -Ao, UPDATE7 | if (SP/PE0) {<br>SP.Ao.H0 ←SP.Ao.H0 - (UPDATE7 * 2)<br>if (SP.Ao.H0 < 0)<br>SP.Ao.H0 ←SP.Ao.H0 + SP.Ao.H1<br>SP.BrData[15:0] ←SP.Mem[SP.Ae + SP.Ao.H0]$_{hword}$ }<br>PE.AtMRt.H0 ←SP.BrData[15:0]<br>PE.AtMRt.H1 ←0xFFFF if MSB(SP.BrData[15:0])=1<br>PE.AtMRt.H1 ←0x0000 if MSB(SP.BrData[15:0])=0 |
| T.LBRMX.P.[WH0H1].[X] | AtMRt, Ae, -Ao, UPDATE7 | Do receive operation only if T condition is satisfied in F0 |

NOTE: AtMRt is any register except a compute register.

Syntax/Operation (post-increment)

| Instruction | Operands | Operation |
|---|---|---|
| | | Load Compute Register |
| LBRMX.P.D | Rte, Ae, Ao+, UPDATE7 | if (SP/PE0) {<br>SP.BrData[63:0] ←SP.Mem[SP.Ae + SP.Ao.H0]$_{dword}$<br>SP.Ao.H0 ←SP.Ao.H0 + (UPDATE7 * 8)<br>if (SP.Ao.H0 >= SP.Ao.H1)<br>SP.Ao.H0 ←SP.Ao.H0 - SP.Ao.H1 }<br>PE.Rto\|\|Rte ←SP.BrData[63:0] |
| LBRMX.P.W | Rt, Ae, Ao+, UPDATE7 | if (SP/PE0) {<br>SP.BrData[31:0] ←SP.Mem[SP.Ae + SP.Ao.H0]$_{word}$<br>SP.Ao.H0 ←SP.Ao.H0 + (UPDATE7 * 4)<br>if (SP.Ao.H0 >= SP.Ao.H1)<br>SP.Ao.H0 ←SP.Ao.H0 - SP.Ao.H1 }<br>PE.Rt ←SP.BrData[31:0] |
| LBRMX.P.H0 | Rt, Ae, Ao+, UPDATE7 | if (SP/PE0) {<br>SP.BrData[15:0] ←SP.Mem[SP.Ae + SP.Ao.H0]$_{hword}$<br>SP.Ao.H0 ←SP.Ao.H0 + (UPDATE7 * 2)<br>if (SP.Ao.H0 >= SP.Ao.H1)<br>SP.Ao.H0 ←SP.Ao.H0 - SP.Ao.H1 }<br>PE.Rt.H0 ←SP.BrData[15:0] |
| LBRMX.P.H0.X | Rt, Ae, Ao+, UPDATE7 | if (SP/PE0) {<br>SP.BrData[15:0] ←SP.Mem[SP.Ae + SP.Ao.H0]$_{hword}$<br>SP.Ao.H0 ←SP.Ao.H0 + (UPDATE7 * 2)<br>if (SP.Ao.H0 >= SP.Ao.H1)<br>SP.Ao.H0 ←SP.Ao.H0 - SP.Ao.H1 }<br>PE.Rt.H0 ←SP.BrData[15:0]<br>PE.Rt.H1 ←0xFFFF if MSB(SP.BrData[15:0])=1<br>PE.Rt.H1 ←0x0000 if MSB(SP.BrData[15:0])=0 |
| LBRMX.P.B0 | Rt, Ae, Ao+, UPDATE7 | if (SP/PE0) {<br>SP.BrData[7:0] ←SP.Mem[SP.Ae + SP.Ao.H0]$_{byte}$<br>SP.Ao.H0 ←SP.Ao.H0 + UPDATE7<br>if (SP.Ao.H0 >= SP.Ao.H1) |

| | | |
|---|---|---|
| | | SP.Ao.H0 ←SP.Ao.H0 - SP.Ao.H1 }<br>PE.Rt.B0 ←SP.BrData[7:0] |
| LBRMX.P.B0.X | Rt, Ae, Ao+, UPDATE7 | if (SP/PE0) {<br>SP.BrData[7:0] ←SP.Mem[SP.Ae + SP.Ao.H0]$_{byte}$<br>SP.Ao.H0 ←SP.Ao.H0 + UPDATE7<br>if (SP.Ao.H0 >= SP.Ao.H1)<br>SP.Ao.H0 ←SP.Ao.H0 - SP.Ao.H1 }<br>PE.Rt.B0 ←SP.BrData[7:0]<br>PE.Rt.B1 ←0xFF if MSB(SP.BrData[7:0])=1<br>PE.Rt.B1 ←0x00 if MSB(SP.BrData[7:0])=0<br>PE.Rt.H1 ←0xFFFF if MSB(SP.BrData[7:0])=1<br>PE.Rt.H1 ←0x0000 if MSB(SP.BrData[7:0])=0 |
| T.LBRMX.P.[DWH0B0].[X] | Rt, Ae, Ao+, UPDATE7 | Do receive operation only if T condition is satisfied in F0 |
| | | Load ARF/MRF Register |
| LBRMX.P.W | AtMRt, Ae, Ao+, UPDATE7 | if (SP/PE0) {<br>SP.BrData[31:0] ←SP.Mem[SP.Ae + SP.Ao.H0]$_{word}$<br>SP.Ao.H0 ←SP.Ao.H0 + (UPDATE7 * 4)<br>if (SP.Ao.H0 >= SP.Ao.H1)<br>SP.Ao.H0 ←SP.Ao.H0 - SP.Ao.H1 }<br>PE.AtMRt ←SP.BrData[31:0] |
| LBRMX.P.[H0H1] | AtMRt, Ae, Ao+, UPDATE7 | if (SP/PE0) {<br>SP.BrData[15:0] ←SP.Mem[SP.Ae + SP.Ao.H0]$_{hword}$<br>SP.Ao.H0 ←SP.Ao.H0 + (UPDATE7 * 2)<br>if (SP.Ao.H0 >= SP.Ao.H1)<br>SP.Ao.H0 ←SP.Ao.H0 - SP.Ao.H1 }<br>PE.AtMRt.Hx ←SP.BrData[15:0] *(Note: Hx=H0 or H1)* |
| LBRMX.P.H0.X | AtMRt, Ae, Ao+, UPDATE7 | if (SP/PE0) {<br>SP.BrData[15:0] ←SP.Mem[SP.Ae + SP.Ao.H0]$_{hword}$<br>SP.Ao.H0 ←SP.Ao.H0 + (UPDATE7 * 2)<br>if (SP.Ao.H0 >= SP.Ao.H1)<br>SP.Ao.H0 ←SP.Ao.H0 - SP.Ao.H1 }<br>PE.AtMRt.H0 ←SP.BrData[15:0]<br>PE.AtMRt.H1 ←0xFFFF if MSB(SP.BrData[15:0])=1<br>PE.AtMRt.H1 ←0x0000 if MSB(SP.BrData[15:0])=0 |
| T.LBRMX.P.[WH0H1].[X] | AtMRt, Ae, Ao+, UPDATE7 | Do receive operation only if T condition is satisfied in F0 |

NOTE: AtMRt is any register except a compute register.

Arithmetic Flags Affected
None

Cycles: 1

Pipeline Considerations
See Load/Store Instruction Pipeline Considerations.

LBRMXU - Load Broadcast Modulo Indexed with Unscaled Update

BOPS, Inc. - Manta SYSSIM 2.31

Encoding

| 31 30 | 29 | 28 | 27 26 25 | 24 | 23 22 | 21 20 19 18 17 16 | 15 14 | 13 | 12 | 11 | 10 | 9 | 8 7 | 6 5 4 3 | 2 1 | 0 |
|---|---|---|---|---|---|---|---|---|---|---|---|---|---|---|---|---|
| Group | S/P | L/S | 100 | CE1 | Size | 0 Rt<br>0 Rte 0<br>AtMRt | Ae | Mod/Long | Brcst | Sign Ext | Scale | Pre-Dec/Post Inc | UPDATE7[2:1] | UPDATE7[6:3] | Ao | UPDATE7[0] |

Description

Load a byte, halfword, word, or doubleword operand into a PE target register from SP memory. SP even address register *Ae* contains a 32-bit base address of an SP memory buffer. The high halfword of SP odd address register *Ao* contains an unsigned 16-bit value representing the SP memory buffer size in bytes (This is the modulo value). The low halfword of SP *Ao* is an unsigned 16-bit index into the buffer.

The SP index value is updated prior to (pre-decrement) or after (post-increment) its use in forming the operand effective address on SP/PE0. A pre-decrement update involves subtracting the unsigned 7-bit update value *UPDATE7* from the SP index. If the resulting SP index becomes negative, the modulo value is added to the SP index. A post-increment update involves adding the *UPDATE7* to the SP index. If the resulting SP index is greater than or equal to the SP memory buffer size (modulo value), the SP memory buffer size is subtracted from the SP index. The effect of the SP index update is that the SP index moves *UPDATE7* bytes forward or backward within the SP memory buffer.

The SP operand effective address is the sum of the SP base address and the SP index. Byte and halfword operands can be sign-extended to 32-bits.

See the Load Broadcast Instructions Overview for a more detailed description of the functionality of LBRxx instructions.

Syntax/Operation (pre-decrement)

| Instruction | Operands | Operation |
|---|---|---|
| | | Load Compute Register |
| LBRMXU.P.D | Rte, Ae, -Ao, UPDATE7 | if (SP/PE0) {<br>SP.Ao.H0 ←SP.Ao.H0 - UPDATE7<br>if (SP.Ao.H0 < 0)<br>SP.Ao.H0 ←SP.Ao.H0 + SP.Ao.H1<br>SP.BrData[63:0] ←SP.Mem[SP.Ae + SP.Ao.H0]$_{dword}$ }<br>PE.Rto\|\|Rte ←SP.BrData[63:0] |
| LBRMXU.P.W | Rt, Ae, -Ao, UPDATE7 | if (SP/PE0) {<br>SP.Ao.H0 ←SP.Ao.H0 - UPDATE7<br>if (SP.Ao.H0 < 0)<br>SP.Ao.H0 ←SP.Ao.H0 + SP.Ao.H1<br>SP.BrData[31:0] ←SP.Mem[SP.Ae + SP.Ao.H0]$_{word}$ }<br>PE.Rt ←SP.BrData[31:0] |
| LBRMXU.P.H0 | Rt, Ae, -Ao, UPDATE7 | if (SP/PE0) {<br>SP.Ao.H0 ←SP.Ao.H0 - UPDATE7<br>if (SP.Ao.H0 < 0)<br>SP.Ao.H0 ←SP.Ao.H0 + SP.Ao.H1<br>SP.BrData[15:0] ←SP.Mem[SP.Ae + SP.Ao.H0]$_{hword}$ }<br>PE.Rt.H0 ←SP.BrData[15:0] |
| LBRMXU.P.H0.X | Rt, Ae, -Ao, UPDATE7 | if (SP/PE0) {<br>SP.Ao.H0 ←SP.Ao.H0 - UPDATE7<br>if (SP.Ao.H0 < 0)<br>SP.Ao.H0 ←SP.Ao.H0 + SP.Ao.H1<br>SP.BrData[15:0] ←SP.Mem[SP.Ae + SP.Ao.H0]$_{hword}$ }<br>PE.Rt.H0 ←SP.BrData[15:0]<br>PE.Rt.H1 ←0xFFFF if MSB(SP.BrData[15:0])=1<br>PE.Rt.H1 ←0x0000 if MSB(SP.BrData[15:0])=0 |
| LBRMXU.P.B0 | Rt, Ae, -Ao, UPDATE7 | if (SP/PE0) {<br>SP.Ao.H0 ←SP.Ao.H0 - UPDATE7<br>if (SP.Ao.H0 < 0)<br>SP.Ao.H0 ←SP.Ao.H0 + SP.Ao.H1<br>SP.BrData[7:0] ←SP.Mem[SP.Ae + SP.Ao.H0]$_{byte}$ }<br>PE.Rt.B0 ←SP.BrData[7:0] |
| LBRMXU.P.B0.X | Rt, Ae, -Ao, UPDATE7 | if (SP/PE0) {<br>SP.Ao.H0 ←SP.Ao.H0 - UPDATE7<br>if (SP.Ao.H0 < 0) |

| | | |
|---|---|---|
| | | SP.Ao.H0 ←SP.Ao.H0 + SP.Ao.H1<br>SP.BrData[7:0] ←SP.Mem[SP.Ae + SP.Ao.H0]$_{byte}$ }<br>PE.Rt.B0 ←SP.BrData[7:0]<br>PE.Rt.B1 ←0xFF if MSB(SP.BrData[7:0])=1<br>PE.Rt.B1 ←0x00 if MSB(SP.BrData[7:0])=0<br>PE.Rt.H1 ←0xFFFF if MSB(SP.BrData[7:0])=1<br>PE.Rt.H1 ←0x0000 if MSB(SP.BrData[7:0])=0 |
| T.LBRMXU.P.[DWH0B0].[X] | Rt, Ae, -Ao, UPDATE7 | Do receive operation only if T condition is satisfied in F0 |
| | | Load ARF/MRF Register |
| LBRMXU.P.W | AtMRt, Ae, -Ao, UPDATE7 | if (SP/PE0) {<br>SP.Ao.H0 ←SP.Ao.H0 - UPDATE7<br>if (SP.Ao.H0 < 0)<br>SP.Ao.H0 ←SP.Ao.H0 + SP.Ao.H1<br>SP.BrData[31:0] ←SP.Mem[SP.Ae + SP.Ao.H0]$_{word}$ }<br>PE.AtMRt ←SP.BrData[31:0] |
| LBRMXU.P.[H0H1] | AtMRt, Ae, -Ao, UPDATE7 | if (SP/PE0) {<br>SP.Ao.H0 ←SP.Ao.H0 - UPDATE7<br>if (SP.Ao.H0 < 0)<br>SP.Ao.H0 ←SP.Ao.H0 + SP.Ao.H1<br>SP.BrData[15:0] ←SP.Mem[SP.Ae + SP.Ao.H0]$_{hword}$ }<br>PE.AtMRt.Hx ←SP.BrData[15:0] *(Note: Hx=H0 or H1)* |
| LBRMXU.P.H0.X | AtMRt, Ae, -Ao, UPDATE7 | if (SP/PE0) {<br>SP.Ao.H0 ←SP.Ao.H0 - UPDATE7<br>if (SP.Ao.H0 < 0)<br>SP.Ao.H0 ←SP.Ao.H0 + SP.Ao.H1<br>SP.BrData[15:0] ←SP.Mem[SP.Ae + SP.Ao.H0]$_{hword}$ }<br>PE.AtMRt.H0 ←SP.BrData[15:0]<br>PE.AtMRt.H1 ←0xFFFF if MSB(SP.BrData[15:0])=1<br>PE.AtMRt.H1 ←0x0000 if MSB(SP.BrData[15:0])=0 |
| T.LBRMXU.P.[WH0H1].[X] | AtMRt, Ae, -Ao, UPDATE7 | Do receive operation only if T condition is satisfied in F0 |

NOTE: AtMRt is any register except a compute register.

Syntax/Operation (post-increment)

| Instruction | Operands | Operation |
|---|---|---|
| | | Load Compute Register |
| LBRMXU.P.D | Rte, Ae, Ao+, UPDATE7 | if (SP/PE0) {<br>SP.BrData[63:0] ←SP.Mem[SP.Ae + SP.Ao.H0]$_{dword}$<br>SP.Ao.H0 ←SP.Ao.H0 + UPDATE7<br>if (SP.Ao.H0 >= SP.Ao.H1)<br>SP.Ao.H0 ←SP.Ao.H0 - SP.Ao.H1 }<br>PE.Rto\|\|Rte ←SP.BrData[63:0] |
| LBRMXU.P.W | Rt, Ae, Ao+, UPDATE7 | if (SP/PE0) {<br>SP.BrData[31:0] ←SP.Mem[SP.Ae + SP.Ao.H0]$_{word}$<br>SP.Ao.H0 ←SP.Ao.H0 + UPDATE7<br>if (SP.Ao.H0 >= SP.Ao.H1)<br>SP.Ao.H0 SP.Ao.H0 - SP.Ao.H1 }<br>PE.Rt ←SP.BrData[31:0] |
| LBRMXU.P.H0 | Rt, Ae, Ao+, UPDATE7 | if (SP/PE0) {<br>SP.BrData[15:0] SP.Mem[SP.Ae + SP.Ao.H0]$_{hword}$<br>SP.Ao.H0 ←SP.Ao.H0 + UPDATE7<br>if (SP.Ao.H0 >= SP.Ao.H1)<br>SP.Ao.H0 SP.Ao.H0 - SP.Ao.H1 }<br>PE.Rt.H0 ←SP.BrData[15:0] |
| LBRMXU.P.H0.X | Rt, Ae, Ao+, UPDATE7 | if (SP/PE0) {<br>SP.BrData[15:0] SP.Mem[SP.Ae + SP.Ao.H0]$_{hword}$<br>SP.Ao.H0 ←SP.Ao.H0 + UPDATE7<br>if (SP.Ao.H0 >= SP.Ao.H1)<br>SP.Ao.H0 SP.Ao.H0 - SP.Ao.H1 }<br>PE.Rt.H0 ←SP.BrData[15:0]<br>PE.Rt.H1 0xFFFF if MSB(SP.BrData[15:0])=1<br>PE.Rt.H1 ←0x0000 if MSB(SP.BrData[15:0])=0 |
| LBRMXU.P.B0 | Rt, Ae, Ao+, UPDATE7 | if (SP/PE0) {<br>SP.BrData[7:0] SP.Mem[SP.Ae + SP.Ao.H0]$_{byte}$<br>SP.Ao.H0 ←SP.Ao.H0 + UPDATE7<br>if (SP.Ao.H0 >= SP.Ao.H1)<br>SP.Ao.H0 SP.Ao.H0 - SP.Ao.H1 }<br>PE.Rt.B0 ←SP.BrData[7:0] |

| | | |
|---|---|---|
| LBRMXU.P.B0.X | Rt, Ae, Ao+, UPDATE7 | if (SP/PE0) {<br>SP.BrData[7:0] SP.Mem[SP.Ae + SP.Ao.H0]$_{byte}$<br>SP.Ao.H0 ←SP.Ao.H0 + UPDATE7<br>if (SP.Ao.H0 >= SP.Ao.H1)<br>SP.Ao.H0 SP.Ao.H0 - SP.Ao.H1 }<br>PE.Rt.B0 ←SP.BrData[7:0]<br>PE.Rt.B1 0xFF if MSB(SP.BrData[7:0])=1<br>PE.Rt.B1 ←0x00 if MSB(SP.BrData[7:0])=0<br>PE.Rt.H1 0xFFFF if MSB(SP.BrData[7:0])=1<br>PE.Rt.H1 ←0x0000 if MSB(SP.BrData[7:0])=0 |
| T.LBRMXU.P.[DWH0B0].[X] | Rt, Ae, Ao+, UPDATE7 | Do receive operation only if T condition is satisfied in F0 |
| | | Load ARF/MRF Register |
| LBRMXU.P.W | AtMRt, Ae, Ao+, UPDATE7 | if (SP/PE0) {<br>SP.BrData[31:0] SP.Mem[SP.Ae + SP.Ao.H0]$_{word}$<br>SP.Ao.H0 ←SP.Ao.H0 + UPDATE7<br>if (SP.Ao.H0 >= SP.Ao.H1)<br>SP.Ao.H0 SP.Ao.H0 - SP.Ao.H1 }<br>PE.AtMRt ←SP.BrData[31:0] |
| LBRMXU.P.[H0H1] | AtMRt, Ae, Ao+, UPDATE7 | if (SP/PE0) {<br>SP.BrData[15:0] SP.Mem[SP.Ae + SP.Ao.H0]$_{hword}$<br>SP.Ao.H0 ←SP.Ao.H0 + UPDATE7<br>if (SP.Ao.H0 >= SP.Ao.H1)<br>SP.Ao.H0 SP.Ao.H0 - SP.Ao.H1 }<br>PE.AtMRt.Hx ←SP.BrData[15:0] *(Note: Hx=H0 or H1)* |
| LBRMXU.P.H0.X | AtMRt, Ae, Ao+, UPDATE7 | if (SP/PE0) {<br>SP.BrData[15:0] SP.Mem[SP.Ae + SP.Ao.H0]$_{hword}$<br>SP.Ao.H0 ←SP.Ao.H0 + UPDATE7<br>if (SP.Ao.H0 >= SP.Ao.H1)<br>SP.Ao.H0 SP.Ao.H0 - SP.Ao.H1 }<br>PE.AtMRt.H0 ←SP.BrData[15:0]<br>PE.AtMRt.H1 0xFFFF if MSB(SP.BrData[15:0])=1<br>PE.AtMRt.H1 ←0x0000 if MSB(SP.BrData[15:0])=0 |
| T.LBRMXU.P.[WH0H1].[X] | AtMRt, Ae, Ao+, UPDATE7 | Do receive operation only if T condition is satisfied in F0 |

NOTE: AtMRt is any register except a compute register.

Arithmetic Flags Affected
None

Cycles: 1

Pipeline Considerations
See Load/Store Instruction Pipeline Considerations.

LBRTBL - Load Broadcast from Table

BOPS, Inc. - Manta SYSSIM 2.31

Encoding

| 31 30 | 29 | 28 | 27 26 25 | 24 | 23 22 | 21 | 20 19 18 17 | 16 | 15 14 13 | 12 | 11 | 10 | 9 | 8 | 7 | 6 | 5 | 4 3 2 1 0 |
|---|---|---|---|---|---|---|---|---|---|---|---|---|---|---|---|---|---|---|
| Group | S/P | L/S | 101 | CE1 | Size | 0 | Rt | | An | Brcst | Sign Ext | Scale =1 | S/D =0 | Dec/ Inc | Imm/ Rt =1 | Updt An =0 | Rz/ Az | Rz |
| | | | | | | 0 | Rte | 0 | | | | | | | | | | |
| AtMRt | | | 0 | 0 | Az | | | | | | | | | | | | | |

Description

Load a byte, halfword, word, or doubleword operand into a PE target register from a table of elements in SP memory. SP address register *An* contains the base address of the table. SP compute register *Rz* or SP address register *Az* contains the unsigned index of the element to load. The SP index is scaled by the size of the operand being loaded (i.e. no scale for a byte, 2 for a halfword, or 4 for a word) and can be specified to be added to or subtracted from the SP base address. Byte and halfword operands can be sign-extended to 32-bits.

See the Load Broadcast Instructions Overview for a more detailed description of the functionality of LBRxx instructions.

Syntax/Operation

| Instruction | Operands | Operation |
|---|---|---|
| | | Load Compute Register |
| LBRTBL.P.D | Rte, An, ±RzAz | if (SP/PE0) {<br>SP.BrData[63:0] SP.Mem[SP.An ± (SP.RzAz * 8)]dword }<br>PE.Rto\|\|Rte ←SP.BrData[63:0] |
| LBRTBL.P.W | Rt, An, ±RzAz | if (SP/PE0) {<br>SP.BrData[31:0] SP.Mem[SP.An ± (SP.RzAz * 4)]word }<br>PE.Rt ←SP.BrData[31:0] |
| LBRTBL.P.H0 | Rt, An, ±RzAz | if (SP/PE0) {<br>SP.BrData[15:0] SP.Mem[SP.An ± (SP.RzAz * 2)]hword }<br>PE.Rt.H0 ←SP.BrData[15:0] |
| LBRTBL.P.H0.X | Rt, An, ±RzAz | if (SP/PE0) {<br>SP.BrData[15:0] SP.Mem[SP.An ± (SP.RzAz * 2)]hword }<br>PE.Rt.H0 ←SP.BrData[15:0]<br>PE.Rt.H1 0xFFFF if MSB(SP.BrData[15:0])=1<br>PE.Rt.H1 ←0x0000 if MSB(SP.BrData[15:0])=0 |
| LBRTBL.P.B0 | Rt, An, ±RzAz | if (SP/PE0) {<br>SP.BrData[7:0] SP.Mem[SP.An ± SP.RzAz]byte }<br>PE.Rt.B0 ←SP.BrData[7:0] |
| LBRTBL.P.B0.X | Rt, An, ±RzAz | if (SP/PE0) {<br>SP.BrData[7:0] SP.Mem[SP.An ± SP.RzAz]byte }<br>PE.Rt.B0 ←SP.BrData[7:0]<br>PE.Rt.B1 0xFF if MSB(SP.BrData[7:0])=1<br>PE.Rt.B1 ←0x00 if MSB(SP.BrData[7:0])=0<br>PE.Rt.H1 0xFFFF if MSB(SP.BrData[7:0])=1<br>PE.Rt.H1 ←0x0000 if MSB(SP.BrData[7:0])=0 |
| T.LBRTBL.P.[DWH0B0].[X] | Rt, An, ±RzAz | Do receive operation only if T condition is satisfied in F0 |
| | | Load ARF/MRF Register |
| LBRTBL.P.W | AtMRt, An, ±RzAz | if (SP/PE0) {<br>SP.BrData[31:0] SP.Mem[SP.An ± (SP.RzAz * 4)]word }<br>PE.AtMRt ←SP.BrData[31:0] |
| LBRTBL.P.[H0H1] | AtMRt, An, ±RzAz | if (SP/PE0) {<br>SP.BrData[15:0] SP.Mem[SP.An ± (SP.RzAz * 2)]hword }<br>PE.AtMRt.Hx ←SP.BrData[15:0] *(Note: Hx=H0 or H1)* |
| LBRTBL.P.H0.X | AtMRt, An, ±RzAz | if (SP/PE0) {<br>SP.BrData[15:0] SP.Mem[SP.An ± (SP.RzAz * 2)]hword }<br>PE.AtMRt.H0 ←SP.BrData[15:0]<br>PE.AtMRt.H1 0xFFFF if MSB(SP.BrData[15:0])=1<br>PE.AtMRt.H1 ←0x0000 if MSB(SP.BrData[15:0])=0 |
| T.LBRTBL.P.[WH0H1].[X] | AtMRt, An, ±RzAz | Do receive operation only if T condition is satisfied in F0 |

NOTE: AtMRt is any register except a compute register.
NOTE: RzAz is any address or compute register.

Arithmetic Flags Affected
None

Cycles: 1

Pipeline Considerations

See also Load/Store Instruction Pipeline Considerations and Load/Store Indirect Addressing Mode restrictions.

---

LD - Load Direct

BOPS, Inc. - Manta SYSSIM 2.31

Encoding

| 31 30 | 29 | 28 | 27 26 25 | 24 | 23 22 | 21 | 20 19 18 17 | 16 | 15 14 13 12 11 10 9 8 7 6 5 4 3 2 1 0 |
|---|---|---|---|---|---|---|---|---|---|
| Group | S/P | L/S | 011 | CE1 | Size | 0 | Rt | | UADDR16 |
| | | | | | | 0 | Rte | 0 | |
| | | | | | | AtMRt | | | |

Description

Load a byte, halfword, word, or doubleword operand into an SP target register from SP memory or into a PE target register from PE local memory. The operand effective address is created by zero-extending the 16-bit direct address *UADDR16* to 32-bits.

Syntax/Operation

| Instruction | Operands | Operation |
|---|---|---|
| | | Load Compute Register |
| LD.[SP].D | Rte, UADDR16 | Rto\|\|Rte ←Mem[UADDR16]$_{dword}$ |
| LD.[SP].W | Rt, UADDR16 | Rt ←Mem[UADDR16]$_{word}$ |
| LD.[SP].H0 | Rt, UADDR16 | Rt.H0 ←Mem[UADDR16]$_{hword}$ |
| LD.[SP].B0 | Rt, UADDR16 | Rt.B0 ←Mem[UADDR16]$_{byte}$ |
| T.LD.[SP].[DWH0B0] | Rt, UADDR16 | Do operation only if T condition is satisfied in F0 |
| | | Load ARF/MRF Register |
| LD.[SP].W | AtMRt, UADDR16 | AtMRt ←Mem[UADDR16]$_{word}$ |
| LD.[SP].[H0H1] | AtMRt, UADDR16 | AtMRt.Hx ←Mem[UADDR16]$_{hword}$ (Note: Hx=H0 or H1) |
| T.LD.[SP].[WH0H1] | AtMRt, UADDR16 | Do operation only if T condition is satisfied in F0 |

NOTE: AtMRt is any register except a compute register.
Doubleword access must align on doubleword boundaries.

Arithmetic Flags Affected

None

Cycles: 1

Pipeline Considerations

See Load/Store Instruction Pipeline Considerations.

LI - Load Indirect with Scaled Update

BOPS, Inc. - Manta SYSSIM 2.31

Encoding

| 31-30 | 29 | 28 | 27-25 | 24 | 23-22 | 21-16 | 15-13 | 12 | 11 | 10 | 9 | 8 | 7 | 6 | 5 | 4-0 |
|---|---|---|---|---|---|---|---|---|---|---|---|---|---|---|---|---|
| Group | S/P | L/S | 101 | CE1 | Size | 0 Rt<br>0 Rte 0<br>AtMRt | An | Brcst | Sign Ext | Scale | Pre/ Post | Dec/ Inc | Imm/ Rt =1 | Updt An =1 | Rz/ Az | Rz<br>0 0 Az |

Description

Load a byte, halfword, word, or doubleword operand into an SP target register from SP memory or into a PE target register from PE local memory. Source address register *An* is updated prior to (pre-decrement/pre-increment) or after (post-decrement/post-increment) its use as the operand effective address. The update to *An* is an addition or subtraction of compute register *Rz* or address register *Az* scaled by the size of the operand being loaded (i.e. no scale for a byte, 2 for a halfword, 4 for a word, or 8 for a doubleword). Byte and halfword operands can be sign-extended to 32-bits.

Syntax/Operation (pre-decrement / pre-increment)

| Instruction | Operands | Operation |
|---|---|---|
| | | Load Compute Register |
| LI.[SP].D | Rte, ±An, RzAz | An An ± (RzAz * 8)<br>Rto\|\|Rte ←Mem[An]$_{dword}$ |
| LI.[SP].W | Rt, ±An, RzAz | An An ± (RzAz * 4)<br>Rt ←Mem[An]$_{word}$ |
| LI.[SP].H0 | Rt, ±An, RzAz | An An ± (RzAz * 2)<br>Rt.H0 ←Mem[An]$_{hword}$ |
| LI.[SP].H0.X | Rt, ±An, RzAz | An An ± (RzAz * 2)<br>Rt.H0 ←Mem[An]$_{hword}$<br>Rt.H1 0xFFFF if MSB(Mem[An]$_{hword}$)=1<br>Rt.H1 ←0x0000 if MSB(Mem[An]$_{hword}$)=0 |
| LI.[SP].B0 | Rt, ±An, RzAz | An An ± RzAz<br>Rt.B0 ←Mem[An]$_{byte}$ |
| LI.[SP].B0.X | Rt, ±An, RzAz | An An ± RzAz<br>Rt.B0 ←Mem[An]$_{byte}$<br>Rt.B1 0xFF if MSB(Mem[An]$_{byte}$)=1<br>Rt.B1 ←0x00 if MSB(Mem[An]$_{byte}$)=0<br>Rt.H1 0xFFFF if MSB(Mem[An]$_{byte}$)=1<br>Rt.H1 ←0x0000 if MSB(Mem[An]$_{byte}$)=0 |
| T.LI.[SP].[DWH0B0].[X] | Rt, ±An, RzAz | Do operation only if T condition is satisfied in F0 |
| | | Load ARF/MRF Register |
| LI.[SP].W | AtMRt, ±An, RzAz | An An ± (RzAz * 4)<br>AtMRt ←Mem[An]$_{word}$ |
| LI.[SP].[H0H1] | AtMRt, ±An, RzAz | An An ± (RzAz * 2)<br>AtMRt.Hx ←Mem[An]$_{hword}$ *(Note: Hx=H0 or H1)* |
| LI.[SP].H0.X | AtMRt, ±An, RzAz | An An ± (RzAz * 2)<br>AtMRt.H0 ←Mem[An]$_{hword}$<br>AtMRt.H1 0xFFFF if MSB(Mem[An]$_{hword}$)=1<br>AtMRt.H1 ←0x0000 if MSB(Mem[An]$_{hword}$)=0 |
| T.LI.[SP].[WH0H1].[X] | AtMRt, ±An, RzAz | Do operation only if T condition is satisfied in F0 |

NOTE: AtMRt is any register except a compute register
NOTE: RzAz is any address or compute register.
Doubleword access must align on doubleword boundaries.

Syntax/Operation (post-decrement / post-increment)

| Instruction | Operands | Operation |
|---|---|---|
| | | Load Compute Register |
| LI.[SP].D | Rte, An±, RzAz | Rto\|\|Rte Mem[An]$_{dword}$<br>An ←An ± (RzAz * 8) |
| LI.[SP].W | Rt, An±, RzAz | Rt Mem[An]$_{word}$<br>An ←An ± (RzAz * 4) |
| LI.[SP].H0 | Rt, An±, RzAz | Rt.H0 Mem[An]$_{hword}$<br>An ←An ± (RzAz * 2) |
| LI.[SP].H0.X | Rt, An±, RzAz | Rt.H0 Mem[An]$_{hword}$<br>Rt.H1 ←0xFFFF if MSB(Mem[An]$_{hword}$)=1<br>Rt.H1 0x0000 if MSB(Mem[An]$_{hword}$)=0<br>An ←An ± (RzAz * 2) |

| | | |
|---|---|---|
| LI.[SP].B0 | Rt, An±, RzAz | Rt.B0 Mem[An]$_{byte}$<br>An ←An ± RzAz |
| LI.[SP].B0.X | Rt, An±, RzAz | Rt.B0 Mem[An]$_{byte}$<br>Rt.B1 ←0xFF if MSB(Mem[An]$_{byte}$)=1<br>Rt.B1 0x00 if MSB(Mem[An]$_{byte}$)=0<br>Rt.H1 ←0xFFFF if MSB(Mem[An]$_{byte}$)=1<br>Rt.H1 0x0000 if MSB(Mem[An]$_{byte}$)=0<br>An ←An ± RzAz |
| T.LI.[SP].[DWH0B0].[X] | Rt, An±, RzAz | Do operation only if T condition is satisfied in F0 |
| | | Load ARF/MRF Register |
| LI.[SP].W | AtMRt, An±, RzAz | AtMRt Mem[An]$_{word}$<br>An ←An ± (RzAz * 4) |
| LI.[SP].[H0H1] | AtMRt, An±, RzAz | AtMRt.Hx Mem[An]$_{hword}$ *(Note: Hx=H0 or H1)*<br>An ←An ± (RzAz * 2) |
| LI.[SP].H0.X | AtMRt, An±, RzAz | AtMRt.H0 Mem[An]$_{hword}$<br>AtMRt.H1 ←0xFFFF if MSB(Mem[An]$_{hword}$)=1<br>AtMRt.H1 0x0000 if MSB(Mem[An]$_{hword}$)=0<br>An ←An ± (RzAz * 2) |
| T.LI.[SP].[WH0H1].[X] | AtMRt, An±, RzAz | Do operation only if T condition is satisfied in F0 |

NOTE: AtMRt is any register except a compute register
NOTE: RzAz is any address or compute register.
Doubleword access must align on doubleword boundaries.

Arithmetic Flags Affected
None

Cycles: 1

Pipeline Considerations
See also Load/Store Instruction Pipeline Considerations and Load/Store Indirect Addressing Mode restrictions.

LII - Load Indirect with Scaled Immediate Update

BOPS, Inc. - Manta SYSSIM 2.31

Encoding

| 31 30 | 29 | 28 | 27 26 25 | 24 | 23 22 | 21 20 19 18 17 16 | 15 14 13 | 12 | 11 | 10 | 9 | 8 | 7 | 6 5 4 3 2 1 0 |
|---|---|---|---|---|---|---|---|---|---|---|---|---|---|---|
| Group | S/P | L/S | 101 | CE1 | Size | 0 Rt / 0 Rte 0 / AtMRt | An | Brcst | Sign Ext | Scale | Pre/Post | Dec/Inc | Imm/Rt =0 | UPDATE7 |

Description
Load a byte, halfword, word, or doubleword operand into an SP target register from SP memory or into a PE target register from PE local memory. Source address register *An* is updated prior to (pre-decrement/pre-increment) or after (post-decrement/post-increment) its use as the operand effective address. The update to *An* is an addition or subtraction of the unsigned 7-bit update value *UPDATE7* scaled by the size of the operand being loaded (i.e. no scale for a byte, 2 for a halfword, 4 for a word, or 8 for a doubleword). Byte and halfword operands can be sign-extended to 32-bits.

Syntax/Operation (pre-decrement / pre-increment)

| Instruction | Operands | Operation |
|---|---|---|
| | | Load Compute Register |
| LII.[SP].D | Rte, ±An, UPDATE7 | An An ± (UPDATE7 * 8)<br>Rto\|\|Rte ←Mem[An]dword |
| LII.[SP].W | Rt, ±An, UPDATE7 | An An ± (UPDATE7 * 4)<br>Rt ←Mem[An]word |
| LII.[SP].H0 | Rt, ±An, UPDATE7 | An An ± (UPDATE7 * 2)<br>Rt.H0 ←Mem[An]hword |
| LII.[SP].H0.X | Rt, ±An, UPDATE7 | An An ± (UPDATE7 * 2)<br>Rt.H0 ←Mem[An]hword<br>Rt.H1 0xFFFF if MSB(Mem[An]hword)=1<br>Rt.H1 ←0x0000 if MSB(Mem[An]hword)=0 |
| LII.[SP].B0 | Rt, ±An, UPDATE7 | An An ± UPDATE7<br>Rt.B0 ←Mem[An]byte |
| LII.[SP].B0.X | Rt, ±An, UPDATE7 | An An ± UPDATE7<br>Rt.B0 ←Mem[An]byte<br>Rt.B1 0xFF if MSB(Mem[An]byte)=1<br>Rt.B1 ←0x00 if MSB(Mem[An]byte)=0<br>Rt.H1 0xFFFF if MSB(Mem[An]byte)=1<br>Rt.H1 ←0x0000 if MSB(Mem[An]byte)=0 |
| T.LII.[SP].[DWH0B0].[X] | Rt, ±An, UPDATE7 | Do operation only if T condition is satisfied in F0 |
| | | Load ARF/MRF Register |
| LII.[SP].W | AtMRt, ±An, UPDATE7 | An An ± (UPDATE7 * 4)<br>AtMRt ←Mem[An]word |
| LII.[SP].[H0H1] | AtMRt, ±An, UPDATE7 | An An ± (UPDATE7 * 2)<br>AtMRt.Hx ←Mem[An]hword *(Note: Hx=H0 or H1)* |
| LII.[SP].H0.X | AtMRt, ±An, UPDATE7 | An An ± (UPDATE7 * 2)<br>AtMRt.H0 ←Mem[An]hword<br>AtMRt.H1 0xFFFF if MSB(Mem[An]hword)=1<br>AtMRt.H1 ←0x0000 if MSB(Mem[An]hword)=0 |
| T.LII.[SP].[WH0H1].[X] | AtMRt, ±An, UPDATE7 | Do operation only if T condition is satisfied in F0 |

NOTE: AtMRt is any register except a compute register.
Doubleword access must align on doubleword boundaries.

Syntax/Operation (post-decrement / post-increment)

| Instruction | Operands | Operation |
|---|---|---|
| | | Load Compute Register |
| LII.[SP].D | Rte, An±, UPDATE7 | Rto\|\|Rte Mem[An]dword<br>An ←An ± (UPDATE7 * 8) |
| LII.[SP].W | Rt, An±, UPDATE7 | Rt Mem[An]word<br>An ←An ± (UPDATE7 * 4) |
| LII.[SP].H0 | Rt, An±, UPDATE7 | Rt.H0 Mem[An]hword<br>An ←An ± (UPDATE7 * 2) |
| LII.[SP].H0.X | Rt, An±, UPDATE7 | Rt.H0 Mem[An]hword<br>Rt.H1 ←0xFFFF if MSB(Mem[An]hword)=1<br>Rt.H1 0x0000 if MSB(Mem[An]hword)=0<br>An ←An ± (UPDATE7 * 2) |

| | | |
|---|---|---|
| LII.[SP].B0 | Rt, An±, UPDATE7 | Rt.B0 Mem[An]$_{byte}$<br>An ←An ± UPDATE7 |
| LII.[SP].B0.X | Rt, An±, UPDATE7 | Rt.B0 Mem[An]$_{byte}$<br>Rt.B1 ←0xFF if MSB(Mem[An]$_{byte}$)=1<br>Rt.B1 0x00 if MSB(Mem[An]$_{byte}$)=0<br>Rt.H1 ←0xFFFF if MSB(Mem[An]$_{byte}$)=1<br>Rt.H1 0x0000 if MSB(Mem[An]$_{byte}$)=0<br>An ←An ± UPDATE7 |
| T.LII.[SP].[DWH0B0].[X] | Rt, An±, UPDATE7 | Do operation only if T condition is satisfied in F0 |
| | | Load ARF/MRF Register |
| LII.[SP].W | AtMRt, An±, UPDATE7 | AtMRt Mem[An]$_{word}$<br>An ←An ± (UPDATE7 * 4) |
| LII.[SP].[H0H1] | AtMRt, An±, UPDATE7 | AtMRt.Hx Mem[An]$_{hword}$ *(Note: Hx=H0 or H1)*<br>An ←An ± (UPDATE7 * 2) |
| LII.[SP].H0.X | AtMRt, An±, UPDATE7 | AtMRt.H0 Mem[An]$_{hword}$<br>AtMRt.H1 ←0xFFFF if MSB(Mem[An]$_{hword}$)=1<br>AtMRt.H1 0x0000 if MSB(Mem[An]$_{hword}$)=0<br>An ←An ± (UPDATE7 * 2) |
| T.LII.[SP].[WH0H1].[X] | AtMRt, An±, UPDATE7 | Do operation only if T condition is satisfied in F0 |

NOTE: AtMRt is any register except a compute register.
Doubleword access must align on doubleword boundaries.

Arithmetic Flags Affected
None

Cycles: 1

Pipeline Considerations
See Load/Store Instruction Pipeline Considerations.

LIM - Load Immediate

BOPS, Inc. - Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | L/S | 000 | | | CE1 | LOC | | $Rt_{5-0}$ | | | | | | IMM16 | | | | | | | | | | | | | | | |

Description

The halfword form of LIM loads a 16-bit immediate value into the upper halfword *(H1)* or lower halfword *(H0)* of an SP or PE target register *Rt*. The 16-bit immediate value is interpreted as a sign "neutral" value, meaning that any value in the range -32768 to 65535 is accepted. (This covers the 2's complement signed value range of -32768 to +32767 and the unsigned value range of 0 to 65535).

The word form of LIM loads a signed-extended 17-bit immediate value into the target register. The 17-bit signed value may be any value in the range -65536 to 65535. The encoding for the word form of LIM puts the magnitude of the value into the *IMM16* field and the sign bit is the *LOC* field. The LOC field determines if the upper halfword is filled with all one or all zero bits.

Codings for typical and boundary values for the word form of LIM are shown in the table below.

| IMM17 (Dec) | Rt (Hex) |
|---|---|
| - 65536 | 0xFFFF0000 |
| ... | ... |
| - 32769 | 0xFFFF7FFF |
| - 32768 | 0xFFFF8000 |
| ... | ... |
| - 00001 | 0xFFFFFFFF |
| 00000 | 0x00000000 |
| +00001 | 0x00000001 |
| ... | ... |
| +32767 | 0x00007FFF |
| +32768 | 0x00008000 |
| ... | ... |
| +65535 | 0x0000FFFF |

Syntax/Operation

| Instruction | Operands | Operation |
|---|---|---|
| | | Word |
| LIM.[SP].W | Rt, IMM17 | if (MSB(IMM17) == 1) Rt.H1 ←0xFFFF<br>if (MSB(IMM17) == 0) Rt.H1 ←0x0000<br>Rt.H0 ←IMM16 |
| T.LIM.[SP].W | Rt, IMM17 | Do operation only if T condition is satisfied in F0 |
| | | Halfword |
| LIM.[SP].H1 | Rt, IMM16 | Rt.H1 ←IMM16 |
| LIM.[SP].H0 | Rt, IMM16 | Rt.H0 ←IMM16 |
| T.LIM.[SP].[H0H1] | Rt, IMM16 | Do operation only if T condition is satisfied in F0 |

Arithmetic Flags Affected

None

Cycles: 1

Pipeline Considerations

Address registers are loaded in the Decode stage of the pipeline. Non-address registers are loaded in the Execute stage. See also Load/Store Instruction Pipeline Considerations.

LIU - Load Indirect with Unscaled Update

BOPS, Inc. - Manta SYSSIM 2.31

Encoding

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="2" rowspan="2">Group</td><td rowspan="2">S/P</td><td rowspan="2">L/S</td><td colspan="3" rowspan="2">101</td><td rowspan="2">CE1</td><td colspan="2" rowspan="2">Size</td><td>0</td><td colspan="5">Rt</td><td colspan="3" rowspan="2">An</td><td rowspan="2">Brcst</td><td rowspan="2">Sign Ext</td><td rowspan="2">Scale</td><td rowspan="2">Pre/ Post</td><td rowspan="2">Dec/ Inc</td><td rowspan="2">Imm/ Rt =1</td><td rowspan="2">Updt An =1</td><td rowspan="2">Rz/ Az</td><td colspan="5" rowspan="2">Rz</td></tr>
<tr><td>0</td><td colspan="4">Rte</td><td>0</td></tr>
<tr><td colspan="6">AtMRt</td><td>0</td><td>0</td><td colspan="3">Az</td><td colspan="21"></td></tr>
</table>

Description

Load a byte, halfword, word, or doubleword operand into an SP target register from SP memory or into a PE target register from PE local memory. Source address register *An* is updated prior to (pre-decrement/pre-increment) or after (post-decrement/post-increment) its use as the operand effective address. The update to *An* is an addition or subtraction of compute register *Rz* or address register *Az*. Byte and halfword operands can be sign-extended to 32-bits.

Syntax/Operation (pre-decrement / pre-increment)

| Instruction | Operands | Operation |
|---|---|---|
| | | Load Compute Register |
| LIU.[SP].D | Rte, ±An, RzAz | An ←An ± RzAz<br>Rto\|\|Rte ←Mem[An]$_{dword}$ |
| LIU.[SP].W | Rt, ±An, RzAz | An ←An ± RzAz<br>Rt ←Mem[An]$_{word}$ |
| LIU.[SP].H0 | Rt, ±An, RzAz | An ←An ± RzAz<br>Rt.H0 ←Mem[An]$_{hword}$ |
| LIU.[SP].H0.X | Rt, ±An, RzAz | An ←An ± RzAz<br>Rt.H0 ←Mem[An]$_{hword}$<br>Rt.H1 ←0xFFFF if MSB(Mem[An]$_{hword}$)=1<br>Rt.H1 ←0x0000 if MSB(Mem[An]$_{hword}$)=0 |
| LIU.[SP].B0 | Rt, ±An, RzAz | An ←An ± RzAz<br>Rt.B0 ←Mem[An]$_{byte}$ |
| LIU.[SP].B0.X | Rt, ±An, RzAz | An ←An ± RzAz<br>Rt.B0 ←Mem[An]$_{byte}$<br>Rt.B1 ←0xFF if MSB(Mem[An]$_{byte}$)=1<br>Rt.B1 ←0x00 if MSB(Mem[An]$_{byte}$)=0<br>Rt.H1 ←0xFFFF if MSB(Mem[An]$_{byte}$)=1<br>Rt.H1 ←0x0000 if MSB(Mem[An]$_{byte}$)=0 |
| T.LIU.[SP].[DWH0B0].[X] | Rt, ±An, RzAz | Do operation only if T condition is satisfied in F0 |
| | | Load ARF/MRF Register |
| LIU.[SP].W | AtMRt, ±An, RzAz | An ←An ± RzAz<br>AtMRt ←Mem[An]$_{word}$ |
| LIU.[SP].[H0H1] | AtMRt, ±An, RzAz | An ←An ± RzAz<br>AtMRt.Hx ←Mem[An]$_{hword}$ *(Note: Hx=H0 or H1)* |
| LIU.[SP].H0.X | AtMRt, ±An, RzAz | An ←An ± RzAz<br>AtMRt.H0 ←Mem[An]$_{hword}$<br>AtMRt.H1 ←0xFFFF if MSB(Mem[An]$_{hword}$)=1<br>AtMRt.H1 ←0x0000 if MSB(Mem[An]$_{hword}$)=0 |
| T.LIU.[SP].[WH0H1].[X] | AtMRt, ±An, RzAz | Do operation only if T condition is satisfied in F0 |

NOTE: AtMRt is any register except a compute register.
NOTE: RzAz is any address or compute register.
Doubleword access must align on doubleword boundaries.

Syntax/Operation (post-decrement / post-increment)

| Instruction | Operands | Operation |
|---|---|---|
| | | Load Compute Register |
| LIU.[SP].D | Rte, An±, RzAz | Rto\|\|Rte ←Mem[An]$_{dword}$<br>An ←An ± RzAz |
| LIU.[SP].W | Rt, An±, RzAz | Rt ←Mem[An]$_{word}$<br>An ←An ± RzAz |
| LIU.[SP].H0 | Rt, An±, RzAz | Rt.H0 ←Mem[An]$_{hword}$<br>An ←An ± RzAz |
| LIU.[SP].H0.X | Rt, An±, RzAz | Rt.H0 ←Mem[An]$_{hword}$<br>Rt.H1 ←0xFFFF if MSB(Mem[An]$_{hword}$)=1 |

| | | |
|---|---|---|
| | | Rt.H1 ←0x0000 if MSB(Mem[An]$_{hword}$)=0<br>An ←An ± RzAz |
| LIU.[SP].B0 | Rt, An±, RzAz | Rt.B0 ←Mem[An]$_{byte}$<br>An ←An ± RzAz |
| LIU.[SP].B0.X | Rt, An±, RzAz | Rt.B0 ←Mem[An]$_{byte}$<br>Rt.B1 ←0xFF if MSB(Mem[An]$_{byte}$)=1<br>Rt.B1 ←0x00 if MSB(Mem[An]$_{byte}$)=0<br>Rt.H1 ←0xFFFF if MSB(Mem[An]$_{byte}$)=1<br>Rt.H1 ←0x0000 if MSB(Mem[An]$_{byte}$)=0<br>An ←An ± RzAz |
| T.LIU.[SP].[DWH0B0].[X] | Rt, An±, RzAz | Do operation only if T condition is satisfied in F0 |
| | | Load ARF/MRF Register |
| LIU.[SP].W | AtMRt, An±, RzAz | AtMRt ←Mem[An]$_{word}$<br>An ←An ± RzAz |
| LIU.[SP].[H0H1] | AtMRt, An±, RzAz | AtMRt.Hx ←Mem[An]$_{hword}$ *(Note: Hx=H0 or H1)*<br>An ←An ± RzAz |
| LIU.[SP].H0.X | AtMRt, An±, RzAz | AtMRt.H0 ←Mem[An]$_{hword}$<br>AtMRt.H1 ←0xFFFF if MSB(Mem[An]$_{hword}$)=1<br>AtMRt.H1 ←0x0000 if MSB(Mem[An]$_{hword}$)=0<br>An ←An ± RzAz |
| T.LIU.[SP].[WH0H1].[X] | AtMRt, An±, RzAz | Do operation only if T condition is satisfied in F0 |

NOTE: AtMRt is any register except a compute register.
NOTE: RzAz is any address or compute register.
Doubleword access must align on doubleword boundaries.

Arithmetic Flags Affected
None

Cycles: 1

Pipeline Considerations
See also Load/Store Instruction Pipeline Considerations and Load/Store Indirect Addressing Mode restrictions.

←

LIUI - Load Indirect with Unscaled Immediate Update

BOPS, Inc. - Manta SYSSIM 2.31

Encoding

| 31 30 | 29 | 28 | 27 26 25 | 24 | 23 22 | 21 20 19 18 17 16 | 15 14 13 | 12 | 11 | 10 | 9 | 8 | 7 | 6 5 4 3 2 1 0 |
|---|---|---|---|---|---|---|---|---|---|---|---|---|---|---|
| Group | S/P | L/S | 101 | CE1 | Size | 0 Rt | An | Brcst | Sign Ext | Scale | Pre/ Post | Dec/ Inc | Imm/ Rt =0 | UPDATE7 |
| | | | | | | 0 Rte 0 | | | | | | | | |
| | | | | | | AtMRt | | | | | | | | |

Description
Load a byte, halfword, word, or doubleword operand into an SP target register from SP memory or into a PE target register from PE local memory. Source address register *An* is updated prior to (pre-decrement/pre-increment) or after (post-decrement/post-increment) its use as the operand effective address. The update to *An* is an addition or subtraction of the unsigned 7-bit update value *UPDATE7*. Byte and halfword operands can be sign-extended to 32-bits.

Syntax/Operation (pre-decrement / pre-increment)

| Instruction | Operands | Operation |
|---|---|---|
| | | Load Compute Register |
| LIUI.[SP].D | Rte, ±An, UPDATE7 | An ←An ± UPDATE7<br>Rto\|\|Rte ←Mem[An]$_{dword}$ |
| LIUI.[SP].W | Rt, ±An, UPDATE7 | An ←An ± UPDATE7<br>Rt ←Mem[An]$_{word}$ |
| LIUI.[SP].H0 | Rt, ±An, UPDATE7 | An ←An ± UPDATE7<br>Rt.H0 ←Mem[An]$_{hword}$ |
| LIUI.[SP].H0.X | Rt, ±An, UPDATE7 | An ←An ± UPDATE7<br>Rt.H0 ←Mem[An]$_{hword}$<br>Rt.H1 ←0xFFFF if MSB(Mem[An]$_{hword}$)=1<br>Rt.H1 ←0x0000 if MSB(Mem[An]$_{hword}$)=0 |
| LIUI.[SP].B0 | Rt, ±An, UPDATE7 | An ←An ± UPDATE7<br>Rt.B0 ←Mem[An]$_{byte}$ |
| LIUI.[SP].B0.X | Rt, ±An, UPDATE7 | An ←An ± UPDATE7<br>Rt.B0 ←Mem[An]$_{byte}$<br>Rt.B1 ←0xFF if MSB(Mem[An]$_{byte}$)=1<br>Rt.B1 ←0x00 if MSB(Mem[An]$_{byte}$)=0<br>Rt.H1 ←0xFFFF if MSB(Mem[An]$_{byte}$)=1<br>Rt.H1 ←0x0000 if MSB(Mem[An]$_{byte}$)=0 |
| T.LIUI.[SP].[DWH0B0].[X] | Rt, ±An, UPDATE7 | Do operation only if T condition is satisfied in F0 |
| | | Load ARF/MRF Register |
| LIUI.[SP].W | AtMRt, ±An, UPDATE7 | An ←An ± UPDATE7<br>AtMRt ←Mem[An]$_{word}$ |
| LIUI.[SP].[H0H1] | AtMRt, ±An, UPDATE7 | An ←An ± UPDATE7<br>AtMRt.Hx ←Mem[An]$_{hword}$ *(Note: Hx=H0 or H1)* |
| LIUI.[SP].H0.X | AtMRt, ±An, UPDATE7 | An ←An ± UPDATE7<br>AtMRt.H0 ←Mem[An]$_{hword}$<br>AtMRt.H1 ←0xFFFF if MSB(Mem[An]$_{hword}$)=1<br>AtMRt.H1 ←0x0000 if MSB(Mem[An]$_{hword}$)=0 |
| T.LIUI.[SP].[WH0H1].[X] | AtMRt, ±An, UPDATE7 | Do operation only if T condition is satisfied in F0 |

NOTE: AtMRt is any register except a compute register.
Doubleword access must align on doubleword boundaries.

Syntax/Operation (post-decrement / post-increment)

| Instruction | Operands | Operation |
|---|---|---|
| | | Load Compute Register |
| LIUI.[SP].D | Rte, An±, UPDATE7 | Rto\|\|Rte ←Mem[An]$_{dword}$<br>An ←An ± UPDATE7 |
| LIUI.[SP].W | Rt, An±, UPDATE7 | Rt ←Mem[An]$_{word}$<br>An ←An ± UPDATE7 |
| LIUI.[SP].H0 | Rt, An±, UPDATE7 | Rt.H0 ←Mem[An]$_{hword}$<br>An ←An ± UPDATE7 |
| LIUI.[SP].H0.X | Rt, An±, UPDATE7 | Rt.H0 ←Mem[An]$_{hword}$<br>Rt.H1 ←0xFFFF if MSB(Mem[An]$_{hword}$)=1 |

| | | |
|---|---|---|
| | | Rt.H1 ←0x0000 if MSB(Mem[An]$_{hword}$)=0<br>An ←An ± UPDATE7 |
| LIUI.[SP].B0 | Rt, An±, UPDATE7 | Rt.B0 ←Mem[An]$_{byte}$<br>An ←An ± UPDATE7 |
| LIUI.[SP].B0.X | Rt, An±, UPDATE7 | Rt.B0 ←Mem[An]$_{byte}$<br>Rt.B1 ←0xFF if MSB(Mem[An]$_{byte}$)=1<br>Rt.B1 ←0x00 if MSB(Mem[An]$_{byte}$)=0<br>Rt.H1 ←0xFFFF if MSB(Mem[An]$_{byte}$)=1<br>Rt.H1 ←0x0000 if MSB(Mem[An]$_{byte}$)=0<br>An ←An ± UPDATE7 |
| T.LIUI.[SP].[DWH0B0].[X] | Rt, An±, UPDATE7 | Do operation only if T condition is satisfied in F0 |
| | | Load ARF/MRF Register |
| LIUI.[SP].W | AtMRt, An±, UPDATE7 | AtMRt ←Mem[An]$_{word}$<br>An ←An ± UPDATE7 |
| LIUI.[SP].[H0H1] | AtMRt, An±, UPDATE7 | AtMRt.Hx ←Mem[An]$_{hword}$ *(Note: Hx=H0 or H1)*<br>An ←An ± UPDATE7 |
| LIUI.[SP].H0.X | AtMRt, An±, UPDATE7 | AtMRt.H0 ←Mem[An]$_{hword}$<br>AtMRt.H1 ←0xFFFF if MSB(Mem[An]$_{hword}$)=1<br>AtMRt.H1 ←0x0000 if MSB(Mem[An]$_{hword}$)=0<br>An ←An ± UPDATE7 |
| T.LIUI.[SP].[WH0H1].[X] | AtMRt, An±, UPDATE7 | Do operation only if T condition is satisfied in F0 |

NOTE: AtMRt is any register except a compute register.
Doubleword access must align on doubleword boundaries.

Arithmetic Flags Affected
None

Cycles: 1

Pipeline Considerations
See Load/Store Instruction Pipeline Considerations.

←

LMX - Load Modulo Indexed with Scaled Update

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | L/S | 100 | | | CE1 | Size | | Rt / 0 Rte / AtMRt | | | | | 0 / 0 | Ae | | Mod/Long | Brcst | Sign Ext | Scale | Pre-Dec/Post Inc | UPDATE7[2:1] | | UPDATE7[6:3] | | | | Ao | | UPDATE7[0] |

Description
Load a byte, halfword, word, or doubleword operand into an SP target register from SP memory or into a PE target register from PE local memory. Even address register *Ae* contains a 32-bit base address of a memory buffer. The high halfword of odd address register *Ao* contains an unsigned 16-bit value representing the memory buffer size in bytes (This is the modulo value). The low halfword of *Ao* is an unsigned 16-bit index into the buffer.

The index value is updated prior to (pre-decrement) or after (post-increment) its use in forming the operand effective address. A pre-decrement update involves subtracting the unsigned 7-bit update value *UPDATE7* scaled by the size of the operand being loaded (i.e. no scale for a byte, 2 for a halfword, 4 for a word, or 8 for a doubleword) from the index. If the resulting index becomes negative, the modulo value is added to the index. A post-increment update involves adding the scaled *UPDATE7* to the index. If the resulting index is greater than or equal to the memory buffer size (modulo value), the memory buffer size is subtracted from the index. The effect of the index update is that the index moves a scaled *UPDATE7* bytes forward or backward within the memory buffer.

The operand effective address is the sum of the base address and the index. Byte and halfword operands can be sign-extended to 32-bits.

Syntax/Operation (pre-decrement)

| Instruction | Operands | Operation |
|---|---|---|
| | | Load Compute Register |
| LMX.[SP].D | Rte, Ae, -Ao, UPDATE7 | Ao.H0 ←Ao.H0 - (UPDATE7 * 8)<br>if (Ao.H0 < 0) Ao.H0 ←Ao.H0 + Ao.H1<br>Rto\|\|Rte ←Mem[Ae + Ao.H0]$_{dword}$ |
| LMX.[SP].W | Rt, Ae, -Ao, UPDATE7 | Ao.H0 ←Ao.H0 - (UPDATE7 * 4)<br>if (Ao.H0 < 0)<br>Ao.H0 ←Ao.H0 + Ao.H1<br>Rt ←Mem[Ae + Ao.H0]$_{word}$ |
| LMX.[SP].H0 | Rt, Ae, -Ao, UPDATE7 | Ao.H0 ←Ao.H0 - (UPDATE7 * 2)<br>if (Ao.H0 < 0)<br>Ao.H0 ←Ao.H0 + Ao.H1<br>Rt.H0 ←Mem[Ae + Ao.H0]$_{hword}$ |
| LMX.[SP].H0.X | Rt, Ae, -Ao, UPDATE7 | Ao.H0 ←Ao.H0 - (UPDATE7 * 2)<br>if (Ao.H0 < 0)<br>Ao.H0 ←Ao.H0 + Ao.H1<br>Rt.H0 ←Mem[Ae + Ao.H0]$_{hword}$<br>Rt.H1 ←0xFFFF if MSB(Mem[Ae + Ao.H0]$_{hword}$)=1<br>Rt.H1 ←0x0000 if MSB(Mem[Ae + Ao.H0]$_{hword}$)=0 |
| LMX.[SP].B0 | Rt, Ae, -Ao, UPDATE7 | Ao.H0 ←Ao.H0 - UPDATE7<br>if (Ao.H0 < 0)<br>Ao.H0 ←Ao.H0 + Ao.H1<br>Rt.B0 ←Mem[Ae + Ao.H0]$_{byte}$ |
| LMX.[SP].B0.X | Rt, Ae, -Ao, UPDATE7 | Ao.H0 ←Ao.H0 - UPDATE7<br>if (Ao.H0 < 0)<br>Ao.H0 ←Ao.H0 + Ao.H1<br>Rt.B0 ←Mem[Ae + Ao.H0]$_{byte}$<br>Rt.B1 ←0xFF if MSB(Mem[Ae + Ao.H0]$_{byte}$)=1<br>Rt.B1 ←0x00 if MSB(Mem[Ae + Ao.H0]$_{byte}$)=0<br>Rt.H1 ←0xFFFF if MSB(Mem[Ae + Ao.H0]$_{byte}$)=1<br>Rt.H1 ←0x0000 if MSB(Mem[Ae + Ao.H0]$_{byte}$)=0 |
| T.LMX.[SP].[DWH0B0].[X] | Rt, Ae, -Ao, UPDATE7 | Do operation only if T condition is satisfied in F0 |
| | | Load ARF/MRF Register |
| LMX.[SP].W | AtMRt, Ae, -Ao, UPDATE7 | Ao.H0 ←Ao.H0 - (UPDATE7 * 4)<br>if (Ao.H0 < 0)<br>Ao.H0 ←Ao.H0 + Ao.H1<br>AtMRt ←Mem[Ae + Ao.H0]$_{word}$ |

| | | |
|---|---|---|
| LMX.[SP].[H0H1] | AtMRt, Ae, -Ao, UPDATE7 | Ao.H0 ←Ao.H0 - (UPDATE7 * 2)<br>if (Ao.H0 < 0)<br>Ao.H0 ←Ao.H0 + Ao.H1<br>AtMRt.Hx ←Mem[Ae + Ao.H0]$_{hword}$ *(Note: Hx=H0 or H1)* |
| LMX.[SP].H0.X | AtMRt, Ae, -Ao, UPDATE7 | Ao.H0 ←Ao.H0 - (UPDATE7 * 2)<br>if (Ao.H0 < 0)<br>Ao.H0 ←Ao.H0 + Ao.H1<br>AtMRt.H0 ←Mem[Ae + Ao.H0]$_{hword}$<br>AtMRt.H1 ←0xFFFF if MSB(Mem[Ae + Ao.H0]$_{hword}$)=1<br>AtMRt.H1 ←0x0000 if MSB(Mem[Ae + Ao.H0]$_{hword}$)=0 |
| T.LMX.[SP].[WH0H1].[X] | AtMRt, Ae, -Ao, UPDATE7 | Do operation only if T condition is satisfied in F0 |

NOTE: AtMRt is any register except a compute register.
Doubleword access must align on doubleword boundaries.

Syntax/Operation (post-increment)

| Instruction | Operands | Operation |
|---|---|---|
| | | Load Compute Register |
| LMX.[SP].D | Rte, Ae, Ao+, UPDATE7 | Rto\|\|Rte ←Mem[Ae + Ao.H0]$_{dword}$<br>Ao.H0 ←Ao.H0 + (UPDATE7 * 8)<br>if (Ao.H0 >= Ao.H1)<br>Ao.H0 ←Ao.H0 - Ao.H1 |
| LMX.[SP].W | Rt, Ae, Ao+, UPDATE7 | Rt ←Mem[Ae + Ao.H0]$_{word}$<br>Ao.H0 ←Ao.H0 + (UPDATE7 * 4)<br>if (Ao.H0 >= Ao.H1)<br>Ao.H0 ←Ao.H0 - Ao.H1 |
| LMX.[SP].H0 | Rt, Ae, Ao+, UPDATE7 | Rt.H0 ←Mem[Ae + Ao.H0]$_{hword}$<br>Ao.H0 ←Ao.H0 + (UPDATE7 * 2)<br>if (Ao.H0 >= Ao.H1)<br>Ao.H0 ←Ao.H0 - Ao.H1 |
| LMX.[SP].H0.X | Rt, Ae, Ao+, UPDATE7 | Rt.H0 ←Mem[Ae + Ao.H0]$_{hword}$<br>Rt.H1 ←0xFFFF if MSB(Mem[Ae + Ao.H0]$_{hword}$)=1<br>Rt.H1 ←0x0000 if MSB(Mem[Ae + Ao.H0]$_{hword}$)=0<br>Ao.H0 ←Ao.H0 + (UPDATE7 * 2)<br>if (Ao.H0 >= Ao.H1)<br>Ao.H0 ←Ao.H0 - Ao.H1 |
| LMX.[SP].B0 | Rt, Ae, Ao+, UPDATE7 | Rt.B0 ←Mem[Ae + Ao.H0]$_{byte}$<br>Ao.H0 ←Ao.H0 + UPDATE7<br>if (Ao.H0 >= Ao.H1)<br>Ao.H0 ←Ao.H0 - Ao.H1 |
| LMX.[SP].B0.X | Rt, Ae, Ao+, UPDATE7 | Rt.B0 ←Mem[Ae + Ao.H0]$_{byte}$<br>Rt.B1 ←0xFF if MSB(Mem[Ae + Ao.H0]$_{byte}$)=1<br>Rt.B1 ←0x00 if MSB(Mem[Ae + Ao.H0]$_{byte}$)=0<br>Rt.H1 ←0xFFFF if MSB(Mem[Ae + Ao.H0]$_{byte}$)=1<br>Rt.H1 ←0x0000 if MSB(Mem[Ae + Ao.H0]$_{byte}$)=0<br>Ao.H0 ←Ao.H0 + UPDATE7<br>if (Ao.H0 >= Ao.H1)<br>Ao.H0 ←Ao.H0 - Ao.H1 |
| T.LMX.[SP].[DWH0B0].[X] | Rt, Ae, Ao+, UPDATE7 | Do operation only if T condition is satisfied in F0 |
| | | Load ARF/MRF Register |
| LMX.[SP].W | AtMRt, Ae, Ao+, UPDATE7 | AtMRt ←Mem[Ae + Ao.H0]$_{word}$<br>Ao.H0 ←Ao.H0 + (UPDATE7 * 4)<br>if (Ao.H0 >= Ao.H1)<br>Ao.H0 ←Ao.H0 - Ao.H1 |
| LMX.[SP].[H0H1] | AtMRt, Ae, Ao+, UPDATE7 | AtMRt.Hx ←Mem[Ae + Ao.H0]$_{hword}$ *(Note: Hx=H0 or H1)*<br>Ao.H0 ←Ao.H0 + (UPDATE7 * 2)<br>if (Ao.H0 >= Ao.H1)<br>Ao.H0 ←Ao.H0 - Ao.H1 |
| LMX.[SP].H0.X | AtMRt, Ae, Ao+, UPDATE7 | AtMRt.H0 ←Mem[Ae + Ao.H0]$_{hword}$<br>AtMRt.H1 ←0xFFFF if MSB(Mem[Ae + Ao.H0]$_{hword}$)=1<br>AtMRt.H1 ←0x0000 if MSB(Mem[Ae + Ao.H0]$_{hword}$)=0<br>Ao.H0 ←Ao.H0 + (UPDATE7 * 2)<br>if (Ao.H0 >= Ao.H1)<br>Ao.H0 ←Ao.H0 - Ao.H1 |
| T.LMX.[SP].[WH0H1].[X] | AtMRt, Ae, Ao+, UPDATE7 | Do operation only if T condition is satisfied in F0 |

NOTE: AtMRt is any register except a compute register.
Doubleword access must align on doubleword boundaries.

Arithmetic Flags Affected
None

Cycles: 1

Pipeline Considerations
See Load/Store Instruction Pipeline Considerations.

---

LMXU - Load Modulo Indexed with Unscaled Update

BOPS, Inc. Manta SYSSIM 2.31

Encoding

| 31 30 | 29 | 28 | 27 26 25 | 24 | 23 22 | 21 20 19 18 17 16 | 15 14 | 13 | 12 | 11 | 10 | 9 | 8 7 | 6 5 4 3 | 2 1 | 0 |
|---|---|---|---|---|---|---|---|---|---|---|---|---|---|---|---|---|
| Group | S/P | L/S | 100 | CE1 | Size | 0 Rt<br>0 Rte 0<br>AtMRt | Ae | Mod/Long | Brcst | Sign Ext | Scale | Pre-Dec/Post Inc | UPDATE7$_{[2:1]}$ | UPDATE7$_{[6:3]}$ | Ao | UPDATE7$_{[0]}$ |

Description

Load a byte, halfword, word, or doubleword operand into an SP target register from SP memory or into a PE target register from PE local memory. Even address register *Ae* contains a 32-bit base address of a memory buffer. The high halfword of odd address register *Ao* contains an unsigned 16-bit value representing the memory buffer size in bytes (This is the modulo value). The low halfword of *Ao* is an unsigned 16-bit index into the buffer.

The index value is updated prior to (pre-decrement) or after (post-increment) its use in forming the operand effective address. A pre-decrement update involves subtracting the unsigned 7-bit update value *UPDATE7* from the index. If the resulting index becomes negative, the modulo value is added to the index. A post-increment update involves adding the *UPDATE7* to the index. If the resulting index is greater than or equal to the memory buffer size (modulo value), the memory buffer size is subtracted from the index. The effect of the index update is that the index moves *UPDATE7* bytes forward or backward within the memory buffer.

The operand effective address is the sum of the base address and the index. Byte and halfword operands can be sign-extended to 32-bits.

Syntax/Operation (pre-decrement)

| Instruction | Operands | Operation |
|---|---|---|
| | | Load Compute Register |
| LMXU.[SP].D | Rte, Ae, -Ao, UPDATE7 | Ao.H0 ←Ao.H0 - UPDATE7<br>if (Ao.H0 < 0)<br>Ao.H0 ←Ao.H0 + Ao.H1<br>Rto\|\|Rte ←Mem[Ae + Ao.H0]$_{dword}$ |
| LMXU.[SP].W | Rt, Ae, -Ao, UPDATE7 | Ao.H0 ←Ao.H0 - UPDATE7<br>if (Ao.H0 < 0)<br>Ao.H0 ←Ao.H0 + Ao.H1<br>Rt ←Mem[Ae + Ao.H0]$_{word}$ |
| LMXU.[SP].H0 | Rt, Ae, -Ao, UPDATE7 | Ao.H0 ←Ao.H0 - UPDATE7<br>if (Ao.H0 < 0)<br>Ao.H0 ←Ao.H0 + Ao.H1<br>Rt.H0 ←Mem[Ae + Ao.H0]$_{hword}$ |
| LMXU.[SP].H0.X | Rt, Ae, -Ao, UPDATE7 | Ao.H0 ←Ao.H0 - UPDATE7<br>if (Ao.H0 < 0)<br>Ao.H0 ←Ao.H0 + Ao.H1<br>Rt.H0 ←Mem[Ae + Ao.H0]$_{hword}$<br>Rt.H1 ←0xFFFF if MSB(Mem[Ae + Ao.H0]$_{hword}$)=1<br>Rt.H1 ←0x0000 if MSB(Mem[Ae + Ao.H0]$_{hword}$)=0 |
| LMXU.[SP].B0 | Rt, Ae, -Ao, UPDATE7 | Ao.H0 ←Ao.H0 - UPDATE7<br>if (Ao.H0 < 0)<br>Ao.H0 ←Ao.H0 + Ao.H1<br>Rt.B0 ←Mem[Ae + Ao.H0]$_{byte}$ |
| LMXU.[SP].B0.X | Rt, Ae, -Ao, UPDATE7 | Ao.H0 ←Ao.H0 - UPDATE7<br>if (Ao.H0 < 0)<br>Ao.H0 ←Ao.H0 + Ao.H1<br>Rt.B0 ←Mem[Ae + Ao.H0]$_{byte}$<br>Rt.B1 ←0xFF if MSB(Mem[Ae + Ao.H0]$_{byte}$)=1<br>Rt.B1 ←0x00 if MSB(Mem[Ae + Ao.H0]$_{byte}$)=0<br>Rt.H1 ←0xFFFF if MSB(Mem[Ae + Ao.H0]$_{byte}$)=1<br>Rt.H1 ←0x0000 if MSB(Mem[Ae + Ao.H0]$_{byte}$)=0 |
| T.LMXU.[SP].[DWH0B0].[X] | Rt, Ae, -Ao, UPDATE7 | Do operation only if T condition is satisfied in F0 |
| | | Load ARF/MRF Register |
| LMXU.[SP].W | AtMRt, Ae, -Ao, UPDATE7 | Ao.H0 ←Ao.H0 - UPDATE7<br>if (Ao.H0 < 0)<br>Ao.H0 ←Ao.H0 + Ao.H1<br>AtMRt ←Mem[Ae + Ao.H0]$_{word}$ |

| | | |
|---|---|---|
| LMXU.[SP].[H0H1] | AtMRt, Ae, -Ao, UPDATE7 | Ao.H0 ←Ao.H0 - UPDATE7<br>if (Ao.H0 < 0)<br>Ao.H0 ←Ao.H0 + Ao.H1<br>AtMRt.Hx ←Mem[Ae + Ao.H0]$_{hword}$ *(Note: Hx=H0 or H1)* |
| LMXU.[SP].H0.X | AtMRt, Ae, -Ao, UPDATE7 | Ao.H0 ←Ao.H0 - UPDATE7<br>if (Ao.H0 < 0)<br>Ao.H0 ←Ao.H0 + Ao.H1<br>AtMRt.H0 ←Mem[Ae + Ao.H0]$_{hword}$<br>AtMRt.H1 ←0xFFFF if MSB(Mem[Ae + Ao.H0]$_{hword}$)=1<br>AtMRt.H1 ←0x0000 if MSB(Mem[Ae + Ao.H0]$_{hword}$)=0 |
| T.LMXU.[SP].[WH0H1].[X] | AtMRt, Ae, -Ao, UPDATE7 | Do operation only if T condition is satisfied in F0 |

NOTE: AtMRt is any register except a compute register.
Doubleword access must align on doubleword boundaries.

Syntax/Operation (post-increment)

| Instruction | Operands | Operation |
|---|---|---|
| | | Load Compute Register |
| LMXU.[SP].D | Rte, Ae, Ao+, UPDATE7 | Rto\|\|Rte ←Mem[Ae + Ao.H0]$_{dword}$<br>Ao.H0 ←Ao.H0 + UPDATE7<br>if (Ao.H0 >= Ao.H1)<br>Ao.H0 ←Ao.H0 - Ao.H1 |
| LMXU.[SP].W | Rt, Ae, Ao+, UPDATE7 | Rt ←Mem[Ae + Ao.H0]$_{word}$<br>Ao.H0 ←Ao.H0 + UPDATE7<br>if (Ao.H0 >= Ao.H1)<br>Ao.H0 ←Ao.H0 - Ao.H1 |
| LMXU.[SP].H0 | Rt, Ae, Ao+, UPDATE7 | Rt.H0 ←Mem[Ae + Ao.H0]$_{hword}$<br>Ao.H0 ←Ao.H0 + UPDATE7<br>if (Ao.H0 >= Ao.H1)<br>Ao.H0 ←Ao.H0 - Ao.H1 |
| LMXU.[SP].H0.X | Rt, Ae, Ao+, UPDATE7 | Rt.H0 ←Mem[Ae + Ao.H0]$_{hword}$<br>Rt.H1 ←0xFFFF if MSB([Ae + Ao.H0]$_{hword}$)=1<br>Rt.H1 ←0x0000 if MSB([Ae + Ao.H0]$_{hword}$)=0<br>Ao.H0 ←Ao.H0 + UPDATE7<br>if (Ao.H0 >= Ao.H1)<br>Ao.H0 ←Ao.H0 - Ao.H1 |
| LMXU.[SP].B0 | Rt, Ae, Ao+, UPDATE7 | Rt.B0 ←Mem[Ae + Ao.H0]$_{byte}$<br>Ao.H0 ←Ao.H0 + UPDATE7<br>if (Ao.H0 >= Ao.H1)<br>Ao.H0 ←Ao.H0 - Ao.H1 |
| LMXU.[SP].B0.X | Rt, Ae, Ao+, UPDATE7 | Rt.B0 ←Mem[Ae + Ao.H0]$_{byte}$<br>Rt.B1 ←0xFF if MSB([Ae + Ao.H0]$_{byte}$)=1<br>Rt.B1 ←0x00 if MSB([Ae + Ao.H0]$_{byte}$)=0<br>Rt.H1 ←0xFFFF if MSB([Ae + Ao.H0]$_{byte}$)=1<br>Rt.H1 ←0x0000 if MSB([Ae + Ao.H0]$_{byte}$)=0<br>Ao.H0 ←Ao.H0 + UPDATE7<br>if (Ao.H0 >= Ao.H1)<br>Ao.H0 ←Ao.H0 - Ao.H1 |
| T.LMXU.[SP].[DWH0B0].[X] | Rt, Ae, Ao+, UPDATE7 | Do operation only if T condition is satisfied in F0 |
| | | Load ARF/MRF Register |
| LMXU.[SP].W | AtMRt, Ae, Ao+, UPDATE7 | AtMRt ←Mem[Ae + Ao.H0]$_{word}$<br>Ao.H0 ←Ao.H0 + UPDATE7<br>if (Ao.H0 >= Ao.H1)<br>Ao.H0 ←Ao.H0 - Ao.H1 |
| LMXU.[SP].[H0H1] | AtMRt, Ae, Ao+, UPDATE7 | AtMRt.Hx ←Mem[Ae + Ao.H0]$_{hword}$ *(Note: Hx=H0 or H1)*<br>Ao.H0 ←Ao.H0 + UPDATE7<br>if (Ao.H0 >= Ao.H1)<br>Ao.H0 ←Ao.H0 - Ao.H1 |
| LMXU.[SP].H0.X | AtMRt, Ae, Ao+, UPDATE7 | AtMRt.H0 ←Mem[Ae + Ao.H0]$_{hword}$<br>AtMRt.H1 ←0xFFFF if MSB([Ae + Ao.H0]$_{hword}$)=1<br>AtMRt.H1 ←0x0000 if MSB([Ae + Ao.H0]$_{hword}$)=0<br>Ao.H0 ←Ao.H0 + UPDATE7<br>if (Ao.H0 >= Ao.H1)<br>Ao.H0 ←Ao.H0 - Ao.H1 |
| T.LMXU.[SP].[WH0H1].[X] | AtMRt, Ae, Ao+, UPDATE7 | Do operation only if T condition is satisfied in F0 |

NOTE: AtMRt is any register except a compute register.
Doubleword access must align on doubleword boundaries.

Arithmetic Flags Affected
None

Cycles: 1

Pipeline Considerations
See Load/Store Instruction Pipeline Considerations.

---

LTBL - Load from Table

BOPS, Inc. Manta SYSSIM 2.31

Encoding

| 31 30 | 29 | 28 | 27 26 25 | 24 | 23 22 | 21 20 19 18 17 16 | 15 14 13 | 12 | 11 | 10 | 9 | 8 | 7 | 6 | 5 | 4 3 2 1 0 |
|---|---|---|---|---|---|---|---|---|---|---|---|---|---|---|---|---|
| Group | S/P | L/S | 101 | CE1 | Size | 0 Rt<br>0 Rte 0<br>AtMRt | An | Brcst | Sign Ext | Scale =1 | S/D =0 | Dec/ Inc | Imm/ Reg =1 | Updt An =0 | Rz/ Az | Rz<br>0 0 Az |

Description

Load a byte, halfword or word into an SP target register from a table of elements in SP memory or into a PE target register from a table of elements in PE local memory. Source address register *An* contains the base address of the table. Compute register *Rz* or address register *Az* contains the unsigned index of the element to load. The index can be specified to be added to or subtracted from the base address. Byte and halfword operands can be optionally sign-extended to 32-bits.

Syntax/Operation

| Instruction | Operands | Operation |
|---|---|---|
| | | Load Compute Register |
| LTBL.[SP].D | Rte, An, ±RzAz | Rto\|\|Rte ←Mem[An ± (RzAz * 8)]$_{dword}$ |
| LTBL.[SP].W | Rt, An, ±RzAz | Rt ←Mem[An ± (RzAz * 4)]$_{word}$ |
| LTBL.[SP].H0 | Rt, An, ±RzAz | Rt.H0 ←Mem[An ± (RzAz * 2)]$_{hword}$ |
| LTBL.[SP].H0.X | Rt, An, ±RzAz | Rt.H0 ←Mem[An ± (RzAz * 2)]$_{hword}$<br>Rt.H1 ←0xFFFF if MSB(Mem[An ± (RzAz * 2)]$_{hword}$)=1<br>Rt.H1 ←0x0000 if MSB(Mem[An ± (RzAz * 2)]$_{hword}$)=0 |
| LTBL.[SP].B0 | Rt, An, ±RzAz | Rt.B0 ←Mem[An ± RzAz]$_{byte}$ |
| LTBL.[SP].B0.X | Rt, An, ±RzAz | Rt.B0 ←Mem[An ± RzAz]$_{byte}$<br>Rt.B1 ←0xFF if MSB(Mem[An ± RzAz]$_{byte}$)=1<br>Rt.B1 ←0x00 if MSB(Mem[An ± RzAz]$_{byte}$)=0<br>Rt.H1 ←0xFFFF if MSB(Mem[An ± RzAz]$_{byte}$)=1<br>Rt.H1 ←0x0000 if MSB(Mem[An ± RzAz]$_{byte}$)=0 |
| T.LTBL.[SP].[DWH0B0].[X] | Rt, An, ±RzAz | Do operation only if T condition is satisfied in F0 |
| | | Load ARF/MRF Register |
| LTBL.[SP].W | AtMRt, An, ±RzAz | AtMRt ←Mem[An ± (RzAz * 4)]$_{word}$ |
| LTBL.[SP].[H0H1] | AtMRt, An, ±RzAz | AtMRt.Hx ←Mem[An ± (RzAz * 2)]$_{hword}$ *(Note: Hx=H0 or H1)* |
| LTBL.[SP].H0.X | AtMRt, An, ±RzAz | AtMRt.H0 ←Mem[An ± (RzAz * 2)]$_{hword}$<br>AtMRt.H1 ←0xFFFF if MSB(Mem[An ± (RzAz * 2)]$_{hword}$)=1<br>AtMRt.H1 ←0x0000 if MSB(Mem[An ± (RzAz * 2)]$_{hword}$)=0 |
| T.LTBL.[SP].[WH0H1].[X] | AtMRt, An, ±RzAz | Do operation only if T condition is satisfied in F0 |

NOTE: AtMRt is any register except a compute register.
NOTE: RzAz is any address or compute register.
Doubleword access must align on doubleword boundaries.

Arithmetic Flags Affected

None

Cycles: 1

Pipeline Considerations

See Load/Store Instruction Pipeline Considerations and Load/Store Indirect Addressing Mode restrictions.

SUBA - Subtract Address

BOPS, Inc. Manta SYSSIM 2.31

Encoding

| 31-30 | 29 | 28 | 27-25 | 24 | 23 | 22 | 21 | 20 | 19 | 18-16 | 15-13 | 12 | 11 | 10 | 9 | 8 | 7 | 6 | 5 | 4-0 |
|---|---|---|---|---|---|---|---|---|---|---|---|---|---|---|---|---|---|---|---|---|
| Group | S/P | L/S | 001 | CE1 | 0 | 0 | 1 | 1 | At/ Mt | At / Mt | An | Brcst =0 | Sign Ext =0 | Scale =0 | S/D =0 | Dec/ Inc =0 | Imm/ Reg =1 | Updt An =0 | Rz/ Az | Rz / 0 0 Az |

Description

Subtract source compute register *Rz* or address register *Az* from address register *An* and store the result in target Address Register *At* or Control-Flow Address Register *Mt*.

Syntax/Operation

| Instruction | Operands | Operation |
|---|---|---|
| SUBA.[SP].W | AtMt, An, RzAz | AtMt An - RzAz |
| T.SUBA.[SP].W | AtMt, An, RzAz | Do operation only if T condition is satisfied in F0 |

NOTES: RzAz is any address or compute register.
See Field Description of At and Mt for valid SP/PE target registers.

Arithmetic Flags Affected

None

Cycles: 1

Pipeline Considerations

The target address register is loaded in the Decode stage of the pipeline.
See also Load/Store Instruction Pipeline Considerations and Load/Store Indirect Addressing Mode restrictions.

ALU - Arithmetic Logic Unit Instructions

ALU Instructions

| | |
|---|---|
| ABS | Absolute Value with Saturate |
| ABSDIF | Absolute Difference |
| AND | Logical AND |
| CMPcc | Compare for Condition |
| CMPIcc | Compare Immediate for Condition |
| CNTMSK | Count 1-Bits with Mask |
| FADD | Floating-Point Add |
| FCMPcc | Floating-Point Compare for Condition |
| FSUB | Floating-Point Subtract |
| MAX | Maximum |
| MIN | Minimum |
| NOT | Logical NOT |
| OR | Logical OR |
| XOR | Logical XOR |

Common ALU/MAU Instructions

| | |
|---|---|
| ADD | Add |
| ADDI | Add Immediate |
| ADDS | Add with Saturate |
| BFLYD2 | Butterfly Divide by 2 |
| BFLYS | Butterfly with Saturate |
| MEAN2 | Mean of 2 Elements |
| SUB | Subtract |
| SUBI | Subtract Immediate |
| SUBS | Subtract with Saturate |

ABS - Absolute Value with Saturate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | ALUopcode | | | | | | Rt | | | | | Rx | | | | | 0 | 0 | 0 | 0 | 0 | 0 | CE2 | | DPack | | |
| | | | | | | | | | | | Rte | | | | 0 | Rxe | | | | 0 | | | | | | | | | | | |

Description
The absolute value of source register *Rx* is stored in target register *Rt*. Saturation occurs when ABS is applied to the largest negative byte, halfword, word, or doubleword (i.e. byte -128 becomes 127, halfword -32768 becomes 32767, word -2147483648 becomes 2147483647, etc).

Syntax/Operation

| Instruction | Operands | Operation | ACF |
|---|---|---|---|
| | | | Doubleword |
| ABS.[SP]A.1SD | Rte, Rxe | Rto\|\|Rte ←\| Rxo\|\|Rxe \| | None |
| [TF].ABS.[SP]A.1SD | Rte, Rxe | Do operation only if T/F condition is satisfied in F0 | None |
| | | | Word |
| ABS.[SP]A.1SW | Rt, Rx | Rt ←\| Rx \| | None |
| [TF].ABS.[SP]A.1SW | Rt, Rx | Do operation only if T/F condition is satisfied in F0 | None |
| | | | Dual Words |
| ABS.[SP]A.2SW | Rte, Rxe | Rto ←\| Rxo \|<br>Rte ←\| Rxe \| | None |
| [TF].ABS.[SP]A.2SW | Rte, Rxe | Do operation only if T/F condition is satisfied in F0 | None |
| | | | Dual Halfwords |
| ABS.[SP]A.2SH | Rt, Rx | Rt.H1 ←\| Rx.H1 \|<br>Rt.H0 ←\| Rx.H0 \| | None |
| [TF].ABS.[SP]A.2SH | Rt, Rx | Do operation only if T/F condition is satisfied in F0 | None |
| | | | Quad Halfwords |
| ABS.[SP]A.4SH | Rte, Rxe | Rto.H1 ←\| Rxo.H1 \|<br>Rto.H0 ←\| Rxo.H0 \|<br>Rte.H1 ←\| Rxe.H1 \|<br>Rte.H0 ←\| Rxe.H0 \| | None |
| [TF].ABS.[SP]A.4SH | Rte, Rxe | Do operation only if T/F condition is satisfied in F0 | None |
| | | | Quad Bytes |
| ABS.[SP]A.4SB | Rt, Rx | Rt.B3 ←\| Rx.B3 \|<br>Rt.B2 ←\| Rx.B2 \|<br>Rt.B1 ←\| Rx.B1 \|<br>Rt.B0 ←\| Rx.B0 \| | None |
| [TF].ABS.[SP]A.4SB | Rt, Rx | Do operation only if T/F condition is satisfied in F0 | None |
| | | | Octal Bytes |
| ABS.[SP]A.8SB | Rte, Rxe | Rto.B3 ←\| Rxo.B3 \|<br>Rto.B2 ←\| Rxo.B2 \|<br>Rto.B1 ←\| Rxo.B1 \|<br>Rto.B0 ←\| Rxo.B0 \|<br>Rte.B3 ←\| Rxe.B3 \|<br>Rte.B2 ←\| Rxe.B2 \|<br>Rte.B1 ←\| Rxe.B1 \|<br>Rte.B0 ←\| Rxe.B0 \| | None |
| [TF].ABS.[SP]A.8SB | Rte, Rxe | Do operation only if T/F condition is satisfied in F0 | None |

Arithmetic Scalar Flags Affected (on least significant operation)
C = Not Affected
N = 0
V = Not Affected
Z = 1 if result is zero, 0 otherwise

Cycles: 1

ABSDIF - Absolute Difference

BOPS, Inc. Manta SYSSIM 2.31

Encoding

| 31 30 | 29 | 28 27 | 26 25 24 23 22 21 | 20 19 18 17 16 | 15 14 13 12 11 | 10 9 8 7 6 | 5 | 4 3 | 2 1 0 |
|---|---|---|---|---|---|---|---|---|---|
| Group | S/P | Unit | ALUopcode | Rt | Rx | Ry | 0 | CE2 | DPack |
| | | | | Rte 0 | Rxe 0 | Rye 0 | | | |

Description
The absolute difference of the two source registers *Rx* and *Ry* is stored in target register *Rt*.

Syntax/Operation

| Instruction | Operands | Operation | ACF |
|---|---|---|---|
| | | | Doubleword |
| ABSDIF.[SP]A.1[SU]D | Rte, Rxe, Rye | Rto\|\|Rte ← \| Rxo\|\|Rxe - Ryo\|\|Rye \| | None |
| [TF].ABSDIF.[SP]A.1[SU]D | Rte, Rxe, Rye | Do operation only if T/F condition is satisfied in F0 | None |
| | | | Word |
| ABSDIF.[SP]A.1[SU]W | Rt, Rx, Ry | Rt ← \| Rx - Ry \| | None |
| [TF].ABSDIF.[SP]A.1[SU]W | Rt, Rx, Ry | Do operation only if T/F condition is satisfied in F0 | None |
| | | | Dual Words |
| ABSDIF.[SP]A.2[SU]W | Rte, Rxe, Rye | Rto ← \| Rxo - Ryo \|<br>Rte ← \| Rxe - Rye \| | None |
| [TF].ABSDIF.[SP]A.2[SU]W | Rte, Rxe, Rye | Do operation only if T/F condition is satisfied in F0 | None |
| | | | Dual Halfwords |
| ABSDIF.[SP]A.2[SU]H | Rt, Rx, Ry | Rt.H1 ← \| Rx.H1 - Ry.H1 \|<br>Rt.H0 ← \| Rx.H0 - Ry.H0 \| | None |
| [TF].ABSDIF.[SP]A.2[SU]H | Rt, Rx, Ry | Do operation only if T/F condition is satisfied in F0 | None |
| | | | Quad Halfwords |
| ABSDIF.[SP]A.4[SU]H | Rte, Rxe, Rye | Rto.H1 ← \| Rxo.H1 - Ryo.H1 \|<br>Rto.H0 ← \| Rxo.H0 - Ryo.H0 \|<br>Rte.H1 ← \| Rxe.H1 - Rye.H1 \|<br>Rte.H0 ← \| Rxe.H0 - Rye.H0 \| | None |
| [TF].ABSDIF.[SP]A.4[SU]H | Rte, Rxe, Rye | Do operation only if T/F condition is satisfied in F0 | None |
| | | | Quad Bytes |
| ABSDIF.[SP]A.4[SU]B | Rt, Rx, Ry | Rt.B3 ← \| Rx.B3 - Ry.B3 \|<br>Rt.B2 ← \| Rx.B2 - Ry.B2 \|<br>Rt.B1 ← \| Rx.B1 - Ry.B1 \|<br>Rt.B0 ← \| Rx.B0 - Rx.B0 \| | None |
| [TF].ABSDIF.[SP]A.4[SU]B | Rt, Rx, Ry | Do operation only if T/F condition is satisfied in F0 | None |
| | | | Octal Bytes |
| ABSDIF.SA.8[SU]B | Rte, Rxe, Rye | Rto.B3 ← \| Rxo.B3 - Ryo.B3 \|<br>Rto.B2 ← \| Rxo.B2 - Ryo.B2 \|<br>Rto.B1 ← \| Rxo.B1 - Ryo.B1 \|<br>Rto.B0 ← \| Rxo.B0 - Ryo.B0 \|<br>Rte.B3 ← \| Rxe.B3 - Rye.B3 \|<br>Rte.B2 ← \| Rxe.B2 - Rye.B2 \|<br>Rte.B1 ← \| Rxe.B1 - Rye.B1 \|<br>Rte.B0 ← \| Rxe.B0 - Rye.B0 \| | None |
| [TF].ABSDIF.SA.8[SU]B | Rte, Rxe, Rye | Do operation only if T/F condition is satisfied in F0 | None |

Arithmetic Scalar Flags Affected (on least significant operation)
C = 1 if a carry occurs on the subtract operation, 0 otherwise
N = 0
V = 1 if an overflow occurs on the subtract operation, 0 otherwise
Z = 1 if result is zero, 0 otherwise See also ASF Definitions in chapter on Conditional Execution.

Cycles: 1

AND - Logical AND

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | ALUopcode | | | | | | Rt | | | | | Rx | | | | | Ry | | | | | 0 | CE2 | | LogicExt | | |
| | | | | | | | | | | | Rte | | | | 0 | Rxe | | | | 0 | Rye | | | | 0 | | | | | | |

Description
The result of a bitwise AND operation of source registers *Rx* and *Ry* is stored in target register *Rt*.

| Rx bit-n | | Ry bit-n | | Rt bit-n |
|---|---|---|---|---|
| 0 | AND | 0 | ==> | 0 |
| 0 | | 1 | | 0 |
| 1 | | 0 | | 0 |
| 1 | | 1 | | 1 |

Syntax/Operation

| Instruction | Operands | Operation | ACF |
|---|---|---|---|
| | | | Doubleword |
| AND.[SP]A.1D | Rte, Rxe, Rye | Rto\|\|Rte ←Rxo\|\|Rxe AND Ryo\|\|Rye | None |
| [TF].AND.[SP]A.1D | Rte, Rxe, Rye | Do operation only if T/F condition is satisfied in F0 | None |
| | | | Word |
| AND.[SP]A.1W | Rt, Rx, Ry | Rt ←Rx AND Ry | None |
| [TF].AND.[SP]A.1W | Rt, Rx, Ry | Do operation only if T/F condition is satisfied in F0 | None |

Arithmetic Scalar Flags Affected (on least significant operation)
C = Not Affected
N = MSB of result
V = Not Affected
Z = 1 if result is zero, 0 otherwise

Cycles: 1

CMPcc - Compare for Condition

BOPS, Inc. Manta SYSSIM 2.31

Encoding

| 31 30 | 29 | 28 27 | 26 25 24 23 22 21 | 20 | 19 18 17 16 | 15 14 13 12 11 | 10 9 8 7 6 | 5 | 4 3 | 2 1 0 |
|---|---|---|---|---|---|---|---|---|---|---|
| Group | S/P | Unit | ALUopcode | 0 | CC | Rx | Ry | 0 | CCombo | DPack |
| | | | | | | Rxe \| 0 | Rye \| 0 | | | |

Description

The difference of elements from source registers *Rx* and *Ry* is computed yielding sets of C-N-V-Z flags for each element difference. The corresponding Arithmetic Condition Flags (F0-F7) (one for each element difference) are updated with respect to the specified Condition Code *CC* ('1' if *CC* is true, '0' if *CC* is false). The Arithmetic Scalar Flags receive the C-N-V-Z settings of the least significant element operation (i.e. the one affecting F0). The *.AND .OR .XOR* forms provide logical combinations with the previous settings of the Arithmetic Condition Flags. Below is a table summarizing each Condition Code with the C-N-V-Z flag setting for which that condition is true.

| CC | Description | C-N-V-Z Setting |
|---|---|---|
| Z (EQ) | Zero or Equal | Z=1 |
| NZ (NE) | Not Zero or Not Equal | Z=0 |
| HI | Higher (unsigned) | (C=1) && (Z=0) |
| HS (CS) | Higher or Same (unsigned, or Carry Set) | C=1 |
| LO (CC) | Lower (unsigned, or Carry Clear) | C=0 |
| LS | Lower or Same (unsigned) | (C=0) \|\| (Z=1) |
| VS | Overflow Set | V=1 |
| VC | Overflow Clear | V=0 |
| POS | Positive | (N=0) && (Z=0) |
| NEG | Negative | N=1 |
| GE | Greater-than or Equal (signed) | N=V |
| GT | Greater-Than (signed) | (Z=0) && (N=V) |
| LE | Less-than or Equal (signed) | (Z=1) \|\| (N != V) |
| LT | Less-Than (signed) | N != V |

Syntax/Operation

| Instruction | Operands | Operation |
|---|---|---|
| | | Doubleword |
| CMPcc.[SP]A.1D | Rxe, Rye | F0 ←CC(Rxo\|\|Rxe - Ryo\|\|Rye) |
| CMPcc[.AND .OR .XOR].[SP]A.1D | Rxe, Rye | F0 ←F0 [AND OR XOR] CC(Rxo\|\|Rxe - Ryo\|\|Rye) |
| | | Word |
| CMPcc.[SP]A.1W | Rx, Ry | F0 ←CC(Rx - Ry) |
| CMPcc[.AND .OR .XOR].[SP]A.1W | Rx, Ry | F0 ←F0 [AND OR XOR] CC(Rx - Ry) |
| | | Dual Words |
| CMPcc.[SP]A.2W | Rxe, Rye | F1 ←CC(Rxo - Ryo)<br>F0 ←CC(Rxe - Rye) |
| CMPcc[.AND .OR .XOR].[SP]A.2W | Rxe, Rye | F1 ←F1 [AND OR XOR] CC(Rxo - Ryo)<br>F0 ←F0 [AND OR XOR] CC(Rxe - Rye) |
| | | Dual Halfwords |
| CMPcc.[SP]A.2H | Rx, Ry | F1 ←CC(Rx.H1 - Ry.H1)<br>F0 ←CC(Rx.H0 - Ry.H0) |
| CMPcc[.AND .OR .XOR].[SP]A.2H | Rx, Ry | F1 ←F1 [AND OR XOR] CC(Rx.H1 - Ry.H1)<br>F0 ←F0 [AND OR XOR] CC(Rx.H0 - Ry.H0) |
| | | Quad Halfwords |
| CMPcc.[SP]A.4H | Rxe, Rye | F3 ←CC(Rxo.H1 - Ryo.H1)<br>F2 ←CC(Rxo.H0 - Ryo.H0)<br>F1 ←CC(Rxe.H1 - Rye.H1)<br>F0 ←CC(Rxe.H0 - Rye.H0) |
| CMPcc[.AND .OR .XOR].[SP]A.4H | Rxe, Rye | F3 ←F3 [AND OR XOR] CC(Rxo.H1 - Ryo.H1)<br>F2 ←F2 [AND OR XOR] CC(Rxo.H0 - Ryo.H0)<br>F1 ←F1 [AND OR XOR] CC(Rxe.H1 - Rye.H1)<br>F0 ←F0 [AND OR XOR] CC(Rxe.H0 - Rye.H0) |

| | | |
|---|---|---|
| | | Quad Bytes |
| CMPcc.[SP]A.4B | Rx, Ry | F3 ←CC(Rx.B3 - Ry.B3)<br>F2 ←CC(Rx.B2 - Ry.B2)<br>F1 ←CC(Rx.B1 - Ry.B1)<br>F0 ←CC(Rx.B0 - Ry.B0) |
| CMPcc[.AND .OR .XOR].[SP]A.4B | Rx, Ry | F3 ←F3 [AND OR XOR] CC(Rx.B3 - Ry.B3)<br>F2 ←F2 [AND OR XOR] CC(Rx.B2 - Ry.B2)<br>F1 ←F1 [AND OR XOR] CC(Rx.B1 - Ry.B1)<br>F0 ←F0 [AND OR XOR] CC(Rx.B0 - Ry.B0) |
| | | Octal Bytes |
| CMPcc.[SP]A.8B | Rxe, Rye | F7 ←CC(Rxo.B3 - Ryo.B3)<br>F6 ←CC(Rxo.B2 - Ryo.B2)<br>F5 ←CC(Rxo.B1 - Ryo.B1)<br>F4 ←CC(Rxo.B0 - Ryo.B0)<br>F3 ←CC(Rxe.B3 - Rye.B3)<br>F2 ←CC(Rxe.B2 - Rye.B2)<br>F1 ←CC(Rxe.B1 - Rye.B1)<br>F0 ←CC(Rxe.B0 - Rye.B0) |
| CMPcc[.AND .OR .XOR].[SP]A.8B | Rxe, Rye | F7 ←F7 [AND OR XOR] CC(Rxo.B3 - Ryo.B3)<br>F6 ←F6 [AND OR XOR] CC(Rxo.B2 - Ryo.B2)<br>F5 ←F5 [AND OR XOR] CC(Rxo.B1 - Ryo.B1)<br>F4 ←F4 [AND OR XOR] CC(Rxo.B0 - Ryo.B0)<br>F3 ←F3 [AND OR XOR] CC(Rxe.B3 - Rye.B3)<br>F2 ←F2 [AND OR XOR] CC(Rxe.B2 - Rye.B2)<br>F1 ←F1 [AND OR XOR] CC(Rxe.B1 - Rye.B1)<br>F0 ←F0 [AND OR XOR] CC(Rxe.B0 - Rye.B0) |

The Arithmetic Condition Flags (ACF) F7 - F0 are defined in the chapter on Scalable Conditional Execution.

Arithmetic Scalar Flags Affected (on the least significant operation, F0)
C = 1 if a carry occurs, 0 otherwise
N = MSB of result
V = 1 if an overflow occurs, 0 otherwise
Z = 1 if result is zero, 0 otherwise See also ASF Definitions in chapter on Conditional Execution.

Cycles: 1

CMPIcc - Compare Immediate for Condition

BOPS, Inc. Manta SYSSIM 2.31

Encoding

| 31 30 | 29 | 28 27 | 26 25 24 23 22 21 | 20 | 19 18 17 16 | 15 14 13 12 11 | 10 9 8 7 6 5 | 4 3 | 2 1 0 |
|---|---|---|---|---|---|---|---|---|---|
| Group | S/P | Unit | ALUopcode | $I_6$ | CC | Rx / Rxe 0 | $I_{5\text{-}0}$ | CCombo | DPack |

NOTE: The *SIMM7* field is split in the opcode with the sign bit in bit 20 ($I_6$) and the rest in bits 10-5 ($I_{5\text{-}0}$).

Description

The difference of elements from source register *Rx* and a 7-bit signed (2's complement) immediate value *ISIMM7* ($I_6$,$I_{5\text{-}0}$) is computed yielding sets of C-N-V-Z flags for each element difference. The corresponding Arithmetic Condition Flags (F0-F7) (one for each element difference) are updated with respect to the specified Condition Code *CC* ('1' if *CC* is true, '0' if *CC* is false). The Arithmetic Scalar Flags receive the C-N-V-Z settings of the least significant element operation (i.e. the one affecting F0). The *.AND .OR .XOR* forms provide logical combinations with the previous settings of the Arithmetic Condition Flags. Below is a table summarizing each Condition Code with the C-N-V-Z flag setting for which that condition is true.

| CC | Description | C-N-V-Z Setting |
|---|---|---|
| Z (EQ) | Zero or Equal | Z=1 |
| NZ (NE) | Not Zero or Not Equal | Z=0 |
| HI | Higher (unsigned) | (C=1) && (Z=0) |
| HS (CS) | Higher or Same (unsigned, or Carry Set) | C=1 |
| LO (CC) | Lower (unsigned, or Carry Clear) | C=0 |
| LS | Lower or Same (unsigned) | (C=0) \|\| (Z=1) |
| VS | Overflow Set | V=1 |
| VC | Overflow Clear | V=0 |
| POS | Positive | (N=0) && (Z=0) |
| NEG | Negative | N=1 |
| GE | Greater-than or Equal (signed) | N=V |
| GT | Greater-Than (signed) | (Z=0) && (N=V) |
| LE | Less-than or Equal (signed) | (Z=1) \|\| (N != V) |
| LT | Less-Than (signed) | N != V |

Syntax/Operation

| Instruction | Operands | Operation |
|---|---|---|
| | | Doubleword |
| CMPIcc.[SP]A.1D | Rxe, SIMM7 | F0 ←CC(Rxo\|\|Rxe - SIMM7) |
| CMPIcc[.AND .OR .XOR].[SP]A.1D | Rxe, SIMM7 | F0 ←F0 [AND OR XOR] CC(Rxo\|\|Rxe - SIMM7) |
| | | Word |
| CMPIcc.[SP]A.1W | Rx, SIMM7 | F0 ←CC(Rx - SIMM7) |
| CMPIcc[.AND .OR .XOR].[SP]A.1W | Rx, SIMM7 | F0 ←F0 [AND OR XOR] CC(Rx - SIMM7) |
| | | Dual Words |
| CMPIcc.[SP]A.2W | Rxe, SIMM7 | F1 ←CC(Rxo - SIMM7)<br>F0 ←CC(Rxe - SIMM7) |
| CMPIcc[.AND .OR .XOR].[SP]A.2W | Rxe, SIMM7 | F1 ←F1 [AND OR XOR] CC(Rxo - SIMM7)<br>F0 ←F0 [AND OR XOR] CC(Rxe - SIMM7) |
| | | Dual Halfwords |
| CMPIcc.[SP]A.2H | Rx, SIMM7 | F1 ←CC(Rx.H1 - SIMM7)<br>F0 ←CC(Rx.H0 - SIMM7) |
| CMPIcc[.AND .OR .XOR].[SP]A.2H | Rx, SIMM7 | F1 ←F1 [AND OR XOR] CC(Rx.H1 - SIMM7)<br>F0 ←F0 [AND OR XOR] CC(Rx.H0 - SIMM7) |
| | | Quad Halfwords |
| CMPIcc.[SP]A.4H | Rxe, SIMM7 | F3 ←CC(Rxo.H1 - SIMM7)<br>F2 ←CC(Rxo.H0 - SIMM7)<br>F1 ←CC(Rxe.H1 - SIMM7)<br>F0 ←CC(Rxe.H0 - SIMM7) |
| CMPIcc[.AND .OR .XOR].[SP]A.4H | Rxe, SIMM7 | F3 ←F3 [AND OR XOR] CC(Rxo.H1 - SIMM7) |

| | | |
|---|---|---|
| | | F2 ←F2 [AND OR XOR] CC(Rxo.H0 - SIMM7)<br>F1 ←F1 [AND OR XOR] CC(Rxe.H1 - SIMM7)<br>F0 ←F0 [AND OR XOR] CC(Rxe.H0 - SIMM7) |
| | | Quad Bytes |
| CMPIcc.[SP]A.4B | Rx, SIMM7 | F3 ←CC(Rx.B3 - SIMM7)<br>F2 ←CC(Rx.B2 - SIMM7)<br>F1 ←CC(Rx.B1 - SIMM7)<br>F0 ←CC(Rx.B0 - SIMM7) |
| CMPIcc[.AND .OR .XOR].[SP]A.4B | Rx, SIMM7 | F3 ←F3 [AND OR XOR] CC(Rx.B3 - SIMM7)<br>F2 ←F2 [AND OR XOR] CC(Rx.B2 - SIMM7)<br>F1 ←F1 [AND OR XOR] CC(Rx.B1 - SIMM7)<br>F0 ←F0 [AND OR XOR] CC(Rx.B0 - SIMM7) |
| | | Octal Bytes |
| CMPIcc.[SP]A.8B | Rxe, SIMM7 | F7 ←CC(Rxo.B3 - SIMM7)<br>F6 ←CC(Rxo.B2 - SIMM7)<br>F5 ←CC(Rxo.B1 - SIMM7)<br>F4 ←CC(Rxo.B0 - SIMM7)<br>F3 ←CC(Rxe.B3 - SIMM7)<br>F2 ←CC(Rxe.B2 - SIMM7)<br>F1 ←CC(Rxe.B1 - SIMM7)<br>F0 ←CC(Rxe.B0 - SIMM7) |
| CMPIcc[.AND .OR .XOR].[SP]A.8B | Rxe, SIMM7 | F7 ←F7 [AND OR XOR] CC(Rxo.B3 - SIMM7)<br>F6 ←F6 [AND OR XOR] CC(Rxo.B2 - SIMM7)<br>F5 ←F5 [AND OR XOR] CC(Rxo.B1 - SIMM7)<br>F4 ←F4 [AND OR XOR] CC(Rxo.B0 - SIMM7)<br>F3 ←F3 [AND OR XOR] CC(Rxe.B3 - SIMM7)<br>F2 ←F2 [AND OR XOR] CC(Rxe.B2 - SIMM7)<br>F1 ←F1 [AND OR XOR] CC(Rxe.B1 - SIMM7)<br>F0 ←F0 [AND OR XOR] CC(Rxe.B0 - SIMM7) |

The Arithmetic Condition Flags (ACF) F7 - F0 are defined in the chapter on Scalable Conditional Execution.

Arithmetic Scalar Flags Affected (on the least significant operation)
C = 1 if a carry occurs, 0 otherwise
N = MSB of result
V = 1 if an overflow occurs, 0 otherwise
Z = 1 if result is zero, 0 otherwise See also ASF Definitions in chapter on Conditional Execution.

Cycles: 1

←

CNTMSK - Count 1 Bits with Mask

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | ALUopcode | | | | | | Rt | | | | | Rx | | | | | Ry | | | | | 0 | CE2 | | CntmskExt | | |
| | | | | | | | | | | | Rte | | | | 0 | Rxe | | | | 0 | Rye | | | | 0 | | | | | | |

Description

Source registers *Rx* and *Ry* are ANDed together and the number of 1-bits in the result is stored in byte-0 of target register *Rt*. The AND operation allows the programmer to mask which bits participate in the counting of 1-bits. To count the number of 1-bits in an entire register, just supply the same register as both sources.

Syntax/Operation

| Syntax | Operands | Operation | ACF |
|---|---|---|---|
| | | | Word |
| CNTMSK.[SP]A.1W | Rt, Rx, Ry | Rt.B0 ←CountOnes(Rx AND Ry) | None |
| [TF].CNTMSK.[SP]A.1W | Rt, Rx, Ry | Do operation only if T/F condition is satisfied in F0 | None |
| | | | Dual Words |
| CNTMSK.[SP]A.2W | Rte, Rxe, Rye | Rto.B0 ←CountOnes(Rxo AND Ryo)<br>Rte.B0 ←CountOnes(Rxe AND Rye) | None |
| [TF].CNTMSK.[SP]A.2W | Rte, Rxe, Rye | Do operation only if T/F condition is satisfied in F0 | None |

Arithmetic Scalar Flags Affected

C = Not Affected
N = MSB of result (always 0)
V = Not Affected
Z = 1 if result is zero, 0 otherwise

Cycles: 1

Example:
(Key)

```
! Count the number of 1-bits in the even bytes of R0
CNTMSK.SA.1W  R2, R0, R1       ! Before: R0=01001110:00101011:01001110:00101010
                               ! Before: R1=00000000:11111111:00000000:11111111
                               ! AND result=--------:--1-1-11:--------:--1-1-1-
                               ! After:  R2=7.
```

←

FADD - Floating-Point Add

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | ALUopcode | | | | | | Rt | | | | | Rx | | | | | Ry | | | | | 0 | CE2 | | FPack | | |

Description
The floating-point sum of source registers *Rx* and *Ry* is loaded into target register *Rt*. Both source registers are assumed to be in IEEE 754 floating point compatible format.

For additional discussion of ManArray floating point operations, see Floating Point Operations, Saturation, and Overflow.

Floating-Point Addition operations with zero, NAN and Infinity values.

| Floating-Point Operand | | 2nd Floating-Point Operand | | ManArray Floating-Point Result | Arithmetic Flags |
|---|---|---|---|---|---|
| Sign | Value | Sign | Value | | |
| 0 | NAN or INF | 0/1 | $-2^{128} < Rx < +2^{128}$ | $+1.9999..x2^{127}$ | V=1, N=0, Z=0 |
| 0 | NAN or INF | 0 | NAN or INF | $+1.9999..x2^{127}$ | V=1, N=0, Z=0 |
| 0 | NAN or INF | 1 | NAN or INF | +0 | V=1, N=0, Z=1 |
| 1 | NAN or INF | 0/1 | $-2^{128} < Rx < +2^{128}$ | $-1.9999..x\ 2^{127}$ | V=1, N=1, Z=0 |
| 1 | NAN or INF | 0 | NAN or INF | +0 | V=1, N=0, Z=1 |
| 1 | NAN or INF | 1 | NAN or INF | $-1.9999..x2^{127}$ | V=1, N=1, Z=0 |
| 0/1 | $-2^{128} < Rx < +2^{128}$ | 0 | NAN or INF | $+1.9999..x2^{127}$ | V=1, N=0, Z=0 |
| 0/1 | $-2^{128} < Rx < +2^{128}$ | 1 | NAN or INF | $-1.9999..x2^{127}$ | V=1, N=1, Z=0 |
| Notes for the programmer:<br>A non-normalized result of an operation is flushed to zero.<br>The results in this table are the same when the order of the operands is reversed. | | | | | |

Syntax/Operation

| Instruction | Operands | Operation | ACF |
|---|---|---|---|
| FADD.[SP]A.1FW | Rt, Rx, Ry | Rt ←Rx + Ry | None |
| [TF].FADD.[SP]A.1FW | Rt, Rx, Ry | Do operation only if T/F condition is satisfied in F0 | None |

Arithmetic Scalar Flags Affected
C = Not affected
N = MSB of result
V = 1 if a saturated result is generated, 0 otherwise.
Z = 1 if result is zero, 0 otherwise

Cycles: 2

Restrictions
This ALU instruction takes two execution cycles to complete and may be pipelined with other two-execution-cycle ALU instructions. The target register is written via the ALU write port during the second execution cycle. If a single-execution-cycle ALU instruction immediately follows this two-cycle ALU instruction, the single-cycle ALU instruction has priority over the ALU write port. In this situation, the two-cycle ALU instruction results are lost and the single-cycle ALU instruction's target register is written.

FCMPcc - Floating-Point Compare for Condition

BOPS, Inc. Manta SYSSIM 2.31

Encoding

| 31 30 | 29 | 28 27 | 26 25 24 23 22 21 | 20 19 18 17 16 | 15 14 13 12 11 | 10 9 8 7 6 | 5 | 4 3 | 2 1 0 |
|---|---|---|---|---|---|---|---|---|---|
| Group | S/P | Unit | ALUopcode | FCC | Rx | Ry | 0 | CCombo | FPack |

Description
The floating-point difference of source registers *Rx* and *Ry* is computed yielding the Arithmetic Scalar Flags (C-N-V-Z). Arithmetic Condition Flag (F0) is updated with respect to the specified Floating-point Condition Code *FCC* ('1' if *FCC* is true, '0' if *FCC* is false). The *.AND .OR .XOR* forms provide logical combinations with the previous settings of the Arithmetic Condition Flags. Below is a table summarizing each Floating-point Condition Code with the C-N-V-Z flag setting for which that condition is true.

| FCC | Description | C-N-V-Z Setting |
|---|---|---|
| EQ | Equal or Unordered | Z=1 |
| GE | Greater-than or Equal | (N=0) && (V=0) |
| GT | Greater-Than and Ordered | (N=0) && (V=0) && (Z=0) |
| LE | Less-than or Equal | (N=1 \|\| (N=0 && Z=1)) && (V=0) |
| LT | Less-Than and Ordered | (N=1) && (Z=0) && (V=0) |
| NE | Not Equal and Ordered | Z=0 |

Both source registers are assumed to be in IEEE 754 compatible floating point format. For additional discussion of ManArray floating point operations, see Floating Point Operations, Saturation, and Overflow.

Floating-Point Compare operations with zero, NAN and Infinity values.

| Floating-Point Operand | | 2nd Floating-Point Operand | | Arithmetic Flags |
|---|---|---|---|---|
| Sign | Value | Sign | Value | |
| 0 | NAN or INF | 0/1 | $-2^{128} < Rx < +2^{128}$ | V=1, N=0, Z=0 |
| 0 | NAN or INF | 0 | NAN or INF | V=1, N=0, Z=1 |
| 0 | NAN or INF | 1 | NAN or INF | V=1, N=0, Z=0 |
| 1 | NAN or INF | 0/1 | $-2^{128} < Rx < +2^{128}$ | V=1, N=1, Z=0 |
| 1 | NAN or INF | 0 | NAN or INF | V=1, N=1, Z=0 |
| 1 | NAN or INF | 1 | NAN or INF | V=1, N=0, Z=1 |
| 0/1 | $-2^{128} < Rx < +2^{128}$ | 0 | NAN or INF | V=1, N=1, Z=0 |
| 0/1 | $-2^{128} < Rx < +2^{128}$ | 1 | NAN or INF | V=1, N=0, Z=0 |

Syntax/Operation

| Instruction | Operands | Operation |
|---|---|---|
| | | Word |
| FCMPfcc.[SP]A.1FW | Rx, Ry | F0 ←FCC(Rx - Ry) |
| FCMPfcc[.AND .OR .XOR].[SP]A.1FW | Rx, Ry | F0 ←F0 [AND OR XOR] FCC(Rx - Ry) |

Floating-Point Condition Code (FCC)
EQ F0 = 1 if Rx and Ry are equal or unordered, 0 otherwise (Z = 1)
GE F0 = 1 if Rx >= Ry, 0 otherwise (N=0, V=0)
GT F0 = 1 if Rx > Ry and ordered, 0 otherwise (N=0, V=0, Z=0)
LE F0 = 1 if Rx <= Ry, 0 otherwise (N=1 or (N=0 and Z=1), V=0)
LT F0 = 1 if Rx < Ry and ordered, 0 otherwise (N=1, V=0, Z=0)

NE F0 = 1 if Rx and Ry are not equal and ordered, 0 otherwise (Z=0)

Arithmetic Scalar Flags Affected
C = Not Affected
N = MSB of the floating-point difference
V = 1 if a saturated floating-point difference is generated, 0 otherwise
Z = 1 if a zero floating-point difference is generated, 0 otherwise

Cycles: 2

Restrictions
This ALU instruction takes two execution cycles to complete and may be pipelined with other two execution cycle ALU instructions. The Arithmetic Scalar Flags are written via the ALU write port in condition return. If a single execution cycle ALU instruction immediately follows this two cycle ALU instruction, the single cycle ALU instruction has priority over the ALU write port. In this situation, the two cycle ALU instruction Arithmetic Flags are lost and the single cycle ALU instruction's target register and/or flags are written.

FSUB - Floating-Point Subtract

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | ALUopcode | | | | | | Rt | | | | | Rx | | | | | Ry | | | | | 0 | CE2 | | FPack | | |

Description

The floating-point difference of source registers *Rx* and *Ry* is loaded into target register *Rt*. Both source registers are assumed to be in IEEE 754 floating-point compatible format.

For additional discussion of ManArray floating point operations, see Floating Point Operations, Saturation, and Overflow.

Floating-Point Subtraction operations with zero, NAN and Infinity values.

| Floating-Point Operand | | 2nd Floating-Point Operand | | ManArray Floating-Point Result | Arithmetic Flags |
|---|---|---|---|---|---|
| Sign | Value | Sign | Value | | |
| 0 | NAN or INF | 0/1 | $-2^{128} < Rx < +2^{128}$ | $+1.9999..x\ 2^{127}$ | V=1, N=0, Z=0 |
| 0 | NAN or INF | 0 | NAN or INF | +0 | V=1, N=0, Z=1 |
| 0 | NAN or INF | 1 | NAN or INF | $+1.9999..x2^{127}$ | V=1, N=0, Z=0 |
| 1 | NAN or INF | 0/1 | $-2^{128} < Rx < +2^{128}$ | $-1.9999..x\ 2^{127}$ | V=1, N=1, Z=0 |
| 1 | NAN or INF | 0 | NAN or INF | $-1.9999..x2^{127}$ | V=1, N=1, Z=0 |
| 1 | NAN or INF | 1 | NAN or INF | +0 | V=1, N=0, Z=1 |
| 0/1 | $-2^{128} < Rx < +2^{128}$ | 0 | NAN or INF | $-1.9999..x2^{127}$ | V=1, N=1, Z=0 |
| 0/1 | $-2^{128} < Rx < +2^{128}$ | 1 | NAN or INF | $+1.9999..x2^{127}$ | V=1, N=0, Z=0 |

Notes for the programmer:
A non-normalized result of an operation is flushed to zero.
The results in this table are the same when the order of the operands is reversed.

Syntax/Operation

| Instruction | Operands | Operation | ACF |
|---|---|---|---|
| | | | Word |
| FSUB.[SP]A.1FW | Rt, Rx, Ry | Rt ←Rx - Ry | None |
| [TF].FSUB.[SP]A.1FW | Rt, Rx, Ry | Do operation only if T/F condition is satisfied in ACFs | None |

Arithmetic Scalar Flags Affected

C = Not affected
N = MSB of result
V = 1 if a saturated result is generated, 0 otherwise.
Z = 1 if result is zero, 0 otherwise

Cycles: 2

Restrictions

This ALU instruction takes two execution cycles to complete and may be pipelined with other two-execution-cycle ALU instructions. The target register is written via the ALU write port during the second execution cycle. If a single-execution-cycle ALU instruction immediately follows this two-cycle ALU instruction, the single-cycle ALU instruction has priority over the ALU write port. In this situation, the two-cycle ALU instruction results are lost and the single-cycle ALU instruction's target register is written.

MAX - Maximum

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | ALUopcode | | | | | | Rt | | | | | Rx | | | | | Ry | | | | | 0 | CE2 | | DPack | | |
| | | | | | | | | | | | Rte | | | | 0 | Rxe | | | | 0 | Rye | | | | 0 | | | | | | |

Description
The maximum value of source registers *Rx* and *Ry* is stored in target register *Rt*.

Syntax/Operation

| Instruction | Operands | Operation | ACF |
|---|---|---|---|
| | | | Doubleword |
| MAX.[SP]A.1[SU]D | Rte, Rxe, Rye | Rto\|\|Rte ←MAX(Rxo\|\|Rxe, Ryo\|\|Rye) | None |
| [TF].MAX.[SP]A.1[SU]D | Rte, Rxe, Rye | Do operation only if T/F condition is satisfied in F0 | None |
| | | | Word |
| MAX.[SP]A.1[SU]W | Rt, Rx, Ry | Rt ←MAX(Rx, Ry) | None |
| [TF].MAX.[SP]A.1[SU]W | Rt, Rx, Ry | Do operation only if T/F condition is satisfied in F0 | None |
| | | | Dual Words |
| MAX.[SP]A.2[SU]W | Rte, Rxe, Rye | Rto ←MAX(Rxo, Ryo)<br>Rte ←MAX(Rxe, Rye) | None |
| [TF].MAX.[SP]A.2[SU]W | Rte, Rxe, Rye | Do operation only if T/F condition is satisfied in F0 | None |
| | | | Dual Halfwords |
| MAX.[SP]A.2[SU]H | Rt, Rx, Ry | Rt.H1 ←MAX(Rx.H1, Ry.H1)<br>Rt.H0 ←MAX(Rx.H0, Ry.H0) | None |
| [TF].MAX.[SP]A.2[SU]H | Rt, Rx, Ry | Do operation only if T/F condition is satisfied in F0 | None |
| | | | Quad Halfwords |
| MAX.[SP]A.4[SU]H | Rte, Rxe, Rye | Rto.H1 ←MAX(Rxo.H1, Ryo.H1)<br>Rto.H0 ←MAX(Rxo.H0, Ryo.H0)<br>Rte.H1 ←MAX(Rxe.H1, Rye.H1)<br>Rte.H0 ←MAX(Rxe.H0, Rye.H0) | None |
| [TF].MAX.[SP]A.4[SU]H | Rte, Rxe, Rye | Do operation only if T/F condition is satisfied in F0 | None |
| | | | Quad Bytes |
| MAX.[SP]A.4[SU]B | Rt, Rx, Ry | Rt.B3 ←MAX(Rx.B3, Ry.B3)<br>Rt.B2 ←MAX(Rx.B2, Ry.B2)<br>Rt.B1 ←MAX(Rx.B1, Ry.B1)<br>Rt.B0 ←MAX(Rx.B0, Ry.B0) | None |
| [TF].MAX.[SP]A.4[SU]B | Rt, Rx, Ry | Do operation only if T/F condition is satisfied in F0 | None |
| | | | Octal Bytes |
| MAX.[SP]A.8[SU]B | Rte, Rxe, Rye | Rto.B3 ←MAX(Rxo.B3, Ryo.B3)<br>Rto.B2 ←MAX(Rxo.B2, Ryo.B2)<br>Rto.B1 ←MAX(Rxo.B1, Ryo.B1)<br>Rto.B0 ←MAX(Rxo.B0, Ryo.B0)<br>Rte.B3 ←MAX(Rxe.B3, Rye.B3)<br>Rte.B2 ←MAX(Rxe.B2, Rye.B2)<br>Rte.B1 ←MAX(Rxe.B1, Rye.B1)<br>Rte.B0 ←MAX(Rxe.B0, Rye.B0) | None |
| [TF].MAX.[SP]A.8[SU]B | Rte, Rxe, Rye | Do operation only if T/F condition is satisfied in F0 | None |

Arithmetic Scalar Flags Affected (on least significant operation)
C = 1 if Rx is greater than Ry, 0 otherwise
N = MSB of result
V = 1 if result is zero, 0 otherwise
Z = 1 if Rx is equal to Ry, 0 otherwise

Cycles: 1

MIN - Minimum

BOPS, Inc. Manta SYSSIM 2.31

Encoding

| 31 | 30 | 29 | 28 27 | 26 25 24 23 22 21 | 20 19 18 17 16 | 15 14 13 12 11 | 10 9 8 7 6 | 5 | 4 3 | 2 1 0 |
|---|---|---|---|---|---|---|---|---|---|---|
| Group | | S/P | Unit | ALUopcode | Rt / Rte 0 | Rx / Rxe 0 | Ry / Rye 0 | 0 | CE2 | DPack |

Description
The minimum value of source registers *Rx* and *Ry* is stored in target register *Rt*.

Syntax/Operation

| Instruction | Operands | Operation | ACF |
|---|---|---|---|
| | | | Doubleword |
| MIN.[SP]A.1[SU]D | Rte, Rxe, Rye | Rto\|\|Rte ←MIN(Rxo\|\|Rxe, Ryo\|\|Rye) | None |
| [TF].MIN.[SP]A.1[SU]D | Rte, Rxe, Rye | Do operation only if T/F condition is satisfied in F0 | None |
| | | | Word |
| MIN.[SP]A.1[SU]W | Rt, Rx, Ry | Rt ←MIN(Rx, Ry) | None |
| [TF].MIN.[SP]A.1[SU]W | Rt, Rx, Ry | Do operation only if T/F condition is satisfied in F0 | None |
| | | | Dual Words |
| MIN.[SP]A.2[SU]W | Rte, Rxe, Rye | Rto ←MIN(Rxo, Ryo)<br>Rte ←MIN(Rxe, Rye) | None |
| [TF].MIN.[SP]A.2[SU]W | Rte, Rxe, Rye | Do operation only if T/F condition is satisfied in F0 | None |
| | | | Dual Halfwords |
| MIN.[SP]A.2[SU]H | Rt, Rx, Ry | Rt.H1 ←MIN(Rx.H1, Ry.H1)<br>Rt.H0 ←MIN(Rx.H0, Ry.H0) | None |
| [TF].MIN.[SP]A.2[SU]H | Rt, Rx, Ry | Do operation only if T/F condition is satisfied in F0 | None |
| | | | Quad Halfwords |
| MIN.[SP]A.4[SU]H | Rte, Rxe, Rye | Rto.H1 ←MIN(Rxo.H1, Ryo.H1)<br>Rto.H0 ←MIN(Rxo.H0, Ryo.H0)<br>Rte.H1 ←MIN(Rxe.H1, Rye.H1)<br>Rte.H0 ←MIN(Rxe.H0, Rye.H0) | None |
| [TF].MIN.[SP]A.4[SU]H | Rte, Rxe, Rye | Do operation only if T/F condition is satisfied in F0 | None |
| | | | Quad Bytes |
| MIN.[SP]A.4[SU]B | Rt, Rx, Ry | Rt.B3 ←MIN(Rx.B3, Ry.B3)<br>Rt.B2 ←MIN(Rx.B2, Ry.B2)<br>Rt.B1 ←MIN(Rx.B1, Ry.B1)<br>Rt.B0 ←MIN(Rx.B0, Ry.B0) | None |
| [TF].MIN.[SP]A.4[SU]B | Rt, Rx, Ry | Do operation only if T/F condition is satisfied in F0 | None |
| | | | Octal Bytes |
| MIN.[SP]A.8[SU]B | Rte, Rxe, Rye | Rto.B3 ←MIN(Rxo.B3, Ryo.B3)<br>Rto.B2 ←MIN(Rxo.B2, Ryo.B2)<br>Rto.B1 ←MIN(Rxo.B1, Ryo.B1)<br>Rto.B0 ←MIN(Rxo.B0, Ryo.B0)<br>Rte.B3 ←MIN(Rxe.B3, Rye.B3)<br>Rte.B2 ←MIN(Rxe.B2, Rye.B2)<br>Rte.B1 ←MIN(Rxe.B1, Rye.B1)<br>Rte.B0 ←MIN(Rxe.B0, Rye.B0) | None |
| [TF].MIN.[SP]A.8[SU]B | Rte, Rxe, Rye | Do operation only if T/F condition is satisfied in F0 | None |

Arithmetic Scalar Flags Affected (on least significant operation)
C = 1 if Rx is less than or equal to Ry, 0 otherwise
N = MSB of result
V = 1 if result is zero, 0 otherwise
Z = 1 if Rx is equal to Ry, 0 otherwise

Cycles: 1

NOT - Logical NOT

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | ALUopcode | | | | | | Rt | | | | | Rx | | | | | 0 | 0 | 0 | 0 | 0 | 0 | CE2 | | LogicExt | | |
| | | | | | | | | | | | Rte | | | | 0 | Rxe | | | | 0 | | | | | | | | | | | |

Description
The result of a bitwise NOT operation of source register *Rx* is stored in target register *Rt*.

| Rx bit-n | | Rt bit-n |
|---|---|---|
| 0 | NOT | 1 |
| 1 | | 0 |

Syntax/Operation

| Instruction | Operands | Operation | ACF |
|---|---|---|---|
| | | Doubleword | |
| NOT.[SP]A.1D | Rte, Rxe | Rto\|\|Rte ←NOT Rxo\|\|Rxe | None |
| [TF].NOT.[SP]A.1D | Rte, Rxe | Do operation only if T/F condition is satisfied in F0 | None |
| | | Word | |
| NOT.[SP]A.1W | Rt, Rx | Rt ←NOT Rx | None |
| [TF].NOT.[SP]A.1W | Rt, Rx | Do operation only if T/F condition is satisfied in F0 | None |

Arithmetic Scalar Flags Affected (on least significant operation)
C = Not Affected
N = MSB of result
V = Not Affected
Z = 1 if result is zero, 0 otherwise

Cycles: 1

OR - Logical OR

BOPS, Inc. Manta SYSSIM 2.31

Encoding

| 31 30 | 29 | 28 27 | 26 25 24 23 22 21 | 20 19 18 17 16 | 15 14 13 12 11 | 10 9 8 7 6 | 5 | 4 3 | 2 1 0 |
|---|---|---|---|---|---|---|---|---|---|
| Group | S/P | Unit | ALUopcode | Rt | Rx | Ry | 0 | CE2 | LogicExt |
| | | | | Rte 0 | Rxe 0 | Rye 0 | | | |

Description
The result of a bitwise OR operation of source registers *Rx* and *Ry* is stored in target register *Rt*.

| Rx bit-n | | Ry bit-n | | Rt bit-n |
|---|---|---|---|---|
| 0 | OR | 0 | ==> | 0 |
| 0 | | 1 | | 1 |
| 1 | | 0 | | 1 |
| 1 | | 1 | | 1 |

Syntax/Operation

| Instruction | Operands | Operation | ACF |
|---|---|---|---|
| | | | Doubleword |
| OR.[SP]A.1D | Rte, Rxe, Rye | Rto\|\|Rte ←Rxo\|\|Rxe OR Ryo\|\|Rye | None |
| [TF].OR.[SP]A.1D | Rte, Rxe, Rye | Do operation only if T/F condition is satisfied in F0 | None |
| | | | Word |
| OR.[SP]A.1W | Rt, Rx, Ry | Rt ←Rx OR Ry | None |
| [TF].OR.[SP]A.1W | Rt, Rx, Ry | Do operation only if T/F condition is satisfied in F0 | None |

Arithmetic Scalar Flags Affected (on least significant operation)
C = Not Affected
N = MSB of result
V = Not Affected
Z = 1 if result is zero, 0 otherwise

Cycles: 1

XOR - Logical XOR

BOPS, Inc. Manta SYSSIM 2.31

Encoding

| 31 30 | 29 | 28 27 | 26 25 24 23 22 21 | 20 19 18 17 | 16 | 15 14 13 12 | 11 | 10 9 8 7 | 6 | 5 | 4 3 | 2 1 0 |
|---|---|---|---|---|---|---|---|---|---|---|---|---|
| Group | S/P | Unit | ALUopcode | Rt | | Rx | | Ry | | 0 | CE2 | LogicExt |
| | | | | Rte | 0 | Rxe | 0 | Rye | 0 | | | |

Description
The result of a bitwise XOR (Exclusive-OR) operation of source registers *Rx* and *Ry* is stored in target register *Rt*.

| Rx bit-n | | Ry bit-n | | Rt bit-n |
|---|---|---|---|---|
| 0 | XOR | 0 | ==> | 0 |
| 0 | | 1 | | 1 |
| 1 | | 0 | | 1 |
| 1 | | 1 | | 0 |

Syntax/Operation

| Instruction | Operands | Operation | ACF |
|---|---|---|---|
| | | | Doubleword |
| XOR.[SP]A.1D | Rte, Rxe, Rye | Rto\|\|Rte ←Rxo\|\|Rxe XOR Ryo\|\|Rye | None |
| [TF].XOR.[SP]A.1D | Rte, Rxe, Rye | Do operation only if T/F condition is satisfied in F0 | None |
| | | | Word |
| XOR.[SP]A.1W | Rt, Rx, Ry | Rt ←Rx XOR Ry | None |
| [TF].XOR.[SP]A.1W | Rt, Rx, Ry | Do operation only if T/F condition is satisfied in F0 | None |

Arithmetic Scalar Flags Affected (on least significant operation)
C = Not Affected
N = MSB of result
V = Not Affected
Z = 1 if result is zero, 0 otherwise

Cycles: 1

ALU/MAU Common Instructions

| | |
|---|---|
| ADD | Add |
| ADDI | Add Immediate |
| ADDS | Add with Saturate |
| BFLYD2 | Butterfly Divide by 2 |
| BFLYS | Butterfly with Saturate |
| MEAN2 | Mean of 2 Elements |
| SUB | Subtract |
| SUBI | Subtract Immediate |
| SUBS | Subtract with Saturate |

ADD - Add

BOPS, Inc. Manta SYSSIM 2.31

Encoding

| 31 30 | 29 | 28 27 | 26 25 24 23 22 21 | 20 19 18 17 | 16 | 15 14 13 12 | 11 | 10 9 8 7 | 6 | 5 | 4 3 | 2 1 0 |
|---|---|---|---|---|---|---|---|---|---|---|---|---|
| Group | S/P | Unit | ALUopcode | Rt | | Rx | | Ry | | 0 | CE2 | DPack |
| | | | MAUopcode | Rte | 0 | Rxe | 0 | Rye | 0 | | | |

Description
The sum of source registers *Rx* and *Ry* is stored in target register *Rt*.

Syntax/Operation

| Instruction | Operands | Operation | ACF |
|---|---|---|---|
| | | | Doubleword |
| ADD.[SP][AM].1D | Rte, Rxe, Rye | Rto\|\|Rte ←Rxo\|\|Rxe + Ryo\|\|Rye | None |
| [TF].ADD.[SP][AM].1D | Rte, Rxe, Rye | Do operation only if T/F condition is satisfied in F0 | None |
| | | | Word |
| ADD.[SP][AM].1W | Rt, Rx, Ry | Rt ←Rx + Ry | None |
| [TF].ADD.[SP][AM].1W | Rt, Rx, Ry | Do operation only if T/F condition is satisfied in F0 | None |
| | | | Dual Words |
| ADD.[SP][AM].2W | Rte, Rxe, Rye | Rto ←Rxo + Ryo<br>Rte ←Rxe + Rye | None |
| [TF].ADD.[SP][AM].2W | Rte, Rxe, Rye | Do operation only if T/F condition is satisfied in F0 | None |
| | | | Dual Halfwords |
| ADD.[SP][AM].2H | Rt, Rx, Ry | Rt.H1 ←Rx.H1 + Ry.H1<br>Rt.H0 ←Rx.H0 + Ry.H0 | None |
| [TF].ADD.[SP][AM].2H | Rt, Rx, Ry | Do operation only if T/F condition is satisfied in F0 | None |
| | | | Quad Halfwords |
| ADD.[SP][AM].4H | Rte, Rxe, Rye | Rto.H1 ←Rxo.H1 + Ryo.H1<br>Rto.H0 ←Rxo.H0 + Ryo.H0<br>Rte.H1 ←Rxe.H1 + Rye.H1<br>Rte.H0 ←Rxe.H0 + Rye.H0 | None |
| [TF].ADD.[SP][AM].4H | Rte, Rxe, Rye | Do operation only if T/F condition is satisfied in F0 | None |
| | | | Quad Bytes |
| ADD.[SP][AM].4B | Rt, Rx, Ry | Rt.B3 ←Rx.B3 + Ry.B3<br>Rt.B2 ←Rx.B2 + Ry.B2<br>Rt.B1 ←Rx.B1 + Ry.B1<br>Rt.B0 ←Rx.B0 + Ry.B0 | None |
| [TF].ADD.[SP][AM].4B | Rt, Rx, Ry | Do operation only if T/F condition is satisfied in F0 | None |
| | | | Octal Bytes |
| ADD.[SP][AM].8B | Rte, Rxe, Rye | Rto.B3 ←Rxo.B3 + Ryo.B3<br>Rto.B2 ←Rxo.B2 + Ryo.B2<br>Rto.B1 ←Rxo.B1 + Ryo.B1<br>Rto.B0 ←Rxo.B0 + Ryo.B0<br>Rte.B3 ←Rxe.B3 + Rye.B3<br>Rte.B2 ←Rxe.B2 + Rye.B2<br>Rte.B1 ←Rxe.B1 + Rye.B1<br>Rte.B0 ←Rxe.B0 + Rye.B0 | None |
| [TF].ADD.[SP][AM].8B | Rte, Rxe, Rye | Do operation only if T/F condition is satisfied in F0 | None |

Arithmetic Scalar Flags Affected (on least significant operation)
C = 1 if a carry occurs, 0 otherwise
N = MSB of result
V = 1 if an overflow occurs, 0 otherwise
Z = 1 if result is zero, 0 otherwise See also ASF Definitions in chapter on Conditional Execution.

Cycles: 1

ADDI - Add Immediate

BOPS, Inc. Manta SYSSIM 2.31

Encoding

| 31 | 30 | 29 | 28 27 | 26 25 24 23 22 21 | 20 19 18 17 16 | | 15 14 13 12 11 | | 10 9 8 7 6 | 5 | 4 3 | 2 1 0 |
|---|---|---|---|---|---|---|---|---|---|---|---|---|
| Group | | S/P | Unit | ALUopcode / MAUopcode | Rt | | Rx | | UIMM5 | 0 | CE2 | DPack |
| | | | | | Rte | 0 | Rxe | 0 | | | | |

Description

The sum of source register *Rx* and an unsigned 5-bit immediate value *UIMM5* is stored in target register *Rt*. The valid value range for *UIMM5* is 1-32.

Syntax/Operation

| Instruction | Operands | Operation | ACF |
|---|---|---|---|
| | | Doubleword | |
| ADDI.[SP][AM].1D | Rte, Rxe, UIMM5 | Rto\|\|Rte ←Rxo\|\|Rxe + UIMM5 | None |
| [TF].ADDI.[SP][AM].1D | Rte, Rxe, UIMM5 | Do operation only if T/F condition is satisfied in F0 | None |
| | | Word | |
| ADDI.[SP][AM].1W | Rt, Rx, UIMM5 | Rt ←Rx + UIMM5 | None |
| [TF].ADDI.[SP][AM].1W | Rt, Rx, UIMM5 | Do operation only if T/F condition is satisfied in F0 | None |
| | | Dual Words | |
| ADDI.[SP][AM].2W | Rte, Rxe, UIMM5 | Rto ←Rxo + UIMM5<br>Rte ←Rxe + UIMM5 | None |
| [TF].ADDI.[SP][AM].2W | Rte, Rxe, UIMM5 | Do operation only if T/F condition is satisfied in F0 | None |
| | | Dual Halfwords | |
| ADDI.[SP][AM].2H | Rt, Rx, UIMM5 | Rt.H1 ←Rx.H1 + UIMM5<br>Rt.H0 ←Rx.H0 + UIMM5 | None |
| [TF].ADDI.[SP][AM].2H | Rt, Rx, UIMM5 | Do operation only if T/F condition is satisfied in F0 | None |
| | | Quad Halfwords | |
| ADDI.[SP][AM].4H | Rte, Rxe, UIMM5 | Rto.H1 ←Rxo.H1 + UIMM5<br>Rto.H0 ←Rxo.H0 + UIMM5<br>Rte.H1 ←Rxe.H1 + UIMM5<br>Rte.H0 ←Rxe.H0 + UIMM5 | None |
| [TF].ADDI.[SP][AM].4H | Rte, Rxe, UIMM5 | Do operation only if T/F condition is satisfied in F0 | None |
| | | Quad Bytes | |
| ADDI.[SP][AM].4B | Rt, Rx, UIMM5 | Rt.B3 ←Rx.B3 + UIMM5<br>Rt.B2 ←Rx.B2 + UIMM5<br>Rt.B1 ←Rx.B1 + UIMM5<br>Rt.B0 ←Rx.B0 + UIMM5 | None |
| [TF].ADDI.[SP][AM].4B | Rt, Rx, UIMM5 | Do operation only if T/F condition is satisfied in F0 | None |
| | | Octal Bytes | |
| ADDI.[SP][AM].8B | Rte, Rxe, UIMM5 | Rto.B3 ←Rxo.B3 + UIMM5<br>Rto.B2 ←Rxo.B2 + UIMM5<br>Rto.B1 ←Rxo.B1 + UIMM5<br>Rto.B0 ←Rxo.B0 + UIMM5<br>Rte.B3 ←Rxe.B3 + UIMM5<br>Rte.B2 ←Rxe.B2 + UIMM5<br>Rte.B1 ←Rxe.B1 + UIMM5<br>Rte.B0 ←Rxe.B0 + UIMM5 | None |
| [TF].ADDI.[SP][AM].8B | Rte, Rxe, UIMM5 | Do operation only if T/F condition is satisfied in F0 | None |

Arithmetic Scalar Flags Affected (on least significant operation)

C = 1 if a carry occurs, 0 otherwise
N = MSB of result
V = 1 if an overflow occurs, 0 otherwise
Z = 1 if result is zero, 0 otherwise See also ASF Definitions in chapter on Conditional Execution.

Cycles: 1

ADDS - Add with Saturate

BOPS, Inc. Manta SYSSIM 2.31

Encoding

| 31 30 | 29 | 28 27 | 26 25 24 23 22 21 | 20 19 18 17 16 | 15 14 13 12 11 | 10 9 8 7 6 | 5 | 4 3 | 2 1 0 |
|---|---|---|---|---|---|---|---|---|---|
| Group | S/P | Unit | ALUopcode<br>MAUopcode | Rt<br>Rte 0 | Rx<br>Rxe 0 | Ry<br>Rye 0 | 0 | CE2 | DPack |

Description
The sum of source registers *Rx* and *Ry* is stored in target register *Rt*. Saturated arithmetic is performed such that if a result does not fit within the target format, it is clipped to a minimum or maximum as necessary. See the Saturated Arithmetic description for details on when saturation occurs and what the saturation values are.

Syntax/Operation

| Instruction | Operands | Operation | ACF |
|---|---|---|---|
| | | | Doubleword |
| ADDS.[SP][AM].1[SU]D | Rte, Rxe, Rye | Rto\|\|Rte ←Rxo\|\|Rxe + Ryo\|\|Rye | None |
| [TF].ADDS.[SP][AM].1[SU]D | Rte, Rxe, Rye | Do operation only if T/F condtion is satisfied in F0 | None |
| | | | Word |
| ADDS.[SP][AM].1[SU]W | Rt, Rx, Ry | Rt ←Rx + Ry | None |
| [TF].ADDS.[SP][AM].1[SU]W | Rt, Rx, Ry | Do operation only if T/F condition is satisfied in F0 | None |
| | | | Dual Words |
| ADDS.[SP][AM].2[SU]W | Rte, Rxe, Rye | Rto ←Rxo + Ryo<br>Rte ←Rxe + Rye | None |
| [TF].ADDS.[SP][AM].2[SU]W | Rte, Rxe, Rye | Do operation only if T/F condition is satisfied in F0 | None |
| | | | Dual Halfwords |
| ADDS.[SP][AM].2[SU]H | Rt, Rx, Ry | Rt.H1 ←Rx.H1 + Ry.H1<br>Rt.H0 ←Rx.H0 + Ry.H0 | None |
| [TF].ADDS.[SP][AM].2[SU]H | Rt, Rx, Ry | Do operation only if T/F condition is satisfied in F0 | None |
| | | | Quad Halfwords |
| ADDS.[SP][AM].4[SU]H | Rte, Rxe, Rye | Rto.H1 ←Rxo.H1 + Ryo.H1<br>Rto.H0 ←Rxo.H0 + Ryo.H0<br>Rte.H1 ←Rxe.H1 + Rye.H1<br>Rte.H0 ←Rxe.H0 + Rye.H0 | None |
| [TF].ADDS.[SP][AM].4[SU]H | Rte, Rxe, Rye | Do operation only if T/F condition is satisfied in F0 | None |
| | | | Quad Bytes |
| ADDS.[SP][AM].4[SU]B | Rt, Rx, Ry | Rt.B3 ←Rx.B3 + Ry.B3<br>Rt.B2 ←Rx.B2 + Ry.B2<br>Rt.B1 ←Rx.B1 + Ry.B1<br>Rt.B0 ←Rx.B0 + Ry.B0 | None |
| [TF].ADDS.[SP][AM].4[SU]B | Rt, Rx, Ry | Do operation only if T/F condition is satisfied in F0 | None |
| | | | Octal Bytes |
| ADDS.[SP][AM].8[SU]B | Rte, Rxe, Rye | Rto.B3 ←Rxo.B3 + Ryo.B3<br>Rto.B2 ←Rxo.B2 + Ryo.B2<br>Rto.B1 ←Rxo.B1 + Ryo.B1<br>Rto.B0 ←Rxo.B0 + Ryo.B0<br>Rte.B3 ←Rxe.B3 + Rye.B3<br>Rte.B2 ←Rxe.B2 + Rye.B2<br>Rte.B1 ←Rxe.B1 + Rye.B1<br>Rte.B0 ←Rxe.B0 + Rye.B0 | None |
| [TF].ADDS.[SP][AM].8[SU]B | Rte, Rxe, Rye | Do operation only if T/F condition is satisfied in F0 | None |

Arithmetic Scalar Flags Affected (on least significant operation)
C = 1 if a carry occurs, 0 otherwise
N = MSB of result
V = 1 if an overflow occurs, 0 otherwise
Z = 1 if result is zero, 0 otherwise See also ASF Definitions in chapter on Conditional Execution.

Cycles: 1

BFLYD2 - Butterfly Divide by 2

BOPS, Inc. Manta SYSSIM 2.31

Encoding

| 31 30 | 29 | 28 27 | 26 25 24 23 22 21 | 20 19 18 17 | 16 | 15 14 13 12 11 | 10 9 8 7 6 | 5 | 4 3 | 2 | 1 | 0 |
|---|---|---|---|---|---|---|---|---|---|---|---|---|
| Group | S/P | Unit | ALUopcode<br>MAUopcode | Rte | 0 | Rx<br>Rxe 0 | Ry<br>Rye 0 | 0 | CE2 | 0 | H | W/H |

Description

A butterfly operation consisting of a sum of source registers *Rx* and *Ry* divided by two and a difference of source registers *Rx* and *Ry* divided by two is stored in odd/even target register pair *Rto||Rte*.

The divide by two operation performs FLOOR rounding on the divide by two operation. FLOOR rounds towards negative infinity. Thus, an operation yielding a -1.5 value is rounded to -2.0. An operation yielding +1.5 is rounded to +1.0.

Syntax/Operation

| Instruction | Operands | Operation | ACF |
|---|---|---|---|
| | | | Dual Words |
| BFLYD2.[SP][AM].2SW | Rte, Rx, Ry | Rto ←(Rx + Ry)/2<br>Rte ←(Rx - Ry)/2 | None |
| [TF].BFLYD2.[SP][AM].2SW | Rte, Rx, Ry | Do operation only if T/F condition is satisfied in ACFs | None |
| | | | Quad Halfwords |
| BFLYD2.[SP][AM].4SH | Rte, Rxe, RyeH | Rto.H1 ←(Rxo.H + Ryo.H)/2<br>Rto.H0 ←(Rxo.H - Ryo.H)/2<br>Rte.H1 ←(Rxe.H + Rye.H)/2<br>Rte.H0 ←(Rxe.H - Rye.H)/2<br>(H refers to register halfwords H0 or H1) | None |
| [TF].BFLYD2.[SP][AM].4SH | Rte, Rxe, RyeH | Do operation only if T/F condition is satisfied in ACFs | None |

Arithmetic Scalar Flags Affected (on least significant operation (Rte difference operation))

C = Not affected
N = MSB of result
V = Not affected
Z = 1 if result is zero, 0 otherwise See also ASF Definitions in chapter on Conditional Execution.

Cycles: 1

BFLYS - Butterfly with Saturate

BOPS, Inc. Manta SYSSIM 2.31

Encoding

| 31 30 | 29 | 28 27 | 26 25 24 23 22 21 | 20 19 18 17 | 16 | 15 14 13 12 11 | 10 9 8 7 6 | 5 | 4 3 | 2 | 1 | 0 |
|---|---|---|---|---|---|---|---|---|---|---|---|---|
| Group | S/P | Unit | ALUopcode<br>MAUopcode | Rte | 0 | Rx | Ry | 0 | CE2 | 0 | H | W/H |
| | | | | | | Rxe \| 0 | Rye \| 0 | | | | | |

Description

A butterfly operation consisting of a sum and a difference of source registers *Rx* and *Ry* is stored in odd/even target register pair *Rto*||*Rte*. Saturated arithmetic is performed such that if a result does not fit within the target format, it is clipped to a minimum or maximum as necessary.

Syntax/Operation

| Instruction | Operands | Operation | ACF |
|---|---|---|---|
| | | | Dual Words |
| BFLYS.[SP][AM].2[SU]W | Rte, Rx, Ry | Rto ←Rx + Ry<br>Rte ←Rx - Ry | None |
| [TF].BFLYS.[SP][AM].2[SU]W | Rte, Rx, Ry | Do operation only if T/F condition is satisfied in ACFs | None |
| | | | Quad Halfwords |
| BFLYS.[SP][AM].4[SU]H | Rte, Rxe, RyeH | Rto.H1 ←Rxo.H + Ryo.H<br>Rto.H0 ←Rxo.H - Ryo.H<br>Rte.H1 ←Rxe.H + Rye.H<br>Rte.H0 ←Rxe.H - Rye.H<br>(H refers to register halfwords H0 or H1) | None |
| [TF].BFLYS.[SP][AM].4[SU]H | Rte, Rxe, RyeH | Do operation only if T/F condition is satisfied in ACFs | None |

Arithmetic Scalar Flags Affected (on least significant operation (Rte difference operation))
C = 1 if a carry occurs, 0 otherwise
N = MSB of result
V = 1 if an overflow occurs, 0 otherwise
Z = 1 if result is zero, 0 otherwise See also ASF Definitions in chapter on Conditional Execution.

Cycles: 1

MEAN2 - Mean of 2 elements

BOPS, Inc. Manta SYSSIM 2.31

Encoding

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="2" rowspan="2">Group</td><td rowspan="2">S/P</td><td colspan="2" rowspan="2">Unit</td><td colspan="6" rowspan="2">ALUopcode<br>MAUopcode</td><td colspan="5">Rt</td><td colspan="5">Rx</td><td colspan="5">Ry</td><td rowspan="2">0</td><td colspan="2" rowspan="2">CE2</td><td colspan="3" rowspan="2">DPack</td></tr>
<tr><td colspan="4">Rte</td><td>0</td><td colspan="4">Rxe</td><td>0</td><td colspan="4">Rye</td><td>0</td></tr>
</table>

Description

The sum of unsigned values in source registers *Rx* and *Ry* is divided by two, rounded according to the rounding mode specified, then stored in target register *Rt*. Since the result is shifted right for the divide by two, the carry bit is shifted into the MSB position and thus, overflow and a traditional carry can not occur with this operation. The C flag for this instruction is defined below.

The *RoundMode* operand specifies which rounding mode to use on the result and is specified as follows:
R=TRUNC Round towards zero (LSB shifted off is ignored)
R=ROUND Round to the nearest integer (LSB shifted off is added to the result)

Syntax/Operation

| Instruction | Operands | Operation | ACF |
|---|---|---|---|
| | | | Doubleword |
| MEAN2.[SP][AM].1UD | Rte, Rxe, Rye, *RoundMode* | Rto\|\|Rte ←Round((Rxo\|\|Rxe + Ryo\|\|Rye) / 2) | None |
| [TF].MEAN2.[SP][AM].1UD | Rte, Rxe, Rye, *RoundMode* | Do operation only if T/F condition is satisfied in F0 | None |
| | | | Word |
| MEAN2.[SP][AM].1UW | Rt, Rx, Ry, *RoundMode* | Rt ←Round((Rx + Ry) / 2) | None |
| [TF].MEAN2.[SP][AM].1UW | Rt, Rx, Ry, *RoundMode* | Do operation only if T/F condition is satisfied in F0 | None |
| | | | Dual Words |
| MEAN2.[SP][AM].2UW | Rte, Rxe, Rye, *RoundMode* | Rto ←Round((Rxo + Ryo) / 2)<br>Rte ←Round((Rxe + Rye) / 2) | None |
| [TF].MEAN2.[SP][AM].2UW | Rte, Rxe, Rye, *RoundMode* | Do operation only if T/F condition is satisfied in F0 | None |
| | | | Dual Halfwords |
| MEAN2.[SP][AM].2UH | Rt, Rx, Ry, *RoundMode* | Rt.H1 ←Round((Rx.H1 + Ry.H1) / 2)<br>Rt.H0 ←Round((Rx.H0 + Ry.H0) / 2) | None |
| [TF].MEAN2.[SP][AM].2UH | Rt, Rx, Ry, *RoundMode* | Do operation only if T/F condition is satisfied in F0 | None |
| | | | Quad Halfwords |
| MEAN2.[SP][AM].4UH | Rte, Rxe, Rye, *RoundMode* | Rto.H1 ←Round((Rxo.H1 + Ryo.H1) / 2)<br>Rto.H0 ←Round((Rxo.H0 + Ryo.H0) / 2)<br>Rte.H1 ←Round((Rxe.H1 + Rye.H1) / 2)<br>Rte.H0 ←Round((Rxe.H0 + Rye.H0) / 2) | None |
| [TF].MEAN2.[SP][AM].4UH | Rte, Rxe, Rye, *RoundMode* | Do operation only if T/F condition is satisfied in F0 | None |
| | | | Quad Bytes |
| MEAN2.[SP][AM].4UB | Rt, Rx, Ry, *RoundMode* | Rt.B3 ←Round((Rx.B3 + Ry.B3) / 2)<br>Rt.B2 ←Round((Rx.B2 + Ry.B2) / 2)<br>Rt.B1 ←Round((Rx.B1 + Ry.B1) / 2)<br>Rt.B0 ←Round((Rx.B0 + Ry.B0) / 2) | None |
| [TF].MEAN2.[SP][AM].4UB | Rt, Rx, Ry, *RoundMode* | Do operation only if T/F condition is satisfied in F0 | None |
| | | | Octal Bytes |
| MEAN2.[SP][AM].8UB | Rte, Rxe, Rye, *RoundMode* | Rto.B3 ←Round((Rxo.B3 + Ryo.B3) / 2)<br>Rto.B2 ←Round((Rxo.B2 + Ryo.B2) / 2)<br>Rto.B1 ←Round((Rxo.B1 + Ryo.B1) / 2)<br>Rto.B0 ←Round((Rxo.B0 + Ryo.B0) / 2)<br>Rte.B3 ←Round((Rxe.B3 + Rye.B3) / 2)<br>Rte.B2 ←Round((Rxe.B2 + Rye.B2) / 2)<br>Rte.B1 ←Round((Rxe.B1 + Rye.B1) / 2)<br>Rte.B0 ←Round((Rxe.B0 + Rye.B0) / 2) | None |
| [TF].MEAN2.[SP][AM].8UB | Rte, Rxe, Rye, *RoundMode* | Do operation only if T/F condition is satisfied in F0 | None |

Arithmetic Scalar Flags Affected (on least significant operation)
C = value of last bit shifted out of source register
N = MSB of result
V = Not affected
Z = 1 if result is zero, 0 otherwise

Cycles: 1

SUB - Subtract

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | ALUopcode MAUopcode | | | | | | Rt / Rte | | | | 0 | Rx / Rxe | | | | 0 | Ry / Rye | | | | 0 | 0 | CE2 | | DPack | | |

Description
The difference of source registers *Rx* and *Ry* is stored in target register *Rt*.

Syntax/Operation

| Instruction | Operands | Operation | ACF |
|---|---|---|---|
| | | | Doubleword |
| SUB.[SP][AM].1D | Rte, Rxe, Rye | Rto\|\|Rte ←Rxo\|\|Rxe - Ryo\|\|Rye | None |
| [TF].SUB.[SP][AM].1D | Rte, Rxe, Rye | Do operation only if T/F condition is satisfied in F0 | None |
| | | | Word |
| SUB.[SP][AM].1W | Rt, Rx, Ry | Rt ←Rx - Ry | None |
| [TF].SUB.[SP][AM].1W | Rt, Rx, Ry | Do operation only if T/F condition is satisfied in F0 | None |
| | | | Dual Words |
| SUB.[SP][AM].2W | Rte, Rxe, Rye | Rto ←Rxo - Ryo<br>Rte ←Rxe - Rye | None |
| [TF].SUB.[SP][AM].2W | Rte, Rxe, Rye | Do operation only if T/F condition is satisfied in F0 | None |
| | | | Dual Halfwords |
| SUB.[SP][AM].2H | Rt, Rx, Ry | Rt.H1 ←Rx.H1 - Ry.H1<br>Rt.H0 ←Rx.H0 - Ry.H0 | None |
| [TF].SUB.[SP][AM].2H | Rt, Rx, Ry | Do operation only if T/F condition is satisfied in F0 | None |
| | | | Quad Halfwords |
| SUB.[SP][AM].4H | Rte, Rxe, Rye | Rto.H1 ←Rxo.H1 - Ryo.H1<br>Rto.H0 ←Rxo.H0 - Ryo.H0<br>Rte.H1 ←Rxe.H1 - Rye.H1<br>Rte.H0 ←Rxe.H0 - Rye.H0 | None |
| [TF].SUB.[SP][AM].4H | Rte, Rxe, Rye | Do operation only if T/F condition is satisfied in F0 | None |
| | | | Quad Bytes |
| SUB.[SP][AM].4B | Rt, Rx, Ry | Rt.B3 ←Rx.B3 - Ry.B3<br>Rt.B2 ←Rx.B2 - Ry.B2<br>Rt.B1 ←Rx.B1 - Ry.B1<br>Rt.B0 ←Rx.B0 - Ry.B0 | None |
| [TF].SUB.[SP][AM].4B | Rt, Rx, Ry | Do operation only if T/F condition is satisfied in F0 | None |
| | | | Octal Bytes |
| SUB.[SP][AM].8B | Rte, Rxe, Rye | Rto.B3 ←Rxo.B3 - Ryo.B3<br>Rto.B2 ←Rxo.B2 - Ryo.B2<br>Rto.B1 ←Rxo.B1 - Ryo.B1<br>Rto.B0 ←Rxo.B0 - Ryo.B0<br>Rte.B3 ←Rxe.B3 - Rye.B3<br>Rte.B2 ←Rxe.B2 - Rye.B2<br>Rte.B1 ←Rxe.B1 - Rye.B1<br>Rte.B0 ←Rxe.B0 - Rye.B0 | None |
| [TF].SUB.[SP][AM].8B | Rte, Rxe, Rye | Do operation only if T/F condition is satisfied in F0 | None |

Arithmetic Scalar Flags Affected (on least significant operation)
C = 1 if a carry occurs, 0 otherwise
N = MSB of result
V = 1 if an overflow occurs, 0 otherwise
Z = 1 if result is zero, 0 otherwise See also ASF Definitions in chapter on Conditional Execution.

Cycles: 1

SUBI - Subtract Immediate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | ALUopcode<br>MAUopcode | | | | | | Rt / Rte | | | | 0 | Rx / Rxe | | | | 0 | UIMM5 | | | | | 0 | CE2 | | DPack | | |

Description
The difference of source register *Rx* and an unsigned 5-bit immediate value *UIMM5* is stored in target register *Rt*. The valid value range for *UIMM5* is 1-32.

Syntax/Operation

| Instruction | Operands | Operation | ACF |
|---|---|---|---|
| | | | Doubleword |
| SUBI.[SP][AM].1D | Rte, Rxe, UIMM5 | Rto‖Rte ←Rxo‖Rxe - UIMM5 | None |
| [TF].SUBI.[SP][AM].1D | Rte, Rxe, UIMM5 | Do operation only if T/F condition is satisfied in F0 | None |
| | | | Word |
| SUBI.[SP][AM].1W | Rt, Rx, UIMM5 | Rt ←Rx - UIMM5 | None |
| [TF].SUBI.[SP][AM].1W | Rt, Rx, UIMM5 | Do operation only if T/F condition is satisfied in F0 | None |
| | | | Dual Words |
| SUBI.[SP][AM].2W | Rte, Rxe, UIMM5 | Rto ←Rxo - UIMM5<br>Rte ←Rxe - UIMM5 | None |
| [TF].SUBI.[SP][AM].2W | Rte, Rxe, UIMM5 | Do operation only if T/F condition is satisfied in F0 | None |
| | | | Dual Halfwords |
| SUBI.[SP][AM].2H | Rt, Rx, UIMM5 | Rt.H1 ←Rx.H1 - UIMM5<br>Rt.H0 ←Rx.H0 - UIMM5 | None |
| [TF].SUBI.[SP][AM].2H | Rt, Rx, UIMM5 | Do operation only if T/F condition is satisfied in F0 | None |
| | | | Quad Halfwords |
| SUBI.[SP][AM].4H | Rte, Rxe, UIMM5 | Rto.H1 ←Rxo.H1 - UIMM5<br>Rto.H0 ←Rxo.H0 - UIMM5<br>Rte.H1 ←Rxe.H1 - UIMM5<br>Rte.H0 ←Rxe.H0 - UIMM5 | None |
| [TF].SUBI.[SP][AM].4H | Rte, Rxe, UIMM5 | Do operation only if T/F condition is satisfied in F0 | None |
| | | | Quad Bytes |
| SUBI.[SP][AM].4B | Rt, Rx, UIMM5 | Rt.B3 ←Rx.B3 - UIMM5<br>Rt.B2 ←Rx.B2 - UIMM5<br>Rt.B1 ←Rx.B1 - UIMM5<br>Rt.B0 ←Rx.B0 - UIMM5 | None |
| [TF].SUBI.[SP][AM].4B | Rt, Rx, UIMM5 | Do operation only if T/F condition is satisfied in F0 | None |
| | | | Octal Bytes |
| SUBI.[SP][AM].8B | Rte, Rxe, UIMM5 | Rto.B3 ←Rxo.B3 - UIMM5<br>Rto.B2 ←Rxo.B2 - UIMM5<br>Rto.B1 ←Rxo.B1 - UIMM5<br>Rto.B0 ←Rxo.B0 - UIMM5<br>Rte.B3 ←Rxe.B3 - UIMM5<br>Rte.B2 ←Rxe.B2 - UIMM5<br>Rte.B1 ←Rxe.B1 - UIMM5<br>Rte.B0 ←Rxe.B0 - UIMM5 | None |
| [TF].SUBI.[SP][AM].8B | Rte, Rxe, UIMM5 | Do operation only if T/F condition is satisfied in F0 | None |

Arithmetic Scalar Flags Affected (on least significant operation)
C = 1 if a carry occurs, 0 otherwise
N = MSB of result
V = 1 if an overflow occurs, 0 otherwise
Z = 1 if result is zero, 0 otherwise See also ASF Definitions in chapter on Conditional Execution.

Cycles: 1

SUBS - Subtract with Saturate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | ALUopcode / MAUopcode | | | | | | Rt | | | | | Rx | | | | | Ry | | | | | 0 | CE2 | | DPack | | |
| | | | | | | | | | | | Rte | | | | 0 | Rxe | | | | 0 | Rye | | | | 0 | | | | | | |

Description

The difference of source registers *Rx* and *Ry* is stored in target register *Rt*. Saturated arithmetic is performed such that if a result does not fit within the target format, it is clipped to a minimum or maximum as necessary. See the Saturated Arithmetic description for details on when saturation occurs and what the saturation values are.

Syntax/Operation

| Instruction | Operands | Operation | ACF |
|---|---|---|---|
| | | | Doubleword |
| SUBS.[SP][AM].1[SU]D | Rte, Rxe, Rye | Rto\|\|Rte ←Rxo\|\|Rxe - Ryo\|\|Rye | None |
| [TF].SUBS.[SP][AM].1[SU]D | Rte, Rxe, Rye | Do operation only if T/F condition is satisfied in F0 | None |
| | | | Word |
| SUBS.[SP][AM].1[SU]W | Rt, Rx, Ry | Rt ←Rx - Ry | None |
| [TF].SUBS.[SP][AM].1[SU]W | Rt, Rx, Ry | Do operation only if T/F condition is satisfied in F0 | None |
| | | | Dual Words |
| SUBS.[SP][AM].2[SU]W | Rte, Rxe, Rye | Rto ←Rxo - Ryo<br>Rte ←Rxe - Rye | None |
| [TF].SUBS.[SP][AM].2[SU]W | Rte, Rxe, Rye | Do operation only if T/F condition is satisfied in F0 | None |
| | | | Dual Halfwords |
| SUBS.[SP][AM].2[SU]H | Rt, Rx, Ry | Rt.H1 ←Rx.H1 - Ry.H1<br>Rt.H0 ←Rx.H0 - Ry.H0 | None |
| [TF].SUBS.[SP][AM].2[SU]H | Rt, Rx, Ry | Do operation only if T/F condition is satisfied in F0 | None |
| | | | Quad Halfwords |
| SUBS.[SP][AM].4[SU]H | Rte, Rxe, Rye | Rto.H1 ←Rxo.H1 - Ryo.H1<br>Rto.H0 ←Rxo.H0 - Ryo.H0<br>Rte.H1 ←Rxe.H1 - Rye.H1<br>Rte.H0 ←Rxe.H0 - Rye.H0 | None |
| [TF].SUBS.[SP][AM].4[SU]H | Rte, Rxe, Rye | Do operation only if T/F condition is satisfied in F0 | None |
| | | | Quad Bytes |
| SUBS.[SP][AM].4[SU]B | Rt, Rx, Ry | Rt.B3 ←Rx.B3 - Ry.B3<br>Rt.B2 ←Rx.B2 - Ry.B2<br>Rt.B1 ←Rx.B1 - Ry.B1<br>Rt.B0 ←Rx.B0 - Ry.B0 | None |
| [TF].SUBS.[SP][AM].4[SU]B | Rt, Rx, Ry | Do operation only if T/F condition is satisfied in F0 | None |
| | | | Octal Bytes |
| SUBS.[SP][AM].8[SU]B | Rte, Rxe, Rye | Rto.B3 ←Rxo.B3 - Ryo.B3<br>Rto.B2 ←Rxo.B2 - Ryo.B2<br>Rto.B1 ←Rxo.B1 - Ryo.B1<br>Rto.B0 ←Rxo.B0 - Ryo.B0<br>Rte.B3 ←Rxe.B3 - Rye.B3<br>Rte.B2 ←Rxe.B2 - Rye.B2<br>Rte.B1 ←Rxe.B1 - Rye.B1<br>Rte.B0 ←Rxe.B0 - Rye.B0 | None |
| [TF].SUBS.[SP][AM].8[SU]B | Rte, Rxe, Rye | Do operation only if T/F condition is satisfied in F0 | None |

Arithmetic Scalar Flags Affected (on least significant operation)
C = 1 if a carry occurs, 0 otherwise
N = MSB of result
V = 1 if an overflow occurs, 0 otherwise
Z = 1 if result is zero, 0 otherwise See also ASF Definitions in chapter on Conditional Execution.

Cycles: 1

MAU - Multiply Accumulate Unit Instructions

Common ALU/MAU Instructions

| | |
|---|---|
| ADD | Add |
| ADDI | Add Immediate |
| ADDS | Add with Saturate |
| BFLYD2 | Butterfly Divide by 2 |
| BFLYS | Butterfly with Saturate |
| MEAN2 | Mean of 2 Elements |
| SUB | Subtract |
| SUBI | Subtract Immediate |
| SUBS | Subtract with Saturate |

MAU Instructions

| | |
|---|---|
| FMPY | Floating-Point Multiply |
| MEAN4 | Mean of 4 Elements |
| MPY | Multiply |
| MPYA | Multiply Accumulate |
| MPYCX | Multiply Complex |
| MPYCXD2 | Multiply Complex Divide by 2 |
| MPYCXJ | Multiply Complex Conjugate |
| MPYCXJD2 | Multiply Complex Conjugate Divide by 2 |
| MPYD2 | Multiply Divide by 2 |
| MPYH | Multiply High |
| MPYL | Multiply Low |
| MPYXA | Multiply with Extended Accumulate |
| SUM2P | Sum of 2 Products |
| SUM2PA | Sum of 2 Products Accumulate |
| SUM4ADD | Four Input Summation with Add |
| SUM8ADD | Eight Input Summation with Add |

FMPY - Floating-Point Multiply

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | MAUopcode | | | | | | Rt | | | | | Rx | | | | | Ry | | | | | 0 | CE2 | | FPack | | |

Description
The floating-point product of source registers *Rx* and *Ry* is loaded into target register *Rt*. Both source registers are assumed to be in IEEE 754 floating-point compatible format.

For additional discussion of ManArray floating point operations, see Floating Point Operations, Saturation, and Overflow.

Floating-point multiplication operations with zero, NAN and Infinity values.

| Floating-Point Operand | | 2nd Floating-Point Operand | | ManArray Floating-Point Result | Arithmetic Flags |
|---|---|---|---|---|---|
| Sign | Value | Sign | Value | | |
| 0 | NAN or INF | 0 | non-zero | $+1.9999..x\ 2^{127}$ | V=1, N=0, Z=0 |
| 0 | NAN or INF | 1 | non-zero | $-1.9999..x2^{127}$ | V=1, N=1, Z=0 |
| 0 | NAN or INF | 0 | NAN or infinity | $+1.9999..x2^{127}$ | V=1, N=0, Z=0 |
| 0 | NAN or INF | 1 | NAN or infinity | $-1.9999..x\ 2^{127}$ | V=1, N=1, Z=0 |
| 0 | NAN or INF | 0/1 | zero | +0 | V=1, N=0, Z=1 |
| 1 | NAN or INF | 0 | non-zero | $-1.9999..x\ 2^{127}$ | V=1, N=1, Z=0 |
| 1 | NAN or INF | 1 | non-zero | $+1.9999..x2^{127}$ | V=1, N=0, Z=0 |
| 1 | NAN or INF | 0 | NAN or infinity | $-1.9999..x\ 2^{127}$ | V=1, N=1, Z=0 |
| 1 | NAN or INF | 1 | NAN or infinity | $+1.9999..x2^{127}$ | V=1, N=0, Z=0 |
| 1 | NAN or INF | 0/1 | zero | +0 | V=1, N=0, Z=1 |
| 0/1 | zero | 0/1 | zero | +0 | V=0, N=0, Z=1 |
| 0/1 | zero | 0/1 | non-zero | +0 | V=0, N=0, Z=1 |

Notes for the programmer:
A non-normalized result of an operation is flushed to zero.
The results in this table are the same when the order of the operands is reversed.

Syntax/Operation

| Instruction | Operands | Operation | ACF |
|---|---|---|---|
| | | | Word |
| FMPY.[SP]M.1FW | Rt, Rx, Ry | Rt ←Rx * Ry | None |
| [TF].FMPY.[SP]M.1FW | Rt, Rx, Ry | Do operation only if T/F condition is satisfied in F0 | None |

Arithmetic Scalar Flags Affected
C = Not affected
N = MSB of result
V = 1 if a saturate result is generated, 0 otherwise.
Z = 1 if result is zero, 0 otherwise

Cycles: 2

Restrictions
This MAU instruction takes two execution cycles to complete and may be pipelined with other two-execution-cycle MAU instructions. The target register is written via the MAU write port during the second execution cycle. If a single-execution-cycle MAU instruction immediately follows this two-cycle MAU instruction, the single-cycle MAU instruction has priority over the MAU write port. In this situation, the two-cycle MAU instruction results are lost and the single-cycle MAU instruction's target register is written.

MEAN4 - MEAN of 4 elements

BOPS, Inc. Manta SYSSIM 2.31

Encoding

| 31 30 | 29 | 28 27 | 26 25 24 23 22 21 | 20 19 18 17 16 | 15 14 13 12 | 11 | 10 9 8 7 | 6 | 5 | 4 3 | 2 | 1 0 |
|---|---|---|---|---|---|---|---|---|---|---|---|---|
| Group | S/P | Unit | MAUopcode | Rt | Rxe | 0 | Rye | 0 | 0 | CE2 | RM1 | M4Ext |

Description

The mean of four unsigned bytes is computed for four groups of values, rounded according to the rounding mode specified, then stored in the target register *Rt*. The operation diagram below shows which bytes from source register pairs *Rxo*||*Rxe* and *Ryo*||*Rye* are involved in each of the four group calculations.

The *RoundMode* operand specifies which rounding mode to use on the result and is specified as follows:

R=TRUNC Round towards zero (The two least significant bits shifted off are ignored)

R=ROUND Round to the nearest integer (The 2nd least significant bit shifted off is added to the result)

MEAN4.[SP]M.4UB Rt, Rxe, Rye, *RoundMode*

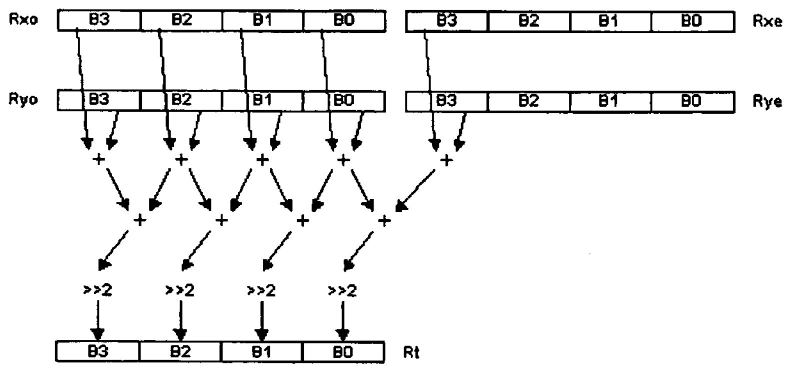

Syntax/Operation

| Syntax | Operands | Operation | ACF |
|---|---|---|---|
| | | | Octal Bytes |
| MEAN4.[SP]M.4UB | Rt, Rxe, Rye, RoundMode | Rt.B3 ←Round((Rxo.B3 + Ryo.B3 + Rxo.B2 + Ryo.B2) / 4)<br>Rt.B2 ←Round((Rxo.B2 + Ryo.B2 + Rxo.B1 + Ryo.B1) / 4)<br>Rt.B1 ←Round((Rxo.B1 + Ryo.B1 + Rxo.B0 + Ryo.B0) / 4)<br>Rt.B0 ←Round((Rxo.B0 + Ryo.B0 + Rxe.B3 + Rye.B3) / 4) | None |
| [TF].MEAN4.[SP]M.4UB | Rt, Rxe, Rye, RoundMode | Do operation only if T/F condition is satisfied in F0. | None |

Arithmetic Scalar Flags Affected

C = value of last bit shifted out of source register

N = MSB of result

V = Not affected

Z = 1 if a zero result is generated, 0 otherwise

Cycles: 1

MPY - Multiply

BOPS, Inc. Manta SYSSIM 2.31

Encoding

| 31 30 | 29 | 28 27 | 26 25 24 23 22 21 | 20 19 18 17 | 16 | 15 14 13 12 11 | 10 9 8 7 6 | 5 | 4 3 | 2 1 0 |
|---|---|---|---|---|---|---|---|---|---|---|
| Group | S/P | Unit | MAUopcode | Rte | 0 | Rx | Ry | 0 | CE2 | MPack |

Description
The product of source registers *Rx* and *Ry* is stored in target register *Rt*.

Syntax/Operation

| Instruction | Operands | Operation | ACF |
|---|---|---|---|
| | | | Word |
| MPY.[SP]M.1[SU]W | Rte, Rx, Ry | Rto\|\|Rte ←Rx * Ry | None |
| [TF].MPY.[SP]M.1[SU]W | Rte, Rx, Ry | Do operation only if T/F condition is satisfied in F0 | None |
| | | | Dual Halfwords |
| MPY.[SP]M.2[SU]H | Rte, Rx, Ry | Rto ←Rx.H1 * Ry.H1<br>Rte ←Rx.H0 * Ry.H0 | None |
| [TF].MPY.[SP]M.2[SU]H | Rte, Rx, Ry | Do operation only if T/F condition is satisfied in F0 | None |

NOTE: The ASFs are set for both signed and unsigned operations.

Arithmetic Scalar Flags Affected (on least significant operation)
C = Not affected
N = MSB of result
V = Not affected
Z = 1 if result is zero, 0 otherwise

Cycles: 2

Restrictions
This MAU instruction takes two execution cycles to complete and may be pipelined with other two execution cycle MAU instructions. The target register is written via the MAU write port during the second execution cycle. If a single execution cycle MAU instruction immediately follows this two cycle MAU instruction, the single cycle MAU instruction has priority over the MAU write port. In this situation, the two cycle MAU instruction results are lost and the single cycle MAU instruction's target register is written.

MPYA - Multiply Accumulate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | MAUopcode | | | | | | Rte | | | | 0 | Rx | | | | | Ry | | | | | 0 | CE2 | | MPack | | |

Description

The product of source registers *Rx* and *Ry* is added to target register *Rt*. The word multiply form of MPYA multiplies two 32-bit values producing a 64-bit result which is added to a 64-bit odd/even target register. The dual halfword form of MPYA multiplies two pairs of 16-bit values producing two 32-bit results: one is added to the odd 32-bit word, the other is added to the even 32-bit word of the odd/even target register pair.

Syntax/Operation

| Instruction | Operands | Operation | ACF |
|---|---|---|---|
| | | | Word |
| MPYA.[SP]M.1[SU]W | Rte, Rx, Ry | Rto\|\|Rte ←(Rx * Ry) + Rto\|\|Rte | None |
| [TF].MPYA.[SP]M.1[SU]W | Rte, Rx, Ry | Do operation only if T/F condition is satisfied in F0 | None |
| | | | Dual Halfwords |
| MPYA.[SP]M.2[SU]H | Rte, Rx, Ry | Rto ←(Rx.H1 * Ry.H1) + Rto<br>Rte ←(Rx.H0 * Ry.H0) + Rte | None |
| [TF].MPYA.[SP]M.2[SU]H | Rte, Rx, Ry | Do operation only if T/F condition is satisfied in F0 | None |

NOTE: The ASFs are set for both signed and unsigned operations.

Arithmetic Flags Affected

C = 1 if a carry occurs on the addition, 0 otherwise
N = MSB of result
V = 1 if an overflow occurs on the addition, 0 otherwise
Z = 1 if result is zero, 0 otherwise See also ASF Definitions in chapter on Conditional Execution.

Cycles: 2

Restrictions

This MAU instruction takes two execution cycles to complete and may be pipelined with other two execution cycle MAU instructions. The target register is written via the MAU write port during the second execution cycle. If a single execution cycle MAU instruction immediately follows this two cycle MAU instruction, the single cycle MAU instruction has priority over the MAU write port. In this situation, the two cycle MAU instruction results are lost and the single cycle MAU instruction's target register is written.

MPYCX - Multiply Complex

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | MAUopcode | | | | | | Rt | | | | | Rx | | | | | Ry | | | | | 0 | CE2 | | | ME | |

Description
The complex product of the two source operands is rounded and loaded into the target register. The complex numbers are organized in the source registers such that H1 contains the real component and H0 contains the imaginary component.

Syntax/Operation

| Instruction | Operands | Operation | ACF |
|---|---|---|---|
| | | Dual Halfwords | |
| MPYCX.[SP]M.2SH | Rt, Rx, Ry | Rt.H1 ←round((Rx.H1 * Ry.H1 - Rx.H0 * Ry.H0)/$2^{15}$)<br>Rt.H0 ←round((Rx.H1 * Ry.H0 + Rx.H0 * Ry.H1)/$2^{15}$) | None |
| [TF].MPYCX.[SP]M.2SH | Rt, Rx, Ry | Do operation only if T/F condition is satisfied in F0 | None |

Arithmetic Scalar Flags Affected (on least significant operation (Rt.H0))
C = Not affected.
N = MSB of result
V = 1 if an integer overflow occurs on either operation prior to the divide, 0 otherwise
Z = 1 if a zero result is generated, 0 otherwise

Cycles: 2

Restrictions
This MAU instruction takes two execution cycles to complete and may be pipelined with other two execution cycle MAU instructions. The target register is written via the MAU write port during the second execution cycle. If a single execution cycle MAU instruction immediately follows this two cycle MAU instruction, the single cycle MAU instruction has priority over the MAU write port. In this situation, the two cycle MAU instruction results are lost and the single cycle MAU instruction's target register is written.

See the section on Complex Multiplication and Rounding.

MPYCXD2 - Multiply Complex Divide by 2

BOPS, Inc. Manta SYSSIM 2.31

Encoding

| 31 30 | 29 | 28 27 | 26 25 24 23 22 21 | 20 19 18 17 16 | 15 14 13 12 11 | 10 9 8 7 6 | 5 | 4 3 | 2 1 0 |
|---|---|---|---|---|---|---|---|---|---|
| Group | S/P | Unit | MAUopcode | Rt | Rx | Ry | 0 | CE2 | ME |

Description

The complex product of the two source operands is divided by two and loaded into the target register. The complex numbers are organized in the source registers such that H1 contains the real component and H0 contains the imaginary component.

Syntax/Operation

| Instruction | Operands | Operation | ACF |
|---|---|---|---|
| | | Dual Halfwords | |
| MPYCXD2.[SP]M.2SH | Rt, Rx, Ry | Do operation below but do not affect ACFs | None |
| MPYCXD2[NVZ].[SP]M.2SH | Rt, Rx, Ry | Rt.H1 ←round((Rx.H1 * Ry.H1 - Rx.H0 * Ry.H0) /$2^{16}$)<br>Rt.H0 ←round((Rx.H1 * Ry.H0 + Rx.H0 * Ry.H1) /$2^{16}$) | F1<br>F0 |
| [TF].MPYCXD2.[SP]M.2SH | Rt, Rx, Ry | Do operation only if T/F condition is satisfied in ACFs | None |

Arithmetic Scalar Flags Affected (on least significant operation (Rt.H0))

C = Not affected.
N = MSB of result
V = 1 if an integer overflow occurs on either operation prior to the divide, 0 otherwise
Z = 1 if a zero result is generated, 0 otherwise

Cycles: 2

Restrictions

This MAU instruction takes two execution cycles to complete and may be pipelined with other two execution cycle MAU instructions. The target register is written via the MAU write port during the second execution cycle. If a single execution cycle MAU instruction immediately follows this two cycle MAU instruction, the single cycle MAU instruction has priority over the MAU write port. In this situation, the two cycle MAU instruction results are lost and the single cycle MAU instruction's target register is written.

See the section on Complex Multiplication and Rounding.

MPYCXJ - Multiply Complex Conjugate

BOPS, Inc. Manta SYSSIM 2.31

Encoding

| 31 30 | 29 | 28 27 | 26 25 24 23 22 21 | 20 19 18 17 16 | 15 14 13 12 11 | 10 9 8 7 6 | 5 | 4 3 | 2 1 0 |
|---|---|---|---|---|---|---|---|---|---|
| Group | S/P | Unit | MAUopcode | Rt | Rx | Ry | 0 | CE2 | ME |

Description

The complex product of the first source operand times the conjugate of the second source operand, is loaded into the target register. The complex numbers are organized in the source registers such that H1 contains the real component and H0 contains the imaginary component.

Syntax/Operation

| Instruction | Operands | Operation | ACF |
|---|---|---|---|
| | | | Dual Halfwords |
| MPYCXJ.[SP]M.2SH | Rt, Rx, Ry | Do operation below but do not affect ACFs | None |
| MPYCXJ[NVZ].[SP]M.2SH | Rt, Rx, Ry | Rt.H1 ←round((Rx.H1 * Ry.H1 + Rx.H0 * Ry.H0)/$2^{15}$)<br>Rt.H0 ←round((Rx.H0 * Ry.H1 - Rx.H1 * Ry.H0)/$2^{15}$) | F1<br>F0 |
| [TF].MPYCXJ.[SP]M.2SH | Rt, Rx, Ry | Do operation only if T/F condition is satisfied in ACFs | None |

Arithmetic Scalar Flags Affected (on least significant operation (Rt.H0))

C = Not affected
N = MSB of result
V = 1 if an integer overflow occurs on either operation, 0 otherwise
Z = 1 if a zero result is generated, 0 otherwise

Cycles: 2

Restrictions

This MAU instruction takes two execution cycles to complete and may be pipelined with other two execution cycle MAU instructions. The target register is written via the MAU write port during the second execution cycle. If a single execution cycle MAU instruction immediately follows this two cycle MAU instruction, the single cycle MAU instruction has priority over the MAU write port. In this situation, the two cycle MAU instruction results are lost and the single cycle MAU instruction's target register is written.

See the section on Complex Multiplication and Rounding.

MPYCXJD2 - Multiply Complex Conjugate Divide by 2

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | MAUopcode | | | | | | Rt | | | | | Rx | | | | | Ry | | | | | 0 | CE2 | | | ME | |

Description

The complex product of the first source operand times the conjugate of the second source operand, is divided by two and loaded into the target register. The complex numbers are organized in the source registers such that H1 contains the real component and H0 contains the imaginary component.

Syntax/Operation

| Instruction | Operands | Operation | ACF |
|---|---|---|---|
| | | Dual Halfwords | |
| MPYCXJD2.[SP]M.2SH | Rt, Rx, Ry | Do operation below but do not affect ACFs | None |
| MPYCXJD2[NVZ].[SP]M.2SH | Rt, Rx, Ry | Rt.H1 ←round((Rx.H1 * Ry.H1 + Rx.H0 * Ry.H0) /$2^{16}$)<br>Rt.H0 ←round((Rx.H0 * Ry.H1 - Rx.H1 * Ry.H0) /$2^{16}$) | F1<br>F0 |
| [TF].MPYCXJD2.[SP]M.2SH | Rt, Rx, Ry | Do operation only if T/F condition is satisfied in ACFs | None |

Arithmetic Scalar Flags Affected (on least significant operation (Rt.H0))

C = Not affected.
N = MSB of result
V = 1 if an integer overflow occurs on either operation, 0 otherwise
Z = 1 if a zero result is generated, 0 otherwise

Cycles: 2

Restrictions

This MAU instruction takes two execution cycles to complete and may be pipelined with other two execution cycle MAU instructions. The target register is written via the MAU write port during the second execution cycle. If a single execution cycle MAU instruction immediately follows this two cycle MAU instruction, the single cycle MAU instruction has priority over the MAU write port. In this situation, the two cycle MAU instruction results are lost and the single cycle MAU instruction's target register is written.

See the section on Complex Multiplication and Rounding.

MPYD2 - Multiply Divide by 2

BOPS, Inc. Manta SYSSIM 2.31

Encoding

| 31 30 | 29 | 28 27 | 26 25 24 23 22 21 | 20 19 18 17 | 16 | 15 14 13 12 11 | 10 9 8 7 6 | 5 | 4 3 | 2 1 0 |
|---|---|---|---|---|---|---|---|---|---|---|
| Group | S/P | Unit | MAUopcode | Rte | 0 | Rx | Ry | 0 | CE2 | MPack |

Description

The product of source registers *Rx* and *Ry* is divided by two, rounded, and stored in target register *Rt*. The type of rounding used in this operation is ROUND, as specified in the Complex Multiplication and Rounding chapter.

Syntax/Operation

| Instruction | Operands | Operation | ACF |
|---|---|---|---|
| | | | Word |
| MPYD2.[SP]M.1[SU]W | Rte, Rx, Ry | Rto\|\|Rte ←(Rx * Ry) / 2 | None |
| [TF].MPYD2.[SP]M.1[SU]W | Rte, Rx, Ry | Do operation only if T/F condition is satisfied in F0 | None |
| | | | Dual Halfwords |
| MPYD2.[SP]M.2[SU]H | Rte, Rx, Ry | Rto ←(Rx.H1 * Ry.H1) / 2<br>Rte ←(Rx.H0 * Ry.H0) / 2 | None |
| [TF].MPYD2.[SP]M.2[SU]H | Rte, Rx, Ry | Do operation only if T/F condition is satisfied in F0 | None |

Arithmetic Scalar Flags Affected (on least significant operation)

C = value of last bit shifted out of source register

N = MSB of result

V = Not affected

Z = 1 if result is zero, 0 otherwise

Cycles: 2

Restrictions

This MAU instruction takes two execution cycles to complete and may be pipelined with other two execution cycle MAU instructions. The target register is written via the MAU write port during the second execution cycle. If a single execution cycle MAU instruction immediately follows this two cycle MAU instruction, the single cycle MAU instruction has priority over the MAU write port. In this situation, the two cycle MAU instruction results are lost and the single cycle MAU instruction's target register is written.

MPYH - Multiply High

BOPS, Inc. Manta SYSSIM 2.31

Encoding

| 31 30 | 29 | 28 27 | 26 25 24 23 22 21 | 20 19 18 17 | 16 | 15 14 13 12 | 11 | 10 9 8 7 | 6 | 5 | 4 3 | 2 1 0 |
|---|---|---|---|---|---|---|---|---|---|---|---|---|
| Group | S/P | Unit | MAUopcode | Rt | | Rx | | Ry | | 0 | CE2 | MPack |
| | | | | Rte | 0 | Rxe | 0 | Rye | 0 | | | |

Description

The upper half of the product of source registers *Rx* and *Ry* is stored in target register *Rt*.

Syntax/Operation

| Instruction | Operands | Operation | ACF |
|---|---|---|---|
| | | | Word |
| MPYH.[SP]M.1[SU]W | Rt, Rx, Ry | Rt ←(Rx * Ry)[63:32] | None |
| [TF].MPYH.[SP]M.1[SU]W | Rt, Rx, Ry | Do operation only if T/F condition is satisfied in F0 | None |
| | | | Dual Halfwords |
| MPYH.[SP]M.2[SU]H | Rt, Rx, Ry | Rt.H1 ←(Rx.H1 * Ry.H1)[31:16]<br>Rt.H0 ←(Rx.H0 * Ry.H0)[31:16] | None |
| [TF].MPYH.[SP]M.2[SU]H | Rt, Rx, Ry | Do operation only if T/F condition is satisfied in F0 | None |
| | | | Quad Halfwords |
| MPYH.[SP]M.4[SU]H | Rte, Rxe, Rye | Rto.H1 ←(Rxo.H1 * Ryo.H1)[31:16]<br>Rto.H0 ←(Rxo.H0 * Ryo.H0)[31:16]<br>Rte.H1 ←(Rxe.H1 * Rye.H1)[31:16]<br>Rte.H0 ←(Rxe.H0 * Rye.H0)[31:16] | None |
| [TF].MPYH.[SP]M.4[SU]H | Rte, Rxe, Rye | Do operation only if T/F condition is satisfied in F0 | None |

Arithmetic Scalar Flags Affected (on least significant operation)

C = Not Affected
N = MSB of result
V = Not Affected
Z = 1 if result is zero, 0 otherwise

Cycles: 2

Restrictions

This MAU instruction takes two execution cycles to complete and may be pipelined with other two execution cycle MAU instructions. The target register is written via the MAU write port during the second execution cycle. If a single execution cycle MAU instruction immediately follows this two cycle MAU instruction, the single cycle MAU instruction has priority over the MAU write port. In this situation, the two cycle MAU instruction results are lost and the single cycle MAU instruction's target register is written.

MPYL - Multiply Low

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | MAUopcode | | | | | | Rt | | | | | Rx | | | | | Ry | | | | | 0 | CE2 | | MPack | | |
| | | | | | | | | | | | Rte | | | | 0 | Rxe | | | | 0 | Rye | | | | 0 | | | | | | |

Description

The lower half of the product of source registers *Rx* and *Ry* is stored in target register *Rt*.

Syntax/Operation

| Instruction | Operands | Operation | ACF |
|---|---|---|---|
| | | | Word |
| MPYL.[SP]M.1[SU]W | Rt, Rx, Ry | Rt ←(Rx * Ry)[31:0] | None |
| [TF].MPYL.[SP]M.1[SU]W | Rt, Rx, Ry | Do operation only if T/F condition is satisfied in F0 | None |
| | | | Dual Halfwords |
| MPYL.[SP]M.2[SU]H | Rt, Rx, Ry | Do operation below but do not affect ACFs | None |
| [TF].MPYL.[SP]M.2[SU]H | Rt, Rx, Ry | Do operation only if T/F condition is satisfied in F0 | None |
| | | | Quad Halfwords |
| MPYL.[SP]M.4[SU]H | Rte, Rxe, Rye | Rto.H1 ←(Rxo.H1 * Ryo.H1)[15:0]<br>Rto.H0 ←(Rxo.H0 * Ryo.H0)[15:0]<br>Rte.H1 ←(Rxe.H1 * Rye.H1)[15:0]<br>Rte.H0 ←(Rxe.H0 * Rye.H0)[15:0] | None |
| [TF].MPYL.[SP]M.4[SU]H | Rte, Rxe, Rye | Do operation only if T/F condition is satisfied in F0 | None |

Arithmetic Flags Affected

C = Not Affected
N = MSB of result
V = Not Affected
Z = 1 if result is zero, 0 otherwise

Cycles: 2

Restrictions

This MAU instruction takes two execution cycles to complete and may be pipelined with other two execution cycle MAU instructions. The target register is written via the MAU write port during the second execution cycle. If a single execution cycle MAU instruction immediately follows this two cycle MAU instruction, the single cycle MAU instruction has priority over the MAU write port. In this situation, the two cycle MAU instruction results are lost and the single cycle MAU instruction's target register is written.

MPYXA - Multiply with Extended Accumulate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | MAUopcode | | | | | | Rte | | | | 0 | Rx | | | | | Ry | | | | | 0 | CE2 | | MPack | | |

Description

The product of source registers *Rx* and *Ry* is added to an extended precision target register *Rt*. The word multiply form of the instruction multiplies two 32-bit values producing a 64-bit result which is then added to the 80-bit extended precision target register. The dual halfword form of the instruction multplies two pairs of 16-bit values producing a 32-bit result which is then added to the 40-bit extended precision target register.

The extended precision bits for the 40-bit and 80-bit results are provided by the Extended Precision Register (XPR). The byte or halfword of the XPR that will be used is dependent on the source operand Rte, as described in Extended Precision Accumulation Operations.

Syntax/Operation

| Instruction | Operands | Operation | ACF |
|---|---|---|---|
| | | | Word |
| MPYXA.[SP]M.1[SU]W | Rte, Rx, Ry | XPR.Hx\|\|Rto\|\|Rte ←XPR.Hx\|\|Rto\|\|Rte + (Rx * Ry) | None |
| [TF].MPYXA.[SP]M.1[SU]W | Rte, Rx, Ry | Do operation only if T/F condition is satisfied in F0 | None |
| | | | Dual Halfwords |
| MPYXA.[SP]M.2[SU]H | Rte, Rx, Ry | XPR.Bo\|\|Rto ←XPR.Bo\|\|Rto + (Rx.H1 * Ry.H1)<br>XPR.Be\|\|Rte ←XPR.Be\|\|Rte + (Rx.H0 * Ry.H0) | None |
| [TF].MPYXA.[SP]M.2[SU]H | Rte, Rx, Ry | Do operation only if T/F condition is satisfied in F0 | None |

Arithmetic Scalar Flags Affected (on least significant operation)
C = 1 if a carry occurs on the addition, 0 otherwise
N = MSB of result
V = 1 if an overflow occurs on the addition, 0 otherwise
Z = 1 if result is zero, 0 otherwise See also ASF Definitions in chapter on Conditional Execution.

Cycles: 2

Restrictions

This MAU instruction takes two execution cycles to complete and may be pipelined with other two execution cycle MAU instructions. The target register is written via the MAU write port during the second execution cycle. If a single execution cycle MAU instruction immediately follows this two cycle MAU instruction, the single cycle MAU instruction has priority over the MAU write port. In this situation, the two cycle MAU instruction results are lost and the single cycle MAU instruction's target register is written.

SUM2P - Sum of 2 Products

BOPS, Inc. Manta SYSSIM 2.31

Encoding

| 31 30 | 29 | 28 27 | 26 25 24 23 22 21 | 20 19 18 17 | 16 | 15 14 13 12 | 11 | 10 9 8 7 | 6 | 5 | 4 3 | 2 1 0 |
|---|---|---|---|---|---|---|---|---|---|---|---|---|
| Group | S/P | Unit | MAUopcode | Rt | | Rx | | Ry | | 0 | CE2 | SumpExt |
| | | | | Rte | 0 | Rxe | 0 | Rye | 0 | | | |

Description

The product of the high halfwords (or bytes) of source registers *Rx* and *Ry* is added to the product of the low halfwords (or bytes) of *Rx* and *Ry* and the result is stored in target register *Rt*.

Syntax/Operation

| Instruction | Operands | Operation | ACF |
|---|---|---|---|
| | | Dual Halfwords | |
| SUM2P.[SP]M.2[SU]H | Rt, Rx, Ry | Rt ←(Rx.H1 * Ry.H1) + (Rx.H0 * Ry.H0) | None |
| [TF].SUM2P.[SP]M.2[SU]H | Rt, Rx, Ry | Do operation only if T/F condition is satisfied in F0 | None |
| | | Quad Halfwords | |
| SUM2P.[SP]M.4[SU]H | Rte, Rxe, Rye | Rto ←(Rxo.H1 * Ryo.H1) + (Rxo.H0 * Ryo.H0)<br>Rte ←(Rxe.H1 * Rye.H1) + (Rxe.H0 * Rye.H0) | None |
| [TF].SUM2P.[SP]M.4[SU]H | Rte, Rxe, Rye | Do operation only if T/F condition is satisfied in F0 | None |
| [TF].SUM2P.[SP]M.8[SU]B | Rte, Rxe, Rye | Do operation only if T/F condition is satisfied in F0 | None |

NOTE: The ASFs are set for both signed and unsigned operations.

Arithmetic Scalar Flags Affected (on least significant operation)
C = 1 if a carry occurs on the addition, 0 otherwise
N = MSB of result
V = 1 if on overflow occurs on the addition, 0 otherwise
Z = 1 if result is zero, 0 otherwise See also ASF Definitions in chapter on Conditional Execution.

Cycles: 2

Restrictions

This MAU instruction takes two execution cycles to complete and may be pipelined with other two execution cycle MAU instructions. The target register is written via the MAU write port during the second execution cycle. If a single execution cycle MAU instruction immediately follows this two cycle MAU instruction, the single cycle MAU instruction has priority over the MAU write port. In this situation, the two cycle MAU instruction results are lost and the single cycle MAU instruction's target register is written.

SUM2PA - Sum of 2 Products Accumulate

BOPS, Inc. Manta SYSSIM 2.31

Encoding

| 31 | 30 | 29 | 28 27 | 26 25 24 23 22 21 | 20 19 18 17 16 | | 15 14 13 12 11 | | 10 9 8 7 6 | | 5 | 4 3 | 2 1 0 |
|---|---|---|---|---|---|---|---|---|---|---|---|---|---|
| Group | | S/P | Unit | MAUopcode | Rt | | Rx | | Ry | | 0 | CE2 | SumpExt |
| | | | | | Rte | 0 | Rxe | 0 | Rye | 0 | | | |

Description
The product of the high halfwords of source registers *Rx* and *Ry* is added to the product of the low halfwords of *Rx* and *Ry* and the result is added to target register *Rt*.

Syntax/Operation

| Instruction | Operands | Operation | ACF |
|---|---|---|---|
| | | | Dual Halfwords |
| | | | |
| SUM2PA.[SP]M.2[SU]H | Rt, Rx, Ry | Rt ←Rt + (Rx.H1 * Ry.H1) + (Rx.H0 * Ry.H0) | None |
| [TF].SUM2PA.[SP]M.2[SU]H | Rt, Rx, Ry | Do operation only if T/F condition is satisfied in F0 | None |
| | | | |
| | | | Quad Halfwords |
| | | | |
| SUM2PA.[SP]M.4[SU]H | Rte, Rxe, Rye | Rto ←Rto + (Rxo.H1 * Ryo.H1) + (Rxo.H0 * Ryo.H0)<br>Rte ←Rte + (Rxe.H1 * Rye.H1) + (Rxe.H0 * Rye.H0) | None |
| [TF].SUM2PA.[SP]M.4[SU]H | Rte, Rxe, Rye | Do operation only if T/F condition is satisfied in F0 | None |
| | | | |

NOTE: The ASFs are set for both signed and unsigned operations.

Arithmetic Scalar Flags Affected (on least significant operation)
C = 1 if a carry occurs on the add with Rt, 0 otherwise
N = MSB of result
V = 1 if on overflow occurs on the add with Rt, 0 otherwise
Z = 1 if result is zero, 0 otherwise See also ASF Definitions in chapter on Conditional Execution.

Cycles: 2

Restrictions
This MAU instruction takes two execution cycles to complete and may be pipelined with other two execution cycle MAU instructions. The target register is written via the MAU write port during the second execution cycle. If a single execution cycle MAU instruction immediately follows this two cycle MAU instruction, the single cycle MAU instruction has priority over the MAU write port. In this situation, the two cycle MAU instruction results are lost and the single cycle MAU instruction's target register is written.

SUM4ADD - Four Input Summation with Add

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | MAUopcode | | | | | | Rt | | | | | Rx | | | | | Ry | | | | | 0 | CE2 | | Sum4Ext | | |
| | | | | | | | | | | | Rte | | | | 0 | Rxe | | | | 0 | Rye | | | | 0 | | | | | | |

Description
The sum of four unsigned bytes in source register *Rx* is added with the unsigned word in source register *Ry* and the result is stored in target register *Rt*.

Syntax/Operation

| Instruction | Operands | Operation | ACF |
|---|---|---|---|
| | | | 4 Halfwords |
| SUM4ADD.[SP]M.4[SU]H | Rt, Rxe, Ry | Rt ←(Rxo.H1 + Rxo.H0 + Rxe.H1 + Rxe.H0) + Ry | None |
| [TF].SUM4ADD.[SP]M.4[SU]H | Rt, Rxe, Ry | Do operation only if T/F condition is satisfied in ACFs | None |
| | | | 4 Bytes |
| SUM4ADD.[SP]M.4[SU]B | Rt, Rx, Ry | Rt ←(Rx.B3 + Rx.B2 + Rx.B1 + Rx.B0) + Ry | None |
| [TF].SUM4ADD.[SP]M.4[SU]B | Rt, Rx, Ry | Do operation only if T/F condition is satisfied in F0 | None |
| | | | Dual 4 Bytes |
| SUM4ADD.[SP]M.8[SU]B | Rte, Rxe, Rye | Rto ←(Rxo.B3 + Rxo.B2 + Rxo.B1 + Rxo.B0) + Ryo<br>Rte ←(Rxe.B3 + Rxe.B2 + Rxe.B1 + Rxe.B0) + Rye | None |
| [TF].SUM4ADD.[SP]M.8[SU]B | Rte, Rxe, Rye | Do operation only if T/F condition is satisfied in F0 | None |

Arithmetic Scalar Flags Affected
C = 1 if a carry occurs on the add with Ry, 0 otherwise
N = MSB of result
V = 1 if an overflow occurs on the add with Ry, 0 otherwise
Z = 1 if result is zero, 0 otherwise

Cycles: 1

SUMBADD - Eight Input Summation with Add

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | MAUopcode | | | | | | Rt | | | | | Rxe | | | | 0 | Ry | | | | | 0 | CE2 | | Sum8Ext | | |

Description

The sum of eight unsigned bytes in source register pair *Rxo*||*Rxe* is added with the unsigned word in source register *Ry* and the result is stored in target register *Rt*.

Syntax/Operation

| Instruction | Operands | Operation | ACF |
|---|---|---|---|
| | | | 8 Bytes |
| SUM8ADD.[SP]M.8[SU]B | Rt, Rxe, Ry | Rt ←(Rxo.B3 + Rxo.B2 + Rxo.B1 + Rxo.B0 + Rxe.B3 + Rxe.B2 + Rxe.B1 + Rxe.B0) + Ry | None |
| [TF].SUM8ADD.[SP]M.8[SU]B | Rt, Rxe, Ry | Do operation only if T/F condition is satisfied in F0 | None |

Arithmetic Scalar Flags Affected

C = 1 if a carry occurs on the add with Ry, 0 otherwise
N = MSB of result
V = 1 if an overflow occurs on the add with Ry, 0 otherwise
Z = 1 if result is zero, 0 otherwise

Cycles: 1

DSU - Data Select Unit Instructions

BOPS, Inc. Manta SYSSIM 2.31

| | | | |
|---|---|---|---|
| BAND | Bit Load with Logical AND | FDIV | Floating-Point Divide |
| BANDI | Bit Load with Logical AND Immediate | FRCP | Floating-Point Reciprocal |
| BANDN | Bit AND with NOT (Bit) | FRSQRT | Floating-Point Reciprocal Square Root |
| BANDNI | Bit AND with NOT (Bit) Immediate | FSQRT | Floating-Point Square Root |
| BCLR | Bit Clear | FTOI | Convert Floating-Point to Integer |
| BCLRI | Bit Clear Immediate | FTOIS | Convert Floating-Point to Integer Scaled |
| BL | Bit Load | ITOF | Convert Integer to Floating-Point |
| BLI | Bit Load Immediate | ITOFS | Convert Integer to Floating-Point Scaled |
| BLN | Bit Load with Logical NOT | MIX | Mix Packed Data |
| BLNI | Bit Load with Logical NOT Immediate | PACKB | Pack 4 Bytes into 1 Word |
| BNOT | Bit NOT | PACKH | Pack High Data into Smaller Format |
| BNOTI | Bit NOT Immediate | PACKL | Pack Low Data into Smaller Format |
| BOR | Bit Load with Logical OR | PERM | Permute |
| BORI | Bit Load with Logical OR Immediate | PEXCHG | PE to PE Exchange |
| BORN | Bit OR with NOT (Bit) | ROT | Rotate |
| BORNI | Bit OR with NOT (Bit) Immediate | ROTLI | Rotate Left Immediate |
| BS | Bit Store | ROTRI | Rotate Right Immediate |
| BSI | Bit Store Immediate | SCANL | Scan Left for First '1' Bit |
| BSET | Bit Set | SCANR | Scan Right for First '1' Bit |
| BSETI | Bit Set Immediate | SHL | Shift Left |
| BSWAP | Bit Swap | SHLI | Shift Left Immediate |
| BSWAPI | Bit Swap Immediate | SHR | Shift Right |
| BXOR | Bit Load with Logical XOR | SHRI | Shift Right Immediate |
| BXORI | Bit Load with Logical XOR Immediate | SPRECV | SP Receive from PE |
| BXORN | Bit XOR with NOT (Bit) | SPSEND | SP Send to PEs |
| BXORNI | Bit XOR with NOT (Bit) Immediate | UNPACK | Unpack Data Elements |
| CNTRS | Count Redundant Sign Bits | XSCAN | Find Significant Bits in Extension Register |
| COPY | Copy | XSHR | Extended Shift Right |
| COPYS | Copy Selective | | |

BAND - Bit Load with Logical AND

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rs4-0 | | | | | Rx | | | | | Rs5 | Ft | | | BitOpExt | | | | 0 | CE2 | |

Description

The result of a logical AND of a single bit from source register *Rs* with ACF *Ft* is stored in *Ft*. The source register bit is specified by bits 4-0 of register *Rx*.
See also ACF Definition.

Syntax/Operation

| Instruction | Operands | Operation | ACF |
|---|---|---|---|
| BAND.[SP]D | Ft, Rs, Rx | Ft ←Ft AND bit(Rx[4:0]) of Rs | Ft |
| [TF].BAND.[SP]D | Ft, Rs, Rx | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected
C = Not Affected
N = Not Affected
V = Not Affected
Z = Not Affected

Cycles: 1

Restrictions
The source register *Rs* may not be an address register (because address registers are not bit-addressable).

BANDI - Bit Load with Logical AND Immediate

Encoding

| 31 30 | 29 | 28 27 | 26 25 24 23 22 21 | 20 19 18 17 16 | 15 14 13 12 11 | 10 | 9 8 | 7 6 5 4 3 | 2 | 1 0 |
|---|---|---|---|---|---|---|---|---|---|---|
| Group | S/P | Unit | DSUopcode | $Rs_{4-0}$ | BitNum | $Rs_5$ | Ft | BitOpExt | 0 | CE2 |

Description
The result of a logical AND of a single bit from source register *Rs* with ACF *Ft* is stored in *Ft*. The source register bit is specified by a 5-bit immediate value *BitNum*.
See also ACF Definition.

Syntax/Operation

| Instruction | Operands | Operation | ACF |
|---|---|---|---|
| BANDI.[SP]D | Ft, Rs, BitNum | Ft ←Ft AND bit(BitNum) of Rs | Ft |
| [TF].BANDI.[SP]D | Ft, Rs, BitNum | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected
C = Not Affected
N = Not Affected
V = Not Affected
Z = Not Affected

Cycles: 1

Restrictions
The source register *Rs* may not be an address register (because address registers are not bit-addressable).

BANDN - Bit AND with NOT Bit

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rs_{4-0}$ | | | | | Rx | | | | | $Rs_5$ | Ft | | | BitOpExt | | | | 0 | CE2 | |

Description

The result of a logical AND of the complement (NOT) of a single bit from source register *Rs* with ACF *Ft* is stored in *Ft*. The source register bit is specified by bits 4-0 of register *Rx*.
See also ACF Definition.

Syntax/Operation

| Instruction | Operands | Operation | ACF |
|---|---|---|---|
| BANDN.[SP]D | Ft, Rs, Rx | Ft ←Ft AND NOT(bit(Rx[4:0]) of Rs) | Ft |
| [TF].BANDN.[SP]D | Ft, Rs, Rx | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected

C = Not Affected
N = Not Affected
V = Not Affected
Z = Not Affected

Cycles: 1

Restrictions

The source register *Rs* may not be an address register (because address registers are not bit-addressable).

BANDNI - Bit AND with NOT Bit Immediate BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rs_{4-0}$ | | | | | BitNum | | | | | $Rs_5$ | Ft | | | BitOpExt | | | | 0 | CE2 | |

Description

The result of a logical AND of the complement (NOT) of a single bit from source register *Rs* with ACF *Ft* is stored in *Ft*. The source register bit is specified by a 5-bit immediate value *BitNum*.
See also ACF Definition.

Syntax/Operation

| Instruction | Operands | Operation | ACF |
|---|---|---|---|
| BANDNI.[SP]D | Ft, Rs, BitNum | Ft ←Ft AND NOT(bit(BitNum) of Rs) | Ft |
| [TF].BANDNI.[SP]D | Ft, Rs, BitNum | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected
C = Not Affected
N = Not Affected
V = Not Affected
Z = Not Affected

Cycles: 1

Restrictions
The source register *Rs* may not be an address register (because address registers are not bit-addressable).

BCLR - Bit Clear

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rt_{4\text{-}0}$ | | | | | Rx | | | | | $Rt_5$ | 0 | 0 | 0 | BitOpExt | | | | 0 | CE2 | |

Description
A '0' is stored in a single bit of target register *Rt*. The target register bit is specified by bits 4-0 of register *Rx*.

Syntax/Operation

| Instruction | Operands | Operation | ACF |
|---|---|---|---|
| BCLR.[SP]D | Rt, Rx | Bit(Rx[4:0]) of Rt ←0 | None |
| [TF].BCLR.[SP]D | Rt, Rx | Do operation only if T/F condition is satisfied in F0 | None |

Arithmetic Scalar Flags Affected
C = Not Affected
N = Not Affected
V = Not Affected
Z = Not Affected

Cycles: 1

Restrictions
The target register *Rt* may not be an address register (because address registers are not bit-addressable).

BCLRI - Bit Clear Immediate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rt_{4\text{-}0}$ | | | | | BitNum | | | | | $Rt_5$ | 0 | 0 | 0 | BitOpExt | | | | 0 | CE2 | |

Description
A '0' is stored in a single bit of target register *Rt*. The target register bit is specified by a 5-bit immediate value *BitNum*.

Syntax/Operation

| Instruction | Operands | Operation | ACF |
|---|---|---|---|
| BCLRI.[SP]D | Rt, BitNum | Bit(BitNum) of Rt ←0 | None |
| [TF].BCLRI.[SP]D | Rt, BitNum | Do operation only if T/F condition is satisfied in F0 | None |

Arithmetic Scalar Flags Affected
C = Not Affected
N = Not Affected
V = Not Affected
Z = Not Affected

Cycles: 1

Restrictions
The target register *Rt* may not be an address register (because address registers are not bit-addressable).

BL - Bit Load

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rs4-0 | | | | | Rx | | | | | Rs5 | Ft | | | BitOpExt | | | | 0 | CE2 | |

Description
A single bit from source register *Rs* is stored in ACF *Ft*. The source register bit is specified by bits 4-0 of register *Rx*.

Syntax/Operation

| Instruction | Operands | Operation | ACF |
|---|---|---|---|
| BL.[SP]D | Ft, Rs, Rx | Ft ←bit(Rx[4:0]) of Rs | Ft |
| [TF].BL.[SP]D | Ft, Rs, Rx | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected
C = Not Affected
N = Not Affected
V = Not Affected
Z = Not Affected

Cycles: 1

Restrictions
The source register *Rs* may not be an address register (because address registers are not bit-addressable).

BLI - Bit Load Immediate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rs_{4-0}$ | | | | | BitNum | | | | | $Rs_5$ | Ft | | | BitOpExt | | | | 0 | CE2 | |

Description
A single bit from source register *Rs* is stored in ACF *Ft*. The source register bit is specified by the 5-bit immediate value *BitNum*.

Syntax/Operation

| Instruction | Operands | Operation | ACF |
|---|---|---|---|
| BLI.[SP]D | Ft, Rs, BitNum | Ft ←bit(BitNum) of Rs | Ft |
| [TF].BLI.[SP]D | Ft, Rs, BitNum | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected
C = Not Affected
N = Not Affected
V = Not Affected
Z = Not Affected

Cycles: 1

Restrictions
The source register *Rs* may not be an address register (because address registers are not bit-addressable).

BLN - Bit Load with Logical NOT

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rs$_{4-0}$ | | | | | Rx | | | | | Rs$_5$ | Ft | | | BitOpExt | | | | 0 | CE2 | |

Description
The complement (NOT) of a single bit from source register *Rs* is stored in ACF *Ft*. The source register bit is specified by bits 4-0 of register *Rx*.

Syntax/Operation

| Instruction | Operands | Operation | ACF |
|---|---|---|---|
| BLN.[SP]D | Ft, Rs, Rx | Ft ←NOT(bit(Rx[4:0]) of Rs) | Ft |
| [TF].BLN.[SP]D | Ft, Rs, Rx | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected
C = Not Affected
N = Not Affected
V = Not Affected
Z = Not Affected

Cycles: 1

Restrictions
The source register *Rs* may not be an address register (because address registers are not bit-addressable).

BLNI - Bit Load with Logical NOT Immediate

BOPS, Inc. Manta SYSSIM 2.31

Encoding

| 31 30 | 29 | 28 27 | 26 25 24 23 22 21 | 20 19 18 17 16 | 15 14 13 12 11 | 10 | 9 8 7 | 6 5 4 3 | 2 | 1 0 |
|---|---|---|---|---|---|---|---|---|---|---|
| Group | S/P | Unit | DSUopcode | $Rs_{4-0}$ | BitNum | $Rs_5$ | Ft | BitOpExt | 0 | CE2 |

Description
The complement (NOT) of a single bit from source register *Rs* is stored in ACF *Ft*. The source register bit is specified by a 5-bit immediate value *BitNum*.

Syntax/Operation

| Instruction | Operands | Operation | ACF |
|---|---|---|---|
| BLNI.[SP]D | Ft, Rs, BitNum | Ft ←NOT(bit(BitNum) of Rs) | Ft |
| [TF].BLNI.[SP]D | Ft, Rs, BitNum | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected
C = Not Affected
N = Not Affected
V = Not Affected
Z = Not Affected

Cycles: 1

Restrictions
The source register *Rs* may not be an address register (because address registers are not bit-addressable).

BNOT - Bit NOT

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rt_{4\text{-}0}$ | | | | | Rx | | | | | $Rt_5$ | 0 | 0 | BitOpExt | | | | | 0 | CE2 | |

Description

This instruction complements (NOT) a single bit of target register *Rt*. The target register bit is specified by bits 4-0 of register *Rx*.

Syntax/Operation

| Instruction | Operands | Operation | ACF |
|---|---|---|---|
| BNOT.[SP]D | Rt, Rx | bit(Rx[4:0]) of Rt ←NOT(bit(Rx[4:0]) of Rt) | None |
| [TF].BNOT.[SP]D | Rt, Rx | Do operation only if T/F condition is satisfied in F0 | None |

Arithmetic Scalar Flags Affected

C = Not Affected
N = Not Affected
V = Not Affected
Z = Not Affected

Cycles: 1

Restrictions

The source register *Rs* may not be an address register (because address registers are not bit-addressable).

BNOTI - Bit NOT Immediate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rt_{4-0}$ | | | | | BitNum | | | | | $Rt_5$ | 0 | 0 | 0 | BitOpExt | | | | 0 | CE2 | |

Description
This instruction complements (NOT) a single bit of target register *Rt*. The target register bit is specified by a 5-bit immediate value *BitNum*.

Syntax/Operation

| Instruction | Operands | Operation | ACF |
|---|---|---|---|
| BNOTI.[SP]D | Rt, BitNum | bit(BitNum) of Rt ←NOT(bit(BitNum) of Rt) | None |
| [TF].BNOTI.[SP]D | Rt, BitNum | Do operation only if T/F condition is satisfied in F0 | None |

Arithmetic Scalar Flags Affected
C = Not Affected
N = Not Affected
V = Not Affected
Z = Not Affected

Cycles: 1

Restrictions
The source register *Rs* may not be an address register (because address registers are not bit-addressable).

BOR - Bit Load with Logical OR

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rs_{4-0}$ | | | | | Rx | | | | | $Rs_5$ | Ft | | | BitOpExt | | | | 0 | CE2 | |

Description

The result of a logical OR of a single bit from source register *Rs* with ACF *Ft* is stored in *Ft*. The source register bit is specified by bits 4-0 of register *Rx*.
See also ACF Definition.

Syntax/Operation

| Instruction | Operands | Operation | ACF |
|---|---|---|---|
| BOR.[SP]D | Ft, Rs, Rx | Ft ←Ft OR bit(Rx[4:0]) of Rs | Ft |
| [TF].BOR.[SP]D | Ft, Rs, Rx | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected

C = Not Affected
N = Not Affected
V = Not Affected
Z = Not Affected

Cycles: 1

Restrictions

The source register *Rs* may not be an address register (because address registers are not bit-addressable).

BORI - Bit Load with Logical OR Immediate BOPS, Inc. Manta SYSSIM 2.31

Encoding

| 31 30 | 29 | 28 27 | 26 25 24 23 22 21 | 20 19 18 17 16 | 15 14 13 12 11 | 10 | 9 8 7 | 6 5 4 3 | 2 | 1 0 |
|---|---|---|---|---|---|---|---|---|---|---|
| Group | S/P | Unit | DSUopcode | $Rs_{4-0}$ | BitNum | $Rs_5$ | Ft | BitOpExt | 0 | CE2 |

Description

The result of a logical OR of a single bit from source register *Rs* with ACF *Ft* is stored in *Ft*. The source register bit is specified by a 5-bit immediate value *BitNum*.
See also ACF Definition.

Syntax/Operation

| Instruction | Operands | Operation | ACF |
|---|---|---|---|
| BORI.[SP]D | Ft, Rs, BitNum | Ft ←Ft OR bit(BitNum) of Rs | Ft |
| [TF].BORI.[SP]D | Ft, Rs, BitNum | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected
C = Not Affected
N = Not Affected
V = Not Affected
Z = Not Affected

Cycles: 1

Restrictions

The source register *Rs* may not be an address register (because address registers are not bit-addressable).

BORN - Bit OR with NOT Bit

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rs4-0 | | | | | Rx | | | | | Rs5 | Ft | | | BitOpExt | | | | 0 | CE2 | |

Description

The result of a logical OR of the complement (NOT) of a single bit from source register *Rs* with ACF *Ft* is stored in *Ft*. The source register bit is specified by bits 4-0 of register *Rx*.
See also ACF Definition.

Syntax/Operation

| Instruction | Operands | Operation | ACF |
|---|---|---|---|
| BORN.[SP]D | Ft, Rs, Rx | Ft ←Ft OR NOT(bit(Rx[4:0]) of Rs) | Ft |
| [TF].BORN.[SP]D | Ft, Rs, Rx | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected

C = Not Affected
N = Not Affected
V = Not Affected
Z = Not Affected

Cycles: 1

Restrictions

The source register *Rs* may not be an address register (because address registers are not bit-addressable).

BORNI - Bit OR with NOT Bit Immediate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rs_{4-0}$ | | | | | BitNum | | | | | $Rs_5$ | Ft | | | BitOpExt | | | | 0 | CE2 | |

Description

The result of a logical OR of the complement (NOT) of a single bit from source register *Rs* with ACF *Ft* is stored in *Ft*. The source register bit is specified by a 5-bit immediate value *BitNum*.
See also ACF Definition.

Syntax/Operation

| Instruction | Operands | Operation | ACF |
|---|---|---|---|
| BORNI.[SP]D | Ft, Rs, BitNum | Ft ←Ft OR NOT(bit(BitNum) of Rs) | Ft |
| [TF].BORNI.[SP]D | Ft, Rs, BitNum | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected

C = Not Affected
N = Not Affected
V = Not Affected
Z = Not Affected

Cycles: 1

Restrictions

The source register *Rs* may not be an address register (because address registers are not bit-addressable).

BS - Bit Store

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rt_{4-0}$ | | | | | Rx | | | | | $Rt_5$ | Ft | | | BitOpExt | | | | 0 | CE2 | |

Description

An ACF bit *Ft* is stored to a single bit of target register *Rt*. The target register bit is specified by bits 4-0 of register *Rx*.

Syntax/Operation

| Instruction | Operands | Operation | ACF |
|---|---|---|---|
| BS.[SP]D | Rt, Ft, Rx | bit(Rx[4:0]) of Rt ←Ft | None |
| [TF].BS.[SP]D | Rt, Ft, Rx | Do operation only if T/F condition is satisfied in F0 | None |

NOTE: For source and result, Ft refers to the Arithmetic Condition Flags (ACFs) in SCR0, not the hot ACF information.

Arithmetic Scalar Flags Affected

C = Not Affected
N = Not Affected
V = Not Affected
Z = Not Affected

Cycles: 1

Restrictions

The target register *Rt* may not be an address register (because address registers are not bit-addressable).

BSI - Bit Store Immediate

BOPS, Inc. Manta SYSSIM 2.31

Encoding

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="2">Group</td><td>S/P</td><td colspan="2">Unit</td><td colspan="6">DSUopcode</td><td colspan="5">$Rt_{4-0}$</td><td colspan="5">BitNum</td><td>$Rt_5$</td><td colspan="3">Ft</td><td colspan="4">BitOpExt</td><td>0</td><td colspan="2">CE2</td></tr>
</table>

Description

An ACF bit *Ft* is stored to a single bit of target register *Rt*. The target register bit is specified by a 5-bit immediate value *BitNum*.

Syntax/Operation

| Instruction | Operands | Operation | ACF |
|---|---|---|---|
| BSI.[SP]D | Rt, Ft, BitNum | Bit (BitNum) of Rt ←Ft | None |
| [TF].BSI.[SP]D | Rt, Ft, BitNum | Do operation only if T/F condition is satisfied in F0 | None |

NOTE: For source and result, Ft refers to the Arithmetic Condition Flags (ACFs) in SCR0, not the hot ACF information.

Arithmetic Scalar Flags Affected

C = Not Affected
N = Not Affected
V = Not Affected
Z = Not Affected

Cycles: 1

Restrictions

The target register *Rt* may not be an address register (because address registers are not bit-addressable).

BSET - Bit Set

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | $Rt_{4\text{-}0}$ | | | | | Rx | | | | | | $Rt_5$ | 0 | 0 | 0 | BitOpExt | | | | 0 | CE2 | |

Description
A '1' is stored in a single bit of target register *Rt*. The target register bit is specified by bits 4-0 of register *Rx*.

Syntax/Operation

| Instruction | Operands | Operation | ACF |
|---|---|---|---|
| BSET.[SP]D | Rt, Rx | Bit(Rx[4:0]) of Rt ←1 | None |
| [TF].BSET.[SP]D | Rt, Rx | Do operation only if T/F condition is satisfied in F0 | None |

Arithmetic Scalar Flags Affected
C = Not Affected
N = Not Affected
V = Not Affected
Z = Not Affected

Cycles: 1

Restrictions
The target register *Rt* may not be an address register (because address registers are not bit-addressable).

BSETI - Bit Set Immediate

BOPS, Inc. Manta SYSSIM 2.31

Encoding

| 31 30 | 29 | 28 27 | 26 25 24 23 22 21 | 20 19 18 17 16 | 15 14 13 12 11 | 10 | 9 | 8 | 7 6 5 4 3 | 2 | 1 0 |
|---|---|---|---|---|---|---|---|---|---|---|---|
| Group | S/P | Unit | DSUopcode | $Rt_{4\text{-}0}$ | BitNum | $Rt_5$ | 0 | 0 | BitOpExt | 0 | CE2 |

Description

A '1' is stored in a single bit of target register *Rt*. The target register bit is specified by a 5-bit immediate value *BitNum*.

Syntax/Operation

| Instruction | Operands | Operation | ACF |
|---|---|---|---|
| BSETI.[SP]D | Rt, BitNum | Bit(BitNum) of Rt ←1 | None |
| [TF].BSETI.[SP]D | Rt, BitNum | Do operation only if T/F condition is satisfied in F0 | None |

Arithmetic Scalar Flags Affected

C = Not Affected
N = Not Affected
V = Not Affected
Z = Not Affected

Cycles: 1

Restrictions

The target register *Rt* may not be an address register (because address registers are not bit-addressable).

BSWAP - Bit Swap

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rs_{4-0}$ | | | | | Rx | | | | | $Rs_5$ | Ft | | | BitOpExt | | | | 0 | CE2 | |

Description
Swap an ACF bit *Ft* with a single bit of target register *Rt*. The target register bit is specified by bits 4-0 of register *Rx*.

Syntax/Operation

| Instruction | Operands | Operation | ACF |
|---|---|---|---|
| BSWAP.[SP]D | Rt, Ft, Rx | saveBit ←bit(Rx[4:0]) of Rt<br>bit(Rx[4:0]) of Rt ←Ft<br>Ft ←saveBit | Ft |
| [TF].BSWAP.[SP]D | Rt, Ft, Rx | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected
C = Not Affected
N = Not Affected
V = Not Affected
Z = Not Affected

Cycles: 1

Restrictions
The target register *Rt* may not be an address register (because address registers are not bit-addressable).

BSWAPI - Bit Swap Immediate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rs_{4-0}$ | | | | | BitNum | | | | | $Rs_5$ | Ft | | | BitOpExt | | | | 0 | CE2 | |

Description
Swap an ACF bit *Ft* with a single bit of target register *Rt*. The target register bit is specified by bits 4-0 of register *Rx*.

Syntax/Operation

| Instruction | Operands | Operation | ACF |
|---|---|---|---|
| BSWAPI.[SP]D | Rt, Ft, BitNum | saveBit ←bit(BitNum) of Rt<br>bit(BitNum) of Rt ←Ft<br>Ft ←saveBit | Ft |
| [TF].BSWAPI.[SP]D | Rt, Ft, BitNum | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected
C = Not Affected
N = Not Affected
V = Not Affected
Z = Not Affected

Cycles: 1

Restrictions
The target register *Rt* may not be an address register (because address registers are not bit-addressable).

BXOR - Bit Load with Logical XOR

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rs_{4-0}$ | | | | | Rx | | | | | $Rs_5$ | Ft | | | BitOpExt | | | | 0 | CE2 | |

Description

The result of a logical XOR of a single bit from source register *Rs* with ACF *Ft* is stored in *Ft*. The source register bit is specified by bits 4-0 of register *Rx*.
See also ACF Definition.

Syntax/Operation

| Instruction | Operands | Operation | ACF |
|---|---|---|---|
| BXOR.[SP]D | Ft, Rs, Rx | Ft ←Ft XOR bit(Rx[4:0]) of Rs | Ft |
| [TF].BXOR.[SP]D | Ft, Rs, Rx | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected

C = Not Affected
N = Not Affected
V = Not Affected
Z = Not Affected

Cycles: 1

Restrictions

The source register *Rs* may not be an address register (because address registers are not bit-addressable).

BXORI - Bit Load with Logical XOR Immediate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rs_{4-0}$ | | | | | BitNum | | | | | $Rs_5$ | Ft | | | BitOpExt | | | | 0 | CE2 | |

Description

The result of a logical XOR of a single bit from source register *Rs* with ACF *Ft* is stored in *Ft*. The source register bit is specified by a 5-bit immediate value *BitNum*.
See also ACF Definition.

Syntax/Operation

| Instruction | Operands | Operation | ACF |
|---|---|---|---|
| BXORI.[SP]D | Ft, Rs, BitNum | Ft ←Ft XOR bit(BitNum) of Rs | Ft |
| [TF].BXORI.[SP]D | Ft, Rs, BitNum | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected

C = Not Affected
N = Not Affected
V = Not Affected
Z = Not Affected

Cycles: 1

Restrictions

The source register *Rs* may not be an address register (because address registers are not bit-addressable).

BXORN - Bit XOR with NOT Bit

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rs_{4-0}$ | | | | | Rx | | | | | $Rs_5$ | Ft | | | BitOpExt | | | | 0 | CE2 | |

Description

The result of a logical XOR of the complement (NOT) of a single bit from source register *Rs* with ACF *Ft* is stored in *Ft*. The source register bit is specified by bits 4-0 of register *Rx*.
See also ACF Definition.

Syntax/Operation

| Instruction | Operands | Operation | ACF |
|---|---|---|---|
| BXORN.[SP]D | Ft, Rs, Rx | Ft ←Ft XOR NOT(bit(Rx[4:0]) of Rs) | Ft |
| [TF].BXORN.[SP]D | Ft, Rs, Rx | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected

C = Not Affected
N = Not Affected
V = Not Affected
Z = Not Affected

Cycles: 1

Restrictions

The source register *Rs* may not be an address register (because address registers are not bit-addressable).

BXORNI - Bit XOR with NOT Bit Immediate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | $Rs_{4-0}$ | | | | | BitNum | | | | | $Rs_5$ | Ft | | | BitOpExt | | | | 0 | CE2 | |

Description

The result of a logical XOR of the complement (NOT) of a single bit from source register *Rs* with ACF *Ft* is stored in *Ft*. The source register bit is specified by a 5-bit immediate value *BitNum*.
See also ACF Definition.

Syntax/Operation

| Instruction | Operands | Operation | ACF |
|---|---|---|---|
| BXORNI.[SP]D | Ft, Rs, BitNum | Ft ←Ft XOR NOT(bit(BitNum) of Rs) | Ft |
| [TF].BXORNI.[SP]D | Ft, Rs, BitNum | Do operation only if T/F condition is satisfied in F0 | Ft |

NOTE: For source and result, Ft refers to the Arithmetic Condition Flags (ACFs) in SCR0, not the hot ACF information.

Arithmetic Scalar Flags Affected
C = Not Affected
N = Not Affected
V = Not Affected
Z = Not Affected

Cycles: 1

Restrictions
The source register *Rs* may not be an address register (because address registers are not bit-addressable).

CNTRS - Count Redundant Sign Bits

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt | | | | | Rx | | | | | 0 | 0 | 0 | 0 | 0 | CntrsExt | | | 0 | CE2 | |

Description

The signed form of CNTRS counts the redundant sign bits of the value in source register *Rx*. This number is one less than the number of leading sign bits. The unsigned form of CNTRS counts the number of leading zeroes of the source register value. For either form, the result is stored in byte-0 of target register *Rt*.

Syntax/Operation

| Syntax | Operands | Operation | ACF |
|---|---|---|---|
| CNTRS.[SP]D.1SW | Rt, Rx | Rt.B0 ←number of redundant sign bits | None |
| CNTRS.[SP]D.1UW | Rt, Rx | Rt.B0 ←number of leading zero bits | None |
| [TF].CNTRS.[SP]D.1[SU]W | Rt, Rx | Do operation only if T/F condition is satisfied in F0 | None |

Arithmetic Scalar Flags Affected

C = Not Affected
N = 1 if MSB of source is 1, 0 otherwise
V = Not Affected
Z = 1 if source operand is 0, 0 otherwise

Cycles: 1

Examples
(Key)

```
CNTRS.[SP]D.1SW Rt, Rx      ! Rx = 0x00000000 Rt.B0 = 31
CNTRS.[SP]D.1UW Rt, Rx      ! Rx = 0x00000000 Rt.B0 = 32

CNTRS.[SP]D.1SW Rt, Rx      ! Rx = 0xF0000000 Rt.B0 = 3
CNTRS.[SP]D.1UW Rt, Rx      ! Rx = 0xF0000000 Rt.B0 = 0

CNTRS.[SP]D.1SW Rt, Rx      ! Rx = 0x30000000 Rt.B0 = 1
CNTRS.[SP]D.1UW Rt, Rx      ! Rx = 0x30000000 Rt.B0 = 2

CNTRS.[SP]D.1SW Rt, Rx      ! Rx = 0x7FFFFFFF Rt.B0 = 0
CNTRS.[SP]D.1UW Rt, Rx      ! Rx = 0x7FFFFFFF Rt.B0 = 1

CNTRS.[SP]D.1SW Rt, Rx      ! Rx = 0x80000000 Rt.B0 = 0
CNTRS.[SP]D.1UW Rt, Rx      ! Rx = 0x80000000 Rt.B0 = 0

CNTRS.[SP]D.1SW Rt, Rx      ! Rx = 0xC0000000 Rt.B0 = 1
CNTRS.[SP]D.1UW Rt, Rx      ! Rx = 0xC0000000 Rt.B0 = 0
```

COPY - Copy

BOPS, Inc. Manta SYSSIM 2.31

Encoding

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="2" rowspan="2">Group</td><td rowspan="2">S/P</td><td colspan="2" rowspan="2">Unit</td><td colspan="6" rowspan="2">DSUopcode</td><td colspan="5">Rt4-0</td><td colspan="5">Rx4-0</td><td>Rt5</td><td>Rx5</td><td rowspan="2">0</td><td rowspan="2">0</td><td colspan="5" rowspan="2">CopyExt</td><td colspan="2" rowspan="2">CE2</td></tr>
<tr><td colspan="4">Rte</td><td>0</td><td colspan="4">Rxe</td><td>0</td><td>0</td><td>0</td></tr>
</table>

Description

COPY performs a transfer of a byte, halfword, word or doubleword from source register *Rx* to a specified byte, halfword, word or doubleword target register *Rt*. For byte, halfword and word operations, the source and target register may be any register in the Register File. For doubleword operations, only compute registers (CRF) are allowed to be source/target registers.

Syntax/Operation

| Instruction | Operands | Operation | ACF |
|---|---|---|---|
| | | | Doubleword |
| COPY.[SP]D.D | Rte, Rxe | Rto\|\|Rte ←Rxo\|\|Rxe | None |
| [TF].COPY.[SP]D.D | Rte, Rxe | Do operation only if T/F condition is satisfied in F0 | |
| | | | Word |
| COPY.[SP]D.W | RFt, RFx | RFt ←RFx, RFt and RFx are 32-bit registers | None |
| [TF].COPY.[SP]D.W | RFt, RFx | Do operation only if T/F condition is satisfied in F0 | None |
| | | | Halfword |
| COPY.[SP]D.H | RFtHt, RFxHx | RFt.Ht ←RFx.Hx<br>*(Ht and Hx refer to register halfwords H0 or H1)* | None |
| [TF].COPY.[SP]D.H | RFtHt, RFxHx | Do operation only if T/F condition is satisfied in F0 | None |
| | | | Byte |
| COPY.[SP]D.B | RFtBt, RFxBx | RFt.Bt ←RFx.Bx<br>*(Bt and Bx refer to register bytes B0, B1, B2 or B3)* | None |
| [TF].COPY.[SP]D.B | RFtBt, RFxBx | Do operation only if T/F condition is satisfied in F0 | None |

*RFt and RFx refer to any register in the Register File*

Arithmetic Scalar Flags Affected

C = Not Affected
N = Not Affected
V = Not Affected
Z = Not Affected

Cycles: 1

Restrictions:

It is not possible to simultaneously load and copy values to the Miscellaneous Register File (MRF)
See also Load/Store Pipeline Restrictions.

COPYS - Copy Selective

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt | | | | | Rx | | | | | Ry | | | | | DPack | | | 0 | 0 | 0 |
| | | | | | | | | | | | Rte | | | | 0 | Rxe | | | | 0 | Rye | | | | 0 | | | | | | |

Description

COPYS selects data elements from either *Rx/Rxe* or *Ry/Rye* and copies them to the corresponding elements of *Rt/Rte*. Selection is based on the ACFs. If the ACF associated with a particular data element position is a 1, then the element from *Rx/Rxe* is copied to *Rt/Rte*, otherwise the element from *Ry/Rye* is copied to *Rt/Rte*.

Note: This instruction is implicitly conditionally executed (across all data elements involved) and therefore does not have special forms for conditional execution.

Syntax/Operation

| Instruction | Operands | Operation | ACF |
|---|---|---|---|
| | | | Doubleword |
| COPYS.[SP]D.1D | Rte, Rxe, Rye | if (F0 = 1) Rto\|\|Rte ←Rxo\|\|Rxe else Rto\|\|Rte ←Ryo\|\|Rye | None |
| | | | Word |
| COPYS.[SP]D.1W | Rt, Rx, Ry | if (F0 = 1) Rt ←Rx else Rt ←Ry | None |
| | | | Dual Words |
| COPYS.[SP]D.2W | Rte, Rxe, Rye | if (F1 = 1) Rto ←Rxo else Rto ←Ryo<br>if (F0 = 1) Rte ←Rxe else Rte ←Rye | None |
| | | | Dual Halfwords |
| COPYS.[SP]D.2H | Rt, Rx, Ry | if (F1 = 1) Rt.H1 ←Rx.H1 else Rt.H1 ←Ry.H1<br>if (F0 = 1) Rt.H0 ←Rx.H0 else Rt.H0 ←Ry.H0 | None |
| | | | Quad Halfwords |
| COPYS.[SP]D.4H | Rte, Rxe, Rye | if (F3 = 1) Rto.H1 ←Rxo.H1 else Rto.H1 ←Ryo.H1<br>if (F2 = 1) Rto.H0 ←Rxo.H0 else Rto.H0 ←Ryo.H0<br>if (F1 = 1) Rte.H1 ←Rxe.H1 else Rte.H1 ←Rye.H1<br>if (F0 = 1) Rte.H0 ←Rxe.H0 else Rte.H0 ←Rye.H0 | None |
| | | | Quad Bytes |
| COPYS.[SP]D.4B | Rt, Rx, Ry | if (F3 = 1) Rt.B3 ←Rx.B3 else Rt.B3 ←Ry.B3<br>if (F2 = 1) Rt.B2 ←Rx.B2 else Rt.B2 ←Ry.B2<br>if (F1 = 1) Rt.B1 ←Rx.B1 else Rt.B1 ←Ry.B1<br>if (F0 = 1) Rt.B0 ←Rx.B0 else Rt.B0 ←Ry.B0 | None |
| | | | Octal Bytes |
| COPYS.[SP]D.8B | Rte, Rxe, Rye | if (F7 = 1) Rto.B3 ←Rxo.B3 else Rto.B3 ←Ryo.B3<br>if (F6 = 1) Rto.B2 ←Rxo.B2 else Rto.B2 ←Ryo.B2<br>if (F5 = 1) Rto.B1 ←Rxo.B1 else Rto.B1 ←Ryo.B1<br>if (F4 = 1) Rto.B0 ←Rxo.B0 else Rto.B0 ←Ryo.B0<br>if (F3 = 1) Rte.B3 ←Rxe.B3 else Rte.B3 ←Rye.B3<br>if (F2 = 1) Rte.B2 ←Rxe.B2 else Rte.B2 ←Rye.B2<br>if (F1 = 1) Rte.B1 ←Rxe.B1 else Rte.B1 ←Rye.B1<br>if (F0 = 1) Rte.B0 ←Rxe.B0 else Rte.B0 ←Rye.B0 | None |

Arithmetic Scalar Flags Affected

C = Not Affected
N = MSB of result
V = Not Affected
Z = Not Affected

Cycles: 1

Restrictions:

It is not possible to simultaneously load and copy values to the Miscellaneous Register File (MRF)
See also Load/Store Pipeline Restrictions.

FDIV - Floating-Point Divide

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt | | | | | Rx | | | | | Ry | | | | | FdivExt | | | 0 | CE2 | |

Description

The result of the previously executed Divide/Square Root Unit instruction is copied from the DSQR into the target register and the saved flags are copied from the DC, DN, DV, and DZ fields in the SCR1 to the CNVZ arithmetic flags. The source operands are issued to the divide/square root unit to produce a floating point division quotient after a multi-cycle iteration. When the result is complete it is placed in DSQR, and the Arithmetic Flags generated are saved in the DC, DN, DV, and DZ fields of the SCR1. The results and arithmetic flags can be obtained by issuing another Divide/Square Root instruction in the same PE or SP (see DSQR Instruction Examples), or the results alone can be obtained by copying the DSQR to a compute register via a COPY instruction. Both source registers are assumed to be in IEEE 754 compatible floating point format. This instruction produces FP results compatible with IEEE 754 standard. For additional discussion of ManArray floating point operations, see Floating Point Operations, Saturation, and Overflow. This instruction executes in the DSU Functional Unit.

Floating-point division operations with zero, NAN and Infinity values.

| Floating-Point Operand | | 2nd Floating-Point Operand | | ManArray Floating-Point Result | Arithmetic Flags |
|---|---|---|---|---|---|
| Sign | Value | Sign | Value | | |
| 0 | NAN or INF | 0 | non-zero | +1.9999..x $2^{127}$ | V=1, N=0, Z=0 |
| 0 | NAN or INF | 1 | non-zero | - 1.9999..x$2^{127}$ | V=1, N=1, Z=0 |
| 0 | NAN or INF | 0/1 | zero | +1.9999..x $2^{127}$ | V=1, N=0, Z=0 |
| 0 | NAN or INF | 0 | NAN or INF | 1 | V=1, Z=0, N=0 |
| 0 | NAN or INF | 1 | NAN or INF | -1 | V=1, Z=0, N=1 |
| 1 | NAN or INF | 0 | non-zero | -1.9999..x $2^{127}$ | V=1, N=1, Z=0 |
| 1 | NAN or INF | 1 | non-zero | +1.9999..x$2^{127}$ | V=1, N=0, Z=0 |
| 1 | NAN or INF | 0/1 | zero | -1.9999..x $2^{127}$ | V=1, N=1, Z=0 |
| 1 | NAN or INF | 0 | NAN or INF | -1 | V=1, Z=0, N=1 |
| 1 | NAN or INF | 1 | NAN or INF | 1 | V=1, Z=0, N=0 |
| 0 | non-zero | 0 | NAN or INF | +0 | V=1, N=0, Z=1 |
| 0 | non-zero | 1 | NAN or INF | +0 | V=1, N=0, Z=1 |
| 0 | non-zero | 0/1 | zero | +1.9999..x $2^{127}$ | V=1, N=0, Z=0 |
| 1 | non-zero | 0 | NAN or INF | +0 | V=1, N=0, Z=1 |
| 1 | non-zero | 1 | NAN or INF | +0 | V=1, N=0, Z=1 |
| 1 | non-zero | 0/1 | zero | -1.9999..x $2^{127}$ | V=1, N=1, Z=0 |
| 0/1 | zero | 0 | NAN or INF | +0 | V=1, N=0, Z=1 |
| 0/1 | zero | 1 | NAN or INF | +0 | V=1, N=0, Z=1 |
| 0/1 | zero | 0/1 | zero | +0 | V=1, N=0, Z=1 |
| A non-normalized result of an operation is flushed to zero. | | | | | |

Syntax/Operation

| Instruction | Operands | Operation | ACF |
|---|---|---|---|
| FDIV.[SP]D.1FW | Rt, Rx, Ry | In the first execution cycle:(1)<br>Rt ←current value of DSQR<br>C flag ←DC0 from the SCR1<br>N flag ←DN0 from the SCR1<br>V flag ←DV0 from the SCR1<br>Z flag ←DZ0 from the SCR1<br>At the end of the last cycle of the multi-cycle operation:<br>DSQR ←Rx/Ry<br>DD0, DN0, DV0, and DZ0 fields in the SCR1 ←flags generated | None |
| [TF].FDIV.[SP]D.1FW | Rt, Rx, Ry | Do operation only if T/F condition is satisfied in F0 | None |

Notes:

1) For conditional execution, this instruction, and all other Divide/Square-Root instructions, never use hot condition information, generated during the immediately preceding cycle. Divide/Square-Root instructions only use the Condition Flags stored in SCR0. See chapter on Scalable Conditional Execution for details.
2) The CNVZ flags and F0-F1 ACF flags are made available to the next instruction in the pipeline, but are actually written to SCR0 on the second execution cycle. This is similar to how all single-cycle arithmetic instructions operate. See chapter on Scalable Conditional Execution for details.

Arithmetic Scalar Flags Affected
C = Current DC0 field from the SCR1.
N = Current DN0 field from the SCR1.
V = Current DV0 field from the SCR1.
Z = Current DZ0 field from the SCR1.
DC0 = Not Affected
DN = MSB of multi-cycle result.
DV0 = 1 if a saturate from multi-cycle result is generated, 0 otherwise..
DZ0 = 1 if a zero from multi-cycle result is generated, 0 otherwise.

Cycles: 8

Restrictions
The Floating-point Divide (FDIV), Floating-point Reciprocal (FRCP), Floating Point Reciprocal Square Root (FRSQRT), and Floating-point Square Root (FSQRT) instructions all share the same computational unit and are not pipeline-able. Executing any of these instructions before a previous one has completed its computation aborts the previous computation and produces undefined results in the target register, and ASFs.

Example
(Key)

```
!To obtain R2 = R0/R1
FDIV.PD.1FW  R3, R0, R1   ! Cycle-1, R3 gets DSQR result, divide unit begins on R0/R1
<instr2>                  ! Cycle-2 of FDIV
<instr3>                  ! Cycle-3 of FDIV
<instr4>                  ! Cycle-4 of FDIV
<instr5>                  ! Cycle-5 of FDIV
<instr6>                  ! Cycle-6 of FDIV
<instr7>                  ! Cycle-7 of FDIV
<instr8>                  ! Cycle-8 of FDIV, DSQR gets result at the end of this cycle
FDIV.PD.1FW  R2, R3, R4   ! R2 gets DSQR (FDIV R0/R1), divide unit begins on R3/R4
```

FRCP - Floating-Point Reciprocal

BOPS, Inc. Manta SYSSIM 2.31

Encoding

| 31 30 | 29 | 28 27 | 26 25 24 23 22 21 | 20 19 18 17 16 | 15 14 13 12 11 | 10 | 9 | 8 | 7 | 6 | 5 4 3 | 2 | 1 0 |
|---|---|---|---|---|---|---|---|---|---|---|---|---|---|
| Group | S/P | Unit | DSUopcode | Rt | Rx | 0 | 0 | 0 | 0 | 0 | FdivExt | 0 | CE2 |

Description

The result of the previously executed Divide/Square Root Unit instruction is copied from the DSQR into the target register and the saved flags are copied from the DC, DN, DV, and DZ fields in the SCR1 to the CNVZ arithmetic flags. The source operand is issued to the divide/square root unit to produce a floating point reciprocal (1/x) quotient after a multi-cycle iteration. When the result is complete it is placed in DSQR, and the Arithmetic Flags generated are saved in the DN, DV, and DZ fields of the SCR1. The results and arithmetic flags can be obtained by issuing another Divide/Square Root instruction in the same PE or SP (see DSQR Instruction Examples), or the results alone can be obtained by copying the DSQR to a compute register via a COPY instruction. Both source registers are assumed to be in IEEE 754 compatible floating point format. This instruction produces FP results compatible with IEEE 754 standard. For additional discussion of ManArray floating point operations, see Floating Point Operations, Saturation, and Overflow. This instruction executes in the DSU Functional Unit.

Floating-point reciprocal operations with zero, NAN and Infinity values:

| Floating-Point Operand | | ManArray Floating-Point Result | Arithmetic Flags |
|---|---|---|---|
| Sign | Value | | |
| 0 | NAN or INF | +0 | V=1, N=0, Z=1 |
| 1 | NAN or INF | +0 | V=1, N=0, Z=1 |
| 0/1 | zero | $+1.9999..x\ 2^{127}$ | V=1, N=0, Z=0 |
| A non-normalized result of an operation is flushed to zero. | | | |

Syntax/Operation

| Instruction | Operands | Operation | ACF |
|---|---|---|---|
| FRCP.[SP]D.1FW | Rt, Rx | In the first execution cycle:(1)<br>Rt ←current value of DSQR<br>C flag ←DC0 flag field from the SCR1<br>N flag ←DN0 flag field from the SCR1<br>V flag ←DV0 flag field from the SCR1<br>Z flag ←DZ0 flag field from the SCR1<br>At the end of the last cycle of the multi-cycle operation:<br>DSQR ←1/Rx<br>DC0, DN0, DV0, and DZ0 fields in the SCR1 ←flags generated | None |
| [TF].FRCP.[SP]D.1FW | Rt, Rx | Do operation only if T/F condition is satisfied in F0. | None |

Notes:

1) For conditional execution, this instruction, and all other Divide/Square-Root instructions, never use hot condition information, generated during the immediately preceding cycle. Divide/Square-Root instructions only use the Condition Flags stored in SCR0. See chapter on Scalable Conditional Execution for details.

2) The CNVZ flags and F0-F1 ACF flags are made available to the next instruction in the pipeline, but are actually written to SCR0 on the second execution cycle. This is similar to how all single-cycle arithmetic instructions operate. See chapter on Scalable Conditional Execution for details.

Arithmetic Scalar Flags Affected

C = Current DC0 field from the SCR1.
N = Current DN0 field from the SCR1.
V = Current DV0 field from the SCR1.
Z = Current DZ0 field from the SCR1.
DC0 = Not Affected
DN0 = MSB of multi-cycle result.
DV0 = 1 if a saturate from multi-cycle result is generated, 0 otherwise..
DZ0 = 1 if a zero from multi-cycle result is generated, 0 otherwise.

Cycles: 8

Restrictions

The Floating-point Divide (FDIV), Floating-point Reciprocal (FRCP), Floating Point Reciprocal Square Root (FRSQRT), and Floating-point Square Root (FSQRT) instructions all share the same computational unit and are not pipeline-able. Executing any of these instructions before a previous one has completed its computation aborts the previous computation and produces undefined results in the target register, and ASFs.

Example
(Key)

```
!To obtain R2 = R0/R1
FRCP.PD.1FW  R3, R0, R1   ! Cycle-1, R3 gets DSQR result, divide unit begins on R0/R1
<instr2>                  ! Cycle-2 of FRCP
<instr3>                  ! Cycle-3 of FRCP
<instr4>                  ! Cycle-4 of FRCP
<instr5>                  ! Cycle-5 of FRCP
<instr6>                  ! Cycle-6 of FRCP
<instr7>                  ! Cycle-7 of FRCP
<instr8>                  ! Cycle-8 of FRCP, DSQR gets result at the end of this cycle
FRCP.PD.1FW  R2, R3, R4   ! R2 gets DSQR (FRCP R0/R1), divide unit begins on R3/R4
```

FRSQRT - Floating-Point Reciprocal Square Root

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt | | | | | Rx | | | | | 0 | 0 | 0 | 0 | 0 | FsqrtExt | | | 0 | CE2 | |

Description

The result of the previously executed Divide/Square Root Unit instruction is copied from the DSQR into the target register and the saved flags are copied from the DC, DN, DV, and DZ fields in the SCR1 to the CNVZ arithmetic flags. The source operand is issued to the divide/square root unit to produce a floating point reciprocal square-root result after a multi-cycle iteration. When the result is complete it is placed in DSQR, and the Arithmetic Flags generated are saved in the DN, DV, and DZ fields of the SCR1. The results and arithmetic flags can be obtained by issuing another Divide/Square Root instruction in the same PE or SP (see DSQR Instruction Examples), or the results alone can be obtained by copying the DSQR to a compute register via a COPY instruction. Both source registers are assumed to be in IEEE 754 compatible floating point format. This instruction produces FP results compatible with IEEE 754 standard. For additional discussion of ManArray floating point operations, see Floating Point Operations, Saturation, and Overflow. This instruction executes in the DSU Functional Unit.

Floating-point reciprocal square root operations with zero, NAN and Infinity values.

| Floating-Point Operand | | ManArray Floating-Point Result | Arithmetic Flags |
|---|---|---|---|
| Sign | Value | | |
| 0 | NAN or INF | +0 | V=1, N=0, Z=1 |
| 1 | NAN or INF | +0 | V=1, N=0, Z=1 |
| 1 | non-zero | $1/(ABS\ (Rx))^{1/2}$ | V=0, N=1, Z=1 * |
| 0/1 | zero | $+1.9999..x\ 2^{127}$ | V=1, N=0, Z=0 |
| A non-normalized result of an operation is flushed to zero. | | | |

Syntax/Operation

| Instruction | Operands | Operation | ACF |
|---|---|---|---|
| FRSQRT.[SP]D.1FW | Rt, Rx | In the first execution cycle:(1)<br>Rt ←current value of DSQR<br>C flag ←DC0 flag field from the SCR1<br>N flag ←DN0 flag field from the SCR1<br>V flag ←DV0 flag field from the SCR1<br>Z flag ←DZ0 flag field from the SCR1<br>At the end of the last cycle of the multi-cycle operation:<br>DSQR ←$1/Rx^{1/2}$<br>DC0, DN0, DV0, and DZ0 fields in the SCR1 ←flags generated | None |
| [TF].FRSQRT.[SP]D.1FW | Rt, Rx | Do operation only if specified condition is satisfied in F0 | None |

Notes:

1) For conditional execution, this instruction, and all other Divide/Square-Root instructions, never use hot condition information, generated during the immediately preceding cycle. Divide/Square-Root instructions only use the Condition Flags stored in SCR0. See chapter on Scalable Conditional Execution for details.

2) The CNVZ flags and F0-F1 ACF flags are made available to the next instruction in the pipeline, but are actually written to SCR0 on the second execution cycle. This is similar to how all single-cycle arithmetic instructions operate. See chapter on Scalable Conditional Execution for details.

Arithmetic Scalar Flags Affected

C = Current DC0 field from the SCR1.
N = Current DN0 field from the SCR1.
V = Current DV0 field from the SCR1.
Z = Current DZ0 field from the SCR1.
DC0 = Not Affected
DN0 = MSB of multi-cycle result.
DV0 = 1 if a saturate from multi-cycle result is generated, 0 otherwise..
DZ0 = 1 if a zero from multi-cycle result is generated, 0 otherwise.

*) Note on Results that set both N=1 and Z=1:

The square root of a negative number is an imaginary number. When the operand is a negative number, this instruction produces a result as if the operand were a positive number, and it indicates that the result is imaginary by setting both the Negative (N) and Zero (Z) flags to 1. Imaginary numbers are used in engineering to refer to a phase angle or phase value, the polar coordinate equivalent of Y-Axis values. Real numbers are used in polar coordinates associated with the X-Axis.

Cycles: 16

Restrictions
The Floating-point Divide (FDIV), Floating-point Reciprocal (FRCP), Integer Divide (DIV), Integer Remainder (MOD), Floating Point Reciprocal Square Root (FRSQRT), and Floating-point Square Root (FSQRT) instructions all share the same computational unit and are not pipeline-able. Executing any of these instructions before a previous one has completed its computation aborts the previous computation and produces undefined results in the target register, and ASFs.

Example
(Key)

```
!To obtain R2 = 1/sqrt(R0)
FRSQRT.PD.1FW  R3, R0   ! Cycle-1, R3 gets DSQR result, square-root unit begins on R0
<instr2>                ! Cycle-2 of FRSQRT
<instr3>                ! Cycle-3 of FRSQRT
 ...
<instr15>               ! Cycle-15 of FRSQRT
<instr16>               ! Cycle-16 of FRSQRT, DSQR gets result at the end of this cycle
FRSQRT.PD.1FW  R2, R3   ! R2 gets DSQR (FRSQRT R0), square-root unit begins on R3
```

FSQRT - Floating-Point Square Root

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt | | | | | Rx | | | | | 0 | 0 | 0 | 0 | FsqrtExt | | | | 0 | CE2 | |

Description

The result of the previously executed Divide/Square Root Unit instruction is copied from the DSQR into the target register and the saved flags are copied from the DC, DN, DV, and DZ fields in the SCR1 to the CNVZ arithmetic flags. The source operand is issued to the divide/square root unit to produce a floating point square-root after a multi-cycle iteration. When the result is complete it is placed in DSQR, and the Arithmetic Flags generated are saved in the DN, DV, and DZ fields of the SCR1. The results and arithmetic flags can be obtained by issuing another Divide/Square Root instruction in the same PE or SP (see DSQR Instruction Examples), or the results alone can be obtained by copying the DSQR to a compute register via a COPY instruction. Both source registers are assumed to be in IEEE 754 compatible floating point format. This instruction produces FP results compatible with IEEE 754 standard. For additional discussion of ManArray floating point operations, see Floating Point Operations, Saturation, and Overflow. This instruction executes in the DSU Functional Unit.

Floating-point square root operations with zero, NAN and Infinity values.

| Floating-Point Operand | | ManArray Floating-Point Result | Arithmetic Flags |
|---|---|---|---|
| Sign | Value | | |
| 0 | NAN or INF | $+1.9999..x\ 2^{127}$ | V=1, N=0, Z=0 |
| 1 | NAN or INF | $-\ 1.9999..x2^{127}$ | V=1, N=1, Z=0 |
| 1 | non-zero | $(ABS\ (Rx))^{1/2}$ | V=0, N=1, Z=1 * |
| 0/1 | zero | +0 | V=0, N=0, Z=1 |
| A non-normalized result of an operation is flushed to zero. | | | |

Syntax/Operation

| Instruction | Operands | Operation | ACF |
|---|---|---|---|
| FSQRT.[SP]D.1FW | Rt, Rx | In the first execution cycle:[1]<br>Rt ←current value of DSQR<br>C flag ←DC0 flag field from the SCR1<br>N flag ←DN0 flag field from the SCR1<br>V flag ←DV0 flag field from the SCR1<br>Z flag ←DZ0 flag field from the SCR1<br>At the end of the last cycle of the multi-cycle operation:<br>DSQR ←$Rx^{1/2}$<br>DC0, DN0, DV0, and DZ0 fields in the SCR1 ←flags generated | None |
| [TF].FSQRT.[SP]D.1FW | Rt, Rx | Do operation only if specified condition is satisfied in F0. | None |

Notes:

1) For conditional execution, this instruction, and all other Divide/Square-Root instructions, never use hot condition information, generated during the immediately preceding cycle. Divide/Square-Root instructions only use the Condition Flags stored in SCR0. See chapter on Scalable Conditional Execution for details.

2) The CNVZ flags and F0-F1 ACF flags are made available to the next instruction in the pipeline, but are actually written to SCR0 on the second execution cycle. This is similar to how all single-cycle arithmetic instructions operate. See chapter on Scalable Conditional Execution for details.

Arithmetic Scalar Flags Affected

C = Current DC0 field from the SCR1.
N = Current DN0 field from the SCR1.
V = Current DV0 field from the SCR1.
Z = Current DZ0 field from the SCR1.
DC0 = Not Affected
DN0 = MSB of multi-cycle result.
DV0 = 1 if a saturate from multi-cycle result is generated, 0 otherwise..
DZ0 = 1 if a zero from multi-cycle result is generated, 0 otherwise.

*) Note on Results that set both N=1 and Z=1:

The square root of a negative number is an imaginary number. When the operand is a negative number, this instruction produces a result as if the operand were a positive number, and it indicates that the result is imaginary by setting both the Negative (N) and Zero (Z) flags to 1. Imaginary numbers are used in engineering to refer to a phase angle or phase value, the polar coordinate equivalent of Y-Axis values. Real numbers are used in polar coordinates associated with the X-Axis.

Cycles: 8

Restrictions

The Floating-point Divide (FDIV), Floating-point Reciprocal (FRCP), Integer Divide (DIV), Integer Remainder (MOD), Floating Point Reciprocal Square Root (FRSQRT), and Floating-point Square Root (FSQRT) instructions all share the same computational unit and are not pipeline-able. Executing any of these instructions before a previous one has completed its computation aborts the previous computation and produces undefined results in the target register, and ASFs.

Example

(Key)

```
!To obtain R2 = sqrt(R0)
FSQRT.PD.1FW R3, R0    ! Cycle-1, R3 gets DSQR result, square-root unit begins on R0
<instr2>               ! Cycle-2 of FSQRT
<instr3>               ! Cycle-3 of FSQRT
<instr4>               ! Cycle-4 of FSQRT
<instr5>               ! Cycle-5 of FSQRT
<instr6>               ! Cycle-6 of FSQRT
<instr7>               ! Cycle-7 of FSQRT
<instr8>               ! Cycle-8 of FSQRT, DSQR gets result at the end of this cycle
FSQRT.PD.1FW R2, R3    ! R2 gets DSQR (FSQRT R0), square-root unit begins on R3
```

FTOI - Convert Single Precision Floating-Point to Integer

BOPS, Inc. Manta SYSSIM 2.31

Encoding

| 31 30 | 29 | 28 27 | 26 25 24 23 22 21 | 20 19 18 17 16 | 15 14 13 12 11 | 10 | 9 | 8 | 7 6 5 4 3 | 2 | 1 0 |
|---|---|---|---|---|---|---|---|---|---|---|---|
| Group | S/P | Unit | DSUopcode | Rt | Rx | 0 | RM | 0 | CnvrtExt | 0 | CE2 |

Description

The source operand *Rx* is converted from a single-precision floating-point value to a (signed or unsigned) integer word, halfword, or byte result and is loaded into target register *Rt*. The fractional part of the floating-point value affects the result according to the *RoundMode* specified. The result of converting a negative floating-point value to an unsigned integer is zero, and the V flag is set to 1. For additional discussion of ManArray floating point operations, see Floating Point Operations, Saturation, and Overflow.

Single Precision Floating-Point to Integer conversion with NAN and Infinity values.

| | Floating-Point Operand | | ManArray Integer Result | Arithmetic Flags |
|---|---|---|---|---|
| | Sign | Value | | |
| unsigned operation | 1 | valid negative value | 0 | V=1 |
| | 1 | NAN or INF | 0 | V=1 |
| | 0 | Max INT < Rx < positive INF | Max INT, unsigned | V=1 |
| | 0 | NAN or INF | Max INT, unsigned | V=1 |
| signed operation | 1 | NAN or INF | Min INT, signed | V=1 |
| | 1 | Min INT > Rx > negative INF | Min INT, signed | V=1 |
| | 0 | Max INT < Rx < positive INF | Max INT, signed | V=1 |
| | 0 | NAN or INF | Max INT, signed | V=1 |

For a definition of Max/Min INT, see the section on Saturated Arithmetic.

Syntax/Operation

| Instruction | Operands | Operation | ACF |
|---|---|---|---|
| | | | Word |
| FTOI.[SP]D.1[SU]W | Rt, Rx, RoundMode | Rt ←ToInt(Rx) | None |
| [TF].FTOI.[SP]D.1[SU]W | Rt, Rx, RoundMode | Do operation only if T/F condition is satisfied in F0 | None |
| | | | Halfword |
| FTOI.[SP]D.1[SU]H | RtHt, Rx, RoundMode | RtHt ←ToInt(Rx)<br>(Ht refers to register halfword H0 or H1) | None |
| [TF].FTOI.[SP]D.1[SU]H | RtHt, Rx, RoundMode | Do operation only if T/F condition is satisfied in F0 | None |
| | | | Byte |
| FTOI.[SP]D.1[SU]B | RtBt, Rx, RoundMode | RtBt ←ToInt(Rx)<br>(Bt refers to register byte B0, B1, B2 or B3) | None |
| [TF].FTOI.[SP]D.1[SU]B | RtBt, Rx, RoundMode | Do operation only if T/F condition is satisfied in F0 | None |

The operand *RoundMode* is the following:
R=TRUNC for rounding towards zero
R=ROUND for rounding to the nearest integer

Arithmetic Scalar Flags Affected

C = Not Affected
N = MSB of result
V = 1 if a saturated result is generated, 0 otherwise
Z = 1 if a zero result is generated, 0 otherwise

Cycles: 1

Examples
(Key)

```
ftoi.pd.1sw r1, r0, r=round ! r0 = 2.5; after execution r1 = 3
ftoi.pd.1sw r1, r0, r=round ! r0 = -2.5; after execution r1 = -3
```

FTOIS - Convert Single Precision Floating-Point to Integer Scaled

BOPS, Inc. Manta SYSSIM 2.31

Encoding

| 31 30 | 29 | 28 27 | 26 25 24 23 22 21 | 20 19 18 17 16 | 15 14 13 12 11 | 10 | 9 8 | 7 | 6 5 4 3 | 2 | 1 0 |
|---|---|---|---|---|---|---|---|---|---|---|---|
| Group | S/P | Unit | DSUopcode | Rt | Rx | 0 | RM | 1 | CnvrtExt | 0 | CE2 |

Description

The source operand *Rx* is converted from a single-precision floating-point value to a scaled (signed or unsigned) integer word, halfword or byte result that is loaded into target register *Rt*.

For signed integer conversion, the floating-point value is assumed to be in the range -1.0 to 1.0 and is converted to either a signed word ($-2^{31}$ to $2^{31}-1$) or a signed halfword ($-2^{15}$ to $2^{15}-1$) or a signed byte ($-2^{7}$ to $2^{7}-1$).

For unsigned integer conversion, the floating-point value is assumed to be in the range 0.0 to 1.0 and is converted to either an unsigned word (0 to $2^{32}-1$) or an unsigned halfword (0 to $2^{16}-1$) or an unsigned byte (0 to $2^{8}-1$).

The result of converting a negative floating-point value to an unsigned integer is zero, and the V flag is set to 1. If the floating point value is not in the specified range then the result is asymmetrically saturated and the V flag is set to a 1.

For additional discussion of ManArray floating point operations, see Floating Point Operations, Saturation, and Overflow.

Single Precision Floating-Point to scaled Integer conversion with values -1,0, and +1.

| | Floating-Point Operand | | ManArray Integer Result | Arithmetic Flags |
|---|---|---|---|---|
| | Sign | Value | | |
| unsigned operation | 1 | Rx < 0.0 | 0 | V=1 |
| | 1/0 | Rx = 0.0 | 0 | V=0 |
| | 0 | Rx = 1.0 | Max INT, unsigned | V=0 |
| | 0 | Rx > 1.0 | Max INT, unsigned | V=1 |
| signed operation | 1 | Rx < (-1.0) | Min INT, signed | V=1 |
| | 1 | Rx = (-1.0) | Min INT, signed | V=0 |
| | 1/0 | Rx = 0.0 | -1 for ROUND | V=0 |
| | 0 | Rx = 1.0 | Max INT, signed | V=0 |
| | 0 | Rx > 1.0 | Max INT, signed | V=1 |

For a definition of Max/Min INT, see the section on Saturated Arithmetic.

Syntax/Operation (signed integer)

| Instruction | Operands | Operation | ACF |
|---|---|---|---|
| | | | Word |
| FTOIS.[SP]D.1SW | Rt, Rx, RoundMode | Rt ←ToInt(((($2^{32}$-1)*Rx)-1)/2) | None |
| [TF].FTOIS.[SP]D.1SW | Rt, Rx, RoundMode | Do operation only if T/F condition is satisfied in F0 | None |
| | | | Halfword |
| FTOIS.[SP]D.1SH | RtHt, Rx, RoundMode | RtHt ←ToInt(((($2^{16}$-1)*Rx)-1)/2)<br>(Ht refers to register halfword H0 or H1) | None |
| [TF].FTOIS.[SP]D.1SH | RtHt, Rx, RoundMode | Do operation only if T/F condition is satisfied in F0 | None |
| | | | Byte |
| FTOIS.[SP]D.1SB | RtBt, Rx, RoundMode | RtBt ←ToInt(((($2^{8}$-1)*Rx)-1)/2)<br>(Bt refers to register byte B0, B1, B2 or B3) | None |
| [TF].FTOIS.[SP]D.1SB | RtBt, Rx, RoundMode | Do operation only if T/F condition is satisfied in F0 | None |

Syntax/Operation (unsigned integer)

| Instruction | Operands | Operation | ACF |
|---|---|---|---|
| | | | Word |
| FTOIS.[SP]D.1UW | Rt, Rx, RoundMode | Rt ←ToInt(($2^{32}$-1)*Rx) | None |
| [TF].FTOIS.[SP]D.1UW | Rt, Rx, RoundMode | Do operation only if T/F condition is satisfied in F0 | None |
| | | | Halfword |
| FTOIS.[SP]D.1UH | RtHt, Rx, RoundMode | RtHt ←ToInt(($2^{16}$-1)*Rx) | None |

| | | | |
|---|---|---|---|
| | | (Ht refers to register halfword H0 or H1) | |
| [TF].FTOIS.[SP]D.1UH | RtHt, Rx, RoundMode | Do operation only if T/F condition is satisfied in F0 | None |
| Byte | | | |
| FTOIS.[SP]D.1UB | RtBt, Rx, RoundMode | RtBt ←ToInt(($2^8$-1)*Rx)<br>(Bt refers to register byte B0, B1, B2 or B3) | None |
| [TF].FTOIS.[SP]D.1UB | RtBt, Rx, RoundMode | Do operation only if T/F condition is satisfied in F0 | None |

The operand *RoundMode* is the following:
R=round, Note: The round function is unique to FTOIS.

Arithmetic Scalar Flags Affected
C = Not Affected
N = MSB of result
V = 1 if a saturated result is generated, 0 otherwise
Z = 1 if a zero result is generated, 0 otherwise

Cycles: 1

Examples (Key)

```
ftois.pd.1sb r1b0, r0, r=round ! r0=1.0; after execution r1b0=127

ftois.pd.1sb r1b0, r0, r=round ! r0=-1.0; after execution r1=-128

ftois.pd.1sb r1b0, r0, r=round ! r0=0.0; after execution r1=0
```

ITOF - Convert Integer to Single Precision Floating-Point

BOPS, Inc. Manta SYSSIM 2.31

Encoding

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td colspan="2">Group</td><td>S/P</td><td colspan="2">Unit</td><td colspan="6">DSUopcode</td><td colspan="5">Rt</td><td colspan="5">Rx</td><td>0</td><td>0</td><td>0</td><td>0</td><td colspan="4">CnvrtExt</td><td>0</td><td colspan="2">CE2</td></tr>
</table>

Description

The source operand *Rx* is converted from a (signed or unsigned) integer word, halfword, or byte to a single-precision floating-point value and the result is loaded into target register *Rt*.

Syntax/Operation

| Instruction | Operands | Operation | ACF |
|---|---|---|---|
| | | | Word |
| ITOF.[SP]D.1[SU]W | Rt, Rx | Rt ←ToFloat(Rx) | None |
| [TF].ITOF.[SP]D.1[SU]W | Rt, Rx | Do operation only if T/F condition is satisfied in F0 | None |
| | | | Halfword |
| ITOF.[SP]D.1[SU]H | Rt, RxH0 | Rt ←ToFloat(RxH0) | None |
| [TF].ITOF.[SP]D.1[SU]H | Rt, RxH0 | Do operation only if T/F condition is satisfied in F0 | None |
| | | | Byte |
| ITOF.[SP]D.1[SU]B | Rt, RxB0 | Rt ←ToFloat(RxB0) | None |
| [TF].ITOF.[SP]D.1[SU]B | Rt, RxB0 | Do operation only if T/F condition is satisfied in F0 | None |

Arithmetic Scalar Flags Affected

C = Not Affected
N = MSB of result
V = 0
Z = 1 if a zero result is generated, 0 otherwise

Cycles: 1

Examples (Key)

```
itof.sd.1sw r1, r0 ! r0=1; after execution r1=1.0
itof.sd.1sh r1, r0h0 ! r0h0=127; after execution r1=127.0
itof.sd.1sb r1, r0b0 ! r0b0=-12; after execution r1=-12.0
```

ITOFS - Convert Integer to Single Precision Floating-Point Scaled

BOPS, Inc. Manta
SYSSIM 2.31

Encoding

| 31-30 | 29 | 28-27 | 26-21 | 20-16 | 15-11 | 10 | 9 | 8 | 7 | 6-3 | 2 | 1-0 |
|---|---|---|---|---|---|---|---|---|---|---|---|---|
| Group | S/P | Unit | DSUopcode | Rt | Rx | 0 | 0 | 0 | 1 | CnvrtExt | 0 | CE2 |

Description
The source operand *Rx* is converted from a (signed or unsigned) integer word, halfword, or byte to a single-precision floating-point value, scaled according to the operand size and loaded into target register *Rt*. The result for a signed integer conversion is a value between -1.0 and +1.0. The result for an unsigned integer conversion is a value between 0.0 and 1.0.

Syntax/Operation (signed integer)

| Instruction | Operands | Operation | ACF |
|---|---|---|---|
| | | | Word |
| ITOFS.[SP]D.1SW | Rt, Rx | Rt ←ToFloat((2*Rx+1)/($2^{32}$-1)) | None |
| [TF].ITOFS.[SP]D.1SW | Rt, Rx | Do operation only if T/F condition is satisfied in F0 | None |
| | | | Halfword |
| ITOFS.[SP]D.1SH | Rt, RxH0 | Rt ←ToFloat((2*RxH0+1)/($2^{16}$-1)) | None |
| [TF].ITOFS.[SP]D.1SH | Rt, RxH0 | Do operation only if T/F condition is satisfied in F0 | None |
| | | | Byte |
| ITOFS.[SP]D.1SB | Rt, RxB0 | Rt ←ToFloat((2*RxB0+1)/($2^{8}$-1)) | None |
| [TF].ITOFS.[SP]D.1SB | Rt, RxB0 | Do operation only if T/F condition is satisfied in F0 | None |

Syntax/Operation (unsigned integer)

| Instruction | Operands | Operation | ACF |
|---|---|---|---|
| | | | Word |
| ITOFS.[SP]D.1UW | Rt, Rx | Rt ←ToFloat(Rx/($2^{32}$-1)) | None |
| [TF].ITOFS.[SP]D.1UW | Rt, Rx | Do operation only if T/F condition is satisfied in F0 | None |
| | | | Halfword |
| ITOFS.[SP]D.1UH | Rt, RxH0 | Rt ←ToFloat(RxH0/($2^{16}$-1)) | None |
| [TF].ITOFS.[SP]D.1UH | Rt, RxH0 | Do operation only if T/F condition is satisfied in F0 | None |
| | | | Byte |
| ITOFS.[SP]D.1UB | Rt, RxB0 | Rt ←ToFloat(RxB0/($2^{8}$-1)) | None |
| [TF].ITOFS.[SP]D.1UB | Rt, RxB0 | Do operation only if T/F condition is satisfied in F0 | None |

Arithmetic Scalar Flags Affected
C = Not Affected
N = MSB of result
V = 0
Z = 1 if a zero result is generated, 0 otherwise

Cycles: 1

Examples (Key)

```
itofs.sd.1sh r1, r0h0 ! r0h0=32767; after execution r1=1.0
itofs.sd.1sb r1, r0b0 ! r0b0=127; after execution r1=1.0
itofs.sd.1sb r1, r0b0 ! r0b0=-128; after execution r1=-1.0
itofs.sd.1sb r1, r0b0 ! r0b0=0; after execution r1=-0.00392156862745
```

MIX - Mix Packed Data

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rte | | | | 0 | Rx | | | | | Ry | | | | | MixExt | | | 0 | CE2 | |

Description

Packed data from source registers *Rx* and *Ry* is interleaved into target register *Rt*.

←

Syntax/Operation

| Instruction | Operands | Operation | ACF |
|---|---|---|---|
| | | Quad Halfwords | |
| MIX.[SP]D.4H | Rte, Rx, Ry | Rto.H1 ←Rx.H1<br>Rto.H0 ←Ry.H1<br>Rte.H1 ←Rx.H0<br>Rte.H0 ←Ry.H0 | None |
| [TF].MIX.[SP]D.4H | Rte, Rx, Ry | Do operation only if T/F condition is satisfied in F0. | None |
| | | Octal Bytes | |
| MIX.[SP]D.8B | Rte, Rx, Ry | Rto.B3 ←Rx.B3<br>Rto.B2 ←Ry.B3<br>Rto.B1 ←Rx.B2<br>Rto.B0 ←Ry.B2<br>Rte.B3 ←Rx.B1<br>Rte.B2 ←Ry.B1<br>Rte.B1 ←Rx.B0<br>Rte.B0 ←Ry.B0 | None |
| [TF].MIX.[SP]D.8B | Rte, Rx, Ry | Do operation only if T/F condition is satisfied in F0. | None |

Arithmetic Scalar Flags Affected

C = Not Affected
N = Not Affected
V = Not Affected
Z = Not Affected

Cycles: 1

PACKB - Pack 4 Bytes into 1 Word

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt | | | | | Rxe | | | | 0 | Rye | | | 0 | PackbExt | | | | 0 | CE2 | |

Description

A specific byte (B0, B1, B2 or B3) from each word of source register pairs *Rxo*||*Rxe* and *Ryo*||*Rye* is packed into the target register *Rt*.

PACKB.[SP]D.4B Rt, Rxe, Rye, B2

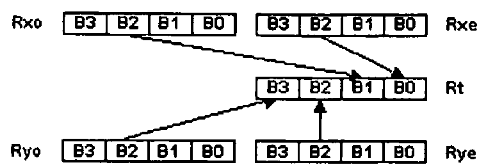

Syntax/Operation

| Instruction | Operands | Operation | ACF |
|---|---|---|---|
| | | | Quad Bytes |
| PACKB.[SP]D.4B | Rt, Rxe, Rye, Bz | Rt.B3 ←Ryo.Bz<br>Rt.B2 ←Rye.Bz<br>Rt.B1 ←Rxo.Bz<br>Rt.B0 ←Rxe.Bz *(Note: Bz is B0,B1,B2 or B3)* | None |
| [TF].PACKB.[SP]D.4B | Rt, Rxe, Rye, Bz | Do operation only if T/F condition is satisfied in F0. | None |

Arithmetic Scalar Flags Affected

C = Not Affected

N = Not Affected

V = Not Affected

Z = Not Affected

Cycles: 1

PACKH - Pack High Data into Smaller Format

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rte | | | | 0 | Rxe | | | | 0 | Rye | | | 0 | PackExt | | | | 0 | CE2 | |

Description
High order bytes or halfwords from source registers *Rxo*||*Rxe* and *Ryo*||*Rye* are packed into target register *Rt*.

PACKH.[SP]D.4H Rte, Rxe, Rye

←

PACKH.[SP]D.8B Rte, Rxe, Rye

←

Syntax/Operation

| Instruction | Operands | Operation | ACF |
|---|---|---|---|
| | | | Quad Halfwords |
| PACKH.[SP]D.4H | Rte, Rxe, Rye | Rto.H1 ←Rxo.H1<br>Rto.H0 ←Rxe.H1<br>Rte.H1 ←Ryo.H1<br>Rte.H0 ←Rye.H1 | None |
| [TF].PACKH.[SP]D.4H | Rte, Rxe, Rye | Do operation only if T/F condition is satisfied in F0. | None |
| | | | Octal Bytes |
| PACKH.[SP]D.8B | Rte, Rxe, Rye | Rto.B3 ←Rxo.B3<br>Rto.B2 ←Rxo.B1<br>Rto.B1 ←Rxe.B3<br>Rto.B0 ←Rxe.B1<br>Rte.B3 ←Ryo.B3<br>Rte.B2 ←Ryo.B1<br>Rte.B1 ←Rye.B3<br>Rte.B0 ←Rye.B1 | None |
| [TF].PACKH.[SP]D.8B | Rte, Rxe, Rye | Do operation only if T/F condition is satisfied in F0. | None |

Arithmetic Scalar Flags Affected
C = Not Affected
N = Not Affected
V = Not Affected
Z = Not Affected

Cycles: 1

PACKL - Pack Low Data into Smaller Format

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rte | | | | 0 | Rxe | | | | 0 | Rye | | | | 0 | PackExt | | | 0 | CE2 | |

Description
Low order bytes or halfwords from source registers *Rxo*||*Rxe* and *Ryo*||*Rye* are packed into target register *Rt*.

PACKL.[SP]D.4H Rte, Rxe, Rye

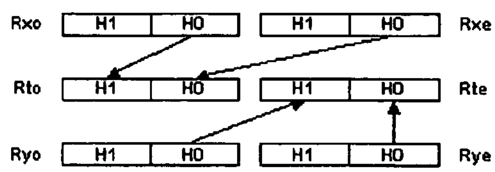

PACKL.[SP]D.8B Rte, Rxe, Rye

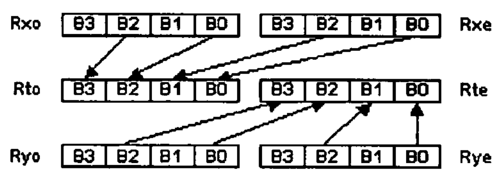

Syntax/Operation

| Instruction | Operands | Operation | ACF |
|---|---|---|---|
| | | Quad Halfwords | |
| PACKL.[SP]D.4H | Rte, Rxe, Rye | Rto.H1 ←Rxo.H0<br>Rto.H0 ←Rxe.H0<br>Rte.H1 ←Ryo.H0<br>Rte.H0 ←Rye.H0 | None |
| [TF].PACKL.[SP]D.4H | Rte, Rxe, Rye | Do operation only if T/F condition is satisfied in F0. | None |
| | | Octal Bytes | |
| PACKL.[SP]D.8B | Rte, Rxe, Rye | Rto.B3 ←Rxo.B2<br>Rto.B2 ←Rxo.B0<br>Rto.B1 ←Rxe.B2<br>Rto.B0 ←Rxe.B0<br>Rte.B3 ←Ryo.B2<br>Rte.B2 ←Ryo.B0<br>Rte.B1 ←Rye.B2<br>Rte.B0 ←Rye.B0 | None |
| [TF].PACKL.[SP]D.8B | Rte, Rxe, Rye | Do operation only if T/F condition is satisfied in F0. | None |

Arithmetic Scalar Flags Affected
C = Not Affected
N = Not Affected
V = Not Affected
Z = Not Affected

Cycles: 1

PERM - Permute
BOPS, Inc. Manta SYSSIM 2.31
Encoding
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt | | | | | Rxe | | | | 0 | Ry | | | | | PermExt | | | 0 | CE2 | |
| | | | | | | | | | | | Rte | | | | 0 | | | | | | | | | | | | | | | | |
Description
Bytes from the source register pair *Rxo||Rxe* are placed into the target register *Rt* or *Rto||Rte* based on corresponding 4-bit indices in permute control word *Ry*. The diagrams below depict the operation of both forms of this instruction.
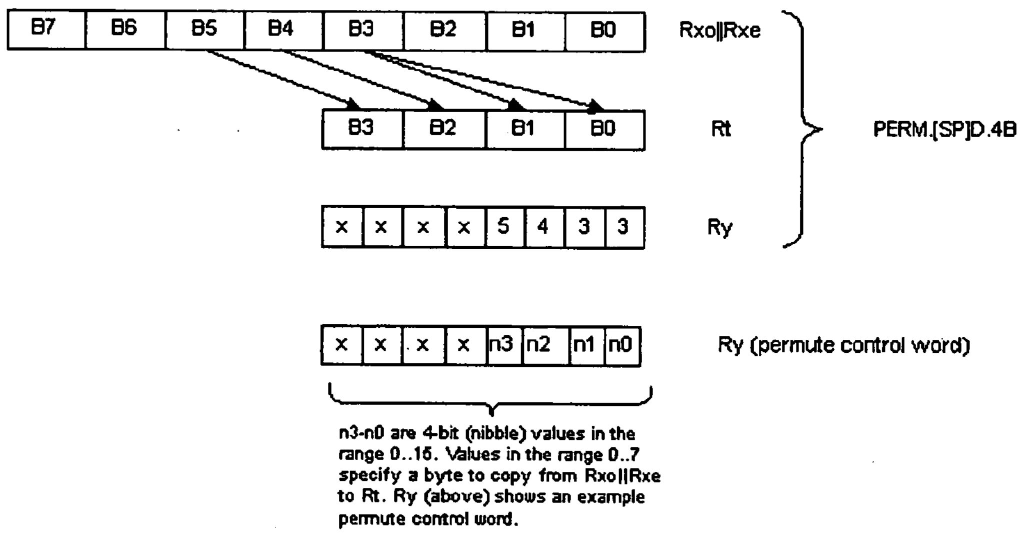

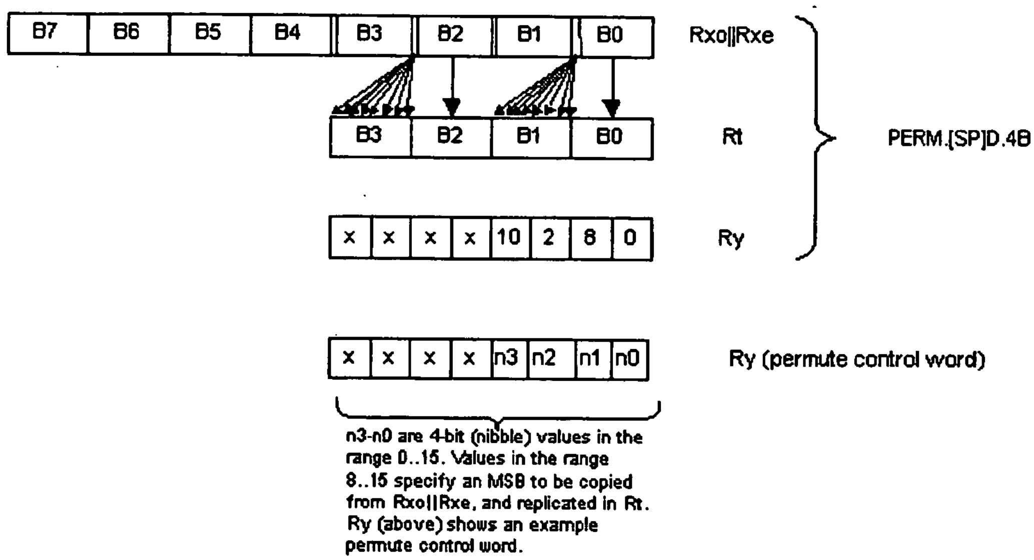
B7
B6
B5
B4
B3
B2
B1
B0
Rxo||Rxe
Rt
PERM.[SP]D.4B
x x x x 10 2 8 0
Ry
x x x x n3 n2 n1 n0
Ry (permute control word)
n3-n0 are 4-bit (nibble) values in the range 0..15. Values in the range 8..15 specify an MSB to be copied from Rxo||Rxe, and replicated in Rt. Ry (above) shows an example permute control word.

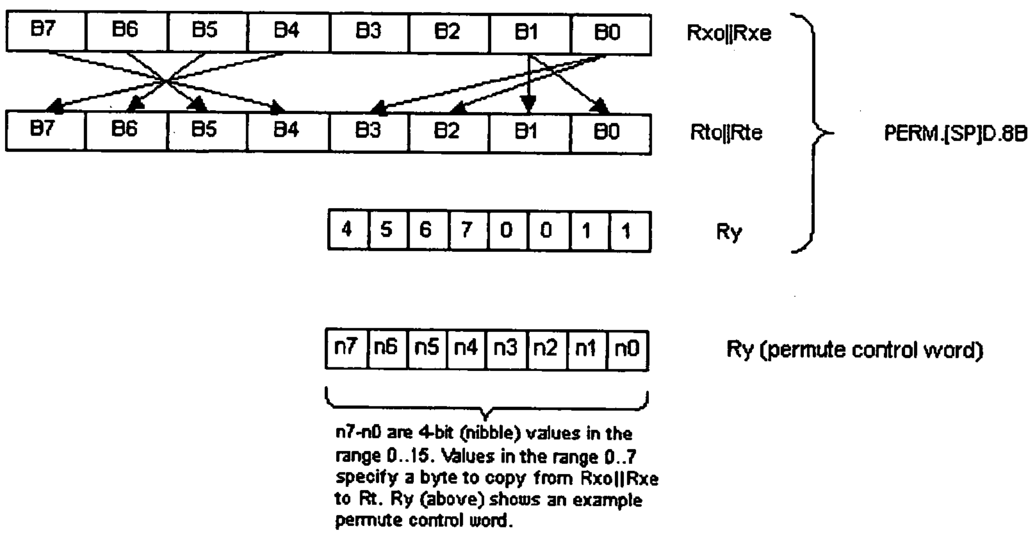
B7
B6
B5
B4
B3
B2
B1
B0
Rxo||Rxe
Rto||Rte
PERM.[SP]D.8B
4 5 6 7 0 0 1 1
Ry
n7 n6 n5 n4 n3 n2 n1 n0
Ry (permute control word)
n7-n0 are 4-bit (nibble) values in the range 0..15. Values in the range 0..7 specify a byte to copy from Rxo||Rxe to Rt. Ry (above) shows an example permute control word.

Syntax/Operation

| Instruction | Operands | Operation | ACF |
|---|---|---|---|
| | | | Quad Bytes |
| PERM.[SP]D.4B | Rt, Rxe, Ry | Rt.B3 ←Rxo\|\|Rxe.B(Ry[15:12])<br>Rt.B2 ←Rxo\|\|Rxe.B(Ry[11:8])<br>Rt.B1 ←Rxo\|\|Rxe.B(Ry[7:4])<br>Rt.B0 ←Rxo\|\|Rxe.B(Ry[3:0]) | None |
| [TF].PERM.[SP]D.4B | Rt, Rxe, Ry | Do operation only if T/F condition is satisfied in F0. | None |
| | | | Octal Bytes |
| PERM.[SP]D.8B | Rte, Rxe, Ry | Rto.B3 ←Rxo\|\|Rxe.B(Ry[31:28])<br>Rto.B2 ←Rxo\|\|Rxe.B(Ry[27:24])<br>Rto.B1 ←Rxo\|\|Rxe.B(Ry[23:20])<br>Rto.B0 ←Rxo\|\|Rxe.B(Ry[19:16])<br>Rte.B3 ←Rxo\|\|Rxe.B(Ry[15:12])<br>Rte.B2 ←Rxo\|\|Rxe.B(Ry[11:8])<br>Rte.B1 ←Rxo\|\|Rxe.B(Ry[7:4])<br>Rte.B0 ←Rxo\|\|Rxe.B(Ry[3:0]) | None |
| [TF].PERM.[SP]D.8B | Rte, Rxe, Ry | Do operation only if T/F condition is satisfied in F0. | None |

| 4 bit Index | |
|---|---|
| **Output** | |
| 0000 – 0111 | Byte 0 - Byte 7 |
| 1000 – 1111 | Fill the byte with the MSB of byte 0 - 7 |

Arithmetic Scalar Flags Affected
C = Not Affected
N = Not Affected
V = Not Affected
Z = Not Affected

Cycles: 1

PEXCHG - PE to PE Exchange

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|

| Group | S/P | Unit | DSUopcode | Rt | Rx | PeXchgCSctrl | CE3 |
|---|---|---|---|---|---|---|---|

Description

A PE's target register receives data from its input port. The PE's source register is made available on its output port. The PE's input and output ports are connected to a Cluster Switch. The Cluster Switch is made up of Multiplexors (Muxes), which are controlled by individual PEs. The combination of the PeXchgCSctrl and the PE's ID controls the PE's mux in the cluster switch. The PEXCHG table specifies how the muxes are controlled. Each PE's mux control, in conjunction with its partner's mux control, determines how the specified source data is routed to the PE's input port.

Each PE also contains a 4-bit hardware Physical ID (PID) stored in a Special Purpose PID register. The 2x2 uses two bits of the PID. The PID of a PE is unique and never changes.

Each PE can take an identity associated with a virtual organization of PEs. This virtual ID (VID) consists of a Gray encoded Row and Column value. For the allowed virtual organization of PEs, shown in the following illustrations, the last 2 digits of the VID match the last 2 digits of the PID.

2x2 Cluster Switch Diagram.

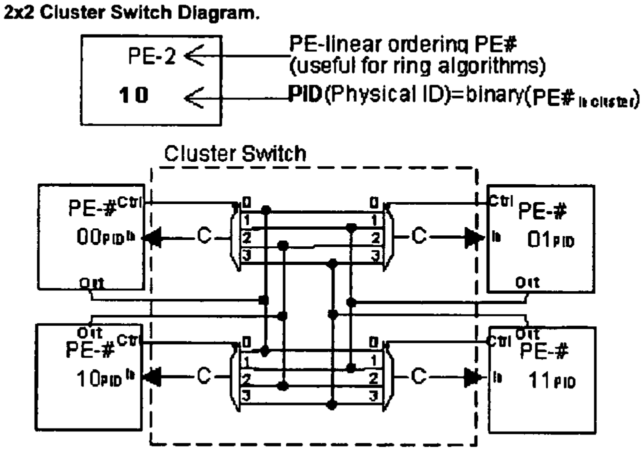

C is the internal data path within a Cluster

Syntax/Operation

| Instruction | Operands | Operation | ACF |
|---|---|---|---|
| | | | Word |
| PEXCHG.PD.W | Rt,Rx, PeXchgCSctrl | Do operation below but do not affect ACFs | None |
| PEXCHG[NZ].PD.W | Rt,Rx, PeXchgCSctrl | PEPID: Rt ←Input port.<br>PEPID: Rx ←Output port | F0 |
| [TF].PEXCHG.PD.W | Rt,Rx, PeXchgCSctrl | Do operation only if T/F condition is satisfied in F0. | None |

Arithmetic Flags Affected

C = Not Affected
N = MSB of result
V = Not Affected
Z = 1 if a zero result is generated, 0 otherwise

Cycles: 1

Key to PEXCHG 2x2 Operation Table
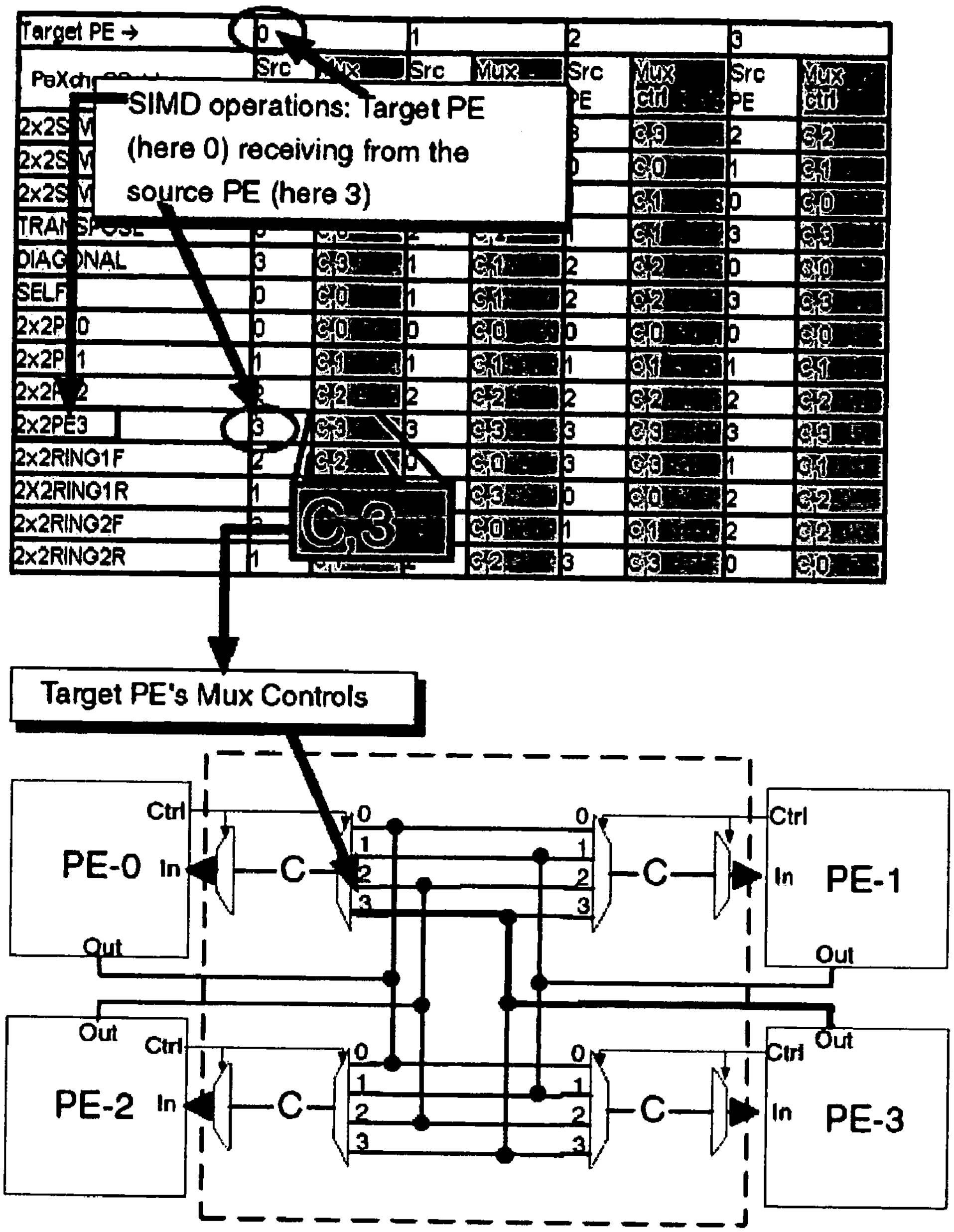

PEXCHG 1x1 Operation Table

| Target PE ← | 0 | |
|---|---|---|
| PeXchgCSctrl | Src PE | Mux ctrl |
| SELF | 0 | C,0 |

PEXCHG 1x2 Operation Table

| Target PE ← | 0 | | 1 | |
|---|---|---|---|---|
| PeXchgCSctrl | Src PE | Mux ctrl | Src PE | Mux ctrl |
| 1x2_SWP0 | 1 | C,1 | 0 | C,0 |
| SELF | 0 | C,0 | 1 | C,1 |
| 1x2_PE0 | 0 | C,0 | 0 | C,0 |
| 1x2_PE1 | 1 | C,1 | 1 | C,1 |

PEXCHG 2x2 Operation Table

| Target PE ← | 0 | | 1 | | 2 | | 3 | |
|---|---|---|---|---|---|---|---|---|
| PeXchgCSctrl | Src PE | Mux ctrl | Src PE | Mux ctrl | Src PE | Mux ctrl | Src PE | Mux ctrl |
| 2x2_SWP0 | 1 | C,1 | 0 | C,0 | 3 | C,3 | 2 | C,2 |
| 2x2_SWP1 | 2 | C,2 | 3 | C,3 | 0 | C,0 | 1 | C,1 |
| 2x2_SWP2 | 3 | C,3 | 2 | C,2 | 1 | C,1 | 0 | C,0 |
| TRANSPOSE | 0 | C,0 | 2 | C,2 | 1 | C,1 | 3 | C,3 |
| DIAGONAL | 3 | C,3 | 1 | C,1 | 2 | C,2 | 0 | C,0 |
| SELF | 0 | C,0 | 1 | C,1 | 2 | C,2 | 3 | C,3 |
| 2x2_PE0 | 0 | C,0 | 0 | C,0 | 0 | C,0 | 0 | C,0 |
| 2x2_PE1 | 1 | C,1 | 1 | C,1 | 1 | C,1 | 1 | C,1 |
| 2x2_PE2 | 2 | C,2 | 2 | C,2 | 2 | C,2 | 2 | C,2 |
| 2x2_PE3 | 3 | C,3 | 3 | C,3 | 3 | C,3 | 3 | C,3 |
| 2x2_RING1F | 2 | C,2 | 0 | C,0 | 3 | C,3 | 1 | C,1 |
| 2x2_RING1R | 1 | C,1 | 3 | C,3 | 0 | C,0 | 2 | C,2 |
| 2x2_RING2F | 3 | C,3 | 0 | C,0 | 1 | C,1 | 2 | C,2 |
| 2x2_RING2R | 1 | C,1 | 2 | C,2 | 3 | C,3 | 0 | C,0 |

F=Forward
R=Reverse

2x2 PEXCHG Operations
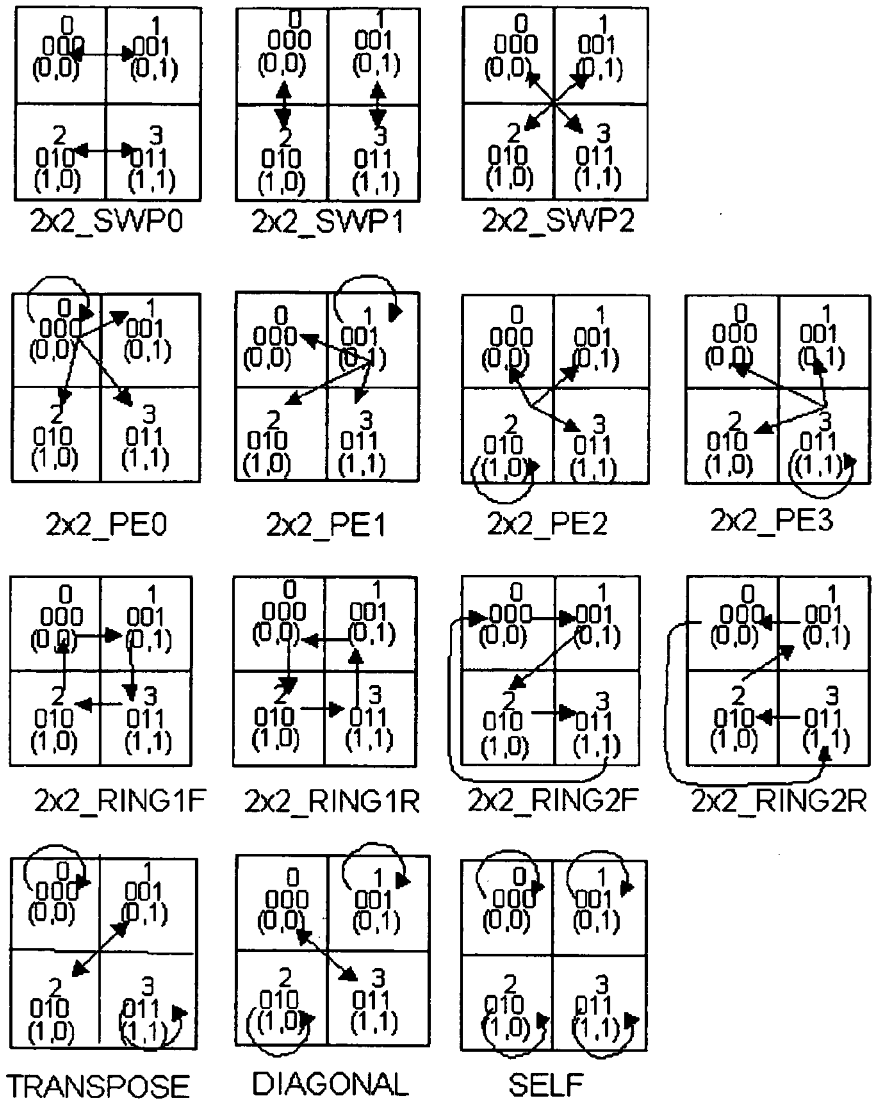
Illustrations of the 2x2 PEXCHG Operations.

ROT - Rotate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt / Rte | | | | 0 | Rx / Rxe | | | | 0 | Ry | | | | | DPack | | | 0 | CE2 | |

Description

Each element in source register *Rx* is rotated by the signed (2's complement) rotate amount in bits 5-0 of Ry.B0. Valid rotate values are in the range -32 to +31. Each result is copied to the corresponding element in target register *Rt*. A positive rotate value rotates left, a negative value rotates right and a zero value is no rotate.

Syntax/Operation

| Instruction | Operands | Operation | ACF |
|---|---|---|---|
| | | | Doubleword |
| ROT.[SP]D.1D | Rte, Rxe, Ry | Rto\|\|Rte ←Rxo\|\|Rxe ←Ry.B0 | None |
| [TF].ROT.[SP]D.1D | Rte, Rxe, Ry | Do operation only if T/F condition is satisfied in F0. | None |
| | | | Word |
| ROT.[SP]D.1W | Rt, Rx, Ry | Rt ←Rx ←Ry.B0 | None |
| [TF].ROT.[SP]D.1W | Rt, Rx, Ry | Do operation only if T/F condition is satisfied in F0. | None |
| | | | Dual Words |
| ROT.[SP]D.2W | Rte, Rxe, Ry | Rto ←Rxo ←Ry.B0<br>Rte ←Rxe ←Ry.B0 | None |
| [TF].ROT.[SP]D.2W | Rte, Rxe, Ry | Do operation only if T/F condition is satisfied in F0. | None |
| | | | Dual Halfwords |
| ROT.[SP]D.2H | Rt, Rx, Ry | Rt.H1 ←Rx.H1 ←Ry.B0<br>Rt.H0 ←Rx.H0 ←Ry.B0 | None |
| [TF].ROT.[SP]D.2H | Rt, Rx, Ry | Do operation only if T/F condition is satisfied in F0. | None |
| | | | Quad Halfwords |
| ROT.[SP]D.4H | Rte, Rxe, Ry | Rto.H1 ←Rxo.H1 ←Ry.B0<br>Rto.H0 ←Rxo.H0 ←Ry.B0<br>Rte.H1 ←Rxe.H1 ←Ry.B0<br>Rte.H0 ←Rxe.H0 ←Ry.B0 | None |
| [TF].ROT.[SP]D.4H | Rte, Rxe, Ry | Do operation only if T/F condition is satisfied in F0. | None |

Arithmetic Scalar Flags Affected (on least significant operation)

C = 0 if Ry.B0 is 0, or the value of last bit shifted out of source register
N = MSB of result
V = 0
Z = 1 if a zero result is generated, 0 otherwise

Cycles: 1

ROTLI - Rotate Left Immediate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt / Rte | | | | 0 | Rx / Rxe | | | | 0 | NBits | | | | | DPack | | | 0 | CE2 | |

Description
Each element in source register *Rx* is rotated left by the specified number of bits *NBits*. Each result is copied to the corresponding element in target register *Rt*. The range for *NBits* is 1-32.

Syntax/Operation

| Instruction | Operands | Operation | ACF |
|---|---|---|---|
| | | | Doubleword |
| ROTLI.[SP]D.1D | Rte, Rxe, Nbits | Rto‖Rte ←Rxo‖Rxe ←Nbits | None |
| [TF].ROTLI.[SP]D.1D | Rte, Rxe, Nbits | Do operation only if T/F condition is satisfied in F0. | None |
| | | | Word |
| ROTLI.[SP]D.1W | Rt, Rx, Nbits | Rt ←Rx ←Nbits | None |
| [TF].ROTLI.[SP]D.1W | Rt, Rx, Nbits | Do operation only if T/F condition is satisfied in F0. | None |
| | | | Dual Words |
| ROTLI.[SP]D.2W | Rte, Rxe, Nbits | Rto ←Rxo ←Nbits<br>Rte ←Rxe ←Nbits | None |
| [TF].ROTLI.[SP]D.2W | Rte, Rxe, Nbits | Do operation only if T/F condition is satisfied in F0. | None |
| | | | Dual Halfwords |
| ROTLI.[SP]D.2H | Rt, Rx, Nbits | Rt.H1 ←Rx.H1 ←Nbits<br>Rt.H0 ←Rx.H0 ←Nbits | None |
| [TF].ROTLI.[SP]D.2H | Rt, Rx, Nbits | Do operation only if T/F condition is satisfied in F0. | None |
| | | | Quad Halfwords |
| ROTLI.[SP]D.4H | Rte, Rxe, Nbits | Rto.H1 ←Rxo.H1 ←Nbits<br>Rto.H0 ←Rxo.H0 ←Nbits<br>Rte.H1 ←Rxe.H1 ←Nbits<br>Rte.H0 ←Rxe.H0 ←Nbits | None |
| [TF].ROTLI.[SP]D.4H | Rte, Rxe, Nbits | Do operation only if T/F condition is satisfied in F0. | None |

Arithmetic Scalar Flags Affected (on least significant operation)
C = value of last bit shifted out of source register
N = MSB of result
V = 0
Z = 1 if a zero result is generated, 0 otherwise

Cycles: 1

ROTRI - Rotate Right Immediate

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt | | | | | Rx | | | | | NBits | | | | | DPack | | | 0 | CE2 | |
| | | | | | | | | | | | Rte | | | | 0 | Rxe | | | | 0 | | | | | | | | | | | |

Description

Each element in source register *Rx* is rotated right by the specified number of bits *NBits*. Each result is copied to the corresponding element in target register *Rt*. The range for *NBits* is 1-32.

Syntax/Operation

| Instruction | Operands | Operation | ACF |
|---|---|---|---|
| | | | Doubleword |
| ROTRI.[SP]D.1D | Rte, Rxe, Nbits | Rto\|\|Rte ←Rxo\|\|Rxe ←Nbits | None |
| [TF].ROTRI.[SP]D.1D | Rte, Rxe, Nbits | Do operation only if T/F condition is satisfied in F0. | None |
| | | | Word |
| ROTRI.[SP]D.1W | Rt, Rx, Nbits | Rt ←Rx ←Nbits | None |
| [TF].ROTRI.[SP]D.1W | Rt, Rx, Nbits | Do operation only if T/F condition is satisfied in F0. | None |
| | | | Dual Words |
| ROTRI.[SP]D.2W | Rte, Rxe, Nbits | Rto ←Rxo ←Nbits<br>Rte ←Rxe ←Nbits | None |
| [TF].ROTRI.[SP]D.2W | Rte, Rxe, Nbits | Do operation only if T/F condition is satisfied in F0. | None |
| | | | Dual Halfwords |
| ROTRI.[SP]D.2H | Rt, Rx, Nbits | Rt.H1 ←Rx.H1 ←Nbits<br>Rt.H0 ←Rx.H0 ←Nbits | None |
| [TF].ROTRI.[SP]D.2H | Rt, Rx, Nbits | Do operation only if T/F condition is satisfied in F0. | None |
| | | | Quad Halfwords |
| ROTRI.[SP]D.4H | Rte, Rxe, Nbits | Rto.H1 ←Rxo.H1 ←Nbits<br>Rto.H0 ←Rxo.H0 ←Nbits<br>Rte.H1 ←Rxe.H1 ←Nbits<br>Rte.H0 ←Rxe.H0 ←Nbits | None |
| [TF].ROTRI.[SP]D.4H | Rte, Rxe, Nbits | Do operation only if T/F condition is satisfied in F0. | None |

Arithmetic Scalar Flags Affected (on least significant operation)

C = value of last bit shifted out of source register

N = MSB of result

V = 0

Z = 1 if a zero result is generated, 0 otherwise

Cycles: 1

SCANL - Scan Left for First '1' Bit

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt | | | | | Rx | | | | | 0 | 0 | 0 | 0 | 0 | ScanExt | | | 0 | CE2 | |

Description

The value in source register *Rx* is scanned from the least-significant bit to the most significant bit for a '1' bit. The position of the first '1' bit (a number between 0 and 31) is returned in byte-0 of the target register *Rt*. A zero is returned if no '1' bit was found.

Syntax/Operation

| Instruction | Operands | Operation | ACF |
|---|---|---|---|
| SCANL.[SP]D.1W | Rt, Rx | Rt.B0 ←bit position of first '1' bit found in Rx (32-bit) while scanning from LSB to MSB. | None |
| [TF].SCANL.[SP]D.1W | Rt, Rx | Do operation only if T/F condition is satisfied in F0. | None |

Arithmetic Scalar Flags Affected

C = Not Affected
N = Not Affected
V = Not Affected
Z = 1 if source register contains zero (no '1' bits found)

Cycles: 1

SCANR - Scan Right for First '1' Bit

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt | | | | | Rx | | | | | 0 | 0 | 0 | 0 | 0 | ScanExt | | | 0 | CE2 | |

Description

The value in source register *Rx* is scanned from the most-significant bit to the least significant bit for a '1' bit. The position of the first '1' bit (a number between 0 and 31) is returned in byte-0 of the target register *Rt*. A zero is returned if no '1' bit was found.

Syntax/Operation

| Instruction | Operands | Operation | ACF |
|---|---|---|---|
| SCANR.[SP]D.1W | Rt, Rx | Rt.B0 ←bit position of first '1' bit found in Rx (32-bit) while scanning from MSB to LSB. | None |
| [TF].SCANR.[SP]D.1W | Rt, Rx | Do operation only if T/F condition is satisfied in ACFs. | None |

Arithmetic Scalar Flags Affected

C = Not Affected
N = Not Affected
V = Not Affected
Z = 1 if source register contains zero (no '1' bits found)

Cycles: 1

SHL - Shift Left

BOPS, Inc. Manta SYSSIM 2.31

Encoding

| 31 30 | 29 | 28 27 | 26 25 24 23 22 21 | 20 19 18 17 | 16 | 15 14 13 12 | 11 | 10 9 8 7 6 | 5 4 3 | 2 1 0 |
|---|---|---|---|---|---|---|---|---|---|---|
| Group | S/P | Unit | DSUopcode | Rt | | Rx | | Ry | DPack | CE3 |
| | | | | Rte | 0 | Rxe | 0 | | | |

Description

Each source register element is shifted left by the number of bits specified in bits 5-0 of Ry.B0. Valid shift values are 0-63.Vacated bit positions are filled with zeroes. Each result is copied to the corresponding target register element.

Syntax/Operation

| Instruction | Operands | Operation | ACF |
|---|---|---|---|
| | | | Doubleword |
| SHL.[SP]D.1D | Rte, Rxe, Ry | Do operation below but do not affect ACFs | None |
| SHL[CNVZ].[SP]D.1D | Rte, Rxe, Ry | Rto‖Rte ←Rxo‖Rxe << Ry.B0 | F0 |
| [TF].SHL.[SP]D.1D | Rte, Rxe, Ry | Do operation only if T/F condition is satisfied in F0. | None |
| | | | Word |
| SHL.[SP]D.1W | Rt, Rx, Ry | Do operation below but do not affect ACFs | None |
| SHL[CNVZ].[SP]D.1W | Rt, Rx, Ry | Rt ←Rx << Ry.B0 | F0 |
| [TF].SHL.[SP]D.1W | Rt, Rx, Ry | Do operation only if T/F condition is satisfied in F0. | None |
| | | | Dual Words |
| SHL.[SP]D.2W | Rte, Rxe, Ry | Do operation below but do not affect ACFs | None |
| SHL[CNVZ].[SP]D.2W | Rte, Rxe, Ry | Rto ←Rxo << Ry.B0<br>Rte ←Rxe << Ry.B0 | F1<br>F0 |
| [TF].SHL.[SP]D.2W | Rte, Rxe, Ry | Do operation only if T/F condition is satisfied in F0. | None |
| | | | Dual Halfwords |
| SHL.[SP]D.2H | Rt, Rx, Ry | Do operation below but do not affect ACFs | None |
| SHL[CNVZ].[SP]D.2H | Rt, Rx, Ry | Rt.H1 ←Rx.H1 << Ry.B0<br>Rt.H0 ←Rx.H0 << Ry.B0 | F1<br>F0 |
| [TF].SHL.[SP]D.2H | Rt, Rx, Ry | Do operation only if T/F condition is satisfied in F0. | None |
| | | | Quad Halfwords |
| SHL.[SP]D.4H | Rte, Rxe, Ry | Do operation below but do not affect ACFs | None |
| SHL[CNVZ].[SP]D.4H | Rte, Rxe, Ry | Rto.H1 ←Rxo.H1 << Ry.B0<br>Rto.H0 ←Rxo.H0 << Ry.B0<br>Rte.H1 ←Rxe.H1 << Ry.B0<br>Rte.H0 ←Rxe.H0 << Ry.B0 | F3<br>F2<br>F1<br>F0 |
| [TF].SHL.[SP]D.4H | Rte, Rxe, Ry | Do operation only if T/F condition is satisfied in F0. | None |

Arithmetic Scalar Flags Affected (on least significant operation)

C = 0 if Ry.B0 is 0, or the value of last bit shifted out of source register
N = MSB of result
V = 0
Z = 1 if a zero result is generated, 0 otherwise

Cycles: 1

SHLI - Shift Left Immediate

BOPS, Inc. Manta SYSSIM 2.31

Encoding

| 31 | 30 | 29 | 28 27 26 25 24 23 22 21 | 20 19 18 17 | 16 | 15 14 13 12 | 11 | 10 9 8 7 6 | 5 4 3 | 2 1 0 |
|---|---|---|---|---|---|---|---|---|---|---|
| Group | | S/P | Unit | DSUopcode | Rt | | Rx | | Nbits | DPack | CE3 |
| | | | | Rte | 0 | Rxe | 0 | | | |

Description
Each source register element is shifted left by the specified number of bits *Nbits*. The range for *Nbits* is 1-32. Vacated bit positions are filled with zeroes. Each result is copied to the corresponding target register element.

Syntax/Operation

| Instruction | Operands | Operation | ACF |
|---|---|---|---|
| | | | Doubleword |
| SHLI.[SP]D.1D | Rte, Rxe, Nbits | Do operation below but do not affect ACFs | None |
| SHLI[CNVZ].[SP]D.1D | Rte, Rxe, Nbits | Rto‖Rte ←Rxo‖Rxe << Nbits | F0 |
| [TF].SHLI.[SP]D.1D | Rte, Rxe, Nbits | Do operation only if T/F condition is satisfied in F0. | None |
| | | | Word |
| SHLI.[SP]D.1W | Rt, Rx, Nbits | Do operation below but do not affect ACFs | None |
| SHLI[CNVZ].[SP]D.1W | Rt, Rx, Nbits | Rt ←Rx << Nbits | F0 |
| [TF].SHLI.[SP]D.1W | Rt, Rx, Nbits | Do operation only if T/F condition is satisfied in F0. | None |
| | | | Dual Words |
| SHLI.[SP]D.2W | Rte, Rxe, Nbits | Do operation below but do not affect ACFs | None |
| SHLI[CNVZ].[SP]D.2W | Rte, Rxe, Nbits | Rto ←Rxo << Nbits<br>Rte ←Rxe << Nbits | F1<br>F0 |
| [TF].SHLI.[SP]D.2W | Rte, Rxe, Nbits | Do operation only if T/F condition is satisfied in F0. | None |
| | | | Dual Halfwords |
| SHLI.[SP]D.2H | Rt, Rx, Nbits | Do operation below but do not affect ACFs | None |
| SHLI[CNVZ].[SP]D.2H | Rt, Rx, Nbits | Rt.H1 ←Rx.H1 << Nbits<br>Rt.H0 ←Rx.H0 << Nbits | F1<br>F0 |
| [TF].SHLI.[SP]D.2H | Rt, Rx, Nbits | Do operation only if T/F condition is satisfied in F0. | None |
| | | | Quad Halfwords |
| SHLI.[SP]D.4H | Rte, Rxe, Nbits | Do operation below but do not affect ACFs | None |
| SHLI[CNVZ].[SP]D.4H | Rte, Rxe, Nbits | Rto.H1 ←Rxo.H1 << Nbits<br>Rto.H0 ←Rxo.H0 << Nbits<br>Rte.H1 ←Rxe.H1 << Nbits<br>Rte.H0 ←Rxe.H0 << Nbits | F3<br>F2<br>F1<br>F0 |
| [TF].SHLI.[SP]D.4H | Rte, Rxe, Nbits | Do operation only if T/F condition is satisfied in F0. | None |

Arithmetic Scalar Flags Affected (on least significant operation)
C = value of last bit shifted out of source register
N = MSB of result
V = 0
Z = 1 if a zero result is generated, 0 otherwise

Cycles: 1

SHR - Shift Right

BOPS, Inc. Manta SYSSIM 2.31

Encoding

| 31 30 | 29 | 28 27 | 26 25 24 23 22 21 | 20 19 18 17 | 16 | 15 14 13 12 | 11 | 10 9 8 7 6 | 5 4 3 | 2 1 0 |
|---|---|---|---|---|---|---|---|---|---|---|
| Group | S/P | Unit | DSUopcode | Rt | | Rx | | Ry | DPack | CE3 |
| | | | | Rte | 0 | Rxe | 0 | | | |

Description

Each source register element is shifted right by the number of bits specified in bits 5-0 of Ry.B0. Valid shift values are 0-63. For signed (arithmetic) shifts, vacated bit positions are filled with the value of the most significant bit of the element. For unsigned (logical) shifts, vacated bit positions are filled with zeroes. Each result is copied to the corresponding target register element.

Syntax/Operation

| Instruction | Operands | Operation | ACF |
|---|---|---|---|
| | | | Doubleword |
| SHR.[SP]D.1[SU]D | Rte, Rxe, Ry | Do operation below but do not affect ACFs | None |
| SHR[CNVZ].[SP]D.1[SU]D | Rte, Rxe, Ry | Rto\|\|Rte ←Rxo\|\|Rxe >> Ry.B0 | F0 |
| [TF].SHR.[SP]D.1[SU]D | Rte, Rxe, Ry | Do operation only if T/F condition is satisfied in F0. | None |
| | | | Word |
| SHR.[SP]D.1[SU]W | Rt, Rx, Ry | Do operation below but do not affect ACFs | None |
| SHR[CNVZ].[SP]D.1[SU]W | Rt, Rx, Ry | Rt ←Rx >> Ry.B0 | F0 |
| [TF].SHR.[SP]D.1[SU]W | Rt, Rx, Ry | Do operation only if T/F condition is satisfied in F0. | None |
| | | | Dual Words |
| SHR.[SP]D.2[SU]W | Rte, Rxe, Ry | Do operation below but do not affect ACFs | None |
| SHR[CNVZ].[SP]D.2[SU]W | Rte, Rxe, Ry | Rto ←Rxo >> Ry.B0<br>Rte ←Rxe >> Ry.B0 | F1<br>F0 |
| [TF].SHR.[SP]D.2[SU]W | Rte, Rxe, Ry | Do operation only if T/F condition is satisfied in F0. | None |
| | | | Dual Halfwords |
| SHR.[SP]D.2[SU]H | Rt, Rx, Ry | Do operation below but do not affect ACFs | None |
| SHR[CNVZ].[SP]D.2[SU]H | Rt, Rx, Ry | Rt.H1 ←Rx.H1 >> Ry.B0<br>Rt.H0 ←Rx.H0 >> Ry.B0 | F1<br>F0 |
| [TF].SHR.[SP]D.2[SU]H | Rt, Rx, Ry | Do operation only if T/F condition is satisfied in F0. | |
| | | | Quad Halfwords |
| SHR.[SP]D.4[SU]H | Rte, Rxe, Ry | Do operation below but do not affect ACFs | None |
| SHR[CNVZ].[SP]D.4[SU]H | Rte, Rxe, Ry | Rto.H1 ←Rxo.H1 >> Ry.B0<br>Rto.H0 ←Rxo.H0 >> Ry.B0<br>Rte.H1 ←Rxe.H1 >> Ry.B0<br>Rte.H0 ←Rxe.H0 >> Ry.B0 | F3<br>F2<br>F1<br>F0 |
| [TF].SHR.[SP]D.4[SU]H | Rte, Rxe, Ry | Do operation only if T/F condition is satisfied in F0. | None |

Arithmetic Scalar Flags Affected (on least significant operation)

C = 0 if Ry.B0 is 0, or the value of last bit shifted out of source register

N = MSB of result

V = 0

Z = 1 if a zero result is generated, 0 otherwise

Cycles: 1

SHRI - Shift Right Immediate

BOPS, Inc. Manta SYSSIM 2.31

Encoding

| 31 30 | 29 | 28 27 | 26 25 24 23 22 21 | 20 19 18 17 16 | 15 14 13 12 11 | 10 9 8 7 6 | 5 4 3 | 2 1 0 |
|---|---|---|---|---|---|---|---|---|
| Group | S/P | Unit | DSUopcode | Rt | Rx | Nbits | DPack | CE3 |
| | | | | Rte \| 0 | Rxe \| 0 | | | |

Description

Each source register element is shifted right by the specified number of bits *Nbits*. The range for *Nbits* is 1-32. For signed (arithmetic) shifts, vacated bit positions are filled with the value of the most significant bit of the element. For unsigned (logical) shifts, vacated bit positions are filled with zeroes. Each result is copied to the corresponding target register element.

Syntax/Operation

| Instruction | Operands | Operation | ACF |
|---|---|---|---|
| | | | Doubleword |
| SHRI.[SP]D.1[SU]D | Rte, Rxe, Nbits | Do operation below but do not affect ACFs | None |
| SHRI[CNVZ].[SP]D.1[SU]D | Rte, Rxe, Nbits | Rto\|\|Rte ←Rxo\|\|Rxe >> Nbits | F0 |
| [TF].SHRI.[SP]D.1[SU]D | Rte, Rxe, Nbits | Do operation only if T/F condition is satisfied in F0. | None |
| | | | Word |
| SHRI.[SP]D.1[SU]W | Rt, Rx, Nbits | Do operation below but do not affect ACFs | None |
| SHRI[CNVZ].[SP]D.1[SU]W | Rt, Rx, Nbits | Rt ←Rx >> Nbits | F0 |
| [TF].SHRI.[SP]D.1[SU]W | Rt, Rx, Nbits | Do operation only if T/F condition is satisfied in F0. | None |
| | | | Dual Words |
| SHRI.[SP]D.2[SU]W | Rte, Rxe, Nbits | Do operation below but do not affect ACFs | None |
| SHRI[CNVZ].[SP]D.2[SU]W | Rte, Rxe, Nbits | Rto ←Rxo >> Nbits<br>Rte ←Rxe >> Nbits | F1<br>F0 |
| [TF].SHRI.[SP]D.2[SU]W | Rte, Rxe, Nbits | Do operation only if T/F condition is satisfied in F0. | None |
| | | | Dual Halfwords |
| SHRI.[SP]D.2[SU]H | Rt, Rx, Nbits | Do operation below but do not affect ACFs | None |
| SHRI[CNVZ].[SP]D.2[SU]H | Rt, Rx, Nbits | Rt.H1 ←Rx.H1 >> Nbits<br>Rt.H0 ←Rx.H0 >> Nbits | F1<br>F0 |
| [TF].SHRI.[SP]D.2[SU]H | Rt, Rx, Nbits | Do operation only if T/F condition is satisfied in F0. | None |
| | | | Quad Halfwords |
| SHRI.[SP]D.4[SU]H | Rte, Rxe, Nbits | Do operation below but do not affect ACFs | None |
| SHRI[CNVZ].[SP]D.4[SU]H | Rte, Rxe, Nbits | Rto.H1 ←Rxo.H1 >> Nbits<br>Rto.H0 ←Rxo.H0 >> Nbits<br>Rte.H1 ←Rxe.H1 >> Nbits<br>Rte.H0 ←Rxe.H0 >> Nbits | F3<br>F2<br>F1<br>F0 |
| [TF].SHRI.[SP]D.4[SU]H | Rte, Rxe, Nbits | Do operation only if T/F condition is satisfied in F0. | None |

Arithmetic Scalar Flags Affected (on least significant operation)

C = value of last bit shifted out of source register
N = MSB of result
V = 0
Z = 1 if a zero result is generated, 0 otherwise

Cycles: 1

SPRECV - SP Receive from PE

BOPS, Inc. Manta SYSSIM 2.31

Encoding

| 31 30 | 29 | 28 27 | 26 25 24 23 22 21 | 20 19 18 17 16 | 15 14 13 12 11 | 10 9 8 7 6 5 4 3 | 2 1 0 |
|---|---|---|---|---|---|---|---|
| Group | S/P | Unit | DSUopcode | Rt | Rx | SpRecvCSctrl | CE3 |

Description

The SP target register receives data from PE0's cluster-switch input port. The source register is made available only on the specified PE's output port. The PE's input and output ports are connected to a Cluster Switch. The cluster switch is made up of Multiplexors (Muxes), which are controlled by individual PEs. The combination of the SpRecvCSctrl and the PE's ID (defined in PEXCHG) controls the PE's mux in the cluster switch. The SPRECV table specifies how the muxes are controlled. In SIMD operation the cluster switch routes data from the specified PE's output port to PE0's input port (which has been taken over by the SP), effectively receiving the specified PE's source register into the SP's target register. See table key in PEXCHG.

2x2 Cluster Switch Diagram.

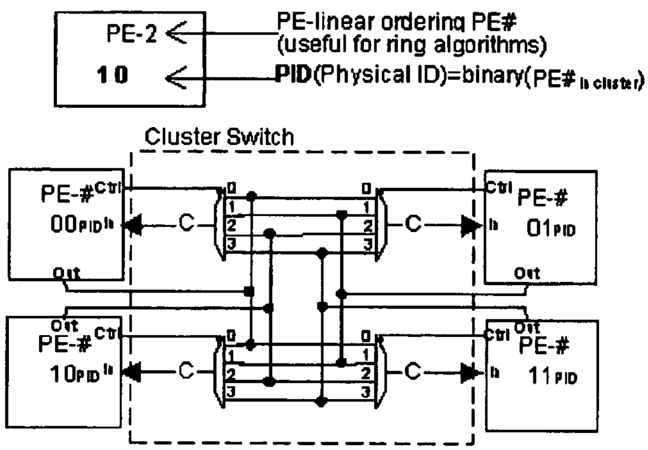

C is the internal data path within a Cluster

Syntax/Operation

| Instruction | Operands | Operation | ACF |
|---|---|---|---|
| SPRECV.PD.W | Rt, Rx, SpRecvCSctrl | Do operation below but do not affect ACFs | None |
| SPRECV[NZ].PD.W | Rt, Rx, SpRecvCSctrl | Ouput Port ←PE Rx<br>SP Rt ←PE0 Input Port | F0 |
| [TF].SPRECV.PD.W | Rt, Rx, SpRecvCSctrl | Do operation only if T/F condition is satisfied in F0. | None |

Arithmetic Flags Affected

N = MSB of result
Z = 1 if result is zero, 0 otherwise
V = Not Affected
C = Not Affected

Cycles: 1

| SPRECV Operation for a 1x1 Configuration: Target PE← | 0 | |
|---|---|---|
| SpRecvCSctrl | Src PE | Mux ctrl |
| 1x1_PE0 | 0 | C,0 |

SPRECV Operations for a 1x2 Configuration:

| Target PE← | 0 | |
|---|---|---|
| SpRecvCSctrl | Src PE | Mux ctrl |
| 1x2_PE0 | 0 | C,0 |
| 1x2_PE1 | 1 | C,1 |

SPRECV Operations for a 2x2 Configuration:
| Target PE← | 0 | |
|---|---|---|
| SpRecvCSctrl | Src PE | Mux ctrl |
| 2x2_PE0 | 0 | C,0 |
| 2x2_PE1 | 1 | C,1 |
| 2x2_PE2 | 2 | C,2 |
| 2x2_PE3 | 3 | C,3 |
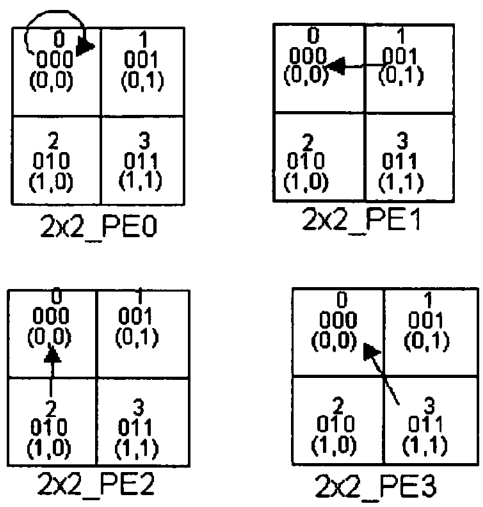
Illustrations of the 2x2 SPRECV Operations in a 2x2 Array.

SPSEND - SP Send

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rt | | | | | Rx | | | | | SpSendCSctrl | | | | | | | | CE3 | | |

Description

The target register of each PE controlled by an SP receives the SP source register. No output port is made available except for SP/PE0, which makes available the SP's register Rx.

Syntax/Operation

| Instruction | Operands | Operation | ACF |
|---|---|---|---|
| | | | 1x1 |
| SPSEND.PD.W | Rt, Rx, 1x1 | Do operation below but do not affect ACFs | None |
| SPSEND[NZ].PD.W | Rt, Rx, 1x1 | PE0 Rt ←SP Rx | F0 |
| [TF].SPSEND.PD.W | Rt, Rx, 1x1 | Do operation only if T/F condition is satisfied in F0. | None |
| | | | 1x2 |
| SPSEND.PD.W | Rt, Rx, 1x2 | Do operation below but do not affect ACFs | None |
| SPSEND[NZ].PD.W | Rt, Rx, 1x2 | PE0 Rt ←SP Rx<br>PE1 Rt ←SP Rx | F0 |
| [TF].SPSEND.PD.W | Rt, Rx, 1x2 | Do operation only if T/F condition is satisfied in F0. | None |
| | | | 2x2 |
| SPSEND.PD.W | Rt, Rx, 2x2 | Do operation below but do not affect ACFs | None |
| SPSEND[NZ].PD.W | Rt, Rx, 2x2 | PE0 Rt ←SP Rx<br>PE1 Rt ←SP Rx<br>PE2 Rt ←SP Rx<br>PE3 Rt ←SP Rx | F0 |
| [TF].SPSEND.PD.W | Rt, Rx, 2x2 | Do operation only if T/F condition is satisfied in F0. | None |

Arithmetic Scalar Flags Affected

C = Not Affected
N = MSB of result
V = Not Affected
Z = 1 if a zero result is generated, 0 otherwise

Cycles: 1

UNPACK - Unpack Data Elements

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rte | | | | 0 | Rx | | | | | 0 | 0 | 0 | 0 | 0 | UnpackExt | | | 0 | CE2 | |

Description

Data elements are converted to the next higher data type (i.e. bytes are promoted to halfwords, halfwords are promoted to words). For signed conversion (.X), the upper half of the new data element is filled with the most significant bit (sign bit) of the data element being unpacked. For unsigned conversion (.Z), the upper half of the new data element is filled with zero bits.

UNPACK.[SP]D.2H.[XZ] Rte, Rx

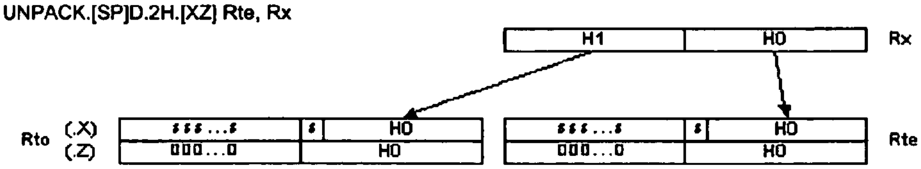

UNPACK.[SP]D.4B.[XZ] Rte, Rx

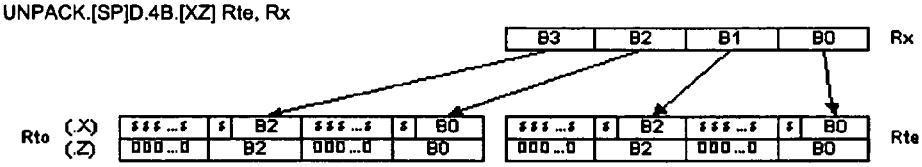

Syntax/Operation

| Syntax | Operands | Operation | ACF |
|---|---|---|---|
| | | Dual Signed Halfwords | |
| UNPACK.[SP]D.2H.X | Rte, Rx | Rto.H1 ←Sign-extend from Rx.H1<br>Rto.H0 ←Rx.H1<br>Rte.H1 ←Sign-extend from Rx.H0<br>Rte.H0 ←Rx.H0 | None |
| [TF].UNPACK.[SP]D.2H.X | Rte, Rx | Do operation only if T/F condition is satisfied in F0 | None |
| | | Dual Unsigned Halfwords | |
| UNPACK.[SP]D.2H.Z | Rte, Rx | Rto.H1 ←0x0000<br>Rto.H0 ←Rx.H1<br>Rte.H1 ←0x0000<br>Rte.H0 ←Rx.H0 | None |
| [TF].UNPACK.[SP]D.2H.Z | Rte, Rx | Do operation only if T/F condition is satisfied in F0 | None |
| | | Quad Signed Bytes | |
| UNPACK.[SP]D.4B.X | Rte, Rx | Rto.B3 ←Sign-extend from Rx.B3<br>Rto.B2 ←Rx.B3<br>Rto.B1 ←Sign-extend from Rx.B2<br>Rto.B0 ←Rx.B2<br>Rte.B3 ←Sign-extend from Rx.B1<br>Rte.B2 ←Rx.B1<br>Rte.B1 ←Sign-extend from Rx.B0<br>Rte.B0 ←Rx.B0 | None |
| [TF].UNPACK.[SP]D.4B.X | Rte, Rx | Do operation only if T/F condition is satisfied in F0 | None |
| | | Quad Unsigned Bytes | |
| UNPACK.[SP]D.4B.Z | Rte, Rx | Rto.B3 ←0x00<br>Rto.B2 ←Rx.B3<br>Rto.B1 ←0x00<br>Rto.B0 ←Rx.B2<br>Rte.B3 ←0x00<br>Rte.B2 ←Rx.B1<br>Rte.B1 ←0x00<br>Rte.B0 ←Rx.B0 | None |
| [TF].UNPACK.[SP]D.4B.Z | Rte, Rx | Do operation only if T/F condition is satisfied in F0 | None |

Arithmetic Scalar Flags Affected

C = Not Affected

N = Not Affected

V = Not Affected
Z = Not Affected

Cycles: 1

---

XSCAN - Scan Extended precision register for MSB

BOPS, Inc. Manta SYSSIM 2.31

Encoding

| 31 30 | 29 | 28 27 | 26 25 24 23 22 21 | 20 19 18 17 16 | 15 14 13 12 | 11 | 10 | 9 | 8 | 7 | 6 | 5 4 3 | 2 | 1 0 |
|---|---|---|---|---|---|---|---|---|---|---|---|---|---|---|
| Group | S/P | Unit | DSUopcode | Rt | Rxe | 0 | 0 | 0 | 0 | 0 | 0 | XscanExt | 0 | CE2 |

Description

XSCAN searches extension register XPR (from most significant bit to least significant bit) for the most significant bit of signed or unsigned data. The scan operates on a single 16-bit extension register (XPR.H1 or XPR.H0) or a pair of 8-bit extension registers (XPR.B0, XPR.B1, XPR.B2 or XPR.B3). The XPR byte or halfword scanned is dependent on the source compute register *Rxe* as described in Extended Precision Accumulation Operations.

For signed scan operations if the sign bit of the XPR is '0', XSCAN searches for the most significant '1' but if the sign bit of the XPR is '1', XSCAN searches for the most significant '0'. If XSCAN does not find any significant bits and the sign bit of the XPR is equal to the sign bit of the source compute register (either *Rxo||Rxe*, or individual *Rxo* or *Rxe*) then zero is written to the appropriate byte of *Rt*. If XSCAN does not find any significant bits and the sign bit of the XPR is not equal to the sign bit of the source compute register then 1 is written to the appropriate byte of *Rt*. If XSCAN finds a significant bit then that bit position plus 2 is written to the appropriate byte of *Rt*.

For unsigned scan operations if no significant '1' bits are found then zero is written to the appropriate byte of *Rt*. Otherwise the bit position plus 1 of the most significant '1' bit is placed into the appropriate byte of *Rt*.

For single halfword scan operation (1[SU]H), the result is written to *Rt.B0*.

For dual byte scan operation (2[SU]B), the result of the operation associated with *XPR.Be* is written to *Rt.B1*. The result of the operation associated with *XPR.Bo* is written to *Rt.B2*. The larger of the two values in *Rt.B2* and *Rt.B1* is written to *Rt.B0*.

Syntax/Operation

| Instruction | Operands | Operation | ACF |
|---|---|---|---|
| | | | Halfword |
| XSCAN.[SP]D.1SH | Rt, Rxe | if ((MSB not found in XPR.Hx) AND (sign(XPR.Hx) == sign(Rxo\|\|Rxe)) Rt.B0 ←0<br>if ((MSB not found in XPR.Hx) AND (sign(XPR.Hx) != sign(Rxo\|\|Rxe)) Rt.B0 ←1<br>if (MSB found in XPR.Hx) Rt.B0 ←bit position + 2 of first significant bit found in XPR.Hx while scanning from MSB to LSB. | None |
| XSCAN.[SP]D.1UH | Rt, Rxe | if (MSB not found in XPR.Hx) Rt.B0 ←0<br>if (MSB found in XPR.Hx) Rt.B0 ←bit position + 1 of first significant bit found in XPR.XHx while scanning from MSB to LSB. | None |
| [TF].XSCAN.[SP]D.1[SU]H | Rt, Rxe | Do operation only if T/F condition is satisfied in ACFs | None |
| | | | Dual Bytes |
| XSCAN.[SP]D.2SB | Rt, Rxe | if ((MSB not found in XPR.Bo) AND (sign(XPR.Bo) == sign(Rxo\|\|Rxe))) Rt.B2 ←0<br>if ((MSB not found in XPR.Be) AND (sign(XPR.Be) == sign(Rxo\|\|Rxe))) Rt.B1 ←0<br>if ((MSB not found in XPR.Bo) AND (sign(XPR.Bo) != sign(Rxo\|\|Rxe))) Rt.B2 ←1<br>if ((MSB not found in XPR.Be) AND (sign(XPR.Be) != sign(Rxo\|\|Rxe))) Rt.B1 ←1<br>if (MSB found in XPR.Bo) Rt.B2 ←bit position + 2 of first significant bit found in XPR while scanning from MSB to LSB.<br>if (MSB found in XPR.Be) Rt.B1 ←bit position + 2 of first significant bit found in XPR while scanning from MSB to LSB.<br>Rt.B0 ←max(Rt.B2, Rt.B1) | None |
| XSCAN.[SP]D.2UB | Rt, Rxe | if (MSB not found in XPR.Bo) Rt.B2 ←0<br>if (MSB not found in XPR.Be) Rt.B1 ←0<br>if (MSB found in XPR.Be) Rt.B2 ←bit position + 1 of first significant bit found in XPR while scanning from MSB to LSB.<br>if (MSB found in XPR.Bo) Rt.B1 ←bit position + 1 of first significant bit found in XPR while scanning from MSB to LSB.<br>Rt.B0 ←max(Rt.B2, Rt.B1) | None |
| [TF].XSCAN.[SP]D.2[SU]B | Rt, Rxe | Do operation only if T/F condition is satisfied in ACFs | None |

Arithmetic Scalar Flags Affected (on least significant operation)

C = Not affected
N = Not affected
V = Not affected
Z = 1 if no significant bits are found, 0 otherwise

Cycles: 1

XSHR - Extended Shift Right

BOPS, Inc. Manta SYSSIM 2.31

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | DSUopcode | | | | | | Rte | | | | | 0 | 0 | 0 | 0 | 0 | 0 | Ry | | | | | XshrExt | | | 0 | CE2 |

Description

XSHR is used to shift extended precision 40-bit data. For dual 40-bit data, each shift operates on an 8-bit extension register (XPR.B3, XPR.B2, XPR.B1 or XPR.B0) concatenated with compute register *Rto* or *Rte*. The XPR byte or halfword used is dependent on the target register *Rte* as described in Extended Precision Accumulation Operations.

The shift amount is specified in bits 5-0 of Ry.B0. Valid shift values are 0-63. For signed (arithmetic) shifts, vacated bit positions are filled with the value of the most significant bit of the XPR byte or halfword used. For unsigned (logical) shifts, vacated bit positions are filled with zeroes.

Syntax/Operation

| Instruction | Operands | Operation | ACF |
|---|---|---|---|
| | | | Dual Words |
| XSHR.[SP]D.2[SU]W | Rte, Ry | XPR.Bo‖Rto ←(XPR.Bo‖Rto >>= Ry.B0)<br>XPR.Be‖Rte ←(XPR.Be‖Rte >>= Ry.B0) | None |
| [TF].XSHR.[SP]D.2[SU]W | Rte, Ry | Do operation only if T/F condition is satisfied in ACFs | None |

Arithmetic Flags Affected (on least significant operation)

C = 0 if Ry.B0 is 0, or the value of last bit shifted out of source register
N = MSB of combined XPR/CR
V = 0
Z = 1 if a zero result is generated in combined XPR/CR, 0 otherwise

Cycles: 1

Instruction Field Definitions

BOPS, Inc. Manta SYSSIM 2.31

| Name | Bits | Description / Values | |
|---|---|---|---|
| **ALU**<br>BACK | **1** | **ALU Instruction Slot** (Used by LV, SETV and XV instruction)<br>LV<br>0 = Enable ALU slot if LV loads a ALU instruction<br>1 = Disable ALU slot<br>SETV<br>0 = Disable ALU Slot<br>1 = Enable ALU Slot<br>XV<br>0 = Do not execute ALU slot<br>1 = Execute ALU slot | |
| **ALUopcode**<br>**MAUopcode**<br>BACK | **6** | **ALUopcode** (blank = Reserved)<br>000000 = ADD<br>000001<br>000010 = ADDI<br>000011<br>000100 = MEAN2 (R=TRUNC)<br>000101<br>000110 = MEAN2 (R=ROUND)<br>000111<br>001000 = SUB<br>001001<br>001010 = SUBI<br>001011<br>001100 = CMPcc<br>001101<br>001110 = CMPIcc<br>001111<br>010000 = ADDS (unsigned)<br>010001 = ADDS (signed)<br>010010<br>010011<br>010100<br>010101 = ABS (signed)<br>010110 = ABSDIF (unsigned)<br>010111 = ABSDIF (signed)<br>011000 = SUBS (unsigned)<br>011001 = SUBS (signed)<br>011010<br>011011 = FBFLY<br>011100 = BFLYS (unsigned)<br>011101 = BFLYS (signed)<br>011110 = BFLYD2 (unsigned)<br>011111 = BFLYD2 (signed)<br>100000 = AND<br>100001<br>100010 = NOT<br>100011<br>100100 = OR<br>100101<br>100110= XOR<br>100111<br>101000 = CNTMSK<br>101001<br>101010<br>101011<br>101100 = MIN (unsigned)<br>101101 = MIN (signed)<br>101110 = MAX (unsigned)<br>101111 = MAX (signed)<br>110000<br>110001<br>110010<br>110011<br>110100<br>110101<br>110110 | **MAUopcode** (blank = Reserved)<br>000000 = ADD<br>000001<br>000010 = ADDI<br>000011<br>000100 = MEAN2 (R=TRUNC)<br>000101<br>000110 = MEAN2 (R=ROUND)<br>000111<br>001000 = SUB<br>001001<br>001010 = SUBI<br>001011<br>001100 = MEAN4<br>001101<br>001110<br>001111<br>010000 = ADDS (unsigned)<br>010001 = ADDS (signed)<br>010010 = SUM4ADD (unsigned)<br>010011 = SUM4ADD (signed)<br>010100 = SUM8ADD (unsigned)<br>010101 = SUM8ADD (signed)<br>010110<br>010111<br>011000 = SUBS (unsigned)<br>011001 = SUBS (signed)<br>011010<br>011011<br>011100 = BFLYS (unsigned)<br>011101 = BFLYS (signed)<br>011110 = BFLYD2 (unsigned)<br>011111 = BFLYD2 (signed)<br>100000 = MPYH (unsigned)<br>100001 = MPYH (signed)<br>100010 = MPYL (unsigned)<br>100011 = MPYL (signed)<br>100100 = MPY (unsigned)<br>100101 = MPY (signed)<br>100110 = MPYD2 (unsigned)<br>100111 = MPYD2 (signed)<br>101000 = MPYA (unsigned)<br>101001 = MPYA (signed)<br>101010 = MPYXA (unsigned)<br>101011 = MPYXA (signed)<br>101100<br>101101<br>101110<br>101111<br>110000<br>110001 = MPYCX<br>110010<br>110011 = MPYCXJ<br>110100<br>110101 = MPYCXD2<br>110110 |

| | | | |
|---|---|---|---|
| | | 110111<br>111000 = FADD<br>111001<br>111010<br>111011<br>111100 = FSUB<br>111101<br>111110 = FCMPcc<br>111111 | 110111 = MPYCXJD2<br>111000 = SUM2P (unsigned)<br>111001 = SUM2P (signed)<br>111010 = SUM2PA (unsigned)<br>111011 = SUM2PA (signed)<br>111100<br>111101<br>111110 = FMPY<br>111111 = FMPYSV |
| **Amode**<br>BACK | 3 | **Addressing Mode**<br>000 = Immediate<br>001 = Load Address<br>010 = Base + Displacement<br>011 = Direct<br>100 = Indexed<br>101 = Indirect<br>110 = SPR<br>111 = Reserved | |
| **Ae**<br>BACK | 2 | **Even Address Register**<br>00 = A0<br>01 = A2<br>10 = A4<br>11 = A6 | |
| **An**<br>**Az**<br>BACK | 3 | **Address Register**<br>000 = A0<br>001 = A1<br>010 = A2<br>...<br>111 = A7 | |
| **Ao**<br>BACK | 2 | **Odd Address Register**<br>00 = A1<br>01 = A3<br>10 = A5<br>11 = A7 | |
| **At**<br>BACK | 6 | **Address Register**<br>100000 = A0<br>100001 = A1<br>100010 = A2<br>...<br>100111 = A7 | |
| **AtMRt**<br>BACK | 6 | **Any register, except a Compute Register**<br>See the SP/PE Register Address Maps for the valid non-compute registers. | |
| **At/Mt**<br>BACK | 1 | **At/Mt flag**<br>0 = At<br>1 = Mt | |

| **Name** | **Bits** | **Description / Values** |
|---|---|---|
| **BitNum**<br>BACK | 5 | **Bit Number** (Used by DSU bit instructions to specify which bit to use in a register)<br>00000 = Bit 0<br>00001 = Bit 1<br>00010 = Bit 2<br>...<br>11111 = Bit 31 |
| **BitOpExt**<br>BACK | 4 | **Bit Operation Extension**<br>0000 = BL<br>0001 = BLN<br>0010 = BAND<br>0011 = BANDN<br>0100 = BOR<br>0101 = BORN<br>0110 = BXOR<br>0111 = BXORN<br>1000 = BSWAP<br>1001 = BS<br>1010 = Reserved<br>1011 = BNOT |

<table>
<tr><td></td><td></td><td>1100 = BCLR<br>1101 = Reserved<br>1110 = BSET<br>1111 = Reserved</td></tr>
<tr><td>Broadcast<br>BACK</td><td>1</td><td>Broadcast Load Flag<br>0 = Not a broadcast load<br>1 = This is a broadcast load</td></tr>
<tr><th>Name</th><th>Bits</th><th>Description / Values</th></tr>
<tr><td>CC</td><td>4</td><td>Condition Code (Valid for CMPcc and CMPIcc instructions)
<table>
<tr><th>Mnemonic</th><th>Value</th><th>Description</th><th>Arithmetic Scalar Flags</th></tr>
<tr><td>-</td><td>0000</td><td>Reserved</td><td>-</td></tr>
<tr><td>Z (EQ)</td><td>0001</td><td>Zero or Equal</td><td>Z=1</td></tr>
<tr><td>NZ (NE)</td><td>0010</td><td>Not Zero or Not Equal</td><td>Z=0</td></tr>
<tr><td>HI</td><td>0011</td><td>Higher (unsigned)</td><td>(C=1) && (Z=0)</td></tr>
<tr><td>HS (CS)</td><td>0100</td><td>Higher or Same (unsigned, or Carry Set)</td><td>C=1</td></tr>
<tr><td>LO (CC)</td><td>0101</td><td>Lower (unsigned, or Carry Clear)</td><td>C=0</td></tr>
<tr><td>LS</td><td>0110</td><td>Lower or Same (unsigned)</td><td>(C=0) || (Z=1)</td></tr>
<tr><td>VS</td><td>0111</td><td>Overflow Set</td><td>V=1</td></tr>
<tr><td>VC</td><td>1000</td><td>Overflow Clear</td><td>V=0</td></tr>
<tr><td>POS</td><td>1001</td><td>Positive</td><td>(N=0) && (Z=0)</td></tr>
<tr><td>NEG</td><td>1010</td><td>Negative</td><td>N=1</td></tr>
<tr><td>GE</td><td>1011</td><td>Greater-than or Equal (signed)</td><td>N=V</td></tr>
<tr><td>GT</td><td>1100</td><td>Greater-Than (signed)</td><td>(Z=0) && (N=V)</td></tr>
<tr><td>LE</td><td>1101</td><td>Less-than or Equal (signed)</td><td>(Z=1) || (N != V)</td></tr>
<tr><td>LT</td><td>1110</td><td>Less-Than (signed)</td><td>N != V</td></tr>
<tr><td>-</td><td>1111</td><td>Reserved</td><td>-</td></tr>
</table></td></tr>
<tr><td>CCombo<br>BACK</td><td>2</td><td>Condition Combination<br>00 = None<br>01 = AND<br>10 = OR<br>11 = XOR</td></tr>
<tr><td>CE1<br>BACK</td><td>1</td><td>Conditional Execution (T)<br>0 = Execute instruction. Do not affect Arithmetic Condition Flags<br>1 = Execute instruction if F0 = 1 (True). Do not affect Arithmetic Condition Flags</td></tr>
<tr><td>CE2<br>BACK</td><td>2</td><td>Conditional Execution (T,F)<br>00 = Execute instruction. Do not affect Arithmetic Condition Flags<br>01 = Execute instruction if F0 = 1 (True). Do not affect Arithmetic Condition Flags<br>10 = Execute instruction if F0 = 0 (False). Do not affect Arithmetic Condition Flags<br>11 = reserved</td></tr>
<tr><td>CE3<br>BACK</td><td>3</td><td>Conditional Execution (T,F,C,N,V,Z)<br>000 = Execute instruction. Do not affect Arithmetic Condition Flags<br>001 = Execute instruction if F0 = 1 (True). Do not affect Arithmetic Condition Flags<br>010 = Execute instruction if F0 = 0 (False). Do not affect Arithmetic Condition Flags<br>011 = Reserved<br>100 = Execute instruction. Update Arithmetic Condition Flag(s) with (C) Carry flag<br>101 = Execute instruction. Update Arithmetic Condition Flag(s) with (N) Sign flag<br>110 = Execute instruction. Update Arithmetic Condition Flag(s) with (V) Overflow flag<br>111 = Execute instruction. Update Arithmetic Condition Flag(s) with (Z) Zero flag</td></tr>
<tr><td>CntmskExt<br>BACK</td><td>3</td><td>Count 1-Bits with Mask Extension<br>000-001 = Reserved<br>010 = 1 Word (1W)<br>011-101 = Reserved<br>110 = 2 Words (2W)<br>111 = Reserved</td></tr>
</table>

| | | |
|---|---|---|
| **CntrsExt**<br>BACK | **3** | **Count Redundant Sign Bits Extension**<br>000-001 = Reserved<br>010 = 1 Word (1W)<br>011-111 = Reserved |
| **CnvrtExt**<br>BACK | **4** | **Convert Extension**<br>0000 = 1 W<br>0001 = Reserved<br>0010 = 1 H0<br>0011 = 1 H1<br>0100 = 1 B0<br>0101 = 1 B1<br>0110 = 1 B2<br>0111 = 1 B3<br>1000 = 2 W<br>1001 = Reserved<br>1010 = 2 H<br>1011 = Reserved<br>1100 = 2 B0<br>1101 = Reserved<br>1110 = 2 B2<br>1111 = Reserved |
| **CopyExt**<br>BACK | **5** | **Copy Extension**<br>00000 = Rt.W, Rx.W 10000 = Rt.B0, Rx.B0<br>00001 = Rt.D, Rx,D 10001 = Rt.B1, Rx.B1<br>00010 = Reserved 10010 = Rt.B2, Rx.B2<br>00011 = Reserved 10011 = Rt.B3, Rx.B3<br>00100 = Reserved 10100 = Rt.B0, Rx.B3<br>00101 = Reserved 10101 = Rt.B1, Rx.B0<br>00110 = Reserved 10110 = Rt.B2, Rx.B1<br>00111 = Reserved 10111 = Rt.B3, Rx.B2<br>01000 = Rt.H0, Rx.H0 11000 = Rt.B0, Rx.B2<br>01001 = Rt.H1, Rx.H1 11001 = Rt.B1, Rx.B3<br>01010 = Rt.H0, Rx.H1 11010 = Rt.B2, Rx.B0<br>01011 = Rt.H1, Rx.H0 11011 = Rt.B3, Rx.B1<br>01100 = Reserved 11100 = Rt.B0, Rx.B1<br>01101 = Reserved 11101 = Rt.B1, Rx.B2<br>01110 = Reserved 11110 = Rt.B2, Rx.B3<br>01111 = Reserved 11111 = Rt.B3, Rx.B0 |
| **CtrlAmode**<br>BACK | **2** | **Flow Control Addressing Mode**<br>00 = Reserved<br>01 = PC-Relative<br>10 = Direct<br>11 = Indirect |
| **CtrlCC** | **5** | **Flow Control Condition Code** (Valid for CALLxcc, JMPxcc and RETxcc instructions<br>Note: && means AND, \|\| means OR, ^ means XOR, != means NOT EQUAL TO |

| Mnemonic | Value | Description | Arithmetic Scalar Flags |
|---|---|---|---|
| blank | 00000 | Unconditionally execute | None |
| Z (EQ) | 00001 | Zero or Equal | Z=1 |
| NZ (NE) | 00010 | Not Zero or Not Equal | Z=0 |
| HI | 00011 | Higher (unsigned) | (C=1) && (Z=0) |
| HS (CS) | 00100 | Higher or Same (unsigned, or Carry Set) | C=1 |
| LO (CC) | 00101 | Lower (unsigned, or Carry Clear) | C=0 |
| LS | 00110 | Lower or Same (unsigned) | (C=0) \|\| (Z=1) |
| VS | 00111 | Overflow Set | V=1 |
| VC | 01000 | Overflow Clear | V=0 |
| POS | 01001 | Positive | (N=0) && (Z=0) |
| NEG | 01010 | Negative | N=1 |
| GE | 01011 | Greater-than or Equal (signed) | N=V |
| GT | 01100 | Greater-Than (signed) | (Z=0) && (N=V) |

<table>
<tr><td></td><td></td><td>LE</td><td>01101</td><td>Less-than or Equal (signed)</td><td>(Z=1) || (N != V)</td></tr>
<tr><td></td><td></td><td>LT</td><td>01110</td><td>Less-Than (signed)</td><td>N != V</td></tr>
<tr><td></td><td></td><td>F.op</td><td>10010</td><td>Do operation if F0 is false (0)</td><td>F0 = 0</td></tr>
<tr><td></td><td></td><td>T.op</td><td>10011</td><td>Do operation if F0 is true (1)</td><td>F0 = 1</td></tr>
<tr><td>CtrlOp<br>BACK</td><td>4</td><td colspan="4">Flow Control Operation<br>0000 = EPLOOP, EPLOOPI<br>0001 = RET<br>0010 = CALL<br>0011 = JMP<br>0100 = LV/SETV<br>0101 = XV<br>0110 = Reserved<br>0111 = Reserved<br>1000 = Reserved<br>1001 = RETI<br>1010 = SYSCALL<br>1011 = Reserved<br>1100 = Reserved<br>1101 = Reserved<br>1110 = NOP<br>1111 = SVC</td></tr>
<tr><td>Name</td><td>Bits</td><td colspan="4">Description / Values</td></tr>
<tr><td>Dec/Inc<br>BACK</td><td>1</td><td colspan="4">Decrement/Increment Flag - This flag is used in conjunction with the Pre/Post Flag to provide Pre-Decrement, Pre-Increment, Post-Decrement and Post-Increment update capability to an address register for a load or store operation.<br>0 = Decrement<br>1 = Increment</td></tr>
<tr><td>DivExt<br>BACK</td><td>3</td><td colspan="4">Divide Extension<br>000 = Reserved<br>001 = 2 Halfwords (2H)<br>010 = 1 Word (1W)<br>011-111 = Reserved</td></tr>
<tr><td>DPack<br>BACK</td><td>3</td><td colspan="4">Integer Data Packing<br>000 = 4 Bytes (4B)<br>001 = 2 Halfwords (2H)<br>010 = 1 Word (1W)<br>011 = Reserved<br>100 = 8 Bytes (8B)<br>101 = 4 Halfwords (4H)<br>110 = 2 Words (2W)<br>111 = 1 Doubleword (1D)</td></tr>
<tr><td>DSU<br>BACK</td><td>1</td><td colspan="4">DSU Instruction Slot (Used by LV, SETV and XV instruction)<br><u>LV</u><br>0 = Enable DSU slot if LV loads a DSU instruction<br>1 = Disable DSU slot<br><u>SETV</u><br>0 = Disable DSU Slot<br>1 = Enable DSU Slot<br><u>XV</u><br>0 = Do not execute DSU slot<br>1 = Execute DSU slot</td></tr>
<tr><td>DSUopcode<br>BACK</td><td>6</td><td colspan="4">DSU Opcodes (blank = Reserved)<br>000000 = BITOP<br>000001 = BITOPI<br>000010 =<br>000011 =<br>000100 = CNTRS (unsigned)<br>000101 = CNTRS (signed)<br>000110 = SCANL<br>000111 = SCANR<br>001000 = EXT (sign-extend)<br>001001 = EXTI (sign-extend)<br>001010 = EXTIL (sign-extend)<br>001011 = EXTIS (sign-extend)<br>001100 = EXT (zero-fill)<br>100000 = MIX<br>100001 = PERM<br>100010 = PACKH<br>100011 = PACKL<br>100100 = COPYS<br>100101 = UNPACK (sign-extend)<br>100110 = UNPACK (zero-fill)<br>100111 =<br>101000 = SPSEND<br>101001 = PEXCHG<br>101010 = SPRECV<br>101011 = INS<br>101100 = INSI</td></tr>
</table>

<table>
<tr><td></td><td></td><td><table>
<tr><td>001101 = EXTI (zero-fill)</td><td>101101 = INSIL</td></tr>
<tr><td>001110 = EXTIL (zero-fill)</td><td>101110 = INSIS (1D)</td></tr>
<tr><td>001111 = EXTIS (zero-fill)</td><td>101111 = INSIS (1W)</td></tr>
<tr><td>010000 = XSHL</td><td>110000 =</td></tr>
<tr><td>010001 = ROT</td><td>110001 =</td></tr>
<tr><td>010010 = ROTLI</td><td>110010 =</td></tr>
<tr><td>010011 = EXTIL (doubleword zero-fill)</td><td>110011 =</td></tr>
<tr><td>010100 = XSHR (unsigned)</td><td>110100 = XSCAN (unsigned)</td></tr>
<tr><td>010101 = XSHR (signed)</td><td>110101 = XSCAN (signed)</td></tr>
<tr><td>010110 = ROTRI</td><td>110110 =</td></tr>
<tr><td>010111 = PACKB</td><td>110111 =</td></tr>
<tr><td>011000 = SHL</td><td>111000 = FDIV</td></tr>
<tr><td>011001 = COPY</td><td>111001 = FRCP</td></tr>
<tr><td>011010 = SHLI</td><td>111010 = FSQRT</td></tr>
<tr><td>011011 = INSVLC</td><td>111011 = FRSQRT</td></tr>
<tr><td>011100 = SHR (unsigned)</td><td>111100 = ITOF (unsigned)</td></tr>
<tr><td>011101 = SHR (signed)</td><td>111101 = ITOF (signed)</td></tr>
<tr><td>011110 = SHRI (unsigned)</td><td>111110 = FTOI (unsigned)</td></tr>
<tr><td>011111 = SHRI (signed)</td><td>111111 = FTOI (signed)</td></tr>
</table></td></tr>
<tr><td>E/D<br>BACK</td><td>1</td><td>Enable/Disable Slots Flag (used by LV and SETV)<br>0 (LV) = Disable Slots (1's in SLAMD slot fields disable)<br>1 (SETV) = Enable and Disable Slots (1's in SLAMD slot fields enable, 0's in SLAMD slot fields disable)</td></tr>
<tr><td>Name</td><td>Bits</td><td>Description / Values</td></tr>
<tr><td>FCC</td><td>5</td><td>Floating-Point Condition Code (Valid for FCMPfcc instruction)<table>
<tr><th>Mnemonic</th><th>Value</th><th>Description</th></tr>
<tr><td>EQ</td><td>00000</td><td>Floating-point Equal</td></tr>
<tr><td>GE</td><td>00001</td><td>Floating-point Greater-than or Equal</td></tr>
<tr><td>GT</td><td>00010</td><td>Floating-point Greater-Than</td></tr>
<tr><td>LE</td><td>00011</td><td>Floating-point Less-than or Equal</td></tr>
<tr><td>LT</td><td>00100</td><td>Floating-point Less-Than</td></tr>
<tr><td>NE</td><td>01000</td><td>Floating-point NOT Equal</td></tr>
</table></td></tr>
<tr><td>FdivExt<br>BACK</td><td>3</td><td>Floating-Point Divide Extension<br>000-001 = Reserved<br>010 = 1 Word (1W)<br>011-111 = Reserved</td></tr>
<tr><td>FPack<br>BACK</td><td>3</td><td>Floating-Point Data Packing<br>000-001 = Reserved<br>010 = 1 Word (1FW)<br>011 = 2 Word (2FW) (used by Fadd, Fmpy, Fmpysv, Fbfly)<br>100-111 = Reserved</td></tr>
<tr><td>FsqrtExt<br>BACK</td><td>3</td><td>Floating-Point Square-Root Extension<br>000-001 = Reserved<br>010 = 1 Word (1FW)<br>011-111 = Reserved</td></tr>
<tr><td>Ft<br>BACK</td><td>3</td><td>Arithmetic Condition Flag<br>000 = F0<br>001 = F1<br>010 = F2<br>...<br>111 = F7</td></tr>
<tr><td>Group<br>BACK</td><td>2</td><td>Instruction Group<br>00 = Reserved<br>01 = Flow Control<br>10 = Load/Store (LU, SU)<br>11 = Arithmetic/Logical (ALU, MAU, DSU)</td></tr>
<tr><td>H<br>BACK</td><td>1</td><td>Upper/Lower Halfword of Register<br>0 = H0 Lower halfword<br>1 = H1 Upper halfword</td></tr>
<tr><td>Name</td><td>Bits</td><td>Description / Values</td></tr>
</table>

| | | |
|---|---|---|
| $I_8\ I_{5\text{-}0}$<br>BACK | 7 | **Signed (2's complement) value** - Used by CMPI instruction<br>-64 to +63 |
| IMM16<br>BACK | 16 | **Sign "neutral" value** - Used by LIM instruction<br>-32768 to +65535 |
| Imm/Reg<br>BACK | 1 | **Immediate/Register Value** - Used in Load/Store instructions<br>0 = Use UPDATE7 value<br>1 = Use Rz register value |
| InstrCnt<br>BACK | 4 | **Instruction Count** - Used in LV instruction to specify the number of instructions to load<br>0xxx = 0 instructions to load<br>1000 = Reserved<br>1001 = 1 instruction to load<br>1010 = 2 instructions to load<br>1011 = 3 instructions to load<br>1100 = 4 instructions to load<br>1101 = 5 instructions to load<br>1110 = Reserved<br>1111 = Reserved |
| **Name** | **Bits** | **Description / Values** |
| LCF<br>BACK | 1 | **Loop Count Flag**<br>0 = No loop count specified<br>1 = LoopCnt field contains loop count |
| BPID<br>BACK | 2 | **Loop Control Register Select**<br>0 = Use IEP0R0, IEP0R1, IEP0R2<br>1 = Use IEP1R0, IEP1R1, IEP1R2<br>2 = Use IEP2R0, IEP2R1, IEP2R2<br>3 = Use IEP3R0, IEP3R1, IEP3R2 |
| LOC<br>BACK | 2 | **Location for LIM Instruction**<br>00 = Load H1, do not affect H0<br>01 = Load H0, do not affect H1<br>10 = Load H0, H1 = 0x0000<br>11 = Load H0, H1 = 0xFFFF |
| LogicExt<br>BACK | 3 | **Logic Opcode Extension**<br>000-001 = Reserved<br>010 = 1 Word (1W)<br>011-110 = Reserved<br>111 = 1 Doubleword (1D) |
| LoopCnt<br>BACK | 10 | **Loop Count** - Unsigned number specifying the number of times to execute an eploop<br>0-1023 |
| L/S<br>BACK | 1 | **Load / Store Flag**<br>0 = Load instruction<br>1 = Store instruction |
| LSDISP13<br>BACK | 13 | **Signed Displacement (in bytes)**<br>-8192 to +8191 bytes (-2048 to +2047 words) |
| LU<br>BACK | 1 | **LU Instruction Slot** (Used by LV, SETV and XV instruction)<br>LV<br>0 = Enable LU slot if LV loads a LU instruction<br>1 = Disable LU slot<br>SETV<br>0 = Disable LU Slot<br>1 = Enable LU Slot<br>XV<br>0 = Do not execute LU slot<br>1 = Execute LU slot |
| **Name** | **Bits** | **Description / Values** |
| M4Ext<br>BACK | 2 | **Mean of 4 Elements Extension**<br>00 = 4 Bytes (4B)<br>01-11 = Reserved |
| MAU<br>BACK | 1 | **MAU Instruction Slot** (Used by LV, SETV and XV instruction)<br>LV<br>0 = Enable MAU slot if LV loads a MAU instruction<br>1 = Disable MAU slot |

<table>
<tr><td></td><td></td><td><u>SETV</u><br>0 = Disable MAU Slot<br>1 = Enable MAU Slot<br><u>XV</u><br>0 = Do not execute MAU slot<br>1 = Execute MAU slot</td></tr>
<tr><td>ME<br>BACK</td><td>3</td><td>Multiply-Complex Opcode Extension<br>000 = Reserved<br>001 = Reserved<br>010 = Reserved<br>011 = Round<br>100 = Reserved<br>101 = Reserved<br>110-111 = Reserved<br><br>The combination of the MAUopcode field and the ME field define the Multiply-Complex instruction opcode:<br>
<table>
<tr><td colspan="2">MAUopcode</td><td>110001</td><td>110011</td><td>110101</td><td>110111</td></tr>
<tr><td rowspan="4">ME</td><td>001</td><td>Reserved</td><td>Reserved</td><td></td><td></td></tr>
<tr><td></td><td></td><td></td><td></td><td></td></tr>
<tr><td>010</td><td>Reserved</td><td></td><td></td><td></td></tr>
<tr><td>Reserved</td><td></td><td></td><td></td><td></td></tr>
<tr><td>011</td><td>MPYCX</td><td>MPYCXJ</td><td>MPYCXD2</td><td>MPYCXJD2</td><td></td></tr>
<tr><td>101</td><td>Reserved</td><td></td><td></td><td></td><td></td></tr>
<tr><td>Reserved</td><td></td><td></td><td></td><td></td><td></td></tr>
</table></td></tr>
<tr><td>MixExt<br>BACK</td><td>3</td><td>Mix Extension<br>000-011 = Reserved<br>100 = 8 Bytes (8B)<br>101 = 4 Halfwords (4H)<br>110-111 = Reserved</td></tr>
<tr><td>Mod/Long<br>BACK</td><td>1</td><td>Modulo / Long Indexing Flag<br>0 = Long<br>1 = Modulo</td></tr>
<tr><td>MPack<br>BACK</td><td>3</td><td>Multiply Data Packing<br>000 = Reserved<br>001 = 2 Halfwords (2H)<br>010 = 1 Word (1W)<br>011 = Reserved<br>100 = Reserved<br>101 = 4 Halfwords (4H) for MPYH and MPYL<br>110 = Reserved<br>111 = Reserved</td></tr>
<tr><td>Mt<br>BACK</td><td>3</td><td>Control-Flow Address Registers<br>This register contains addresses used in flow control instructions, and interrupts.<br><u>SP</u><br>100 = Reserved<br>101 = ULR User Link Register<br>110 = DBGILR Debug Interrupt Link Register<br>111 = GPILR General-Purpose Interrupt Link Register<br><u>PE</u><br>000 = Reserved<br>001 = Reserved<br>...<br>111 = Reserved</td></tr>
<tr><td>NBits<br>BACK</td><td>5</td><td>Number of Bits (Used by Rotate Immediate and Shift Immediate instructions to specify the number of bits (1-32) to shift or rotate.<br>00000 = 32<br>00001 = 1<br>00010 = 2<br>...<br>11111 = 31</td></tr>
</table>

| | | |
|---|---|---|
| **NoTLU**<br>BACK | 2 | **Number of Table Look-Ups** (Used by LTBL, LBRTBL, STBL)<br>00 = 1 Table Look-Up (access a single operand at a 32-bit address)<br>01 = 2 Table Look-Ups (accesses 2 operands, each at a 16-bit address)<br>10 = 4 Table Look-Ups (accesses 4 operands, each at an 8-bit address)<br>11 = Reserved |
| **N1, N0**<br>BACK | 1 | **Byte positions** (Used by PACK4B) |
| **Name** | **Bits** | **Description / Values** |
| **PackExt**<br>BACK | 3 | **Pack Data Extension**<br>000-011 = Reserved<br>100 = 8 Bytes (8B)<br>101 = 4 Halfwords (4H)<br>110-111 = Reserved |
| **PackbExt**<br>BACK | 3 | **Pack 4 Bytes into 1 Word Extension**<br>000 = B0<br>001 = B1<br>010 = B2<br>011 = B3<br>100-111 = Reserved |
| **PeXchgCSctrl**<br>BACK | 8 | **PE-Exchange Cluster Switch Control**<br>00000000 = 2x2_PE0<br>00000001 = 2x2_PE1<br>00000010 = 2x2_PE2<br>00000011 = 2x2_PE3<br>00000100 = 2x2_RING1F<br>00000101 = 2x2_RING1R<br>00000110 = 2x2_RING2F<br>00000111 = 2x2_RING2R<br>00001000 = 2x2_SWP0<br>00001001 = 2x2_SWP1<br>00001010 = 2x2_SWP2<br>00001011 = TRANSPOSE<br>00001100 = DIAGONAL<br>00001101 = SELF<br>00001110-00011101 = Reserved<br>00011110 = 1x2_PE0<br>00011111 = 1x2_PE1<br>00100000 = 1x2_SWAP0<br>00100001-11111111 = Reserved |
| **PermExt**<br>BACK | 3 | **Permute Extension**<br>000 = 4 Bytes (4B)<br>001-011 = Reserved<br>100 = 8 Bytes (8B)<br>101-111 = Reserved |
| **PreDec/PostInc**<br>BACK | 1 | **Pre-Decrement / Post-Increment Flag** - This flag specifies the update to an address register for a load or store operation.<br>0 = Pre-Decrement<br>1 = Post-Increment |
| **Pre/Post**<br>BACK | 1 | **Pre/Post Update Flag** - This flag is used in conjunction with the Dec/Inc Flag to provide Pre-Decrement, Pre-Increment, Post-Decrement and Post-Increment update capability to an address register for a load or store operation.<br>0 = Pre-update<br>1 = Post-update |
| **RM**<br>BACK | 2 | **Rounding Mode** (Used in FTOI instructions)<br>00 = TRUNC Round towards zero<br>01 = CEIL Round towards positive infinity<br>10 = FLOOR Round towards negative infinity<br>11 = ROUND Round to the nearest integer |
| **RM1**<br>BACK | 1 | **Rounding Mode** (Used in MEAN4 instruction)<br>0 = TRUNC Round towards zero<br>1 = ROUND Round to the nearest integer |
| **$Rs_{5-0}$**<br>**$Rs_5$ $Rs_{4-0}$**<br>**Rt..** | 6 | **Any Register File Register**<br>See the SP/PE Register Address Maps for all valid registers. |

| | | |
|---|---|---|
| $Rt_5$ $Rt_{4-0}$<br>$Rx_5$ $Rx_{4-0}$<br><br>BACK | | |
| **Rt**<br>**Rx**<br>**Ry**<br>**Rz**<br>BACK | 5 | **Compute Register**<br>00000 = R0<br>00001 = R1<br>00010 = R2<br>...<br>11111 = R31 |
| **Rte**<br>**Rxe**<br>**Rye**<br>BACK | 4 | **Even Compute Register**<br>0000 = R0<br>0001 = R2<br>0010 = R4<br>...<br>1111 = R30 |
| **Rz/Az**<br>BACK | 1 | **Rz/Az flag**<br>0 = Rz<br>1 = Az |
| **Name** | **Bits** | **Description / Values** |
| **Scale**<br>BACK | 1 | **Scale Load/Store Update Value Flag**<br>0 = Do not scale the update value<br>1 = Scale the update value by the operand size as follows:<br>Byte = No scale<br>Halfword = Scale by 2<br>Word = Scale by 4<br>Doubleword = Scale by 8 |
| **ScanExt**<br>BACK | 3 | **Scan Extension**<br>000-001 = Reserved<br>010 = 1 Word (1W)<br>011-111 = Reserved |
| **SD**<br>BACK | 1 | **Single/Dual Operation**<br>0 = Single operation<br>1 = Dual operation |
| **UDISP10**<br>BACK | 10 | **PC-Relative Unsigned Displacement (in halfwords)**<br>0 to 1024 halfwords (0 to 512 words) |
| **SDISP13**<br>BACK | 13 | **PC-Relative Signed Displacement (in halfwords)**<br>-4096 to +4095 halfwords (-2048 to +2047 words) |
| **SDISP16**<br>BACK | 16 | **PC-Relative Signed Displacement** (in halfwords)<br>-32768 to +32767 halfwords (-16384 to +16383 words) |
| **SignExt**<br>BACK | 1 | **Sign Extend Flag**<br>0 = Do not sign extend value (upper bits are unaffected)<br>1 = Sign extend value (upper bits are filled with MSB of halfword or byte) |
| **SIMM6**<br>BACK | 6 | **Signed Immediate Value** - Used by CMPI instruction<br>-32 to +31 |
| **SIZE** | 2 | **Data Size** (of value being loaded or stored) Note: != means NOT EQUAL TO<br><br>$Rt_{5-0}$ = (R0-R31):<br>00 = Word<br>01 = Doubleword<br>10 = Halfword (H0)<br>11 = Byte (B0)<br><br>$Rt_{5-0}$ != (R0-R31):<br>00 = Word<br>01 = High Halfword (H1)<br>10 = Low Halfword (H0)<br>11 = Reserved (for Byte (B0)) |
| **S/P**<br>BACK | 1 | **SP/PE Select**<br>0 = SP<br>1 = PE |
| **SPRADDR**<br>BACK | 10 | **Special-Purpose Register Address**<br>Contains address of SPR to load from or store to (LSPR and SSPR instructions). Consult your hardware configuration for the list of valid SPR's for your configuration. |
| **SpRecvCSctrl**<br>BACK | 8 | **SP-Receive Cluster Switch Control**<br>00000000 = 2x2_PE0<br>00000001 = 2x2_PE1 |

| | | |
|---|---|---|
| | | 00000010 = 2x2_PE2<br>00000011 = 2x2_PE3<br>00000100-00001010 = Reserved<br>00001100 = 1x1_PE0<br>00001101 = 1x2_PE0<br>00001110 = 1x2_PE1<br>00001111-11111111 = Reserved |
| **SpSendCSctrl**<br>BACK | 8 | **SP-Send Cluster Switch Control**<br>00000000 = 2x2<br>00000001 = Reserved<br>00000010 = 1x1<br>00000011 = 1x2<br>00000100-11111111 = Reserved |
| **SR**<br>BACK | 1 | **Scale Result Value** (used by FTOI and ITOF)<br>0 = Do not scale the result value<br>1 = Scale the result value by the operand size |
| **SU**<br>BACK | 1 | **SU Instruction Slot** (Used by LV, SETV and XV instruction)<br><u>LV</u><br>0 = Enable SU slot if LV loads a SU instruction<br>1 = Disable SU slot<br><u>SETV</u><br>0 = Disable SU Slot<br>1 = Enable SU Slot<br><u>XV</u><br>0 = Do not execute SU slot<br>1 = Execute SU slot |
| **Sum4Ext**<br>BACK | 3 | **Sum 4 Add Extension**<br>000 = 4 Bytes (4B)<br>001-011 = Reserved<br>100 = Dual 4 Bytes (8B)<br>101 = 4 Halfwords (4H)<br>110-111 = Reserved |
| **Sum8Ext**<br>BACK | 3 | **Sum 8 Add Extension**<br>000-011 = Reserved<br>100 = 8 Bytes (8B)<br>101-111 = Reserved |
| **SumpExt**<br>BACK | 3 | **Sum of Products Extension**<br>000 = Reserved<br>001 = 2 Halfwords (2H)<br>010-100 = Reserved<br>101 = 4 Halfwords (4H)<br>110-111 = Reserved |
| **SvcOp**<br>BACK | 8 | **SVC Operation**<br>0x00 = NOP<br>0x01 = SVC_HALT<br>0x02 = SVC_PRINTF<br>0x03 = SVC_GET_MAPPED_FILE_SIZE<br>0x04 = SVC_GET_MAPPED_FILE_FLAGS<br>0x05 = SVC_DUMP_MACHINE_STATE<br>0x06 = SVC_DUMP_STATISTICS<br>0x07 = SVC_ERROR_HALT<br>0x08 = SVC_GET_CYCLE_COUNT<br>0x09 = SVC_GET_INSTRUCTION_COUNT<br>0x0A = SVC_GET_BOPS_COUNT<br>0x0B = SVC_DUMP_MEMORY_STATE<br>0x0C = SVC_DUMP_REGISTER_STATE<br>0x0D = SVC_DUMP_VIM_STATE<br>0x0E-0xFF = Reserved |
| **Name** | **Bits** | **Description / Values** |
| **UADDR16**<br>BACK | 16 | **Direct Address**<br>0x0000 to 0xFFFF |
| **UAF**<br>BACK | 2 | **Unit Affecting Flags**<br>00 = ALU<br>01 = MAU<br>10 = DSU |

| | | |
|---|---|---|
| | | 11 = None |
| UIMM5<br>BACK | 5 | **Unsigned 5-bit Value (1-32)**<br>00001 = 1<br>00010 = 2<br>...<br>11111 = 31<br>00000 = 32 |
| Unit<br>BACK | 2 | **Arithmetic Execution Unit**<br>00 = ALU<br>01 = MAU<br>10 = DSU<br>11 = Reserved |
| UnpackExt<br>BACK | 3 | **Unpack Data Elements Extension**<br>000 = 4 Bytes (4B)<br>001 = 2 Halfwords (2H)<br>010-111 = Reserved |
| UpdtAn<br>BACK | 1 | **Update An Register Flag**<br>0 = Do not update An register<br>1 = Update An register |
| UPDATE7<br>BACK | 7 | **Update Value** - Unsigned value used in updating the address register in Load/Store instructions<br>0-127 |
| Vb<br>BACK | 1 | **VIM Base Register Select**<br>0 = V0<br>1 = V1 |
| Vector<br>BACK | 5 | **SysCall Vector** Values 0 to 31.<br>00000 = 0<br>00001 = 1<br>00010 = 2<br>...<br>11111 = 31 |
| VimOffs<br>BACK | 8 | **VIM Offset** - Contains the offset from the base VIM address register to select which VIM to load (LV) or execute (XV)<br>0-255 is the architected range of VLIW offsets. Please refer to your specific configuration for the valid addressable VIM. |
| VX<br>BACK | 2 | **VLIW Extension** - Specifies if this XV overrides the LV UAF setting<br>0 = Do not override LV UAF setting<br>1 = Override the LV UAF setting with the one specified in the UAF field |
| W/H<br>BACK | 1 | **Dual Words / Quad Halfwords** - Used by BFLYS and BFLYD2<br>0 = Dual Words<br>1 = Quad Halfwords |
| XshrExt<br>BACK | 3 | **Extended Shift Right Extension**<br>000-101 = Reserved<br>110 = 2 Words (2W)<br>111 = 1 Doubleword (1D) |
| XscanExt<br>BACK | 3 | **Extended Scan Extension**<br>000 = Reserved<br>001 = 2 Bytes (2B)<br>010 = 1 Halfword (1H)<br>011..111 = Reserved |

While the present invention has been disclosed in the context of various aspects of presently preferred embodiments, it will be recognized that the invention may be suitably applied to other environments and applications consistent with the claims which follow.

We claim:

1. A system core comprising:

a processor;

a direct memory access (DMA) controller operating under control of a DMA processor;

an instruction memory containing processor instructions and DMA processor instructions;

a plurality of memories, the DMA controller coupled to the instruction memory and the plurality of memories, the DMA processor configured for fetching the DMA instructions from the instruction memory and executing the DMA instructions in parallel with the processor fetching and executing the processor instructions, the DMA instructions when executed causing the transfer of data to populate the plurality of memories with data from an external device, the processor operating on the data found in the populated memories.

2. The system core of claim 1 wherein the executed DMA instructions specify a pattern to populate the plurality of memories.

3. The system core of claim 2 wherein the pattern is a block, circular, or stride pattern.

4. The system core of claim 1 wherein the data from the external device includes processor instructions.

5. The system core of claim 1 further comprising:

a DMA bus connecting the DMA controller to the instruction memory and the plurality of memories.

6. The system core of claim 1 further comprising:

a bus coupled to the external device and the system core.

7. The system core of claim 1 wherein the external device is an external host processor.

8. The system core of claim 1 wherein the external device is an external synchronous data random access memory (SDRAM).

9. The system core of claim 1 wherein the DMA processor fetches DMA instructions from the instruction memory and executes the DMA instructions in parallel with the processor fetching and executing the processor instructions, the DMA instructions when executed causing the transfer of data to populate the external device with data from the plurality of memories.

10. A method for transferring data between a system core and an external device, the system core having a processor, a direct memory access (DMA) processor, an instruction memory storing processor instructions and DMA processor instructions, and a plurality of memories, the method comprising:

fetching direct memory access (DMA) instructions from the instruction memory under control of the DMA processor;

executing the fetched DMA instructions in parallel with the processor fetching and executing the processor instructions, the DMA instructions when executed causing the transfer of data to populate the plurality of memories with data from the external device; and transferring data from the external device to the plurality of memories.

11. The method of claim 10 wherein the executed DMA instructions specify a pattern to populate the plurality of memories.

12. The method of claim 11 wherein the pattern is a block, circular, or stride pattern.

13. The method of claim 10 wherein the data from the external device includes processor instructions.

14. The method of claim 10 wherein the external device is an external host processor.

15. The method of claim 10 wherein the external device is an external synchronous data random access memory (SDRAM).

16. The method of claim 10 further comprising:

executing the fetched DMA instructions in parallel with the processor fetching and executing the processor instructions, the DMA instructions when executed causing the transfer of data to populate the external device with data from the plurality of memories; and transferring data from the plurality of memories to the external device.

17. The method of claim 16 wherein the transferring data step further comprises:

accessing data from the plurality of memories:

writing the data to the external device wherein both the accessing and the writing steps occur in parallel.

18. The method of claim 10 wherein the processor is a sequential processor (SP) which executes the data transferred from the external device as instructions.

* * * * *